(12) United States Patent
Shashou et al.

(10) Patent No.: US 12,733,725 B2
(45) Date of Patent: Sep. 15, 2026

(54) AUTOMATED TOTAL NAIL CARE SYSTEMS, DEVICES AND METHODS

(71) Applicant: 10Beauty, Inc., Burlington, MA (US)

(72) Inventors: Alexander Shashou, New York, NY (US); Justin Effron, New York, NY (US); Gabe Greeley, Somerville, MA (US); Marcus R. Williams, Watertown, MA (US); Margaret Mathieu, Arlington, MA (US); Lucile Driscoll, Boston, MA (US); Lu Lyu, Medford, MA (US); Charles C. Shortlidge, Boston, MA (US); Peter Duerst, Cambridge, MA (US); Douglas Stewart, Quincy, MA (US); Chris Casey, Lexington, MA (US); Ndungu Muturi, Oakland, CA (US); Ryan Wood, Sausalito, CA (US); Zhi Teoh, Somerville, MA (US); Harald Quintus-Bosz, Newton, MA (US); Jesse Gray, Somerville, MA (US); Matt Berlin, Somerville, MA (US); Juhi Kalra, San Francisco, CA (US); Christine Noh, Cambridge, MA (US); Oliver Zhang, San Francisco, CA (US); Will Burke, San Francisco, CA (US); Chris Evans, Amherst, NH (US); Allison Tse, San Francisco, CA (US); Anthony Parker, New Ipswich, NH (US); Eric Maxwell, Charlestown, MA (US); Genevieve Laing, San Francisco, CA (US)

(73) Assignee: 10Beauty, Inc., Burlington, MA (US)

( * ) Notice: Subject to any disclaimer, the term of this patent is extended or adjusted under 35 U.S.C. 154(b) by 1035 days.

(21) Appl. No.: 17/772,986

(22) PCT Filed: Oct. 29, 2020

(86) PCT No.: PCT/US2020/058040

§ 371 (c)(1),
(2) Date: Apr. 28, 2022

(87) PCT Pub. No.: WO2021/087161

PCT Pub. Date: May 6, 2021

(65) Prior Publication Data

US 2024/0074560 A1 Mar. 7, 2024

Related U.S. Application Data

(60) Provisional application No. 62/994,933, filed on Mar. 26, 2020, provisional application No. 62/927,462, filed on Oct. 29, 2019.

(51) Int. Cl.
*A45D 29/20* (2006.01)
*A45D 29/00* (2006.01)
(Continued)

(52) U.S. Cl.
CPC ........... *A45D 29/20* (2013.01); *A45D 29/007* (2013.01); *A45D 44/00* (2013.01); *B25J 9/026* (2013.01);
(Continued)

(58) Field of Classification Search
CPC ...... A45D 29/20; A45D 29/007; A45D 44/00; A45D 29/06; A45D 29/14; A45D 29/22;
(Continued)

(56) References Cited

U.S. PATENT DOCUMENTS 5,931,166 A 8/1999 Weber et al.
6,035,860 A 3/2000 Mombourquette
(Continued)

FOREIGN PATENT DOCUMENTS

CN 107307564 A 11/2017
EP 2820316 B1 5/2016
(Continued)

OTHER PUBLICATIONS

International Search Report and Written Opinion issued in corresponding International Application No. PCT/US2020/058040, Feb. 18, 2021, 14 pages.
(Continued)

*Primary Examiner* — Harry Y Oh

(74) *Attorney, Agent, or Firm* — Mintz Levin Cohn Ferris Glovsky and Poneo P C

(57) ABSTRACT

A system, device and method for nail care is provided. The nail care system includes a shaping system, a polish removal
(Continued)

system and/or a cuticle management system; a vision system; a nail polish application system; and a mobility system. The nail system may further include an accelerated drying system, a hand massage system, a nail identification/diagnosis/estimation of conditions system, an enclosure, a hand/foot rest system, a computer software system, a computer hardware system, a cartridge/pod system, and a multi-tool system. Related apparatuses, techniques and articles are also described.

19 Claims, 172 Drawing Sheets

(51) Int. Cl.

| | |
|---|---|
| ***A45D 29/06*** | (2006.01) |
| ***A45D 29/14*** | (2006.01) |
| ***A45D 29/22*** | (2006.01) |
| ***A45D 44/00*** | (2006.01) |
| ***B25J 5/04*** | (2006.01) |
| ***B25J 9/02*** | (2006.01) |
| ***B25J 9/16*** | (2006.01) |
| ***B25J 11/00*** | (2006.01) |
| ***B25J 15/00*** | (2006.01) |
| ***B41J 3/407*** | (2006.01) |
| ***B41M 1/40*** | (2006.01) |
| ***G06T 7/70*** | (2017.01) |
| ***H04N 1/409*** | (2006.01) |
| ***H04N 1/60*** | (2006.01) |

(52) U.S. Cl.

CPC ............ *B25J 9/1697* (2013.01); *B25J 11/00* (2013.01); *B25J 15/0057* (2013.01); *B25J 15/0061* (2013.01); *B25J 15/0066* (2013.01); *B41J 3/4073* (2013.01); *B41M 1/40* (2013.01); *G06T 7/70* (2017.01); *H04N 1/409* (2013.01); *A45D 29/06* (2013.01); *A45D 29/14* (2013.01); *A45D 29/22* (2013.01); *G06T 2207/30196* (2013.01); *Y10S 901/02* (2013.01); *Y10S 901/14* (2013.01); *Y10S 901/30* (2013.01)

(58) Field of Classification Search

CPC ... A45D 2029/005; A45D 29/00; B25J 9/026; B25J 9/1697; B25J 11/00; B25J 15/0057; B25J 15/0061; B25J 15/0066; B25J 5/04; B25J 9/1684; B25J 11/008; B41J 3/4073; B41M 1/40; G06T 7/70; G06T 2207/30196; H04N 1/409; H04N 1/6097; Y10S 901/02; Y10S 901/14; Y10S 901/30; G05B 2219/45096

See application file for complete search history.

(56) References Cited

U.S. PATENT DOCUMENTS 6,067,996 A 5/2000 Weber et al.
6,286,517 B1 9/2001 Weber et al.
6,336,694 B1 1/2002 Ishizaka
6,525,724 B1 2/2003 Takami
6,990,984 B2 1/2006 Odwyer
7,123,983 B2 10/2006 Yogo et al.
7,188,628 B2 3/2007 Shubert et al.
7,648,364 B2 1/2010 Dauga et al.
8,061,365 B2 11/2011 Rehkemper et al.
8,118,509 B2 2/2012 Marcellus
8,235,386 B1 8/2012 Taig et al.
8,611,780 B2 12/2013 Yona et al.
8,615,185 B2 12/2013 Mor-Yosef et al.
8,646,898 B2 2/2014 Bitoh
8,681,359 B2 3/2014 Bitoh
8,695,495 B2 4/2014 Hashimoto
8,721,068 B2 5/2014 Yamasaki
8,746,820 B2 6/2014 Murata
8,752,956 B2 6/2014 Bitoh
8,757,171 B2 6/2014 Goff et al.
8,801,169 B2 8/2014 Nakayama
8,814,289 B2 8/2014 Yamasaki
8,814,291 B2 8/2014 Bitoh
8,820,866 B2 9/2014 Kasahara
8,840,206 B2 9/2014 Hashimoto
8,857,333 B2 10/2014 Bassat et al.
8,875,896 B2 11/2014 Mor-Yosef et al.
8,919,898 B2 12/2014 Yamasaki
8,919,903 B2 12/2014 Yamasaki
8,926,085 B2 1/2015 Bitoh
8,978,665 B2 3/2015 Liu et al.
9,004,625 B2 4/2015 Yamasaki
9,056,491 B2 6/2015 Bitoh
9,090,092 B2 7/2015 Bitoh et al.
9,139,021 B2 9/2015 Nakajima
9,156,282 B2 10/2015 Yamasaki
9,205,672 B1 12/2015 Bitoh
9,254,026 B2 2/2016 Yamasaki
9,259,814 B2 2/2016 Mor-Yosef
9,302,499 B2 4/2016 Yamasaki
9,314,083 B2 4/2016 Shaul
9,333,767 B2 5/2016 Yamasaki
9,340,038 B2 5/2016 Yamasaki
9,357,825 B2 6/2016 Yamasaki
9,386,834 B2 7/2016 Bitoh
9,398,798 B2 7/2016 Yi et al.
9,434,179 B2 9/2016 Bitoh
9,462,869 B2 10/2016 Bitoh
9,463,644 B2 10/2016 Yamasaki
9,475,308 B2 10/2016 Legallais
9,486,050 B2 11/2016 Yamasaki
9,510,658 B2 12/2016 Nagao
9,526,313 B2 12/2016 Asako
9,538,825 B2 1/2017 Yamasaki
9,603,431 B2 3/2017 Nagao
9,606,476 B2 3/2017 Mor-Yosef et al.
9,635,923 B2 5/2017 Bitoh
9,642,436 B2 5/2017 Miyamoto
9,649,859 B2 5/2017 Bitoh
9,675,159 B2 6/2017 Bitoh
9,687,059 B2 6/2017 Walia et al.
9,694,623 B2 7/2017 Bitoh
9,712,727 B2 7/2017 Yamasaki
9,743,740 B2 8/2017 Teshima
9,743,906 B2 8/2017 Maeva et al.
9,781,989 B2 10/2017 Yamasaki
9,789,683 B2 10/2017 Matsuda
9,799,116 B2 10/2017 Kafuku
9,808,068 B2 11/2017 Yamasaki
9,820,547 B2 11/2017 Yamasaki
9,888,759 B2 2/2018 Asako
9,889,692 B2 2/2018 Legallais
9,894,976 B2 2/2018 Shimizu
9,894,978 B2 2/2018 Nagao
9,894,979 B2 2/2018 Irie
9,901,156 B2 2/2018 Nagao
9,902,148 B2 2/2018 Liu et al.
9,930,951 B2 4/2018 Nagao
9,931,865 B2 4/2018 Shimizu
9,943,154 B2 4/2018 Teshima et al.
9,943,155 B2 4/2018 Hori
9,955,764 B2 5/2018 Yoshigai
9,962,955 B2 5/2018 Collett
10,022,984 B2 7/2018 Irie
10,029,477 B2 7/2018 Yamasaki
10,130,154 B2 11/2018 Irie
10,149,526 B2 12/2018 Nagao
10,156,805 B2 12/2018 Mor-Yosef et al.
10,213,004 B2 2/2019 Miyamoto
10,254,499 B1 4/2019 Cohen et al.
10,278,472 B2 5/2019 Yamasaki
10,286,683 B2 5/2019 Kobayashi
10,292,475 B2 5/2019 Yamasaki

(56) References Cited

U.S. PATENT DOCUMENTS 10,292,476 B2 5/2019 Barrett
10,292,477 B2 5/2019 Hori
10,318,838 B2 6/2019 Nagao
10,327,529 B2 6/2019 Bitoh
10,384,483 B2 8/2019 Kasahara
10,404,890 B2 9/2019 Cao
10,426,244 B2 10/2019 Papshev et al.
10,470,546 B2 11/2019 Walia et al.
10,477,937 B2 11/2019 Walia et al.
10,517,369 B2 12/2019 Hori
10,542,810 B1 1/2020 Auguste
10,548,383 B2 2/2020 Futawatari
10,561,219 B2 2/2020 Hori
10,562,178 B2 2/2020 Harding et al.
10,569,068 B2 2/2020 Stanley et al.
10,569,552 B2 2/2020 Nagao
10,653,225 B2 5/2020 Walia et al.
10,682,866 B2 6/2020 Irie
10,694,828 B2 6/2020 Ortiz et al.
10,696,067 B2 6/2020 Kuronuma
10,702,039 B2 7/2020 Shimizu
10,736,400 B2 8/2020 Nagao
10,750,838 B2 8/2020 Leong
10,779,628 B2 9/2020 McMullen
10,780,711 B2 9/2020 Yamasaki
10,780,712 B2 9/2020 Yamasaki
11,058,204 B2 7/2021 Shashou et al.
2002/0155069 A1 10/2002 Pruche et al.
2004/0194648 A1 10/2004 Uchida
2005/0174367 A1 8/2005 Kondo et al.
2007/0092634 A1 4/2007 Zhang
2009/0153604 A1 6/2009 Chen et al.
2011/0315027 A1 12/2011 Bitoh
2013/0077103 A1 3/2013 Asako
2013/0106928 A1 5/2013 Lee
2013/0106970 A1 5/2013 Yamasaki
2013/0247929 A1 9/2013 Namai
2014/0014127 A1 1/2014 Waxler
2014/0060560 A1 3/2014 Bitoh
2015/0174914 A1 6/2015 Bitoh
2015/0335131 A1* 11/2015 Ortiz .................... G06F 3/0412 132/73.6
2015/0366317 A1 12/2015 Bitoh
2016/0135657 A1 5/2016 Mao et al.
2016/0174680 A1 6/2016 Yamasaki
2016/0183657 A1 6/2016 Nagao
2016/0227900 A1 8/2016 Kumagai
2016/0309877 A1 10/2016 Papshev et al.
2016/0353859 A1 12/2016 Melul
2016/0367010 A1 12/2016 Hori
2016/0367011 A1 12/2016 Hori
2016/0374450 A1 12/2016 Bitoh
2017/0006994 A1 1/2017 King
2017/0007516 A1 1/2017 Mercado et al.
2017/0008275 A1 1/2017 Liu et al.
2017/0008305 A1 1/2017 Kobayashi
2017/0015125 A1 1/2017 Kobayashi
2017/0036456 A1 2/2017 Legallais
2017/0065051 A1 3/2017 Shimizu
2017/0065053 A1 3/2017 Nagao
2017/0071314 A1 3/2017 Irie
2017/0072702 A1 3/2017 Collett
2017/0079402 A1 3/2017 Miyamoto
2017/0079405 A1 3/2017 Asako
2017/0172279 A1 6/2017 Nagao
2017/0181520 A1 6/2017 Nagao
2017/0181522 A1 6/2017 Yoshigai
2017/0193651 A1 7/2017 Yamasaki
2017/0215549 A1 8/2017 Teshima et al.
2017/0215550 A1* 8/2017 Walia .................. A45D 44/005
2017/0266983 A1 9/2017 Irie
2017/0273432 A1 9/2017 Irie
2017/0273433 A1 9/2017 Hori
2017/0347770 A1 12/2017 Walia et al.
2018/0000221 A1 1/2018 Adem
2018/0117938 A1 5/2018 Legallais
2018/0144527 A1* 5/2018 Anderson ............ G06T 3/4038
2018/0255903 A1 9/2018 Walia et al.
2018/0276230 A1 9/2018 Ouyang et al.
2019/0021467 A1 1/2019 Sato
2019/0037997 A1 2/2019 Yoshii
2019/0095747 A1 3/2019 Sasaki
2019/0150589 A1 5/2019 Jones
2019/0166972 A1 6/2019 Walia et al.
2019/0191845 A1 6/2019 Sasaki
2019/0208884 A1 7/2019 Ortiz et al.
2019/0208886 A1 7/2019 Yamasaki
2019/0239616 A1 8/2019 Walia et al.
2019/0269223 A1 9/2019 Harding et al.
2019/0313764 A1 10/2019 Yamasaki
2019/0313765 A1 10/2019 Leong
2019/0314997 A1 10/2019 Amundson et al.
2019/0365077 A1 12/2019 Mor Yosef et al.
2020/0060406 A1 2/2020 Mor Yosef et al.
2020/0060407 A1 2/2020 Yasumoto et al.
2020/0062004 A1 2/2020 Yasumoto et al.
2020/0069027 A1 3/2020 Hu et al.
2020/0086666 A1 3/2020 He et al.
2020/0107628 A1 4/2020 Tsuyuki
2020/0113306 A1 4/2020 Shimizu
2020/0114134 A1 4/2020 Stanley et al.
2020/0146419 A1 5/2020 Griffon
2020/0193399 A1 6/2020 Li et al.
2020/0196937 A1 6/2020 Gopalan
2020/0205549 A1* 7/2020 Mor Yosef ............ A46B 9/021
2020/0207080 A1 7/2020 Hayashi et al.
2020/0221849 A1 7/2020 Lin et al.
2020/0268125 A1 8/2020 Apte et al.
2020/0275756 A1 9/2020 Amar
2020/0276805 A1 9/2020 Miura
2020/0276832 A1 9/2020 Nagao
2020/0307252 A1 10/2020 Yamasaki
2020/0307291 A1 10/2020 Fukasawa et al.
2021/0120935 A1 4/2021 Shashou et al.

FOREIGN PATENT DOCUMENTS

EP 2758242 B1 8/2017
JP 2000-175732 A 6/2000
JP 3195361 U 1/2015
JP 3218523 U 10/2018
KR 2016-0123633 A 10/2016
KR 101947779 B1 5/2019
KR 1020190109512 A 9/2019
WO 2015101696 A1 7/2015
WO WO-2016014132 A1 1/2016
WO WO-2017163237 A1 9/2017
WO WO-2018-142401 A1 8/2018
WO WO-2019070886 A1 4/2019
WO 2021087161 A1 5/2021

OTHER PUBLICATIONS

R. J. Kuo, "Intelligent Robotic Die Polishing System Through Fuzzy Neural Networks and Multi-Sensor Fusion," Proceedings of 1993 International Joint Conference on Neural Networks, IEEE (2002).

* cited by examiner

Total Intensity: MB_R4

100
200
300
400
500
600
700
800
900

200 400 600 800 1000 1200

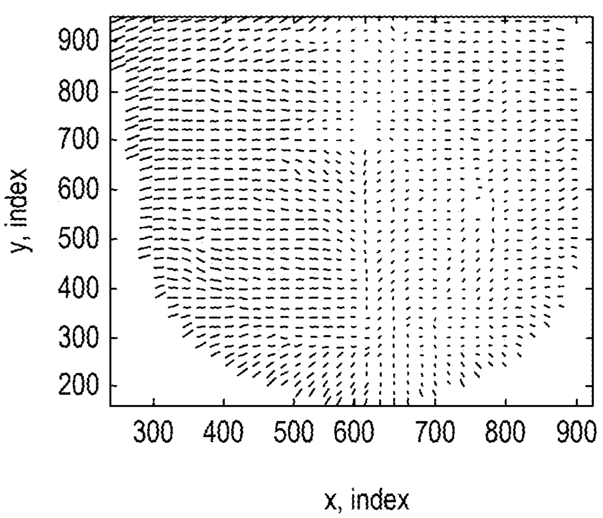
FIG. 49D
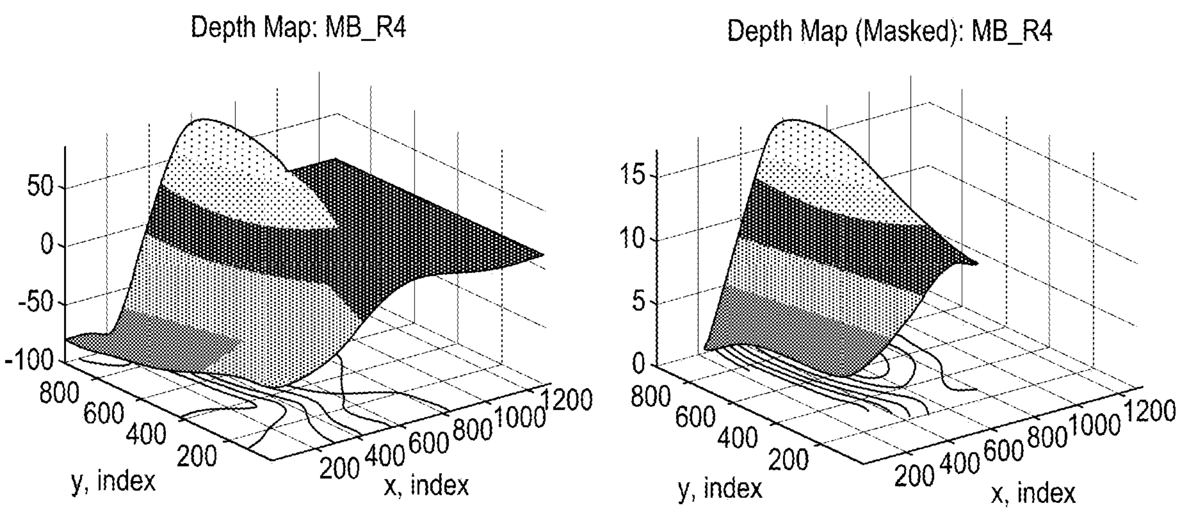
FIG. 49E
FIG. 49F

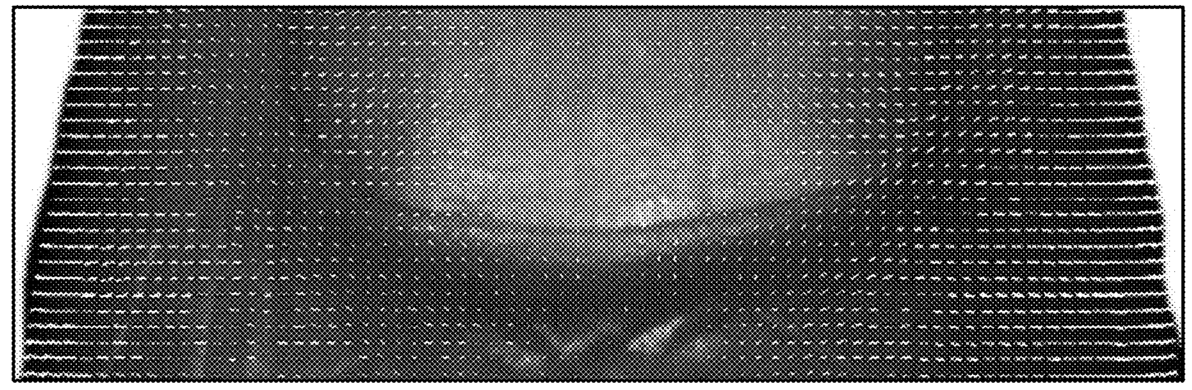
FIG. 81
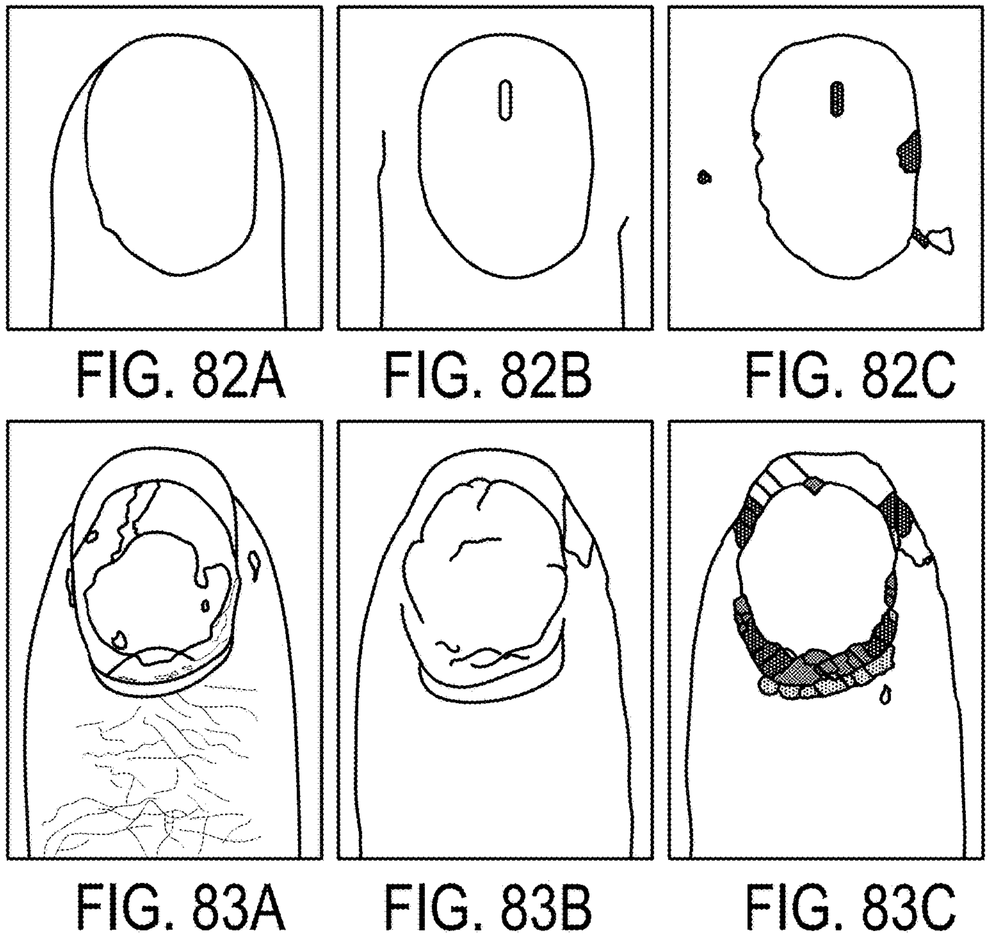
FIG. 82A FIG. 82B FIG. 82C
FIG. 83A FIG. 83B FIG. 83C

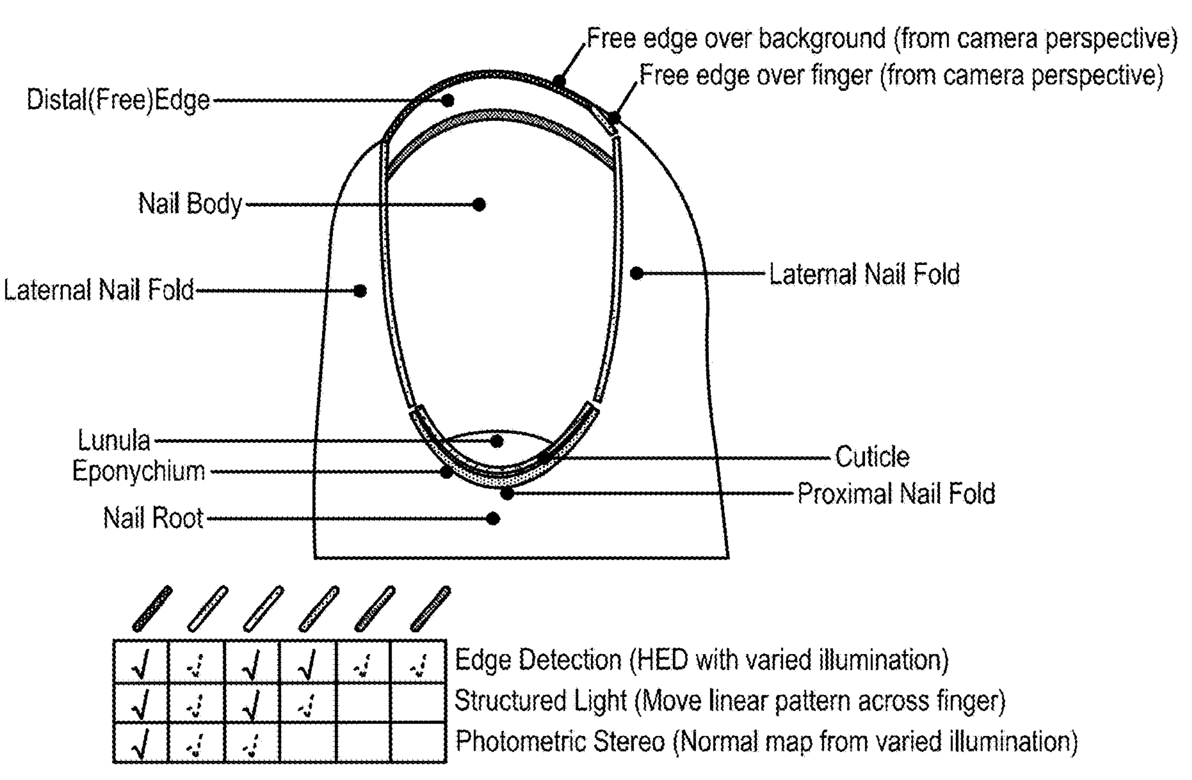
√ -Helpful in this region √ - Partially helpful in this region
FIG. 84
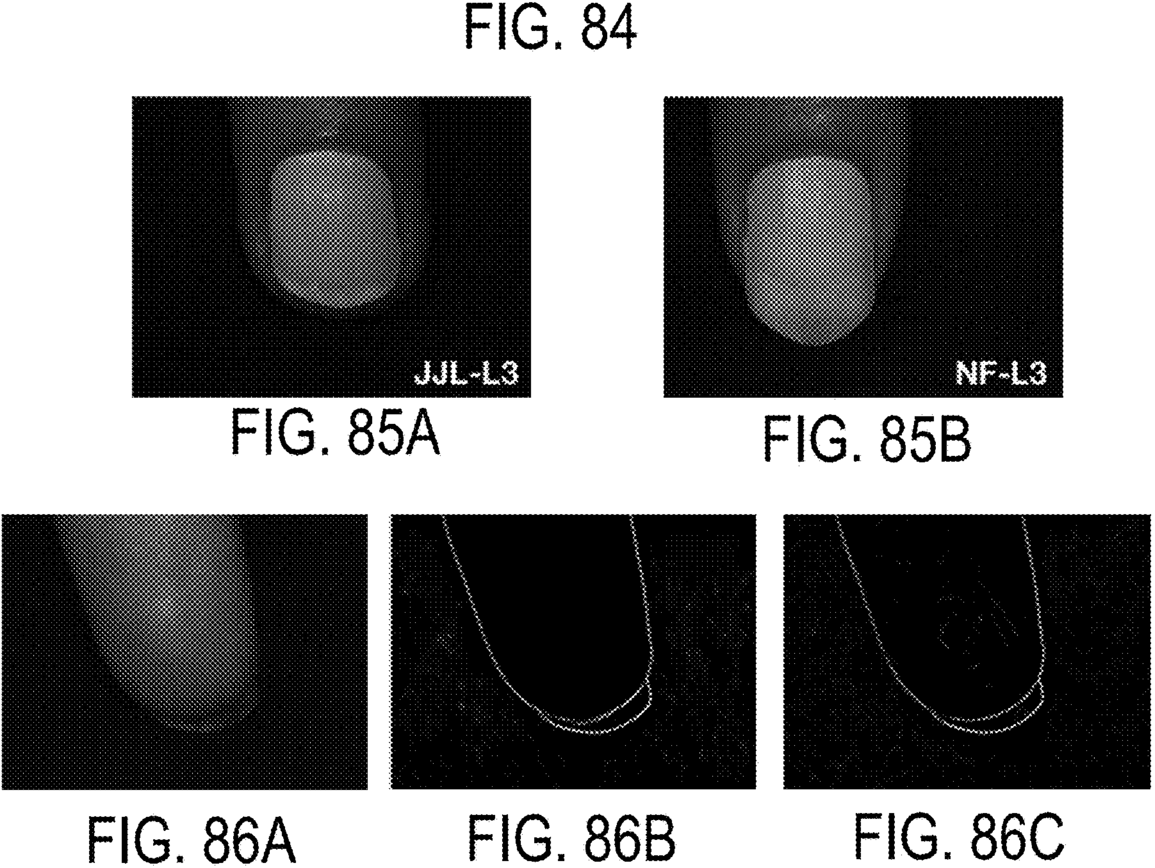
FIG. 85A FIG. 85B
FIG. 86A FIG. 86B FIG. 86C

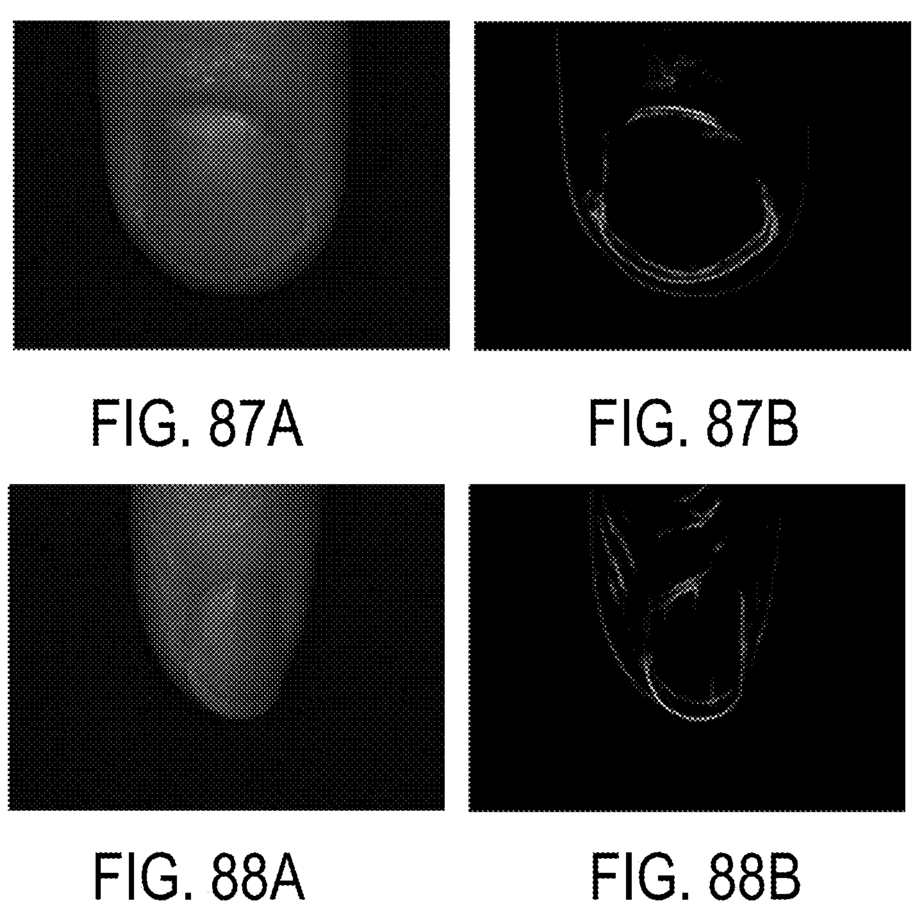
FIG. 87A
FIG. 87B
FIG. 88A
FIG. 88B
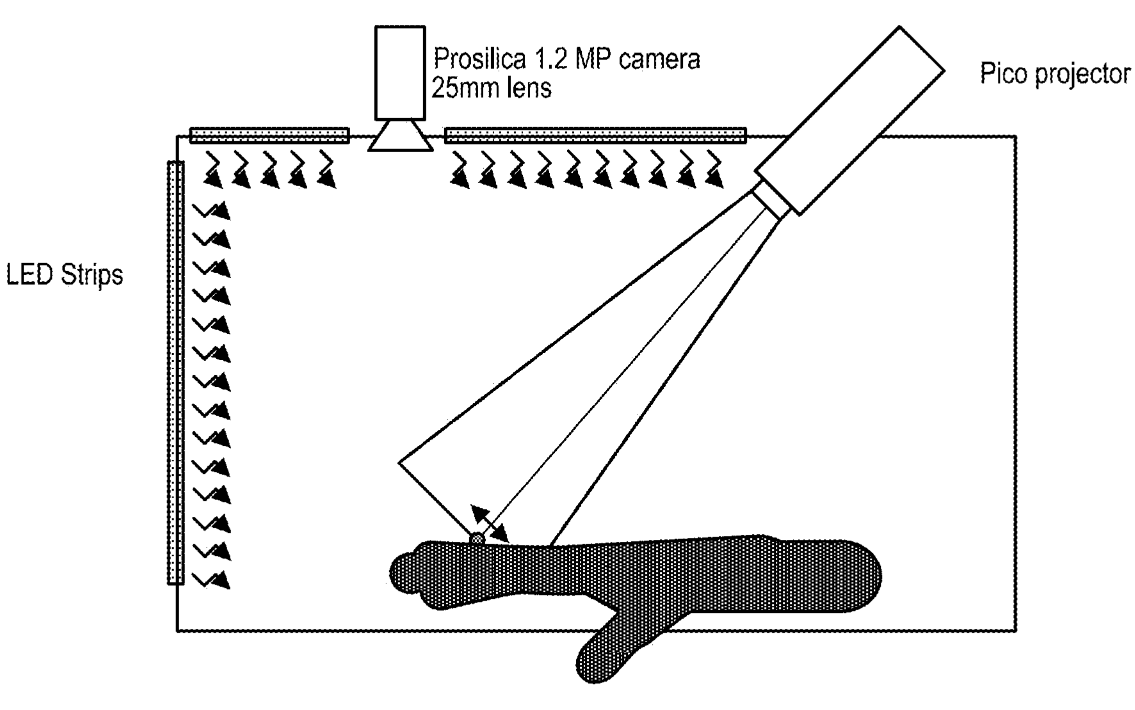
FIG. 89

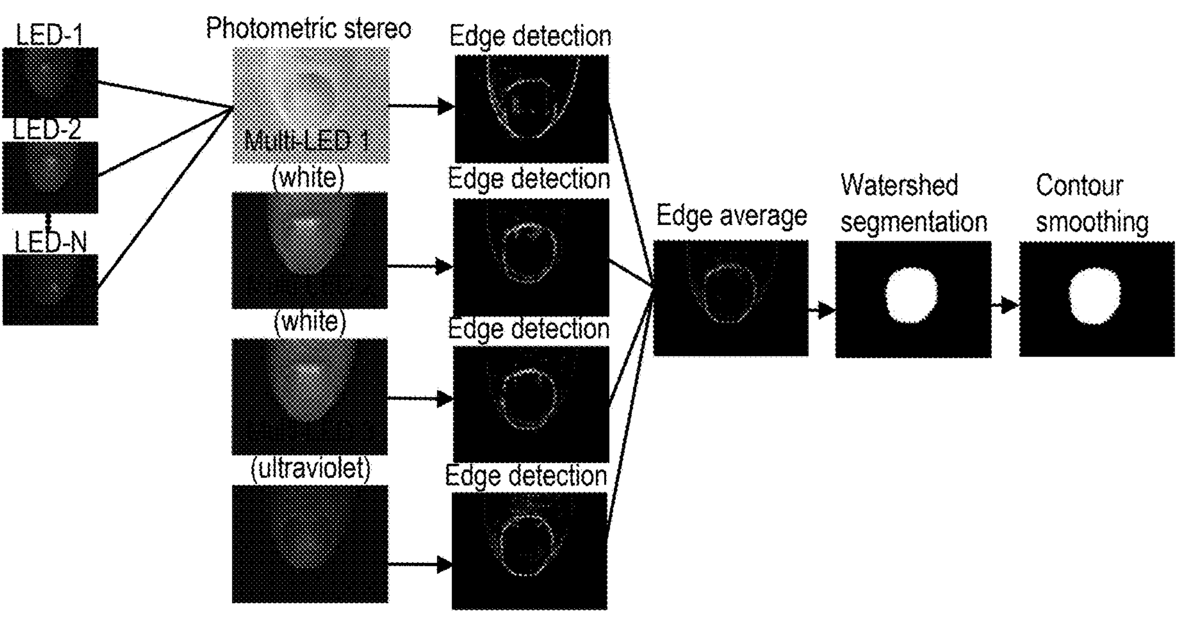
FIG. 92
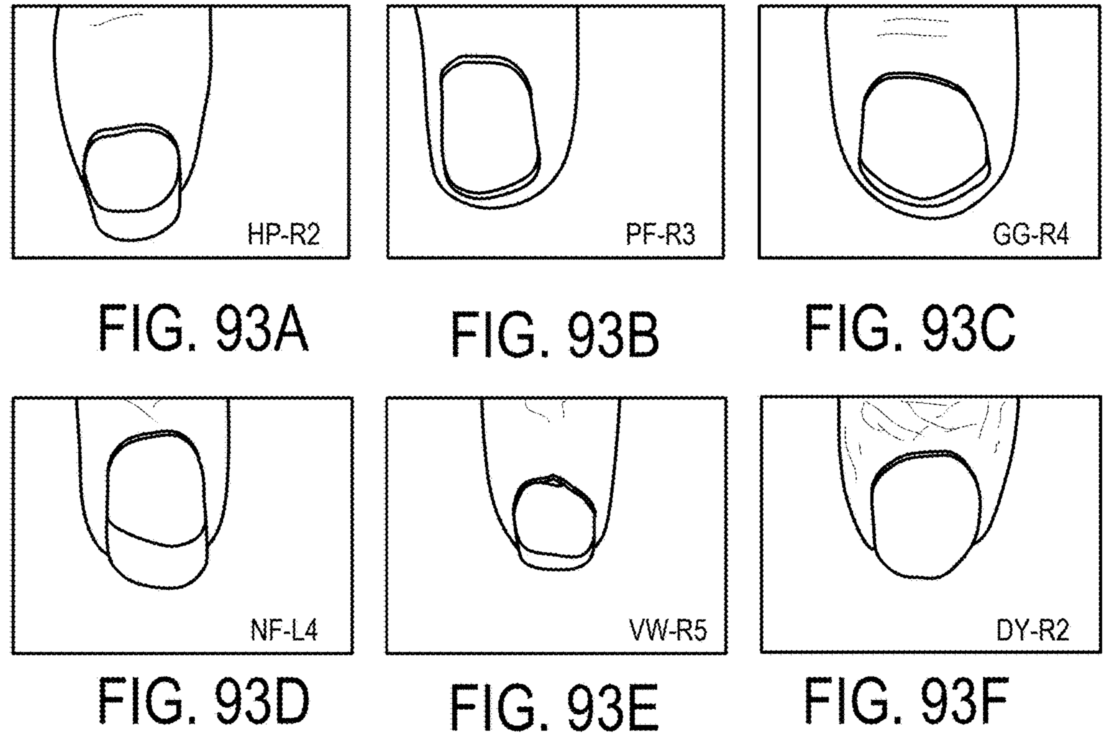
FIG. 93A FIG. 93B FIG. 93C
FIG. 93D FIG. 93E FIG. 93F Before removal First clean Second clean Third clean
Little
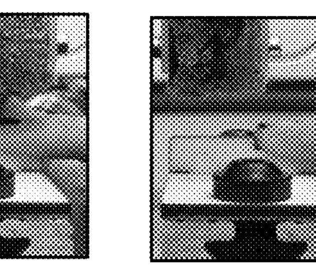
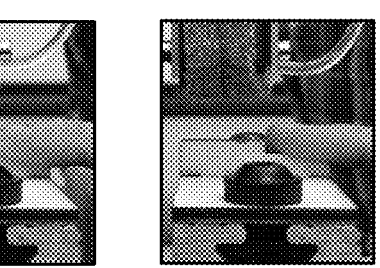
FIG. 99A FIG. 99B FIG. 99C FIG. 99D
Ring
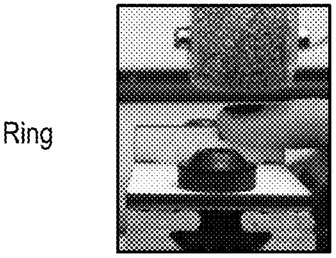
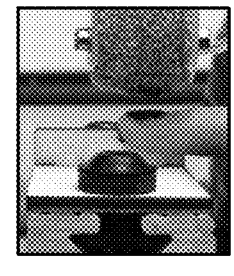
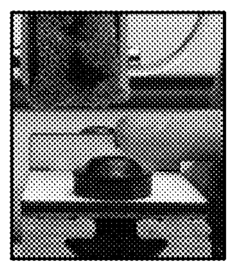
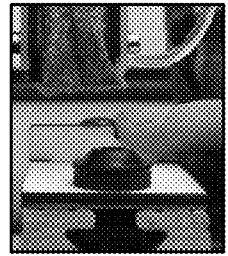
FIG. 100A FIG. 100B FIG. 100C FIG. 100D
Middle
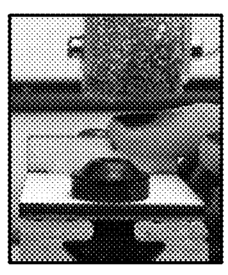
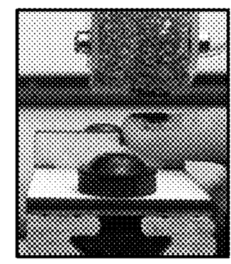
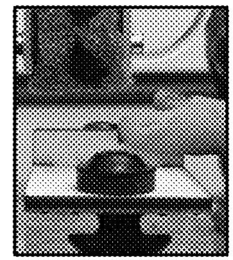
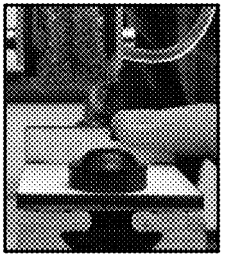
FIG. 101A FIG. 101B FIG. 101C FIG. 101D

| Name | Shrouded Nail Clipper | Shallow Scraping Cutter | Paint n Dump | Structured Laser to Cut | Pipe Cutter |
|---|---|---|---|---|---|
| | | | | | |
| | 103 | 102 | 100 | 99 | 99 |
| Speed | 5 | 4 | 2 | 5 | 5 |
| System complexity | 4 | 4 | 5 | 4 | 4 |
| System reliability | 4 | 5 | 5 | 5 | 4 |
| User experience | 4 | 3 | 2 | 5 | 4 |
| Cost | 4 | 5 | 5 | 2 | 4 |
| Output quality | 4 | 4 | 4 | 4 | 3 |
| Safety | 4 | 4 | 5 | 3 | 4 |
| Score | 103 | 102 | 100 | 99 | 99 |

FIG. 108A

| Double pizza cutter | Machine Positioned Nail Clipper | Shallow Depth of field Laser | Paint and User Files w/ Special, shaped Files | Laser Bath |
|---|---|---|---|---|
| | | | | |
| 99 | 99 | 99 | 96 | 92 |
| 5 | 5 | 5 | 2 | 4 |
| 4 | 4 | 4 | 5 | 3 |
| 4 | 4 | 5 | 5 | 4 |
| 4 | 3 | 5 | 2 | 5 |
| 4 | 4 | 2 | 5 | 1 |
| 3 | 4 | 4 | 3 | 4 |
| 4 | 4 | 3 | 5 | 4 |
| 99 | 99 | 99 | 96 | 92 |

FIG. 108B

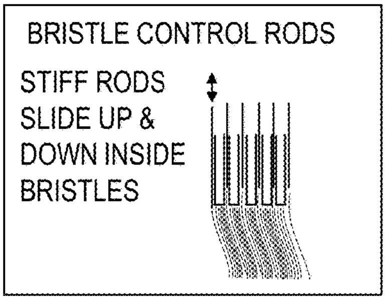
FIG. 113A
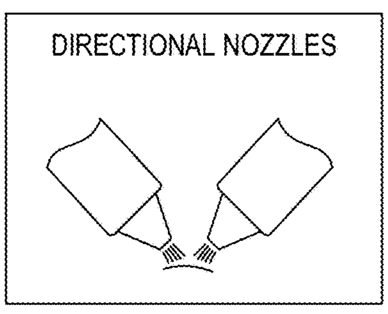
FIG. 113B
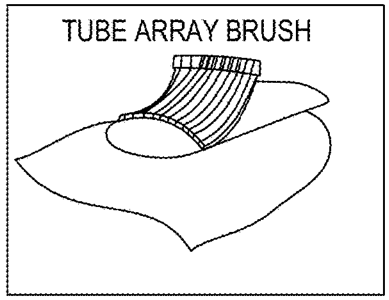
FIG. 113C
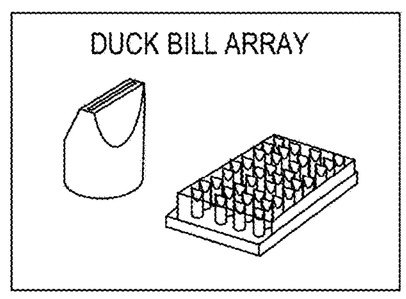
FIG. 113D
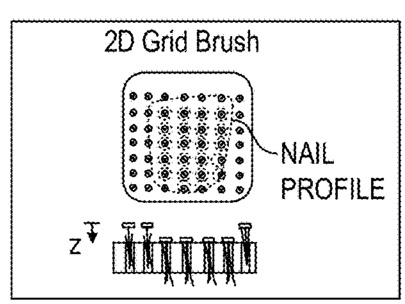
FIG. 113E

| 5=good, 1=bad | WEIGHTING | Concentric Applicator Brush | Foam Tip Applicator | Capillary Worm | Fountain Pen Applicator | Nozzle Tip | Ball Point Pen Applicator |
|---|---|---|---|---|---|---|---|
| Edge Smoothness | 4 | 3 | 3 | 4 | 5 | 5 | 4 |
| Surface Finish | 5 | 3 | 1 | 3 | 4 | 4 | 4 |
| System Complexity | 3 | 2 | 3 | 4 | 5 | 5 | 4 |
| System Reliability | 4 | 2 | 4 | 3 | 5 | 5 | 4 |
| Maintanance Level | 3 | 3 | 2 | 2 | 3 | 4 | 3 |
| Cost (Reuseable) | 1 | 4 | 4 | 5 | 5 | 4 | 4 |
| Cost (Disposeable) | 3 | 5 | 4 | 3 | 2 | 2 | 1 |
| Application Speed | 4 | 2 | 3 | 4 | 3 | 3 | 3 |
| | | 77 | 76 | 82 | 101 | 103 | 89 |

FIG. 114A

| Ball Valve Applicator | 2D Grid Brush | Pad Printing System | Spinning Applicator | Cut Outs | Tape Measure Application | Shape Changing Sponge | UV Cure as you go |
|---|---|---|---|---|---|---|---|
| 1 | 1 | 3 | 4 | 5 | 2 | 3 | 5 |
| 4 | 3 | 1 | 2 | 5 | 2 | 1 | 2 |
| 2 | 1 | 2 | 4 | 4 | 2 | 1 | 4 |
| 3 | 3 | 1 | 3 | 5 | 2 | 1 | 5 |
| 2 | 1 | 3 | 5 | 5 | 2 | 2 | 5 |
| 4 | 1 | 5 | 5 | 2 | 3 | 5 | 5 |
| 1 | 2 | 1 | 2 | 1 | 2 | 2 | 1 |
| 4 | 4 | 4 | 2 | 5 | 1 | 5 | 3 |
| 68 | 54 | 57 | 78 | 114 | 45 | 55 | 94 |

FIG. 114B

| TOOL DESCRIPTION | TOOL IMAGE | PAINTING RESULTS |
| --- | --- | --- |
| Horizontally rotated Q-tip | FIG. 121A | FIG. 121B<br>FIG. 121C |
| Horizontally rotated silicone eye-liner brush | FIG. 121D | FIG. 121E<br>FIG. 121F |

| High-downforce tests (greater than 10 grams of downforce) | | |
|---|---|---|
| TOOL DESCRIPTION | TOOL IMAGE | PAINTING RESULTS |
| Filleted Reduction Head | FIG. 124A FIG. 124B | FIG. 124C FIG. 124D |
| Conical Tipped | FIG. 124E FIG. 124F | FIG. 124G FIG. 124H |
| Dome Tipped | FIG. 124I | FIG. 124J |
| Internal Cavity | FIG. 124K FIG. 124L | FIG. 124M FIG. 124N |
| Silicone brush | FIG. 124O | FIG. 124P FIG. 124Q |
| Mini Q-tip | FIG. 124R | FIG. 124S FIG. 124T |
| Dotting Tool | FIG. 124U | FIG. 124V FIG. 124W |
| Filleted Reduction Head | FIG. 124X | FIG. 124Y |

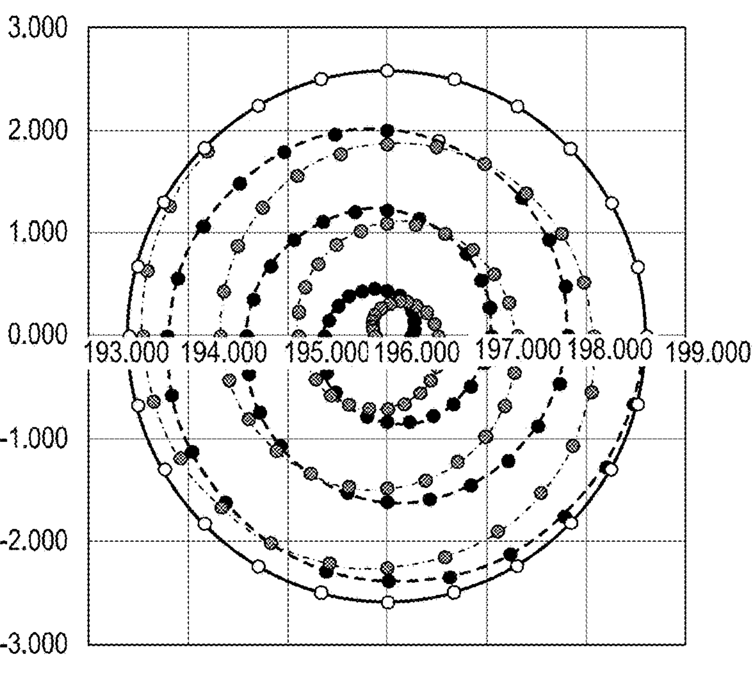
FIG. 125
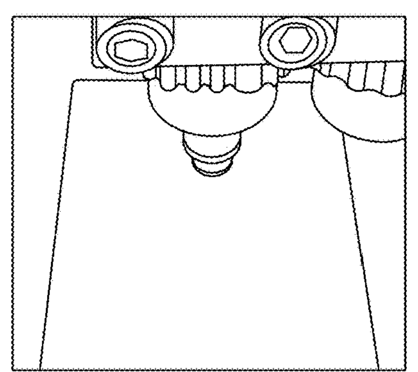
FIG. 126A
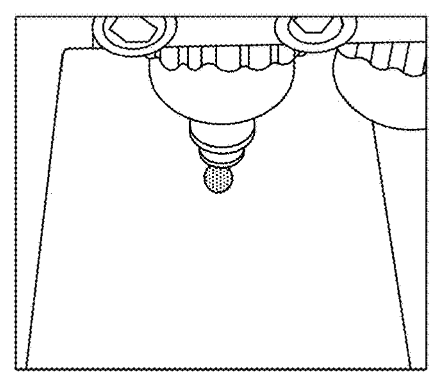
FIG. 126B
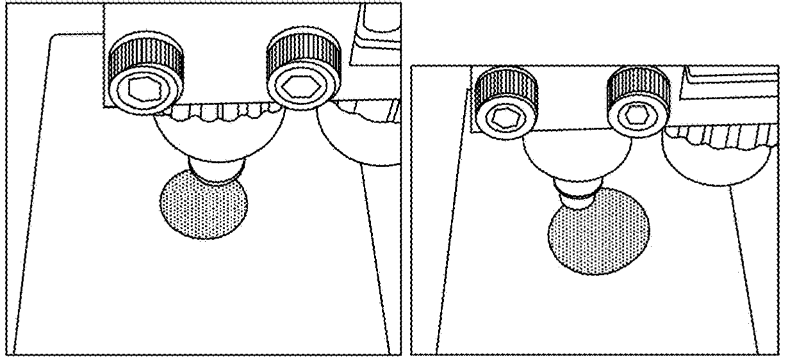
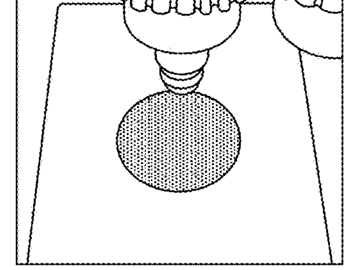
FIG. 126C
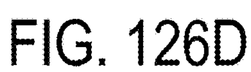
FIG. 126D
FIG. 126E

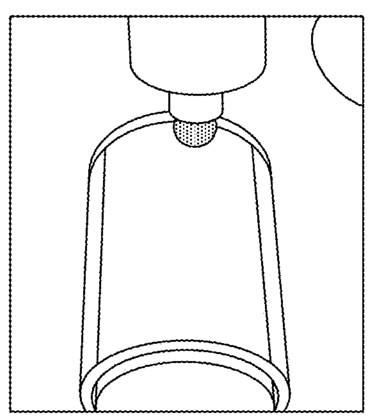
FIG. 128A
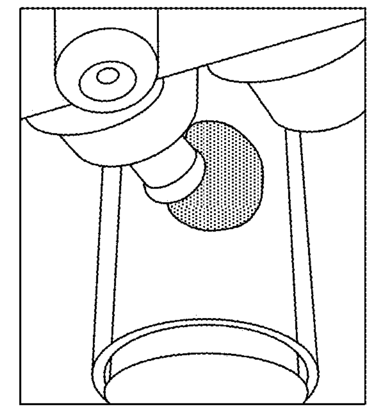
FIG. 128B
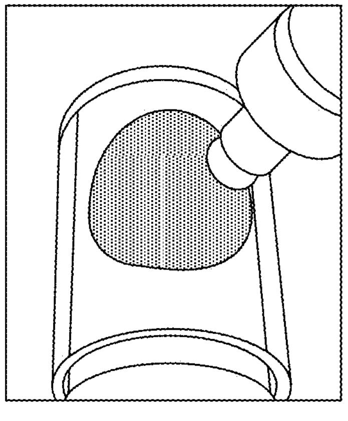
FIG. 128C
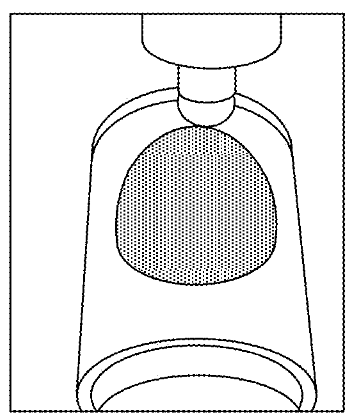
FIG. 128D
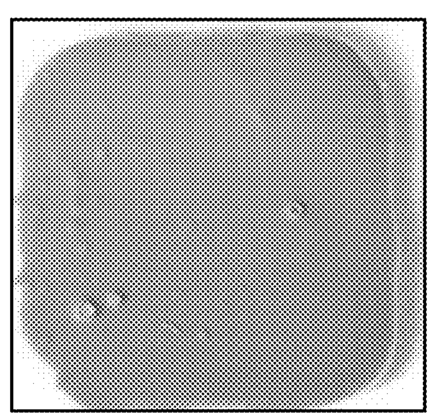
FIG. 129

| | Low-downforce tests (less than 1 gram of downforce) | | |
|---|---|---|---|
| TOOL DESCRIPTION | TOOL IMAGE | | PAINTING RESULTS |
| Soft Smooth Rotating Rubber Disc | FIG. 130A | FIG. 130B | FIG. 130C |
| Low Angled Rotating Rubber Cone | FIG. 130D | FIG. 130E | FIG. 130F |
| High Angled Rotating Rubber Cone | FIG. 130G | FIG. 130H | FIG. 130I |

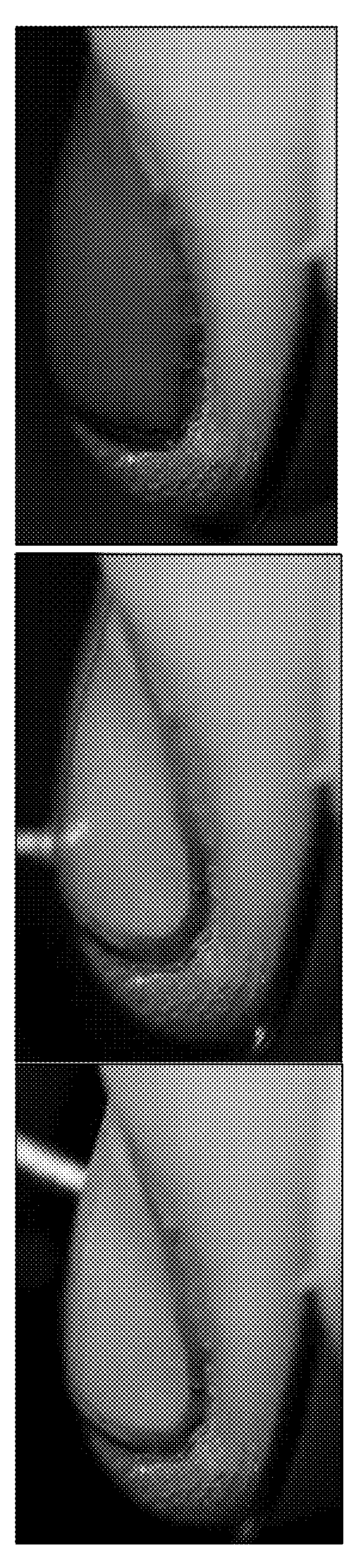
FIG. 157A
FIG. 157B
FIG. 157C
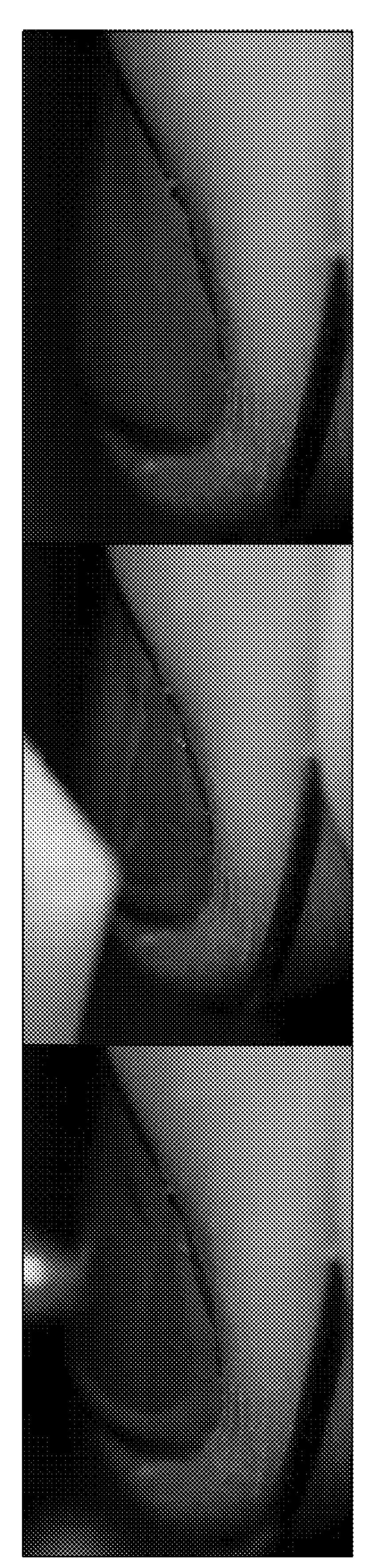
FIG. 157D
FIG. 157E
FIG. 157F

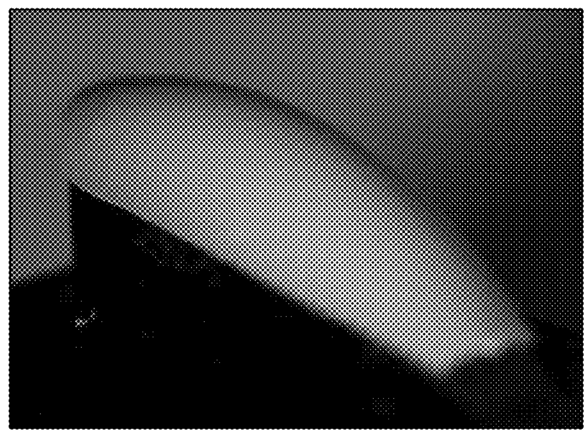
FIG. 161A
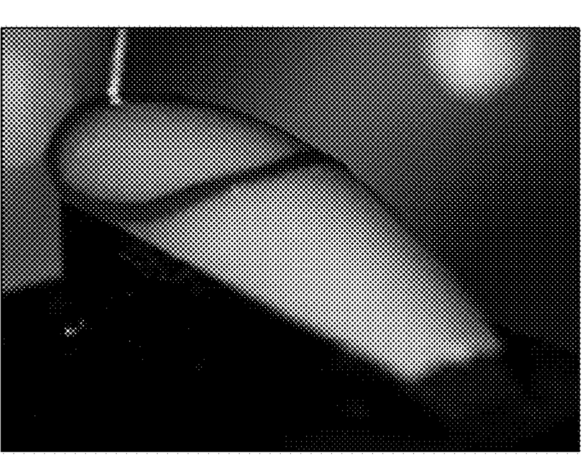
FIG. 161B
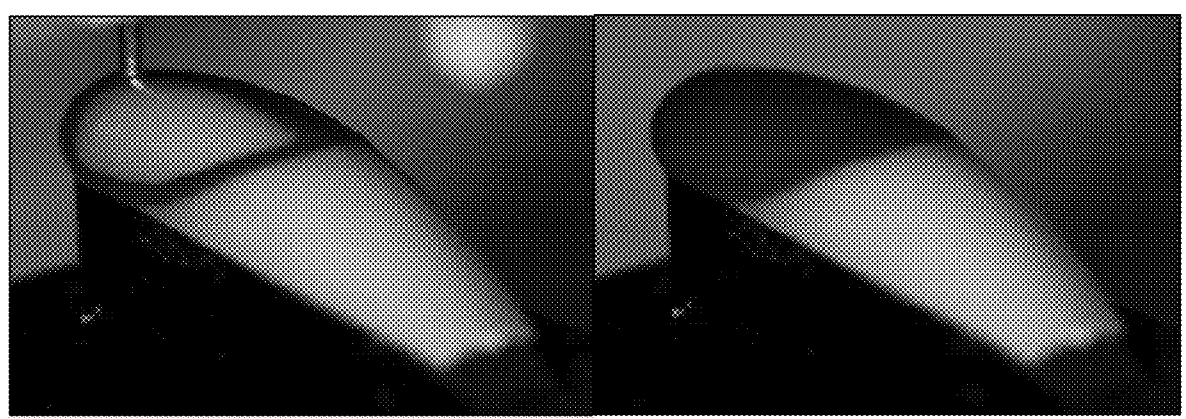
FIG. 161C
FIG. 161D

FILL SPEED=15

FILL SPEED=15

FILL SPEED=15

FILL SPEED=15

FILL SPEED=10

FILL SPEED=10

FILL SPEED=7

FILL SPEED=7

FILL SPEED=15+2 Layers

| TOOL DESCRIPTION | TOOL IMAGE | PAINTING RESULTS |
|---|---|---|
| Nylon Brush / Single Coat | FIG. 180A | FIG. 180B |
| Nylon Brush / Double Coat | FIG. 180C | FIG. 180D |

| TOOL DESCRIPTION | TOOL IMAGE | PAINTING RESULTS |
| --- | --- | --- |
| Makeup Brush<br>Single Coat<br>Light Pressure | FIG. 181A | FIG. 181B<br>FIG. 181C |

| TOOL DESCRIPTION | TOOL IMAGE | PAINTING RESULTS |
|---|---|---|
| Nail Polish Brush Slow Speed Linear Robotic Move | FIG. 183A | FIG. 183B<br>FIG. 183C |
| Nail Polish Brush Fast Speed Linear Robotic Move | FIG. 183D | FIG. 183E |

| TOOL DESCRIPTION | TOOL IMAGE | PAINTING RESULTS |
| --- | --- | --- |
| Soft Smooth Rubber | FIG. 187A | FIG. 187B FIG. 187C |
| Textured Rubber | FIG. 187D | FIG. 187E FIG. 187F |

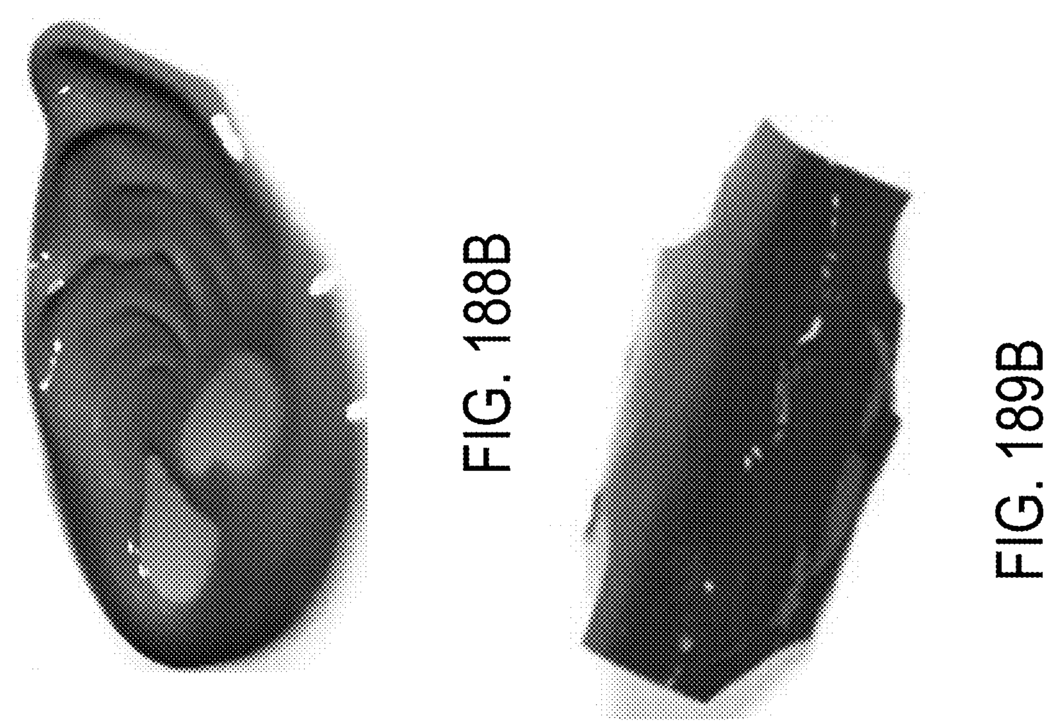
FIG. 188B
FIG. 189B
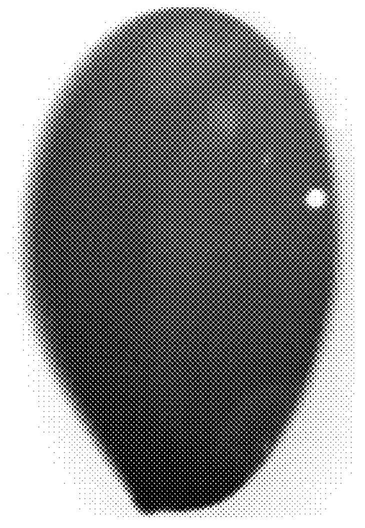
FIG. 188A
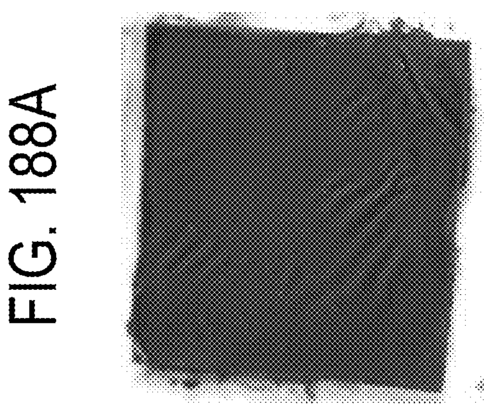
FIG. 189A

| TOOL DESCRIPTOR | TOOL IMAGE | PAINTING RESULTS |
| --- | --- | --- |
| Nail Art Pad Printer | FIG. 190A | FIG. 190B FIG. 190C |
| Open Cell Foam Pad | FIG. 190D | FIG. 190E FIG. 190F |

AUTOMATED TOTAL NAIL CARE SYSTEMS, DEVICES AND METHODS

CROSS-REFERENCE TO RELATED APPLICATIONS

The present application claims priority to and is the 35 U.S.C. 371 United States National Phase application based on International Patent Application No. PCT/US2020/058040, filed on Oct. 29, 2020, and entitled "AUTOMATED TOTAL NAIL CARE SYSTEMS, DEVICES AND METHODS", which claims priority to U.S. Provisional Patent Application No. 62/927,462, filed on Oct. 29, 2019, entitled "APPARATUS AND METHOD FOR AUTOMATED TOTAL NAIL CARE," and to U.S. Provisional Patent Application No. 62/994,933, filed on Mar. 26, 2020, entitled "APPARATUS AND METHOD FOR AUTOMATED TOTAL NAIL CARE," the disclosures which are incorporated herein by reference in their entireties.

TECHNICAL FIELD

The present disclosure relates to a system, device and method for nail care. Specifically, the present disclosure relates to a nail care system including one or more of a vision system, an enamel/polish removal system, a nail shaping system, a cuticle management system, an enamel/polish application system, an accelerated drying system, a hand massage system, a nail identification/diagnosis/estimation of conditions system, a mobility mechanism system, an enclosure, a hand/foot rest system, an ancillary forearm support system, a computer software system, a computer hardware system, a consumable cartridge/pod system, a cloud computing system, a user device, and a multi-tool system. Related apparatuses, techniques and articles are also described.

BACKGROUND

Developed devices and methods for nail care involved vision, mobility and polish application. However, the results achieved by the developed devices and methods failed to deliver a professional quality manicure. The developed systems failed to recognize the importance of shaping, polish removal or cuticle management in combination with vision, mobility and polish application. Real-world results of the developed devices and methods were inferior and unable to achieve a salon quality nail treatment. Developed spray painting systems were only fully effective if the nail was already manicured. Developed manicure (shaping and cuticle management) systems did not remove polish. Developed polish removers did not shape the nail or manage the cuticle. Combining a nail manicure, polish removal and nail painting systems was heretofore unattempted, due to the difficulty of achieving a professional quality manicure in an automated or semiautomated device.

The present inventors developed improvements of devices and methods in nail care that overcome the above-referenced problems with the devices and methods of the related art. Among many numerous advancements in the state of the art, the present inventors recognized the importance of shaping, polish removal and/or cuticle management to the nail care process and describe herein a technologically advanced and effective nail care system.

SUMMARY

One or more of the following features may be included in any feasible combination.

A system, apparatus, device and method for delivering a manicure or pedicure is provided.

A nail care system may include one or more of a shaping system, a polish removal system and a cuticle management system; a vision system; a nail polish application system; and a mobility system.

The shaping system may be configured for one or more of rotary motion, linear reciprocating motion, and rotational oscillation, and wherein the shaping system comprises an abrasive element.

The polish removal system may include a polish removal tool comprising one or more of a sponge, a semi-circular groove or a groove pattern on a surface thereof, and a brush.

The cuticle management system may include a burnishing tool.

The vision system may include: an image acquisition system, an illumination system, and a machine vision processing system.

The machine vision processing system may include a computer device, the computer device having at least one processor and a memory storing at least one program for execution by the at least one processor, the at least one program including instructions, which, when executed by the at least one processor cause the at least one processor to perform operations.

The operations may include one or more of receiving image information from the vision system; pre-processing the received images; determining nail extent and a nail height profile based on analysis of the pre-processed images; determining finger and nail placement based on analysis of the pre-processed images; outputting operating instructions for one or more of the shaping system, the polish removal system, the cuticle management system, the vision system, the nail polish application system, and the mobility system based on the determined nail extent, the determined nail height profile, and the determined finger and nail placement.

The nail polish application system may include a reservoir or vial in fluid communication with a nozzle.

The reservoir or vial may include a cap, the cap may be configured to remain stationary relative to the nozzle, and the reservoir or vial may be configured to be moved relative to the nozzle, and cause fluid in the reservoir or vial to flow out of the nozzle.

The mobility system may be configured to move one or more of the shaping system, the polish removal system, the cuticle management system, and the nail polish application system in at least three directions and rotationally about at least two axes.

The nail care system may further include an accelerated drying system.

The nail care system may further include a hand massage system.

The nail care system may further include a nail identification, diagnosis and estimation of conditions system.

The nail care system may further include an enclosure system configured to enclose the mobility system, one or more of the shaping system, the polish removal system, the cuticle management system, and the nail polish application system, and configured to permit movement of the same in at least three directions and rotationally about at least two axes.

The nail care system may further include a hand rest or foot rest system comprising one or more of fiducials, and at least one finger guide having bilateral symmetry.

The nail care system may further include a cartridge or pod system including one or more components of the nail polish application system, and the polish removal system.

The nail care system may further include a multi-tool system configured for movement by the mobility system and configured to engage with one or more of the cuticle system, the shaping system, the application system, and the removal system.

A method of nail care, wherein a device is provided, the device having at least one processor and a memory storing at least one program for execution by the at least one processor, the at least one program including instructions, which, when executed by the at least one processor cause the at least one processor to perform operations comprising: coordinated operation of one or more of a shaping system, a polish removal system and a cuticle management system; a vision system; a nail polish application system; and a mobility system.

The method may further include receiving image information from the vision system; pre-processing the received images; determining nail extent and a nail height profile based on analysis of the pre-processed images; determining finger and nail placement based on analysis of the pre-processed images; outputting operating instructions for one or more of the shaping system, the polish removal system, the cuticle management system, the vision system, the nail polish application system, and the mobility system based on the determined nail extent, the determined nail height profile, and the determined finger and nail placement.

The method may further include a computer implemented tool movement method comprising: driving one or more of the shaping system, the polish removal system, the cuticle management system, and the nail polish application system to a starting point relative to the nail; driving a center of the one or more of the shaping system, the polish removal system, the cuticle management system, and the nail polish application system to a lateral fold of the nail; moving the one or more of the shaping system, the polish removal system, the cuticle management system, and the nail polish application system in any suitable direction relative to the nail; lifting the one or more of the shaping system, the polish removal system, the cuticle management system, and the nail polish application system; and driving the one or more of the shaping system, the polish removal system, the cuticle management system, and the nail polish application system to another point relative to the nail.

The method may further include a computer implemented tool movement method comprising: driving the one or more of the shaping system, the polish removal system, the cuticle management system, and the nail polish application system according to a predetermined pattern in order to place the one or more of the shaping system, the polish removal system, the cuticle management system, and the nail polish application system in a predetermined position proximate to one or more anatomical features of the nail in order to perform an operation of the one or more of the shaping system, the polish removal system, the cuticle management system, and the nail polish application system.

The method may further include a computer implemented path planning method for a single nail, a plurality of nails, and/or a full hand including the plurality of nails and for generating instructions for driving and operating the one or more of the shaping system, the polish removal system, the cuticle management system, and the nail polish application system.

A system for nail care may include a device having at least one processor and a memory storing at least one program for execution by the at least one processor, the at least one program including instructions, when, executed by the at least one processor cause the at least one processor to perform operations comprising: coordinated operation of one or more of a shaping system, a polish removal system and a cuticle management system; a vision system; a nail polish application system; and a mobility system.

The system may further include a computer architecture comprising: a path planner application including a user interface, a nail shape model system, an action configuration system, a hand model system, a kinematic model system, and a path planner system.

The computer architecture may further include a vision system architecture comprising: an enclosure system, the vision system, a path planner application, and a user interface system.

A non-transitory computer-readable storage medium storing at least one program for nail care, the at least one program for execution by at least one processor and a memory storing the at least one program, the at least one program including instructions, when, executed by the at least one processor cause the at least one processor to perform operations comprising: coordinated operation of one or more of a shaping system, a polish removal system and a cuticle management system; a vision system; a nail polish application system; and a mobility system.

The non-transitory computer-readable storage medium may further include receiving image information from the vision system; pre-processing the received images; determining nail extent and a nail height profile based on analysis of the pre-processed images; determining finger and nail placement based on analysis of the pre-processed images; outputting operating instructions for one or more of the shaping system, the polish removal system, the cuticle management system, the vision system, the nail polish application system, and the mobility system based on the determined nail extent, the determined nail height profile, and the determined finger and nail placement.

The non-transitory computer-readable storage medium may further include a computer implemented tool movement method comprising: driving one or more of the shaping system, the polish removal system, the cuticle management system, and the nail polish application system to a starting point relative to the nail; driving a center of the one or more of the shaping system, the polish removal system, the cuticle management system, and the nail polish application system to a lateral fold of the nail; moving the one or more of the shaping system, the polish removal system, the cuticle management system, and the nail polish application system in any suitable direction relative to the nail; lifting the one or more of the shaping system, the polish removal system, the cuticle management system, and the nail polish application system; and driving the one or more of the shaping system, the polish removal system, the cuticle management system, and the nail polish application system to another point relative to the nail.

The non-transitory computer-readable storage medium may further include a computer implemented tool movement method comprising: driving the one or more of the shaping system, the polish removal system, the cuticle management system, and the nail polish application system according to a predetermined pattern in order to place the one or more of the shaping system, the polish removal system, the cuticle management system, and the nail polish application system in a predetermined position proximate to one or more anatomical features of the nail in order to perform an operation of the one or more of the shaping system, the polish removal system, the cuticle management system, and the nail polish application system.

The non-transitory computer-readable storage medium may further include a computer implemented path planning method for a single nail, a plurality of nails, and/or a full hand including the plurality of nails and for generating instructions for driving and operating the one or more of the shaping system, the polish removal system, the cuticle management system, and the nail polish application system.

The system, apparatus, device and method may include one or more of the following: an enclosure; one or more features designed to comfortably hold the user's hand or foot in a position appropriate for operations of the manicure (e.g., hand rest or foot rest); a system and software for detecting the location and/or shape and/or boundaries of the nails (e.g., a detection system); a device for removing enamel from a nail; a device for shaping a nail; a device for managing (e.g., removing, moving, thinning, and the like) cuticle, or portions thereof; a one or more devices for applying nail polish to a nail; a device for accelerating the drying of nail polish on a nail; a mechanism to enable selection of one or more the devices for use at various stages of the manicure (i.e., device selection); a mechanism to position any, some, or all of the devices during the manicure or portions thereof; a means of storing consumables (e.g., nail polish, polish remover) within the apparatus; a receptacle for a cartridge that holds the consumables (e.g., shaping or buffing elements, nail polish, polish remover, and the like); one or more connectors allowing connection of one or more external computers to the apparatus; a means of connecting wirelessly to the apparatus (e.g., Wi-Fi, Bluetooth, radio communication, IR remote control, and the like); a computer or processor along with associated memory and peripheral devices to control the process of automatically providing the manicure or portions thereof; and/or a program that detects nails or fingers or toes and controls the operation of the apparatus in providing the manicure or portions thereof.

The system, apparatus, device and method may include one or more features to hold a phone or other device in a manner conducive to convenient viewing and operation.

The enclosure may be constructed of opaque materials and designed to reduce or control the amount of external light within the enclosure.

The hand or foot rest may be designed for use with one or more of the following: left or right hand or left or right foot individually (i.e., one rest may be required for each extremity); left and right hands or left and right feet (i.e., one rest may be required for hands and another for feet); either hand or either foot (i.e., one rest suffices for any extremity); or any combination of the above (e.g., one rest for either hand, but one rest required for each foot).

The hand or foot rest may further comprise ridges, texture differences, depressions or the like to guide the user into positioning their hand and/or foot appropriately.

The hand or foot rest may have an orientation (e.g., the angle of repose) or configuration (e.g., width, length, thickness, distance between fingers or toes, aspect ratio, and the like) thereof altered either by the user or under software control.

The hand or foot rest may be of a color that makes it easier for machine vision to distinguish from human nails, tissue, and/or skin.

The hand or foot rest may contain fiducials or other marks to aid machine vision in identification of some or all of the following: nails, fingers, toes, the hand, and/or the foot; and/or estimation of characteristics (e.g., boundaries, extents, shape, location, color, thickness, texture, and the like) of nails, fingers, toes, the hand, and/or the foot.

The hand or foot rest may be removed and replaced with another hand or foot rest better suited to the needs of the particular user.

The hand or foot rest may be constructed in different sizes to more comfortably accommodate the hands and/or feet of different persons.

The detection system may comprise one or more devices that emit electromagnetic (EM) radiation (e.g., visible light, infrared radiation, or ultraviolet radiation).

The devices that emit EM radiation may include, but are not be limited to, bulbs, LEDs, lasers, projectors, and the like.

The devices that emit EM radiation may emit, as only some examples, structured or unstructured light, coherent or incoherent light, patterned or unpatterned light, and the like.

The detection system may comprise one or more devices that emit acoustic energy (e.g., ultrasound transducer, speaker, or other means of generating sound at various frequencies).

The detection system may comprise one or more emitters.

The emitters of the detection system may be repositioned (e.g., forward, backward, up, down, left, or right) and/or re-oriented (e.g., pan/tilt) either manually or under software control.

Some or all of the emitters may have different emission spectra (e.g., differing acoustic or EM spectra, multi-spectral, and the like), either inherently or variable manually or under software control.

The emitters may be independently and/or in any combination illuminated and controlled (e.g., made brighter or dimmer, louder or quieter, activated for greater or lesser periods of time, and the like) either manually or under software control.

Characteristics of the emitters (e.g., position, orientation, spectrum, intensity, and the like) may be specified and available to software.

The system, apparatus, device and method may include mechanisms to alter the area of incidence or characteristics of the emitters output (e.g., lenses, mirrors, masks, diffraction gratings, prisms, anechoic foam, and the like).

Various characteristics of any of the mechanisms (e.g., occlusions, lenses, mirrors, prisms, and the like) may be characterized and available to software.

The detection system may further comprise one or more EM receivers, such as cameras or photodiodes.

The detection system may further comprise one or more acoustic receivers (e.g., microphones, ultrasonic receivers, etc.).

The receivers of the detection system may be repositioned (e.g., forward, backward, up, down, left, or right) and/or re-oriented (e.g., pan/tilt) manually or under software control.

One or more characteristics of the receivers of the detection system (e.g., aperture, focal length, lens characteristics, exposure time, gain, acoustic sensitivity, and the like) may be modified either manually or under software control.

One or more characteristics of the receivers of the detection system (e.g., position, orientation, aperture focal length, exposure time, gain, and the like) may be characterized and available to software.

The detection system may further comprise one or more of the following: at least one processor; and/or computer-readable memory storing instructions for executing a nail or finger or toe estimation protocol by causing one or more processors to acquire information from sensors (e.g., cameras or acoustic receivers) and compute nail or finger or toe characteristics (e.g., boundaries, shape, normal map, height map, thickness, color, albedo, acoustic reflectivity, surface texture, etc.).

The nail or finger or toe estimation protocol may comprise at least one of the following: acquiring images of the user's one or more nails or fingers using one or more imaging frequencies; acquiring multiple images of the user's one or more nails or fingers or toes from different angles; acquiring multiple images of the user's one or more nails of fingers or toes illuminated from different angles; acquiring images of the user's one or more nails or fingers or toes in the presence of structured light; and/or acquiring images of the user's one or more nails or fingers or toes using varying imaging settings (focus, depth of field, aperture, f-stop, exposure length, and the like).

The nail or finger or toe estimation protocol may comprise at least one of the following: acquiring acoustic information generated by, reflected from, or refracted by the user's one or more nails or fingers using one or more acoustic frequencies; and/or acquiring acoustic information generated by, reflected from, or refracted by the user's one or more nails or fingers or toes from different angles, and/or ranges.

The estimation protocol may further comprise using photometric stereo techniques to estimate finger or fingernail boundaries, extents, shapes, and/or locations.

The estimation protocol may further comprise using geometric stereo techniques to estimate finger and/or fingernail boundaries, extents, shapes, and/or locations.

The estimation protocol may further comprise generating a three-dimensional representation of one or more nails from multiple images.

The estimation protocol may further comprise edge detection.

The estimation protocol may further comprise distinguishing between one or more of skin, cuticle, nail fold and/or nail.

The estimation protocol may further comprise utilization of knowledge of an original projected pattern of structured light in an image to determine how the pattern is modified or distorted in the one or more images to infer three-dimensional information about the user's one or more nails or fingers or toes.

The mobility mechanism may comprise a robotic arm.

The mobility mechanism may comprise a parallel robot (e.g., delta robot, Stewart platform, etc.).

The mobility mechanism may comprise a gantry.

The mobility mechanism may comprise multiple mobility mechanisms (e.g., any combination of the mobility mechanisms).

The device selection mechanism may comprise methods of either mechanical and electrical connection or both from a selected device to the apparatus.

The system, apparatus, device and method may further comprise one or more locations within the enclosure that are used to retain devices when they are not in use (e.g., "toolshed")

The system, apparatus, device and method may further comprise one or more locations within the cartridge that are used to retain devices when they are not in use.

The system, apparatus, device and method may further comprise the use of the emitters used for nail or finger or toe detection to illuminate the operative area of the apparatus when it is appropriate for the user to insert their hand or foot.

The system, apparatus, device and method may further comprise the use of the emitters used for nail or finger or toe detection to provide status and/or feedback to the user (e.g., indicating which operation of the manicure is currently being performed).

The enamel removal system may comprise one or more of the following: one or more reservoirs to hold an enamel removal agent; and/or one or more applicators for absorbing the enamel removal agent; and/or one or more fluid delivery systems to deliver the enamel removal agent to the applicators; and/or one or more mechanisms for bringing the applicators into contact with the nail or finger or toe.

The reservoir may be adjacent to the applicator, but separated by fluid separator (e.g., membrane, film, foil, and the like) so that when the fluid separator is perforated, the enamel removal agent may be absorbed into the applicator.

The fluid delivery device may be a pump.

The fluid delivery device may be an open reservoir of the enamel removal agent, into which the applicators are dipped in order to absorb the enamel removal agent.

At least one of the applicators may be pre-soaked with the enamel removal agent, possibly eliminating or substantially simplifying the reservoir and the fluid delivery system.

The applicators may comprise one or more materials selected to accomplish one or more of the following: to be immune to effects of removal agent(s); to most effectively remove enamel (e.g., through surface texture, available surface area, and the like); to maximize amount of removal agent retained; to wick removed enamel away from the cleaning surface; to minimize re-deposition of removed enamel; and/or to be effective in other portions of the manicure process, for example in cleaning the nails or fingers or toes of debris resulting from nail shaping or cuticle management.

One or more of the applicators may have a different configuration or composition from the others (e.g., one brush applicator and one sponge applicator).

One or more of the applicators may further comprise regions with different configurations or compositions (e.g., combining one or more pads with one or more brushes).

One or more of the applicators may be compliant or may comprise compliant regions.

The applicator may passively deform when brought into contact with another object, e.g., a nail or finger or toe.

The applicator may be actively controlled to change configuration.

The applicator may comprise a pad, sponge, cloth, or the like.

One or more of the applicators may be shaped to have one or more protrusions that conform more closely to the nail fold or other regions of the nail or finger or toe.

One or more of the applicators may be shaped with an arched or curved side in contact with the nail or finger or toe.

The applicator may have regions of greater or less stiffness or density to more effectively create intimate contact with the nail or finger or toe.

The system, apparatus, device and method may further comprise a rigid, semi-rigid, or compliant frame that supports the applicator in a configuration that improves its ability to remove enamel.

One or more applicators may comprise a brush, bristles, flexible prongs or other members, and/or flexible loops (e.g., terry cloth).

Some of the bristles may vary in length, shape, curvature, thickness, composition, orientation, and the like.

One or more of the applicators may comprise a cloth or cloth-like material (such as woven material, non-woven material, felt, micro-fiber, and the like)

The applicator furthermore may comprise a rigid, semi-rigid, or compliant frame that supports the cloth in a configuration that improves its ability to remove enamel.

The cloth or cloth-like material may advance as used in order to continuously present unused removal area.

The cloth or cloth-like material may vary in composition or configuration as it is advanced.

One or more of the applicators may comprise a swab or the like including of a compliant material (e.g., cotton) surrounding a more or less rigid member (e.g., wooden dowel).

A method for removing polish from one or more nails or fingers or toes automatically with minimal user input or control (e.g., under software control) is provided.

The method may further comprise one or more of the following steps: soak time, wherein a removal device is held in more or less stationary contact with the nail or finger or toe; one or more strokes, wherein a removal device is substantially in contact with the nail or finger or toe; and/or application of pressure, wherein the removal device is pressed down onto the nail or finger or toe with certain pressure in order to bring a removal device into greater contact with the enamel to be removed.

The one or more strokes may be approximately longitudinal to the nail or finger or toe.

The one or more strokes may be approximately lateral across the nail or finger or toe.

The one or more strokes may be at an angle between these.

The one or more strokes may be furthermore or instead angled upward or downward with respect to the plane of the hand and fingers or foot and toes.

The one or more strokes may be conducted with a removal device oriented to take advantage of any features designed to improve removal in certain regions of the nail or finger or toe (e.g., protrusions to more effectively remove enamel from the nail folds).

The method may comprise the use of a detection system in conjunction with further processing to estimate the amount or location of any remaining enamel.

The method may comprise the use of a detection system, possibly in conjunction with further processing, to direct operation of a removal system.

The method may comprise the use of a detection system in conjunction with further processing to determine whether the user's nail or finger or toe has moved or been removed from the apparatus.

The nail shaping mechanism may comprise at least one of the following: one or more clippers or scissors for shaping a user's one or more nails; one or more mechanisms for applying a resistive chemical layer followed by an etchant to shape a user's one or more nails; one or more abrasive devices to sand or buff away portions of a user's one or more nails; and/or one or more lasers for shaping a user's one or more nails.

The nail shaping device may comprise a substantially 2-dimensional surface composed of abrasive material (e.g., disk, pad, polygonal, and the like), wherein one surface is principally or entirely used to shape a user's one or more nails.

The nail shaping device may comprise a substantially 3-dimensional object of abrasive material (e.g., disk, drum, cube, cone, hourglass shape, and the like) that provides multiple surfaces to shape a user's one or more nails.

The system, apparatus, device and method may comprise one or more compliant elements or regions. The compliance may serve to permit greater contact between the abrasive surface and the user's one or more nails and may also serve to limit torque required to move the abrasive surface against the user's one or more nails.

The shaping element may further comprise one or more abrasive regions, which may feature grits of differing characteristics (e.g., coarseness, hardness, shape of the abrasive grains, sharpness or smoothness of abrasive grains, and the like).

The characteristics of the abrasive devices may be selected to balance one or more of the following objectives: speed of removal; smoothness of the shaped nail edge; comfort of the user; and/or avoidance of damage to the nail.

A method of robotically shaping a user's one or more nails may include one or more of the following operations: determining the initial shape of a nail to be shaped; determining the desired final shape of the nail; confirming that the desired final shape is feasible (e.g., desired final shape contains no regions that lie outside the initial shape); calculating a path for one or more shaping devices to change the shape of the nail from initial to desired final shape; gaining approval from the user to begin shaping the nail; bringing one or more shaping devices operationally into contact with the nail to be shaped; determining intermediate shaping results and comparing them to the desired configuration; and/or continuing to perform such steps as necessary until the nail has achieved the desired shape.

The system, apparatus, device and method may comprise the use of one or more of the following operations to perform shaping: strokes substantially in one direction with return strokes substantially not in contact with the nail; strokes in more than one direction with some strokes possibly not in contact with the nail; a rotary motion; and/or an oscillating rotary motion.

Multiple passes of a shaping tool may be used, with the combined effect of all the passes acting to create the desired final shape.

A shaping element may be held in at least one of the following orientations with respect to the nail or finger or toe at various points in the shaping method: perpendicular to the nail; angled away from perpendicular to the nail, either with the upper edge of the shaping element over the nail or farther away from the nail (i.e., "toward" or "away from the finger or toe); normal to the direction of the finger or toe; angled laterally with respect to the finger or toe (i.e., angled "side to side"); and/or any combination of the above orientations.

The cuticle management mechanism may comprise at least one of the following: a clipper or scissor; a mechanism for applying a resistive chemical layer followed by an etchant to remove cuticle tissue or portions thereof; a sanding or buffing device; and/or a laser for ablating cuticles or portions thereof.

The sanding or buffing device furthermore may comprise one or more of the following: a substantially 2-dimensional surface comprising abrasive material (e.g., disk, pad, polygonal, and the like), wherein one surface of the material is principally or entirely used to shape a nail; and/or a substantially 3-dimensional object comprising abrasive material (e.g., disk, drum, cube, cone, hourglass shape, and the like), wherein multiple surfaces are available to remove cuticle or a portion thereof.

The system, apparatus, device and method may furthermore comprise one or more elements or regions that provide for compliance in the surface(s) of the sanding or buffing device.

The sanding or buffing device may further comprise one or more abrasive regions, which may feature grits of differing characteristics (e.g., coarseness, hardness, shape of the abrasive grains, sharpness or smoothness of abrasive grains, and the like).

The characteristics of the abrasive material are selected to balance one or more of the following objectives: operation of the sanding or buffing device requires no knowledge of cuticle location, shape, or boundaries (i.e., "open loop" cuticle removal); speed of cuticle removal; completeness of cuticle removal; comfort of the user; and/or avoidance of damage to the nail.

A method of robotically removing cuticle or portions thereof from a user's one or more nails may use one or more of the following operations: determining the extents and shape of the cuticle to be managed; calculating a path for cuticle management devices to remove cuticle or portions thereof from the nail; gaining approval from the user to begin cuticle management; bringing one or more cuticle management devices operationally into contact with the cuticle to be removed; performing one or more operations on the nail or finger or toe in order to remove cuticle; determining the effectiveness of cuticle removing and repeating or extending operations as necessary; and/or continuing to perform such steps as necessary until cuticle has been sufficiently removed.

The system, apparatus, device and method may comprise the use of one or more of the following operations to perform cuticle management: strokes along a path with the cuticle management device in operational contact with the nail and/or cuticle; a rotary motion; and/or an oscillating rotary motion.

Multiple passes of a cuticle management tool may be used, the combined effect of which serves to remove cuticle sufficiently.

A cuticle management element may be held in at least one of the following orientations with respect to the nail or finger or toe at various points in the shaping process: perpendicular to the nail; and/or at an angle with respect to the nail surface in any combination of azimuth and elevation from parallel to vertical.

A method of removing debris and/or residue from a user's one or more nails following shaping or cuticle management (e.g., "cleanup") may be provided.

The method of removing debris and/or residue from the user's one or more nails following shaping or cuticle management (e.g., "cleanup") may comprise the use of the apparatus to effect the cleanup.

The method may further comprise the use removal applicators that have been previously used, for example during the enamel removal operation.

The enamel application mechanism may comprise: at least one reservoir for storing enamel; and/or at least one dispensing mechanism for dispensing enamel; and/or at least one applicator for applying the enamel to the user's one or more nails.

The reservoir may further comprise a sensor that indicates the volume of enamel remaining, if any.

The apparatus may be part of a disposable cartridge or the like.

All components subject to clogging, drying out of enclosed enamel, or other failure modes may be included in the disposable cartridge so that any failure may be corrected by replacing the cartridge.

The enamel dispensing mechanism may comprise at least one of the following: one or more pumps; one or more collapsible flexible containers (e.g., a bladder) that extrudes polish when compressed; and/or one or more enclosed volumes in which a movable slider is positioned, motion of the slider causing fluid or gas to be either expelled from the volume or drawn into it (e.g., a syringe).

The enamel dispensing mechanism may comprise a fixed slider over which an enclosed volume is moved, causing a fluid or gas to be expelled, which achieves advantages for filling a syringe, vial or reservoir, and for removing and/or avoiding any entrapped air.

The enamel applicator may comprise at least one of the following: one or more nozzles; one or more brushes; one or more volumes of an absorbent material intended to retain and dispense enamel (e.g., pad, swab, sponge, and the like); and/or one or more mechanisms for dispersing droplets of enamel along with a mechanism to guide the droplets to their intended destination.

The pump may further comprise a positive displacement design that dispenses or draws in a controlled volume of fluid or gas; and/or sensors that indicate the rate of motion of fluid through the pump; and/or sensors that indicate the speed of the pump (which may be used to deduce the rate of motion of fluid through the pump).

The syringe may further comprise sensors that indicate the position of the plunger; and/or sensors that indicate the amount of fluid, if any, retained in the reservoir.

The nozzle may further comprise a tube with flexible elements so that the tip of the nozzle is free to move in order to maintain fluid contact with the nail with minimal pressure on the nail or any previously applied enamel.

The tip of the nozzle may be fashioned to present a smooth surface to the nail. The tip of the nozzle may be flared and curved back on itself to present a smooth curved surface to the nail.

The tip of the nozzle may have a compliant rounded surface surrounding the nozzle orifice configured to present a smooth surface to the nail. The compliant rounded surface may be configured to minimize disturbance of previously applied coats of enamel by subsequently applied coats.

The nozzle may be placed onto or into a prepared area that provides an airtight seal, preventing enamel from drying if the manicure is paused.

The nozzle may be positioned at various angles with respect to the nail or finger or toe (e.g., perpendicular to the nail, at an angle medially or laterally to the nail).

A method for robotically applying nail polish to the user's one or more nails or portions thereof may comprise one or more of the following operations: moving one or more applicators under computer control on or above the surface of the nail while dispensing a material (e.g., fluid or powder); controlling the flow of a material (e.g., nail polish remover, nail polish basecoat, nail polish topcoat, and/or nail polish color coat) from one or more reservoirs through one or more dispensers to one or more applicators; and/or using a visual system to measure and confirm proper coverage of nail polish.

The dispenser may be controlled in conjunction with the movement of the applicator in order to optimize one or more of the following: speed of application; uniformity of application; ability to apply subsequent coats, whether of the same material or different, without damaging previous coats; and/or precision of application, e.g., to prevent application of material to the skin of the user, or to prevent drips over the distal end of the nail plate.

The applicator may be moved closely above the surface of the user's one or more nails, but not in contact with them, so that only dispensed fluid (e.g., enamel) makes fluid contact with the nail.

The applicator may be moved in contact with the surface of the nail

The applicator may be held at a specific angle or range of angles with respect to the nail (e.g., perpendicular or at 45 degrees distal to the finger or toe, or at 30 degrees distally to the finger or toe) in order to minimize contact force between the applicator and the nail Coats subsequent to the first coat may be delayed by a time chosen to ensure the first coat has dried sufficiently to prevent damage to the first coat by the second coat.

The path of the applicator may be planned so as to balance one or more of the following factors: speed of application; uniformity of application; ability to second and subsequent coats without damage to previously applied coats; and/or precision of application (e.g., avoiding nail folds, drips over the distal ends of nails, and the like).

Nail polish with characteristics optimized for robotic application during a robotic manicure or portion thereof may be provided. The phrase nail polish in this context applies equally well to other, similar materials used within a manicure, for example base coat and/or top coat materials. Materials may be designed to optimize any or all of the following: speed of application; uniformity of application; precision of application; and/or ability to dispense subsequent coats as rapidly as possible after previous coats without damaging or degrading the results of previous applications.

The system, apparatus, device and method may further comprise at least one disposable cartridge for housing at least one enamel and an enamel removal agent.

The system, apparatus, device and method may further comprise identification information that may be read by the manicure apparatus.

A method for automatically (e.g., under software control) providing one or more operations of a manicure may comprise one, some or all of the following operations: initiation by the user; initial identification of nail or finger or toe extents; removal of any polish present on a nail or finger or toe; identification of specific nail or finger or toe boundaries, shape, and/or location; shaping of one or more nails or portions thereof; management of one or more regions of cuticle; removal of any debris left by shaping or cuticle management; application of nail polish; and/or accelerated drying of the nail polish; and the like.

The user may stop or pause operation at any point during the manicure.

The apparatus may be configured to automatically stop the manicure process if the user's hand is removed from the apparatus.

The apparatus may be configured to automatically adjust the manicure process if the user's hand or portion thereof moves.

Machine readable information on a consumable cartridge or the like may provide optimization of operational parameters such as: required, optional, or forbidden application of basecoat and/or topcoat; number of coats of basecoat, color coat, and/or topcoat; optimal application speed for basecoat, color coat, and/or topcoat; optimal fluid dispensing rate for basecoat, color coat, and/or topcoat; adjustment of application parameters (e.g., specific application path, flow rate, application speed, and the like) may be performed in response to specific fluid parameters (for example, velocity, thixotropy, pigment concentration, and the like); drying time required between coats; date coding to ensure user warned if product past acceptable usage life; and/or prevention of possibly non-conforming product that may damage machine or harm user.

The system, apparatus, device and method may include a machine vision component (MVC) and/or machine vision processing.

All processing may be carried out in one processor or a plurality of processors in any suitable combination. In some embodiments, separate dedicated processors may be provided for particular tasks.

The system, apparatus, device and method may comprise one or more digital cameras, a first processor to control the cameras, and a second processor to extract information from the cameras' images. The cameras send images and metadata to the second processor at times and under the lighting and other imaging conditions controlled by the first processor. The second processor extracts image information such as 3-dimensional positions and orientations of objects of interest, such as fingers or toes and nails, for delivery to other system components. Positions and orientations may be either relative to other objects in the images or "absolute", meaning that they are relative to image-independent objects such as fixed parts of the MVC. The second processor may also extract other information such as the camera position(s) and lighting conditions achieved, for delivery to the first processor in a feedback mechanism.

The system, apparatus, device and method may include a single camera.

The system, apparatus, device and method may include a movable camera, with its motion controlled by the first processor.

The single camera may be mounted on a robotic arm that provides positional readouts to the first processor.

Absolute object positions may be inferred from multiple images using techniques of dynamical stereoscopy.

A fixed camera and mirrors may be placed to observe both direct and reflected images of objects.

The system, apparatus, device and method may include multiple cameras.

Absolute object positions may be inferred from images taken from multiple cameras using techniques of geometric stereoscopy.

Lighting may include multiple, controllable sources.

The multiple sources may be each independently controlled by the first processor.

The multiple sources may illuminate in a fixed sequence.

Each source may provide illumination from substantially a single direction (e.g., "point sources").

Each source may provide illumination from multiple, known directions (e.g., "distributed sources").

Each image may capture the objects as illuminated by sources from known directions.

Each image may capture the objects as illuminated only by such sources.

Each image may capture the objects as illuminated by environmental sources (e.g., "background") and sources from known directions.

The first processor may cause the camera or cameras to provide an image of the objects with all illumination sources shut off (e.g., "dark image"), and for which all other images have the dark image subtracted.

Relative object positions and/or orientations may be computed from sets of images and their known directions of illumination by techniques of photometric stereoscopy (PMS), producing "images" including the (x, y, z) components of the local surface's normal vectors and an "image" of the local height, a function whose gradient is computed from the same normal vectors.

Absolute object positions may be inferred by including specific objects (e.g., "fiducial" or "calibration" objects) in the MVC that are reliably detectable in many images, and that have known positions, and for which PMS provides positions relative to all the other objects of interest.

All images from a given camera may be preprocessed to remove camera-specific artifacts such as "hot" pixels and "dead" or low-sensitivity pixels, and lighting-specific artifacts such as lower illumination or contrast in some image regions than in others.

The preprocessing may comprise median filtering.

The preprocessing may comprise replacing any measured (e.g., "raw") pixel value by a calculated value depending on both the measured pixel value and the pixel location.

The two-dimensional image positions of objects of interest may be determined by detecting local features such as color, fluorescence, texture, and/or by detecting local variations in such local features, and/or by detecting shape or other larger-scale or global features.

The features may be detected only within pre-defined pixel regions of images.

The features may be detected only within pre-defined ranges of the feature values, such as color, texture, boundary curvature, and/or component size.

Objects' features and/or objects' image positions may be detected by automatic thresholding techniques such as Otsu's criterion, and/or automatic clustering techniques such as k-means clustering, applied to detected features.

The objects' identities or two- or three-dimensional positions may be tentatively or approximately detected by some techniques applied to some features and may be then refined by the same or other techniques applied to additional features combined with the approximate detections.

Objects' approximate positions may be refined by morphological operations or rank filters such as erosion and dilation (equivalently, min and max filters, respectively).

Objects' tentative detections may be strengthened or confirmed, or may be weakened or disconfirmed, by applying metric or topological constraints such as minimum acceptable area, absence of holes, or selection of only the largest detected topological component.

Objects' approximate positions may be refined by applying the technique of adaptive contours (e.g., "snakes").

Objects' two-dimensional positions may be contained within regions of slightly larger size, as by dilating the sets of objects' positions.

The regions of larger size may be computed by morphological dilation.

The regions of larger size may be computed as the convex hull of the set of detected positions of each object.

The local variations in local features may be computed with edge-detection techniques.

The edge-detection technique may be based on Hierarchical Edge Detection.

Edge detections from multiple images, such as fluorescent, color, and PMS surface normal, may be combined into a single "edge image".

The edge image may comprise, at each pixel location, of the square of the mean of the square-roots of the multiple images' edge detections.

Approximate two-dimensional object boundaries may be determined by the technique of watershed processing.

The watershed processing may occur after automatically marking one or more regions, such as the image boundary, as being non-object, and one or more regions, such as the centers of predefined or detected sets, as being object(s).

The watershed processing may be performed on an edge image.

The system, apparatus, device and method may be provided for automated nail care. The system, apparatus, device and method may include at least one of the following: a vision system for generating one or more images of a user's one or more nails; an enamel removal system for removing enamel from a user's one or more nails; a cuticle management system for managing one or more cuticles of a user's one or more nails; a nail shaping system for shaping a user's one or more nails; and/or an enamel application system for applying enamel to a user's one or more nails.

The system, apparatus, device and method may further comprise an element, mechanism, or robotic platform, actuator, or arm forming part of at least one of the vision system, the enamel removal system, the nail shaping system, the cuticle management system, and the enamel application system.

The vision system may comprise at least one camera for image acquisition.

The vision system may further comprise: at least one processor; and/or non-transitory computer-readable memory storing instructions for causing; and/or the at least one processor to acquire one or more images according to a defined image acquisition protocol.

The defined image acquisition protocol may comprise at least one of the following: imaging the user's one or more nails using one or more imaging frequencies; acquiring multiple images of the fingernail from different angles; imaging the user's one or more nails in the presence of structured light; and/or imaging the user's one or more nails using a photometric stereo technique.

The at least one processor may performs image analysis in order to identify the user's one or more nails from the one or more images.

The image analysis may generate a point cloud representing the user's one or more nails.

The image analysis may comprise generating a three-dimensional representation or model of the user's one or more nails from multiple images.

The image analysis may comprise edge detection.

The image analysis may distinguish between one or more of skin, cuticle, nail fold and/or nail and/or regions of the nail.

The image analysis may comprise an analysis of an original projected pattern of structured light in an image to determine how the pattern is modified or distorted in the one or more images to infer three-dimensional information about the user's one or more nails, skin, nail fold, cuticle, and/or regions of the nail.

The vision system may further comprise a light source for providing structured light.

The light source may comprise a projector, one or more light-emitting diodes emitting light through a patterned sheet or mask and/or reflecting the light, or a laser or other focused light source, which may sweeps across one or more surfaces of the user's one or more nails.

The enamel removal system may comprise one or more of the following: an applicator for absorbing an enamel removal agent; and/or a tool member coupled to the applicator for bringing the applicator into contact with the user's one or more nails.

The enamel removal system may further comprise a fluid delivery device for providing the enamel removal agent to the applicator.

The nail shaping system may comprise at least one of a robotically positioned nail clipper, photo-chemical etcher for etching of the user's one or more nails, cutting laser, water jet cutter, and/or a sanding device.

The sanding device may comprise one or more of a vertical sanding drum, a horizontal sanding drum, or a sanding pad.

The enamel application system may comprise one or more of the following: a dispensing system for dispensing enamel or other similar fluid, e.g., basecoat, topcoat, drying agent, photoresist, chemical resist; and/or an applicator for applying the fluid to the user's one or more nails.

The dispensing system may comprise at least one of a pump and a fluid delivery system.

The applicator may comprise at least one of a spreading applicator, reciprocating spreader, rotational spreader, horizontally rotating spreader, vertically rotating spreader, a brush, and a nozzle.

The system, apparatus, device and method may further comprise at least one disposable cartridge for housing at least one of enamel and an enamel removal agent.

A method for automated nail care may comprise at least one of the following: generating with a vision system one or more images of a user's one or more nails; removing with an enamel removal system enamel from a user's one or more nails; shaping with a nail shaping system a user's one or more nails; and/or applying with an enamel application system enamel to a user's one or more nails.

These and other capabilities of the disclosed subject matter will be more fully understood after a review of the following figures, detailed description, and claims.

DESCRIPTION OF DRAWINGS

These and other features will be more readily understood from the following detailed description taken in conjunction with the accompanying drawings, in which:

FIG. 49D is the two-dimensional image of the tip of the finger of the user overlaid with gradient vectors at each of the plurality of points of the image according to an exemplary embodiment;

FIG. 49E is a three-dimensional depth map image of the tip of the finger of the user according to an exemplary embodiment;

FIG. 49F is a masked version of the three-dimensional depth map image of the tip of the finger of the user according to an exemplary embodiment;

FIG. 71 is a depiction of a thumb and a nail of a user including a set of all scan lines reinterpreted as best-fit parabolas according to an exemplary embodiment;

Figure 72:
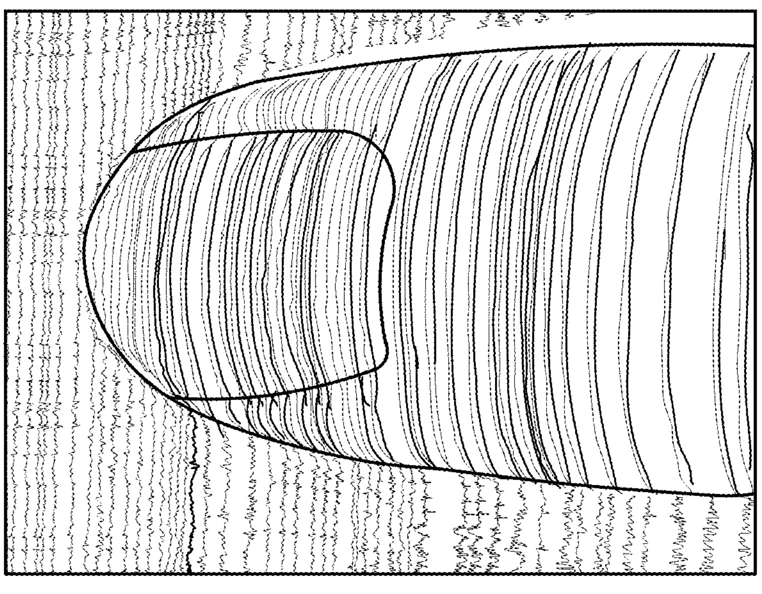
Figure 73A:
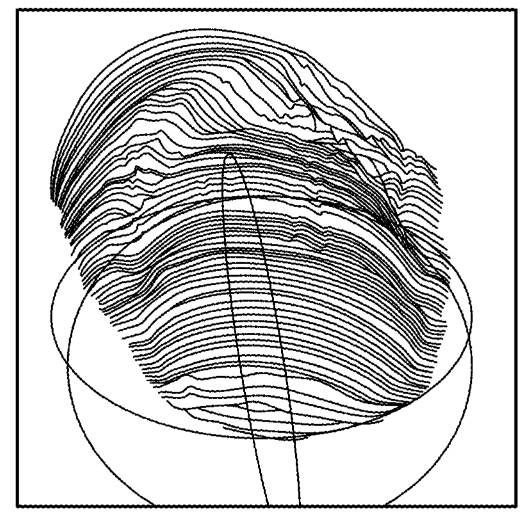
Figure 73B:
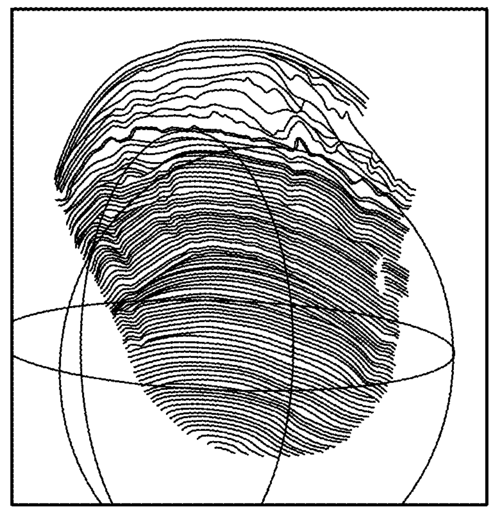
Figure 74A:
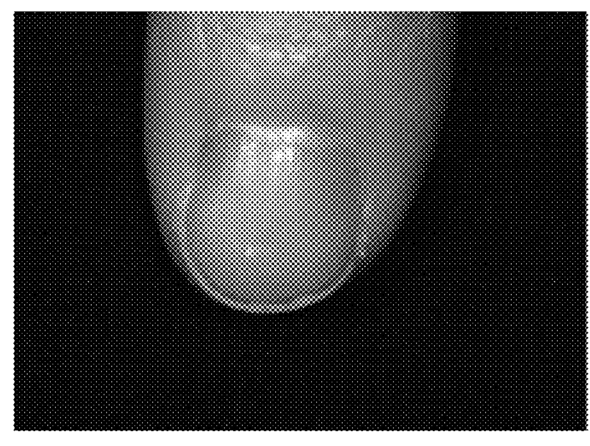
Figure 74B:
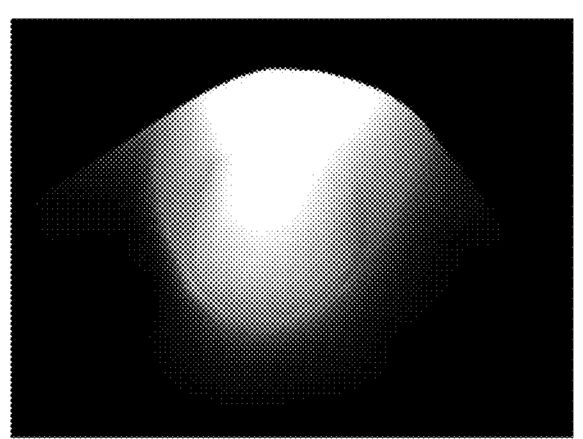
Figure 75A:
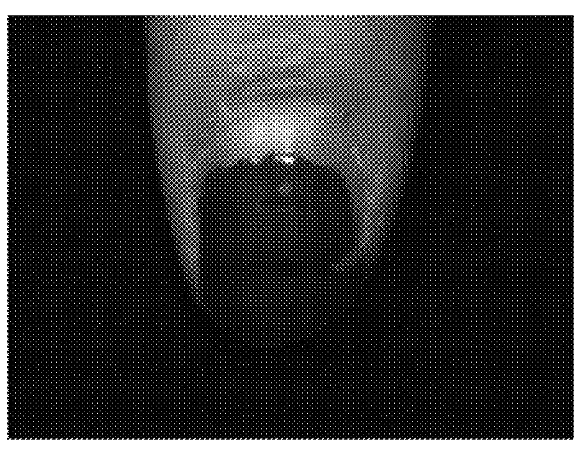
Figure 75B:
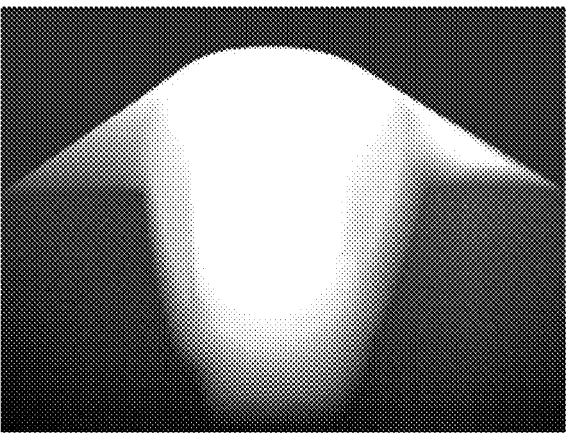
Figures 76A, 76B, 76C, 76D, 76E, 76F, 76G, 76H, 77A, 77B:
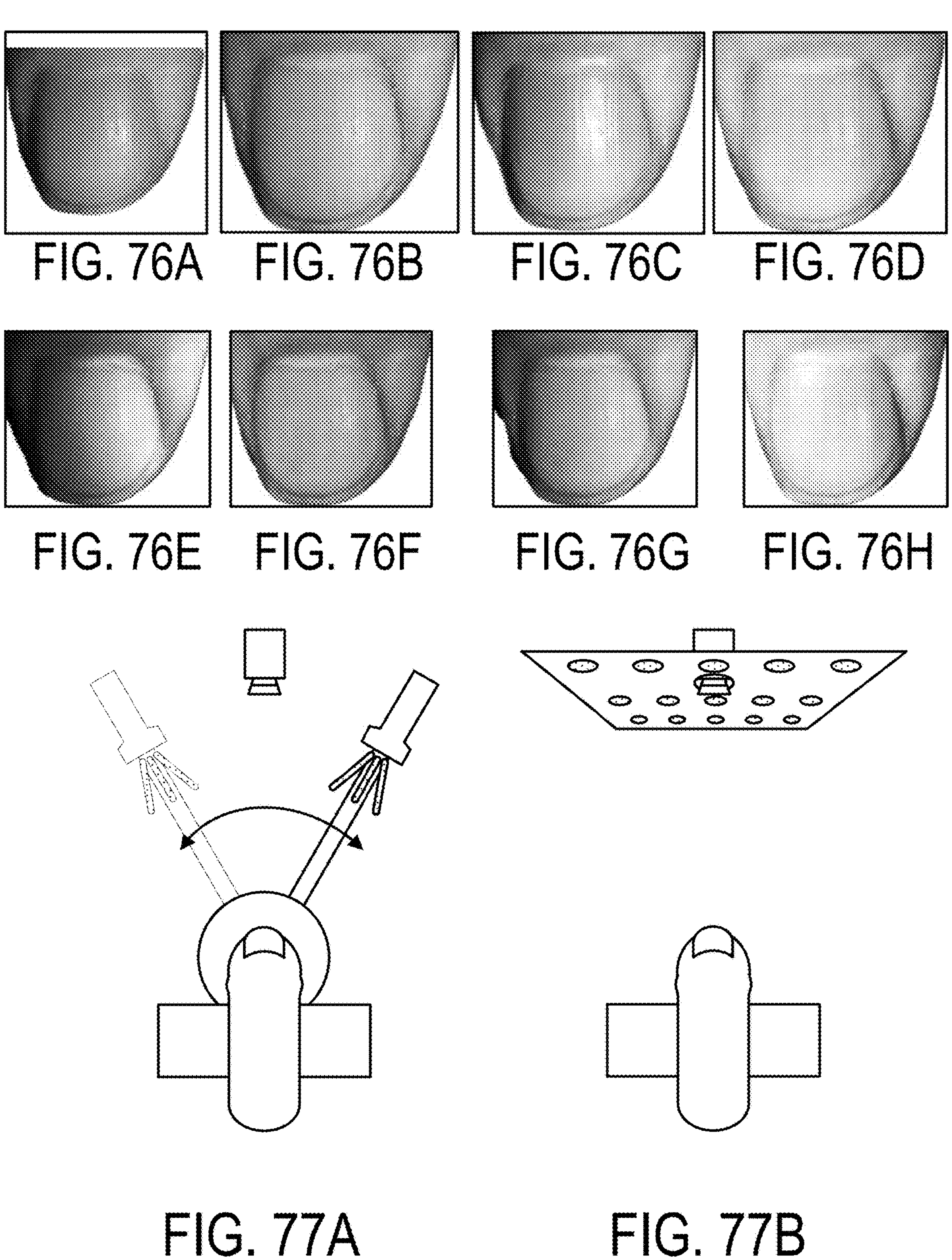
Figure 78:
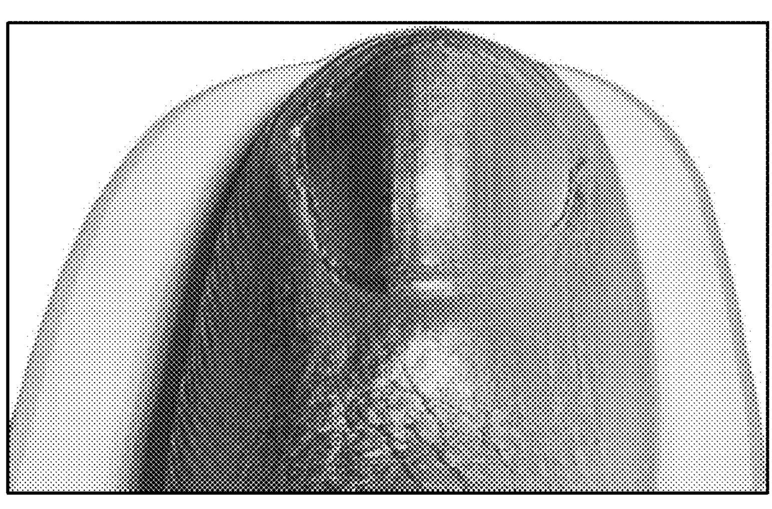
Figure 79A:
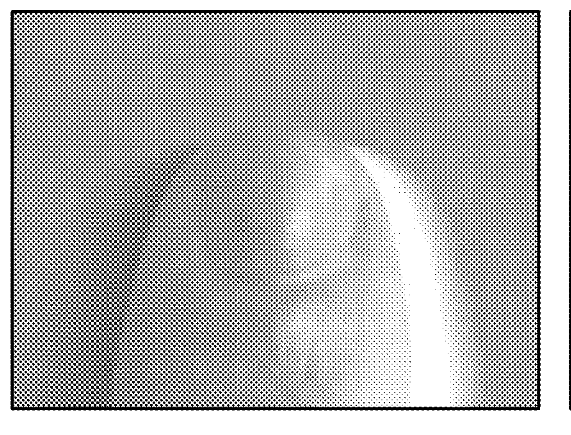
Figure 79B:
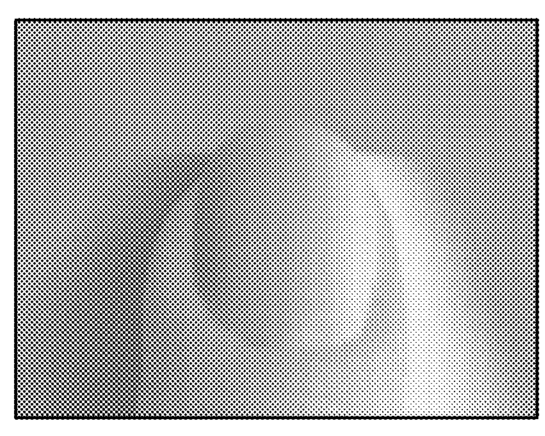
Figure 80A:
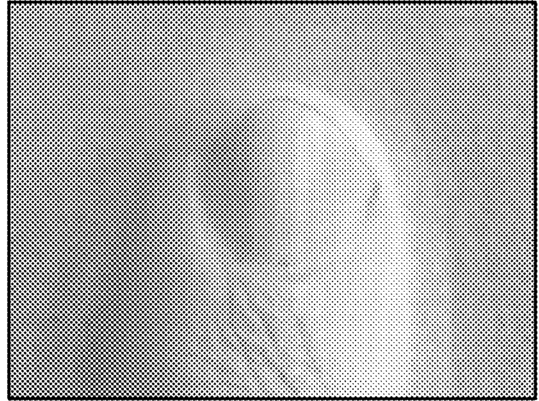
Figure 80B:
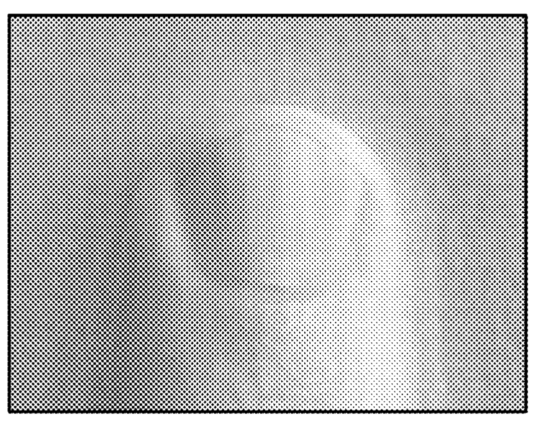
Figures 90A, 90B:
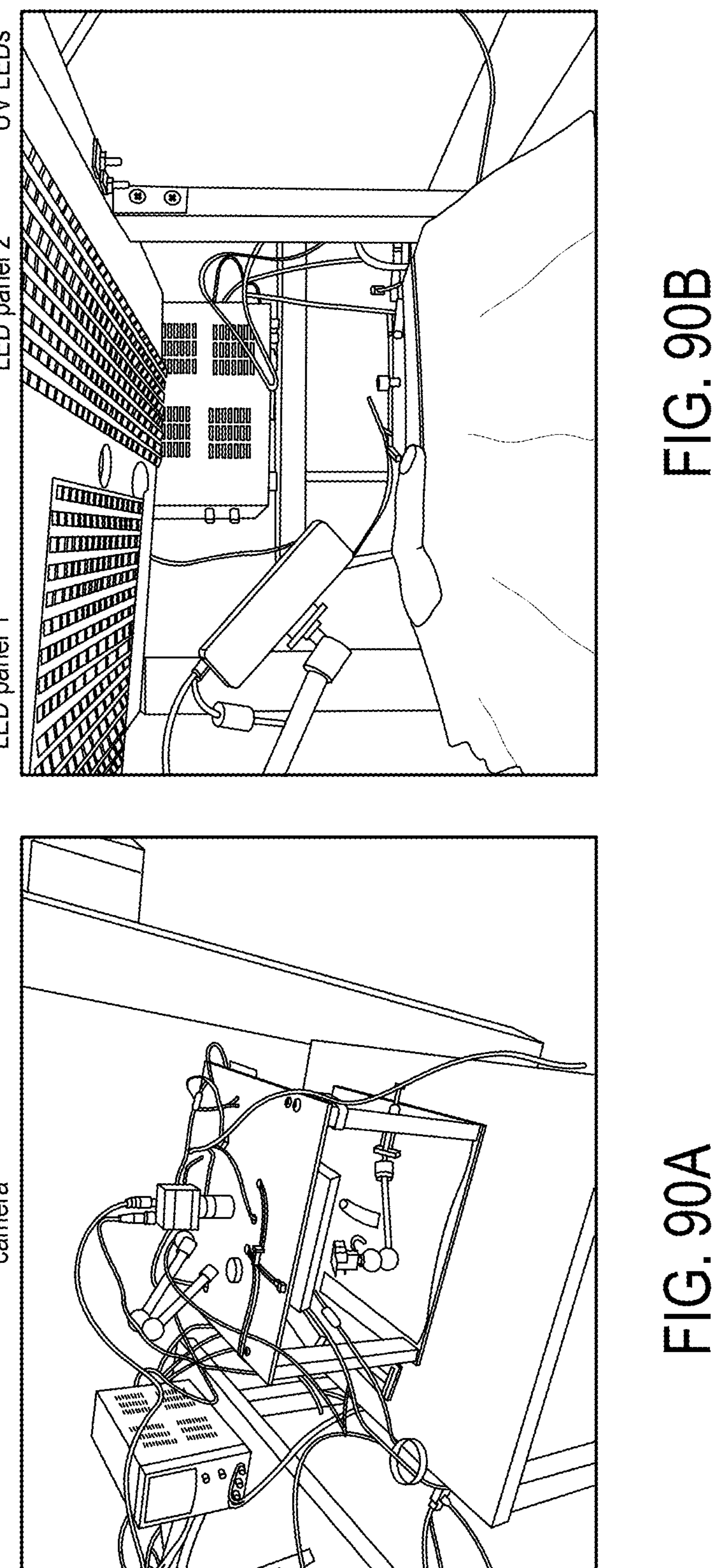
Figures 91A, 91B, 91C, 91D:
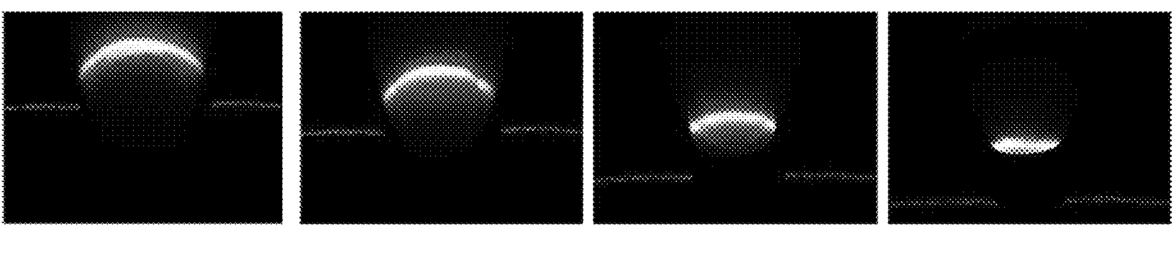
Figures 91E, 91F, 91G:
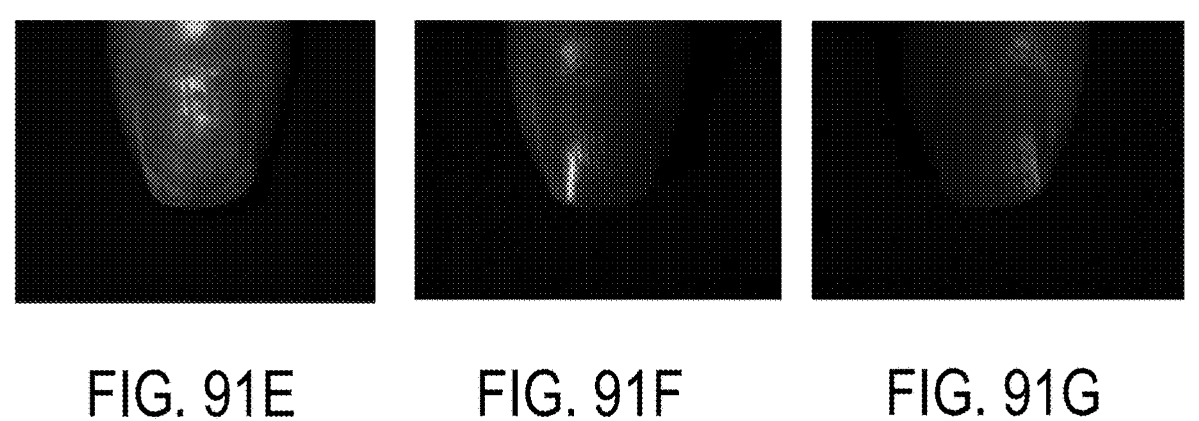
Figures 91H, 91I:
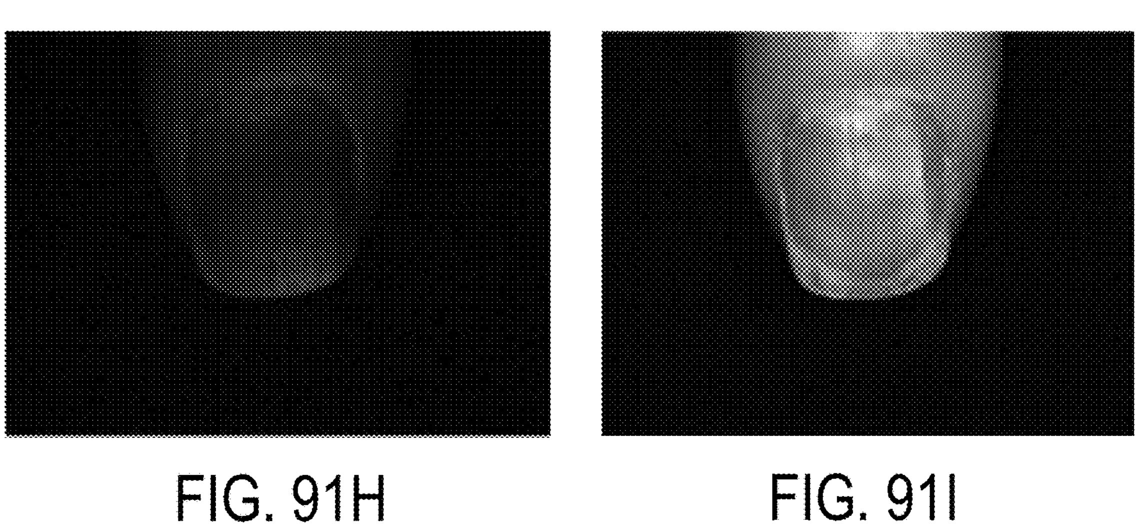
Figures 94A, 94B:
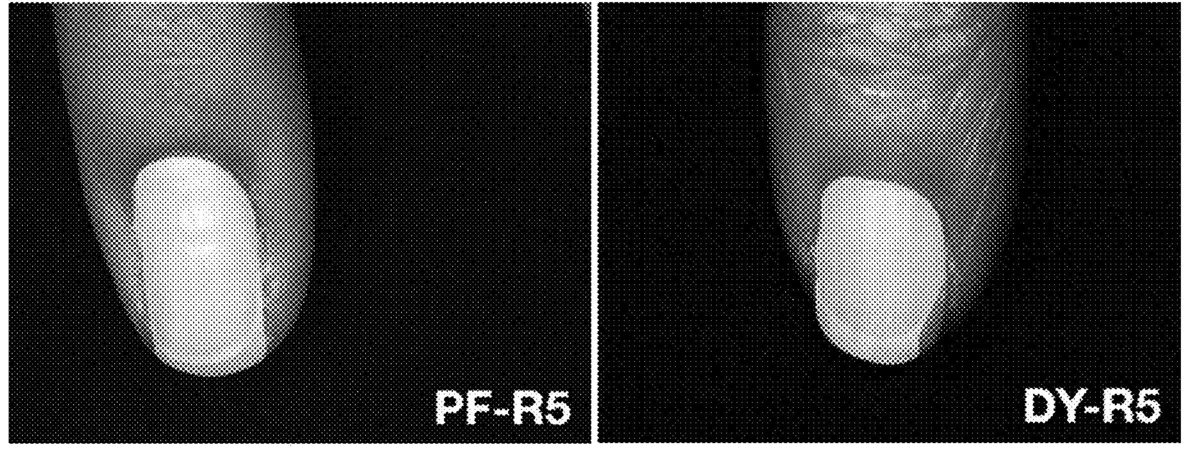
Figures 95A, 95B, 95C, 95D:
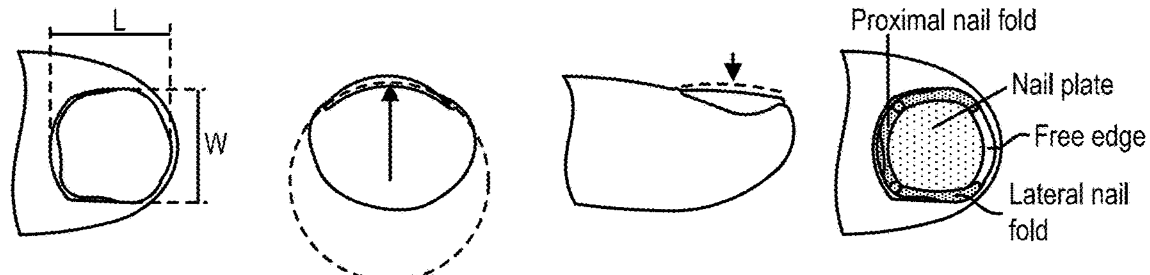
Figure 96B:
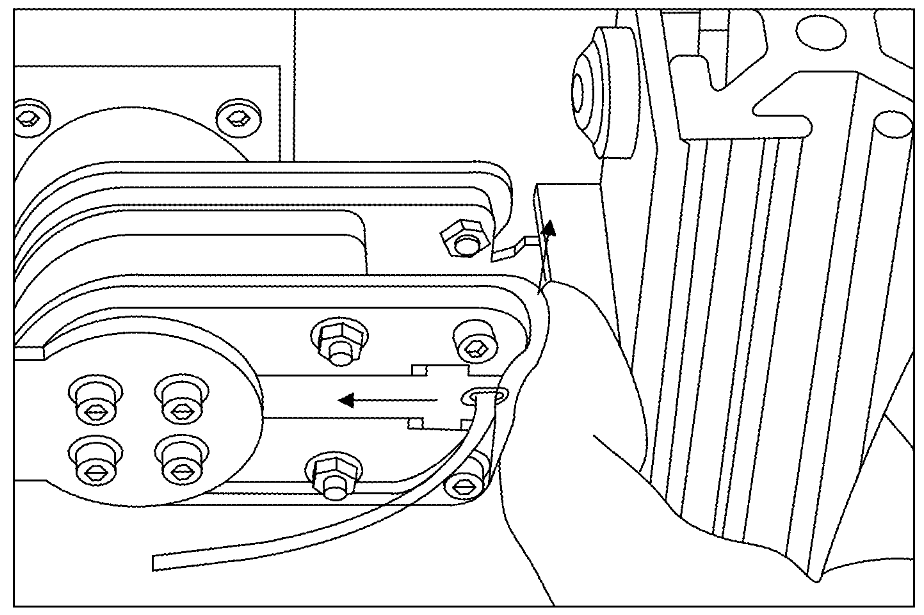
Figure 96A:
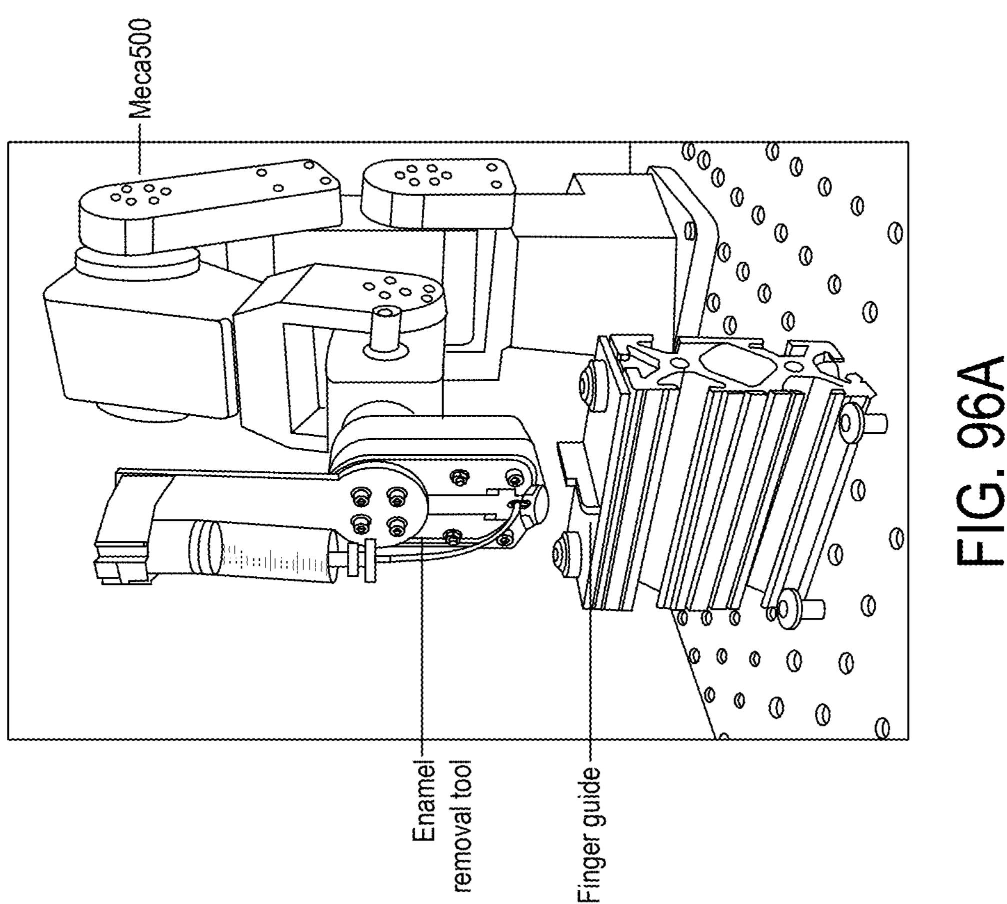
Figure 97:
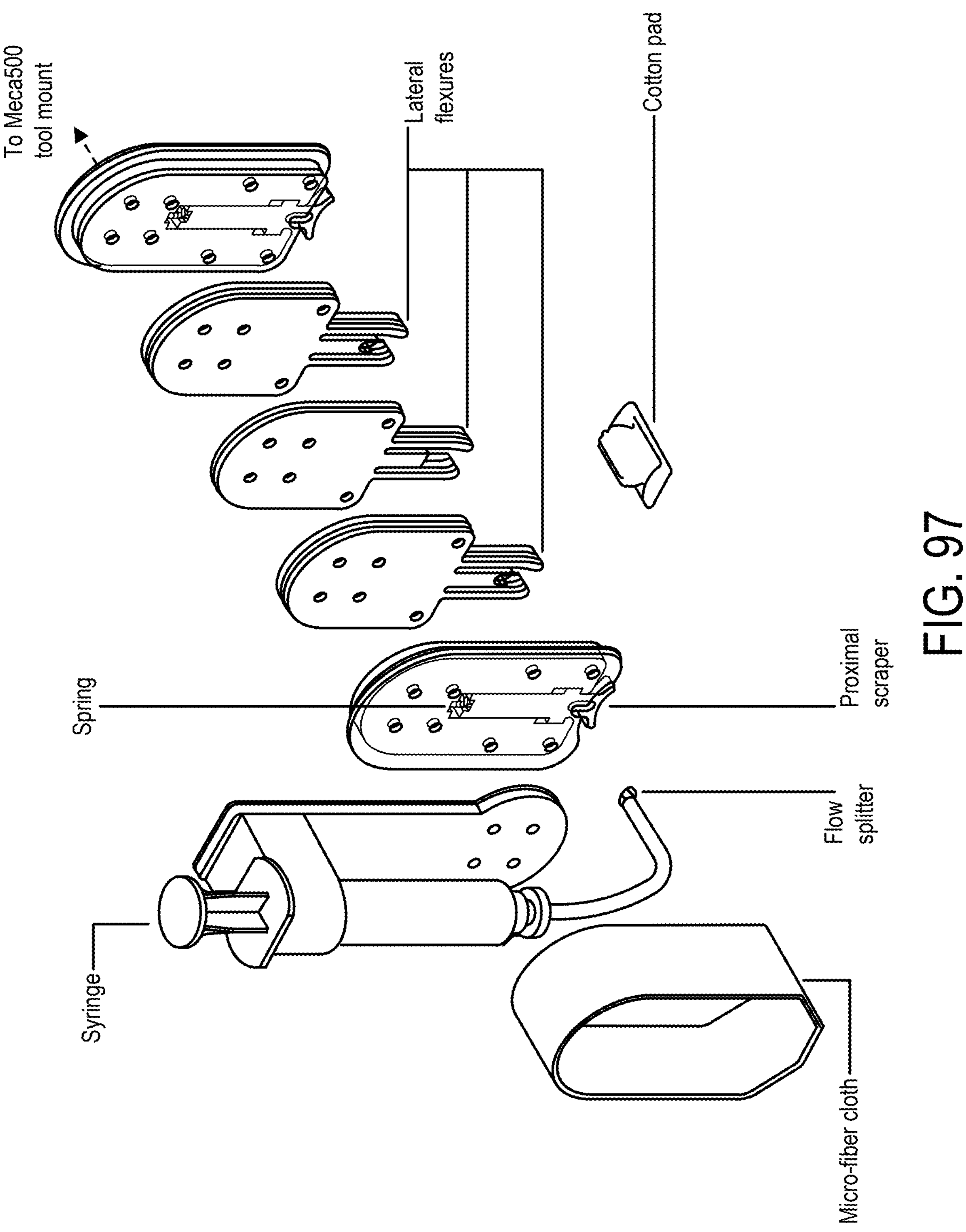
Figures 98A, 98B, 98C, 98D:
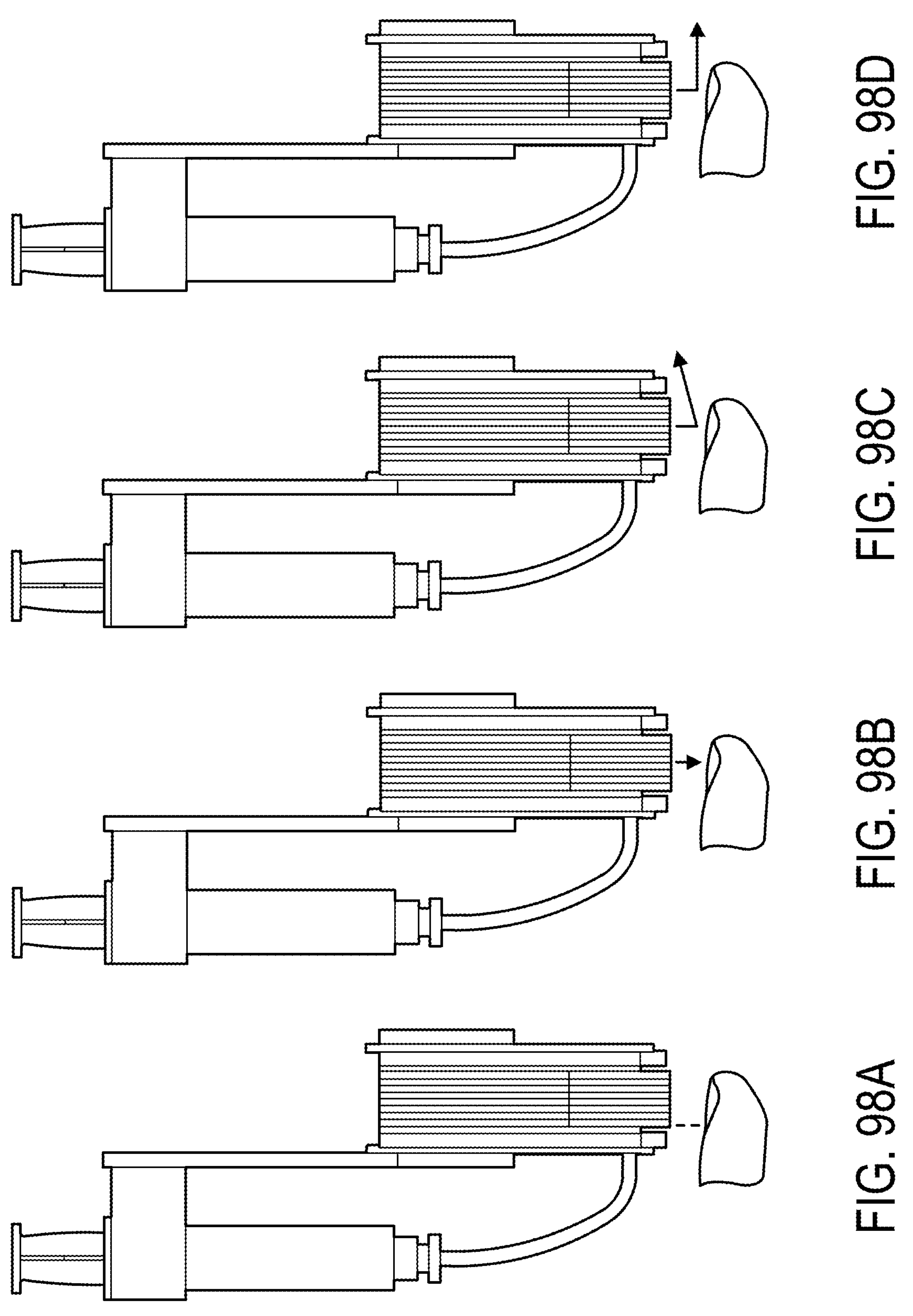
Figures 102A, 102B, 102C, 102D:
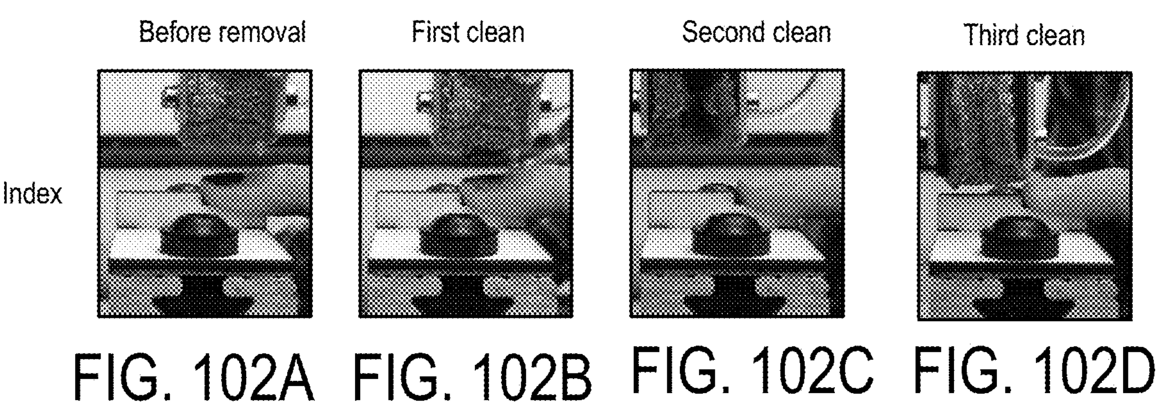
Figures 103A, 103B, 103C, 103D:
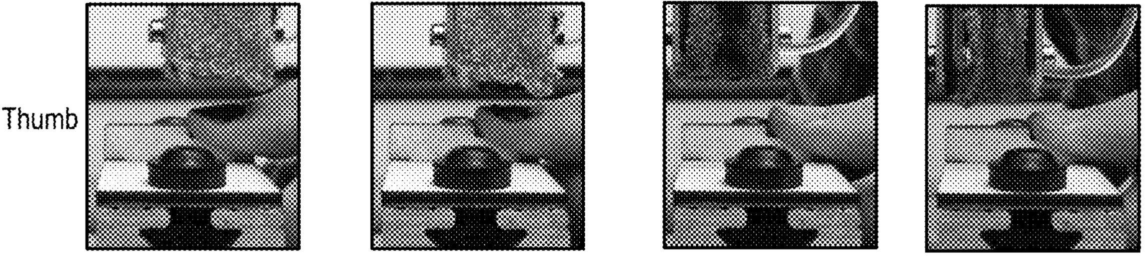
Figures 104A, 104B, 104C, 104D, 104E, 105A, 105B, 105C, 105D, 105E:
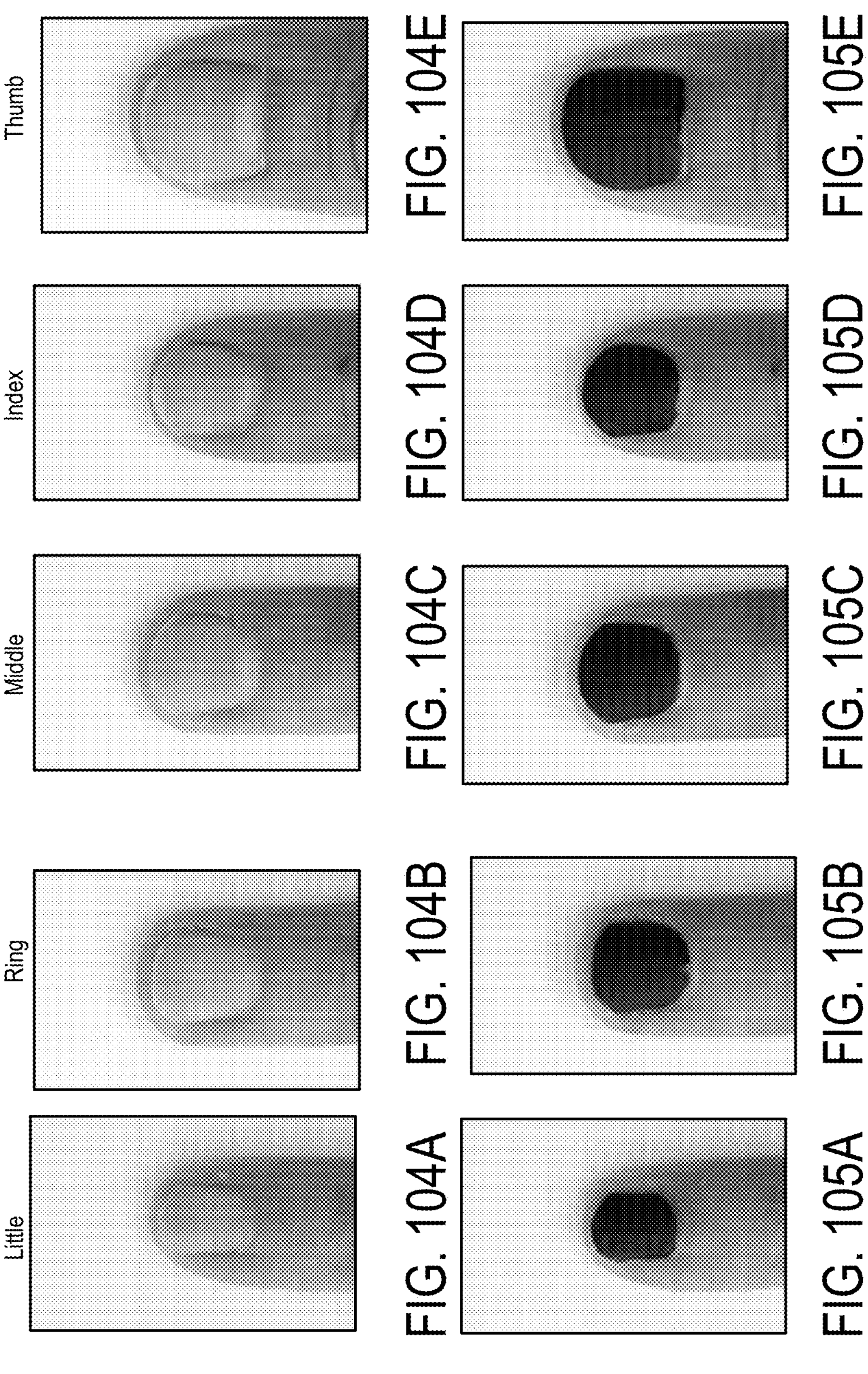
Figures 106A, 106B, 106C, 106D, 106E:
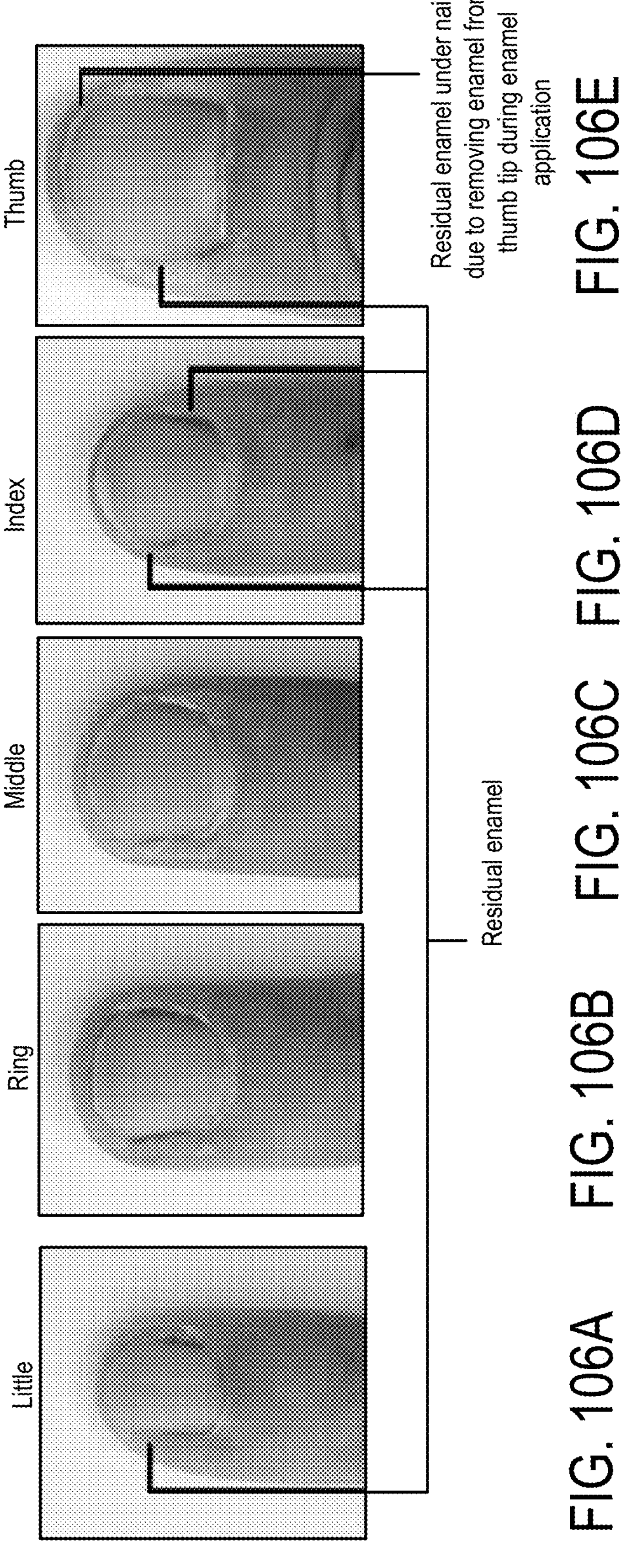
Figure 107A:
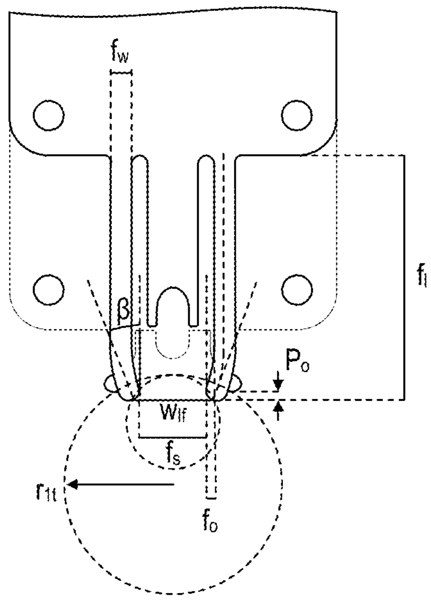
Figure 107B:
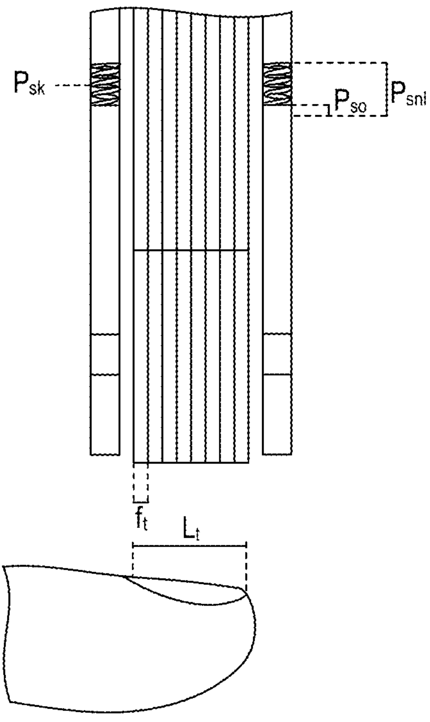
Figure 109:
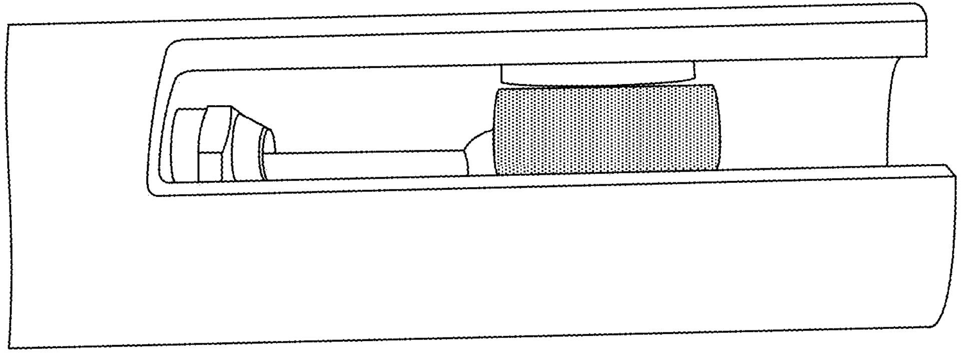
Figure 110:
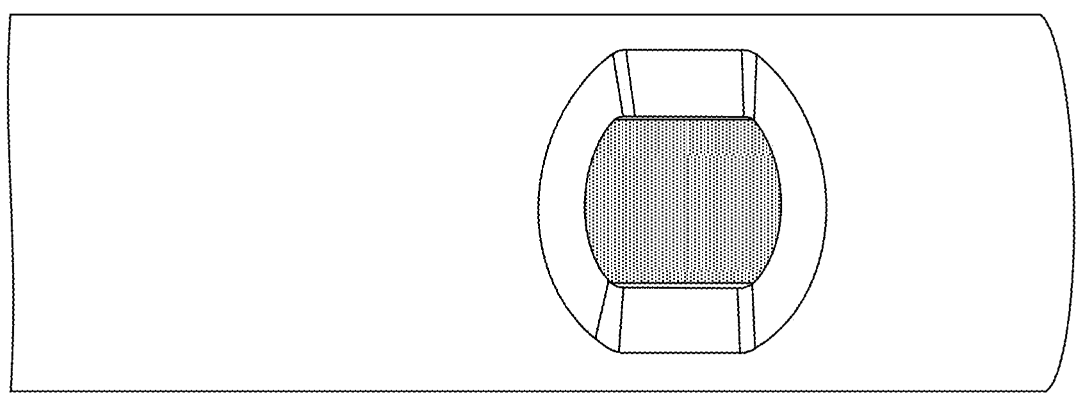
Figure 111:
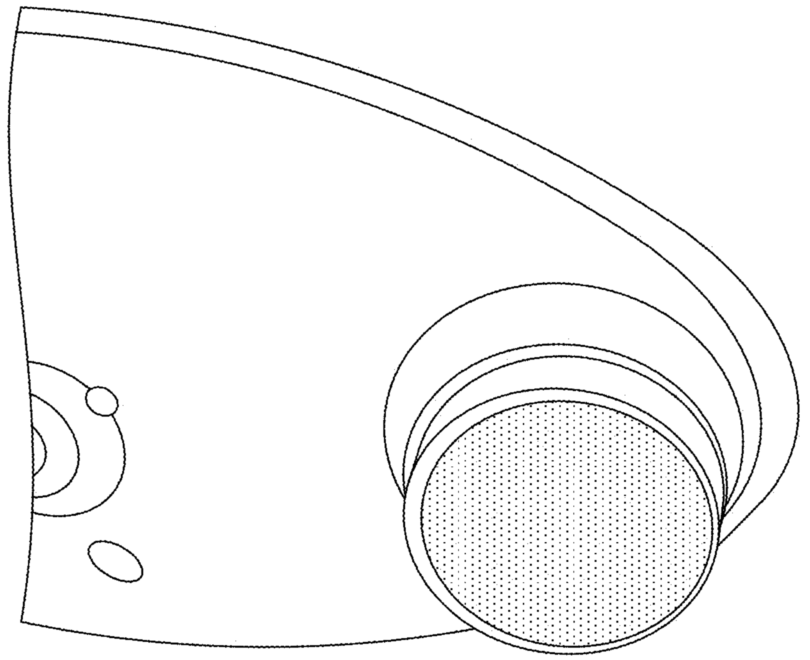
Figure 112:
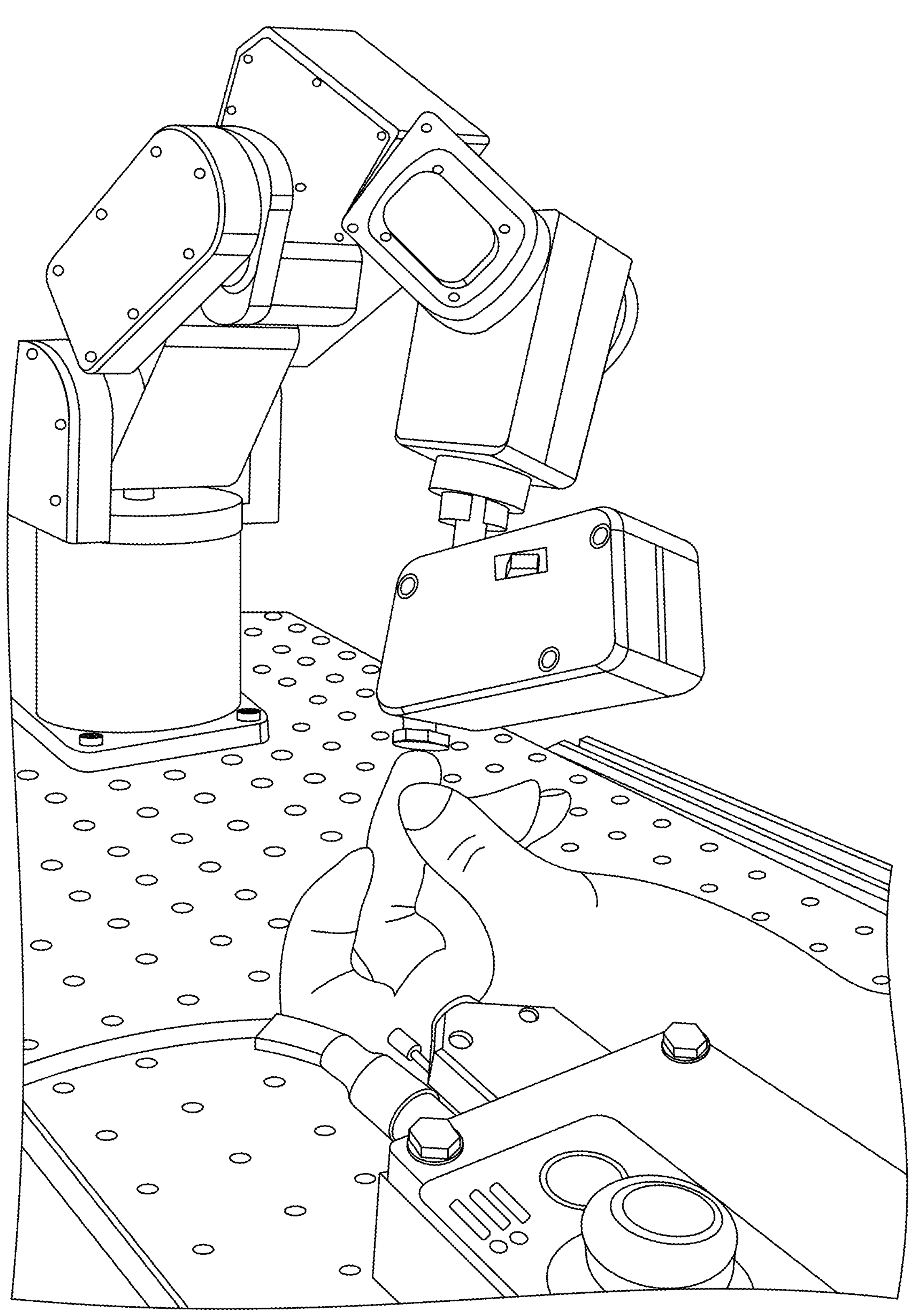
Figure 115:
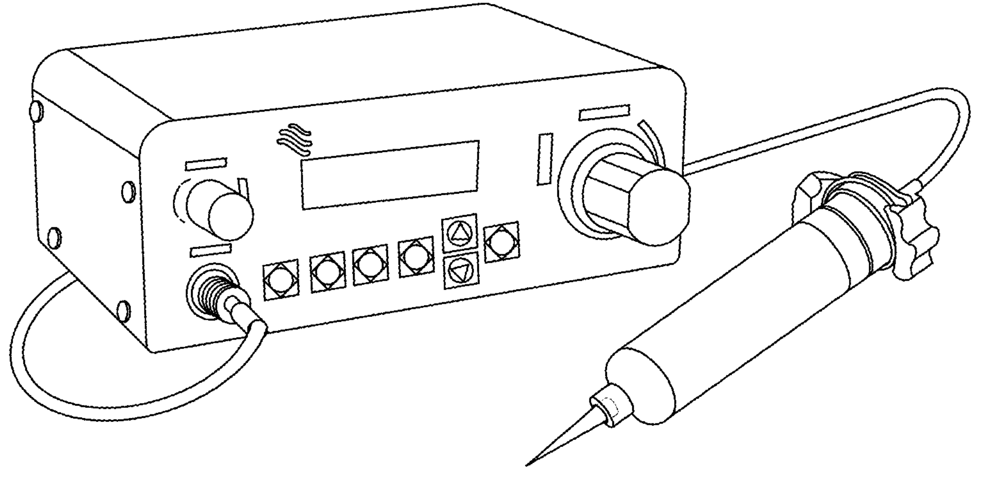
Figure 116:
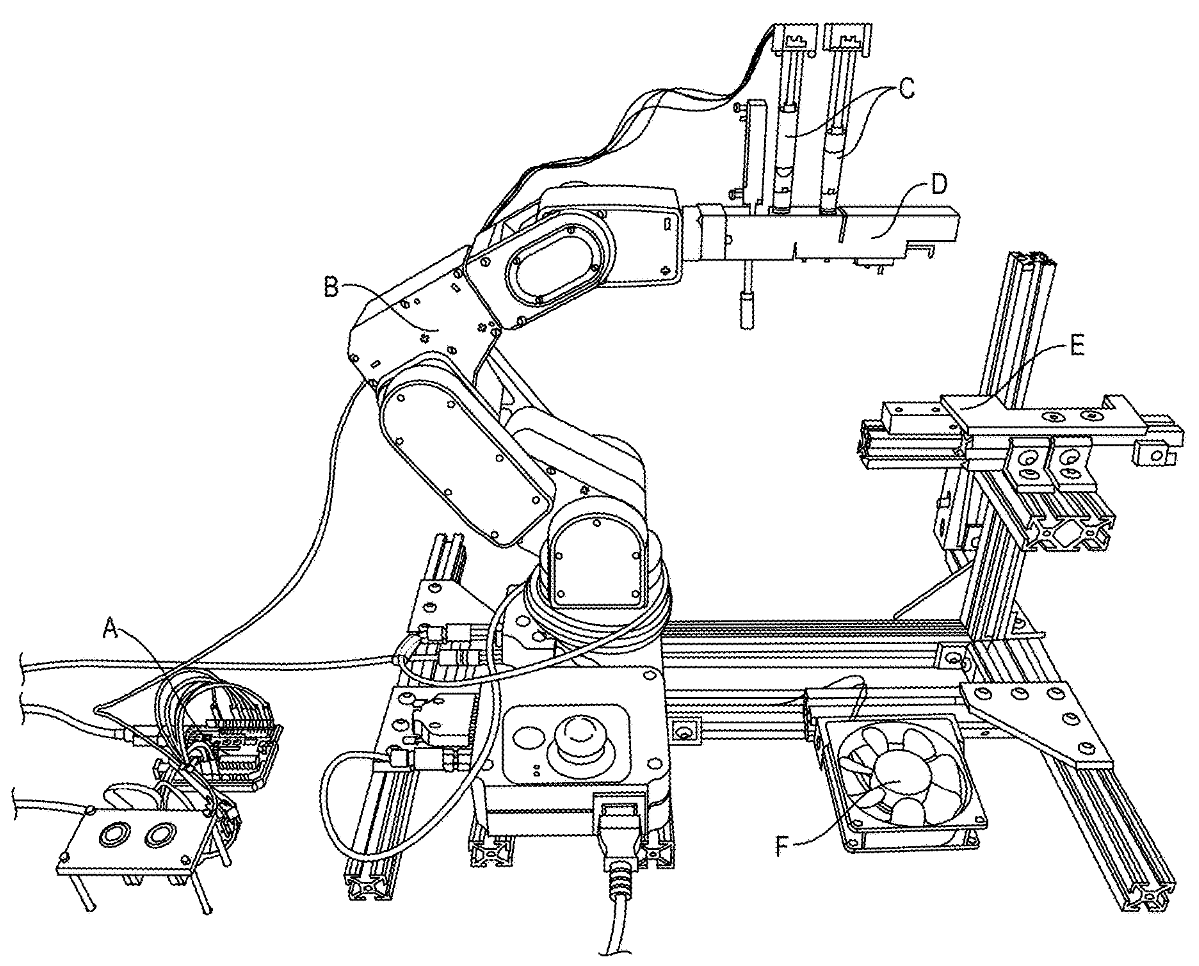
Figure 117:
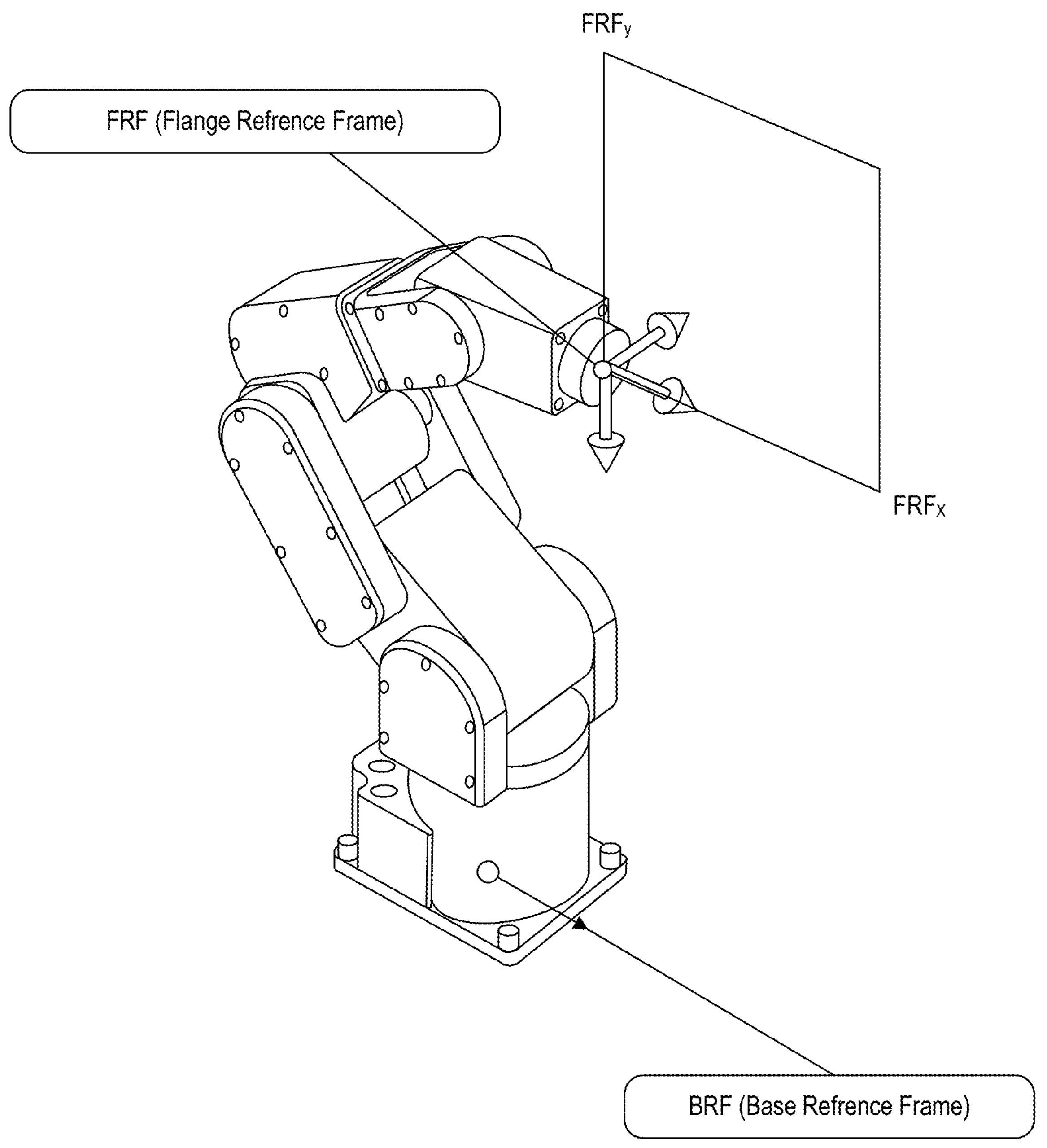
Figure 118A:
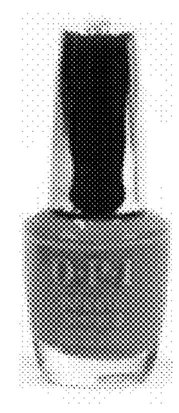
Figure 118B:
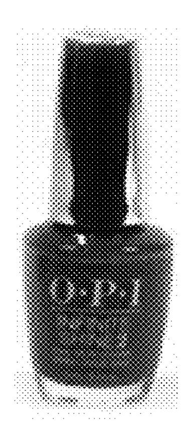
Figure 118C:
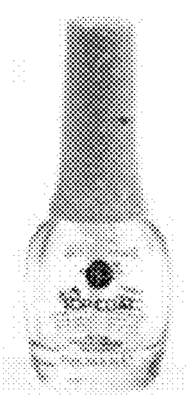
Figure 118D:
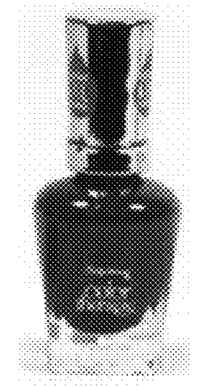
Figure 118E:
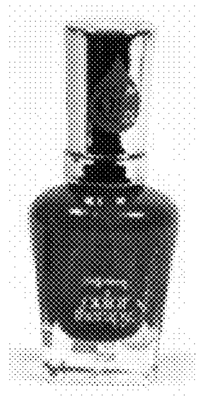
Figure 118F:
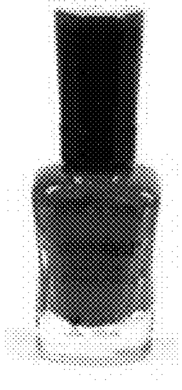
Figures 119A, 119B, 119C, 119D:
Figure 119E:
Figure 119F:
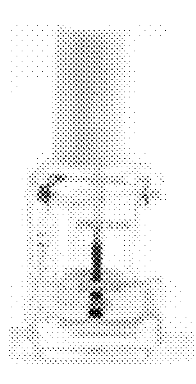
Figure 119G:
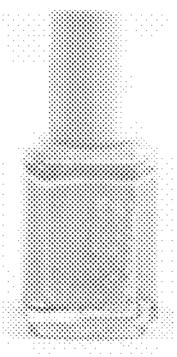
Figure 120A:
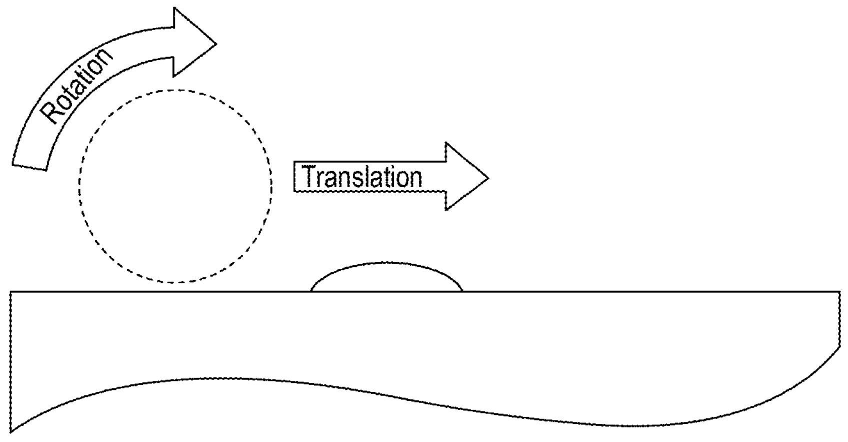
Figure 120B:
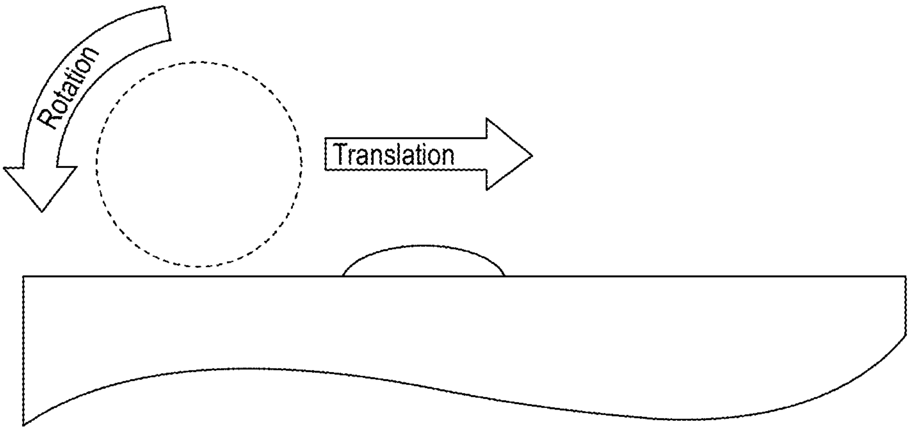
Figure 122:
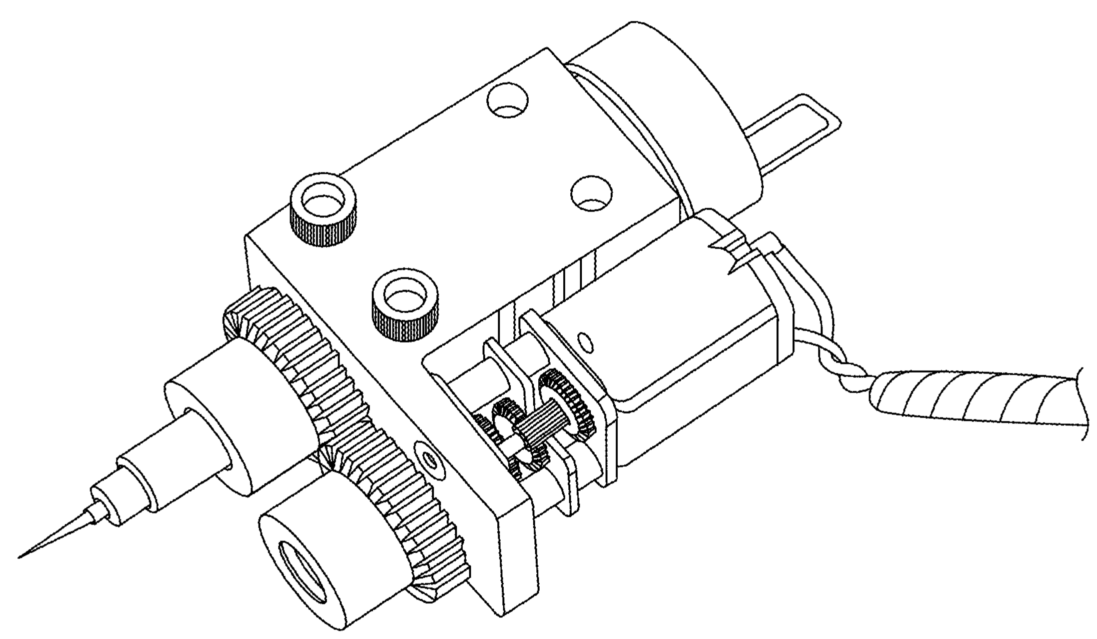
Figure 123:
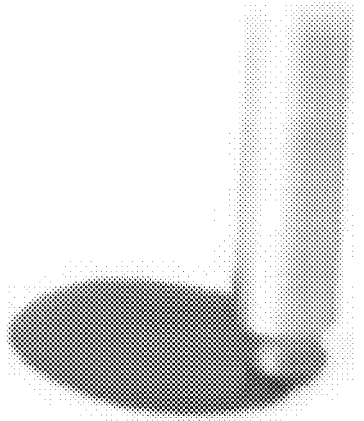
Figure 127A:
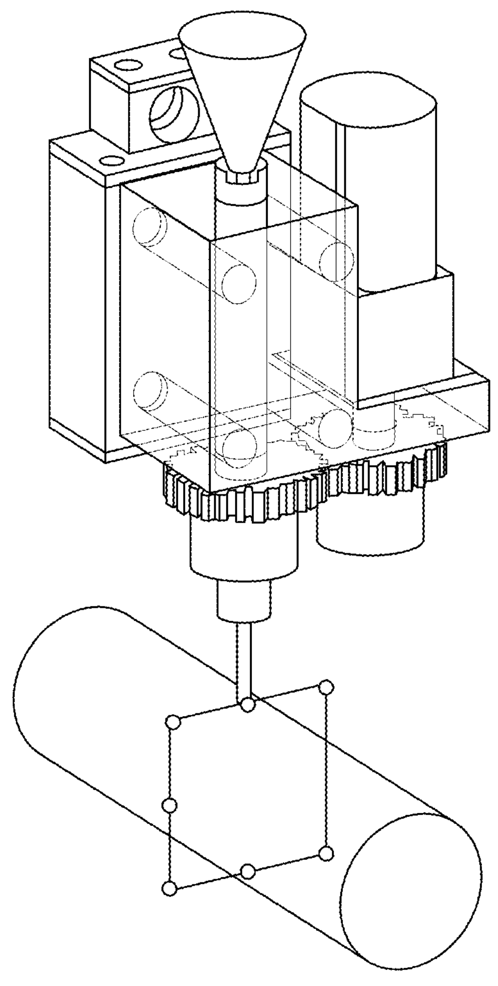
Figure 127B:
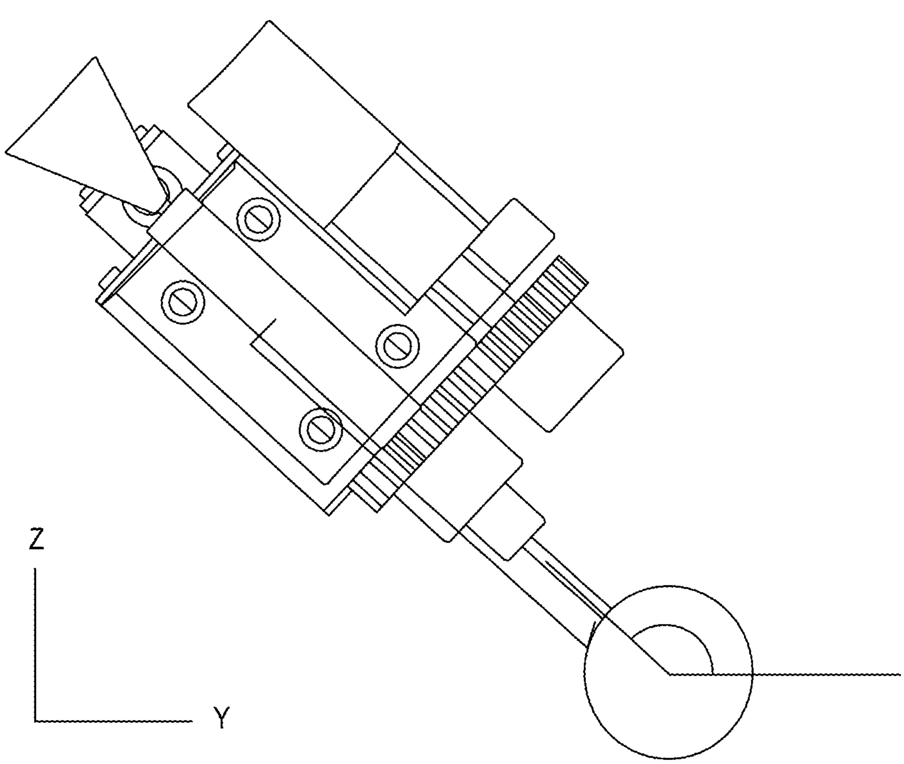
Figure 127C:
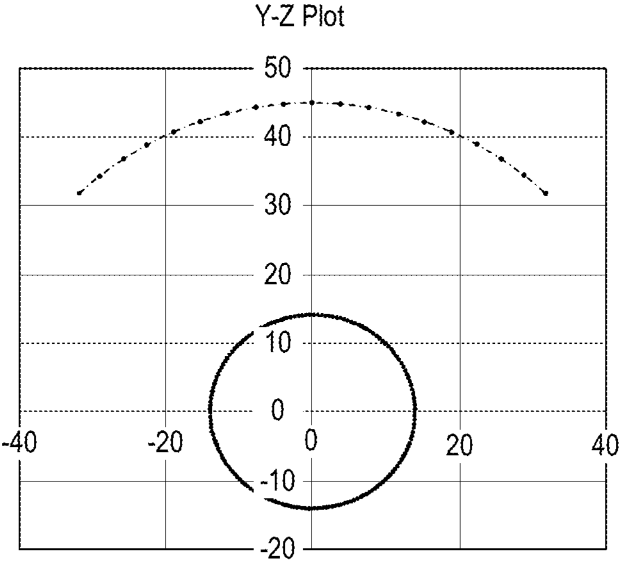
Figure 131:
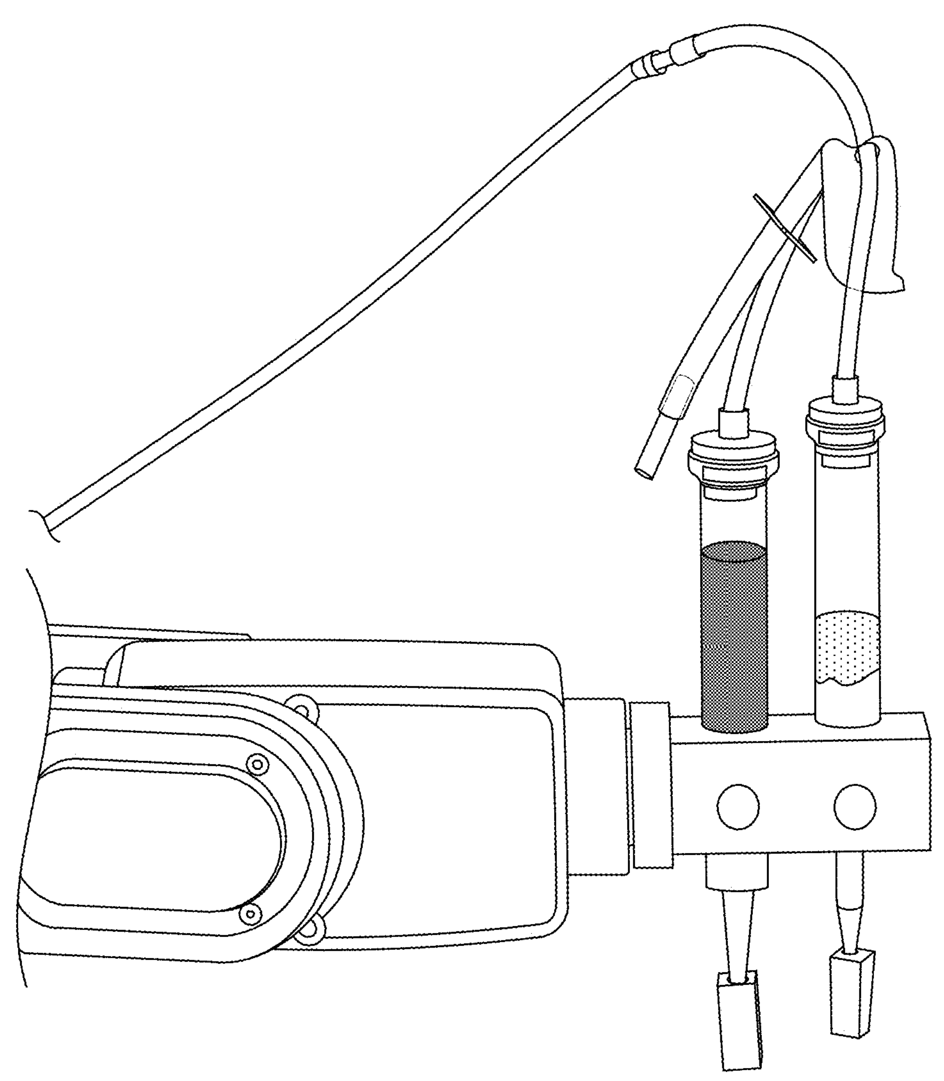
Figure 132:
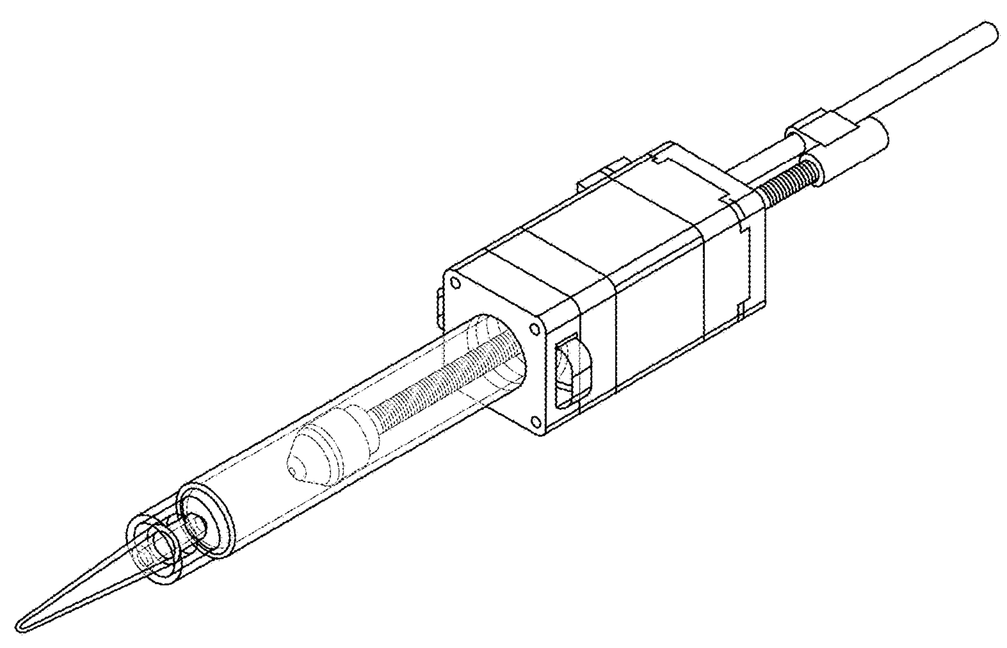
Figure 133:
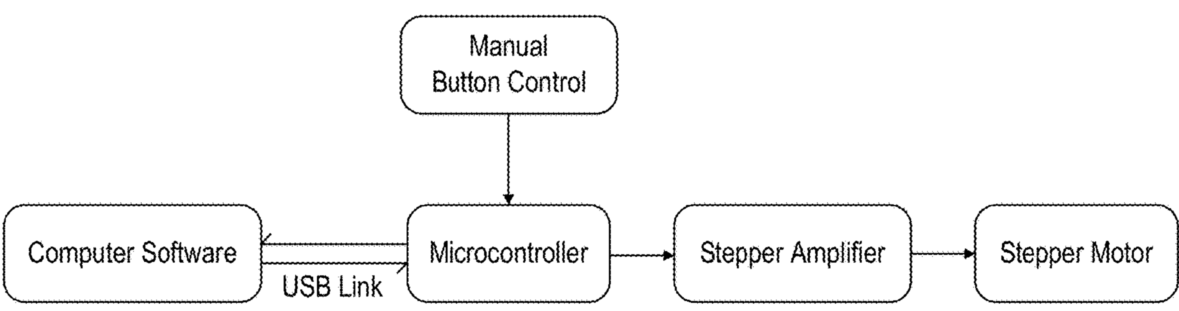
Figure 134:
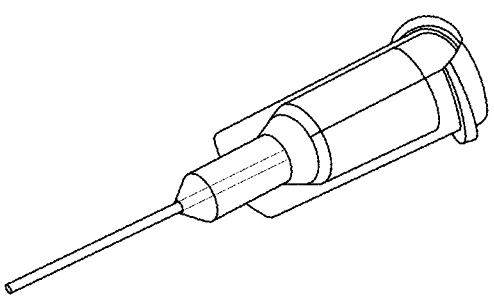
Figure 135:
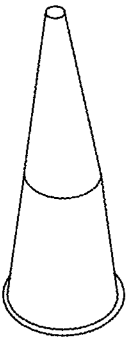
Figure 136:
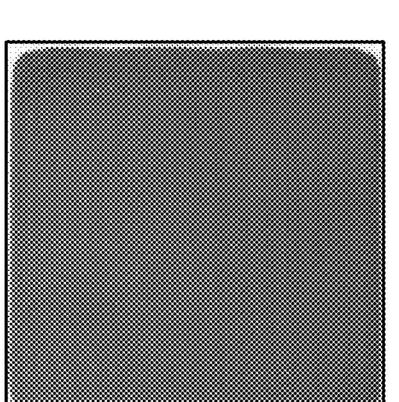
Figure 137:
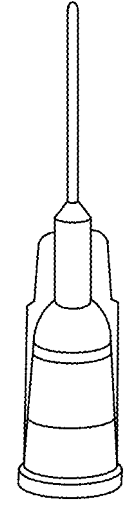
Figure 138A:
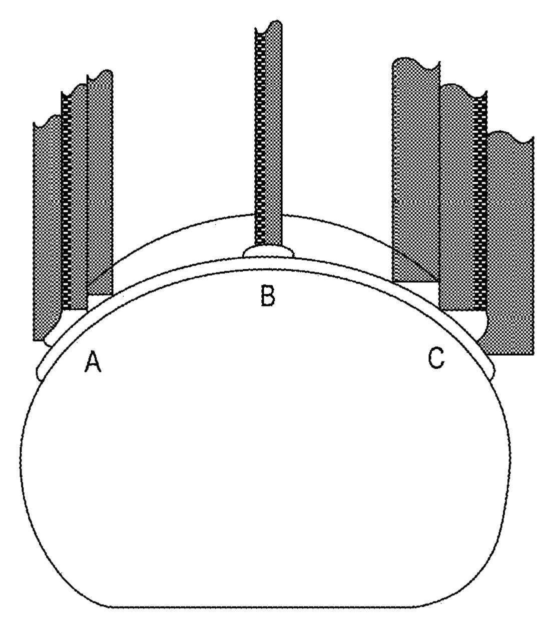
Figure 138B:
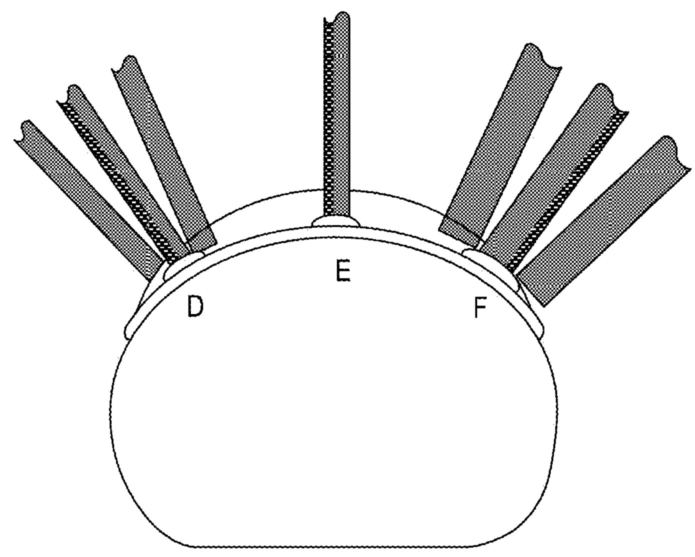
Figure 139A:
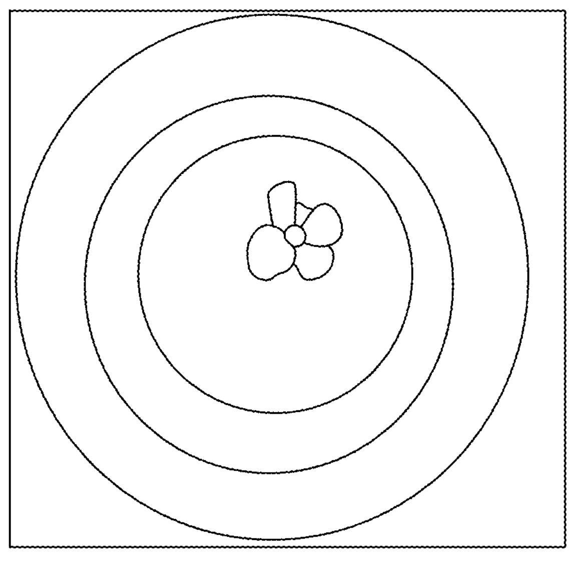
Figure 139B:
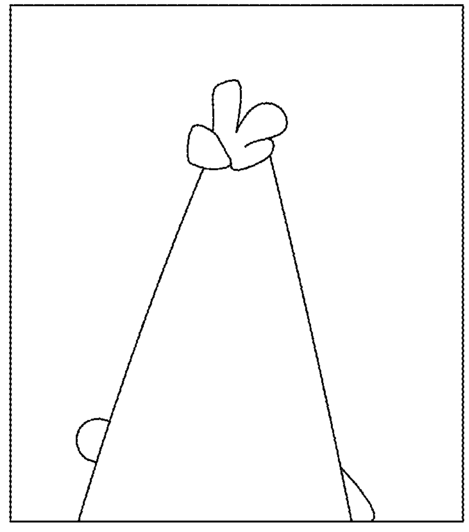
Figure 140A:
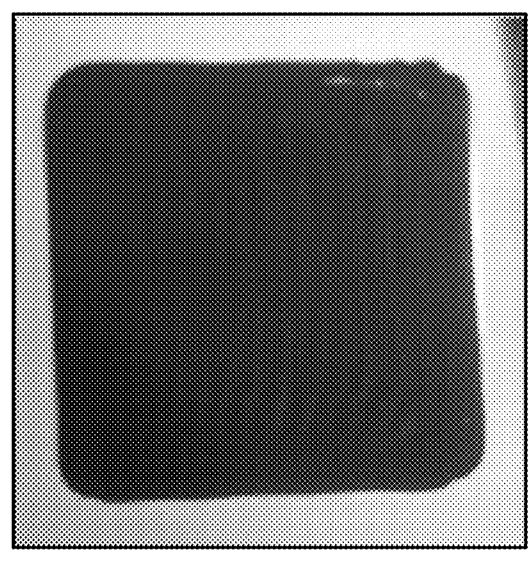
Figure 140B:
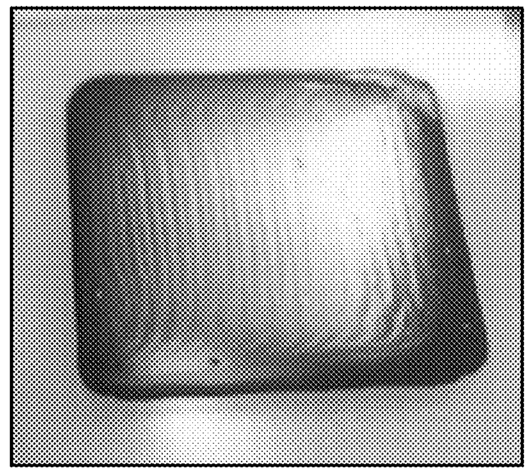
Figure 141A:
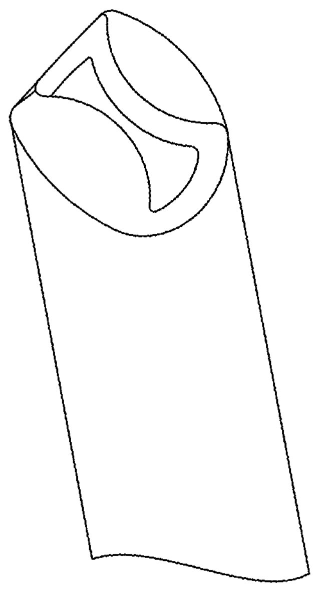
Figure 141B:
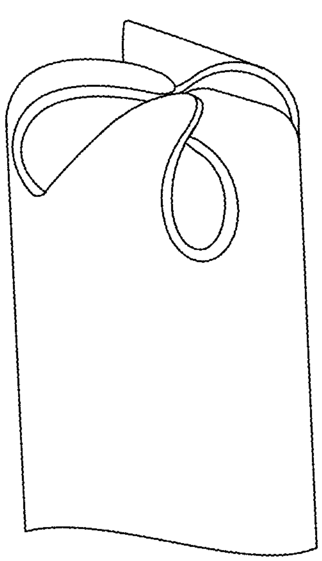
Figure 141C:
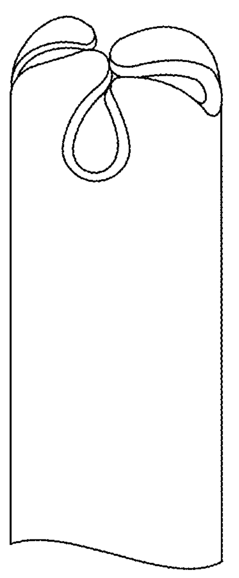
Figure 142A:
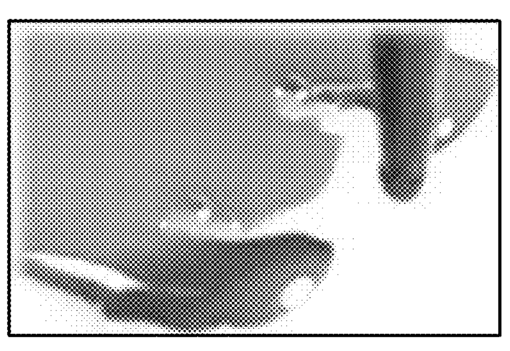
Figure 142B:
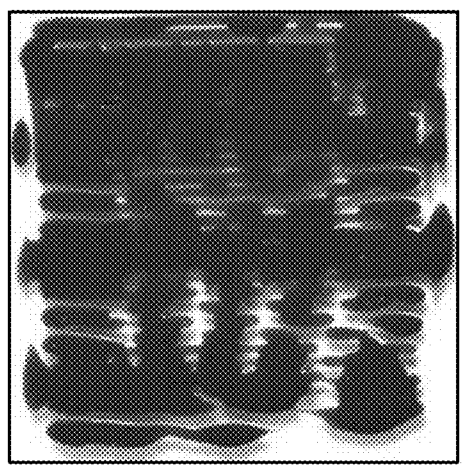
Figure 143A:
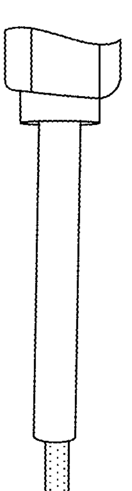
Figure 143B:
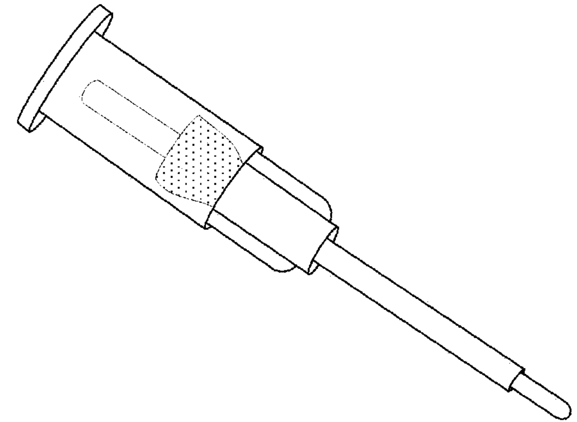
Figures 144A, 144B, 144C:
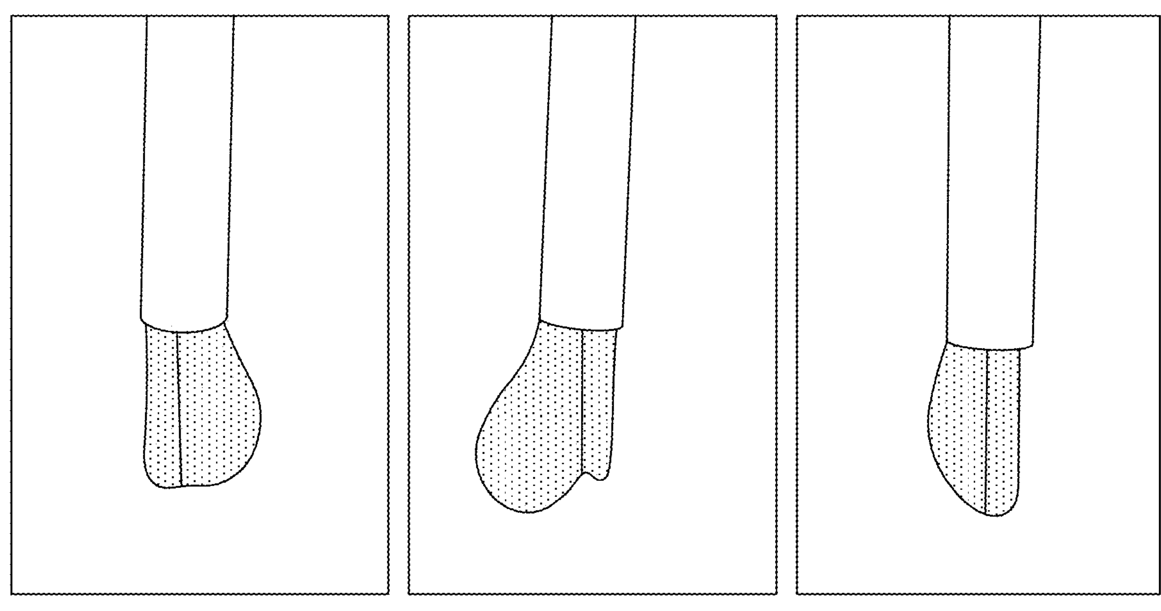
Figures 145A, 145B:
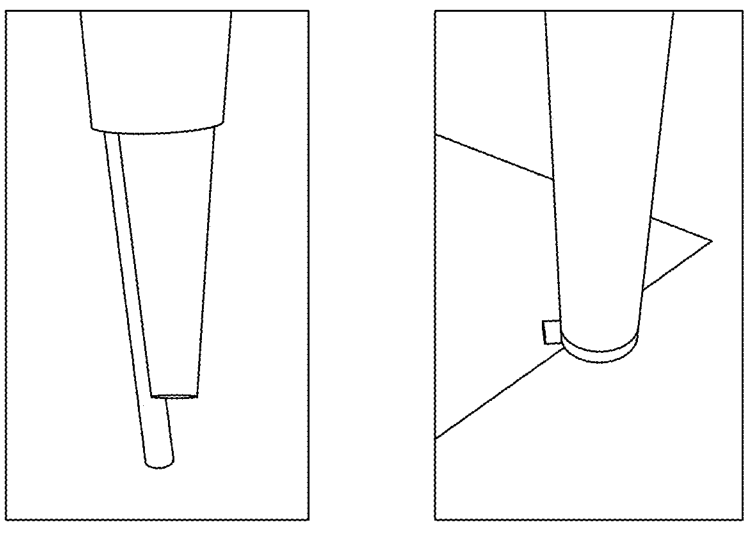
Figure 146A:
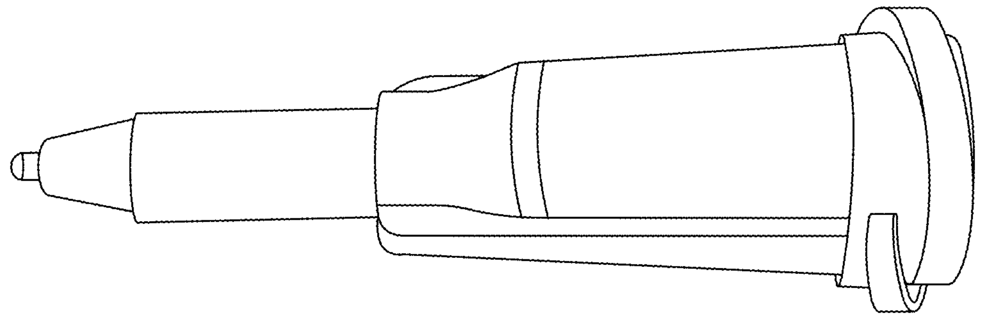
Figure 146B:
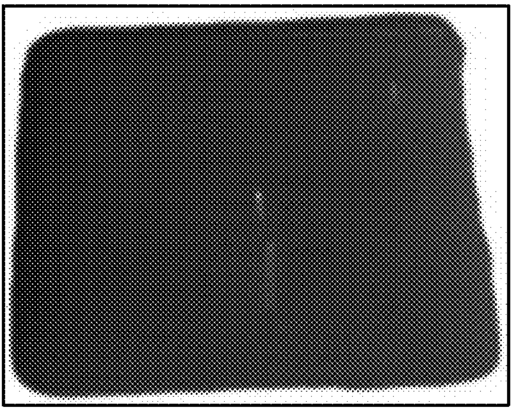
Figures 147A, 147B:
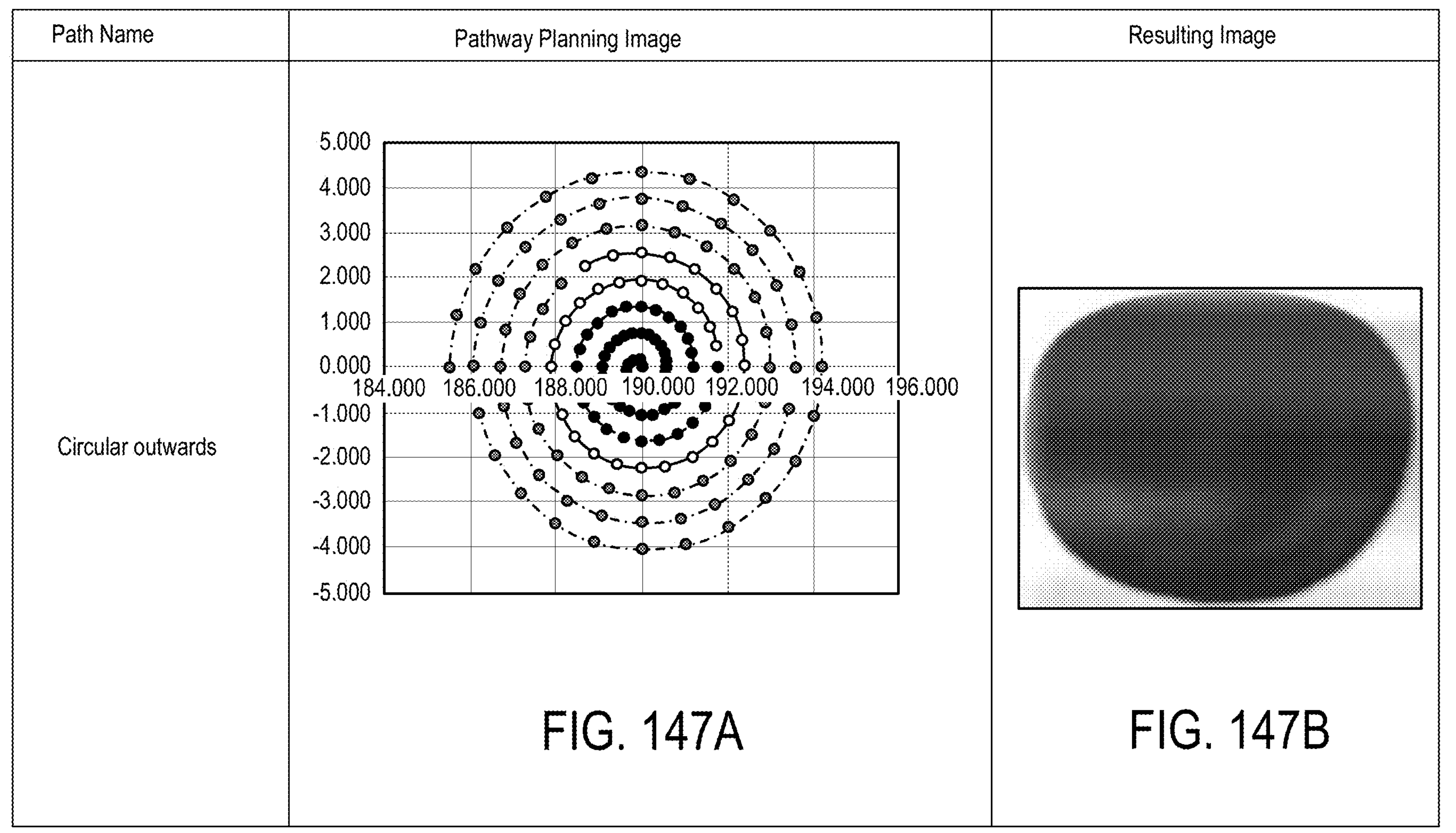
Figures 147C, 147D:
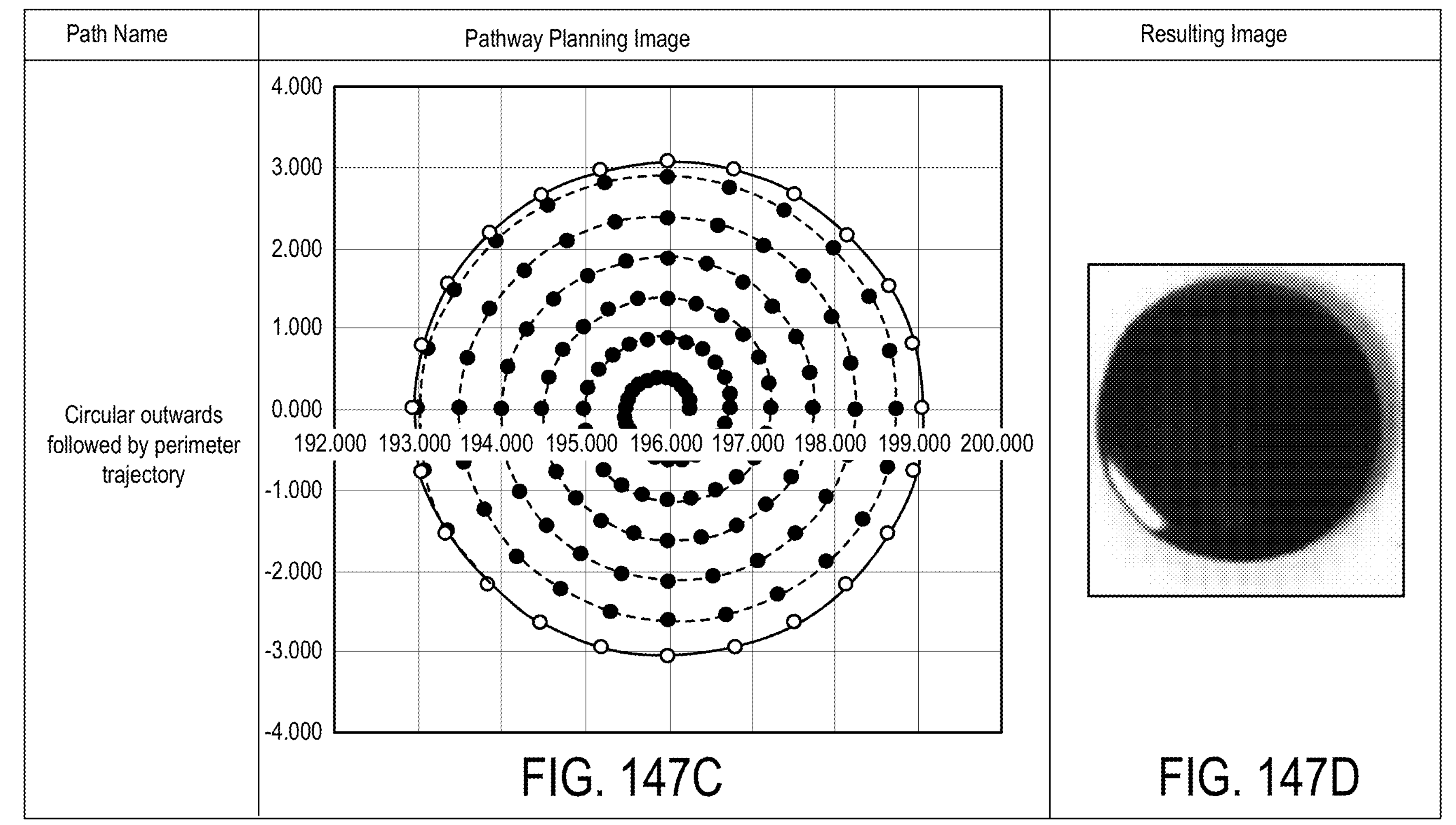
Figures 147E, 147F:
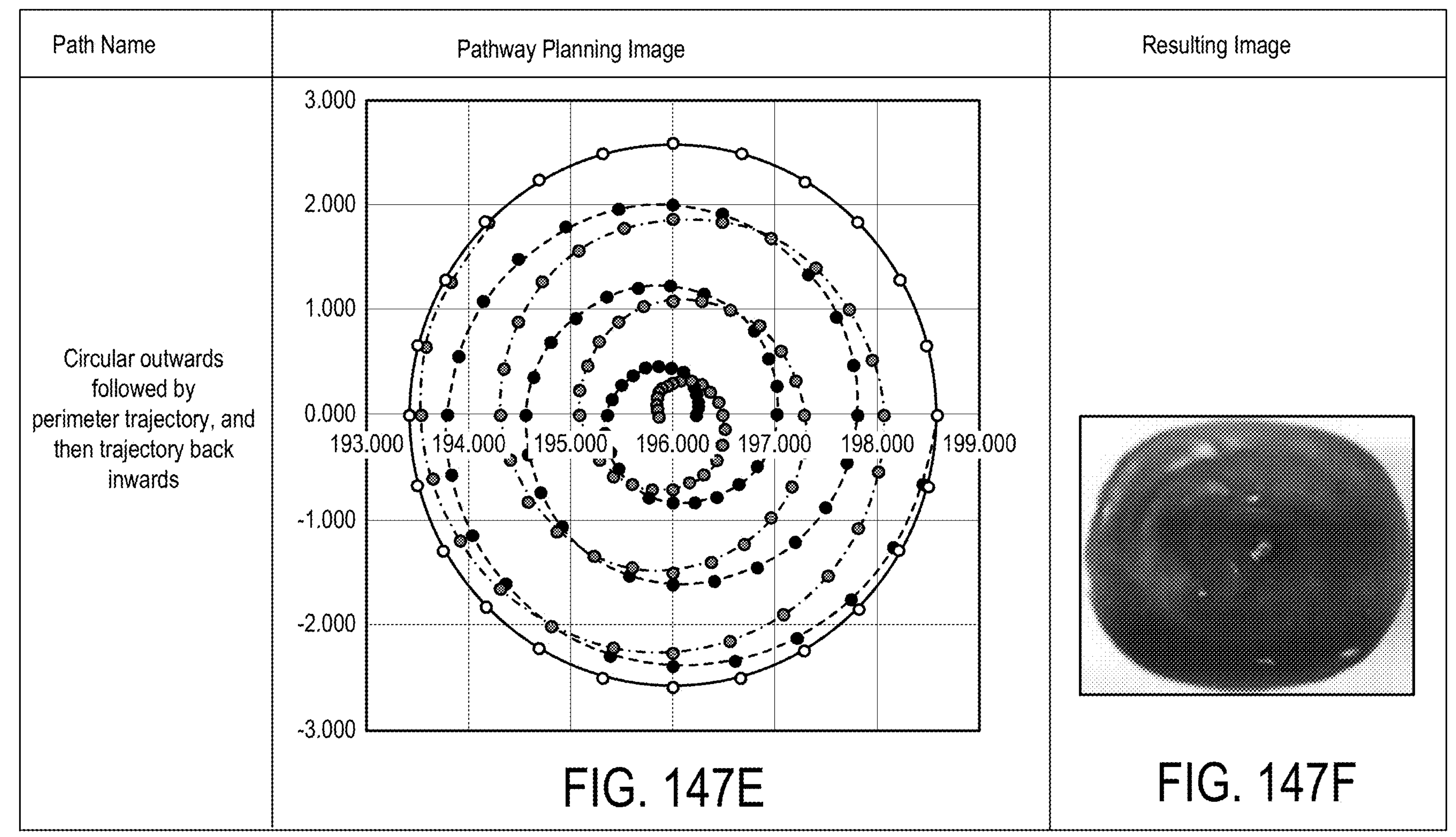
Figures 147G, 147H:
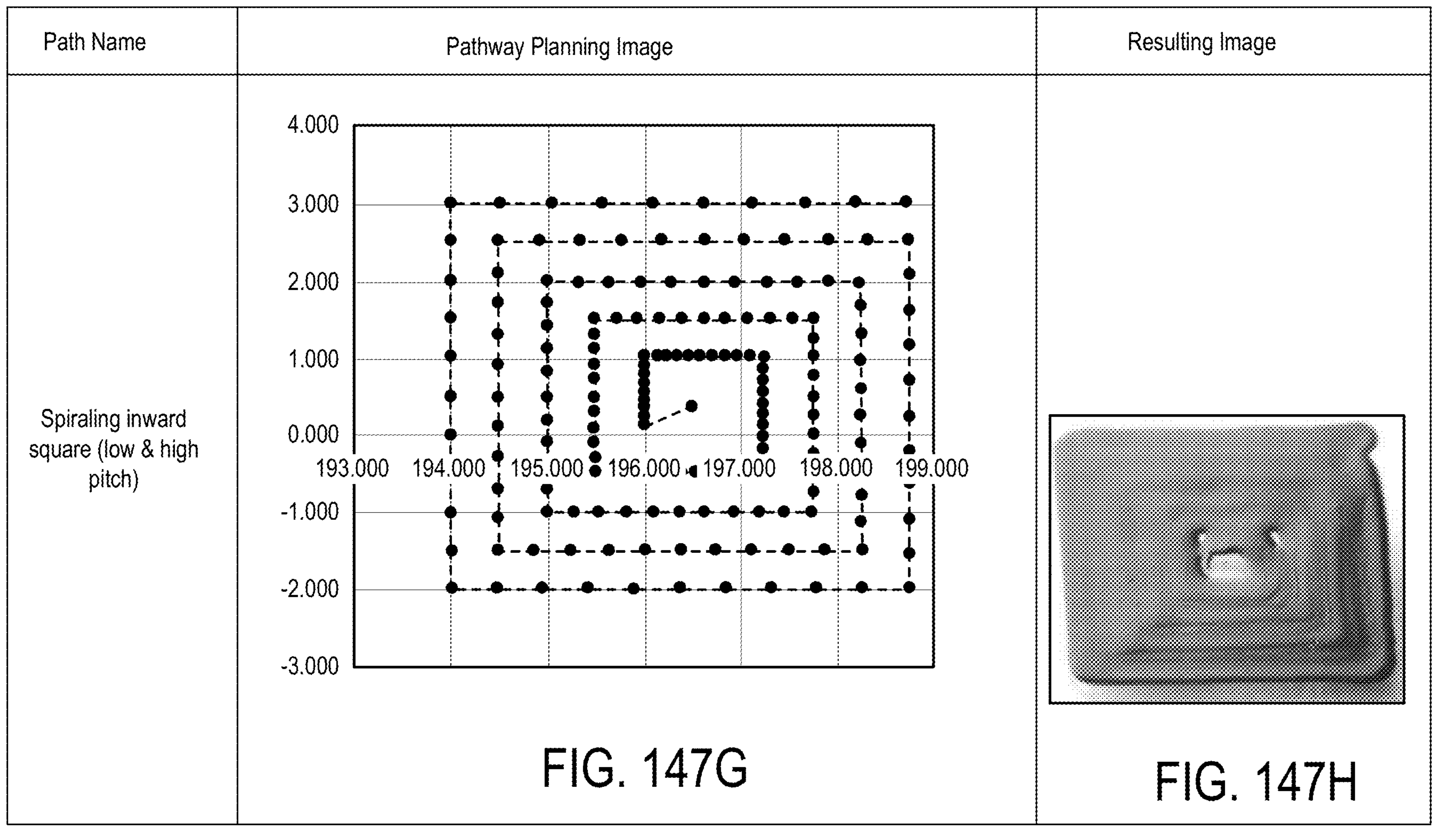
Figures 147I, 147J:
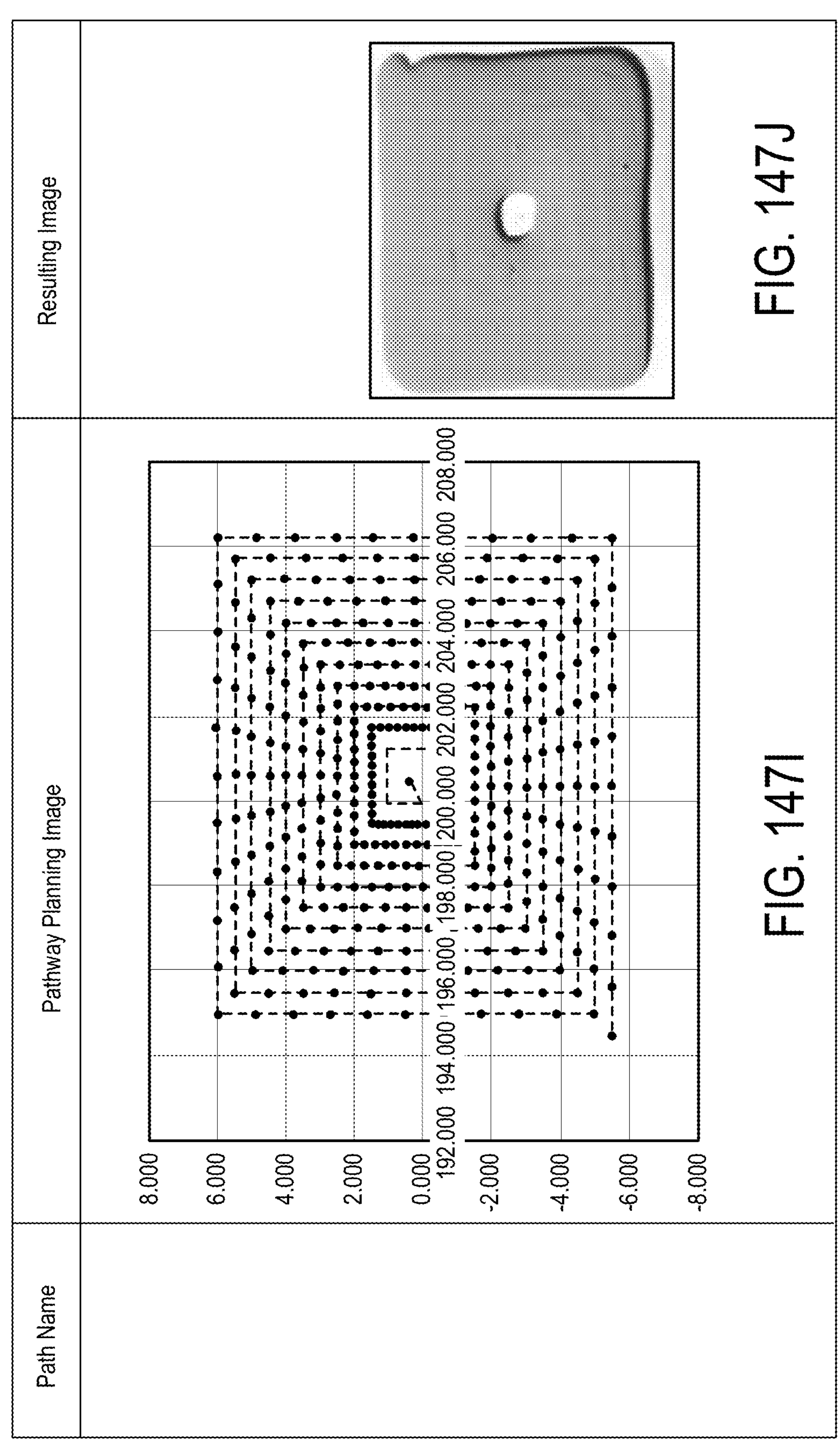
Figures 147K, 147L:
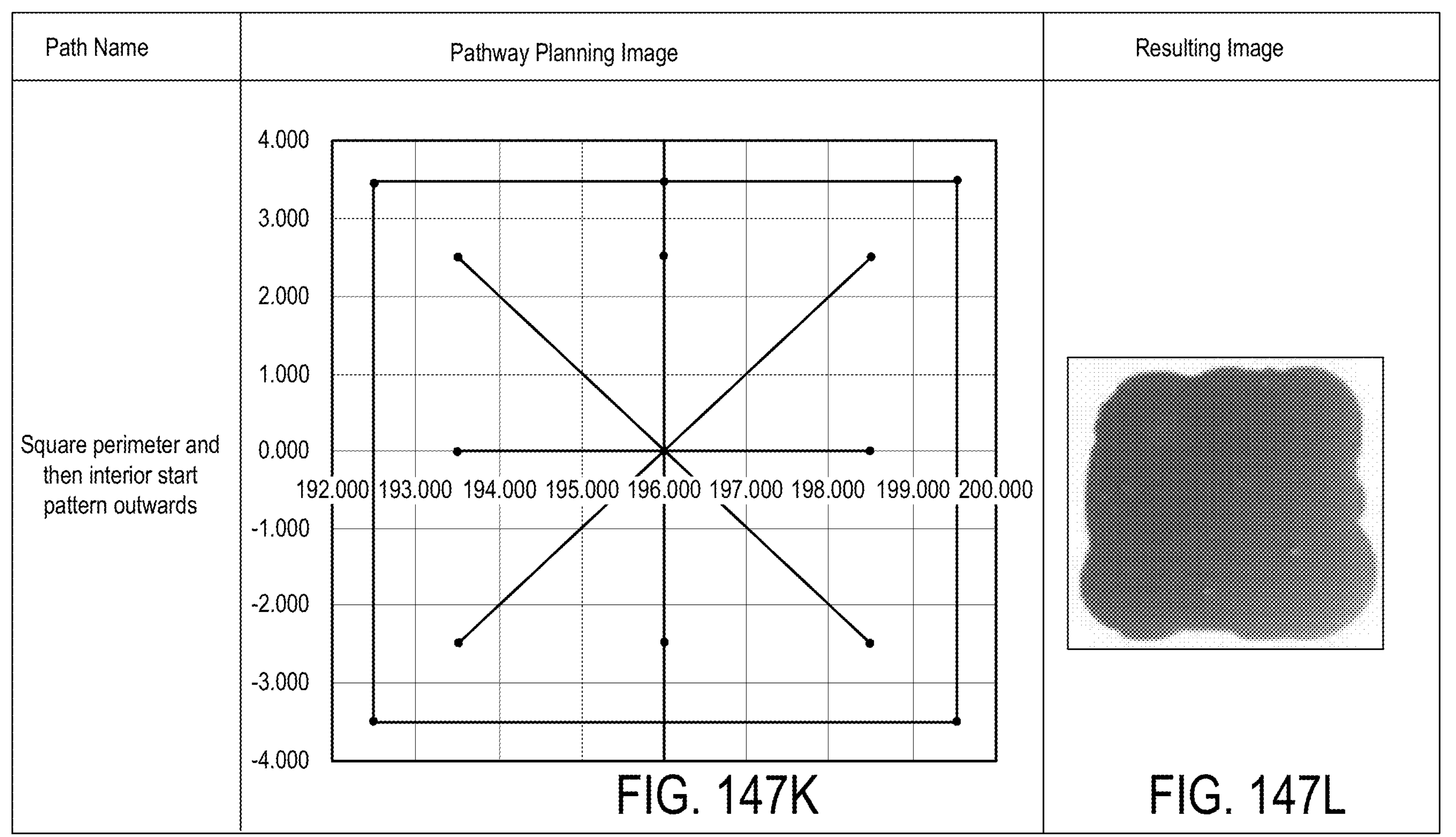
Figures 147M, 147N:
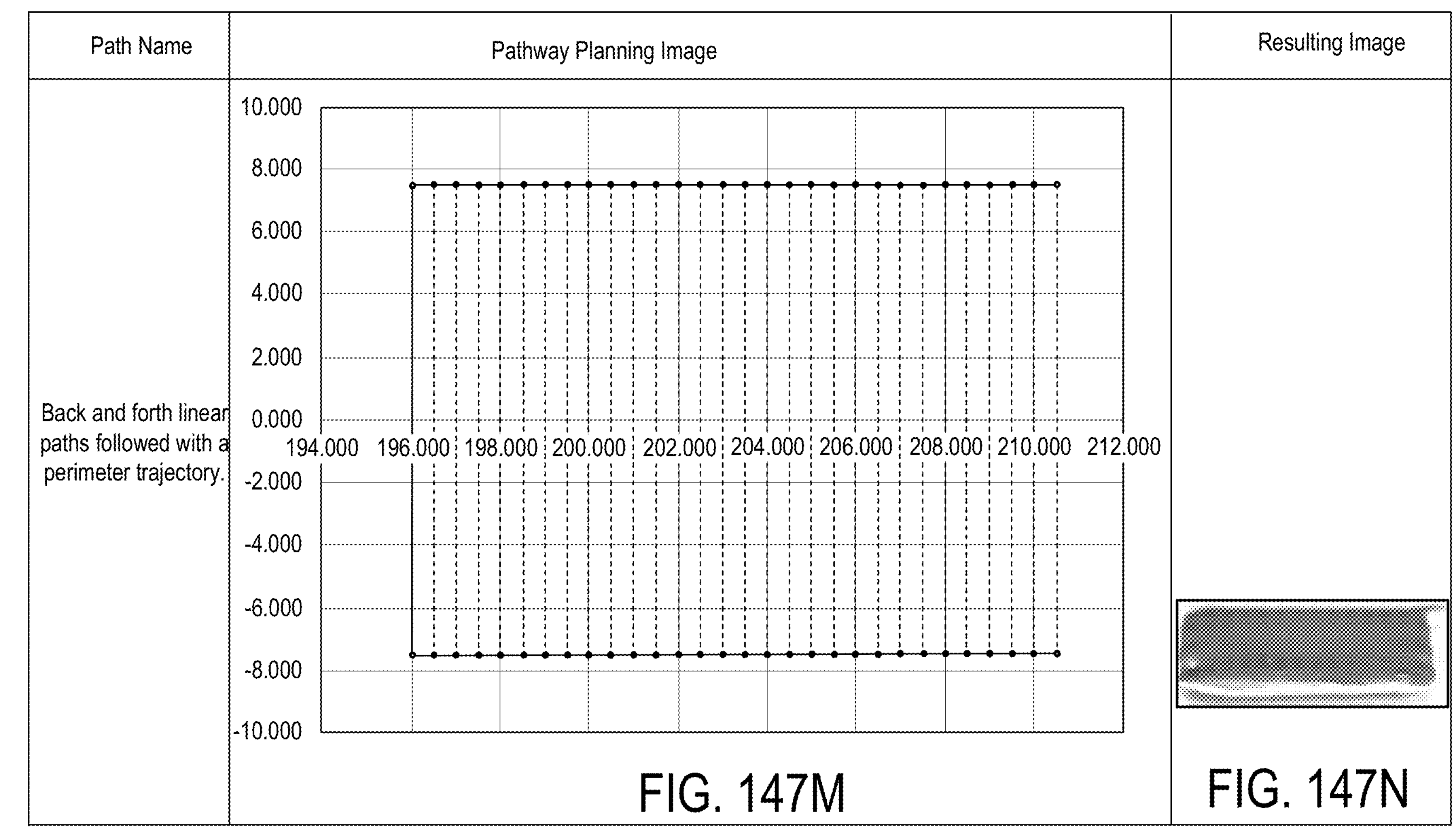
Figures 147O, 147P:
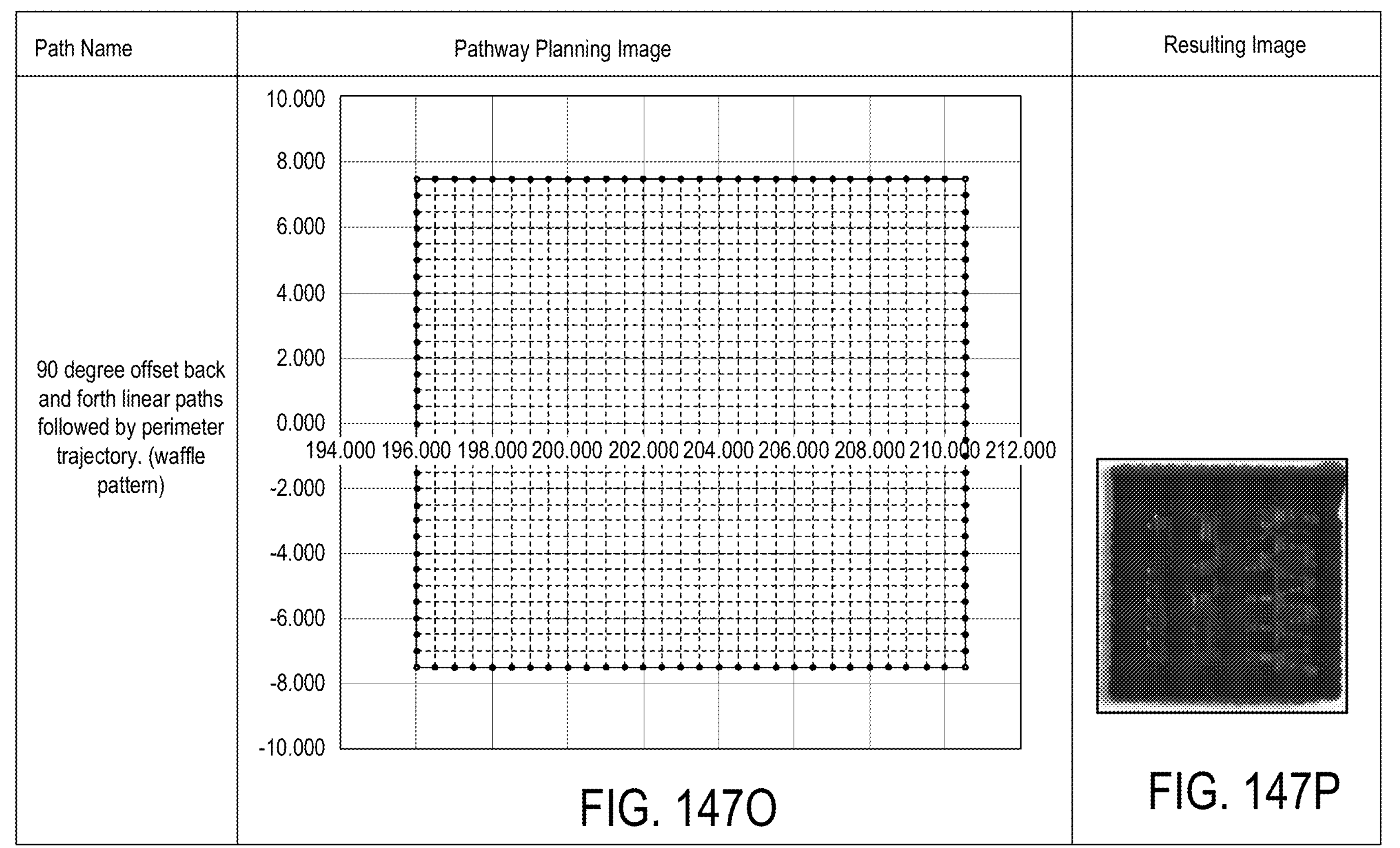
Figures 147Q, 147R:
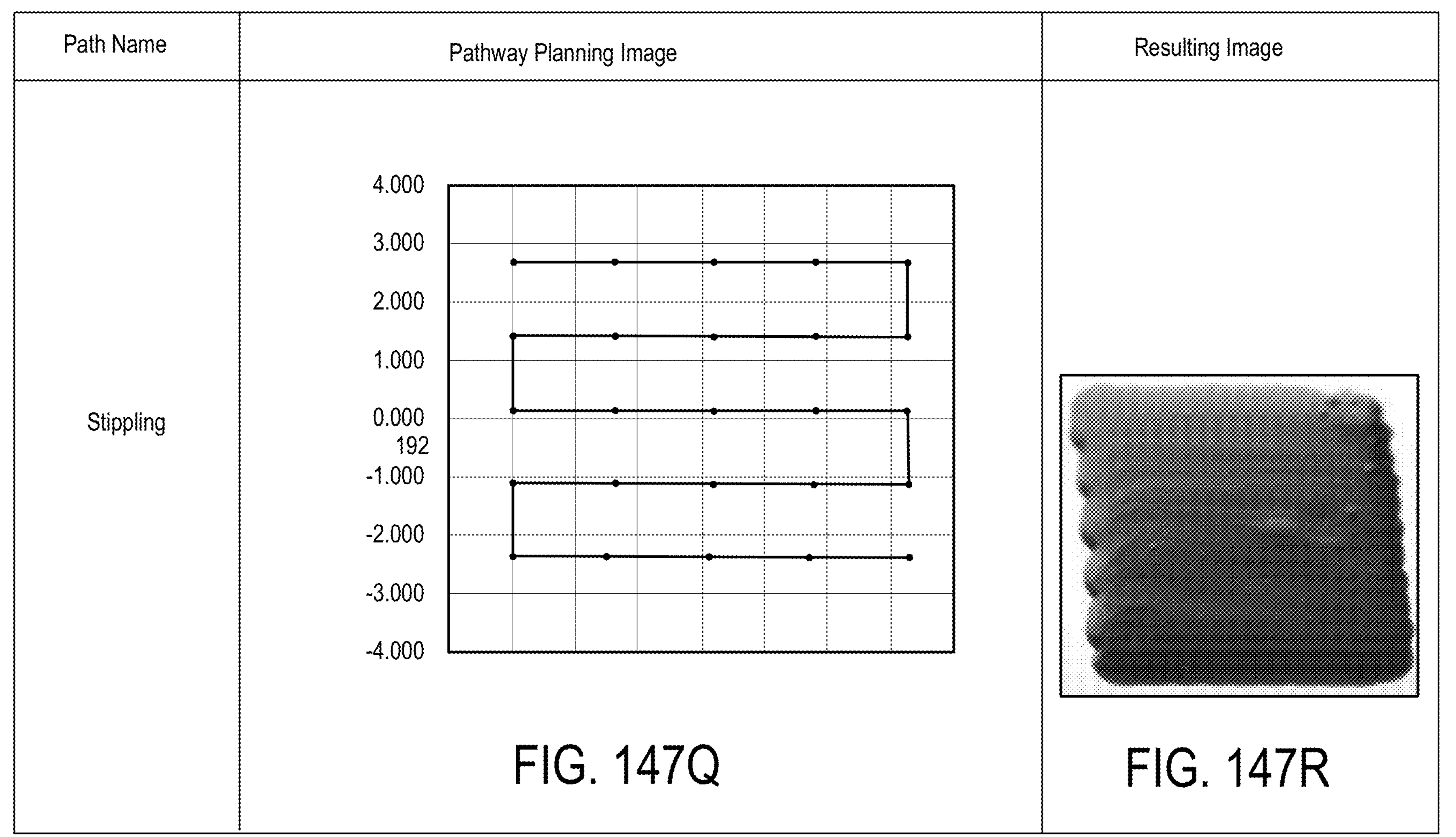
Figures 147S, 147T:
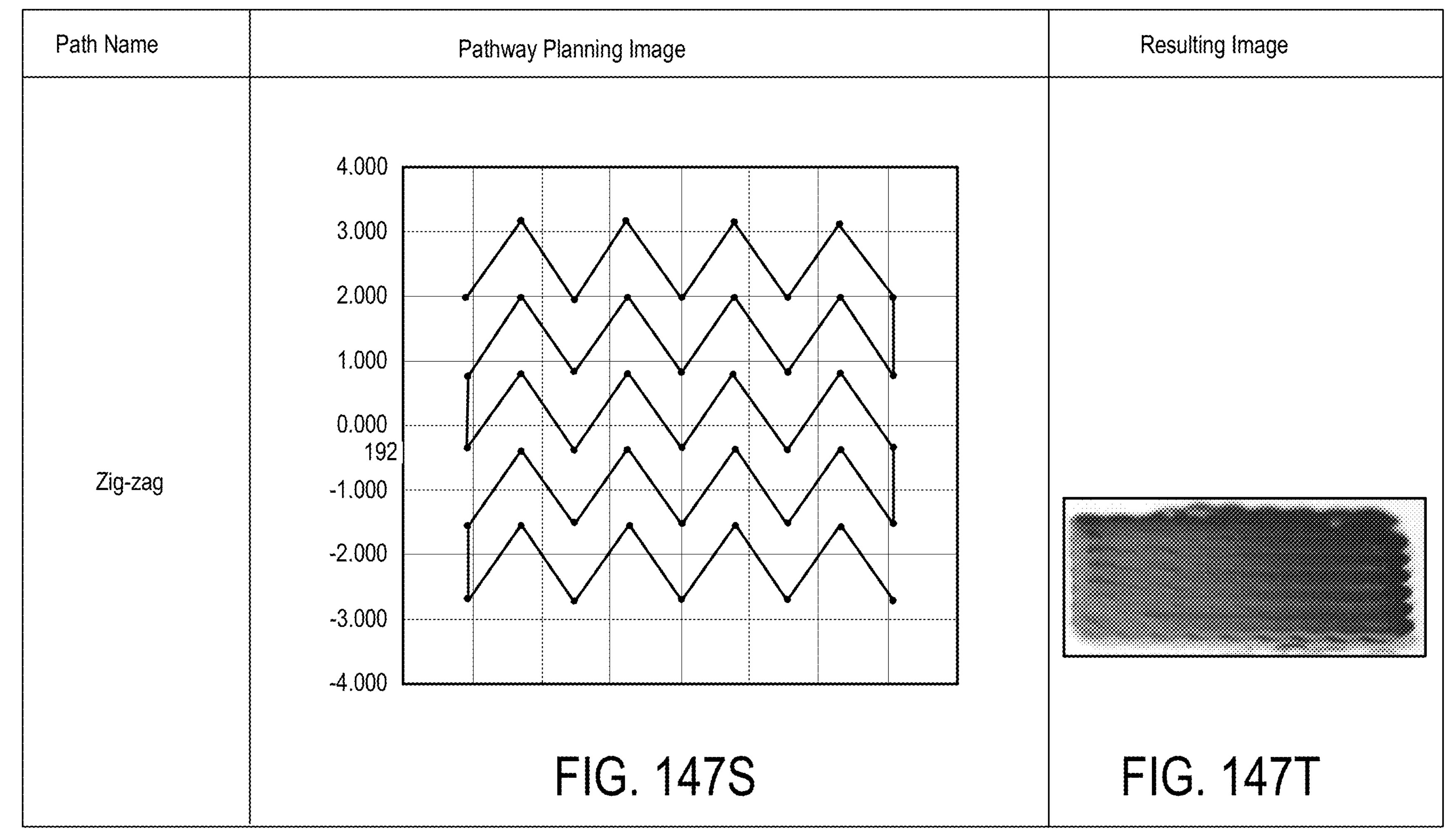
Figures 147U, 147V:
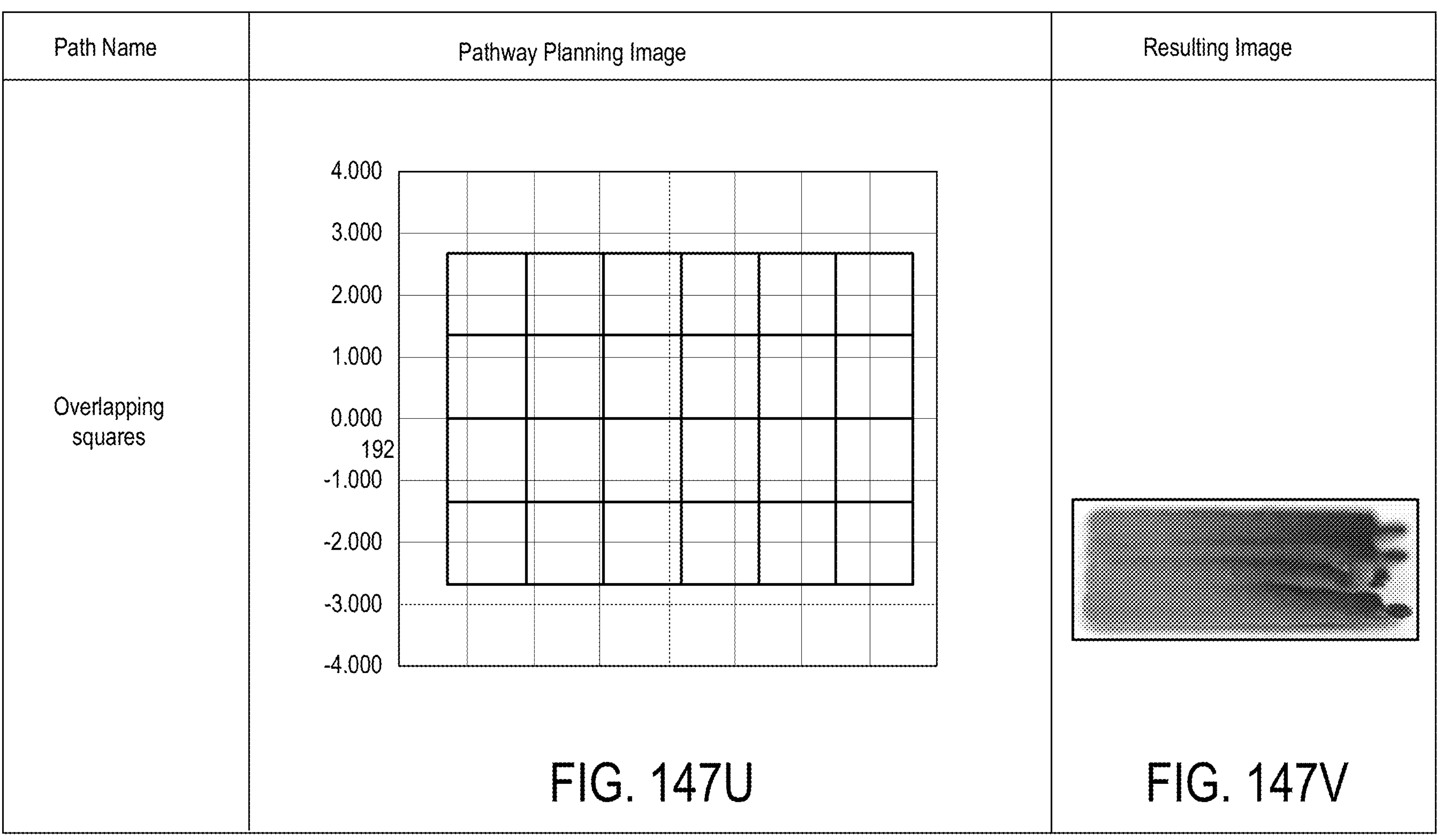
Figures 147W, 147X:
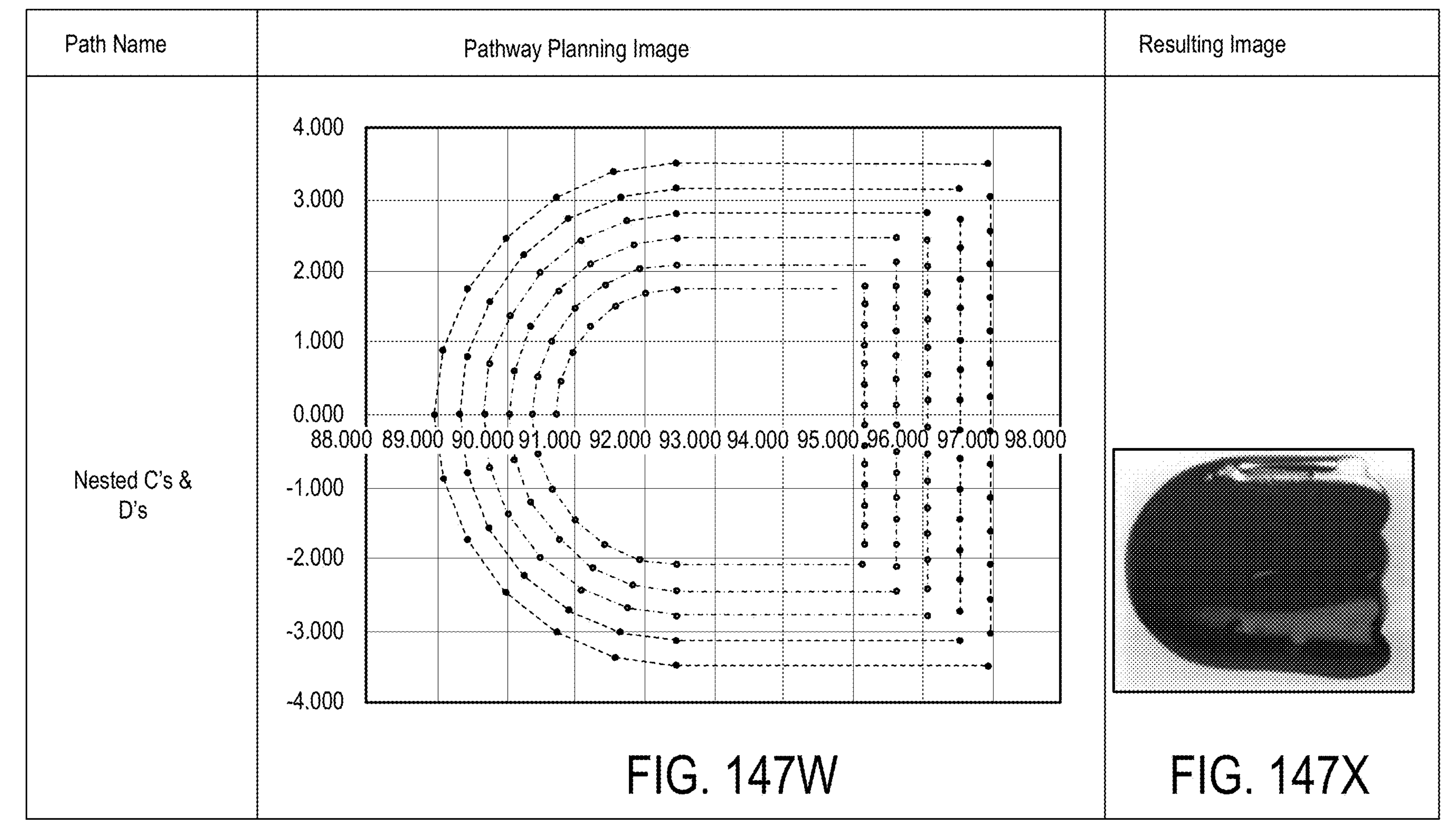
Figures 147Y, 147Z:
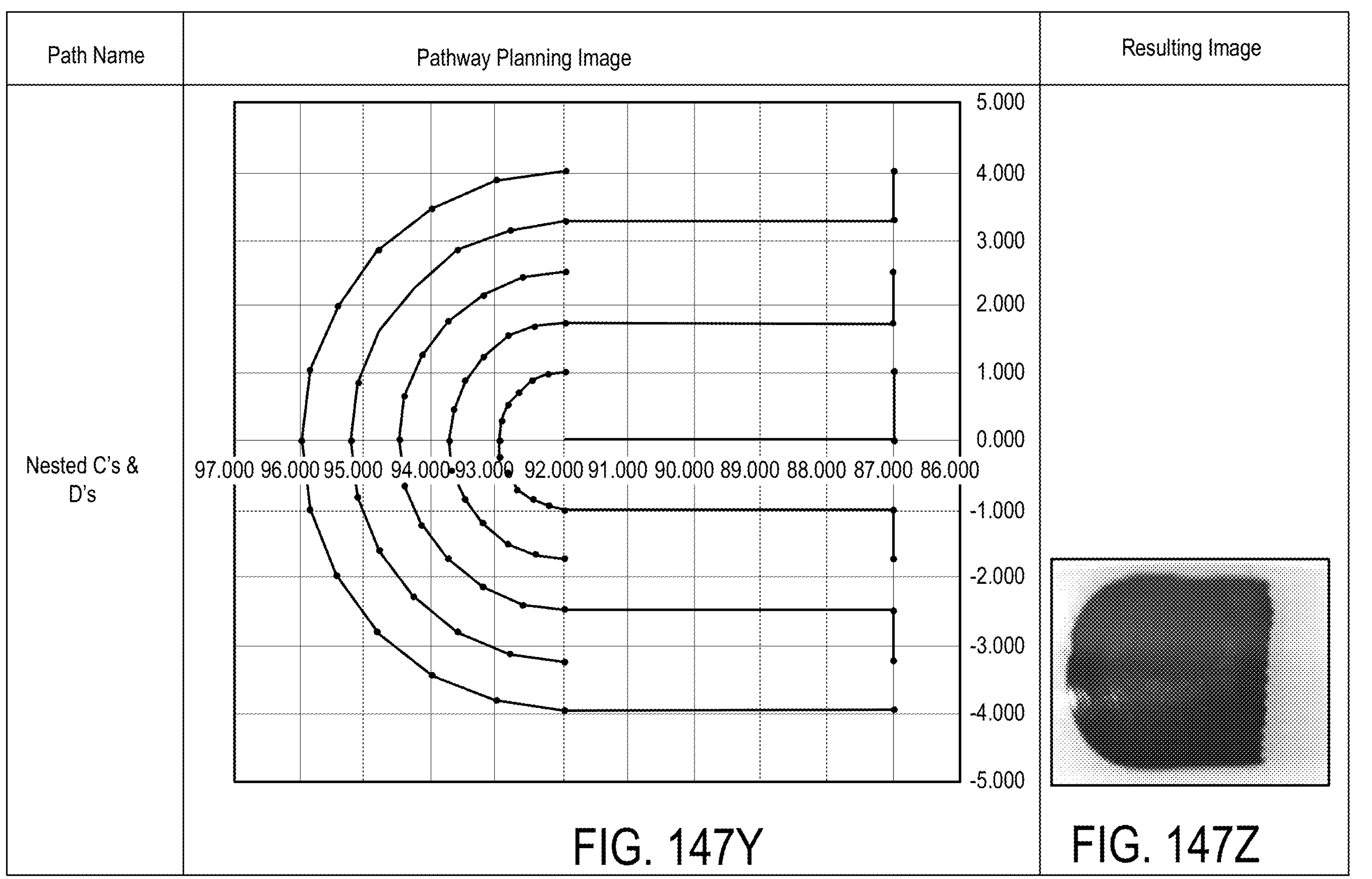
Figure 147A:
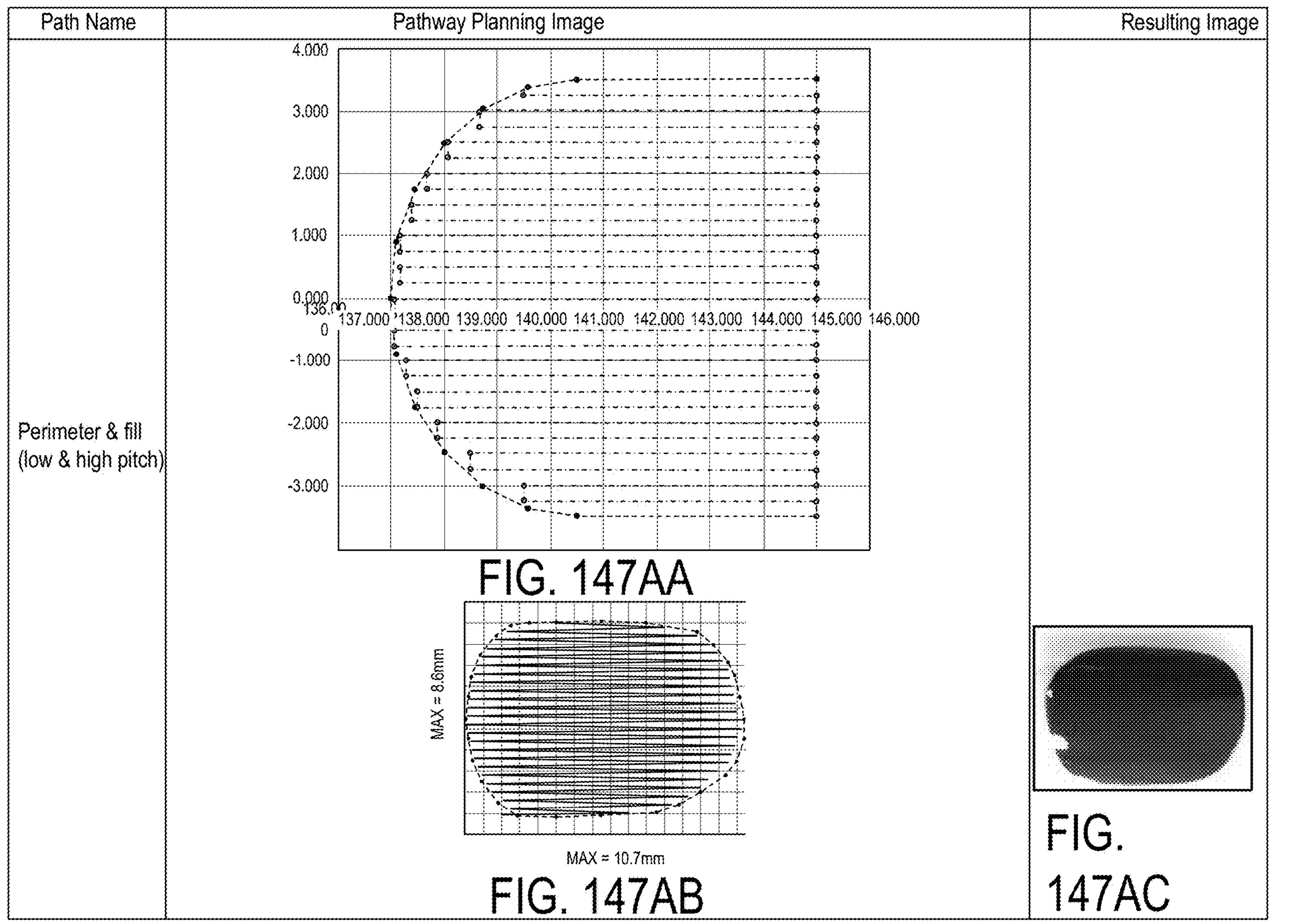
Figure 148:
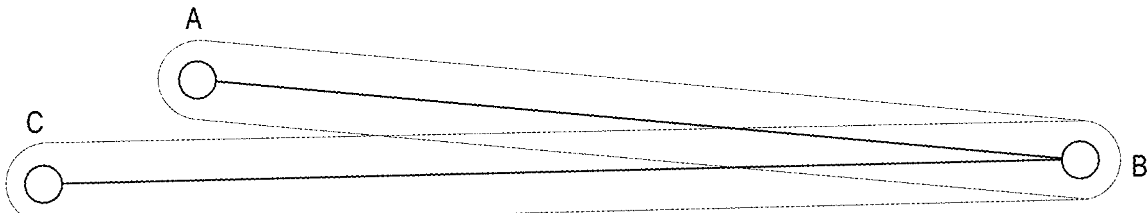
Figure 149A:
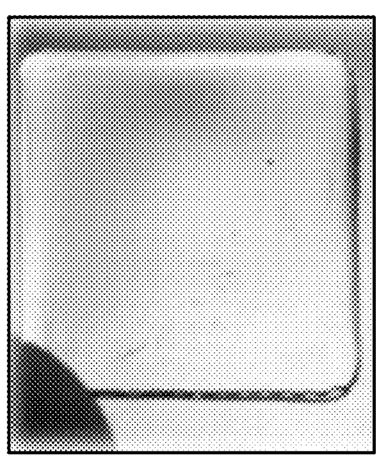
Figure 149B:
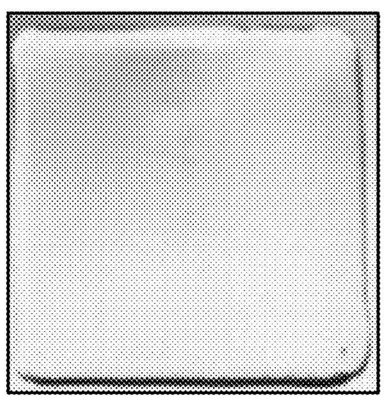
Figure 149C:
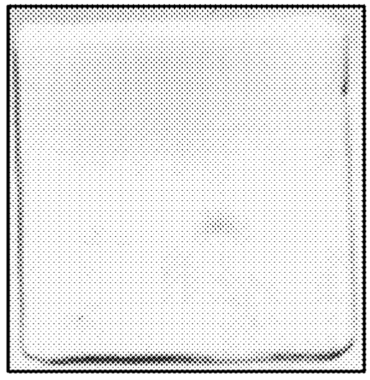
Figure 150A:
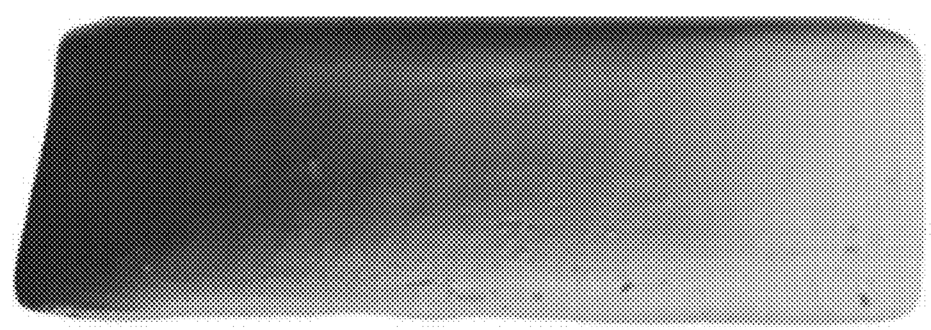
Figure 150B:
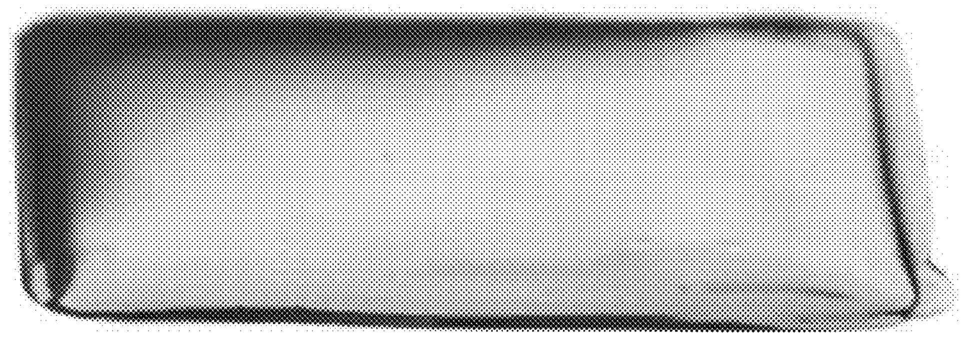
Figure 151B:
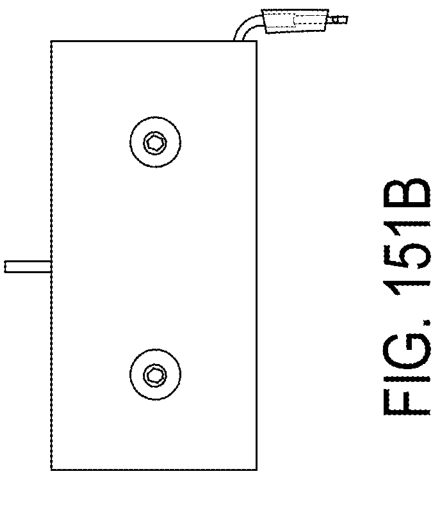
Figure 151D:
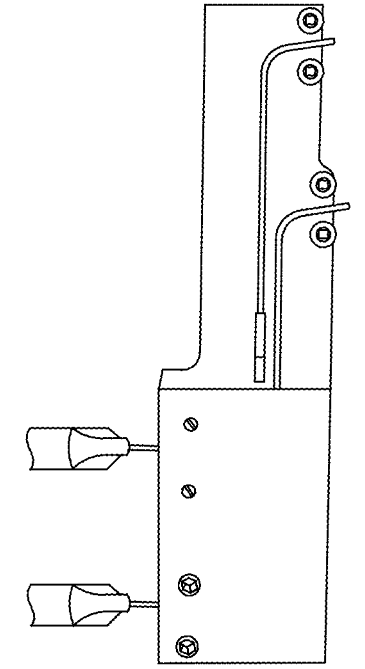
Figure 151A:
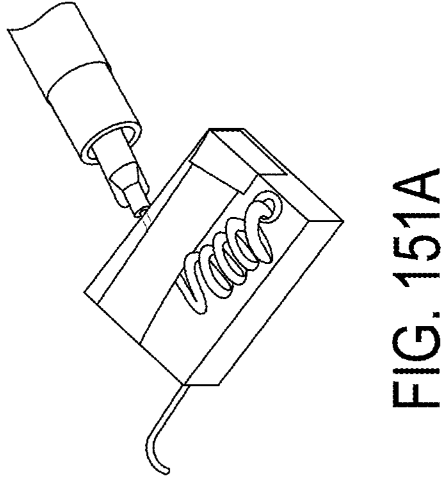
Figure 151C:
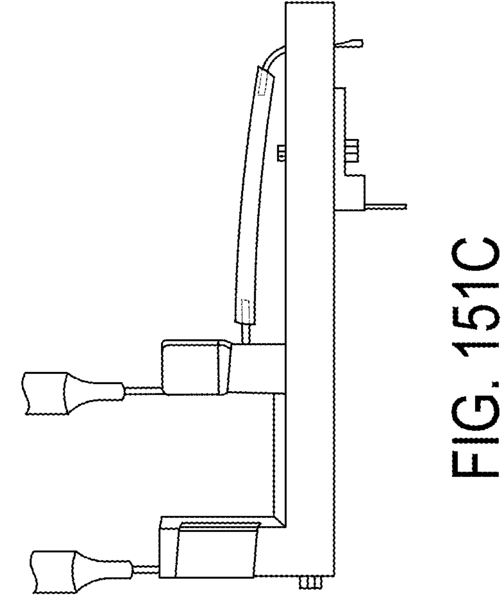
Figure 152:
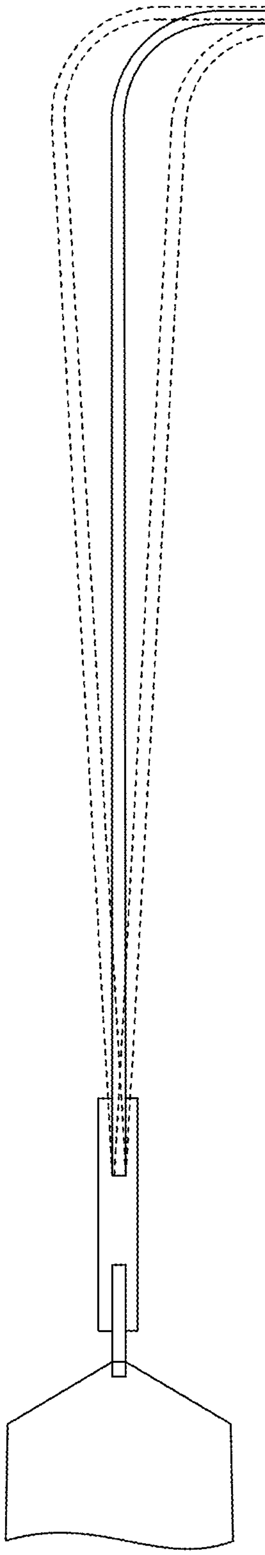
Figure 153:
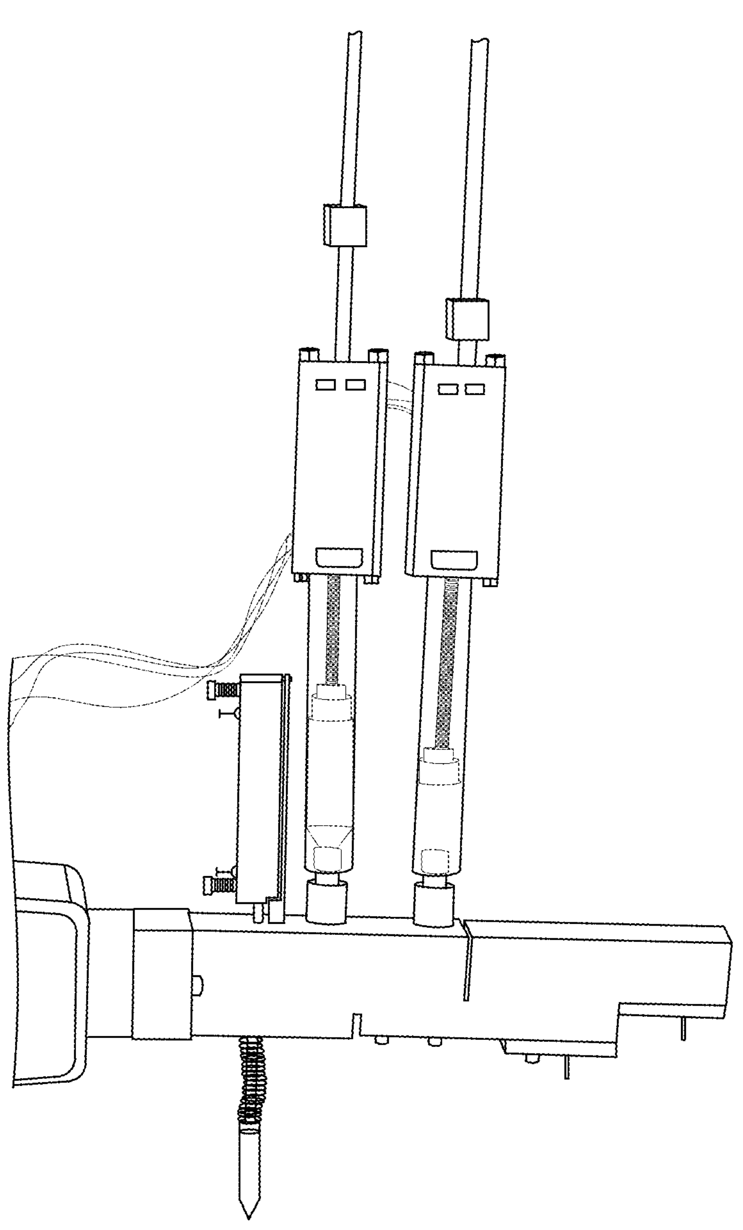
Figure 155:
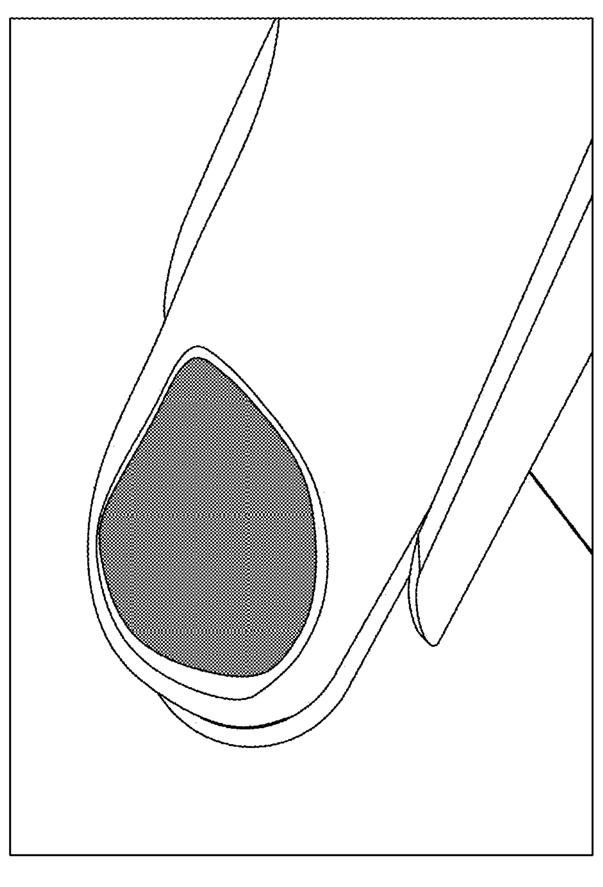
Figure 154:
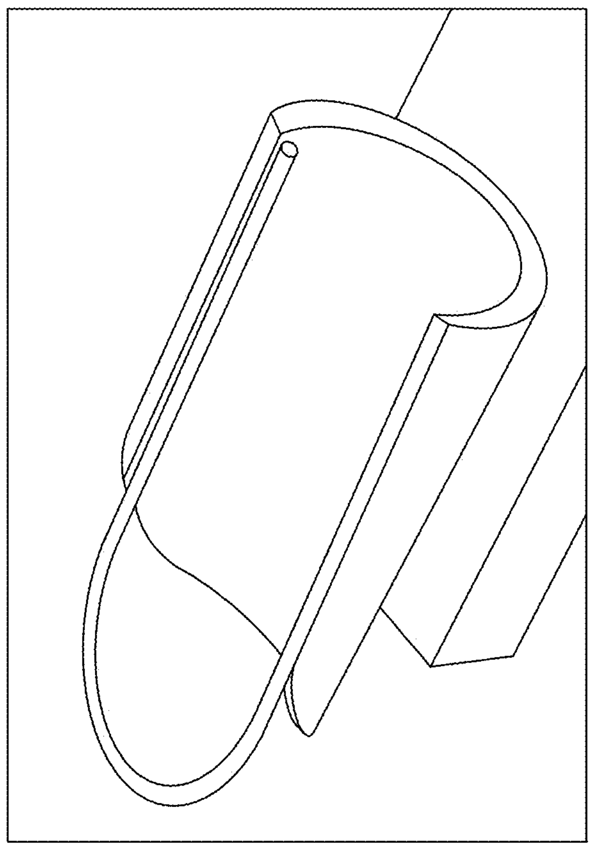
Figure 156B:
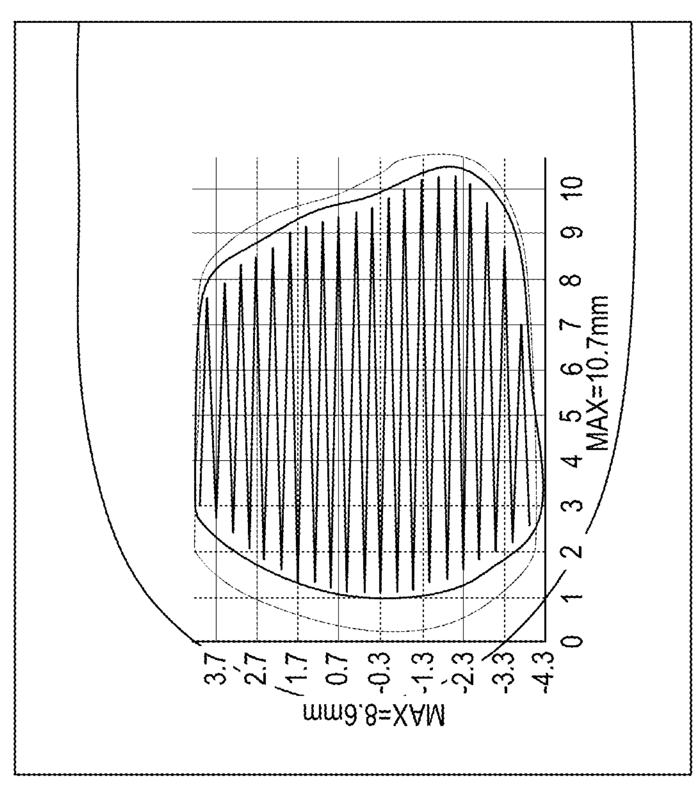
Figure 156A:
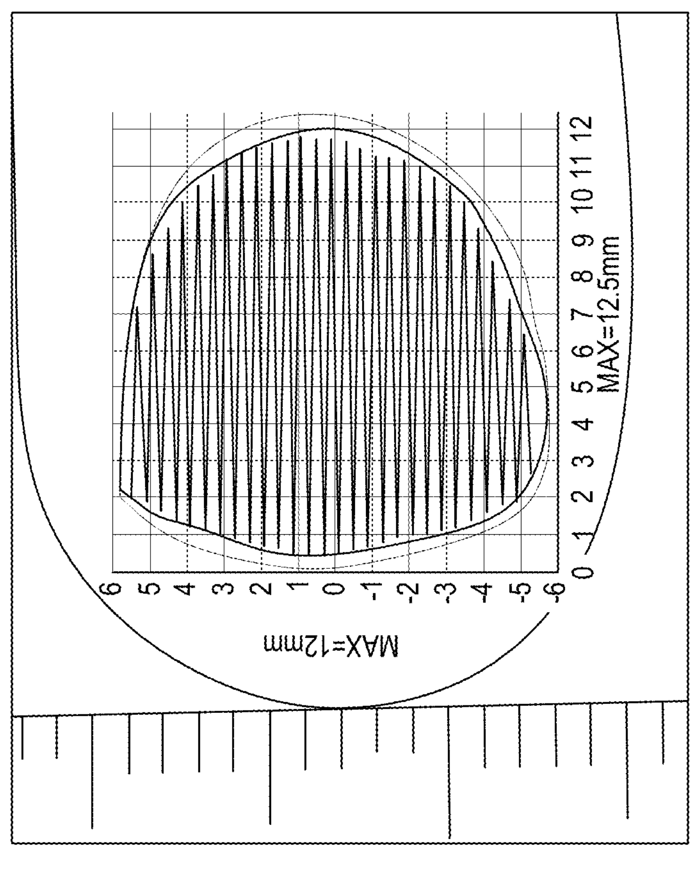
Figure 158:
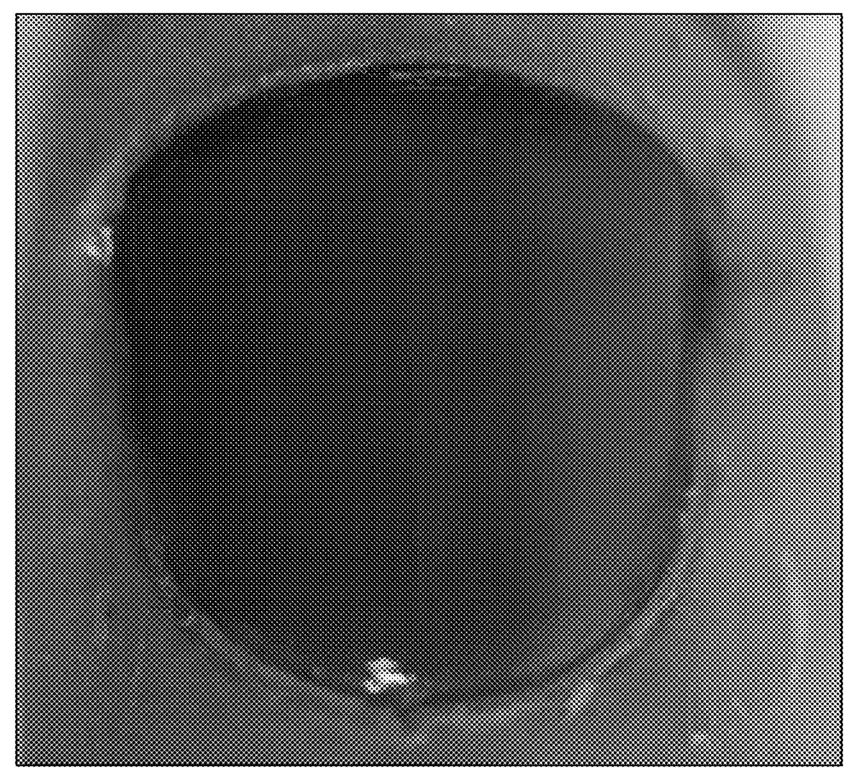
Figure 159:
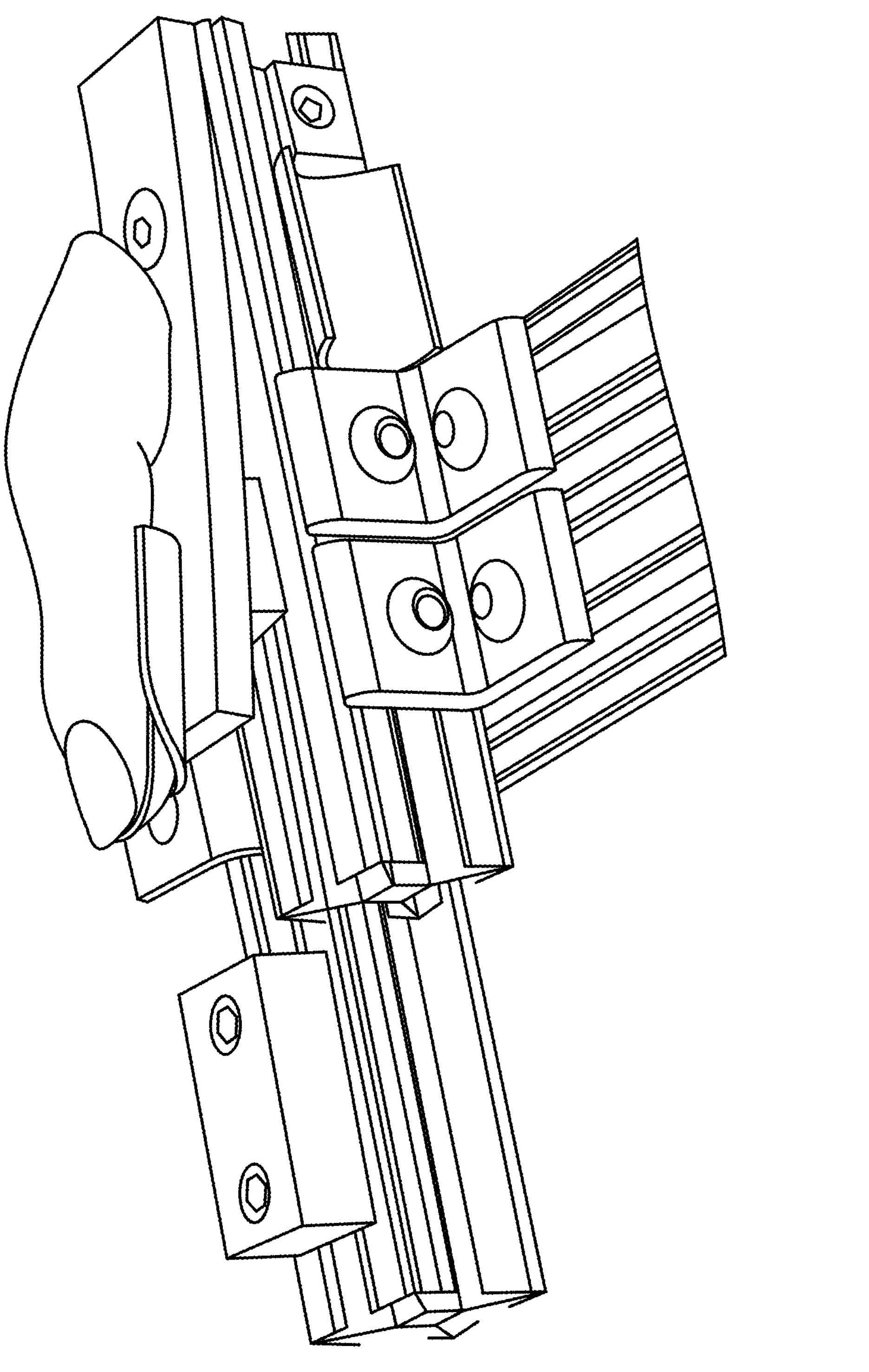
Figure 160A:
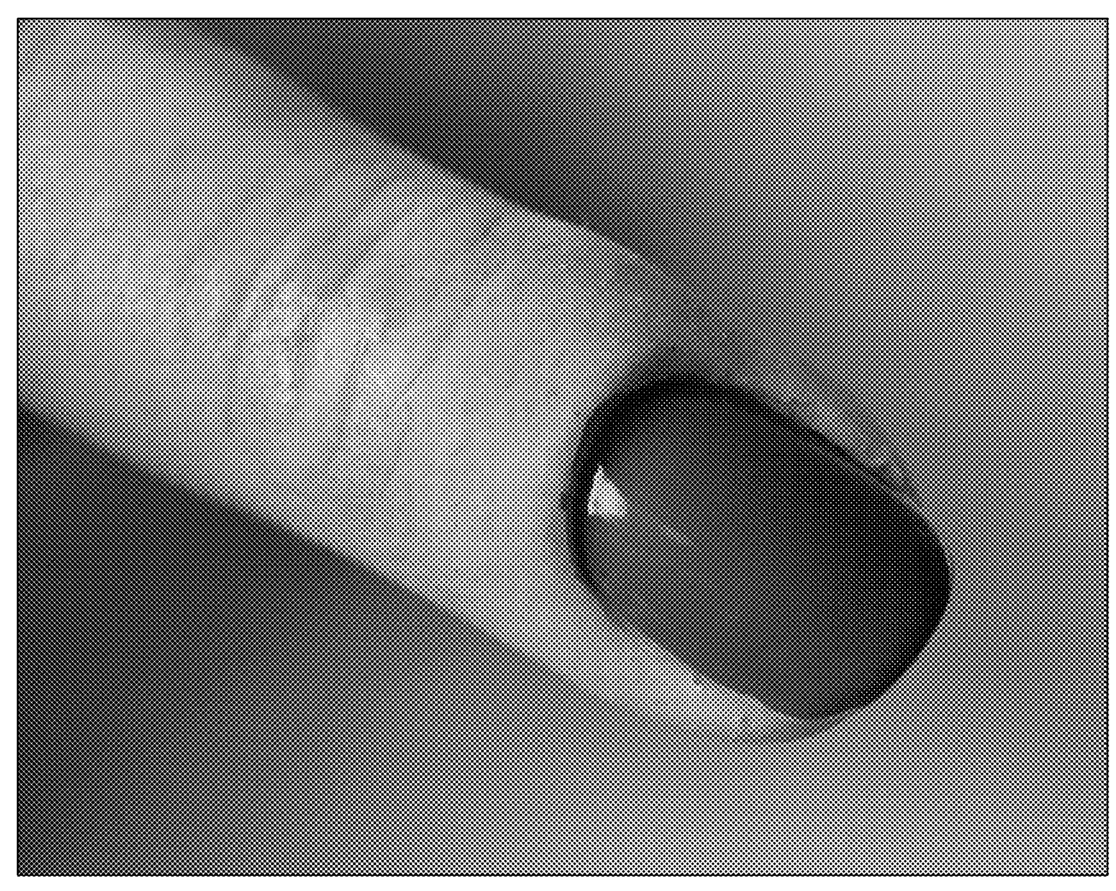
Figure 160B:
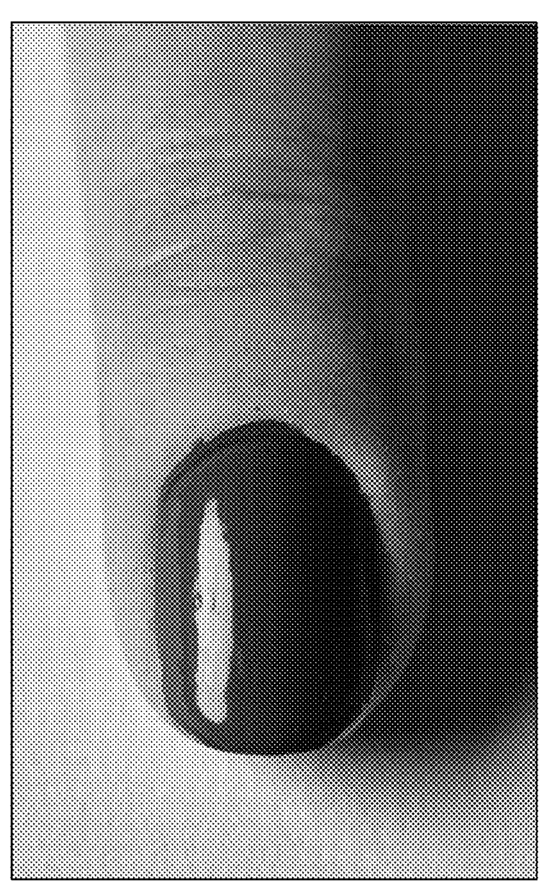
Figure 160C:
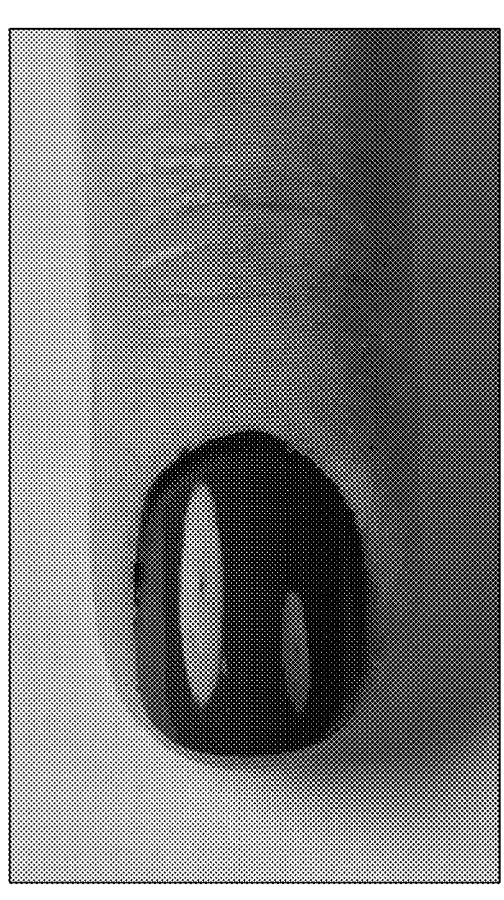
Figure 160D:
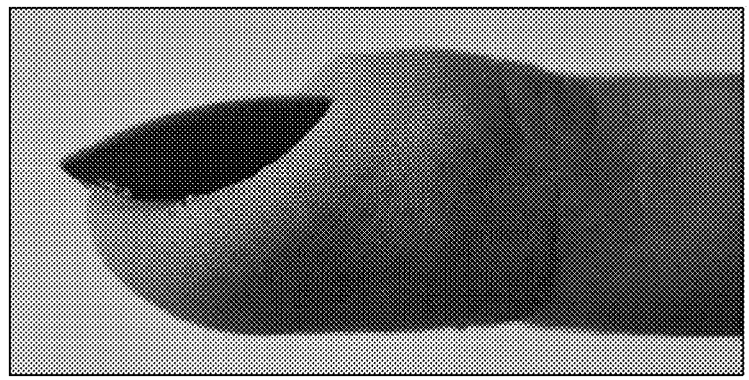
Figures 162A, 162B, 162C, 162D, 162E, 162F, 162G, 162H, 162I:
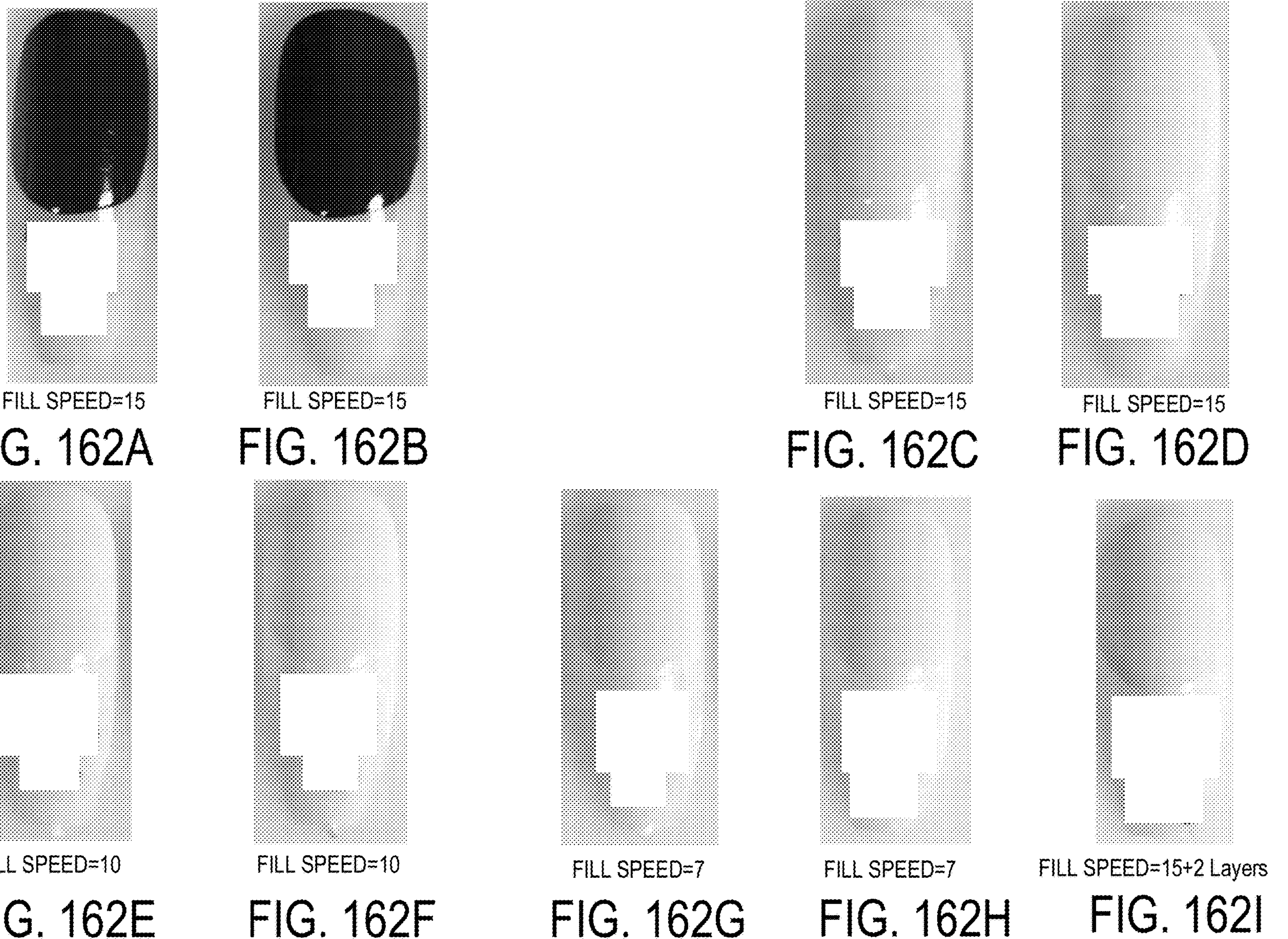
Figure 163:
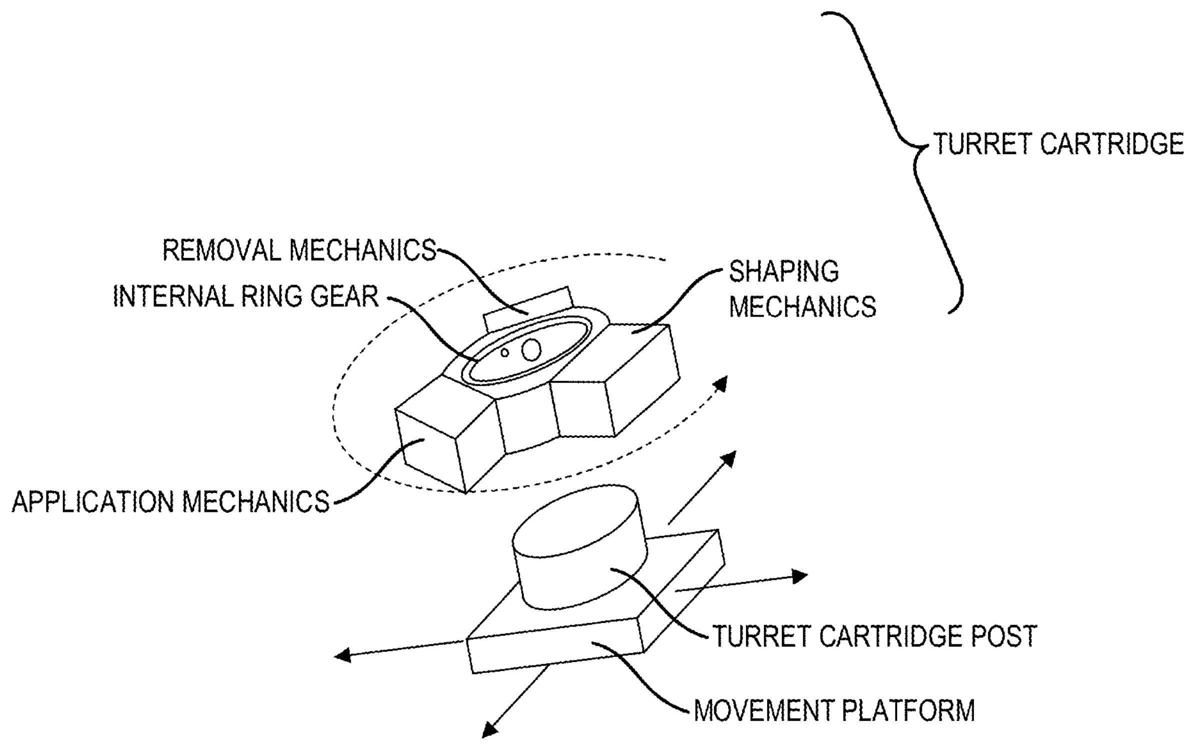
Figure 164:
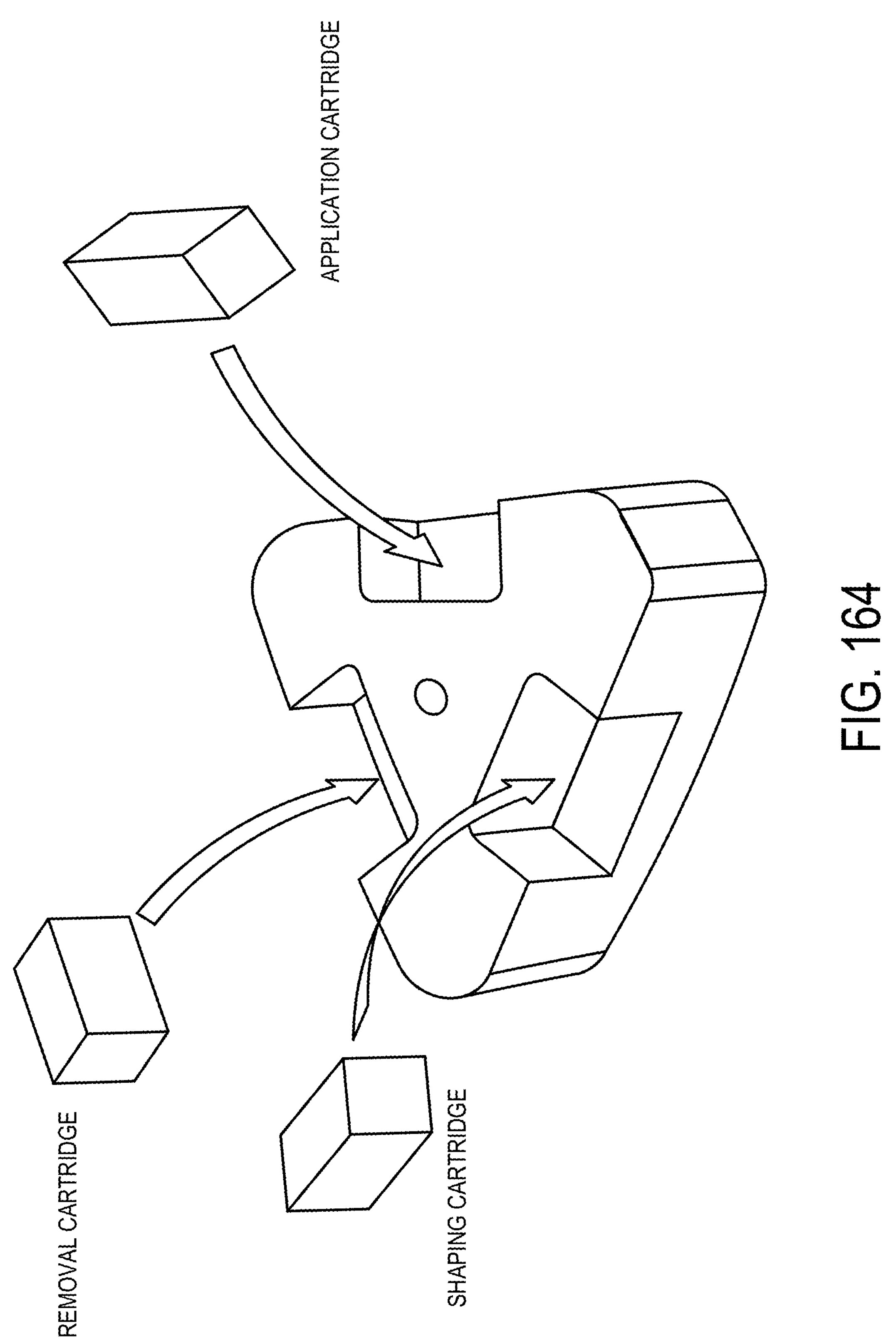
Figure 165:
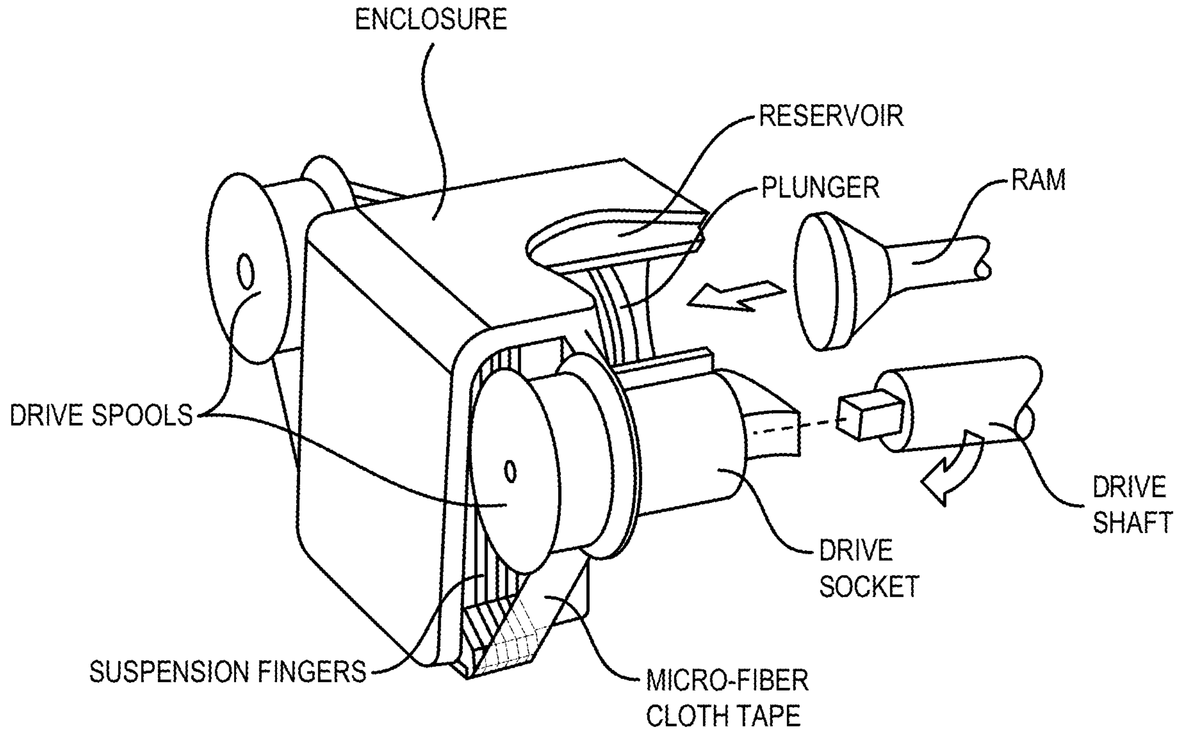
Figure 166:
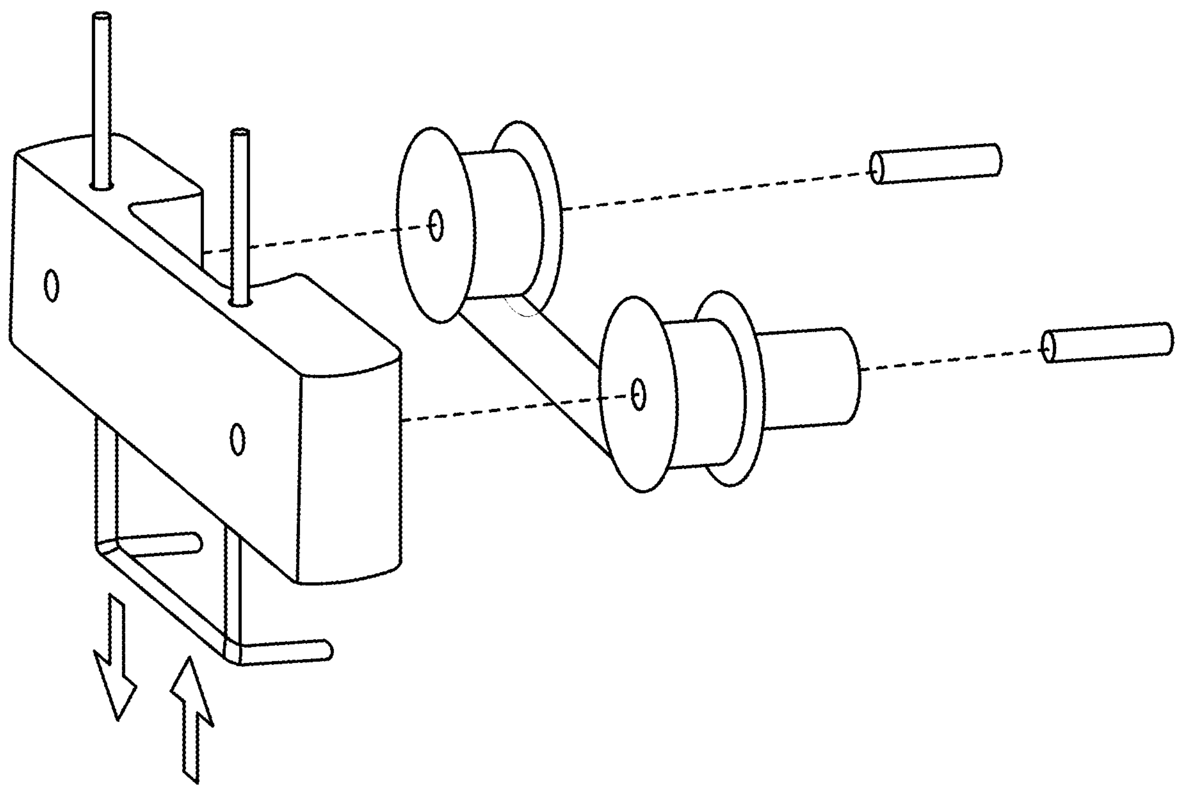
Figure 167:
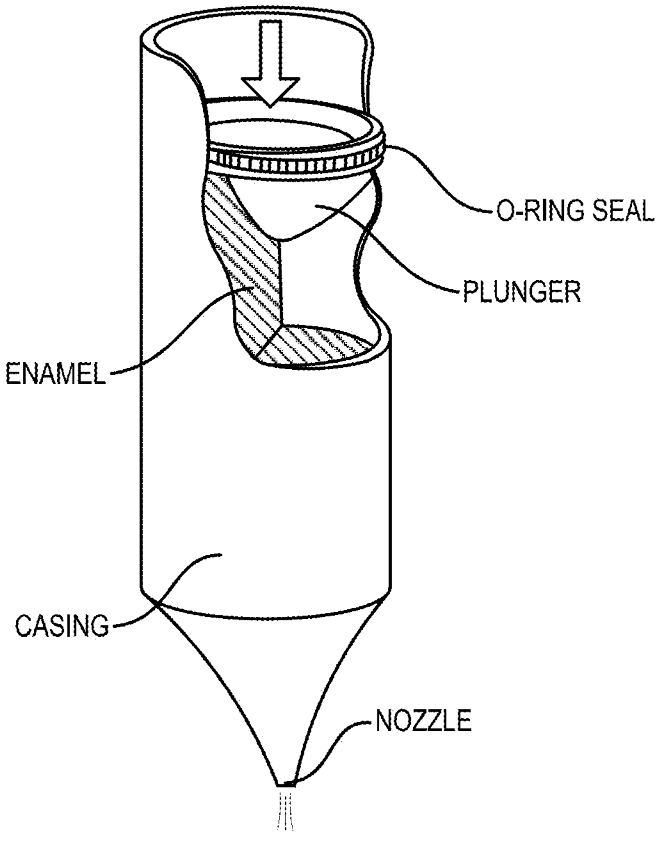
Figure 168:
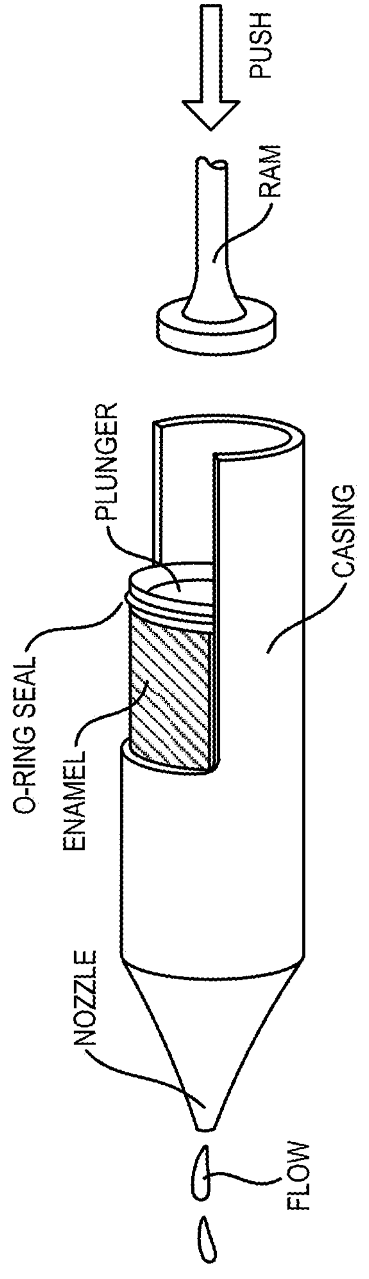
Figure 169:
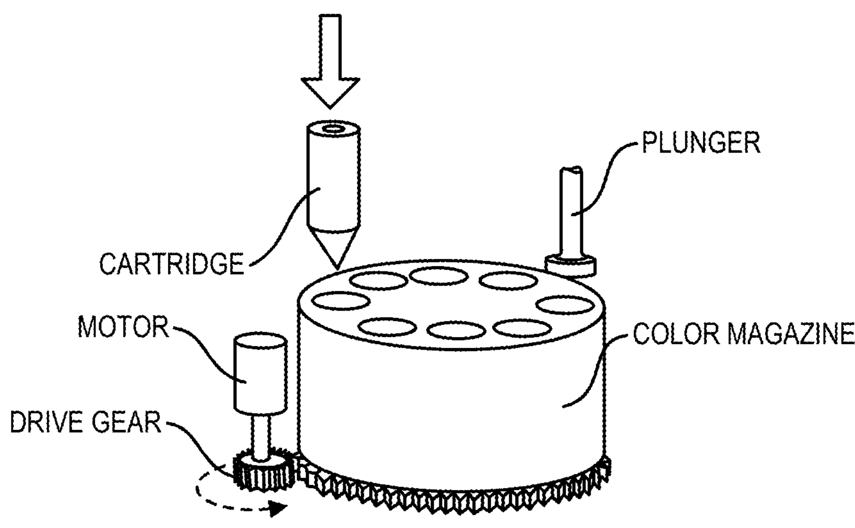
Figure 170:
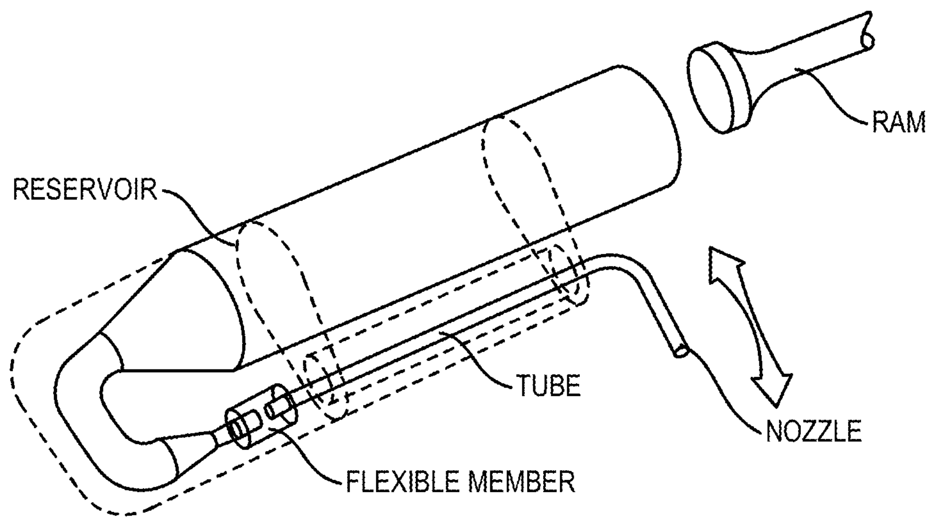
Figure 171:
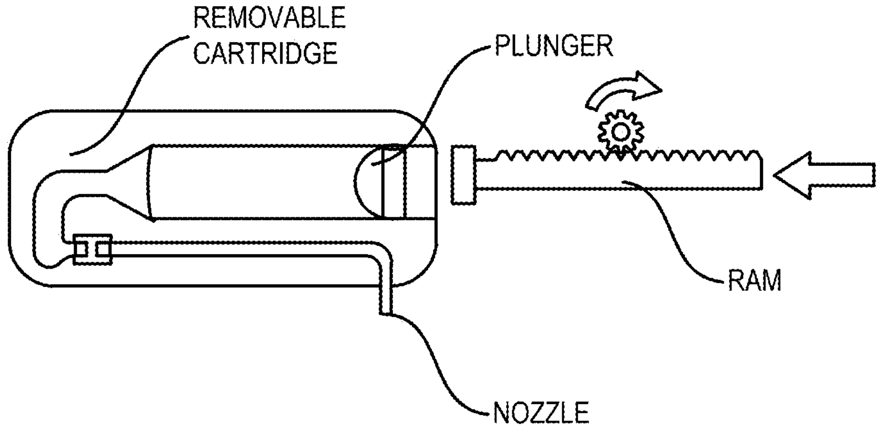
Figure 172:
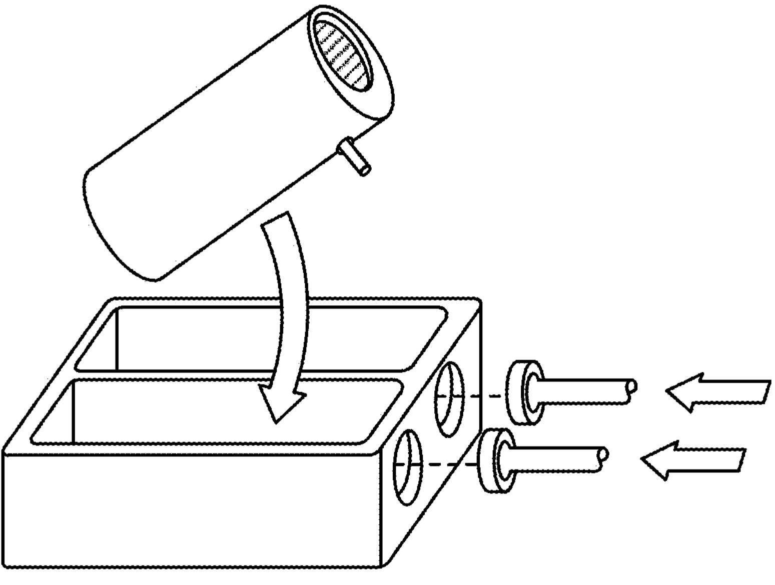
Figure 173A:
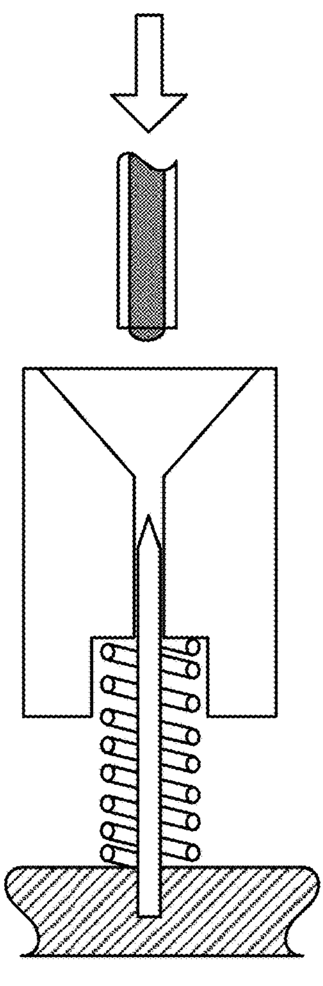
Figure 173B:
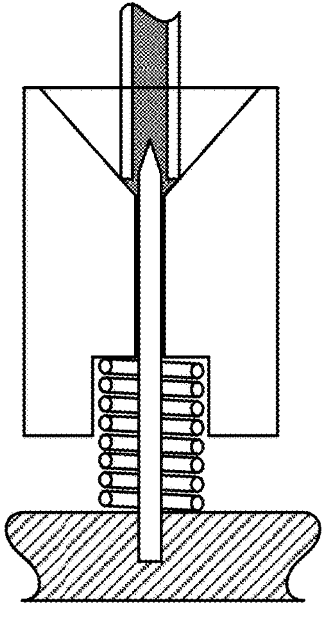
Figure 174A:
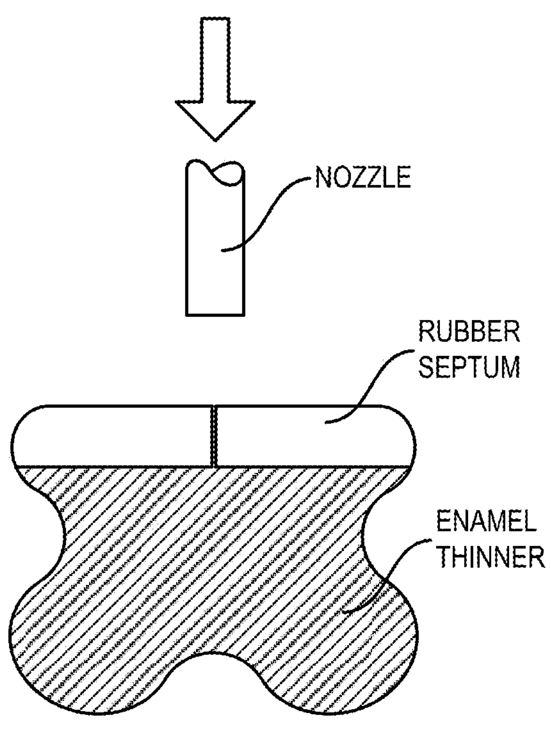
Figure 174B:
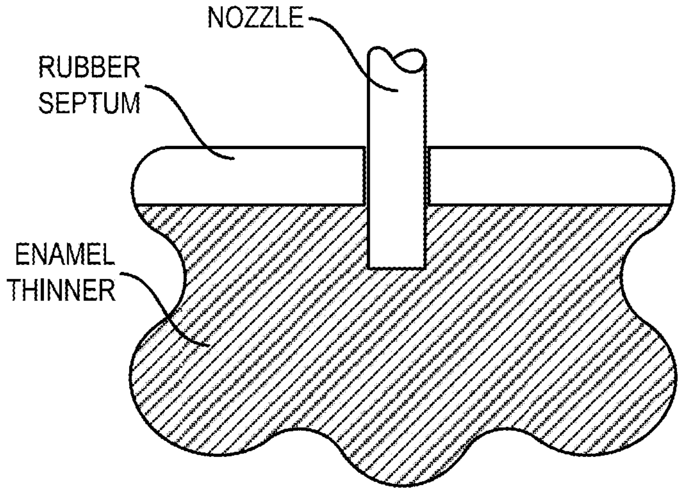
Figure 175A:
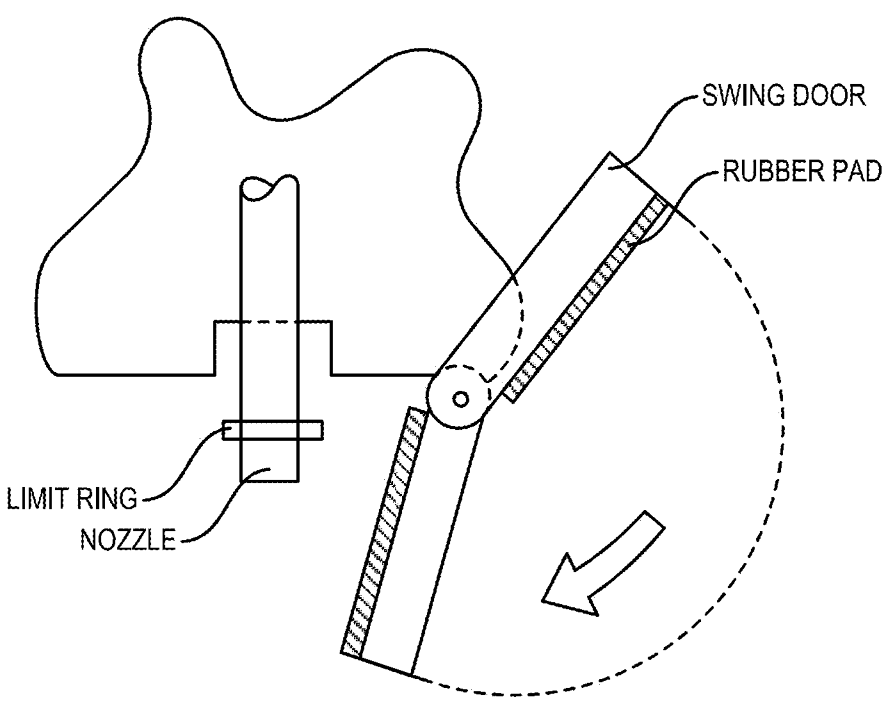
Figure 175B:
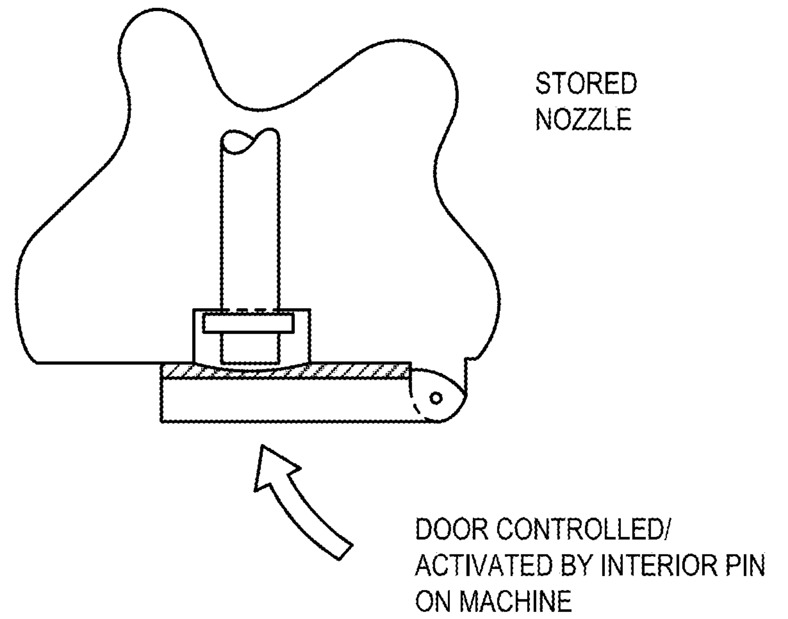
Figure 176:
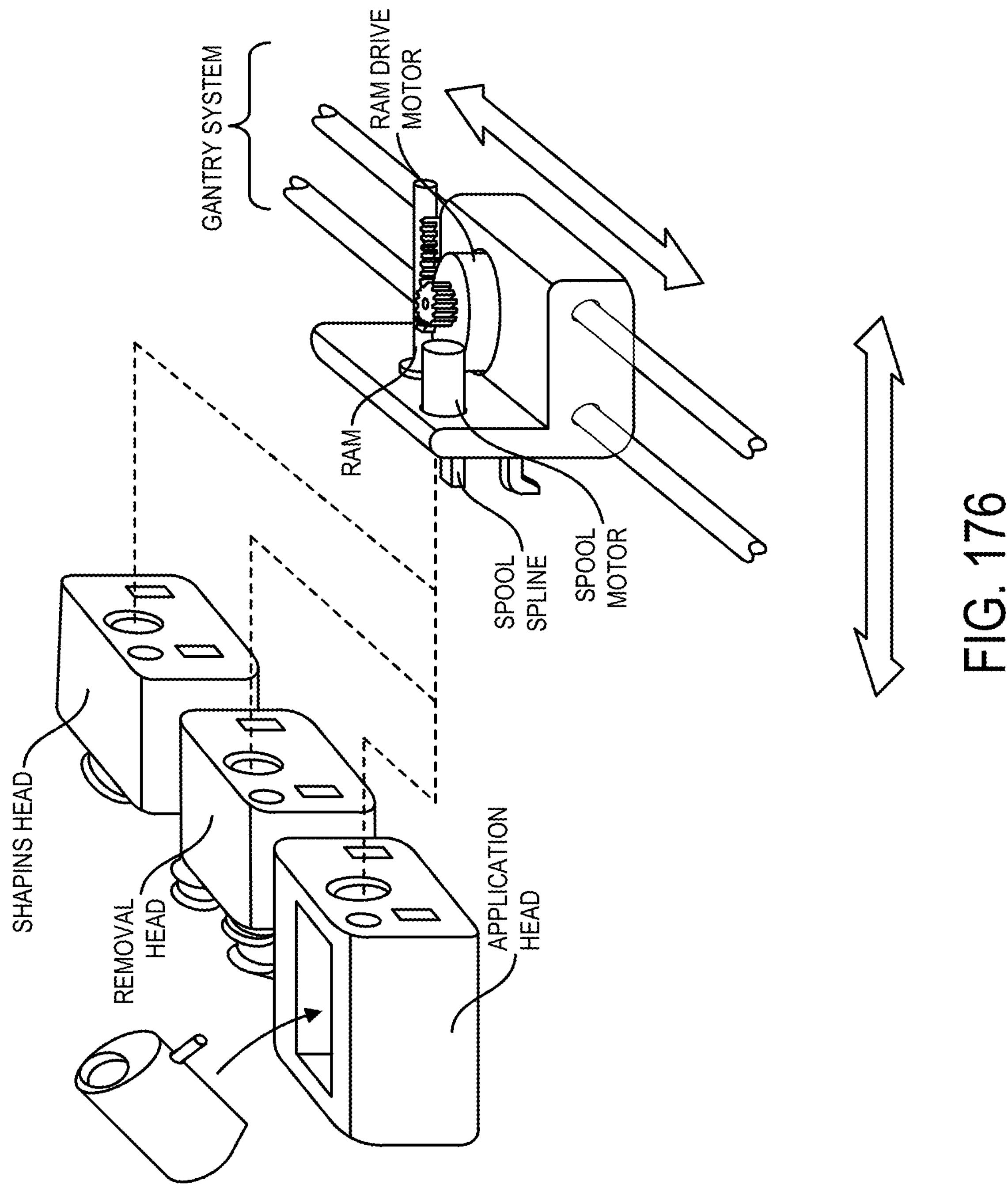
Figure 177:
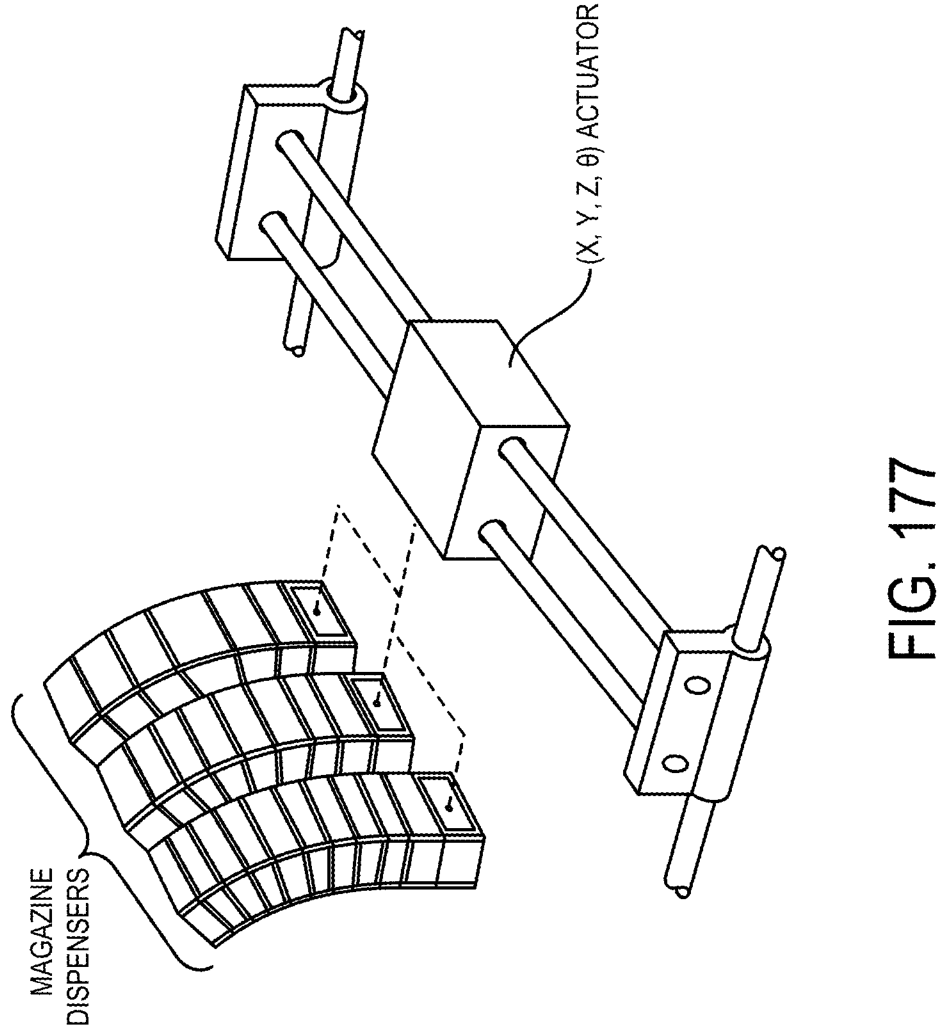
Figure 178:
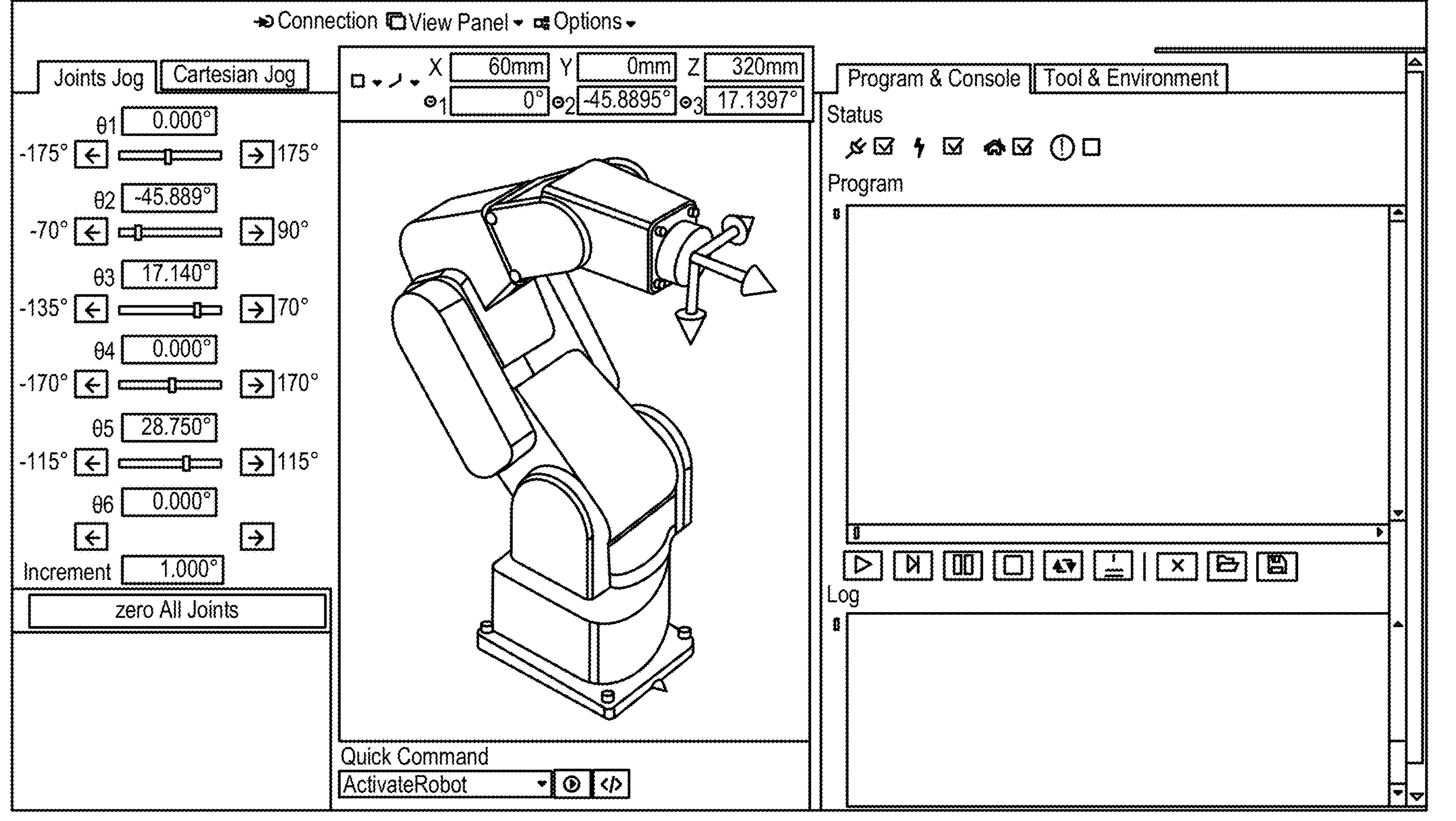
Figure 179:
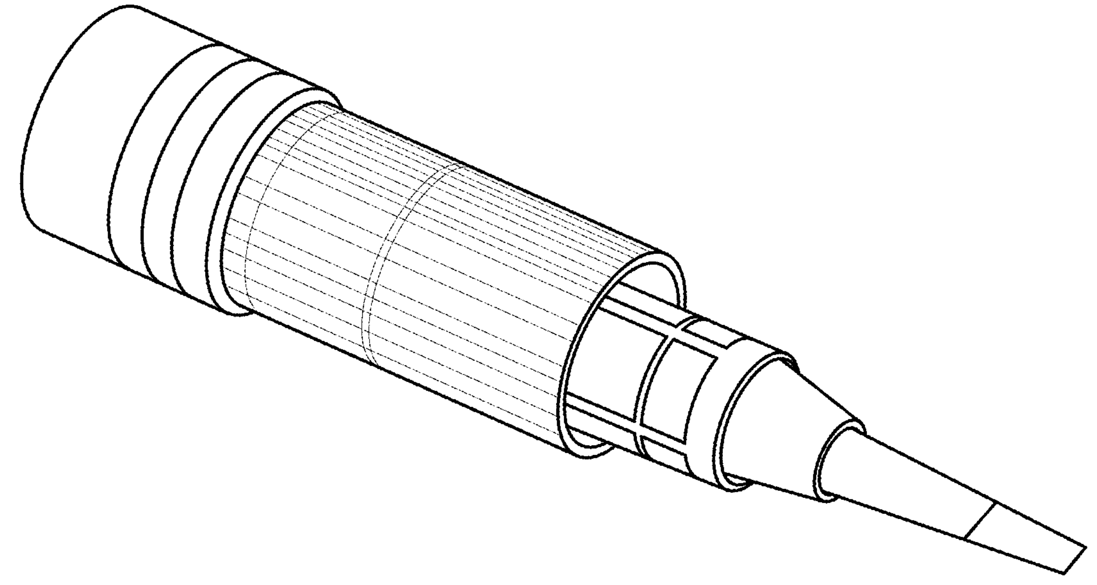
Figures 181D, 181E, 181F, 181G, 181H:
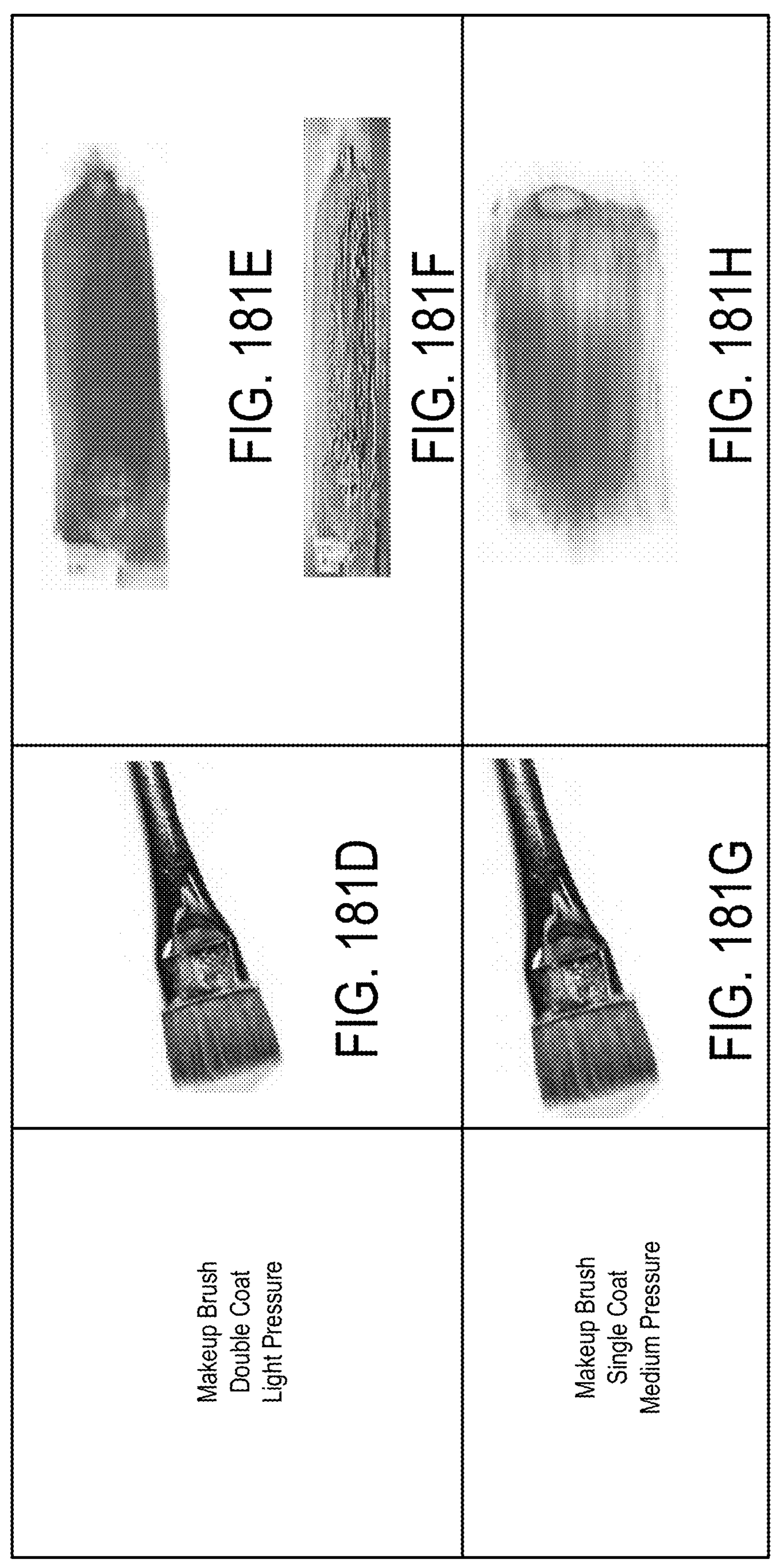
Figures 181I, 181J, 181K, 181L:
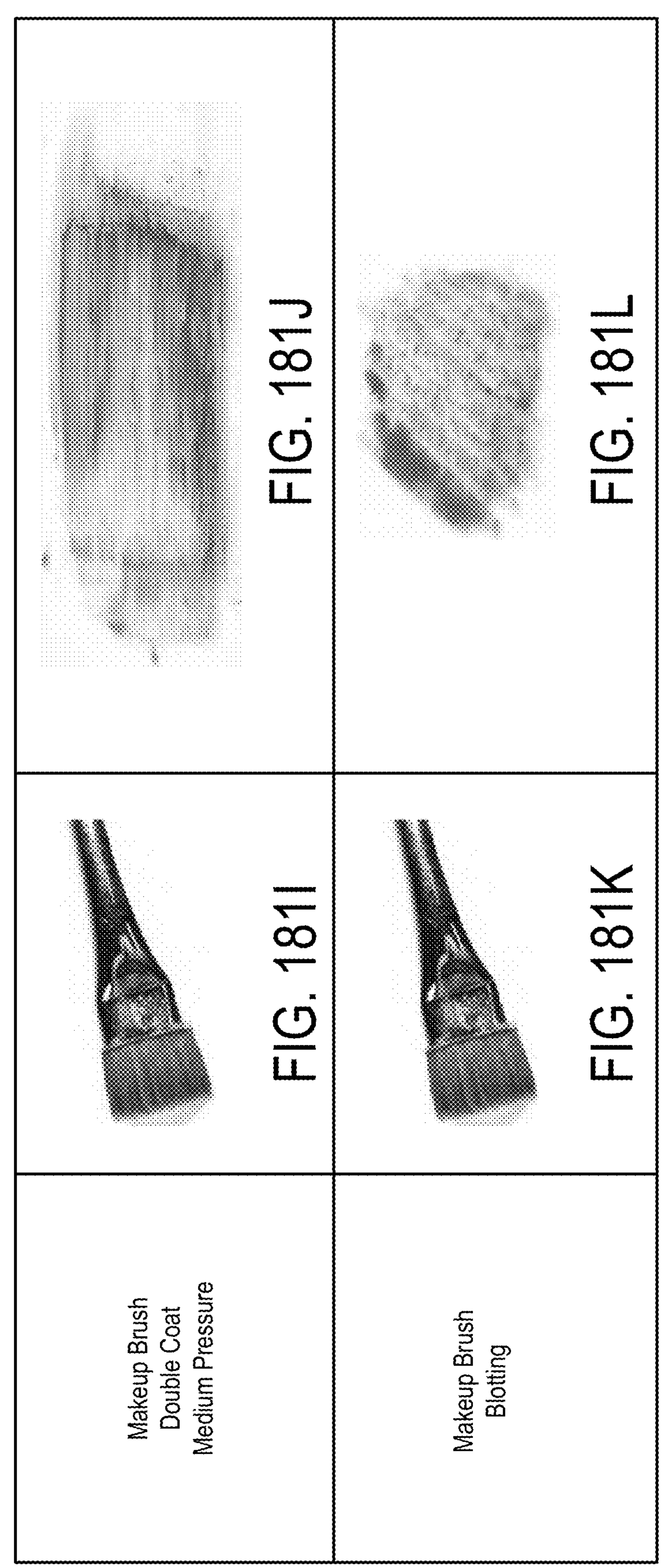
Figure 182:
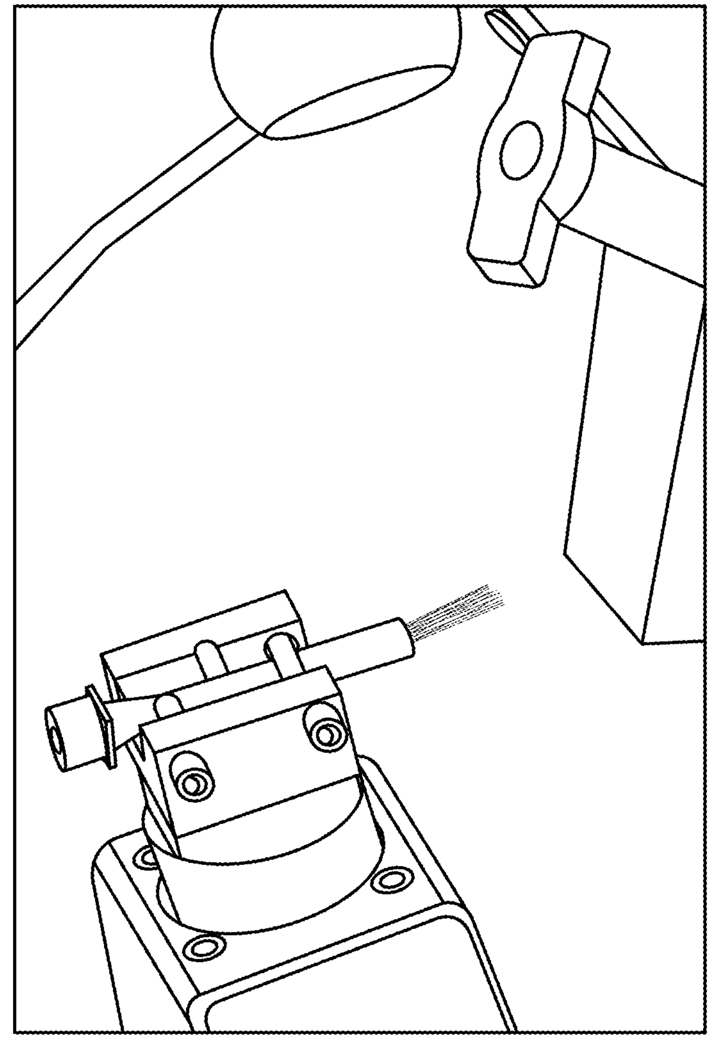
Figure 184A:
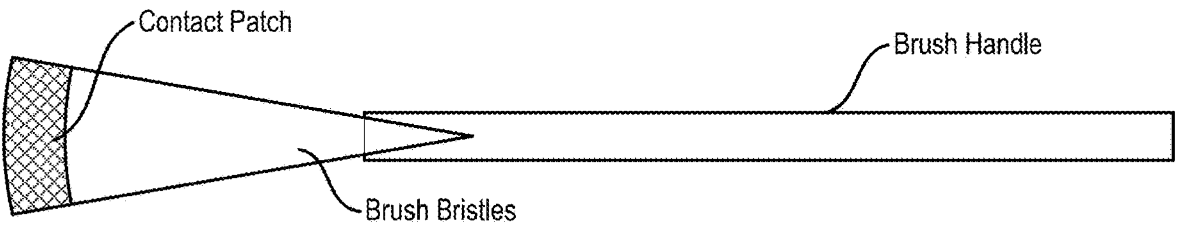
Figure 184B:
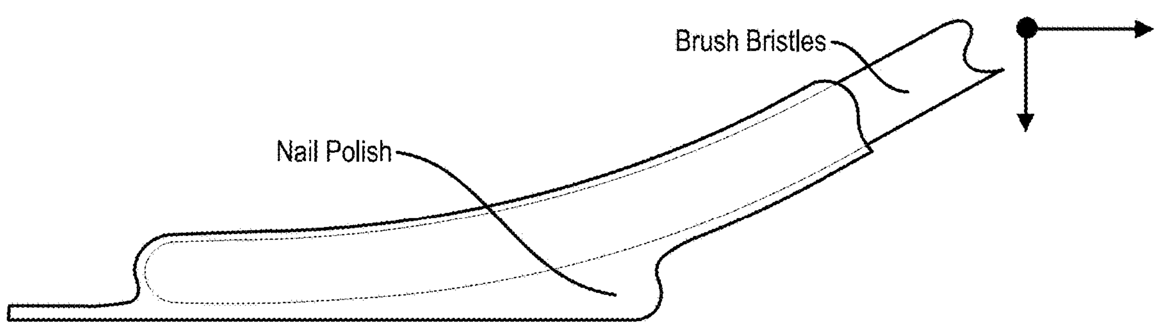
Figure 185A:
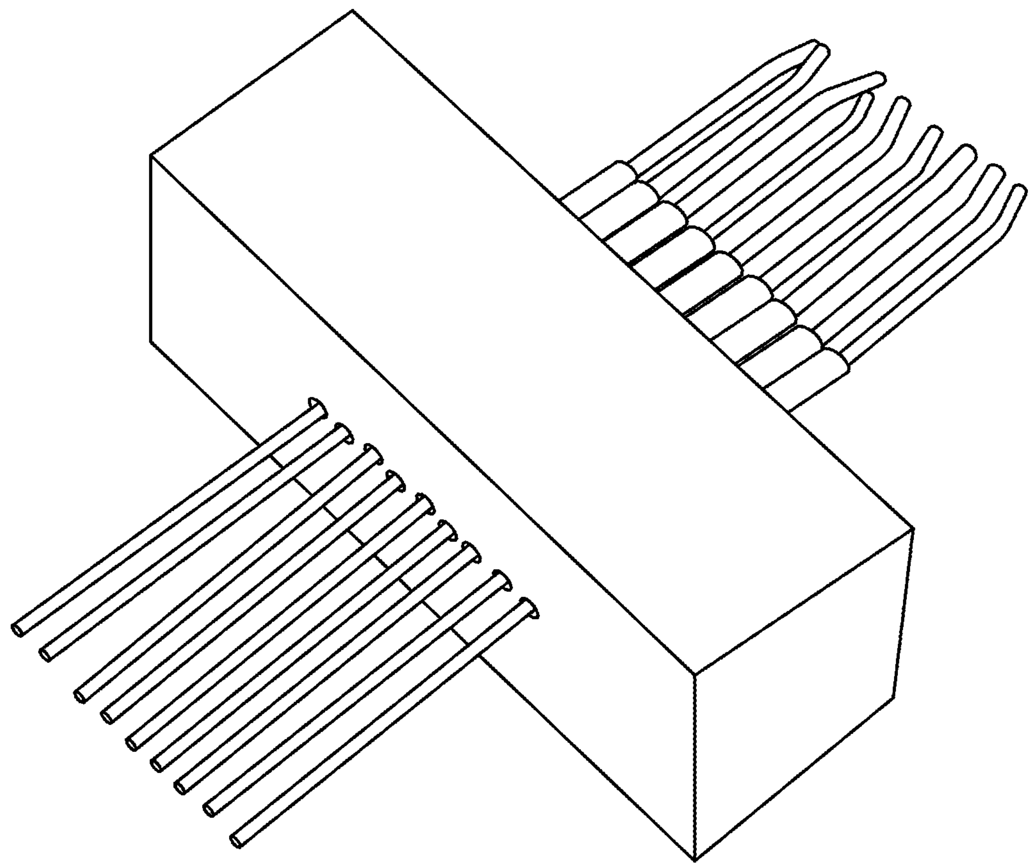
Figure 185B:
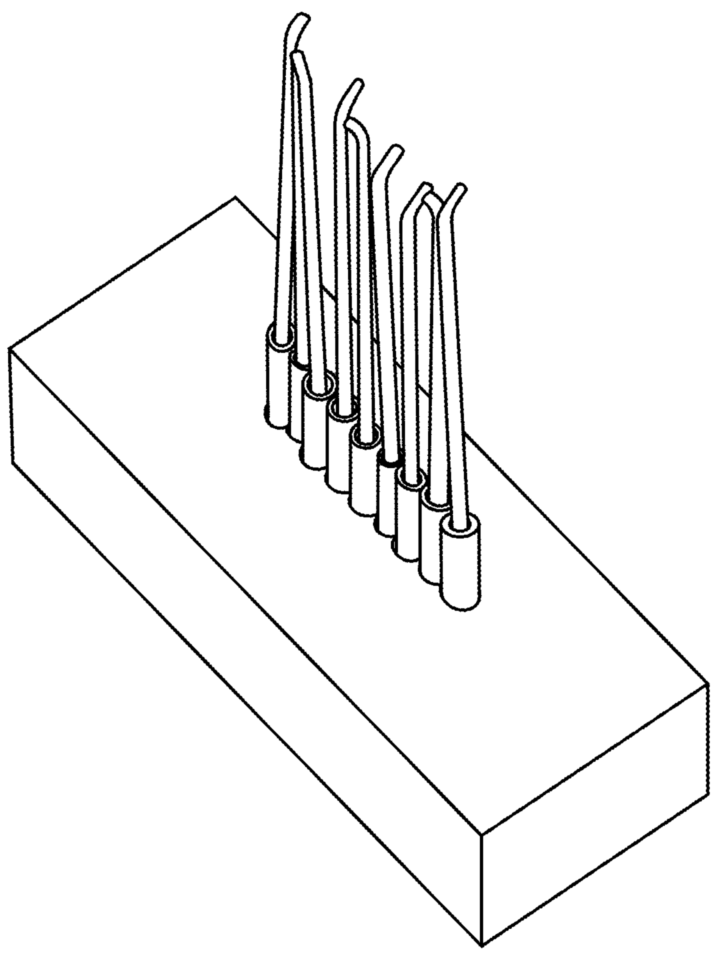
Figures 186A, 186B, 186C, 186D, 186E, 186F, 186G, 186H, 186I:
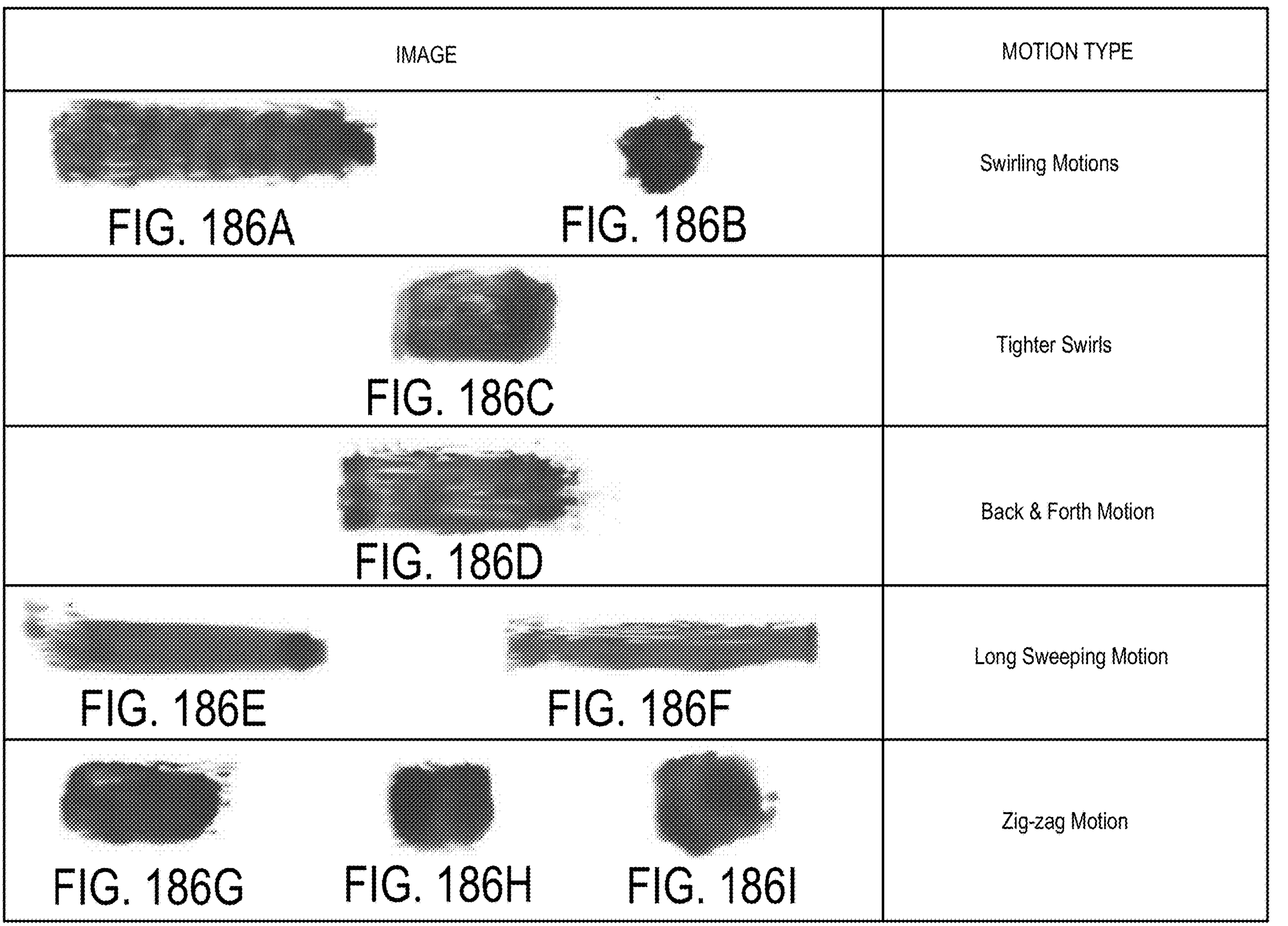
Figures 187G, 187H, 187I, 187J, 187K, 187L:
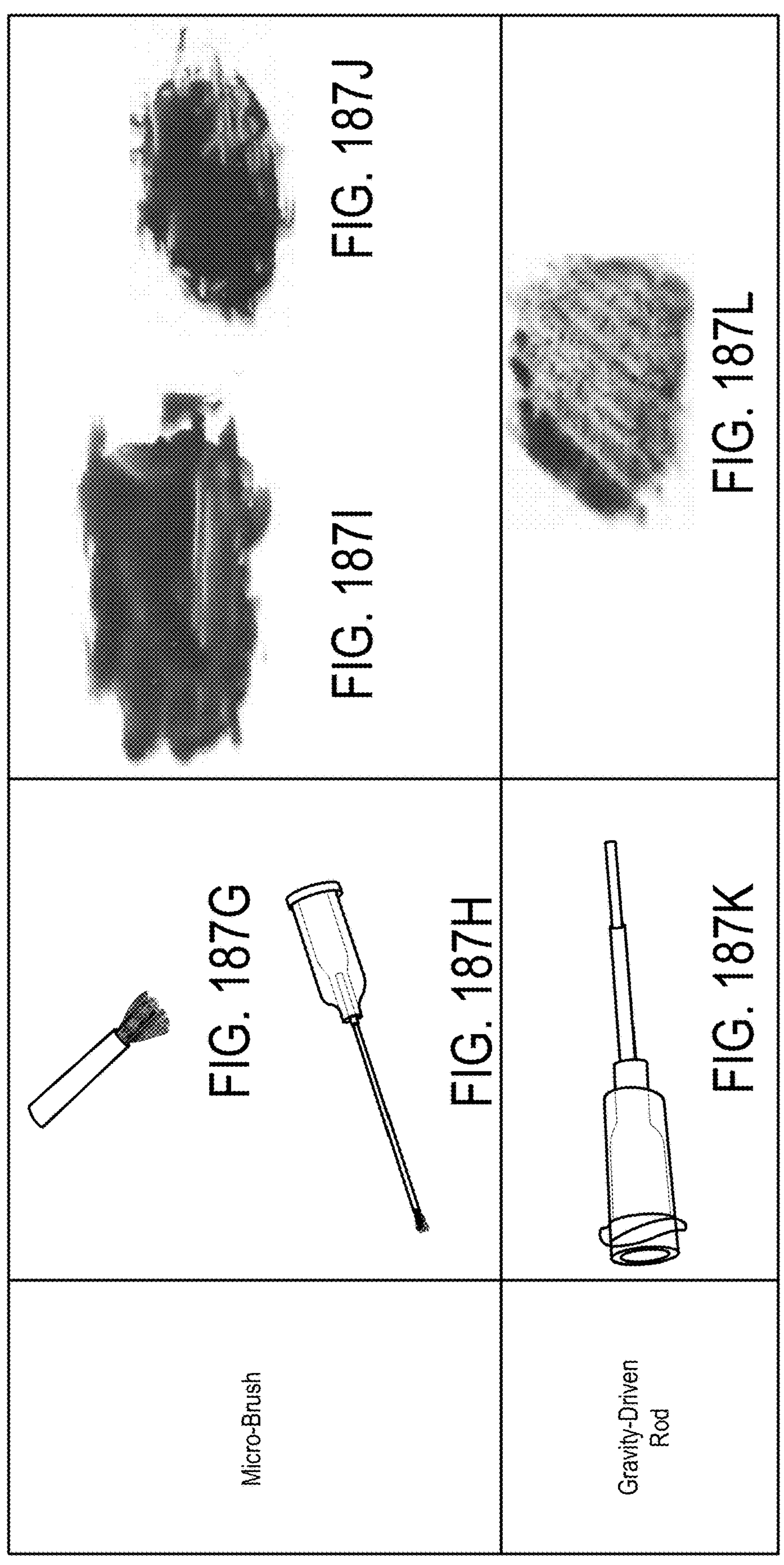
Figures 187M, 187N, 187O, 187P:
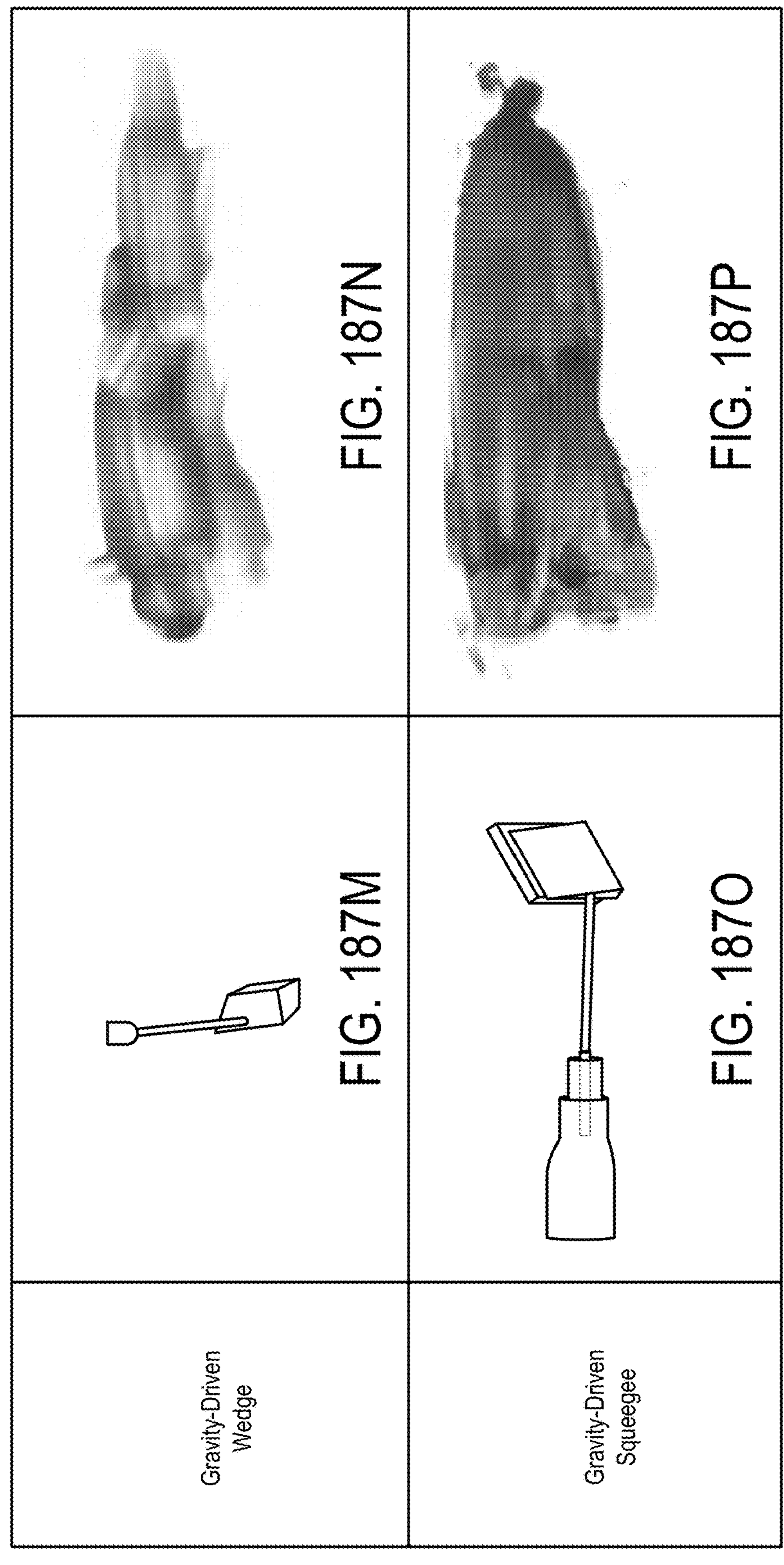
Figures 191A, 191B:
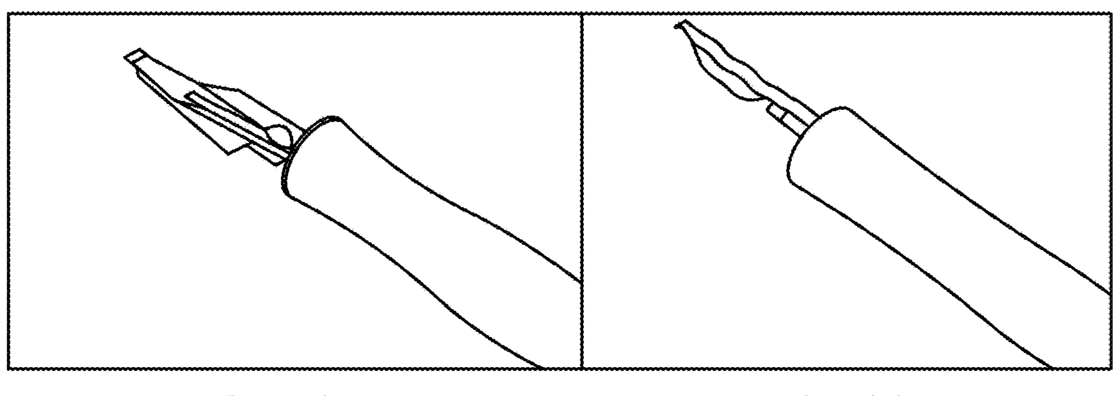
Figures 192A, 192B:
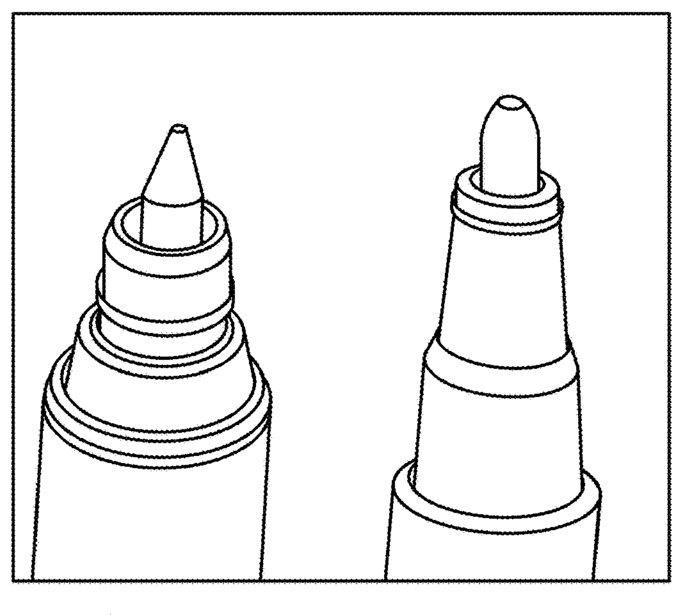
Figure 193A:
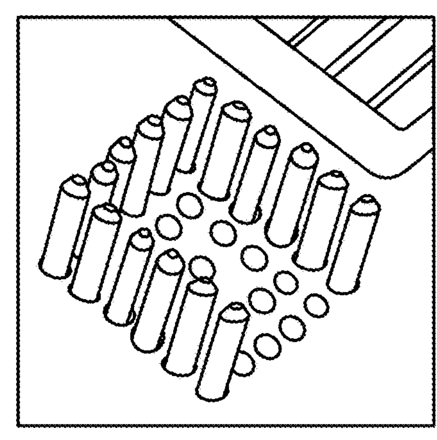
Figure 193B:
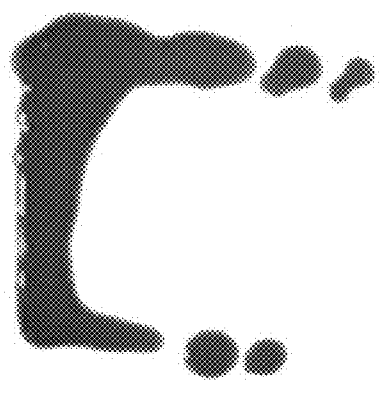
Figures 194A, 194B, 194C:
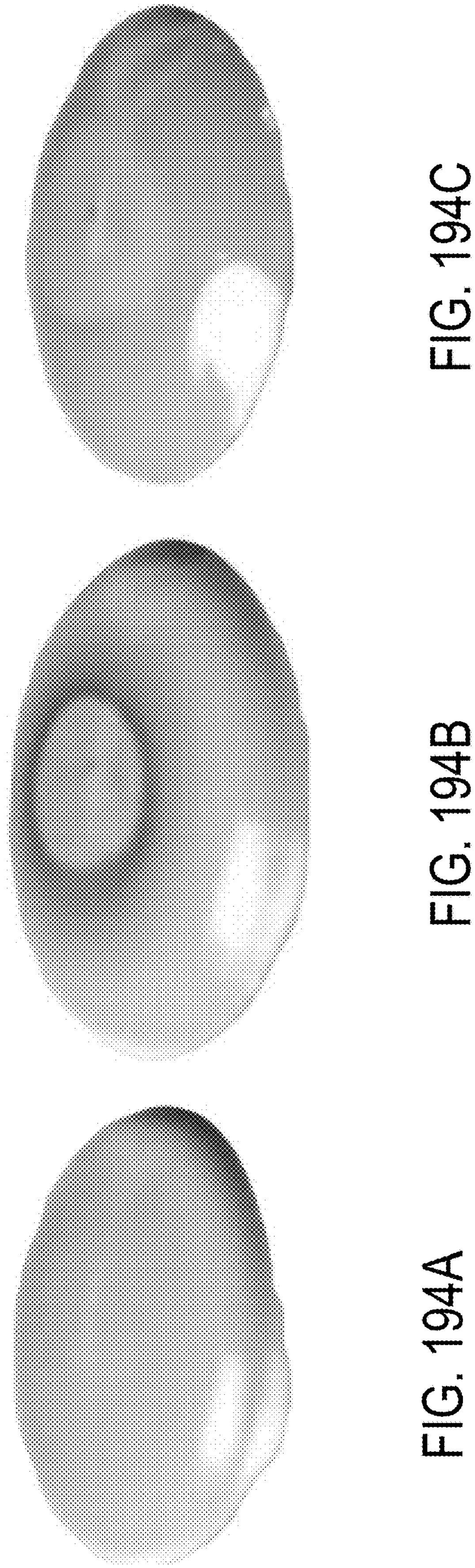
Figure 195C:
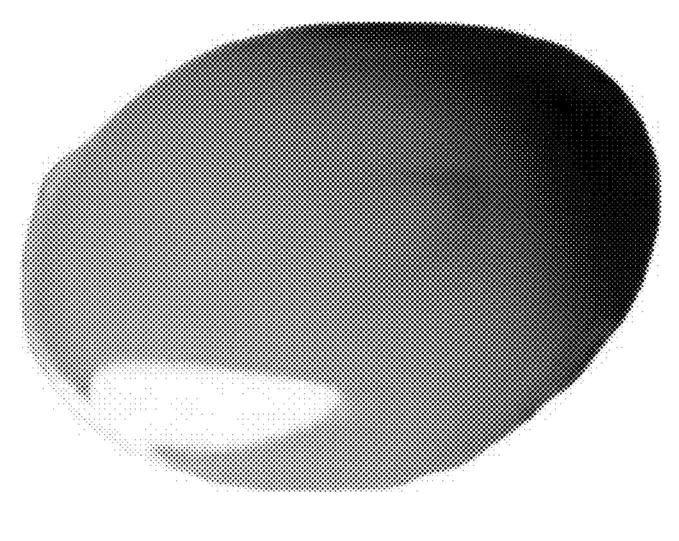
Figure 195B:
Figure 195A:
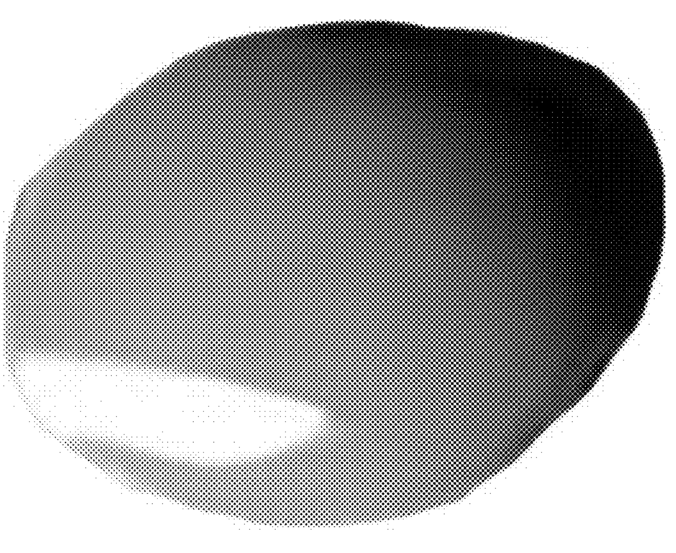
Figure 196:
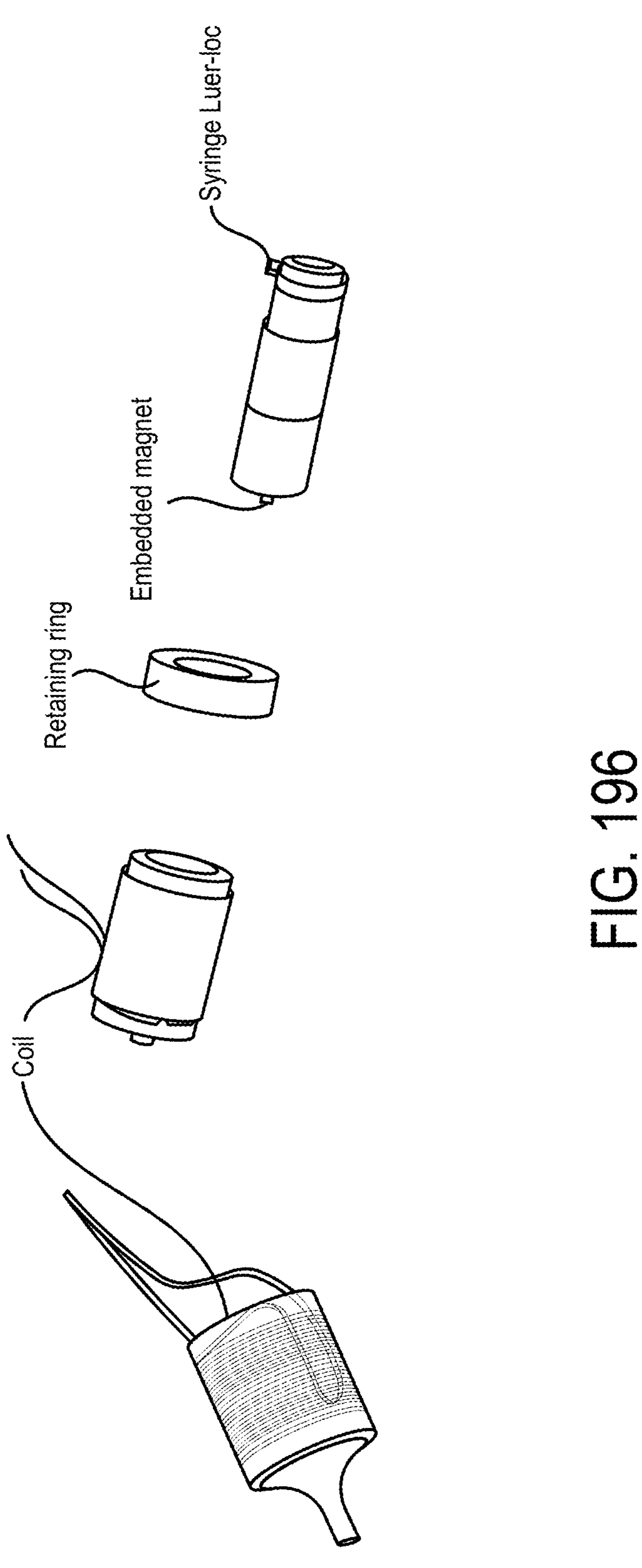
Figure 197A:
Figure 197B:
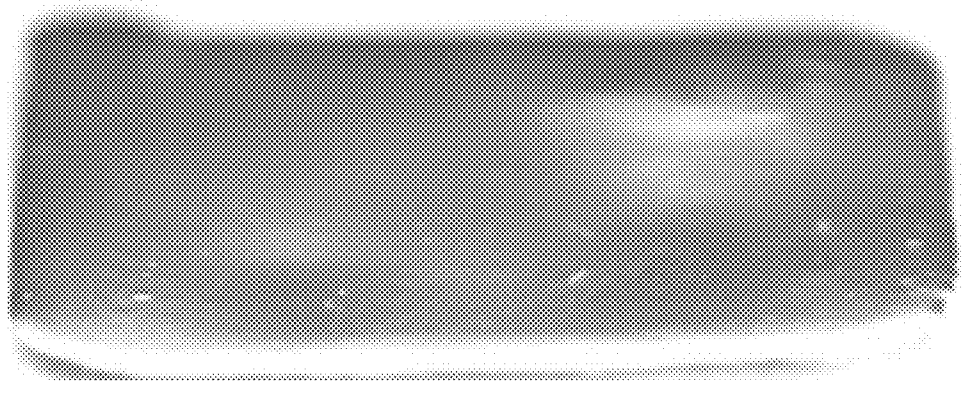
Figure 198:
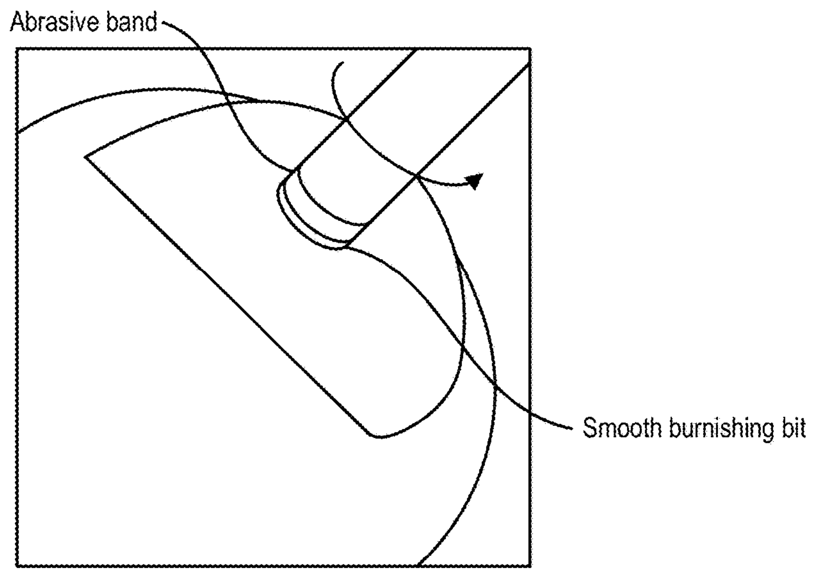
Figure 200:
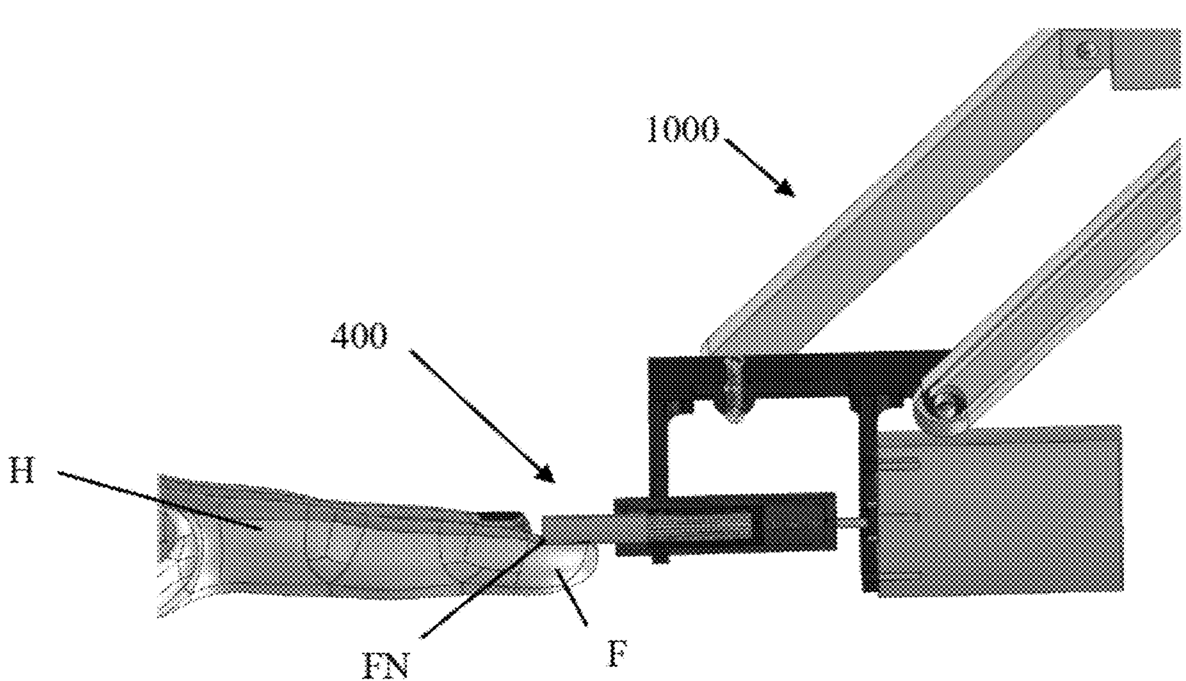
Figures 199A, 199B, 199C, 199D, 199E, 199F, 199G, 199H, 199I, 199J:
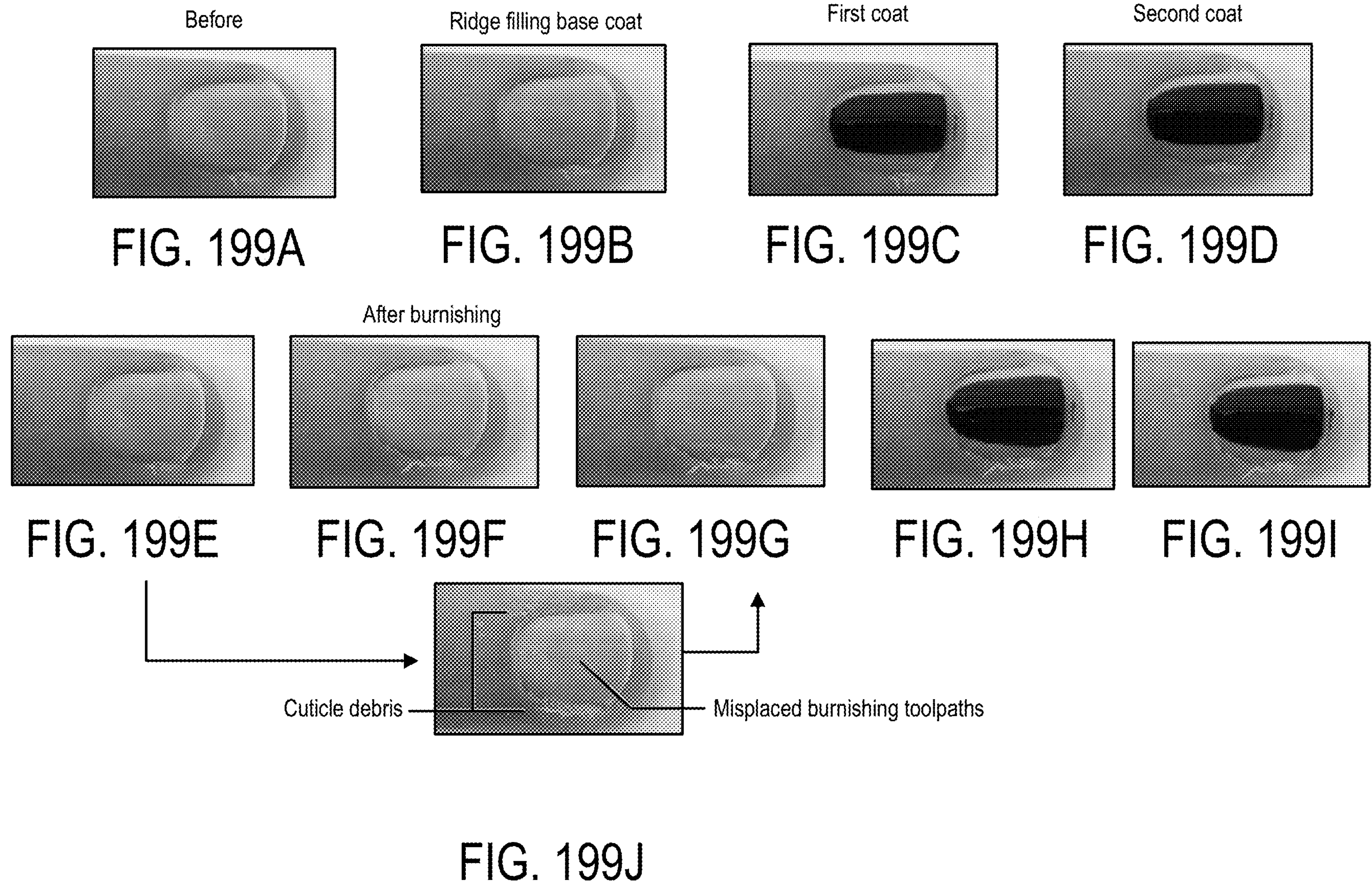

FIG. 72 superimposes the set of all scan lines of the thumb and the nail of the user reinterpreted as best-fit parabolas over a plan view image of the thumb according to an exemplary embodiment;

FIG. 73A is a point cloud rendering of a finger of a user computed by sweep line deformation according to an exemplary embodiment;

FIG. 73B is another point cloud rendering of the finger of the user computed by sweep line deformation according to an exemplary embodiment;

FIG. 74A is a plan view image of a finger of a user according to an exemplary embodiment;

FIG. 74B is a point cloud rendering with data filled in via interpolation and transformed into an image space depth map based on the image of the finger of the user of FIG. 74A according to an exemplary embodiment;

FIG. 75A is a plan view image of a partially painted finger of a user using the structured light technique according to an exemplary embodiment;

FIG. 75B is a point cloud rendering with data filled in via interpolation and transformed into an image space depth map based on the image of the partially painted finger of the user using the structured light technique of FIG. 75A according to an exemplary embodiment;

FIG. 76A is a first plan image of a finger of a user with a camera and the finger in a stationary position under a first lighting condition;

FIG. 76B is a second plan image of the finger of the user with the camera and the finger in the stationary position under a second lighting condition;

FIG. 76C is a third plan image of the same under a third lighting condition;

FIG. 76D is a fourth plan image of the same under a fourth lighting condition;

FIG. 76E is a fifth plan image of the same under a fifth lighting condition;

FIG. 76F is a sixth plan image of the same under a sixth lighting condition;

FIG. 76G is a seventh plan image of the same under a seventh lighting condition;

FIG. 76H is an eighth plan image of the same under an eighth lighting condition;

FIG. 77A is a schematic view of the capture apparatus of the vision system rotating about the finger of the user, in which a stationary camera takes an image illuminated by a plurality of light sources rotated approximately about an axis through the finger according to an exemplary embodiment;

FIG. 77B is a schematic view of a capture apparatus of the vision system including a plurality of light sources arranged in a grid on a substrate about an aperture for a lens of the capture apparatus according to an exemplary embodiment;

FIG. 78 is an uncalibrated normal map of a finger of a user generated using plan view images captured from the capture apparatus of the vision system of FIG. 77A rotating about the finger of the user according to an exemplary embodiment;

FIG. 79A is a calibrated normal map of the finger of the user generated using plan view images captured from the capture apparatus of the vision system of FIG. 77A rotating about the finger of the user according to an exemplary embodiment;

FIG. 79B is a calibrated normal map of an artificial test finger generated using plan view images captured from the capture apparatus of the vision system of FIG. 77A rotating about the artificial test finger according to an exemplary embodiment;

FIG. 80A is a calibrated normal map of a finger of the user generated using plan view images captured from the capture apparatus of the vision system of FIG. 77B including the plurality of light sources arranged in the grid according to an exemplary embodiment;

FIG. 80B is a calibrated normal map of another finger of the user generated using plan view images captured from the capture apparatus of the vision system of FIG. 77B including the plurality of light sources arranged in the grid according to an exemplary embodiment;

FIG. 81 is a depiction of a portion of a finger of a user represented by planar components of normals represented as a vector-field and using color coding to represent three-dimensional information regarding each vector, according to an exemplary embodiment;

FIG. 82A is a plan view image of the artificial test finger according to an exemplary embodiment;

FIG. 82B is the plan view image of FIG. 82A analyzed using Holistically-Nested Edge Detection (HED) according to an exemplary embodiment;

FIG. 82C is the plan view image of FIG. 82A analyzed using initial region segmentation according to an exemplary embodiment;

FIG. 83A is a plan view image of a finger according to an exemplary embodiment;

FIG. 83B is the plan view image of FIG. 83A analyzed using HED according to an exemplary embodiment;

FIG. 83C is the plan view image of FIG. 83A analyzed using initial region segmentation according to an exemplary embodiment;

FIG. 84 is a diagram of a finger including sections of interest of the nail and finger and a comparison of the effectiveness of various analysis methods in accurately detecting and differentiating the sections of interest according to an exemplary embodiment;

FIG. 85A is a plan view image of a nail having a length shorter than that of the finger, in which a fingertip boundary is fully inferred from a fingernail estimate according to an exemplary embodiment;

FIG. 85B is a plan view image of a nail having a length longer than that of the finger, in which a fingertip boundary is partially inferred from the fingernail estimate according to an exemplary embodiment;

FIG. 86A is an image of a back of a finger illuminated with white light according to an exemplary embodiment;

FIG. 86B is a depiction of the back of the finger illuminated with white light of FIG. 86A and analyzed with edge detection according to an exemplary embodiment;

FIG. 86C is a depiction of the back of the finger of FIG. 86A illuminated with ultraviolet light and analyzed with edge detection according to an exemplary embodiment;

FIG. 87A is a plan view image of a finger illuminated with white light according to an exemplary embodiment;

FIG. 87B is a depiction of the finger illuminated with white light of FIG. 87A and analyzed with edge detection according to an exemplary embodiment;

FIG. 88A is a perspective image of a finger illuminated with white light according to an exemplary embodiment;

FIG. 88B is a depiction of the finger illuminated with white light of FIG. 88A and analyzed with edge detection according to an exemplary embodiment;

FIG. 89 is a schematic diagram of an image capture rig for imaging fingers and nails of a user, the rig including LED strips oriented in two planes, a camera, and a projector according to an exemplary embodiment;

FIG. 90A is a back perspective view of a prototype of an image capture rig for imaging a hand and fingers of a user, the rig including three LED panels mounted to a same planar surface, a camera through the planar surface, and a projector within the image capture rig according to an exemplary embodiment;

FIG. 90B is a right side elevation view of the image capture rig for imaging the hand and fingers of the user (here, an artificial test finger is positioned in the rig), the rig including three LED panels oriented in a same plane, a camera, and a projector according to an exemplary embodiment;

FIG. 91A is a first plan view image of about 120 images of an image capture process, in which a camera records a single sweep of a horizontal laser projector line, scanning down from a base of a finger (e.g., FIG. 91A) towards a fingertip (e.g., FIG. 91D) according to an exemplary embodiment;

FIG. 91B is a second plan view image of the about 120 images of the image capture process according to an exemplary embodiment;

FIG. 91C is a third plan view image of the about 120 images of the image capture process according to an exemplary embodiment;

FIG. 91D is a fourth plan view image of the about 120 images of the image capture process according to an exemplary embodiment;

FIG. 91E is a first plan view image of about 30 images of the image capture process, in which a camera records an image for each of about 30 different white LEDs according to an exemplary embodiment;

FIG. 91F is a second plan view image of the about 30 images of the image capture process according to an exemplary embodiment;

FIG. 91G is a third plan view image of the about 30 images of the image capture process according to an exemplary embodiment;

FIG. 91H is a plan view image of about 6 images of the image capture process, in which a camera records an image for each of about 6 different ultraviolet LEDs according to an exemplary embodiment;

FIG. 91I is a plan view image of about 3 images of the image capture process, in which a camera records an image illuminated with white light and ultraviolet LEDs according to an exemplary embodiment;

FIG. 92 is a data flow chart for a nail identification method according to an exemplary embodiment;

FIG. 93A is a first plan view image of a first nail overlaid with a first nail estimate produced by a nail identification computer program according to an exemplary embodiment;

FIG. 93B is a second plan view image of a second nail overlaid with a second nail estimate produced by the nail identification computer program according to an exemplary embodiment;

FIG. 93C is a third plan view image of a third nail overlaid with a third nail estimate produced by the nail identification computer program according to an exemplary embodiment;

FIG. 93D is a fourth plan view image of a fourth nail overlaid with a fourth nail estimate produced by the nail identification computer program according to an exemplary embodiment;

FIG. 93E is a fifth plan view image of a fifth nail overlaid with a fifth nail estimate produced by the nail identification computer program according to an exemplary embodiment;

FIG. 93F is a sixth plan view image of a sixth nail overlaid with a sixth nail estimate produced by the nail identification computer program according to an exemplary embodiment;

FIG. 94A is a seventh plan view image of the second nail overlaid with a seventh nail estimate (an overestimation) produced by the nail identification computer program according to an exemplary embodiment;

FIG. 94B is an eighth plan view image of the sixth nail overlaid with an eighth nail estimate (an underestimation) produced by the nail identification computer program according to an exemplary embodiment;

FIG. 95A is a plan view of finger nail parameters of a width, which is defined as a widest length between two lowest points in a lateral nail fold; and/or a length, which is defined as a longest length between an apex of a free nail edge and a proximal nail fold, according to an exemplary embodiment;

FIG. 95B is an end view of the finger nail parameter of a transverse nail curvature, which is approximated by a circle of a first radius, according to an exemplary embodiment;

FIG. 95C is a side view of the finger nail parameter of a longitudinal nail curvature, which is approximated by a circle of a second radius, according to an exemplary embodiment;

FIG. 95D is a plan view of the finger nail parameters of a nail plate, a free edge, lateral nail folds, and a proximal nail fold according to an exemplary embodiment;

FIG. 96A is a perspective view of a prototype of the enamel/polish removal system according to an exemplary embodiment;

FIG. 96B is a perspective view of the prototype of the enamel/polish removal system with particular emphasis on compliance through springs and flexures, which allow pressure to be applied across nails of varying geometry according to an exemplary embodiment;

FIG. 97 is an exploded view of components of the prototype of the enamel/polish removal system according to an exemplary embodiment;

FIG. 98A is a side view of the prototype of the enamel/polish removal system with particular emphasis on enamel removal tool cleaning trajectories including an initial position in which a proximal face of the lateral flexures is aligned with an apex of an enamel area curve, which ensures pressure is applied to a proximal edge of a lateral nail fold, according to an exemplary embodiment;

FIG. 98B is a side view of the prototype of the enamel/polish removal system with particular emphasis on a first cleaning step in which the enamel/polish removal system is pressed down on the nail and then vertically lifted off the nail, according to an exemplary embodiment;

FIG. 98C is a side view of the prototype of the enamel/polish removal system with particular emphasis on a second cleaning step in which the enamel/polish removal system is pressed down on the nail and then angularly lifted off and away from the nail, according to an exemplary embodiment;

FIG. 98D is a side view of the prototype of the enamel/polish removal system with particular emphasis on a third cleaning step in which the enamel/polish removal system is pressed down on the nail and then horizontally wiped across the nail, according to an exemplary embodiment;

FIG. 99A is a side view image of the prototype of the enamel/polish removal system before enamel/polish removal from a little finger, according to an exemplary embodiment;

FIG. 99B is a side view image of the prototype of the enamel/polish removal system after the first cleaning step is performed by the enamel/polish removal system on the little finger, according to an exemplary embodiment;

FIG. 99C is a side view image of the prototype of the enamel/polish removal system after the second cleaning step is performed by the enamel/polish removal system on the little finger, according to an exemplary embodiment;

FIG. 99D is a side view image of the prototype of the enamel/polish removal system after the third cleaning step is performed by the enamel/polish removal system on the little finger, according to an exemplary embodiment;

FIG. 100A is a side view image of the prototype of the enamel/polish removal system before enamel/polish removal from a ring finger, according to an exemplary embodiment;

FIG. 100B is a side view image of the prototype of the enamel/polish removal system after the first cleaning step is performed by the enamel/polish removal system on the ring finger, according to an exemplary embodiment;

FIG. 100C is a side view image of the prototype of the enamel/polish removal system after the second cleaning step is performed by the enamel/polish removal system on the ring finger, according to an exemplary embodiment;

FIG. 100D is a side view image of the prototype of the enamel/polish removal system after the third cleaning step is performed by the enamel/polish removal system on the ring finger, according to an exemplary embodiment;

FIG. 101A is a side view image of the prototype of the enamel/polish removal system before enamel/polish removal from a middle finger, according to an exemplary embodiment;

FIG. 101B is a side view image of the prototype of the enamel/polish removal system after the first cleaning step is performed by the enamel/polish removal system on the middle finger, according to an exemplary embodiment;

FIG. 101C is a side view image of the prototype of the enamel/polish removal system after the second cleaning step is performed by the enamel/polish removal system on the middle finger, according to an exemplary embodiment;

FIG. 101D is a side view image of the prototype of the enamel/polish removal system after the third cleaning step is performed by the enamel/polish removal system on the middle finger, according to an exemplary embodiment;

FIG. 102A is a side view image of the prototype of the enamel/polish removal system before enamel/polish removal from an index finger, according to an exemplary embodiment;

FIG. 102B is a side view image of the prototype of the enamel/polish removal system after the first cleaning step is performed by the enamel/polish removal system on the index finger, according to an exemplary embodiment;

FIG. 102C is a side view image of the prototype of the enamel/polish removal system after the second cleaning step is performed by the enamel/polish removal system on the index finger, according to an exemplary embodiment;

FIG. 102D is a side view image of the prototype of the enamel/polish removal system after the third cleaning step is performed by the enamel/polish removal system on the index finger, according to an exemplary embodiment;

FIG. 103A is a side view image of the prototype of the enamel/polish removal system before enamel/polish removal from a thumb, according to an exemplary embodiment;

FIG. 103B is a side view image of the prototype of the enamel/polish removal system after the first cleaning step is performed by the enamel/polish removal system on the thumb, according to an exemplary embodiment;

FIG. 103C is a side view image of the prototype of the enamel/polish removal system after the second cleaning step is performed by the enamel/polish removal system on the thumb, according to an exemplary embodiment;

FIG. 103D is a side view image of the prototype of the enamel/polish removal system after the third cleaning step is performed by the enamel/polish removal system on the thumb, according to an exemplary embodiment;

FIG. 104A is a plan view of the little finger before application of enamel and a top coat, according to an exemplary embodiment;

FIG. 104B is a plan view of the ring finger before application of enamel and a top coat, according to an exemplary embodiment;

FIG. 104C is a plan view of the middle finger before application of enamel and a top coat, according to an exemplary embodiment;

FIG. 104D is a plan view of the index finger before application of enamel and a top coat, according to an exemplary embodiment;

FIG. 104E is a plan view of the thumb before application of enamel and a top coat, according to an exemplary embodiment;

FIG. 105A is a plan view of the little finger after application of enamel and a top coat, according to an exemplary embodiment;

FIG. 105B is a plan view of the ring finger after application of enamel and a top coat, according to an exemplary embodiment;

FIG. 105C is a plan view of the middle finger after application of enamel and a top coat, according to an exemplary embodiment;

FIG. 105D is a plan view of the index finger after application of enamel and a top coat, according to an exemplary embodiment;

FIG. 105E is a plan view of the thumb after application of enamel and a top coat, according to an exemplary embodiment;

FIG. 106A is a plan view of the little finger after removal of the enamel and the top coat, according to an exemplary embodiment;

FIG. 106B is a plan view of the ring finger after removal of the enamel and the top coat, according to an exemplary embodiment;

FIG. 106C is a plan view of the middle finger after removal of the enamel and the top coat, according to an exemplary embodiment;

FIG. 106D is a plan view of the index finger after removal of the enamel and the top coat, according to an exemplary embodiment;

FIG. 106E is a plan view of the thumb after removal of the enamel and the top coat, according to an exemplary embodiment;

FIG. 107A is a front view of the enamel/polish removal system including identification of enamel removal tool design parameters according to an exemplary embodiment;

FIG. 107B is a side view of the enamel/polish removal system including identification of enamel removal tool design parameters according to an exemplary embodiment;

FIG. 108A is a left side of a Pugh Chart ranking first, second, third, fourth, and fifth nail shaping methods for the nail shaping system according to an exemplary embodiment;

FIG. 108B is a right side of the Pugh Chart ranking sixth, seventh, eighth, ninth, and tenth nail shaping methods for the nail shaping system according to an exemplary embodiment;

FIG. 109 is a perspective view of the nail shaping system including a vertical sanding drum configuration according to an exemplary embodiment;

FIG. 110 is a perspective view of the nail shaping system including a horizontal sanding drum configuration according to an exemplary embodiment;

FIG. 111 is a perspective view of the nail shaping system including an oscillating sanding disk configuration according to an exemplary embodiment;

FIG. 112 is a perspective view of a prototype of the nail shaping system including oscillating sanding disk configuration mounted to a prototype of the mobility mechanism system and engaging with an extended middle finger of a user according to an exemplary embodiment;

FIG. 113A is a conceptual drawing of the enamel/polish application system including a plurality of bristle control rods according to an exemplary embodiment;

FIG. 113B is a conceptual drawing of the enamel/polish application system including a plurality of directional nozzles according to an exemplary embodiment;

FIG. 113C is a conceptual drawing of the enamel/polish application system including a plurality of tube array brushes according to an exemplary embodiment;

FIG. 113D is a conceptual drawing of the enamel/polish application system including a plurality of interchangeable duck bill arrays according to an exemplary embodiment;

FIG. 113E is a conceptual drawing of the enamel/polish application system including a two-dimensional grid brush according to an exemplary embodiment;

FIG. 114A is a left side of a Pugh Chart ranking first, second, third, fourth, fifth, and sixth enamel/polish application methods and the enamel/polish application systems according to an exemplary embodiment;

FIG. 114B is a right side of the Pugh Chart ranking seventh, eighth, ninth, tenth, eleventh, twelfth, thirteenth, and fourteenth enamel/polish application methods and the enamel/polish application systems according to an exemplary embodiment;

FIG. 115 is a perspective view of a pneumatic dispensing system;

FIG. 116 is a perspective view of a prototype of a nail care system according to an exemplary embodiment;

FIG. 117 is a schematic diagram of reference frames of a prototype of the mobility mechanism system for the prototype of the nail care system according to an exemplary embodiment;

FIG. 118A is a front view of a bottle of It Never Ends by OPI;

FIG. 118B is a front view of a bottle of Envy the Adventure by OPI;

FIG. 118C is a front view of a bottle of Top Coat by FingerPaints;

FIG. 118D is a front view of a bottle of Haute Springs by Color Therapy;

FIG. 118E is a front view of a bottle of Red-y to Glow by Color Therapy;

FIG. 118F is a front view of a bottle of Through the Grapevine by wet n wild;

FIG. 119A is a front view of a bottle of glitter polish by FingerPaints;

FIG. 119B is a front view of a bottle of glitter polish by FingerPaints;

FIG. 119C is a front view of a bottle of glitter polish by Sally Hanson;

FIG. 119D is a front view of a bottle of glitter polish by ORLY;

FIG. 119E is a front view of a bottle of Pool Side Service by Essie;

FIG. 119F is a front view of a bottle of All In One by Essie;

FIG. 119G is a front view of a bottle of Ballet Slippers by Essie;

FIG. 120A is a side view of clockwise rotation of a spreading head of the enamel/polish application system against a direction of travel according to an exemplary embodiment;

FIG. 120B is a side view of counter-clockwise rotation of the spreading head of the enamel/polish application system with the direction of travel according to an exemplary embodiment;

FIG. 121A is a perspective view of a horizontally rotated cotton swab for the enamel/polish application system according to an exemplary embodiment;

FIG. 121B is a plan view of painting results using the horizontally rotated cotton swab for the enamel/polish application system rotating in a first direction according to an exemplary embodiment;

FIG. 121C is a plan view of painting results using the horizontally rotated cotton swab for the enamel/polish application system rotating in a second direction according to an exemplary embodiment;

FIG. 121D is a perspective view of a horizontally rotated silicone eye-liner brush for the enamel/polish application system according to an exemplary embodiment;

FIG. 121E is a plan view of painting results using the horizontally rotated silicone eye-liner brush for the enamel/polish application system rotating in a first direction according to an exemplary embodiment;

FIG. 121F is a plan view of painting results using the horizontally rotated silicone eye-liner brush for the enamel/polish application system rotating in a second direction according to an exemplary embodiment;

FIG. 122 is a perspective view of a rotational attachment for the enamel/polish application system according to an exemplary embodiment;

FIG. 123 is a perspective view of painting results for the rotational attachment of FIG. 122 for the enamel/polish application system according to an exemplary embodiment;

FIG. 124A is a perspective view of a first filleted reduction head for the enamel/polish application system according to an exemplary embodiment;

FIG. 124B is a perspective view of a second filleted reduction head for the enamel/polish application system according to an exemplary embodiment;

FIG. 124C is a plan view of painting results for the first filleted reduction head for the enamel/polish application system according to an exemplary embodiment;

FIG. 124D is a plan view of painting results for the second filleted reduction head for the enamel/polish application system according to an exemplary embodiment;

FIG. 124E is a perspective view of a first conical tipped head for the enamel/polish application system according to an exemplary embodiment;

FIG. 124F is a perspective view of a second conical tipped head for the enamel/polish application system according to an exemplary embodiment;

FIG. 124G is a plan view of painting results for the first conical tipped head for the enamel/polish application system according to an exemplary embodiment;

FIG. 124H is a plan view of painting results for the second conical tipped head for the enamel/polish application system according to an exemplary embodiment;

FIG. 124I is a perspective view of a dome tipped head for the enamel/polish application system according to an exemplary embodiment;

FIG. 124J is a plan view of painting results for the dome tipped head for the enamel/polish application system according to an exemplary embodiment;

FIG. 124K is a perspective view of a first internal cavity head for the enamel/polish application system according to an exemplary embodiment;

FIG. 124L is a perspective view of a second internal cavity head for the enamel/polish application system according to an exemplary embodiment;

FIG. 124M is a plan view of painting results for the first internal cavity head for the enamel/polish application system according to an exemplary embodiment;

FIG. 124N is a plan view of painting results for the second internal cavity head for the enamel/polish application system according to an exemplary embodiment;

FIG. 124O is a perspective view of a silicone brush for the enamel/polish application system according to an exemplary embodiment;

FIG. 124P is a plan view of painting results using the silicone brush for the enamel/polish application system rotating in a first direction according to an exemplary embodiment;

FIG. 124Q is a plan view of painting results using the silicone brush for the enamel/polish application system rotating in a second direction according to an exemplary embodiment;

FIG. 124R is a perspective view of a miniature cotton swab for the enamel/polish application system according to an exemplary embodiment;

FIG. 124S is a plan view of painting results using the miniature cotton swab for the enamel/polish application system rotating in a first direction according to an exemplary embodiment;

FIG. 124T is a plan view of painting results using the miniature cotton swab for the enamel/polish application system rotating in a second direction according to an exemplary embodiment;

FIG. 124U is a perspective view of a miniature cotton swab for the enamel/polish application system according to an exemplary embodiment;

FIG. 124V is a plan view of painting results using the miniature cotton swab for the enamel/polish application system using a first application pattern according to an exemplary embodiment;

FIG. 124W is a plan view of painting results using the miniature cotton swab for the enamel/polish application system using a second application pattern according to an exemplary embodiment;

FIG. 124X is a perspective view of a third filleted reduction head for the enamel/polish application system according to an exemplary embodiment;

FIG. 124Y is a plan view of painting results for the third filleted reduction head for the enamel/polish application system according to an exemplary embodiment;

FIG. 125 is an X-Y diagram of an outwards spiral pathway plan for the enamel/polish application system according to an exemplary embodiment;

FIG. 126A is a perspective view of a filleted reduction head for the enamel/polish application system prior to application according to an exemplary embodiment;

FIG. 126B is the filleted reduction head for the enamel/polish application system dispensing enamel according to an exemplary embodiment;

FIG. 126C is the filleted reduction head for the enamel/polish application system spreading the dispensed enamel according to an exemplary embodiment;

FIG. 126D is the filleted reduction head for the enamel/polish application system continued spreading of the dispensed and spread enamel according to an exemplary embodiment;

FIG. 126E is the filleted reduction head for the enamel/polish application system after completed enamel application according to an exemplary embodiment;

FIG. 127A is a perspective view of the filleted reduction head for the enamel/polish application system incident on a hollow tube in lieu of a finger of a user according to an exemplary embodiment;

FIG. 127B is a side view of the filleted reduction head for the enamel/polish application system incident on the hollow tube according to an exemplary embodiment;

FIG. 127C is a Y-Z plot of a cylindrical surface of the hollow tube to be pained, and a swept trajectory of a wrist joint of the user according to an exemplary embodiment;

FIG. 128A is a top perspective view of the filleted reduction head for the enamel/polish application system and the hollow tube prior to application according to an exemplary embodiment;

FIG. 128B is a top perspective view of the filleted reduction head for the enamel/polish application system dispensing and spreading enamel according to an exemplary embodiment;

FIG. 128C is a top perspective view of the filleted reduction head for the enamel/polish application system continued spreading the dispensed and spread enamel according to an exemplary embodiment;

FIG. 128D is a top perspective view of the filleted reduction head for the enamel/polish application system after completed enamel application according to an exemplary embodiment;

FIG. 129 is a plan view of enamel applied with undesirable air entrapment caused from excessive mixing of a spinning head;

FIG. 130A is a perspective view of the rotational attachment equipped with a soft smooth rotating rubber disc for the enamel/polish application system according to an exemplary embodiment;

FIG. 130B is an end view of soft smooth rotating rubber disc for the enamel/polish application system according to an exemplary embodiment;

FIG. 130C is a plan view of painting results for rotational attachment equipped with the soft smooth rotating rubber disc for the enamel/polish application system according to an exemplary embodiment;

FIG. 130D is a perspective view of the rotational attachment equipped with a low angled rotating rubber cone for the enamel/polish application system according to an exemplary embodiment;

FIG. 130E is an end view of low angled rotating rubber cone for the enamel/polish application system according to an exemplary embodiment;

FIG. 130F is a plan view of painting results for rotational attachment equipped with the low angled rotating rubber cone for the enamel/polish application system according to an exemplary embodiment;

FIG. 130G is a perspective view of the rotational attachment equipped with a soft smooth rotating rubber disc for the enamel/polish application system according to an exemplary embodiment;

FIG. 130H is a side view of soft smooth rotating rubber disc for the enamel/polish application system according to an exemplary embodiment;

FIG. 130I is a plan view of painting results for rotational attachment equipped with the soft smooth rotating rubber disc for the enamel/polish application system according to an exemplary embodiment;

FIG. 131 is a side perspective view of a prototype of pneumatically driven syringe heads held by a prototype of the mobility mechanism system for the enamel/polish application system according to an exemplary embodiment;

FIG. 132 is a perspective view of a captive leadscrew piston pump for the enamel/polish application system according to an exemplary embodiment;

FIG. 133 is a diagram of a system architecture for control and operation of a stepper motor of the nail care system according to an exemplary embodiment;

FIG. 134 is a perspective view of a constant diameter tube for the enamel/polish application system according to an exemplary embodiment;

FIG. 135 is a perspective view of a tapered tube for the enamel/polish application system according to an exemplary embodiment;

FIG. 136 is a plan view of painting results using a basic nozzle tip for the enamel/polish application system according to an exemplary embodiment;

FIG. 137 is a perspective view of the basic nozzle tip for the enamel/polish application system according to an exemplary embodiment;

FIG. 138A is an end view of the basic nozzle tip for the enamel/polish application system orthogonally incident with a curved nail of a user with emphasis on undesirable altered distribution of flow of enamel from the nozzle, according to an exemplary embodiment;

FIG. 138B is an end view of the basic nozzle tip for the enamel/polish application system normally incident with the curved nail of the user with emphasis on improved distribution of flow of enamel from the nozzle, according to an exemplary embodiment;

FIG. 139A is a top end view of a flared castle-tip point for the enamel/polish application system according to an exemplary embodiment;

FIG. 139B is a side view of the flared castle-tip point for the enamel/polish application system according to an exemplary embodiment;

FIG. 140A is a plan view of first painting results using the flared castle-tip point for the enamel/polish application system with emphasis on undesirable surface artifacts, according to an exemplary embodiment;

FIG. 140B is a perspective view of second painting results using the flared castle-tip point for the enamel/polish application system with emphasis on undesirable surface artifacts, according to an exemplary embodiment;

FIG. 141A is a perspective view of a first icing nozzle with two inwardly curved bits for the enamel/polish application system according to an exemplary embodiment;

FIG. 141B is a perspective view of a second icing nozzle with four inwardly curved bits in a relatively loose arrangement for the enamel/polish application system according to an exemplary embodiment;

FIG. 141C is a perspective view of a third icing nozzle with four inward curved bits in a relatively tight arrangement for the enamel/polish application system according to an exemplary embodiment;

FIG. 142A is a perspective view of a filament nozzle and first painting results using the filament nozzle for the enamel/polish application system with emphasis on undesirable blob formation, according to an exemplary embodiment;

FIG. 142B is a plan view of second painting results using the filament nozzle for the enamel/polish application system with emphasis on undesirable inconsistent painting of enamel, according to an exemplary embodiment;

FIG. 143A is a side perspective view of an interior filament nozzle for the enamel/polish application system according to an exemplary embodiment;

FIG. 143B is a perspective view of the interior filament nozzle for the enamel/polish application system according to an exemplary embodiment;

FIG. 144A is a side perspective view of a first example of undesirable uneven flow from the interior filament nozzle for the enamel/polish application system according to an exemplary embodiment;

FIG. 144B is a side perspective view of a second example of undesirable uneven flow from the interior filament nozzle for the enamel/polish application system according to an exemplary embodiment;

FIG. 144C is a side perspective view of a third example of undesirable uneven flow from the interior filament nozzle for the enamel/polish application system according to an exemplary embodiment;

FIG. 145A is a side perspective view of an exterior filament nozzle for the enamel/polish application system according to an exemplary embodiment;

FIG. 145B is a perspective view of the exterior filament nozzle for the enamel/polish application system and painting results for the same, according to an exemplary embodiment;

FIG. 146A is a top perspective view of a spring plunger tip for the enamel/polish application system according to an exemplary embodiment;

FIG. 146B is a top perspective view of painting results of a spring plunger tip for the enamel/polish application system according to an exemplary embodiment;

FIG. 147A is an X-Y diagram of a circular outwards spiral pathway plan for the enamel/polish application system according to an exemplary embodiment;

FIG. 147B is a plan view of painting results from the circular outwards pathway plan for the enamel/polish application system according to an exemplary embodiment;

FIG. 147C is an X-Y diagram of a circular outwards followed by a perimeter trajectory pathway plan for the enamel/polish application system according to an exemplary embodiment;

FIG. 147D is a plan view of painting results from the circular outwards followed by a perimeter trajectory pathway plan for the enamel/polish application system according to an exemplary embodiment;

FIG. 147E is an X-Y diagram of a circular outwards followed by a perimeter trajectory, and then a trajectory back inwards pathway plan for the enamel/polish application system according to an exemplary embodiment;

FIG. 147F is a plan view of painting results from the circular outwards followed by the perimeter trajectory, and then the trajectory back inwards pathway plan for the enamel/polish application system according to an exemplary embodiment;

FIG. 147G is an X-Y diagram of a circular outwards followed by a spiraling inward square (low pitch) pathway plan for the enamel/polish application system according to an exemplary embodiment;

FIG. 147H is a plan view of painting results from the spiraling inward square (low pitch) pathway plan for the enamel/polish application system according to an exemplary embodiment;

FIG. 147I is an X-Y diagram of a circular outwards followed by a spiraling inward square (high pitch) pathway plan for the enamel/polish application system according to an exemplary embodiment;

FIG. 147J is a plan view of painting results from the spiraling inward square (high pitch) pathway plan for the enamel/polish application system according to an exemplary embodiment;

FIG. 147K is an X-Y diagram of a circular outwards followed by a square perimeter and then interior start pattern outwards pathway plan for the enamel/polish application system according to an exemplary embodiment;

FIG. 147L is a plan view of painting results from the square perimeter and then interior start pattern outwards pathway plan for the enamel/polish application system according to an exemplary embodiment;

FIG. 147M is an X-Y diagram of a circular outwards followed by a back and forth linear paths followed with a perimeter trajectory pathway plan for the enamel/polish application system according to an exemplary embodiment;

FIG. 147N is a plan view of painting results from the back and forth linear paths followed with the perimeter trajectory pathway plan for the enamel/polish application system according to an exemplary embodiment;

FIG. 147O is an X-Y diagram of a circular outwards followed by a 90 degree offset back and forth linear paths followed by a perimeter trajectory (waffle pattern) pathway plan for the enamel/polish application system according to an exemplary embodiment;

FIG. 147P is a plan view of painting results from the 90 degree offset back and forth linear paths followed by a perimeter trajectory (waffle pattern) pathway plan for the enamel/polish application system according to an exemplary embodiment;

FIG. 147Q is an X-Y diagram of a circular outwards followed by a stippling pathway plan for the enamel/polish application system according to an exemplary embodiment;

FIG. 147R is a plan view of painting results from the stippling pathway plan for the enamel/polish application system according to an exemplary embodiment;

FIG. 147S is an X-Y diagram of a circular outwards followed by a zig-zag pathway plan for the enamel/polish application system according to an exemplary embodiment;

FIG. 147T is a plan view of painting results from the zig-zag pathway plan for the enamel/polish application system according to an exemplary embodiment;

FIG. 147U is an X-Y diagram of a circular outwards followed by an overlapping squares pathway plan for the enamel/polish application system according to an exemplary embodiment;

FIG. 147V is a plan view of painting results from the overlapping squares pathway plan for the enamel/polish application system according to an exemplary embodiment;

FIG. 147W is an X-Y diagram of a circular outwards followed by a nested D's pathway plan for the enamel/polish application system according to an exemplary embodiment;

FIG. 147X is a plan view of painting results from the nested D's pathway plan for the enamel/polish application system according to an exemplary embodiment;

FIG. 147Y is an X-Y diagram of a circular outwards followed by a nested C's pathway plan for the enamel/polish application system according to an exemplary embodiment;

FIG. 147Z is a plan view of painting results from the nested C's pathway plan for the enamel/polish application system according to an exemplary embodiment;

FIG. 147AA is an X-Y diagram of a circular outwards followed by a perimeter and fill (low pitch) pathway plan for the enamel/polish application system according to an exemplary embodiment;

FIG. 147AB is an X-Y diagram of a circular outwards followed by a perimeter and fill (high pitch) pathway plan for the enamel/polish application system according to an exemplary embodiment;

FIG. 147AC is a plan view of painting results from the perimeter and fill (high pitch) pathway plan for the enamel/polish application system according to an exemplary embodiment;

FIG. 148 is a schematic diagram of an undesirable travel speed profile of a nozzle of the enamel/polish application system in which a nozzle travels along path ABC, and, as the tip deaccelerates into B and then reaccelerates to C, the nozzle passes slower along the surface the closer the nozzle is to point B causing undesirable higher concentrations of enamel around point B, according to an exemplary embodiment;

FIG. 149A is a plan view of first results of an application of a top coat using a non-contact method by hovering a dispensing nozzle over a surface (e.g., a flat glass surface for testing) and extruding a clear top coat, according to an exemplary embodiment;

FIG. 149B is a plan view of second results of the application of the top coat using the non-contact method by hovering the dispensing nozzle over the surface and extruding the clear top coat, according to an exemplary embodiment;

FIG. 149C is a plan view of third results of the application of the top coat using the non-contact method by hovering the dispensing nozzle over the surface and extruding the clear top coat, according to an exemplary embodiment;

FIG. 150A is a perspective view of results of using the non-contact nozzle by hovering the top coat over a cured enamel painted square using bare enamel, according to an exemplary embodiment;

FIG. 150B is a perspective view of results of using the non-contact nozzle by hovering the top coat over the cured enamel painted square using enamel with a top coat, according to an exemplary embodiment;

FIG. 151A is a perspective view of a prototype of a follower with a relatively long conduit of elastomeric tubing of the enamel/polish application system according to an exemplary embodiment;

FIG. 151B is a side view of a prototype of a cantilevered follower with a replaceable nozzle of the enamel/polish application system according to an exemplary embodiment;

FIG. 151C is a side view of a prototype of an elastomeric cantilevered follower with staggered nozzles (for dispensing a color coat and a top coat) of the enamel/polish application system according to an exemplary embodiment;

FIG. 151D is a side view of a prototype of a rigid cantilevered follower with relatively short elastomeric sections at a root section (for compliance) of the enamel/polish application system according to an exemplary embodiment;

FIG. 152 is a side view of a prototype of a follower system principal of the enamel/polish application system with particular emphasis on flexure of the follower system principal relative to an application surface according to an exemplary embodiment;

FIG. 153 is a side view of a prototype of a follower system of the enamel/polish application system, the follower system including enamel and top coat reservoirs with attached lead-screw driven pumping systems, according to an exemplary embodiment;

FIG. 154 is a perspective view of a prototype of a mechanical fixture for stabilizing and orienting a finger of a user for the hand/foot rest system according to an exemplary embodiment;

FIG. 155 is a perspective view of a finger of a user held in the prototype of the mechanical fixture for stabilizing and orienting the finger of the user for the hand/foot rest system according to an exemplary embodiment;

FIG. 156A is a plan view of a finger of a user overlaid with a pathway plotting strategy according to an exemplary embodiment;

FIG. 156B is a plan view of a finger of another user overlaid with a pathway plotting strategy according to an exemplary embodiment;

FIG. 157A is a perspective view of a finger of a user during a first stage of painting a nail with enamel based on the pathway plotting strategy according to an exemplary embodiment;

FIG. 157B is a perspective view of the finger of the user during a second stage of painting the nail with enamel based on the pathway plotting strategy according to an exemplary embodiment;

FIG. 157C is a perspective view of the finger of the user during a third stage of painting the nail with enamel based on the pathway plotting strategy according to an exemplary embodiment;

FIG. 157D is a perspective view of the finger of the user during a first stage of painting a nail with a top coat based on the pathway plotting strategy according to an exemplary embodiment;

FIG. 157E is a perspective view of the finger of the user during a second stage of painting the nail with the top coat based on the pathway plotting strategy according to an exemplary embodiment;

FIG. 157F is a perspective view of the finger of the user during a third stage of painting the nail with the top coat based on the pathway plotting strategy according to an exemplary embodiment;

FIG. 158 is a plan view of the finger of the user after the third stage of painting the nail with the top coat based on the pathway plotting strategy according to an exemplary embodiment;

FIG. 159 is a perspective view of an artificial finger and nail (positioned in the prototype of the mechanical fixture for stabilizing and orienting the finger of the user attached to a prototype jig for the hand/foot rest system) after painting the nail according to an exemplary embodiment;

FIG. 160A is a perspective view of the artificial finger and nail after painting the nail according to an exemplary embodiment;

FIG. 160B is a plan view of the artificial finger and nail after painting the nail according to an exemplary embodiment;

FIG. 160C is a plan view of the artificial finger and nail after painting the nail according to an exemplary embodiment;

FIG. 160D is a side view of the artificial finger and nail after painting the nail according to an exemplary embodiment;

FIG. 161A is a perspective view of a nail jig for testing painting the nail according to an exemplary embodiment;

FIG. 161B is a perspective view of the nail jig during a first stage of painting the nail according to an exemplary embodiment;

FIG. 161C is a perspective view of the nail jig during a second stage of painting the nail according to an exemplary embodiment;

FIG. 161D is a perspective view of the nail jig after a third stage of painting the nail according to an exemplary embodiment;

FIG. 162A is a plan view of a first artificial nail painted using the nail jig according to an exemplary embodiment;

FIG. 162B is a plan view of a second artificial nail painted using the nail jig according to an exemplary embodiment;

FIG. 162C is a plan view of a third artificial nail painted using the nail jig according to an exemplary embodiment;

FIG. 162D is a plan view of a fourth artificial nail painted using the nail jig according to an exemplary embodiment;

FIG. 162E is a plan view of a fifth artificial nail painted using the nail jig according to an exemplary embodiment;

FIG. 162F is a plan view of a sixth artificial nail painted using the nail jig according to an exemplary embodiment;

FIG. 162G is a plan view of a seventh artificial nail painted using the nail jig according to an exemplary embodiment;

FIG. 162H is a plan view of an eighth artificial nail painted using the nail jig according to an exemplary embodiment;

FIG. 162I is a plan view of a ninth artificial nail painted using the nail jig according to an exemplary embodiment;

FIG. 163 is a perspective exploded view of three cartridges of the consumable cartridge/pod system integrated into the multi-tool system and held by an end of the mobility mechanism system according to an exemplary embodiment;

FIG. 164 is a perspective exploded view of three cartridges of the consumable cartridge/pod system according to an exemplary embodiment;

FIG. 165 is a perspective exploded view of an enamel removal cartridge of the consumable cartridge/pod system for the enamel/polish removal system according to an exemplary embodiment;

FIG. 166 is a perspective exploded view of a spring loaded scaffolding for the enamel removal cartridge of the consumable cartridge/pod system for the enamel/polish removal system according to an exemplary embodiment;

FIG. 167 is a partial cutaway side view of an enamel reservoir for the enamel removal cartridge of the consumable cartridge/pod system for the enamel/polish removal system according to an exemplary embodiment;

FIG. 168 is a partial cutaway exploded side view of a ram engaging the enamel reservoir for the enamel removal cartridge of the consumable cartridge/pod system for the enamel/polish removal system according to an exemplary embodiment;

FIG. 169 is a perspective view of a color magazine for holding a plurality of cartridges driven by a motor and gear for the consumable cartridge/pod system for the enamel/polish application system according to an exemplary embodiment;

FIG. 170 is a perspective view of a reservoir to be engaged with a ram, a flexible member, a tube, and a nozzle for the consumable cartridge/pod system for the enamel/polish application system according to an exemplary embodiment;

FIG. 171 is a perspective view of a geared ram for the reservoir to be engaged with the geared ram, the flexible member, the tube, and the nozzle for the consumable cartridge/pod system for the enamel/polish application system according to an exemplary embodiment;

FIG. 172 is a perspective view of an applicator tray for holding a pair of cartridges for the consumable cartridge/pod system for the enamel/polish application system according to an exemplary embodiment;

FIG. 173A is a side cross-sectional view of a first nozzle sealing/opening system prior to a needle engaging with a clogged nozzle for the enamel/polish application system according to an exemplary embodiment;

FIG. 173B is a side cross-sectional view of the first nozzle sealing/opening system after the needle engages with the clogged nozzle for the enamel/polish application system according to an exemplary embodiment;

FIG. 174A is a side cross-sectional view of a second nozzle sealing/opening system prior to inserting a clogged nozzle into a reservoir of enamel thinner for the enamel/polish application system according to an exemplary embodiment;

FIG. 174B is a side cross-sectional view of the second nozzle sealing/opening system after inserting the clogged nozzle into the reservoir of the enamel thinner for the enamel/polish application system according to an exemplary embodiment;

FIG. 175A is a side cross-sectional view of a third nozzle sealing/opening system with a swing door and rubber pad in an open position relative to the nozzle for the enamel/polish application system according to an exemplary embodiment;

FIG. 175B is a side cross-sectional view of the third nozzle sealing/opening system with the swing door and rubber pad in a closed position relative to the nozzle for the enamel/polish application system according to an exemplary embodiment;

FIG. 176 is a perspective, exploded view of a ram and a ram drive motor mounted on a gantry system for selective engagement with an application head of the enamel/polish application system, a removal head of the enamel/polish removal system, and a shaping head of the nail shaping system according to an exemplary embodiment;

FIG. 177 is a perspective, exploded view of the ram and the ram drive motor mounted on the gantry system for selective engagement with one of a plurality of application heads of the enamel/polish application system, one of a plurality of removal heads of the enamel/polish removal system, and one of a plurality of shaping heads of the nail shaping system according to an exemplary embodiment;

FIG. 178 is a screenshot of a control window for the prototype of the mobility mechanism system of FIG. 117 according to an exemplary embodiment;

FIG. 179 is a perspective view of a nylon brush tip of the enamel/polish application system according to an exemplary embodiment;

FIG. 180A is a close-up perspective view of the nylon brush tip of the enamel/polish application system according to an exemplary embodiment;

FIG. 180B is a plan view of painting results of the nylon brush tip of the enamel/polish application system after applying a single coat according to an exemplary embodiment;

FIG. 180C is a close-up perspective view of the nylon brush tip of the enamel/polish application system according to an exemplary embodiment;

FIG. 180D is a plan view of painting results of the nylon brush tip of the enamel/polish application system after applying a double coat according to an exemplary embodiment;

FIG. 181A is a perspective view of a makeup brush of the enamel/polish application system according to an exemplary embodiment;

FIG. 181B is a plan view of painting results of the makeup brush of the enamel/polish application system after applying a single coat with light pressure according to an exemplary embodiment;

FIG. 181C is a perspective view of the painting results of the makeup brush of the enamel/polish application system after applying the single coat with light pressure according to an exemplary embodiment;

FIG. 181D is a perspective view of the makeup brush of the enamel/polish application system according to an exemplary embodiment;

FIG. 181E is a plan view of painting results of the makeup brush of the enamel/polish application system after applying a double coat with light pressure according to an exemplary embodiment;

FIG. 181F is a perspective view of the painting results of the makeup brush of the enamel/polish application system after applying the double coat with light pressure according to an exemplary embodiment;

FIG. 181G is a perspective view of the makeup brush of the enamel/polish application system according to an exemplary embodiment;

FIG. 181H is a plan view of painting results of the makeup brush of the enamel/polish application system after applying a single coat with medium pressure according to an exemplary embodiment;

FIG. 181I is a perspective view of the makeup brush of the enamel/polish application system according to an exemplary embodiment;

FIG. 181J is a plan view of painting results of the makeup brush of the enamel/polish application system after applying a double coat with medium pressure according to an exemplary embodiment;

FIG. 181K is a perspective view of the makeup brush of the enamel/polish application system according to an exemplary embodiment;

FIG. 181L is a plan view of painting results of the makeup brush of the enamel/polish application system after applying enamel with a blotting method according to an exemplary embodiment;

FIG. 182 is a perspective view of a nail polish brush attached to the prototype of the mobility mechanism system of FIG. 117 according to an exemplary embodiment;

FIG. 183A is a side view of the nail polish brush of the enamel/polish application system according to an exemplary embodiment;

FIG. 183B is a plan view of first painting results of the nail polish brush of the enamel/polish application system after applying enamel at a relatively slow speed with a linear robotic movement of the mobility mechanism system according to an exemplary embodiment;

FIG. 183C is a plan view of second painting results of the nail polish brush of the enamel/polish application system after applying enamel at a relatively slow speed with a linear robotic movement of the mobility mechanism system according to an exemplary embodiment;

FIG. 183D is a side view of the nail polish brush of the enamel/polish application system according to an exemplary embodiment;

FIG. 183E is a plan view of third painting results of the nail polish brush of the enamel/polish application system after applying enamel at a relatively fast speed with the linear robotic movement of the mobility mechanism system according to an exemplary embodiment;

FIG. 184A is a top view of a low-force spreading applicator of the enamel/polish application system according to an exemplary embodiment;

FIG. 184B is a side view of brush bristles of the low-force spreading applicator of the enamel/polish application system spreading nail polish according to an exemplary embodiment;

FIG. 185A is a side perspective view of a free-sliding pin array of the enamel/polish application system according to an exemplary embodiment;

FIG. 185B is an end perspective view of the free-sliding pin array of the enamel/polish application system according to an exemplary embodiment;

FIG. 186A is a plan view of first painting results of the free-sliding pin array of the enamel/polish application system using swirling motions according to an exemplary embodiment;

FIG. 186B is a plan view of second painting results of the free-sliding pin array of the enamel/polish application system using swirling motions according to an exemplary embodiment;

FIG. 186C is a plan view of third painting results of the free-sliding pin array of the enamel/polish application system using relatively tighter swirling motions according to an exemplary embodiment;

FIG. 186D is a plan view of fourth painting results of the free-sliding pin array of the enamel/polish application system using back and forth motions according to an exemplary embodiment;

FIG. 186E is a plan view of fifth painting results of the free-sliding pin array of the enamel/polish application system using relatively long sweeping motions according to an exemplary embodiment;

FIG. 186F is a plan view of sixth painting results of the free-sliding pin array of the enamel/polish application system using relatively long sweeping motions according to an exemplary embodiment;

FIG. 186G is a plan view of seventh painting results of the free-sliding pin array of the enamel/polish application system using zig-zag motions according to an exemplary embodiment;

FIG. 186H is a plan view of eighth painting results of the free-sliding pin array of the enamel/polish application system using zig-zag motions according to an exemplary embodiment;

FIG. 186I is a plan view of ninth painting results of the free-sliding pin array of the enamel/polish application system using zig-zag motions according to an exemplary embodiment;

FIG. 187A is a perspective view of a gravity-driven end effector with a relatively soft smooth rubber tip of the enamel/polish application system according to an exemplary embodiment;

FIG. 187B is a plan view of first painting results using the gravity-driven end effector with the relatively soft smooth rubber tip of the enamel/polish application system according to an exemplary embodiment;

FIG. 187C is a plan view of second painting results using the gravity-driven end effector with the relatively soft smooth rubber tip of the enamel/polish application system according to an exemplary embodiment;

FIG. 187D is a perspective view of the gravity-driven end effector with a textured rubber tip of the enamel/polish application system according to an exemplary embodiment;

FIG. 187E is a plan view of first painting results using the gravity-driven end effector with the textured rubber tip of the enamel/polish application system according to an exemplary embodiment;

FIG. 187F is a plan view of second painting results using the gravity-driven end effector with the textured rubber tip of the enamel/polish application system according to an exemplary embodiment;

FIG. 187G is a perspective view of a micro-brush tip of the enamel/polish application system according to an exemplary embodiment;

FIG. 187H is a perspective view of the gravity-driven end effector with the micro-brush tip of the enamel/polish application system according to an exemplary embodiment;

FIG. 187I is a plan view of first painting results using the gravity-driven end effector with the micro-brush tip of the enamel/polish application system according to an exemplary embodiment;

FIG. 187J is a plan view of second painting results using the gravity-driven end effector with the micro-brush tip of the enamel/polish application system according to an exemplary embodiment;

FIG. 187K is a perspective view of a gravity-driven rod of the enamel/polish application system according to an exemplary embodiment;

FIG. 187L is a plan view of painting results using the gravity-driven rod of the enamel/polish application system according to an exemplary embodiment;

FIG. 187M is a perspective view of a gravity-driven wedge of the enamel/polish application system according to an exemplary embodiment;

FIG. 187N is a plan view of painting results using the gravity-driven wedge of the enamel/polish application system according to an exemplary embodiment;

FIG. 187O is a perspective view of the gravity-driven end effector with a gravity-driven squeegee of the enamel/polish application system according to an exemplary embodiment;

FIG. 187P is a plan view of painting results using the gravity-driven end effector with the gravity-driven squeegee of the enamel/polish application system according to an exemplary embodiment;

FIG. 188A is a perspective view of enamel before application of an air spreading technique according to an exemplary embodiment;

FIG. 188B is a perspective view of the enamel after before application of the air spreading technique according to an exemplary embodiment;

FIG. 189A is a plan view of a square-shaped cut-and-paste enamel section applied to a flat surface according to an exemplary embodiment;

FIG. 189B is a plan view of a custom-shaped cut-and-paste enamel section applied to an artificial nail according to an exemplary embodiment;

FIG. 190A is a perspective view of a nail art pad printer of the enamel/polish application system according to an exemplary embodiment;

FIG. 190B is a plan view of first painting results using the nail art pad printer of the enamel/polish application system according to an exemplary embodiment;

FIG. 190C is a plan view of second painting results using the nail art pad printer of the enamel/polish application system according to an exemplary embodiment;

FIG. 190D is a perspective view of an open cell foam pad of the enamel/polish application system according to an exemplary embodiment;

FIG. 190E is a plan view of first painting results using the open cell foam pad of the enamel/polish application system on a planar surface according to an exemplary embodiment;

FIG. 190F is a perspective view of second painting results using the open cell foam pad of the enamel/polish application system on an artificial nail according to an exemplary embodiment;

FIG. 191A is a perspective view of a first fountain pen style tip of the enamel/polish application system according to an exemplary embodiment;

FIG. 191B is a perspective view of a second fountain pen style tip of the enamel/polish application system according to an exemplary embodiment;

FIG. 192A is a perspective view of a first felt tip of the enamel/polish application system according to an exemplary embodiment;

FIG. 192B is a perspective view of a second felt tip of the enamel/polish application system according to an exemplary embodiment;

FIG. 193A is a perspective view of a pin grid applicator of the enamel/polish application system according to an exemplary embodiment;

FIG. 193B is a plan view of painting results using the pin grid applicator of the enamel/polish application system according to an exemplary embodiment;

FIG. 194A is a perspective view of enamel prior to vibratory spreading for the enamel/polish application system according to an exemplary embodiment;

FIG. 194B is a perspective view of the enamel during the vibratory spreading for the enamel/polish application system according to an exemplary embodiment;

FIG. 194C is a perspective view of the enamel after the vibratory spreading for the enamel/polish application system according to an exemplary embodiment;

FIG. 195A is a perspective view of enamel on a steeply angled surface prior to vibratory spreading for the enamel/polish application system according to an exemplary embodiment;

FIG. 195B is a perspective view of the enamel on the steeply angled surface during the vibratory spreading for the enamel/polish application system according to an exemplary embodiment;

FIG. 195C is a perspective view of the enamel on the steeply angled surface after the vibratory spreading for the enamel/polish application system according to an exemplary embodiment;

FIG. 196 is an exploded perspective view of components of a vibratory spreading system of the enamel/polish application system according to an exemplary embodiment;

FIG. 197A is a perspective view of painting results using the basic nozzle tip of the enamel/polish application system according to an exemplary embodiment;

FIG. 197B is a perspective view of painting results using the vibratory spreading system of the enamel/polish application system according to an exemplary embodiment;

FIG. 198 is a perspective view of a tip of a cuticle management system incident on a thumb of a user according to an exemplary embodiment;

FIG. 199A is a plan view of a finger and nail of a user before a first trial including cuticle management with the cuticle management system according to an exemplary embodiment;

FIG. 199B is a plan view of the finger and nail of the user after cuticle management with the cuticle management system and after applying a ridge filling base coat to the nail according to an exemplary embodiment;

FIG. 199C is a plan view of the finger and nail of the user after applying a first coat to the nail according to an exemplary embodiment;

FIG. 199D is a plan view of the finger and nail of the user after applying a second coat to the nail according to an exemplary embodiment;

FIG. 199E is a plan view of a finger and nail of a user before a second trial including cuticle management with the cuticle management system according to an exemplary embodiment;

FIG. 199F is a plan view of the finger and nail of the user after cuticle management by burnishing the nail with the cuticle management system;

FIG. 199G is a plan view of the finger and nail of the user after cuticle management with the cuticle management system and after applying a ridge filling base coat to the nail according to an exemplary embodiment;

FIG. 199H is a plan view of the finger and nail of the user after applying a first coat to the nail according to an exemplary embodiment;

FIG. 199I is a plan view of the finger and nail of the user after applying a second coat to the nail according to an exemplary embodiment;

FIG. 199J is a plan view of an intermediate step between the depiction of FIG. 199E and FIG. 199F, in which cuticle debris and misplaced burnishing toolpaths are evident, according to an exemplary embodiment; and FIG. 200 is a side perspective view of the end of the mobility mechanism system and a cuticle management system with emphasis on a cuticle management tool configured to push against the cuticle and proximal nail fold engaged with the nail of the left index finger of the hand of the user according to an exemplary embodiment.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope is defined solely by the claims.

DETAILED DESCRIPTION OF EMBODIMENTS

A system, device and method is described for providing a salon-quality manicure. The system, device and method may be fully automatic, e.g., a user can insert their hand into the device and receive a complete salon-quality manicure, or semi-automatic, e.g., a user can control one or more functions of the device. The system, device and method may be configured for use in the user's home or in a commercial setting.

The use of terms such as "finger", "thumb" and "nail" and the like should not be construed as limiting. The system, device and method may be configured for toes and toenails; a combination of fingers, fingernails, toes and toenails; or non-human appendages.

In some exemplary embodiments, substantial processing may occur on computers and systems outside of the enclosure. For example, vision processing may occur in a cloud computing system in order to limit requirements on processors within the enclosure.

In other exemplary embodiments, all processing may be performed within the enclosure. For example, as processors become less expensive and more powerful, vision processing may be performed locally.

In some embodiments, the nail care system 100 may be a consumer-focused automated appliance that delivers better quality nail services with greater speed and more convenience than a visit to the nail salon. The typical services that are offered at professional salons are: enamel removal, cuticle management, nail shaping, and enamel application. In some embodiments, the nail care system 100 is a compact appliance that performs all of these manicure steps (e.g., in a user's home) with the desired flexibility in shape and color of a user's nails while minimizing clean-up. The value for the user is, for example, speed and convenience. The consumer can use consumables such as enamel with the nail care system 100, which consumables may be customized in formulation and/or structure such as packaging (e.g., one or more disposable cartridges) for the nail care system 100.

In some embodiments, apparatuses and methods for automated nail care are provided. In some embodiments, an apparatus for automated nail care includes at least one of (e.g., all of) a vision system for generating one or more images of a user's one or more nails (e.g., all of a user's finger nails and/or toe nails), an enamel removal system for removing enamel from a user's one or more nails, a cuticle management system for managing one or more cuticles of a user's one or more nails, a nail shaping system for shaping a user's one or more nails, and an enamel application system for applying enamel to a user's one or more nails.

In some embodiments, the apparatus for automated nail care may include at least one robotic element (e.g., one or more robotic arm(s), platform(s) and/or actuator(s)) forming part of at least one of the vision system, the enamel removal system, the cuticle management system, the nail shaping system, and the enamel application system.

In some embodiments, the vision system of the apparatus for automated nail care includes at least one camera for image acquisition.

In some embodiments, the vision system includes at least one processor and non-transitory computer-readable memory storing instructions for causing the at least one processor to acquire one or more images using the at least one camera according to a defined image acquisition protocol. In some embodiments, the defined image acquisition protocol includes at least one of: imaging the user's one or more nails using one or more imaging frequencies, acquiring multiple images of the fingernail from different angles, imaging the user's one or more nails in the presence of structured light, and imaging the user's one or more nails using a photometric stereo technique.

In some embodiments, the at least one processor of the vision system performs image analysis in order to identify the user's one or more nails from the one or more images. In some embodiments, the image analysis generates a point cloud representing the user's one or more nails. In some embodiments, the image analysis comprises generating a three-dimensional representation of the user's one or more mails from multiple images. In some embodiments, the image analysis comprises edge detection. In some embodiments, the image analysis distinguishes between one or more of skin, cuticle, nail fold and/or nail. In some embodiments, the image analysis utilizes knowledge of an original projected pattern of structured light in an image to determine how the pattern is modified or distorted in the one or more images to infer three-dimensional information about the user's one or more nails. In some embodiments, the vision system further comprises a light source for providing structured light. In some embodiments, the light source comprises a projector, one or more light-emitting diodes emitting light through a patterned sheet or mask, or a laser that sweeps across one or more surfaces of the user's one or more nails. In some embodiments, light from the source may be reflected off one or more surfaces in order to further structure the light or to create specific forms of reflection.

In some embodiments, the enamel removal system of the apparatus for automated nail care includes an applicator for absorbing an enamel removal agent, and a tool member coupled to the applicator for bringing the applicator into contact with the user's one or more nails. In some embodiments, the enamel removal system further includes a fluid delivery device for providing the enamel removal agent to the applicator.

In some embodiments, the nail shaping system of the apparatus for automated nail care includes at least one of a robotically positioned nail clipper, photo-chemical etcher for etching of the user's one or more nails, one or more laser cutting devices, and a sanding device. In some embodiments, the sanding device comprises one or more of a vertical sanding drum, a horizontal sanding drum, and an oscillating sanding pad.

In some embodiments, the enamel application system of the apparatus for automated nail care includes a dispensing system for dispensing enamel, and an applicator for applying the enamel to the user's one or more nails. In some embodiments, the dispensing system includes at least one of a pump and a fluid delivery system. In some embodiments, the applicator includes at least one or more of one or more spreading applicators, one or more rotational spreaders, one or more horizontally rotating spreaders, one or more vertically rotating spreaders, one or more brushes, and one or more nozzles. In some embodiments, the nozzle(s) are held generally in contact with the nail plate. In some embodiments, the nozzle(s) operate at a distance from the nail plate (e.g., including a distance of 0, i.e., in contact with it). In some embodiments, the nozzle(s) are optionally used with one or more follower devices, that are used to, for example, assist in spreading the enamel or to enable more precise horizontal or vertical positioning of the nozzle(s).

In some embodiments, the apparatus for automated nail care includes at least one cartridge (e.g., disposable cartridge) for housing at least one of (e.g., all of) enamel, an enamel removal agent and associated components, e.g., absorbent material and/or scrapers and picks for removal or repositioning of enamel and nail shaping agents such as for example buffing, grinding, or ablating disks, wheels, drums, pads, or other useful shapes.

Additional details regarding illustrative embodiments are described below and throughout this document.

DESCRIPTION OF ILLUSTRATIVE EMBODIMENTS

In some embodiments, the nail care system 100 may include one or more systems or sub-systems for performing robotic manicures. These sub-systems can include, for example, one or more (e.g., two, three, four, all) of a vision system, enamel removal system, nail shaping system, cuticle management system and enamel application system. Examples regarding these subsystems according to some embodiments are provided below.

Figure 1:
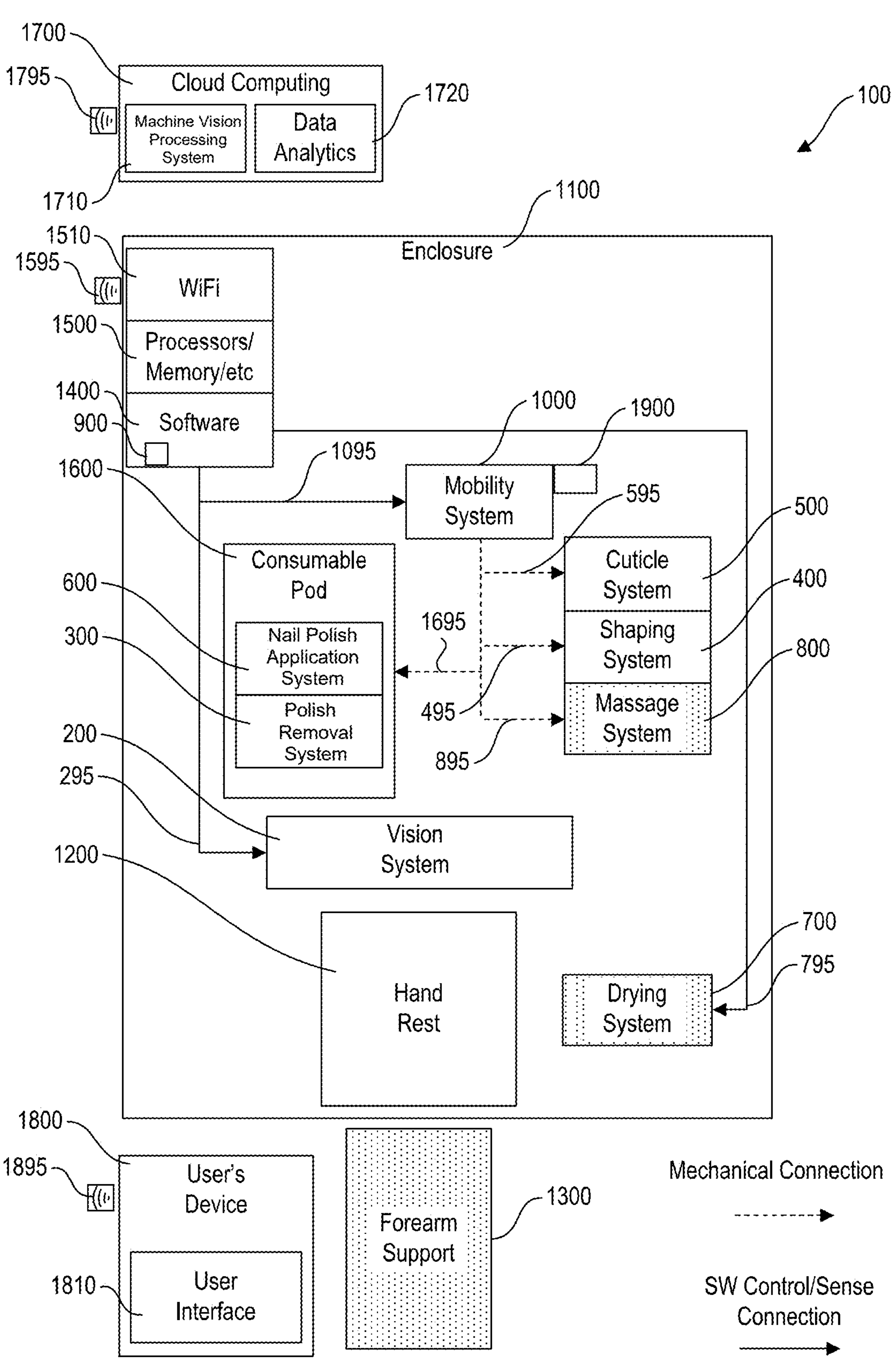
FIG. 1 is a schematic diagram of a first system for nail care according to an exemplary embodiment.

FIG. 1 is a schematic diagram of a first system 100 for nail care. The system 100 may include one or more of the following: a nail care system 100; including one or more of: a vision system 200; an enamel/polish removal system 300; a nail shaping system 400; a cuticle management system 500; an enamel/polish application system 600; an accelerated drying system 700; a hand massage system 800; a nail identification/diagnosis/estimation of conditions system 900; a mobility mechanism system 1000; an enclosure 1100;

a hand/foot rest system 1200; an ancillary forearm support system 1300; a computer software system 1400; a computer hardware system 1500; a consumable cartridge/pod system 1600; a cloud computing system 1700; a user device 1800; and a multi-tool system 1900. The system 100 may perform one or more of methods 2100, 2200, 2300, 2400, 2650, 2700, 2800 and 3100 and architectures 2500 and 2600, either alone or in combination with other methods in any suitable combination without limitation.

In an exemplary embodiment, the system 100 may include one or more of the vision system 200; the enamel/polish removal system 300; the nail shaping system 400; the cuticle management system 500; the enamel/polish application system 600; the accelerated drying system 700; the hand massage system 800; the nail identification/diagnosis/estimation of conditions system 900; the mobility mechanism system 1100; the hand rest/foot rest system 1200; the ancillary forearm support system 1300; the computer software system 1400; the computer hardware system 1500; the cartridge/pod (e.g., consumable) system 1600; the cloud computing system 1700; the user device 1800; the multi-tool 1900 (for use with, e.g., one or more of systems 300, 400, 500, 600, 700, and the like); the prototype 2000; method 2100 (for use with, e.g., one or more of systems 300, 400, 500, 600, 700, and the like); method 2200 (for use with, e.g., one or more of systems 300, 400, 500, 600, 700, and the like); method 2300 (for use with, e.g., one or more of systems 300, 400, 500, 600, 700, and the like); method 2400 (for use with, e.g., one or more of systems 300, 400, 500, 600, 700, and the like); the architecture 2500; the vision system architecture 2600; the machine vision method 2650; the path plan method 2700 (for use with, e.g., one or more of systems 300, 400, 500, 600, 700, and the like); method 2800 (for use with, e.g., one or more of systems 300, 400, 500, 600, 700, and the like); method 3100 (for use with, e.g., one or more of systems 300, 400, 500, 600, 700, and the like); the consumable pod 1600 may include one or more of systems 300, 400, 500, 600, 700, and the like. The hand massage system 800, the hand rest/foot rest system 1200, and the ancillary forearm support 1300 may be integrated or separate components.

The system 100 may include a backup battery (not shown). The system 100 and/or the enclosure 1100 may be powered via power cord (e.g., configured to engage with power connection 1150, FIG. 4).

The mobility system 1000 may be operatively and physically directly connectable to each of the shaping system 400, the cuticle system 500, the massage system 800, the removal system 300, the application system 600, and/or the consumable pod 1600 via respective mechanical connections 495, 595, 895 and/or 1695.

The computer software system 1400 and the computer hardware system 1500 may be operatively connected to a communication device 1510 (such as Wi-Fi) and a transmitter/receiver 1595. The cloud computing system 1700 may include a vision processing system 1710 and a data analytics system 1720. The cloud computing system 1700 may be operatively connected to a communication device (such as Wi-Fi) and a transmitter/receiver 1795.

The computer software system 1400 and/or the computer hardware system 1500 may be operatively connected to the vision system 200 via a first software control or sense connection 295. The computer software system 1400 and/or the computer hardware system 1500 may be operatively connected to the drying system 700 via a second software control or sense connection 795. The computer software system 1400 and/or the computer hardware system 1500 may be operatively connected to the mobility system 1000 via a third software control or sense connection 1095.

The user's device 1800 may be operatively connected to a communication device (such as Wi-Fi) and a transmitter/receiver 1895. The user's device 1800 may include a user interface 1810.

As described in greater detail below, the forearm support 1300 may be separate from, attachable to, or integrated into the enclosure 1100.

All descriptions of the system, device and method are not intended to be limiting. Each system may be completely separate from other systems, may use components in common, and/or or may have components principally for another system. For example, the mobility system 1000 may have components required only for the application system 600.

Some exemplary embodiments may lack one or more of these systems. For example, the system 100 may lack the application system 600 if it is intended only to provide so-called "naked manicures" (i.e., without nail polish).

In other exemplary embodiments, one or more systems may be temperature-controlled so that the systems may be warmed or cooled for the user's comfort or to achieve therapeutic effects.

In some exemplary embodiments, one or more systems may be separate machines or accessories. For example, the accelerated drying system 700 may be a separate fan; and/or a nail shaping system 400 may be available as a separate machine.

In some exemplary embodiments, additional or substitute fluids may be contained in the consumables cartridge 1600. For example, cuticle softening fluid, massage fluids, water, and the like may be contained in the consumables cartridge 1600.

A method of operation may be provided for the system 100 as a whole and/or in combination with methods for each of the components of the system 100. For example, the system 100 may be operated with one or more of the following methods: an activation method; a hand rest positioning method; a coarse nail identification method; an enamel removal method; a precise nail identification method; a nail shaping method; a cuticle management method; a cleanup method; an application method; a drying method; and/or a user interaction method.

The activation method may include one or more of the operations described below in the disclosed order or in other suitable orders. For example, the user may place his or her hand in the enclosure 1100 at various points prior to operations beginning, or may select some operations for inclusion or exclusion after the start of the manicure. The activation method may include one or more of the following operations: user places a consumable cartridge 1600 within the designated receiver of the enclosure 1100; user uses his or her device 1800 and/or indicators/controls on the apparatus to indicate which step(s) the user wishes to have done and to specify any optional characteristics (e.g., nail shape); in some embodiments, status and control information may be provided on the enclosure 1100 so that a device (e.g., 1800) is not necessary to operate the apparatus; user places one hand within the enclosure 1100 on the hand rest 1200; user initiates the manicure; in some embodiments, the nail identification system 100 also monitors the continued presence of the user's hand; if the user's hand is removed or changes position substantially, any ongoing process may be interrupted and paused; when an operation is interrupted or paused, any tool currently being used may be replaced in its appropriate holder (e.g., the consumable cartridge 1600); in some embodiments, system 100 components are used to provide the user with status information or cues for next steps (e.g., the LEDs of the nail identification system may be illuminated to suggest to the user that they should place a hand within the enclosure 1100); and/or in some embodiments, the lights of the nail identification system may change color or intensity to indicate status to the user.

The hand rest positioning method may include one or both of the following: in some embodiments, the system 100 may have a means of requesting that the user move the hand rest 1200 to the appropriate position depending on the operation(s) being performed and on which finger or nail they are being performed; and/or in other embodiments, the system 100 may autonomously move the hand rest 1200 to the appropriate position depending on which operation(s) are being performed and on which fingers or nails they are being performed.

The coarse nail identification method may include one or more operations listed below in any particular order: the mobility system 1000 and all other tools may be moved (e.g., 300, 400, 500, 600, 700, 800, etc.), if necessary, so that they do not block image acquisition of the user's nails by the cameras (e.g., the vision system 200); the vision system 200 may capture one or a series of images of the user's hand, with some or all images each illuminated by a different source or sources of light; photometric stereo techniques may then be used to estimate a normal map (i.e., map of the unit normal vectors for each small region of the nail plate); integration of this normal map may provide an estimate of the shape of the nail plate; the vision system 200 may capture a series of images using at least two different cameras at essentially the same time; these images may be used for geometric stereo (i.e., binocular vision); additional processing may be performed on some or all of these images; in one embodiment, holistically-nested edge detection may be used to identify edges in certain images; a combination of algorithms may be used to determine the general location of the user's nails—to the extent of roughly identifying their locations with an error of not more than approximately +/−5 mm (+/−0.1969 inch); fine identification may not be required at this stage because the enamel removal step (e.g., using the enamel/polish removal system 300) may be done in a way that does not require fine identification; the presence of nail polish may confound fine identification efforts (for example, the user may be wearing a light shade of nail polish that, when the polish is present in the nail folds, makes it extremely difficult to identify the nail folds visually and/or the user may be wearing a shade of nail polish that closely matches the shade of the enclosure interior); coarse nail identification may involve similar methods as fine nail identification, but has significantly reduced requirements. Methods used for precise nail identification may be modified or eliminated for coarse nail identification. For example, edge detection may not be performed, as location of edges will typically not be required for enamel removal and edge detection may be susceptible to errors because of nail polish or nail art. Similarly, it may not be necessary to establish the shape of the nail plate.

The enamel removal method may include one or more operations listed below in any particular order: the mobility system 1000 may be configured to select an enamel removal tool 300 from a holding area; as part of selecting the enamel removal tool, the mobility system 1000 may unseal a compartment of the consumable cartridge 1600 in which the removal tools are held; the enamel removal tool 300 may be moved across the surface of the nails and surrounding tissue according to a method that removes nail polish from both the broad flat areas of the nails and the nail folds around the edges of the nails without requiring precise visual control of the path of the tool; enamel removal methods may be completed on one nail before moving to the next, or operations may be completed on all nails before a next operation is begun on any nail, or some operations may occur on some nails, with another operation occurring on other nails, or any combination of these; for example, the removal tool 300 may be applied to a first nail so that a removal agent (e.g., nail polish remover) is left on the nail; this may be done to a second nail, allowing time for the removal agent to work on the nail polish of the first nail; the removal tool 300 may then wipe the first nail while the removal agent is allowed to work on the nail polish of the second nail; similar methods may apply to a third nail while polish is removed from the second nail, and so on; the mobility system 1000 may replace the enamel removal tool 300 in the holding area; optionally, the holding area may be partially or completely resealed in order to prevent the enamel removal tool 300 from drying out (which is advantageous if the user pauses the manicure process, for example); and/or if the enamel removal process is interrupted or paused, the enamel removal system 300 may be replaced in the consumable cartridge 1600.

The precise nail identification method may include one or both operations listed below in any particular order: once enamel has been removed, precise nail identification may be carried out; and/or one or more of several techniques may be used for precise nail identification including the following: photometric stereo, in which an object is imaged with illumination coming from different sources; analysis of the image variations allows estimation of surface features (such as height) from the changes in the way light reflects off the various surfaces; geometric stereo, in which the same object is imaged by cameras in different positions; disparities in the images allow calculation of the relative locations of features within the images; these calculations may be used to gather additional information (e.g., the three-dimensional location of the nails) and may be used to provide additional verification of information determined in other ways (e.g., using the three-dimensional location of nail plate features to verify or improve the nail shape estimate developed from photometric stereo); edge detection, using any of a variety of algorithms (e.g., holistically-nested edge detection); and other methods described herein.

The nail shaping method may include one or both operations listed below in any particular order: this nail shaping method may be done before or after the cuticle management method (or without the cuticle management method); the mobility system 1000 selects the nail shaping tool 400; images of the user's nails are displayed to the user on the user's device 1800, along with options for various nail shapes and lengths; in some embodiments, only nail shapes and lengths that are currently possible to create on the user's nails are displayed (e.g., only those shapes and lengths that do not require additional nail plate extents); in other embodiments, "impossible" nail shapes are displayed so that the user may gradually achieve them over successive manicures as the nails grow out; in some embodiments, the process of selecting the shapes and lengths of the nails occurs before other operations of the manicure are begun; the mobility system 1000 moves the nail shaping tool 400 along the free edge of the nail plate using a path designed to create the user's desired nail shape and length as material is removed by the nail shaping tool 400; in some embodiments, multiple passes of the nail shaping tool 400 are used, with each pass removing only a small amount of material, the successive operation of the passes ultimately achieving the desired nail shape and length; in some embodiments of the system, subsections of the length of the free edge of the nail plate are individually brought into conformity with the user's desired nail shape and length, with the desired nail shape and length achieved when all subsections of the length of the free edge of the nail plate have been shaped; and in some embodiments, images are obtained from the cameras of the nail identification system during the nail shaping method; in some embodiments, if the user's hand is removed from the system 100, the operation is paused; in some embodiments, if the user's hand changes position, the nail shaping path is updated to reflect the new position of the hand to continue to create the user's desired nail shapes and lengths; and/or when the nail shaping method is complete, the mobility system 1000 replaces the nail shaping element 400 in its holder. In some embodiments, the images obtained from the cameras of the nail identification system during the nail shaping method are used to perform one or more of the following: determine whether the user's hand is still present; and/or determine whether the user's hand has moved; and/or monitor progress of the nail shaping; and/or display nail shaping progress on the user's device 1800; and/or estimate the differences between the user's desired nail shape and length and current progress toward the desired shape and length; and/or provide an estimate of the remaining time required to complete nail shaping.

The nail shaping system 400 may be configured with an abrasive element having specified operating parameters, e.g., revolutions per minute (RPM), pressure against the nail, oscillation period, angular displacement including angular displacement of the oscillation, and the like. The nail shaping system 400 may be configured in accordance with a path plan. The vision system 200 may be configured to constantly monitor the current shape of the nail and to compare it to the desired shape in order to update the planned path of the tool.

Figure 32:
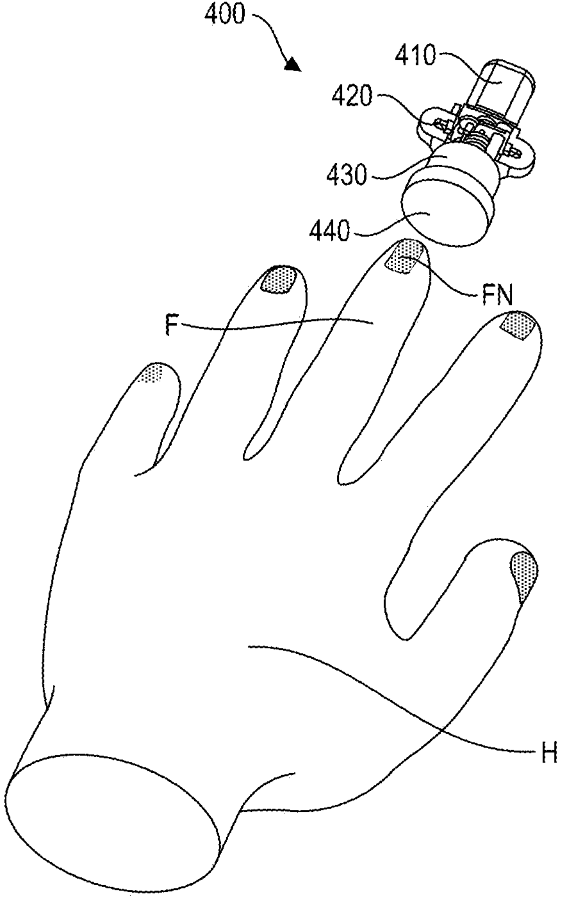
FIG. 32 is a top perspective view of a nail shaping system with emphasis on engagement of the nail shaping system with the nail of the left middle finger of the hand of the user according to an exemplary embodiment.

In some exemplary embodiments, the nail shaping system 400 may include an oscillating disk 440 (e.g., FIG. 32). The oscillating disk 440 may have a diameter of about 0.5 inches (about 1.27 centimeters). The oscillating disk 440 may oscillate back and forth about 20 degrees in each direction. The oscillating disk 440 may oscillate at a frequency of about 37 Hz. The oscillating disk 440 may include an abrasive material. The abrasive material may be glass. The roughness of the abrasive material may be about 180 grit. In some specific exemplary embodiments, the abrasive material may be chosen so that the abrasive material presents little or no risk of discomfort or injury to the user. For example, some embodiments comprise a file constructed of glass with a surface containing a multitude of small, relatively smooth microscopic bumps (in contrast to sandpaper, which may contain a multitude or sharper, more angular features). Such bumps may effectively remove nail plate material (keratin) while having little or no effect on skin.

The cuticle management method may include one or more operations listed below in any particular order: this step may be optionally carried out before or after nail shaping; the mobility system 1000 may select the cuticle management tool 500 from a holding area; the mobility system 1000 may move the cuticle management tool 500 over and around the surface of the nail following a path developed to optimally remove cuticle without requiring precise identification of the location and extents of cuticle; optionally, the nail identification system may be used in conjunction with cuticle management; and/or optionally, the cameras of the nail identification system may be used to capture images of the user's cuticles. The images captured by the cameras of the nail identification system may be used to determine whether the user's hand is still present; and/or determine whether the user's hand has moved; and/or monitor progress of cuticle management; and/or display cuticle management progress on the user's device 1800; and/or estimate the extents of the user's cuticles; and/or plan a path for the cuticle management tool 500 to most effectively and efficiently remove the cuticles; and/or estimate whether the cuticle management operation is complete; and/or provide an estimate of the time required to complete cuticle management.

The cleanup method may include one or more operations listed below in any particular order: the enamel removal system 300 may be used again to remove any dust or debris resulting from nail shaping or cuticle management; the mobility system 1000 may select the appropriate tool from the consumable cartridge 1600; a previously used sponge/brush may be used, or a separate sponge/brush may be used; the mobility system 1000 may move the cleanup tool, e.g., system 300, over the surface of the nail and the surrounding tissue following a path to effectively remove dust and debris; optionally, the vision system 200 may be used for the cleanup; and/or the mobility system 1000 may replace the cleanup tool (e.g., 300) in the consumable cartridge 1600.

The application method may include one or more operations listed below in any particular order: the mobility system 1000 may select the application tool 600; as part of selecting the application tool 600, the reservoir or reservoirs containing the nail polish and any ancillary fluids (e.g., base coat or topcoat) may be unsealed and made available for use; one or more processors may control a dispensing device of the application tool 600 to deliver precise amounts of fluid (e.g., base coat, nail polish, or topcoat) to a nozzle of the tool 600; the nozzle may be moved over the surface of the nail plate according to a path that ensures one or more of complete coverage, no nail polish applied to tissues surrounding the nail plate, and/or maximal evenness of the coat (e.g., uniformity of thickness, lack of drips, lack of thin spots, and the like); in some embodiments, the nozzle may describe the outer boundaries of the nail plate initially, then moving to fill in the bulk of the area; in some embodiments, the nozzle may describe a boustrophedonic path (e.g., "cornrows"); in some embodiments, the nozzle may describe a spiral path; in some embodiments, the spiral may start toward a center of the nail plate and may gradually alter its shape as it widens so that at the end it confirms to the extents of the nail plate; in other embodiments, the spiral path may start by outlining the extents of the nail plate, gradually becoming more nearly circular as it spirals in towards its ending point; in some embodiments the distal tip of the nozzle may be intentionally held in contact with the nail plate; in some embodiments, the distal tip of the nozzle may be held a small distance above the nail plate (e.g., about 0.5 mm (about 0.01969 inch)) so that there is only fluid contact with the nail plate, which may help prevent subsequent coats from marring previously applied coats; when the application method is complete, the mobility system 1000 may replace the application tool 600; if the application method is interrupted or paused, the mobility system 1000 may replace the application tool 600 in the consumable cartridge 1600; and/or in some embodiments, said replacement serves to prevent any fluid present in the application system 600 (e.g., at the nozzle tip) from hardening.

The drying method may include one or more operations listed below in any particular order: a drying system 700 (e.g., a fan) may be activated to dry the user's nails more rapidly; in some embodiments, the drying system 700 may be integral to the system 100 and operate on the user's nails while they are within the enclosure 1100; in other embodiments, the user may remove their hand from the enclosure 1100 and place it near the enclosure 1100 at a location where the drying system 700 operates; in some embodiments, images from the cameras of the nail identification system may be used to estimate how dry the user's nails are and provide guidance on when it is appropriate to remove the hand from the enclosure 1100; and/or in other embodiments, the drying system 700 may be entirely separate from the system 100, with the user placing their hand appropriately and then activating the drying system 700.

The user interaction method may include one or more operations listed below in any particular order: the machine vision method (e.g., 2650); in some embodiments, the cameras of the nail identification system may be used to provide images of the operations of the manicure or of the results of those operations; in some embodiments, augmented reality techniques may be used to show the results of applying a particular shade or type of nail polish to the user's nails; in some embodiments, images of the user's nails may be used to provide confirmation or verification of operations the user has indicated he or she desires to be carried out; in some embodiments, images of the user's nails, and/or information regarding the user's previously used shades of nail polish, and/or information of current or imminent fashion trends may be used to provide the user with recommendations for future nail polish choices; in some embodiments, a user may provide an image of clothing or an accessory so that nail polish shades or types may be suggested; in some embodiments, LEDs used for photometric stereo may also be used to provide status to the user or hints to guide the user's actions (for example, after a pod 1600 is inserted in the enclosure 1100, the photometric stereo LEDs may be illuminated to indicate that the user should place a hand within the enclosure 1100); during operations of the manicure, different colors of LEDs may be illuminated to provide various indications to the user; and/or in some embodiments, a small motor with an offset weight or the like may be included in or near the hand rest 1200. Vibrations could then be used, possibly in conjunction with LEDs and/or indications on the user's device 1800, to provide indications to the users about the status of the manicure or its operations.

Having described various general methods relating to the system 100, the present disclosure turns to detailed descriptions of each of the systems that may be provided in the nail care system 100.

The enclosure 1100 may be configured to contain and protect the systems (e.g., 200, 300, 400, 500, 600, 700, 800, and the like) of the nail care system 100. The enclosure 1100 may further comprise at least some status indications and user controls. The enclosure 1100 may be substantially opaque to the frequencies of light used by the nail identification system and may serve to limit and control ambient light in order to improve imaging of the user's hand, fingers, and nails. The enclosure 1100 may further comprise features that permit the user to conveniently place a device 1800 (e.g., phone or tablet) so that the device may be easily viewed and operated with one hand while the operations of the apparatus are being performed. The region of the enclosure 1100 around the user's hand may be colored to improve discrimination between the range of human flesh tones and the background. The enclosure 1100 may further comprise a power and/or data connection (e.g., USB 1160). The power connection 1150 may be intended to provide power to ancillary devices (e.g., the user's device 1800). The electrical connection 1150 may permit charging of the user's device 1800, or may be used by service personnel to test and/or debug the system 100. The electrical connection 1150 may provide a backup means of connection to an external device.

Figure 2:
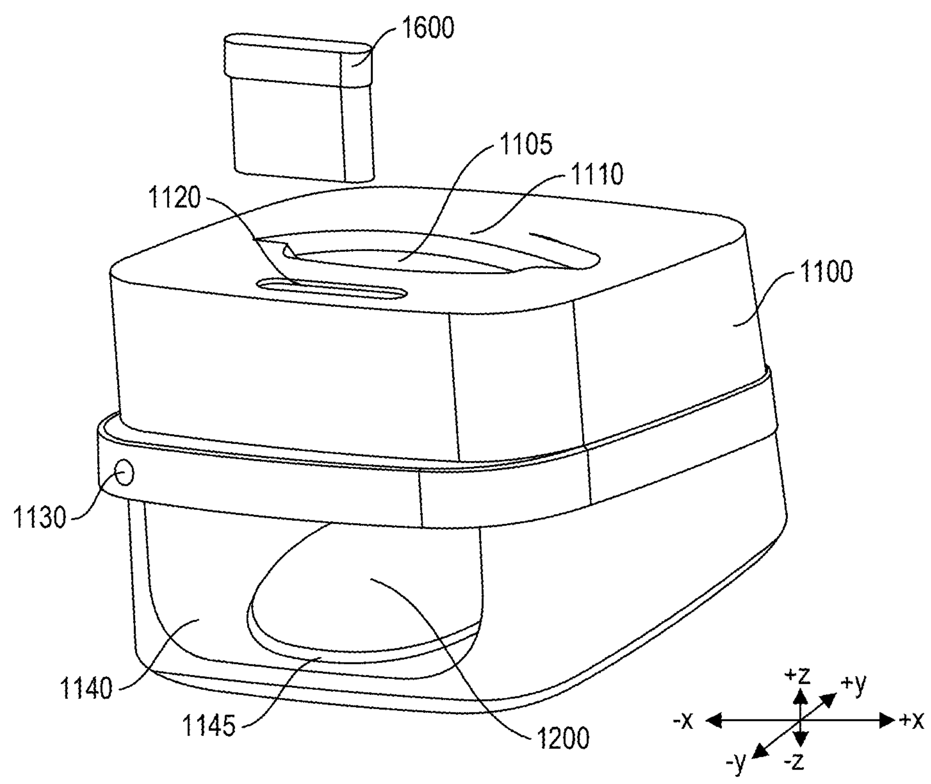
FIG. 2 is a front perspective view of a first type of enclosure of the first system for nail care including a consumable pod/cartridge system and a hand rest system according to an exemplary embodiment.

FIG. 2 is a front perspective view of a first type of enclosure 1100 of the first system 100 for nail care including a consumable pod/cartridge system 1600 and a hand/foot rest system 1200. The enclosure 1100 may include a recessed pocket 1105 for accommodating fingers of a person lifting the system 100 with an integrated handle 1110. The enclosure 1100 may include a cartridge receiver slot 1120 for receiving the cartridge 1600. The enclosure 1100 may include on-device controls 1130, which may be push buttons, a touch screen or any other suitable control device. The enclosure 1100 may include a bay 1140 configured to receive substantially all or part of a user's hand. The enclosure may be configured to include the hand rest system. The bay 1140 may have a recessed portion 1145 in a bottom surface thereof for permitting mounting and movement of the hand rest system 1200 therein.

Figure 3:
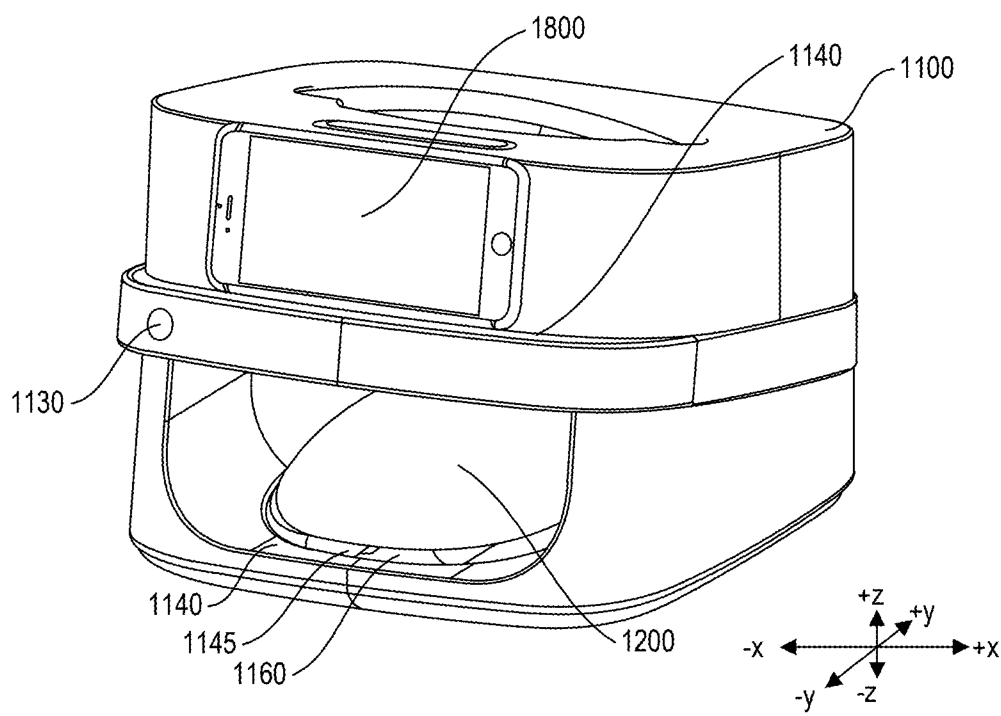
FIG. 3 is a front perspective view of a second type of enclosure of the first system for nail care including a user device according to an exemplary embodiment.

FIG. 3 is a front perspective view of a second type of enclosure 1100 of the first system 100 for nail care including a user device 1800. In this exemplary embodiment, the user's device 1800 may be used as a control device. The user's device 1800 may rest on a shelf of the enclosure 1100. The enclosure 1100 may include user controls or status indicators 1130 in lieu of or in addition to other controls. The enclosure 1100 may include device support features 1140 on a front panel of the disclosure 1100.

Figure 4:
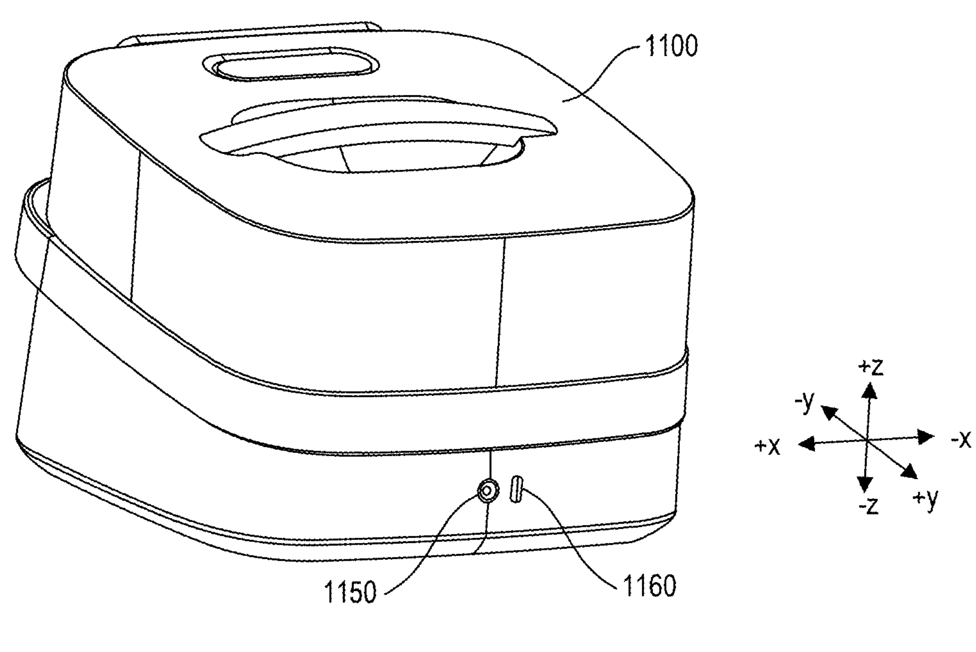
FIG. 4 is a back perspective view of the first type of enclosure of FIG. 2 or the second type of enclosure of FIG. 3 according to an exemplary embodiment.

FIG. 4 is a back perspective view of the first type of enclosure 1100 of FIG. 2 or the second type of enclosure 1100 of FIG. 3. The enclosure 1100 may include a power connection 1150 and/or a USB connection 1160.

The consumable cartridge/pod system 1600 (which may referred to simply as a cartridge or pod) may be configured as shown in FIGS. 2-4 or as shown or described with reference to any of the other embodiments of the present disclosure. In some embodiments, certain consumables required for a manicure (e.g., enamel, base coat, top coat, enamel removal agent, and the like) may be contained within an insertable/removable cartridge or pod 1600.

The pod 1600 may be designed for a single use (e.g., for one complete manicure of two hands or two feet). Advantages of such a design may be, for example, increased flexibility for the user, who can select a particular color for any particular manicure; or increased reliability, as any hardening or blockage of fluid connections may be confined to the removable cartridge 1600 so that the hardening or blockage may be easily remedied by replacing the offending cartridge.

The consumable cartridge 1600 may also serve to minimize the size and expense of the nail care system 100 by obviating the needs to store relatively large amounts (e.g., about 500 mL (about 30.51 cubic inches)) of enamel remover, or to store a substantial volume (e.g., about 500 mL (about 30.51 cubic inches)) of enamel removal sponges, and the like. The consumable cartridge 1600 may also improve safety by obviating the need to store significant volumes of, for example, acetone, which is flammable. The consumable cartridge 1600 may also allow a subscription model so that users are ensured a steady supply of cartridges without excessive storage requirements. The subscription model may permit users to keep up with current fashion trends without significant outlay in colors that become outmoded.

In one embodiment, the consumable cartridge 1600 may include one or more of the following: one or more reservoirs, each containing a fluid (e.g., base coat, topcoat, enamel, enamel remover); one or more fluids in the reservoirs; one or more dispensers, each with provision to operably couple to the mobility system 1000 of the nail care system 100 to dispense one or more fluids from one or more reservoirs; one or more nozzles for dispensing the one or more fluids to the user's one or more nails; enamel removal tools 300 (e.g., sponges, bristles, and the like), which may have a fluid connection to one or more reservoirs (e.g., one containing acetone); and/or other tubing as required to transport fluid from reservoirs.

In the exemplary embodiment, all fluids that may harden (e.g., base coat, topcoat, enamel), along with all associated reservoirs, dispensers, nozzles, and interconnecting tubes may be contained within the consumable cartridge/pod 1600. An advantage of this embodiment, as mentioned above, is that the consequences of any undesired hardening are confined to the consumable cartridge/pod 1600 and may be easily remedied by replacing it.

In the exemplary embodiment, the cartridge/pod 1600 may comprise operable connections to the mobility system 1000 for tools that require it. For example, dispenser(s) (e.g., the enamel/polish application system 600) may feature an operable connection that permits the mobility system 1000 to actuate the dispenser without a permanent connection. Similarly, a shaping tool (e.g., the nail shaping system 400) may comprise an operable connection to the mobility system 1000 so that the mobility system 1000 may cause the shaping tool 400 to move (e.g., rotate, oscillate) without a permanent connection or the requirement for relatively expensive motors and the like in the consumable cartridge/pod 1600. Similar provisions may apply to the cuticle management tool 500 or the enamel removal tool 300.

In some embodiments, the operable connection between the mobility system 1000 may provide an additional degree of freedom of operation. For example, the enamel removal tool 300 may feature an additional axis of rotation that can be operated by the mobility system 1000.

The hand rest system 1200 may be configured to provide a comfortable place for the user's hand to rest while the operations of the nail care apparatus are being performed.

The hand rest 1200 may be configured to guide the user in placing the user's hand in the best position for operation of the nail care system 100. Furthermore, the hand rest 1200 may help orient the alignment and position of the user's one or more fingers or toes so that they are well positioned for the operations of the manicure. For example, some spacing between fingers is useful in order to allow a margin for tool operation on one finger and to avoid affecting nearby adjacent fingers. The hand rest 1200 may furthermore position the thumb in order to minimize angular rotation of the thumbnail with respect to other nails.

The hand rest 1200 may be configured to accommodate a wide range of hand sizes (e.g., 1st percentile woman's hand to 99th percentile man's hand).

The hand rest 1200 may be configured to be equally functional with either the left or right hand.

The hand rest 1200 may be colored to provide the best discrimination between the range of human flesh tones and the background.

The system 100 may optionally further comprise a wrist rest or forearm rest 1300 (which may be positioned outside the enclosure 1100) that ensures the comfort of the user and the best pose of the hand for optimal operation of the apparatus. The wrist or forearm wrist rest 1300 may be permanently affixed to the enclosure 1100, may be removably fixed to the enclosure 1100, or may be entirely separate from the enclosure 1100.

The hand rest 1200 may have a fixed position and orientation with respect to the enclosure 1100.

Figure 8:
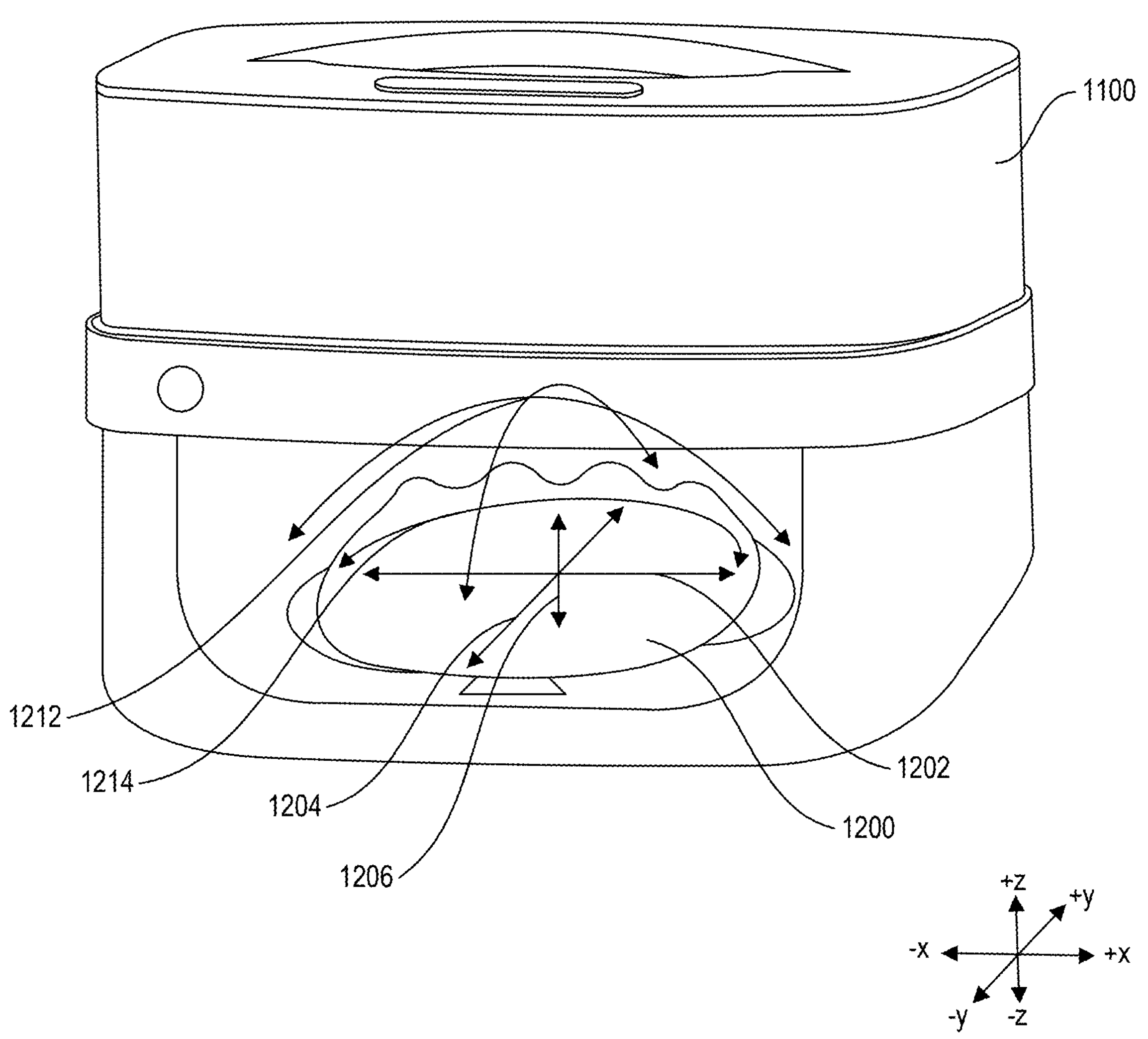
FIG. 8 is the front perspective view of the first type of enclosure of FIG. 2 or the second type of enclosure of FIG. 3 with emphasis on a range of motion of the hand rest system according to an exemplary embodiment.

In some embodiments, the hand rest 1200 may be movably attached to the enclosure 1100. The movable attachment of the hand rest 1200 may permit translation in any of three mutually perpendicular axes (e.g., FIG. 8, i.e., X axis 1202, Y axis 1204, and Z axis 1206). The movable attachment of the hand rest 1200 may further permit rotation about two mutually perpendicular axes (e.g., FIG. 8, rotation about an azimuth 1214 and an elevation 1212). FIG. 8 is the front perspective view of the first type of enclosure 1100 of FIG. 2 or the second type of enclosure 1100 of FIG. 3 with emphasis on a range of motion of the hand/foot rest system 1200.

In some embodiments, the hand rest 1200 may be designed with detents or stops at various positions. The stops or detents may provide a number of discrete positions (translation) and/or orientations (azimuth and elevation) of the hand rest 1200.

In some embodiments, the hand rest 1200 may have continuously variable positions (translation) and/or orientations (azimuth and elevation).

In other embodiments, the hand rest 1200 may further comprise motors and/or sensors that permit the apparatus autonomously to change the position (translation) and/or orientation (azimuth and elevation) of the hand rest 1200.

Figure 5:
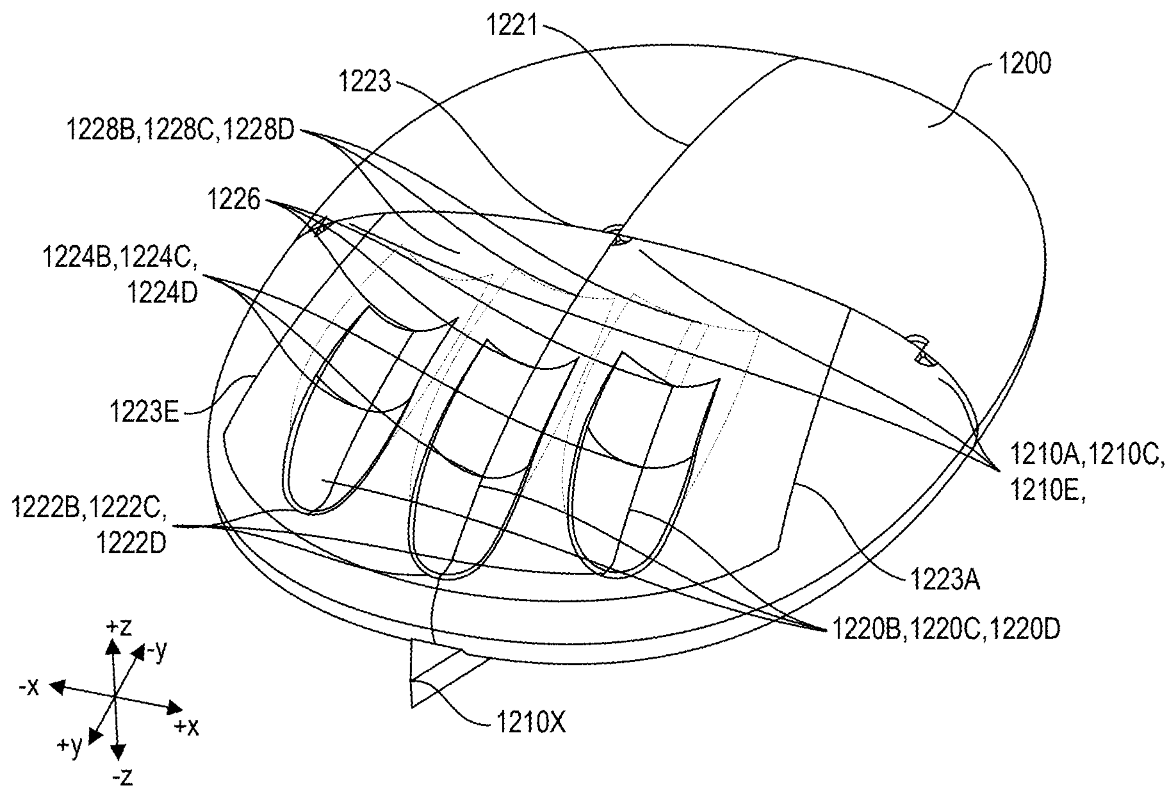
FIG. 5 is a back perspective view of the hand rest system according to an exemplary embodiment.

The hand rest 1200 may comprise markings or other features visible to the nail identification system (e.g., fiducials, see, FIG. 5). The fiducials may, for example, improve geometric stereo, or allow the vision system 200 to calibrate the location and angle of cameras or permit verification of the operation of the vision system 200.

FIG. 5 is a back perspective view of the hand/foot rest system 1200. The hand rest 1200 may include a plurality of fiducial markings. The fiducial markings may include a first fiducial marking 1210A for one of a thumb, a little finger or a side of the hand rest 1200; a second fiducial marking 1210C for a middle finger or a center of the hand rest 1200; a third fiducial marking 1210E for another of the thumb, the little finger or the other side of the hand rest 1200, and a fourth fiducial marking 1210X marking a position near a leading edge and/or a protruding ridge of the hand rest 1200. The second fiducial marking 1210C may be oriented about a centerline 1221 in the Y direction of the hand rest 1200. The first fiducial 1210A, the second fiducial marking 1210C, and the third fiducial marking 1210E may be oriented about a centerline 1223 in the X direction of the hand rest 1200. A first fiducial line 1223A and a second fiducial line 1223E may be parallel to the centerline 1221, and may correspond with a target position for the thumb or the little finger of the user. A relatively shallow depression in a surface of the hand rest 1200 may be provided at or proximate to the first fiducial line 1223A and the second fiducial line 1223E to help guide the user's placement of the little finger, the thumb and/or sides of the hand and provide known points for the vision system 200.

A plurality of finger depressions may be provided in the surface of the hand rest 1200. For example, an index/ring finger depression 1220B, a middle finger depression 1220C, and a ring/index finger depression 1220D in the surface of the hand rest 1200. Each of the index/ring finger depression 1220B, the middle finger depression 1220C, and the ring/index finger depression 1220D may have a respective inflection point 1222B, 1222C, 1222D incident with a surrounding surface of the hand rest 1200. Each of the index/ring finger depression 1220B, the middle finger depression 1220C, and the ring/index finger depression 1220D may descend from the respective inflection point 1222B, 1222C, 1222D to a respective relatively deep well 1224B, 1224C, 1224D. A fiducial centerline 1226 may be provided for each of the index/ring finger depression 1220B, the middle finger depression 1220C, and the ring/index finger depression 1220D. Each of the index/ring finger depression 1220B, the middle finger depression 1220C, and the ring/index finger depression 1220D may ascend from the respective relatively deep well 1224B, 1224C, 1224D to a respective inflection point 1228B, 1228C, 1228D completing the shape of the depressions.

In some exemplary embodiments, the hand rest 1200 may have a length of about 180 mm (about 7.087 inches) (y-direction), a width of about 140 mm (about 5.512 inches) (x-direction), and a height of about 35 mm (about 1.378 inches) (z-direction), which is sized to comfortably fit a wide range of adult hands for at least about 15 minutes. The hand rest 1200 may be equally suitable for the left or right hand. The hand rest 1200 may exhibit bilateral symmetry in order to be equally suitable for the left or right hand.

Figure 6A:
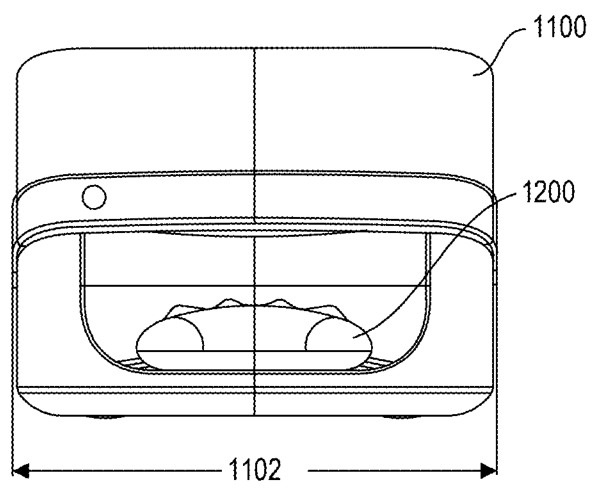
FIG. 6A is a front elevation view of the first type of enclosure of FIG. 2 or the second type of enclosure of FIG. 3 according to an exemplary embodiment.
Figure 6B:
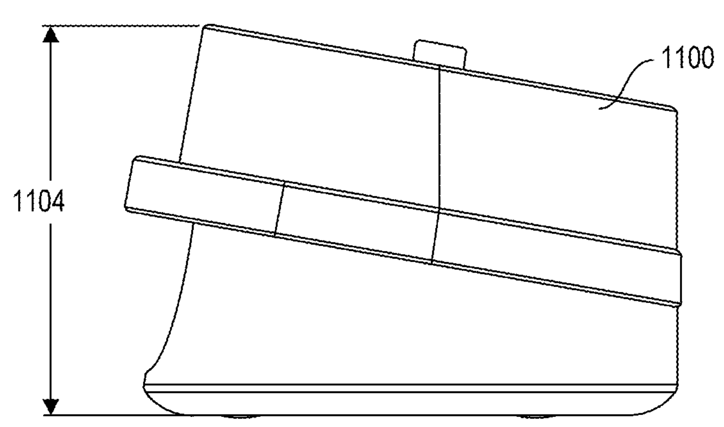
FIG. 6B is a right side elevation view of the first type of enclosure of FIG. 2 or the second type of enclosure of FIG. 3 according to an exemplary embodiment.
Figure 6C:
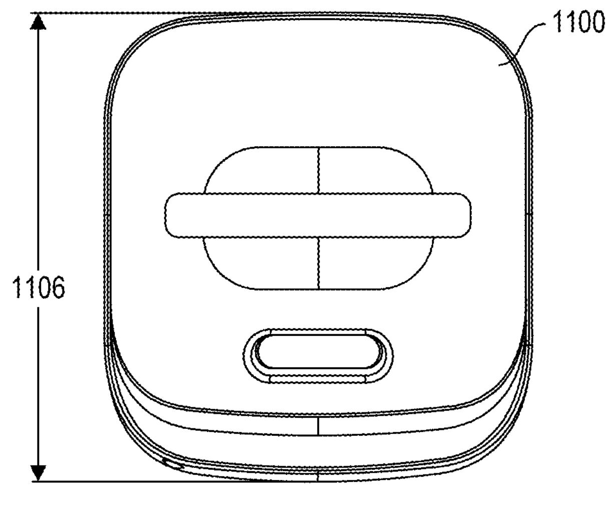
FIG. 6C is a top or plan view of the first type of enclosure of FIG. 2 or the second type of enclosure of FIG. 3 according to an exemplary embodiment.

FIG. 6A is a front elevation view of the first type of enclosure 1100 of FIG. 2 or the second type of enclosure 1100 of FIG. 3. An exemplary width 1102 of the enclosure 1100 may be on the order of about 290 mm (about 11.42 inches). FIG. 6B is a right side elevation view of the first type of enclosure 1100 of FIG. 2 or the second type of enclosure 1100 of FIG. 3. An exemplary height 1104 of the enclosure 1100 may be on the order of about 220 mm (about 8.661 inches). FIG. 6C is a top or plan view of the first type of enclosure 1100 of FIG. 2 or the second type of enclosure 1100 of FIG. 3. An exemplary depth 1106 of the enclosure 1100 may be on the order of about 320 mm (about 12.6 inches). These dimensions are merely exemplary. The enclosure 1100 may be scaled up, scaled down or proportioned in different ratios as necessary.

The enclosure 1100 may be configured to enclose all the functional systems of the nail care system 100 including, for example, one or more of the vision system 200; the enamel/polish removal system 300; the nail shaping system 400; the cuticle management system 500; the enamel/polish application system 600; the accelerated drying system 700; the hand massage system 800; the nail identification/diagnosis/estimation of conditions system 900; the mobility mechanism system 1000; the hand/foot rest system 1200; the computer software system 1400; the computer hardware system 1500; the consumable cartridge/pod system 1600; the user device 1800; and the multi-tool system 1900.

Figure 7A:
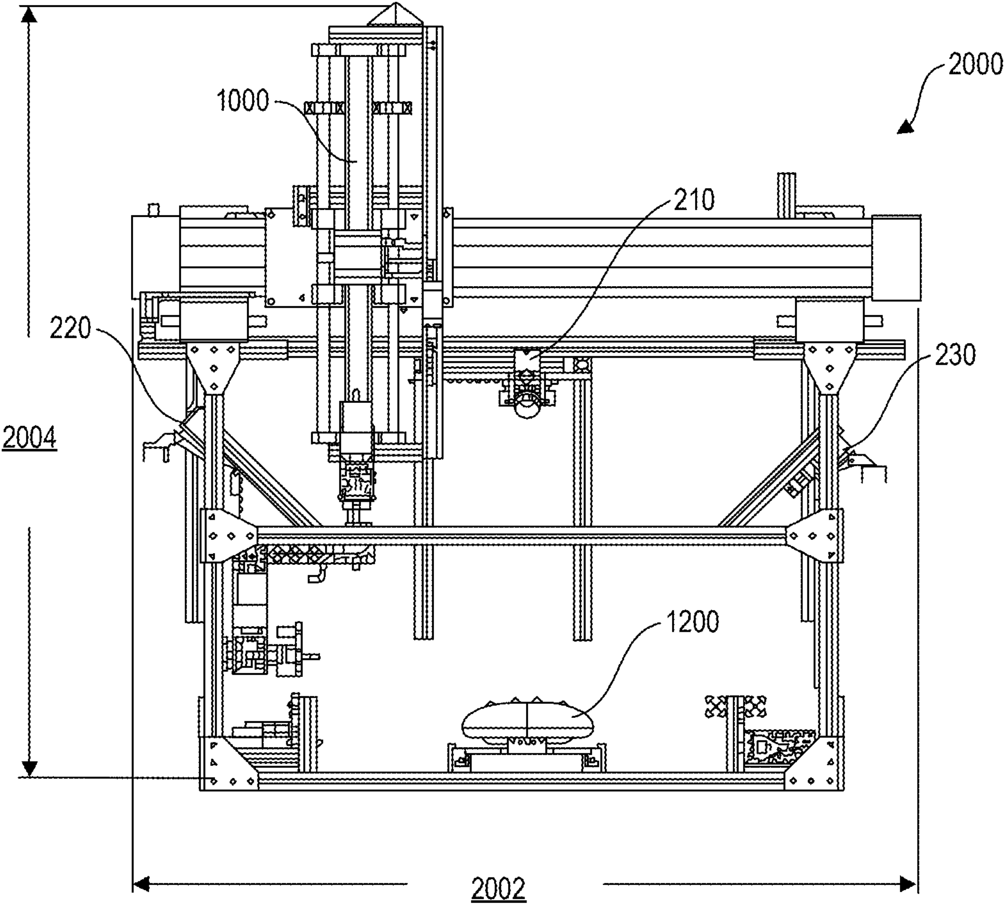
FIG. 7A is a front cross-sectional view of a first prototype of a nail care system according to an exemplary embodiment.
Figure 7B:
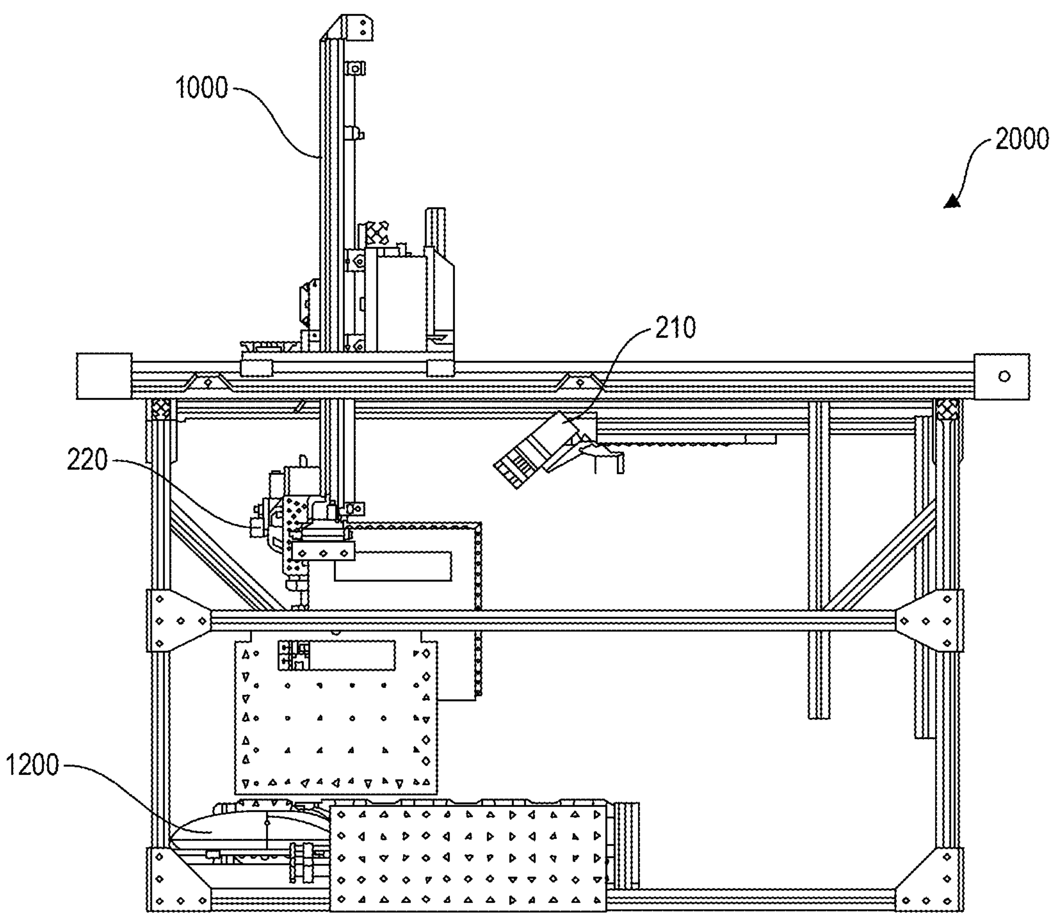
FIG. 7B is a right side cross-sectional view of the first prototype of the nail care system according to an exemplary embodiment.

A scaled-up first prototype 2000 of the system 100 is provided. FIG. 7A is a front cross-sectional view of the first prototype 2000 of the nail care system 100; FIG. 7B is a right side cross-sectional view of the first prototype 2000 of the nail care system 100; and FIG. 7B is a top or plan cross-sectional view of the first prototype 2000 of the nail care system 100. An exemplary width 2002 of the prototype 2000 may be about 850 mm (about 33.46 inches); an exemplary height 2004 of the prototype 2000 may be about 830 mm (about 32.68 inches); and an exemplary depth 2006 of the prototype 2000 may be about 890 mm (about 35.04 inches). These dimensions are merely exemplary. The prototype 2000 is intended to be scaled down, but may be scaled up, or proportioned in different ratios as necessary.

Figure 7C:
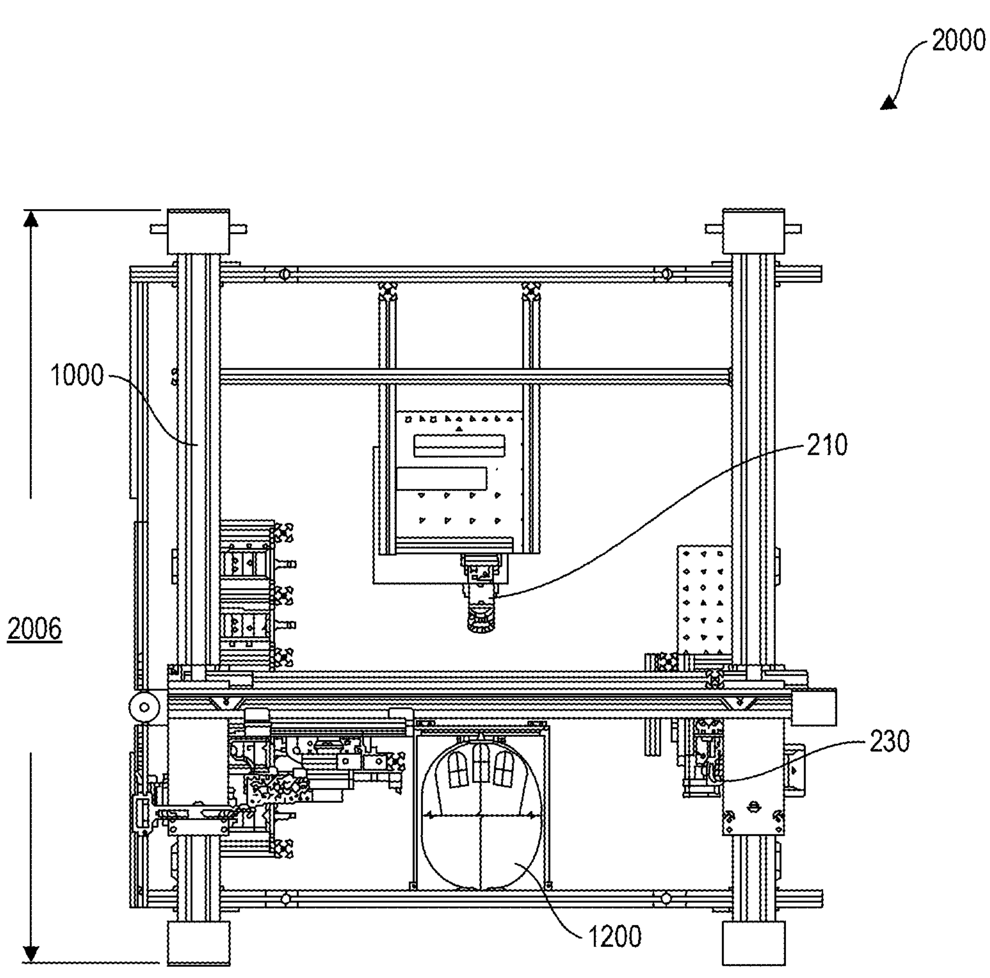
FIG. 7C is a top or plan cross-sectional view of the first prototype of the nail care system according to an exemplary embodiment.

The prototype 2000 may include all the functional systems of the nail care system 100 including, for example, one or more of the vision system 200 (including cameras 210, 220, 230, as shown in FIGS. 7A, 7B and 7C); the enamel/polish removal system 300; the nail shaping system 400; the cuticle management system 500; the enamel/polish application system 600; the accelerated drying system 700; the hand massage system 800; the nail identification/diagnosis/estimation of conditions system 900; the mobility mechanism system 1000 (as shown); the hand/foot rest system 1200 (as shown); the computer software system 1400; the computer hardware system 1500; the consumable cartridge/pod system 1600; and the multi-tool system 1900.

Figure 9:
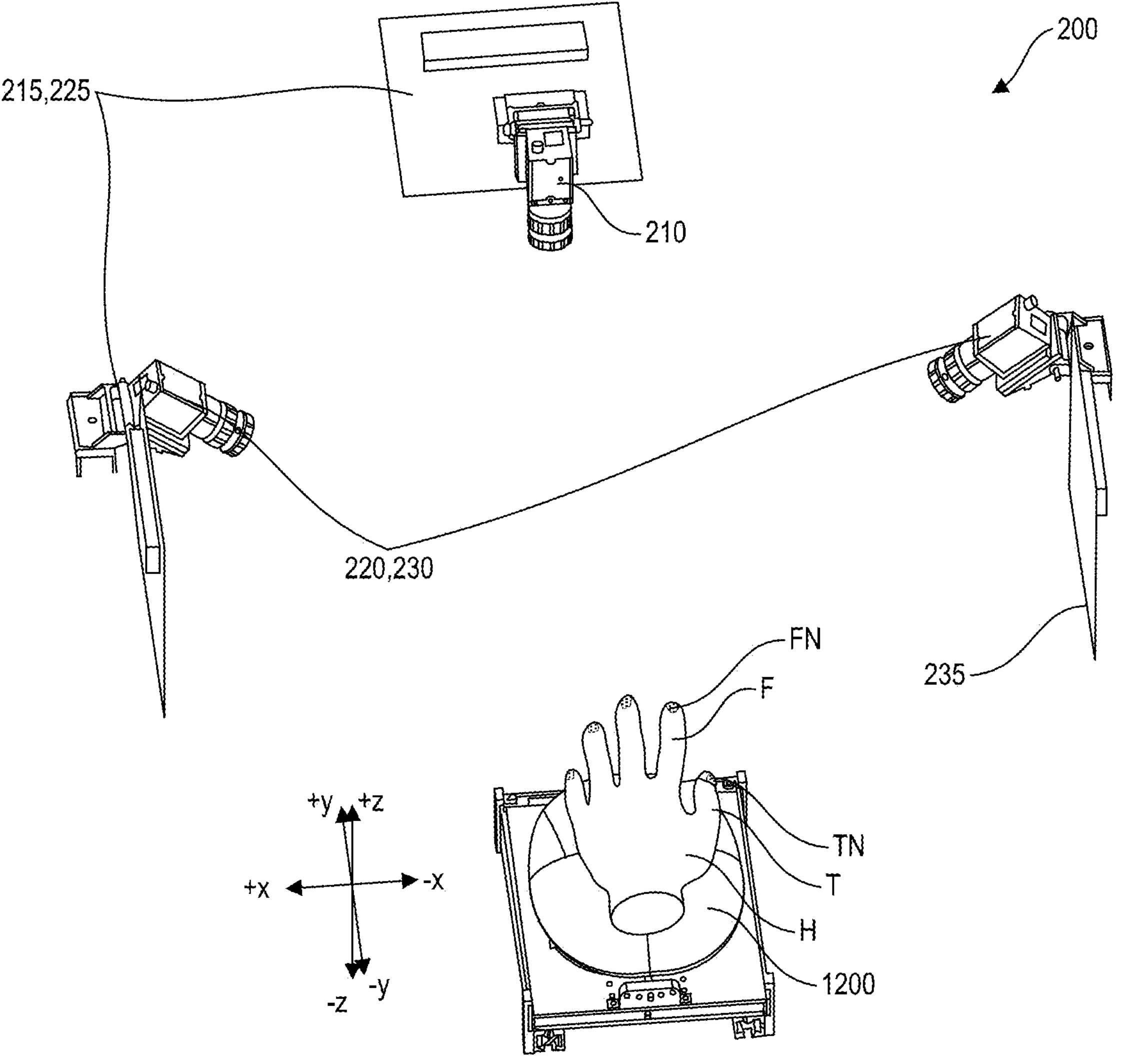
FIG. 9 is a front/top or plan perspective view of a vision system and the hand rest system according to an exemplary embodiment.

A nail identification/diagnosis/estimation of conditions system 900 may be provided. The system 900 may include the vision system 200. FIG. 9 is a front/top or plan perspective view of the vision system 200 and the hand/foot rest system 1200 with a hand H of a user U placed upon the hand rest 1200. The vision system 200 may include three cameras 210, 220, 230 and three corresponding LED lighting arrays 215, 225, 235 for illuminating the user's hand H including each finger F, each fingernail FN, the thumb T, and the thumbnail TN of the user U.

The vision system 200 and the nail identification system 900 may comprise the three cameras 210, 220, 230. One of the cameras 220 may be mounted above and substantially over the user's middle finger nails so that the camera 220 can image all four fingers and at least part of either the left thumb or the right thumb. The other two cameras 210, 230 may be mounted to either side, above the plane of the hand H so that each of the cameras 210, 230 can image either the left thumb or the right thumb along with at least some other fingers.

Other embodiments of the vision system 200 and identification system 900 may comprise one camera and further comprise motors, sensors, and electronics that permit the camera to be moved to determined positions under the control of one or more processors (which may be part of system 1400).

Yet other embodiments of the vision system 200 and identification system 900 may comprise two cameras oriented so that each of the cameras can image the entire hand H from different angles.

Yet other embodiments of the vision system 200 and identification system 900 may comprise one or more cameras and further comprise one or more mirrors that serve to permit imaging of regions of the hand H, fingers F/T, or nails FN/TN that are out of the field of view of one or more of the cameras.

In some embodiments of the vision system 200 and identification system 900, one or more mirrors may be movably mounted and the apparatus may further comprise electronics, motors, and/or sensors that permit one or more mirrors to be repositioned or reoriented under the control of one or more processors (e.g., 1400).

Regardless of specific number and location of the cameras, each is controlled by a processor (e.g., part of 1400), which can configure all features of the camera (e.g., aperture, focus, shutter speed, and the like).

Several LEDs (e.g., about one hundred LEDs) may be mounted within the enclosure 1100 so that illumination of the user's hand H, fingers F/T, and nails FN/TN can be provided from a wide range of angles (for example, through a range of about 180 degrees).

Each of the LEDs may be controlled (i.e., extinguished, illuminated with any degree of brightness, or pulsed in any pattern with any degree of brightness) by one or more processors (e.g., 1400).

Yet other embodiments of the vision system 200 and identification system 900 may comprise other sources of illumination, such as structured light emitters, which project a pattern of dots or lines onto the user's hand, fingers, and nails (see, below). Analysis of the distortions to these patterns in images taken may reveal the shape or location or both of features in the images (such as nails FN/TN, or fingers F/T) (again, see, below).

Yet other embodiments of the vision system 200 and identification system 900 may, in addition to or instead of the above embodiments, further comprise distance sensors (e.g., geometric distance sensors or laser range finders) to assist in determining the location of nails FN/TN or fingers F/T.

Yet other embodiments of the vision system 200 and identification system 900 may comprise acoustic sensors (e.g., ultrasonic transducers) to assist in identifying nail extents, shapes, or locations.

Figure 10:
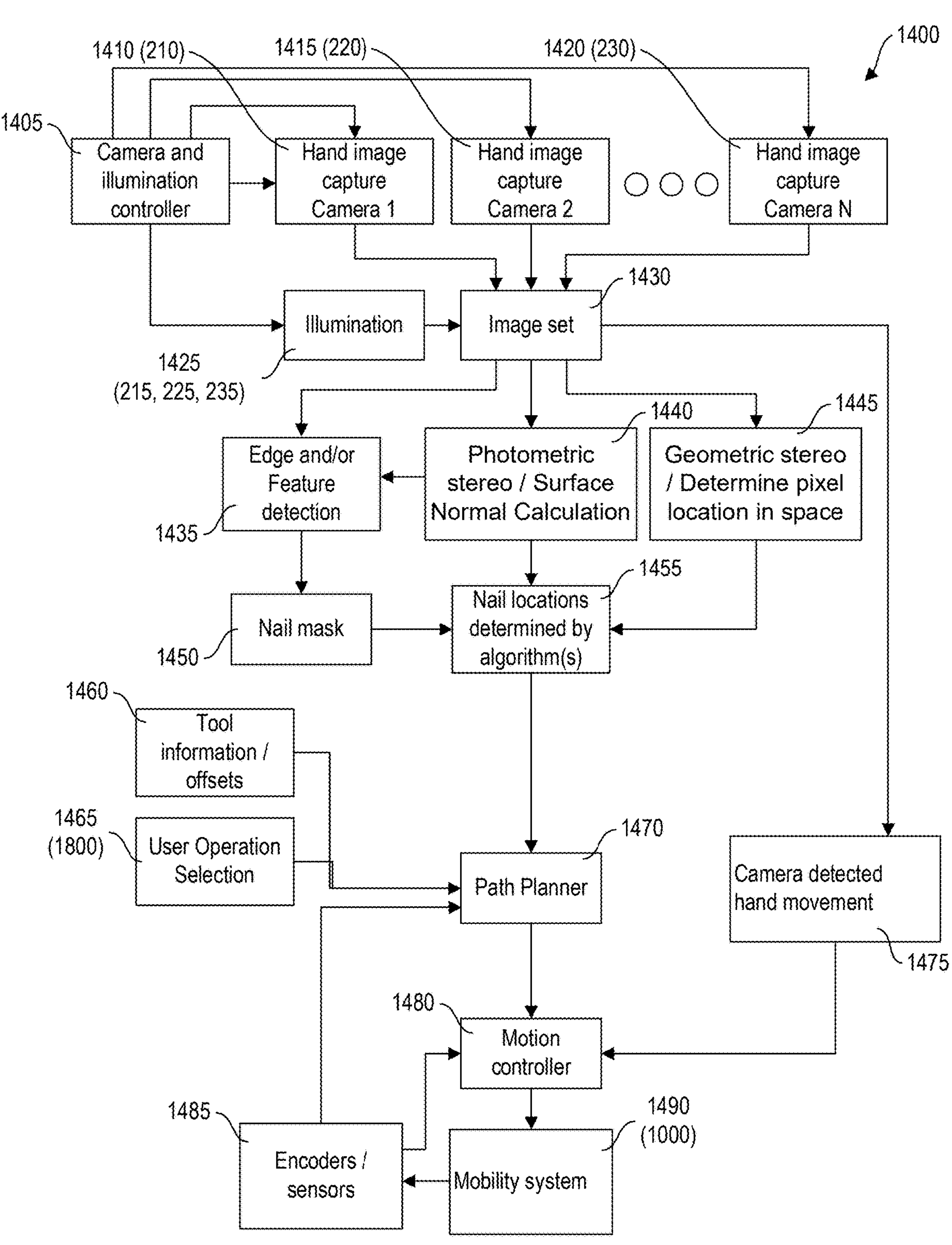
FIG. 10 is a flow chart of a first computer device or system for nail care according to an exemplary embodiment.

FIG. 10 is a flow chart of a first computer device or system 1400 for the nail care system 100. The system 1400 may include a camera and illumination controller 1405, which may be operatively connected to one or more cameras 210, 220, 230. The camera and illumination controller 1405 may be operatively connected to an illumination device 1425, which may be the LED arrays 215, 225, 235. The camera and illumination controller 1405 may be configured to operate the illumination device 1425 and capture an image or a plurality of images from the one or more cameras 210, 220, 230, which may be transmitted and collected as an image set 1430. The image set 1430 may be analyzed with an edge and/or feature detection system 1435. The image set 1430 may be analyzed with a photometric stereo and/or surface normal calculation system 1440. The image set 1430 may be analyzed with a geometric stereo and/or pixel location in space determination system 1445. Output from the photometric stereo and/or surface normal calculation system 1440 may be inputted into the edge and/or feature detection system 1435 for additional analysis. Output from the edge and/or feature detection system 1435 may be inputted into a nail mask system 1450. One or more of the photometric stereo and/or surface normal calculation system 1440, geometric stereo and/or pixel location in space determination system 1445, and the nail mask system 1450 may send output to a nail location determination by algorithm(s) system 1455. Output from the nail location determination by algorithm(s) system 1455 may be sent to a path planner system 1470.

One or more of a tool information/offsets system 1460, a user operation selection system 1465 (which may receive input from the user's device 1800), and encoders and/or sensors 1485 may output information to the path planner system 1470. Also, the encoders and/or sensors 1485 may output information to a motion controller 1480.

The path planner system 1470 may send instructions to the motion controller 1480. Also, the image set 1430 may be sent to a system for detecting hand movement by a camera 1475. The system for detecting hand movement by the camera 1475 may output instructions to the motion controller 1480. The motion controller 1480 may be configured to send instructions to the mobility system 1490, which may be part of the system 1400 or part of the mobility system 1000.

Figure 11:
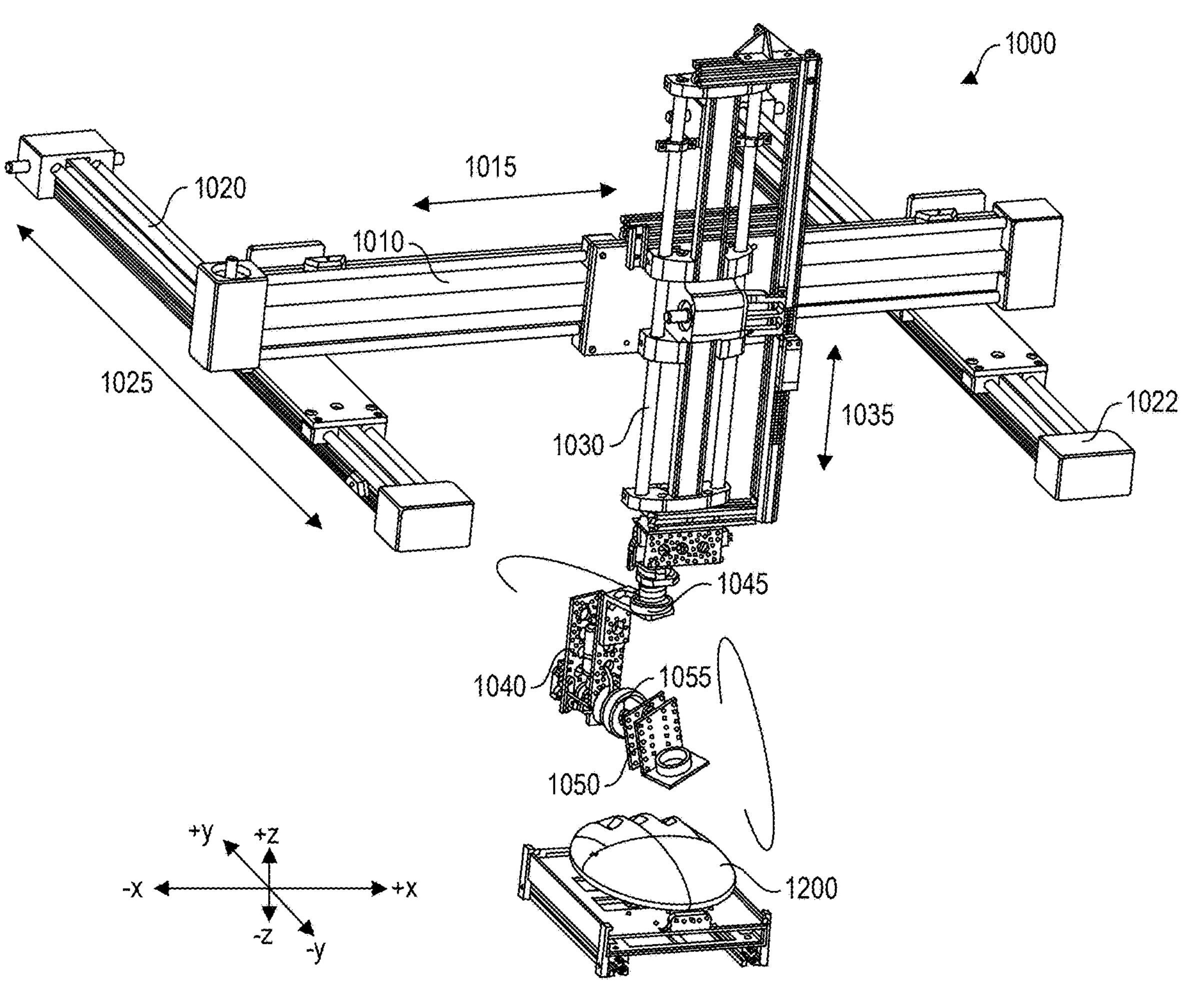
FIG. 11 is a front/top or plan perspective view of a mobility mechanism system and the hand rest system according to an exemplary embodiment.

FIG. 11 is a front/top or plan perspective view of the mobility mechanism system 1000 and the hand/foot rest system 1200. The mobility system 1000 may comprise a multiple degree of freedom gantry. The gantry may have degrees of freedom along three mutually perpendicular linear axes (e.g., X 1015, Y 1025, and Z 1035) and two degrees of freedom around two mutually perpendicular rotational axes (e.g., an azimuth axis 1045 and an elevation axis 1055).

In other embodiments, the gantry may include more or fewer degrees of freedom. In other embodiments, the mobility system 1000 may comprise a delta robot and/or a Stewart platform (not shown), i.e., a type of parallel manipulator that may have six prismatic actuators, commonly hydraulic jacks or electric linear actuators, attached in pairs to three positions on the platform's baseplate, crossing over to three mounting points on a top plate, in which all 12 connections may be made via universal joints.

The mobility system 1000 may further comprise stepper motors to achieve precisely coordinated motion along and between the degrees of freedom. The stepper motors may allow precise, open loop control. In other embodiments, the mobility system 1000 may include standard DC brush motors.

The mobility system 1000 may include encoders on some or all of the degrees of freedom. The encoders may be absolute or relative.

In some embodiments, one or more sensors may be used to measure the force being applied to the user's finger, toe, or nail. For example, an in-line force sensor may be mounted between the gantry system and the attachment point for tools (e.g., the removal tool 300, the shaping tool 400, the cuticle management tool 500, and/or the application tool 600). The force sensor may then provide control software with an estimate of the amount of force being applied. This estimate may be used to improve control. In one exemplary embodiment, force feedback may be used during the shaping operation of the shaping tool 400 to modify the intended path of the shaping tool 400 if applied force begins to increase beyond an appropriate limit. Such an increase in force may signal that the shaping tool 400 is in danger of moving the user's finger or toe, possibly reducing shaping accuracy. In this case, the shaping tool 400 may be moved away from the user's nail so that an appropriate amount of force is applied. Also, for example, force sensing may be used to ensure that the cuticle management tool 500 does not press down too hard on the user's nail plate or skin near the nail plate.

In an exemplary embodiment, the mobility system 1000 includes a first arm 1010 configured for motion in the X direction 1015, a pair of parallel second arms 1020 and 1022 configured for motion in the Y direction 1025, and a third arm 1030 configured for motion in the Z direction 1035. The first arm 1010 may be orthogonal to the second arms 1020, 1022, which may be orthogonal to the third arm 1030. A fourth arm 1040 may be suspended from the third arm 1030 and may be configured to rotate about the azimuth axis 1045. A fifth arm or plate may 1050 may be suspended from the fourth arm 1040 and may be configured to rotate about the elevation axis 1055.

Figure 12:
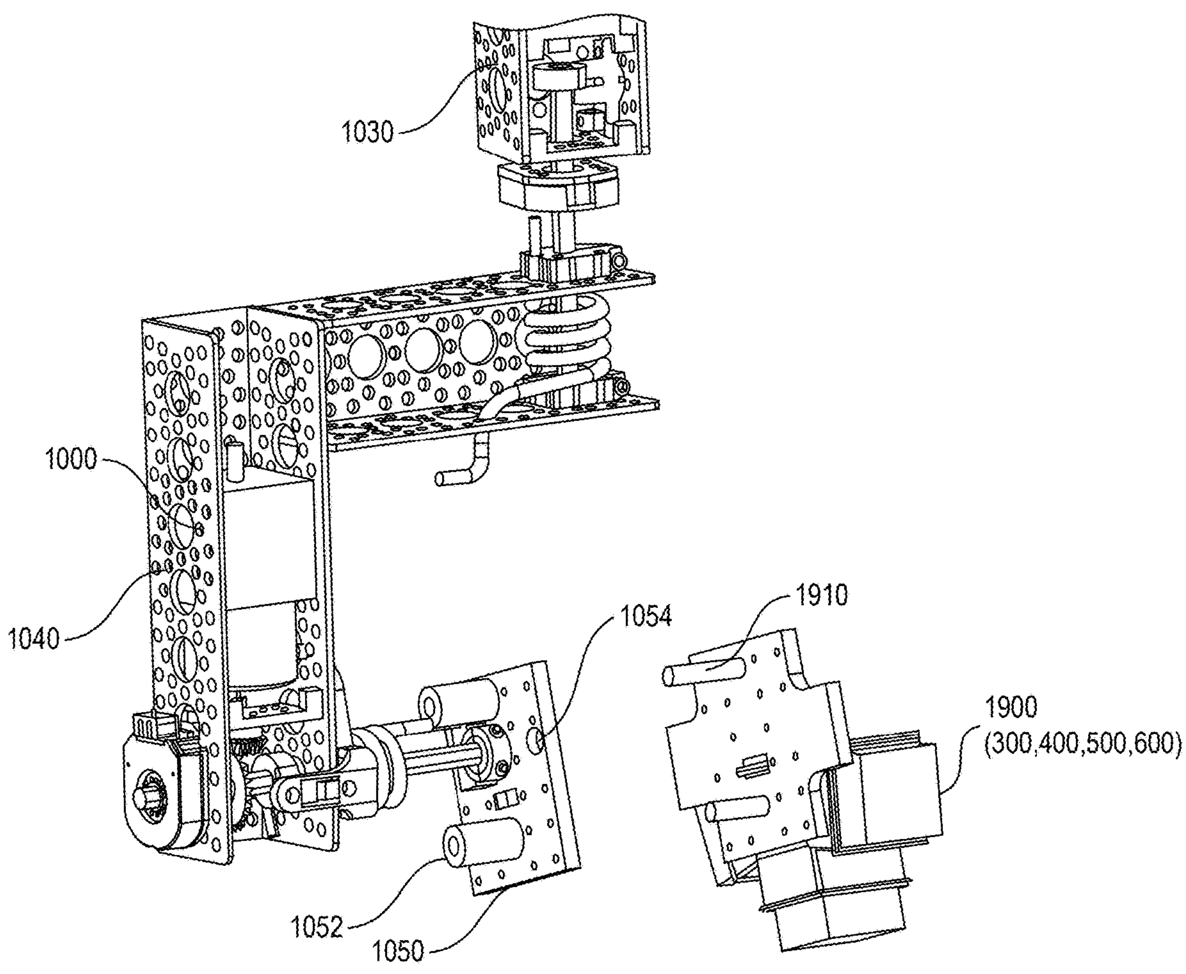
FIG. 12 is a front/top or plan perspective view of a multi-tool system and the mobility mechanism system according to an exemplary embodiment.

FIG. 12 is a front/top or plan perspective view of the multi-tool or tool swap system 1900 and the mobility mechanism system 1000. The tool swap system 1900 may comprise two bayonet style protrusions 1910. The protrusions 1910 may match sockets in various tools of the apparatus (e.g., the removal tool 300, the shaping tool 400, the cuticle management tool 500, and/or the application tool 600, and the like). Also, the protrusions 1910 may match corresponding bayonet sockets 1052 in a mobility side tool swap plate 1050 (as shown). The tool swap system 1900 may further comprise one or more retention magnets 1054. The retention magnets 1054 may serve to maintain the bayonet-style protrusions 1910 within the matching sockets 1052 on the plate 1050 or on the tools 300, 400, 500, 600. The magnets 1054 may serve similarly to cotter pins in that they do not directly support the weight of or forces on a tool, but merely serve to ensure engagement between the mobility system protrusions 1910 and tool sockets.

The tool swap system 1900 may further comprise one or more power and/or data connections. In other embodiments, a reversible latch may be used in place of magnets 1054. In other embodiments, the bayonet-style protrusions 1910 may be designed to reversibly latch into the corresponding sockets 1052. In yet other embodiments, a collet may be used in conjunction with a shaft to lock tools to the mobility system 1000.

Figure 13:
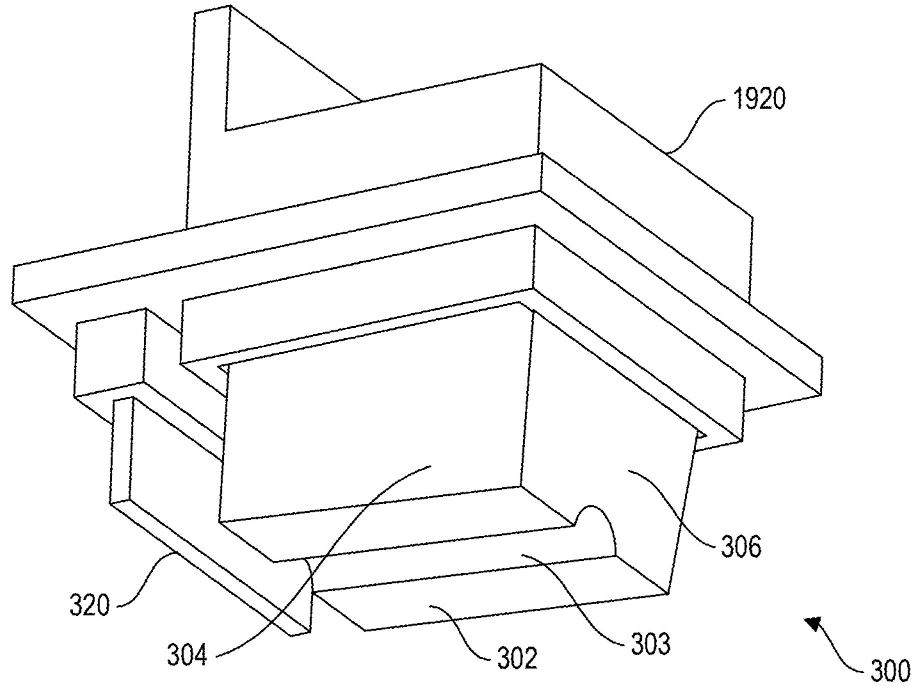
FIG. 13 is a perspective view of a first holder for the multi-tool system holder and a first enamel/polish remover system according to an exemplary embodiment.

FIG. 13 is a perspective view of a first holder 1920 for the multi-tool system 1900 and a first enamel/polish remover system 300. The enamel removal system 300 may include one or more sponges. The sponge may have a bottom/engaging surface 302, a first side surface 304, a second side surface 306, and a third side surface 308 (see, e.g., FIG. 28). The second side surface 306 may be longer and larger than a fourth side surface (not shown). As seen in FIG. 13, the first side surface 304 is relatively shorter adjacent to cleaning bristles 320 and relatively longer adjacent the second side surface 306. The sponge may include a semicircular groove 303 on the bottom/engaging surface 302 (i.e., the area typically in contact with the user's fingers or nails). In some exemplary embodiments, the semicircular groove 303 improves performance of the remover system 300.

The bristles 320 may be made of polyester. The bristles 320 may have moisture wicking capacity. The bristles 320 may be configured to retain acetone and/or removed nail polish. The bristles 320 may have a length of about 15 mm (about 0.5906 inch). A diameter of each of the bristles 320 may be between about 0.20 mm and about 0.30 mm or between about 203 microns and about 305 microns (between about 0.008 inches and about 0.012 inches).

The bottom/engaging surface 302 of the sponge may have sides each with a length of about 26 mm (about 1 inch). A total area of the sponge may be about 676 $mm^2$ (about 1 $inch^2$). A range of force on the nail exerted by the sponge of the enamel removal system 300 having the bottom/engaging surface with the total area of about 676 $mm^2$ (about 1 $inch^2$) may be between about 2.0 N and about 5.0 N (between about 0.45 psi and about 1.1 psi).

Figure 15:
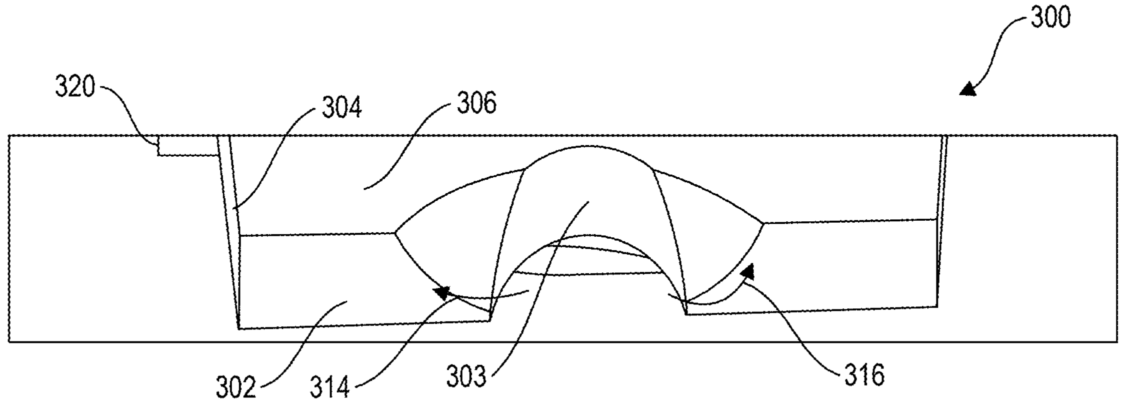
FIG. 15 is an end perspective view of the first enamel/polish remover system of FIG. 13 according to an exemplary embodiment.

FIG. 15 is an end perspective view of the first enamel/polish remover system 300 of FIG. 13 emphasizing the semicircular groove 303 of the sponge, which is configured to spread portions of the sponge laterally in the direction of arrows 314 and 316 when pressed down onto the user's finger or nail so that the sponge tends to passively conform to the shape of the user's finger or nail. The sponge may be compressed against the nail by a distance of between about 2.0 mm and about 8.0 mm (between about 0.079 inches about 0.31 inches).

Figure 14:
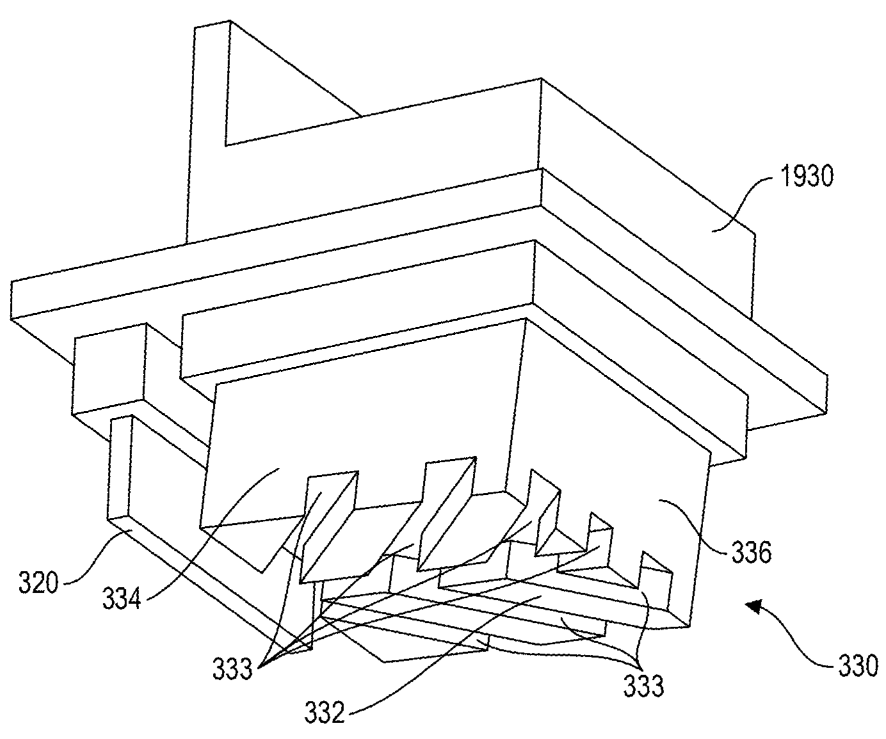
FIG. 14 is a perspective view of a second holder for the multi-tool system holder and a second enamel/polish remover system according to an exemplary embodiment.

FIG. 14 is a perspective view of a second type of holder 1930 for the multi-tool system 1900 and a second type of enamel/polish remover system 330 having a sponge with a groove pattern 332 on the bottom surface thereof. The sponge may further comprise a plurality of notches 333 and/or protrusions designed to more effectively conform to the shape of the nail folds around the user's nail (e.g., lateral nail fold and proximal nail fold). The notches 333 or protrusions may be configured to work into the nail folds when the sponge is pressed down on the user's finger or nail. Specifically, as shown in FIG. 14, seven grooves 333 and eight protrusions may be formed in the bottom surface of the sponge. Six of the grooves may be angled. The seventh groove may be aligned along a centerline of the sponge, which is configured to align with an approximate centerline of the user's finger or nail. In this exemplary embodiment, the protrusions form shapes on the bottom surface including, when viewed from below, relatively larger right triangles in two corners, relatively smaller right triangles about the centerline of the sponge, a pair of trapezoids on either side of the centerline, and a pair of five sided irregular shapes in the other two corners. In some exemplary embodiments, the configuration of the bottom surface of the sponge of the system 330 improves performance of the remover system 330.

Figure 16:
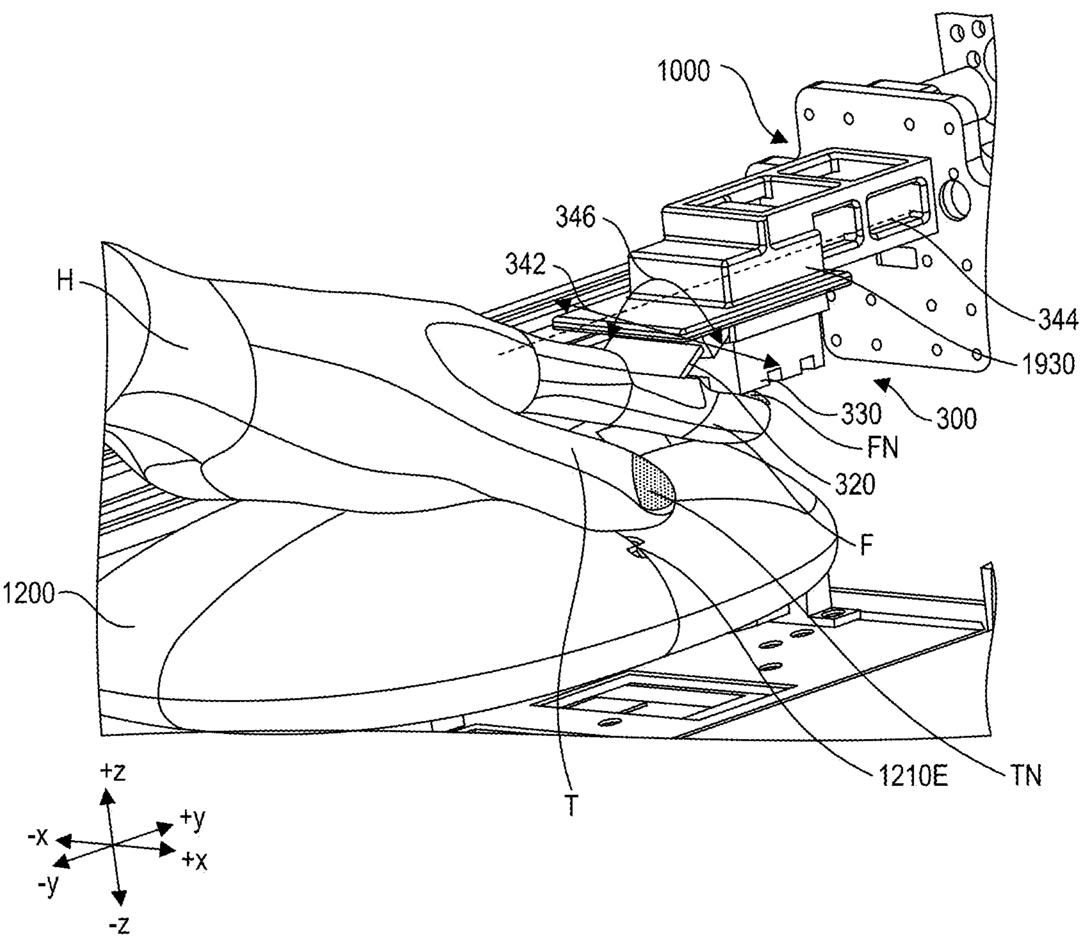
FIG. 16 is a side perspective view of the first holder for the multi-tool system holder; the second enamel/polish remover system; an end of the mobility mechanism system; and/or the hand rest system according to an exemplary embodiment.

FIG. 16 is a side perspective view of the first holder 1930 for the multi-tool system 1900, the second enamel/polish remover system 330, an end of the mobility mechanism system 1000, and/or the hand/foot rest system 1200. The multi-tool system 1900 with the second enamel/polish remover system 330 may be configured to move along, across or into a finger nail and/or rotate about the surface of the nail in order to remove polish. Specifically, multi-tool system 1900 with the second enamel/polish remover system 330 may be configured to move left and right in an X direction 342, in and out in a Y direction 344, and/or rotate in an arcuate motion 346 about the Y axis 344.

Figure 17:
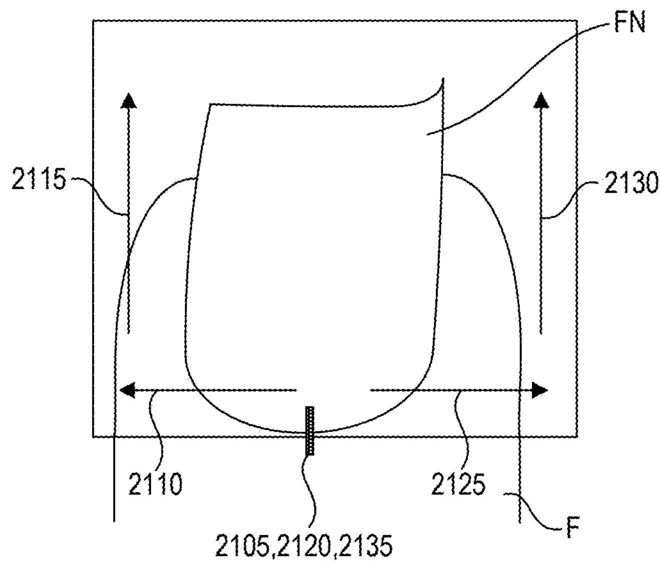
FIG. 17 is a diagram of a fingertip of a user and a first method for moving the enamel/polish remover system according to an exemplary embodiment.

FIG. 17 is a diagram of a fingertip of a user and a first method 2100 for moving the enamel/polish remover system 300. The first method 2100 may include one or more of the following steps in any suitable order. Start 2101 at a center of the nail 2105 (step 1 in FIG. 21). Then, drive a center of the sponge to a lateral fold of the nail 2110 (step 2). The step 2110 may be assisted with the use of rough vision. The step 2110 may include a negative Z direction motion and a positive/negative X direction motion depending on which side the tool 300 is wiping. Then, wipe a length of the nail (about 10 mm (about 0.3937 inch) to 29 mm (1.142 inches)) 2115 (step 3). Then, lift the tool 300 and drive back to the center/starting point 2120 (step 4). Then, repeat motions for the other lateral fold 2125 and 2130 (which may correspond with steps 2110 and 2115) (steps 5 and 6). Finally, return back to the center 2135 (step 7), and repeat the steps 2110 and 2115 about 2 to 5 times for one side and repeat the steps 2125 and 2130 about 2 to 5 times for the other side. The method 2100 may then end 2199.

Figure 18:
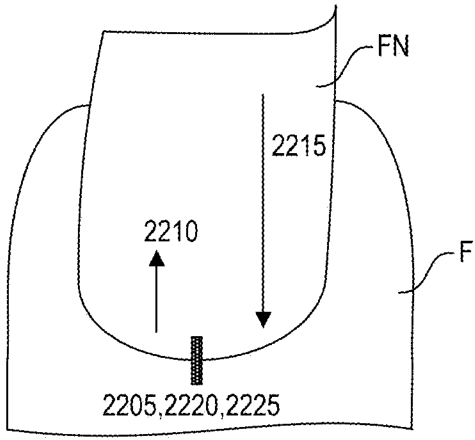
FIG. 18 is a diagram of the fingertip of the user and a second first method for moving the enamel/polish remover system according to an exemplary embodiment.

FIG. 18 is a diagram of the fingertip of the user and a second method 2200 for moving the enamel/polish remover system 300. The second method 2200 may include one or more of the following steps in any suitable order. Start 2201 (see, FIG. 22) at a center of the nail 2205 (step 1). Then, drive forward about 5 mm (about 0.1969 inch) 2210 (step 2). Then, drive backwards about 10 mm (about 0.3937 inch) in order to configure an edge of the sponge in a proximal fold of the nail 2215 (step 3). Then, lift the sponge and drive back to center lowering the sponge down at the starting point 2220 (step 4). Step 2220 prevents the edge of the sponge from catching on edges or sticky surfaces of the nail and the like. Finally, repeat steps 2210, 2215, 2220 about 2 to 5 times 2225 (step 5). The method 2200 may then end 2299.

Figure 19:
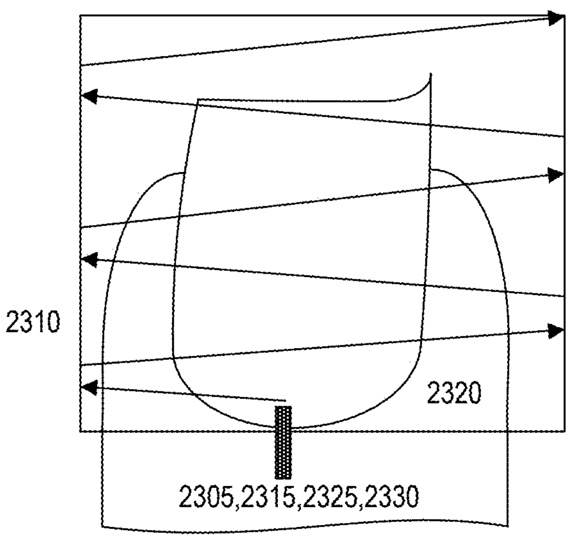
FIG. 19 is a diagram of the fingertip of the user and a third method for moving the enamel/polish remover system according to an exemplary embodiment.

FIG. 19 is a diagram of the fingertip of the user and a third method 2300 for moving the enamel/polish remover system 300. The third method 2300 may include one or more of the following steps in any suitable order. Start 2301 (see, FIG. 23) at a center of the nail 2305 (step 1). Then, drive to one lateral fold of the nail using rough vision in the positive X direction, in the negative Z direction, and incrementing in the positive Y direction by about 2 to 5 mm (about 0.07874 to 0.1969 inch) per increment 2310 (step 2). Then, drive back to center incrementing in the positive Y direction 2315 (step 3). Then, drive to an opposite lateral fold of the nail in the negative X direction, in the negative Z direction, and in the positive Y direction 2320 (step 4). Then, drive back to center incrementing in the positive Y direction 2325 (step 5). Finally, repeat steps 2310, 2315, 2320, and 2325 until a full length of the nail is covered as determined by vision or an average of about 20 mm (about 0.7874 inch) in the Y direction 2330 (step 6). The method 2300 may then end 2399.

Figure 20:
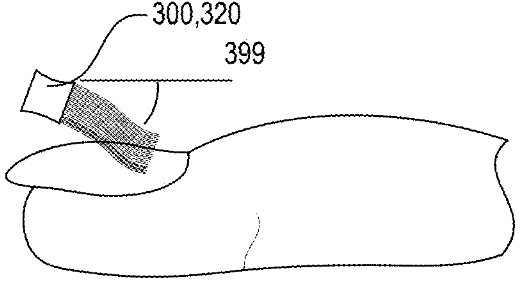
FIG. 20 is a side view of the fingertip of the user and an orientation of bristles of the enamel/polish remover system relative to the nail of the user.

FIG. 20 is a side view of the fingertip of the user and an orientation of bristles 320 of the enamel/polish remover system 300 relative to the nail of the user. The bristles 320 may be oriented at an angle 399 of about 10 degrees to 30 degrees relative to a horizontal direction.

Figures 21, 22, 23:
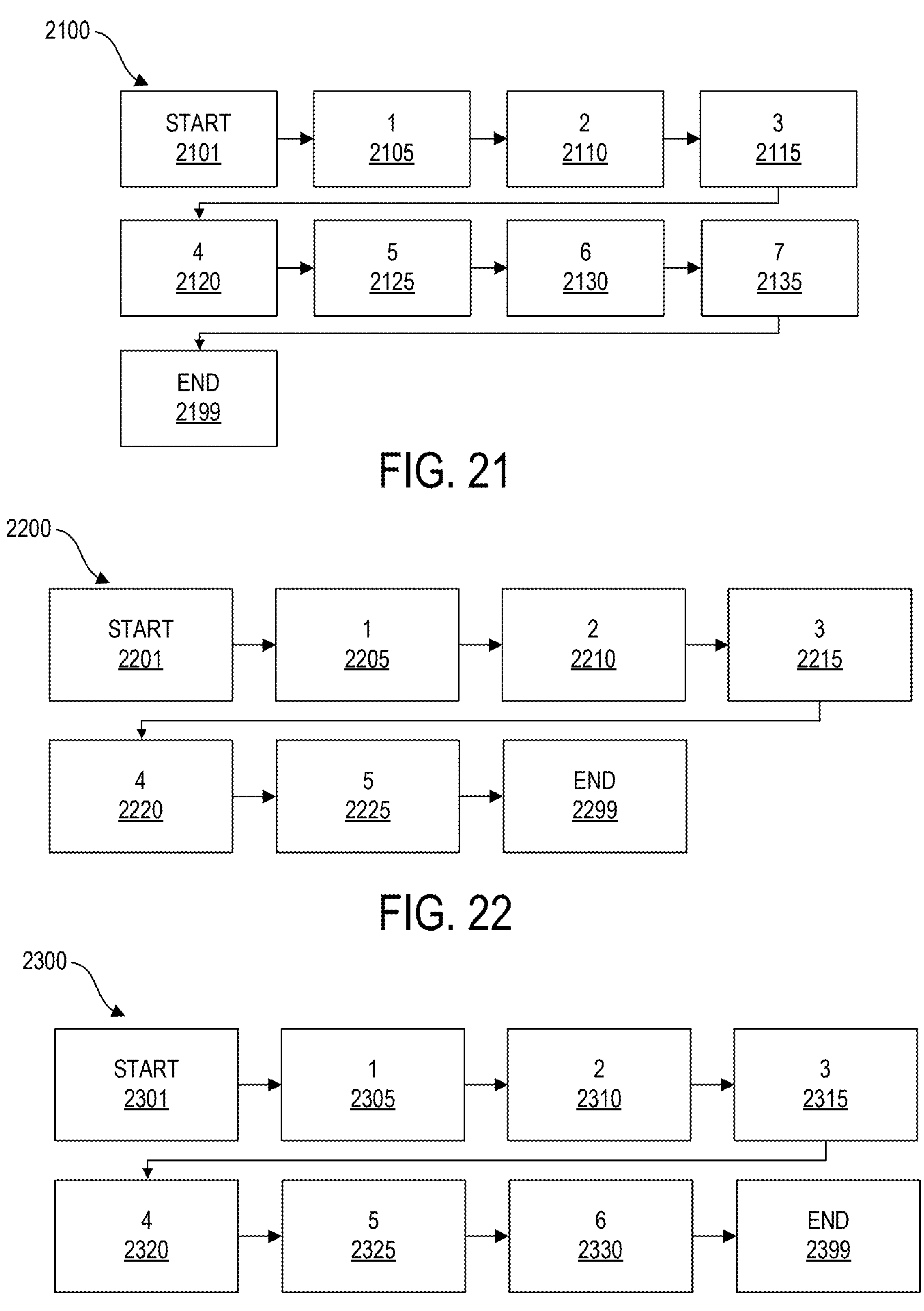
FIG. 21 is a flow chart of the first method of FIG. 17 according to an exemplary embodiment.
FIG. 22 is a flow chart of the second method of FIG. 18 according to an exemplary embodiment.
FIG. 23 is a flow chart of the third method of FIG. 19 according to an exemplary embodiment.

FIG. 21 is a flow chart of the first method 2100 of FIG. 17.

FIG. 22 is a flow chart of the second method 2200 of FIG. 18.

FIG. 23 is a flow chart of the third method 2300 of FIG. 19.

Figure 24:
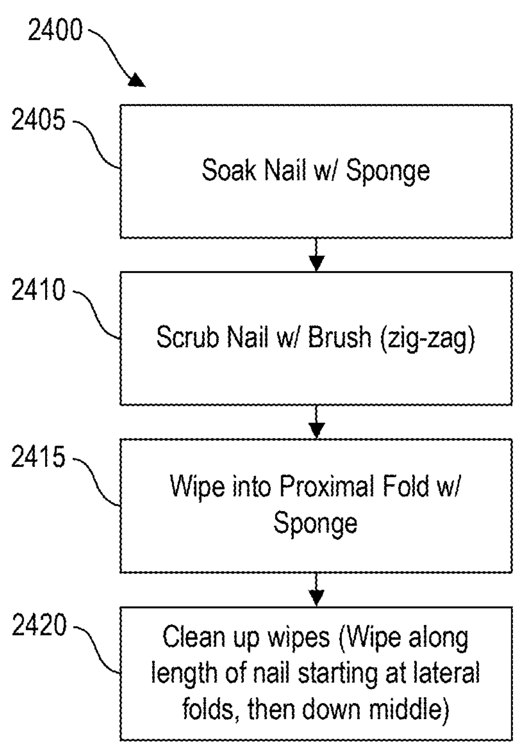
FIG. 24 is a flow chart of a fourth method of operations of the enamel/polish remover system according to an exemplary embodiment.

FIG. 24 is a flow chart of a fourth method 2400 of operations of the enamel/polish remover system 300. The fourth method 2400 may include one or more of the following steps in any suitable order. Soak the nail with the sponge of the system 300 2405. Scrub the nail with bristles 320 of the system 300 2410. The step 2410 may be performed in any suitable pattern including those described with reference to the first, second and third methods 2100, 2200, 2300. The step 2410 may be performed in a zig-zag pattern. Wipe into a proximal fold of the nail with the sponge of the system 300 2415. Clean up the nail with wiping motions 2420. The step 2420 may be performed by wiping along a length of the nail starting at the lateral folds and then down a middle of the nail or any suitable direction relative to the nail.

Figure 25:
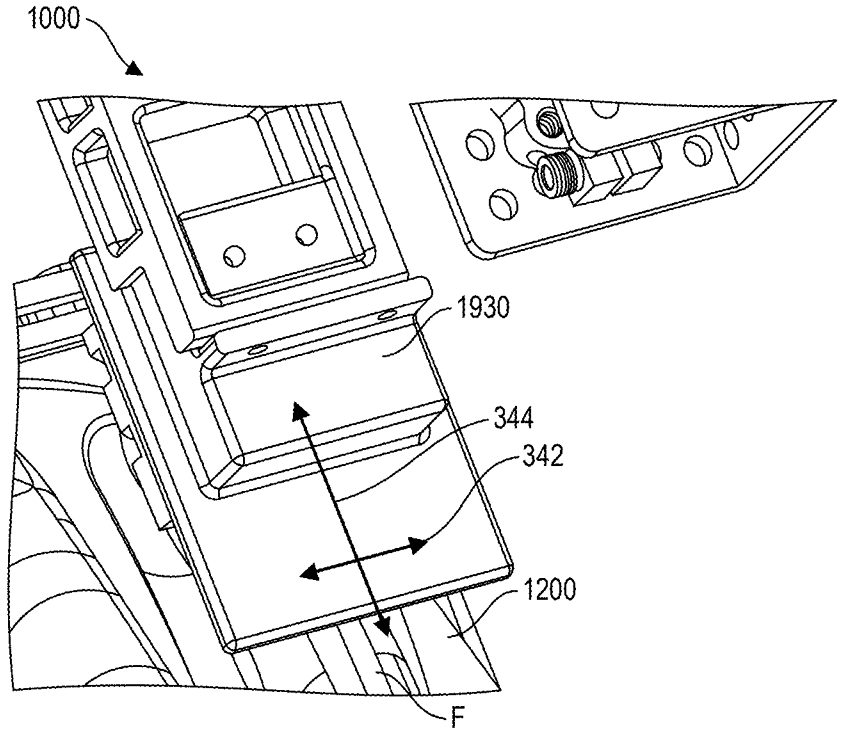
FIG. 25 is a top perspective view of the second holder for the multi-tool system holder; the second enamel/polish remover system; the end of the mobility mechanism system; and/or a portion of the hand rest system with emphasis on a range of motion of the enamel/polish remover system and approximate orientation of the enamel/polish remover system relative to a finger of a hand of the user according to an exemplary embodiment.

FIG. 25 is a top perspective view of the second holder 1930 for the multi-tool system 1900, the second enamel/polish remover system 330, the end of the mobility mechanism system 1000, and/or a portion of the hand/foot rest system 1200 with emphasis on a range of motion of the enamel/polish remover system 300 and approximate orientation of the enamel/polish remover system 300 relative to a finger F of a hand H of the user U. The system 300 may be moved back and forth or side to side over the nail surface in the direction 342. The system 300 may be moved in and out or laterally over the nail surface in the direction 344.

Figure 26:
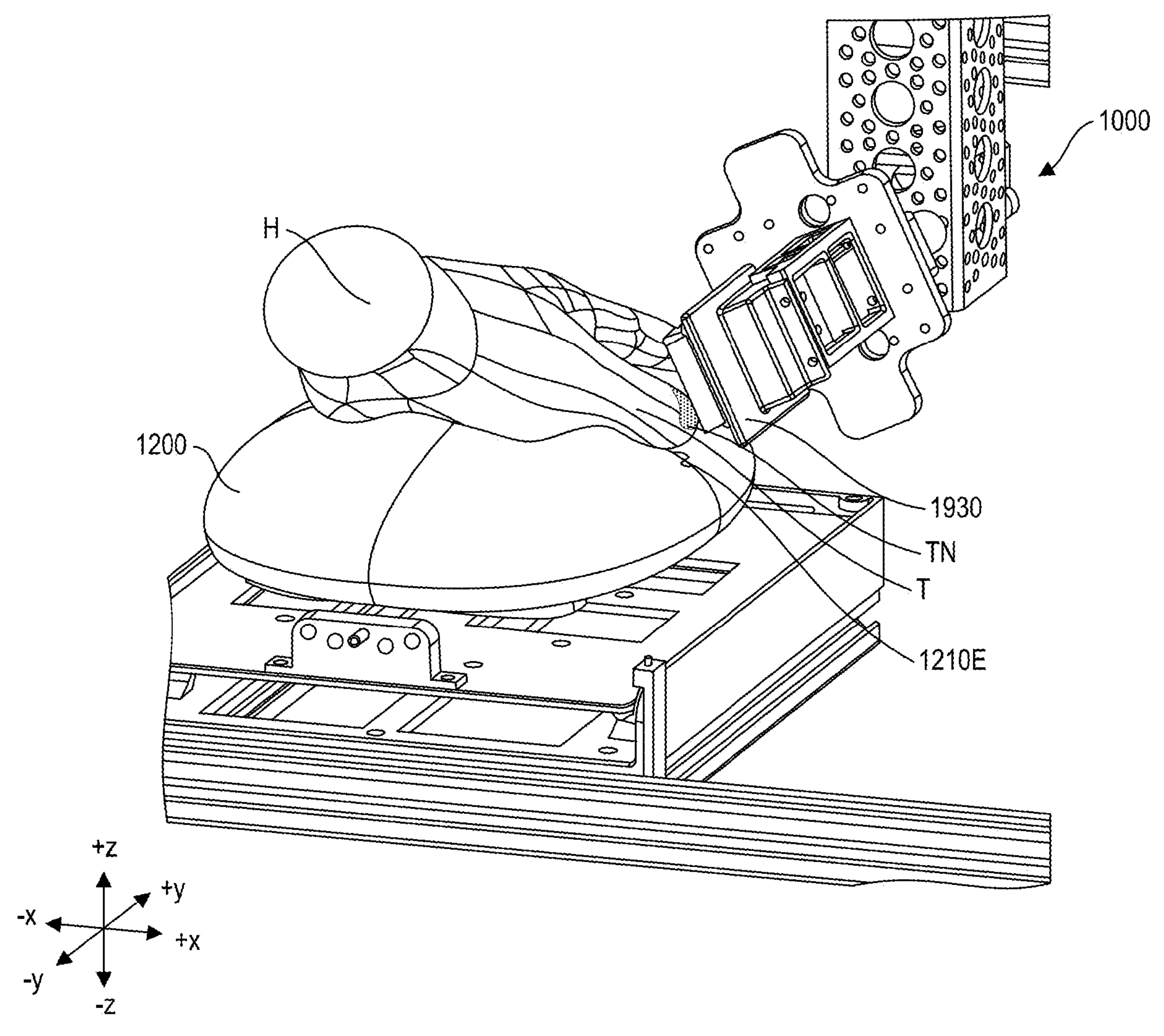
FIG. 26 is an end perspective view of the second holder for the multi-tool system holder; the enamel/polish remover system; the end of the mobility mechanism system; and/or the hand rest system with emphasis on engagement of the enamel/polish remover system with a left thumb nail of a left thumb of the hand of the user according to an exemplary embodiment.

FIG. 26 is an end perspective view of the second holder 1930 for the multi-tool system 1900, the enamel/polish remover system 300, the end of the mobility mechanism system 1000, and/or the hand/foot rest system 1200 with emphasis on engagement of the enamel/polish remover system 300 with a left thumb nail TN of a left thumb T of the hand H of the user U. Please note, the system 300 and the holder 1930 are rotated by the mobility mechanism system 1000 to a suitable angle that is appropriate to make normal (orthogonal) contact of the system 300 with a predominant plane of a nail TN of the thumb T of the user. The fiducial marker 1210E may assist the system 100 in identifying a location of the thumb T, which is particularly helpful with this type of engagement.

The sponges of the enamel/polish remover system 300 may further be shaped to provide support for bristles (e.g., 320) or may serve to position the bristles for best removal effectiveness.

The sponges of the enamel/polish remover system 300 may be of a material substantially immune to the effects of the nail polish removal agent (e.g., acetone) used by the system 100. In one embodiment, the sponge is composed of melamine foam.

The sponges of the enamel/polish remover system 300 may have foam characteristics that assist in removal of softened nail polish. For example, open cell foam with relatively narrow and rigid cell walls may be used to provide a slightly abrasive texture.

The sponges of the enamel/polish remover system 300 may be sized and shaped to effectively absorb removed nail polish and prevent removed nail polish from being redeposited on the user's fingers or nails. Furthermore, the sponges of the enamel/polish remover system 300 may be of a material selected to wick absorbed nail polish away from the surface of the sponge and toward the interior of the sponge.

The enamel/polish remover system 300 may have one or more of the sponges, which may be entirely separate or combined.

If the multiple sponges of the enamel/polish remover system 300 are combined, then they may be configured so that rotation about one of the rotational degrees of freedom (e.g., elevation) serves to bring one sponge or another into the proper position for use.

The enamel/polish remover system 300 may further comprise one or more brushes (e.g., 320). The brushes may be mounted to operate parallel to the long axis of the user's fingers or may be mounted to operate transverse to the fingers, or at any angle between. The brushes may be of any bristle shape, length, stiffness, composition, and/or configuration. The brushes may comprise a variety of bristle types or configurations within a single brush.

In one embodiment, a single brush of the enamel/polish remover system 300 is mounted transverse to the direction of the user's fingers medially with respect to the user's fingers (i.e., "behind" the sponge when the sponge is moved from the base of the nail plate to the free edge of the nail plate.

In another embodiment, two brushes of the enamel/polish remover system 300 may be mounted on either side of a primary brush, and aligned parallel with the direction of the user's fingers.

Figure 27:
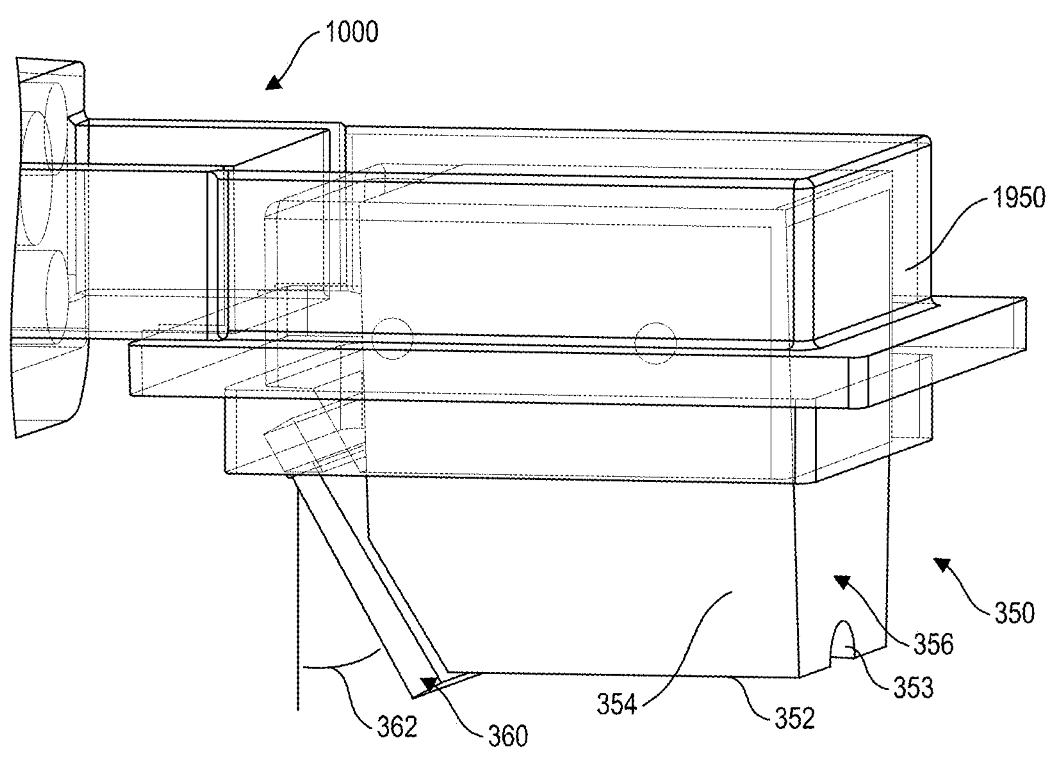
FIG. 27 is a side perspective view of a third holder for the multi-tool system holder; a third enamel/polish remover system; and/or the end of the mobility mechanism system with emphasis on an angle of bristles of the third enamel/polish remover system according to an exemplary embodiment.

FIG. 27 is a side perspective view of a third holder 1950 for the multi-tool system 1900, a third enamel/polish remover system 350, and/or the end of the mobility mechanism system 1000 with emphasis on an angle of bristles 360 of the third enamel/polish remover system 350. The sponge may have a bottom/engaging surface 352, a first side surface 354, a second side surface 356, and so on. A side surface opposite the second side surface may include a tapered section adjacent the bristles 360. The sponge may include a semicircular groove 353 on the bottom/engaging surface 352, which has features similar to that of groove 303 described above. An angle 362 of the bristles 360 relative to a vertical direction of the holder 1950 is about 30 degrees. The angle 362 and tapered sponge allow the bristles 360 to come into closer contact with the nail and the sponge.

Figure 28:
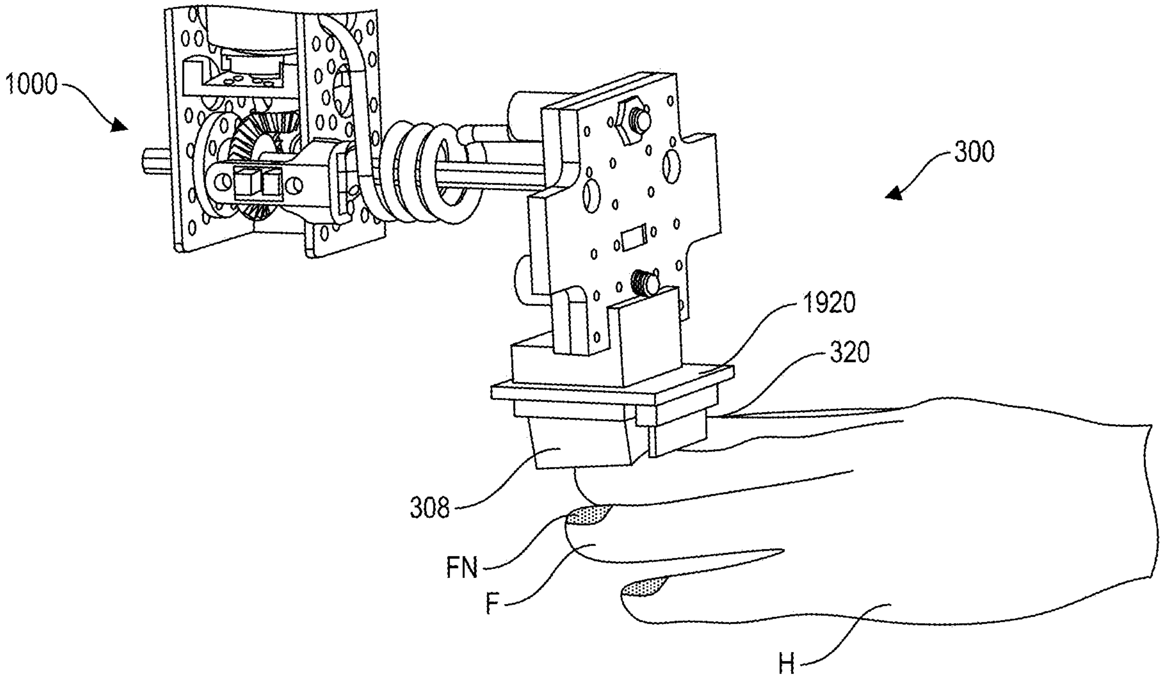
FIG. 28 is a side perspective view of the first holder for the multi-tool system holder; the first enamel/polish remover system; the end of the mobility mechanism system with emphasis on engagement of the first enamel/polish remover system with a nail of a left middle finger of the hand of the user according to an exemplary embodiment.

FIG. 28 is a side perspective view of the first holder 1920 for the multi-tool system 1900, the first enamel/polish remover system 300, the end of the mobility mechanism system 1000 with emphasis on engagement of the first enamel/polish remover system 300 with a nail of a left middle finger of the hand of the user. Although only the nails FN of the ring and little fingers F are clearly shown in FIG. 28, the semi-circular groove 303 of the sponge is aligned by movement of the mobility mechanism system 1000 so as to be over and directly proximate to the nail of the left middle finger of the user.

Figure 29:
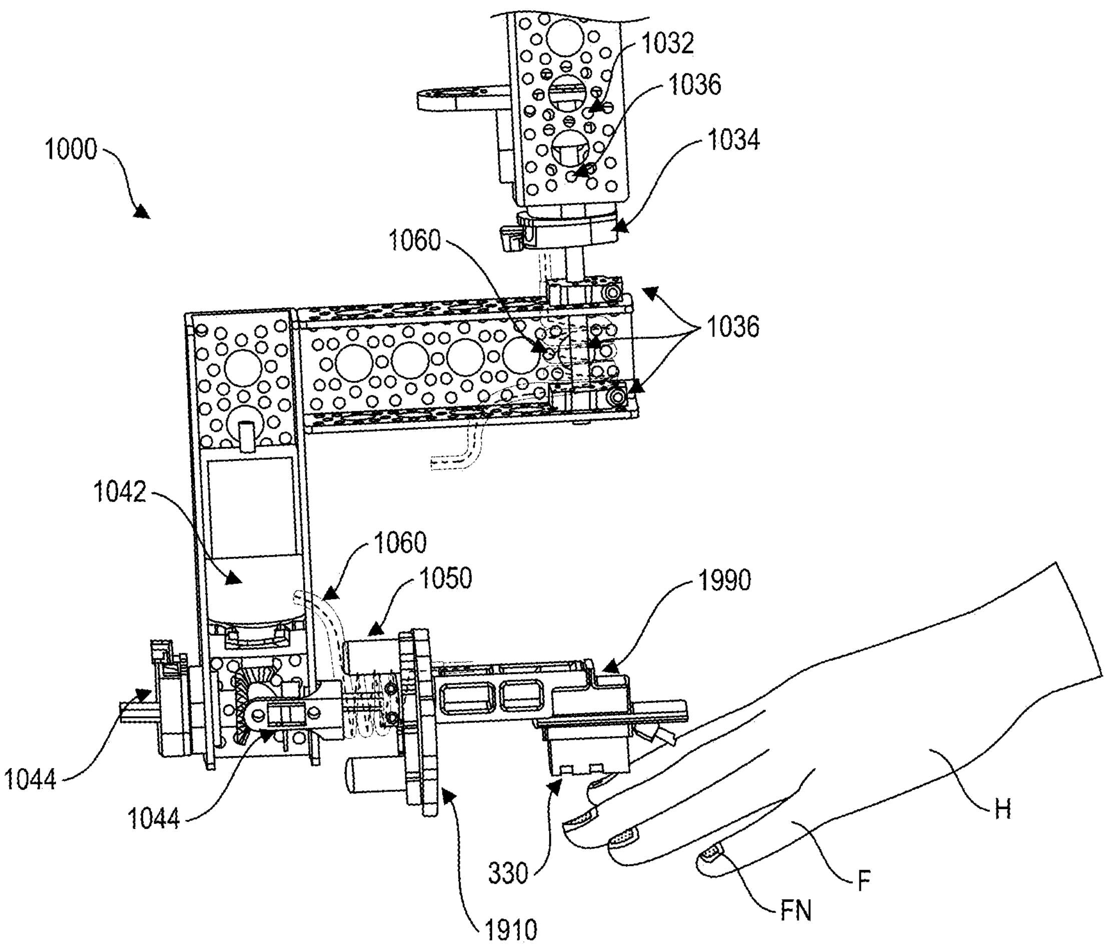
FIG. 29 is a side perspective view of a fourth holder for the multi-tool system holder; the second enamel/polish remover system; the end of the mobility mechanism system with emphasis on engagement of the third enamel/polish remover system with a nail of a left index finger of the hand of the user according to an exemplary embodiment.

FIG. 29 is a side perspective view of a fourth holder 1990 for the multi-tool system 1900, the second enamel/polish remover system 330, the end of the mobility mechanism system 1000 with emphasis on engagement of the third enamel/polish remover system 350 with a nail of a left index finger of the hand H of the user. The mobility mechanism system 1000 may include a motor and gearbox 1032 to rotate about the Z axis. The mobility mechanism system 1000 may include sensors 1034 to determine a position of a rotary axis. The mobility mechanism system 1000 may include shafts and bearings 1036 to support rotation while maintaining rigidity. The mobility mechanism system 1000 may include a motor and gearbox 1042 to rotate about an axis in the XY plane. The mobility mechanism system 1000 may include sensor 1044 to determine a position of a rotary axis. The mobility mechanism system 1000 may include a plate 1050 containing alignment features, latches, and electrical connections to the system 100. The multi-tool system 1900 may include the plate 1910, which may contain corresponding alignment features, latches, and electrical connections attached to the removal system 330. The fourth holder 1990 may be attached to the plate 1910, which may be attached to the plate 1050. The mobility mechanism system 1000 may include cables 1060 configured to transmit data and power between a controller (e.g., 1500) in the system 100 and sensors and motors at the tool head (e.g., 330). The cables 1060 may include multiple windings about a given axis and/or slip rings to allow the mobility mechanism system 1000 to complete multiple rotations about the given axis without disrupting the system 1000.

Figure 30:
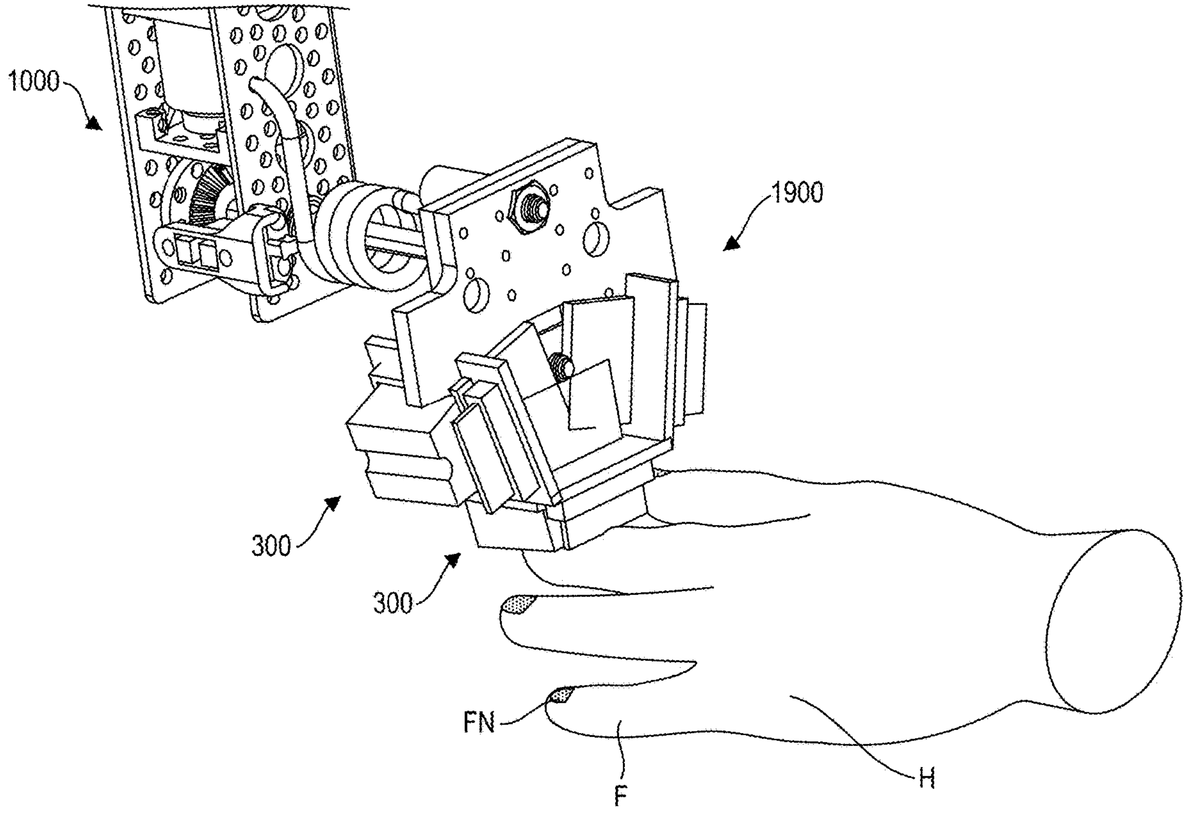
FIG. 30 is a side perspective view of a three-piece holder for the multi-tool system holder; three enamel/polish remover systems; the end of the mobility mechanism system with emphasis on engagement of a second of the three enamel/polish remover systems with the nail of the left middle finger of the hand of the user according to an exemplary embodiment.

FIG. 30 is a side perspective view of a three-piece holder for the multi-tool system 1900 including three enamel/polish remover systems, and the end of the mobility mechanism system 1000 with emphasis on engagement of a second of the three enamel/polish remover systems with the nail of the left middle finger of the hand H of the user. That is, in some embodiments, multiple removal tools 300, 300 may be provided, which may be of identical or different configurations, e.g., one or more of systems 300, 400, 500, 600, and the like. Alternative tools may be selected by the tool swap mechanism or tool swap system 1900, or may be combined into one tool, with rotation about a rotational degree of freedom (e.g., elevation) serving to bring the appropriate tool to bear.

Different enamel removal tools 300 may be supplied with different removal fluids (e.g., water) for use at different points in the manicure. The enamel removal system 300 may be supplied as part of the consumable cartridge 1600. The enamel removal system 300 may be supplied within the consumable cartridge 1600 already saturated with enamel removal fluid (e.g., acetone).

Figure 31:
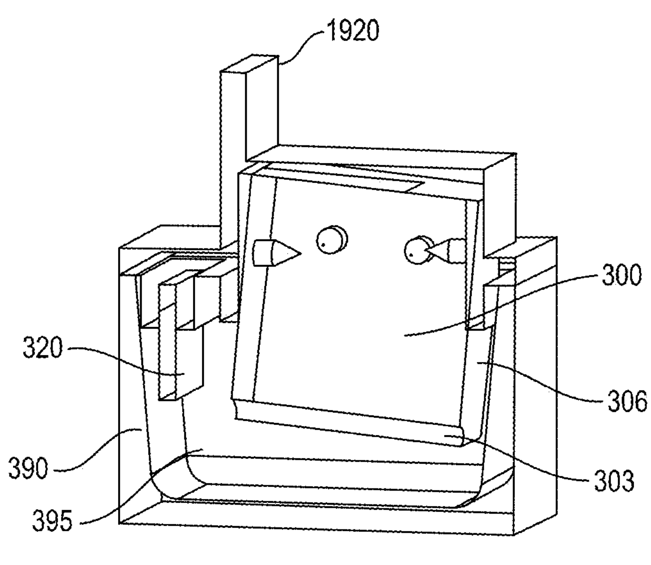
FIG. 31 is a side cross-sectional view of the first holder for the multi-tool system holder; the first enamel/polish remover system; and/or a reservoir for removal agent for the enamel/polish remover system.

The enamel removal tool 300 may be supplied with a separate reservoir of removal agent (e.g., acetone) separated from the enamel removal tool 300 (e.g., sponge/brush) by a barrier. The barrier may be located so that it is pierced when the tool is selected, saturating the enamel removal tool with the enamel removal agent. For example, FIG. 31 is a side cross-sectional view of the first holder 1920 for the multi-tool system 1900, the first enamel/polish remover system 300, and a reservoir 395 for removal agent for the enamel/polish remover system 300.

Figure 33:
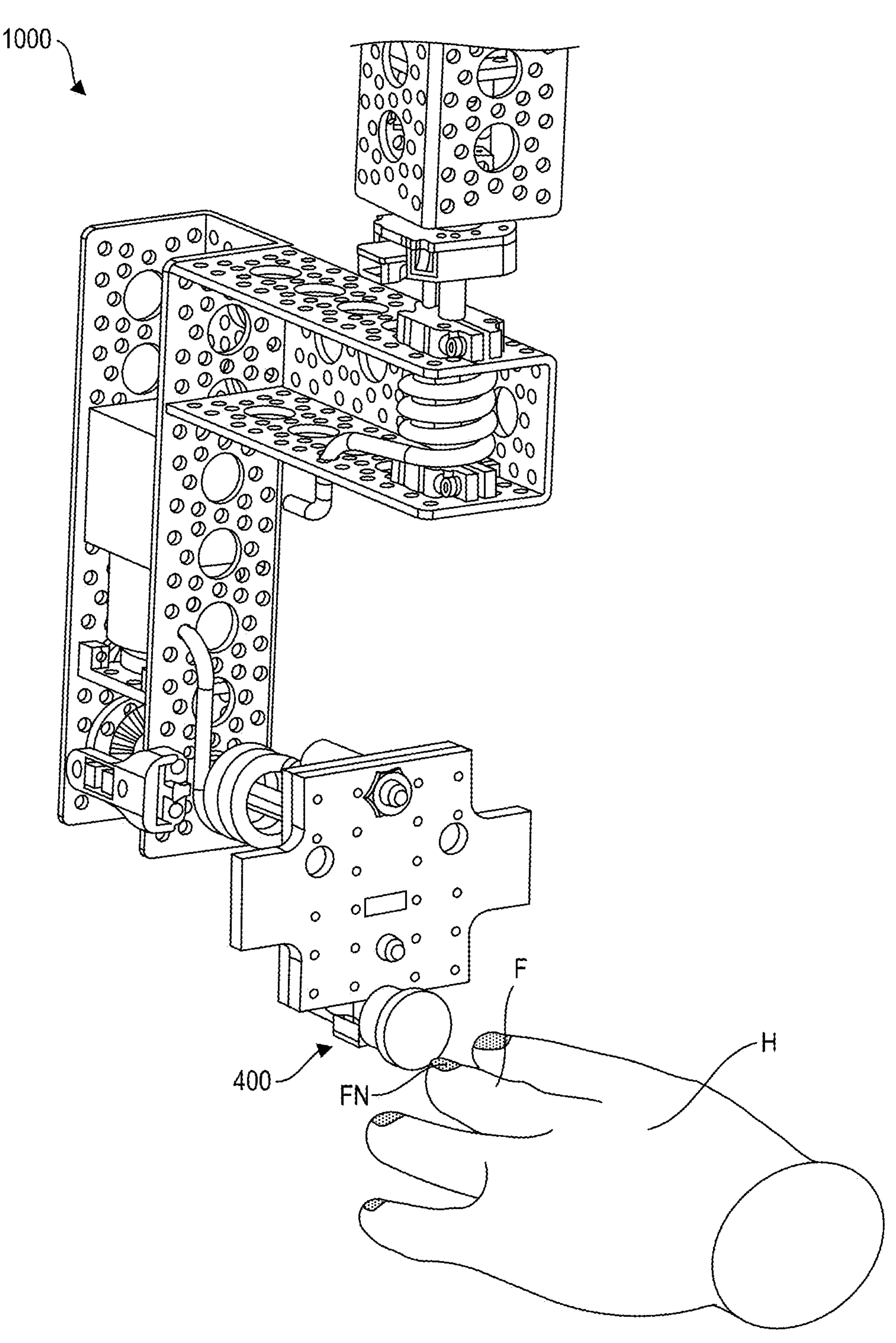
FIG. 33 is an end perspective view of the end of the mobility mechanism system; and/or the nail shaping system with emphasis on engagement of the nail shaping system with the nail of the left middle finger of the hand of the user according to an exemplary embodiment.

FIG. 32 is a top perspective view of a nail shaping system 400 with emphasis on engagement of the nail shaping system 400 with the nail FN of the left middle finger F of the hand H of the user. The nail shaping system 400 may include a motor 410, a gearbox or mechanism 420 for generating oscillating and/or rotary output motion, a compliant member 430, and/or an abrasive element 440. FIG. 33 is an end perspective view of the end of the mobility mechanism system 1000, and the nail shaping system 400 with emphasis on engagement of the nail shaping system 400 with the nail FN of the left middle finger F of the hand H of the user.

The nail shaping tool 400 may include one or more nail shaping elements; and/or one or more tool selection mechanisms; and/or one or more means of transferring mechanical power from the mobility system 1000 to the shaping element. The nail shaping element may comprise a circular disk of abrasive material, e.g., abrasive element 440. The nail shaping element may comprise a drum or other rotationally symmetric shape (e.g., hourglass, cone, truncated cone, and the like) of abrasive material. The nail shaping element may comprise a substantially planar element (e.g., emery board) of abrasive material. The abrasive material may comprise an abrasive grit or powder applied to a substrate (e.g., emery board). The abrasive material may be shaped and adhered (e.g., sintered or glued) so that the entire element is composed essentially of the abrasive material (e.g., whetstone). The abrasive material may comprise a solid that has been scored, etched, or otherwise worked in order to create a series of ridges (e.g., glass file or metal file).

Instead or in addition, the method of application may be chosen to reduce or further reduce the risk of discomfort or injury to the user. For example, an oscillating rotary motion may be effective at removing relatively rigid nail plate material, while simply moving skin back and forth with no significant other effects.

In some embodiments, the use of an inherently safe and comfortable nail plate shaping element and/or method permits less sophisticated imaging and control methods to be used without loss of effectiveness. For example, an inherently safe shaping tool may be pressed against the "corners" of the user's one or more nails—i.e., where the distal edge of the nail plate meets the lateral nail fold—so that the skin is naturally moved out of the way and the "corner" of the nail plate may be shaped as desired. This may be particularly appropriate for users with shorter nails, such that the protrusion of the distal edge of the nail plate from the fingertip is minimal and it is necessary to round the "corners" of the nail for best appearance.

The nail shaping element may have nearly any shape; a disk or rotationally symmetric shape is useful for rotation (e.g., spinning) or rotary oscillation, while a generally planar or relatively large radius curve may be appropriate for reciprocal (e.g., back and forth) motions.

In some embodiments, a compliant material may be located between the surface of the material intended for use in shaping nails and any structural support (e.g., a sponge pad behind a circular sanding disk). The compliant material may serve to limit torque required when the shaping element is pressed against the nail in shaping operations, or may serve to reduce requirements on the precision with which the shaping element is applied to the nail.

Other means of providing compliance are also possible. For example, the entire shaping apparatus may have a compliant member (e.g., 430) between the shaping element and the mobility system 1000.

The shaping element may be operably connected to the mobility system 1000 so that a motor on the mobility system 1000 operates (e.g., rotates or oscillates) the shaping element. The connection may be through a shaft on either the shaping element or the mobility system 1000 and associated socket on the other mechanism.

The operable connection may create rotary motion, linear reciprocating motion (e.g., back and forth), and/or rotational oscillation (e.g., clockwise/counterclockwise).

In some embodiments, mechanical means may be used to turn the rotary motion of a motor into reciprocating or oscillating motion.

In other embodiments, the motor itself may be controlled to rapidly change direction in order to generate reciprocating or oscillating motions of the shaping element.

The operable connection mechanism may minimize the cost of providing new shaping disks in the consumable cartridge 1600 by limiting the components that are required on the consumable apparatus.

The nail shaping tool 400 may be included in the consumable cartridge 1600 (for example, if it requires frequent replacement), or may be changeable independently of the consumable cartridge 1600 (for example, if it requires replacing infrequently), or may be a permanent part of the system 100 (for example, if it will not require replacement within the life of the machine).

The size, shape, configuration of the abrasive element 440 may be a disk, a drum, and the like.

The abrasive element 440 may be configured so that the abrasive element 400 presents little or no risk of discomfort or injury to the user. The grit of the abrasive element 440 may be sufficient to clean or shape a nail but not injure the skin of the user.

For details of the cuticle management system 500, see, FIGS. 198 and 199A through 199J, inclusive, below.

Figure 34A:
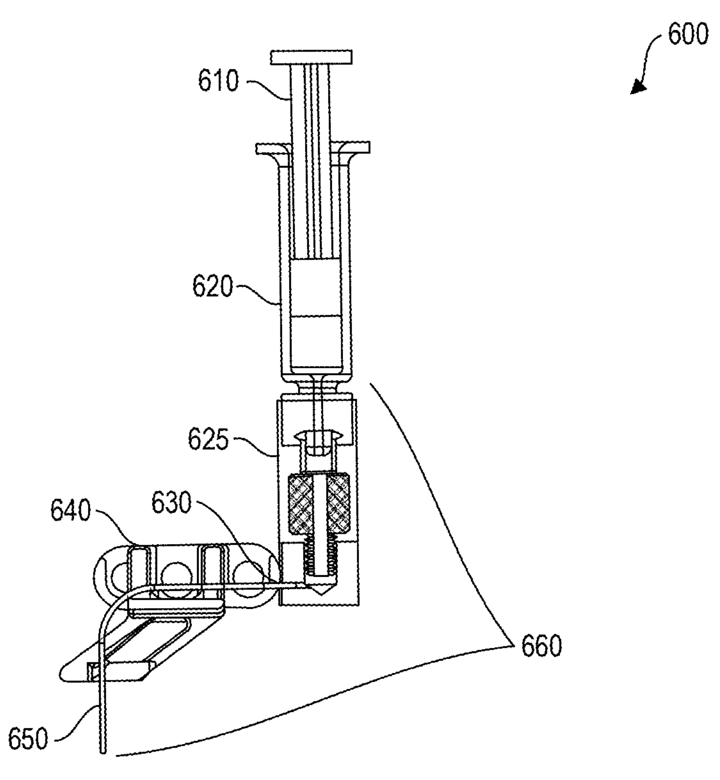
FIG. 34A is a side view and partial cross-sectional view of an enamel/polish application system.

FIG. 34A is a side view and partial cross-sectional view of an enamel/polish application system 600. The application system 600 may include one or more of a plunger 610, a reservoir 620, an intermediate section 625, a flexible connective tube 630 providing compliance to the nozzle 650, a support structure 640 to guide compliance, and a nozzle 650, which collectively provide a fluid path 660 for a consumable item such as enamel.

Figure 34B:
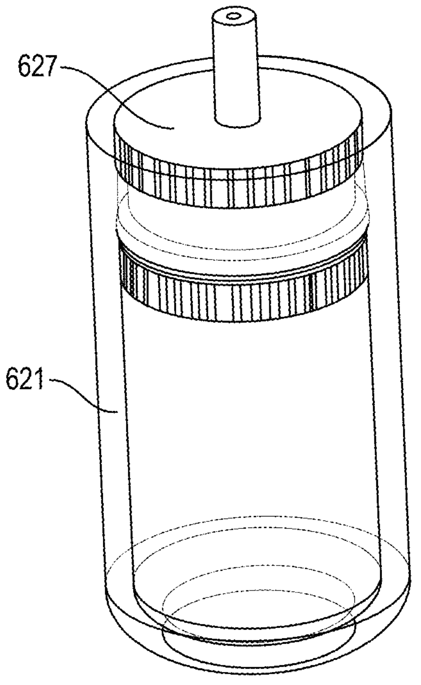
FIG. 34B is a perspective view of a displaceable (full) vial of an enamel/polish application system with a cap therein.
Figure 34C:
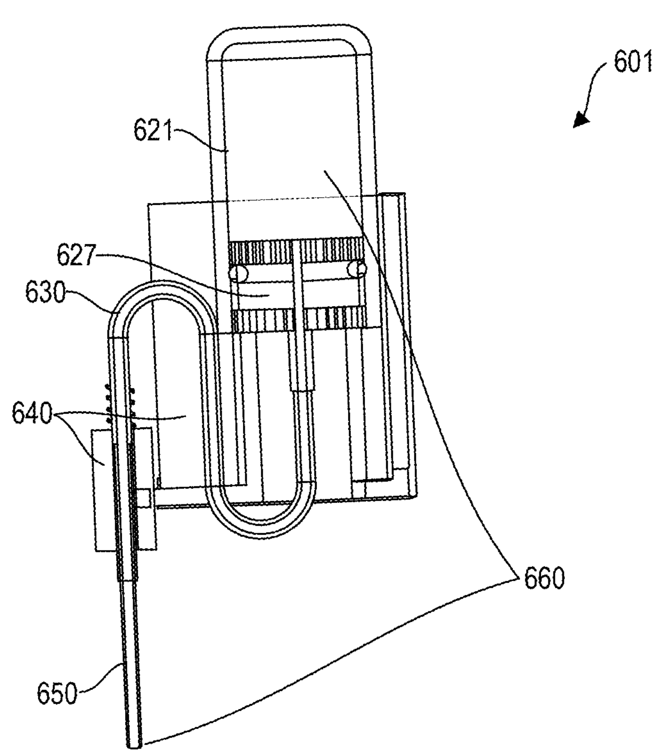
FIG. 34C is a side view of the enamel/polish application system with the displaceable (full) vial and the cap.
Figure 34D:
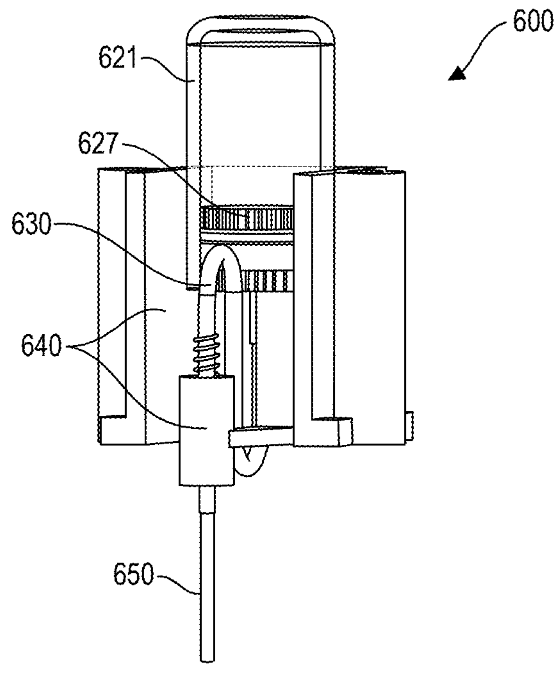
FIG. 34D is an angled side view of the enamel/polish application system with the displaceable (full) vial and the cap.
Figure 34E:
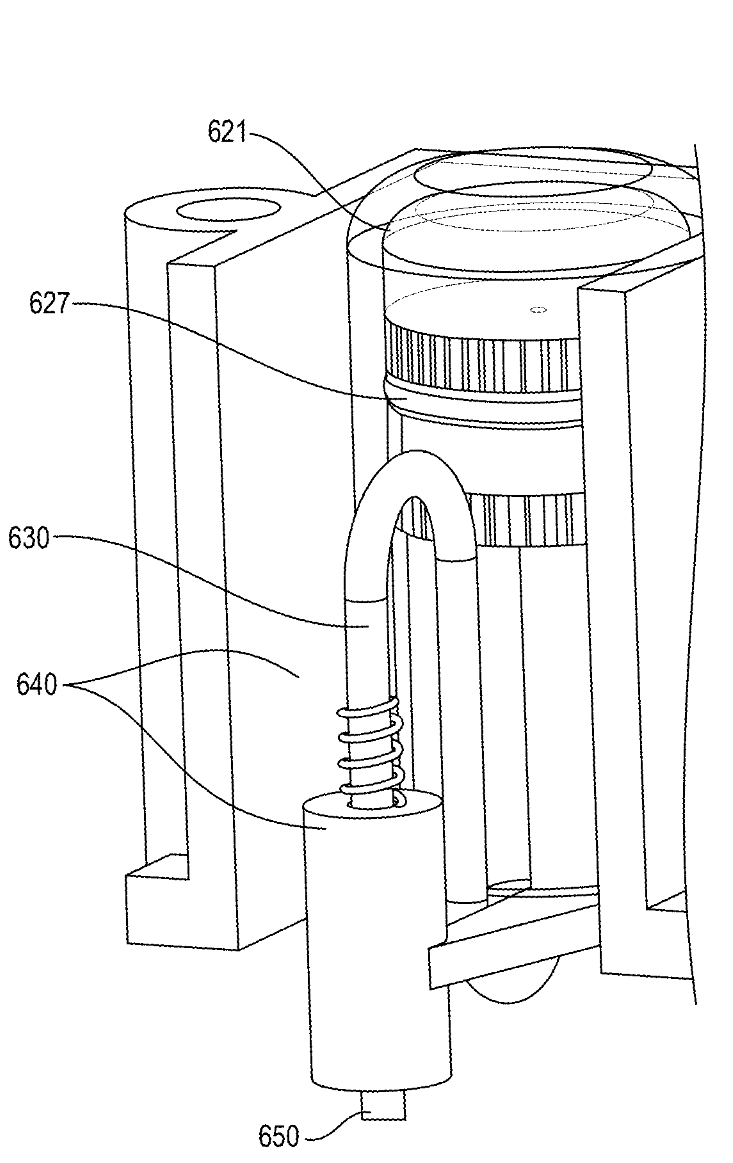
FIG. 34E is a partial angled side view of the enamel/polish application system with the displaceable (mostly empty) vial and the cap.

The alternative enamel/polish application system 600 of FIGS. 34B-34E is configured for use with nail polish, i.e., enamel, top coat, or basecoat, which is viscous and can undesirably entrap air if mishandled. Specifically, FIG. 34B is a perspective view of a displaceable (full) vial 621 of an alternative enamel/polish application system 600 with a cap 627 therein. FIG. 34C is a side view of the enamel/polish application system 600 with the displaceable (full) vial 621 and the cap 627. FIG. 34D is an angled side view of the enamel/polish application system 600 with the displaceable (full) vial 621 and the cap 627. FIG. 34E is a partial angled side view of the enamel/polish application system 600 with the displaceable (mostly empty) vial 621 and the cap 627.

The alternative enamel/polish application system 600 advantageously provides air above the polish or enamel in the vial 621. The alternative enamel/polish application system 600 may include a pump suitable for enamel, top coat, or basecoat, including one or more of a plastic or glass vial 621 filled with the fluid to be dispensed with a cap 627 configured to move within the inner diameter of the vial 621 and an opening in the cap 627 through which fluid is expelled from the vial 621 as the cap 627 is displaced into the vial 621. The vial 621 and cap 627 may be installed into a carrier 641 that fixes the cap 627 and attaches the output to a fluid channel or tubing 630 within the carrier 641. The carrier 641/vial 621 assembly may be installed into a machine (e.g., the mobility system 1000 or the like) configured to displace the vial 621 toward the cap 627, causing fluid to be expelled into the tubing 630 of the assembly and out of the nozzle 650.

The application tool 600 may be configured so that all portions of the tool 600 that come into contact with nail polish are contained in a part of the tool 600 supplied in the consumable cartridge 1600 and are used only once. This ensures that any clog or hardening of the nail polish results only in the need to replace the consumable cartridge 1600 rather than any impairment to the system 100 as a whole.

Any electronics (such as the motor that drives a pump, or sensors to determine fluid levels) may be contained within the system 100 and may be operably connected to the disposable section of the application tool 600 when the mobility system 1000 selects the tool 600. For example, the pump motor may have a mechanical interface to the pump so that the motor is part of the system 100 while the pump is in the disposable portion 1600. Similarly, any fluid level sensor may be configured so as not to come into direct contact with the fluids in the application tool 600, but may establish operable contact when the tool 600 is selected. One embodiment of the application tool 600 includes a capacitive sensor, with metal contacts of the capacitive sensor positioned against a wall of the disposable reservoir 620 when the application tool 600 is selected.

In some embodiments, the capacitive sensor may be used to determine proximity or contact between the nozzle 650 and the user's finger or nail. In some embodiments, the nozzle 650 may be conductive and may form one part of the capacitive sensor.

In some embodiments, other sensors, such as a geometric distance sensor or an ultrasonic range sensor may be provided to determine proximity or contact between the nozzle 650 and the user's finger or nail.

In one embodiment, the application tool 600 may include a hollow cylinder as the reservoir 620 with the plunger 610 that moves to expel fluid from a narrow opening in the cylinder (e.g., a syringe). In the embodiment, the pump assembly in the consumable cartridge 1600 may have a captive plunger disk without the associated shaft. The shaft may be part of the mobility system 1000, configured so that selecting the application tool 600 may be attached to the shaft to the captive plunger in the consumable cartridge 1600.

In some embodiments of the syringe, the plunger 610 may be both pushed down and pulled up, permitting fluid to be either expelled or withdrawn. Such control may permit precise tailoring of application rates in coordination with the path being used in order to ensure the most even application possible. In embodiments with a captive plunger in the consumable cartridge 1600 and a shaft on the mobility system 1000, a locking interconnect may be provided so that the shaft can both push and pull on the plunger. The locking interconnect may include a quarter-turn lock.

Figure 35:
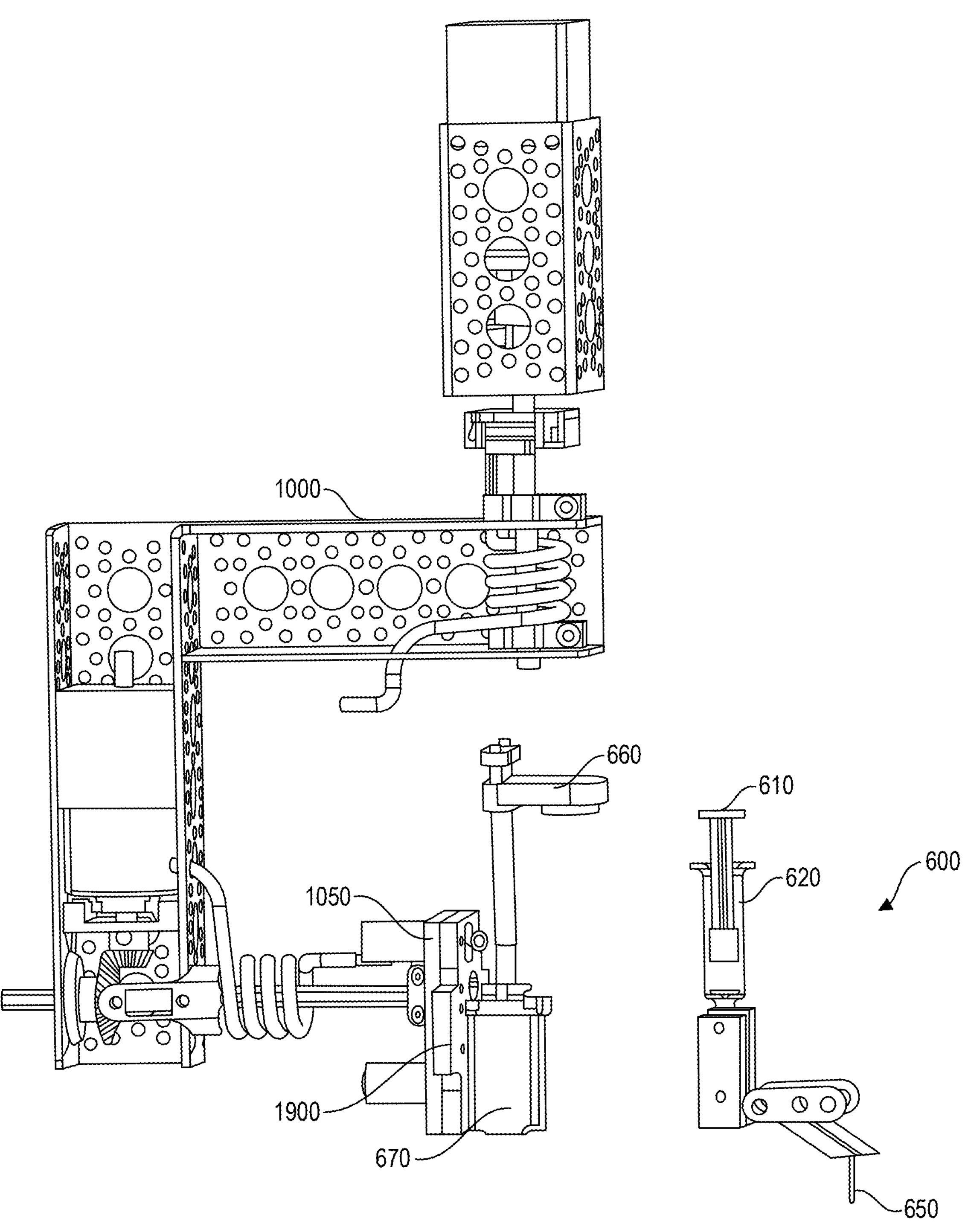
FIG. 35 is a side view of the end of the mobility mechanism system; and/or the enamel/polish application system.

FIG. 35 is a side view of the end of the mobility mechanism system 1000, and/or the enamel/polish application system 600.

Figure 36:
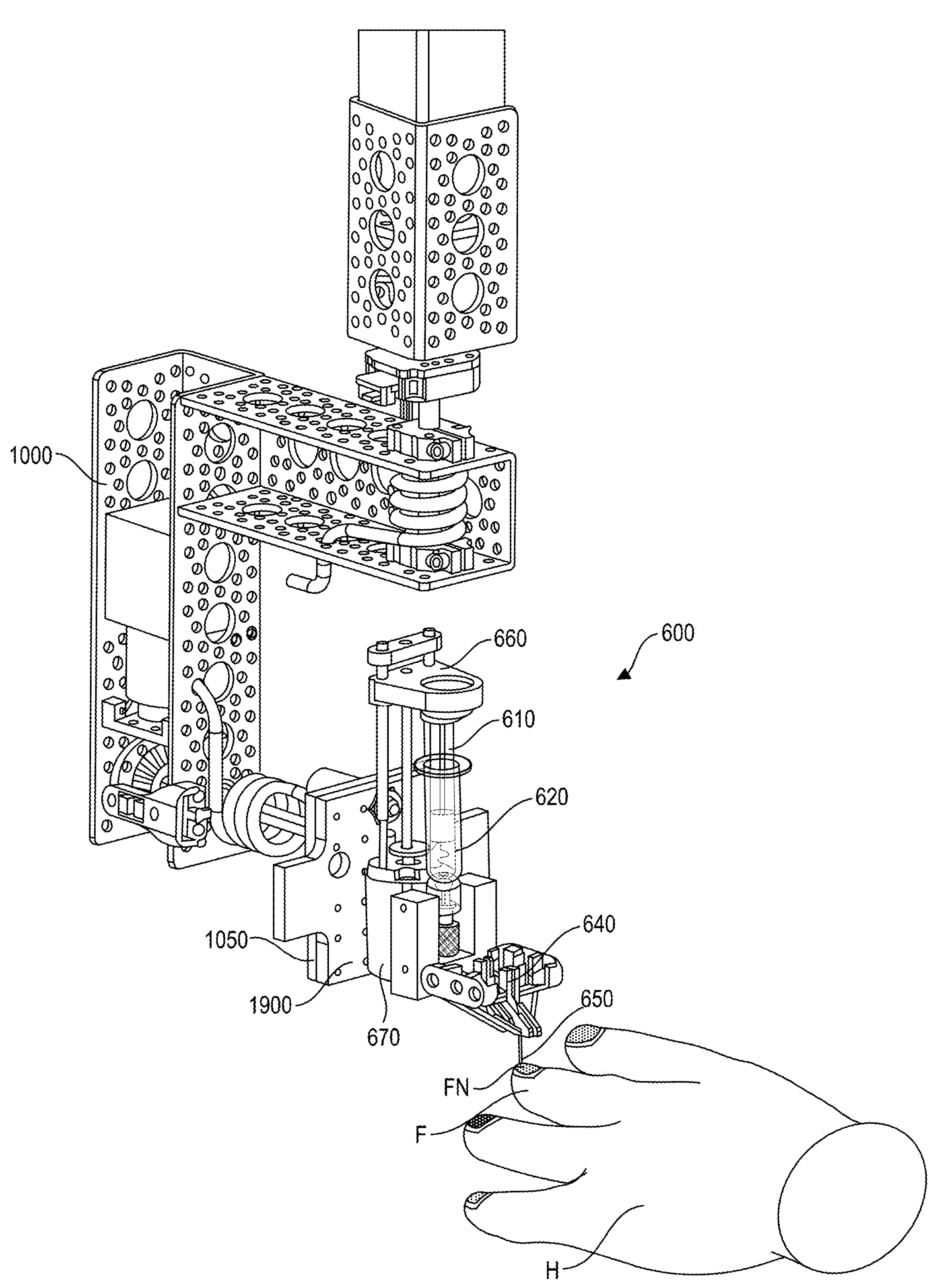
FIG. 36 is a side perspective view of the end of the mobility mechanism system; and/or the enamel/polish application system with emphasis on engagement of the enamel/polish application system with the nail of the left middle finger of the hand of the user according to an exemplary embodiment.

FIG. 36 is a side perspective view of the end of the mobility mechanism system 1000, and/or the enamel/polish application system 600 with emphasis on engagement of the enamel/polish application system 600 with the nail FN of the left middle finger F of the hand H of the user.

In another embodiment, the enamel/polish application system 600 may include a flexible bladder with an opening so that when the bladder is pressed or squeezed between rigid surfaces fluid is expelled from the opening.

The nozzle 650 may be compliant, so that the nozzle 650 rests with very little force against the surface of the nail plate. This compliance reduces the need for a highly precise shape estimate of the nail, as the nozzle will passively follow the nail's contours. Most of the compliance will be normal to the nail surface (i.e., "up and down"), but there will also be some side to side compliance so that if the nozzle 650 comes into contact with the eponychium, it will tend to deflect rather than ride up over it.

In one embodiment, compliance of the nozzle 650 may be achieved by using the flexible connective tube 630 between rigid tubes or between a rigid tube and the output of the pump. The distal end of the tube may have a 90 degree bend to orient the nozzle essentially normal to the nail plate. The flexible connective tube 630 acts to flex and permit the distal end of the nozzle 650 to follow the contours of the nail.

In another embodiment, compliance of the nozzle 650 may be achieved by having a narrower tube inside a wider tube. A spring or weight (including possibly only the weight of the inner tube) may act to cause the inner tube to slide up and down within the outer tube and so to follow the contours of the nail plate.

In another embodiment, compliance of the nozzle 650 may be actively achieved, with an extremely precise nail shape estimate being used to modify the path followed in applying nail polish so that the nozzle 650 is held a precise distance above the nail (e.g., about 100 microns (about 3937 microinches)).

Figure 37:
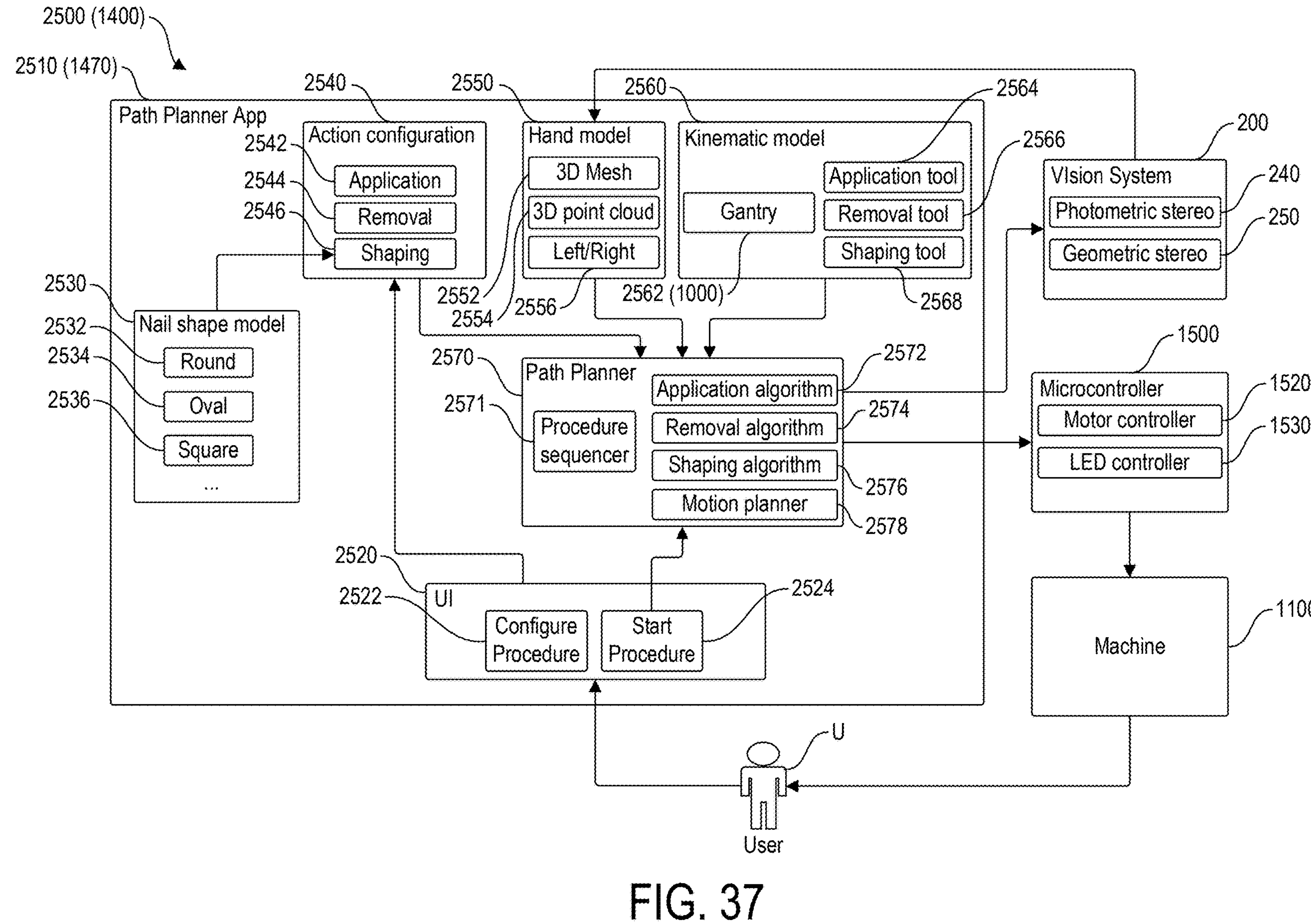
FIG. 37 is a flow chart of a second computer device or system for nail care according to an exemplary embodiment.

FIG. 37 is a flow chart of a second computer device or system 2500 for nail care. The system 2500, which may be part of the computer software system 1400, may include a path planner application 2510, which may have one or more features in common with the path planner system 1470. The path planner application 2510 may include a user interface 2520, a nail shape model system 2530, an action configuration system 2540, a hand model system 2550, a kinematic model system 2560, and a path planner system 2570.

The path planner application 2510 may send output to the vision system and/or receive input from the vision system 200. The vision system 200 may include a photometric stereo system 240 and/or a geometric stereo system 250. The path planner application 2510 may receive input from the user U. The path planner application 2510 may output information to the microcontroller 1500. The microcontroller 1500 may include a motor controller 1520 and/or an LED controller 1530. The microcontroller 1500 may be operatively connected to the enclosure 1100 or the microcontroller 1500 may be integrated into the enclosure 1100 and various systems contained therein. Various components contained in the enclosure 1100 engage with the user U as described herein.

The user interface system 2520 may include a configure procedure system 2522 and/or a start procedure system 2524. The start procedure system 2524 may be configured to send instructions to the action configuration system 2540 and/or the path planner system 2470.

The nail shape model system 2530 may include a round model 2532, an oval model 2534, a square model 2536 and any other nail model. The nail shape model system 2530 may be configured to send information to a shaping system 2546 of the action configuration system 2540.

The action configuration system 2540 may include an application system 2542, a removal system 2544, and the shaping system 2546. The action configuration system 2540 may be configured to transmit information to the path planner system 2570.

The hand model system 2550 may include a 3D mesh system 2552, a 3D point cloud system, and/or a left/right system 2556. The hand model system 2550 may be configured to transmit information to the path planner system 2570.

The kinematic model system 2560 may include a gantry system 2562 configured for use with the gantry of the mobility system 1000. The kinematic model system may include an application tool system 2564, a removal tool system 2566, and/or a shaping tool system 2568. The kinematic model system 2560 may be configured to transmit information to the path planner system 2570.

The path planner system 2570 may include a procedure sequencer 2571, an application algorithm 2572, a removal algorithm 2574, a shaping algorithm 2576, and/or a motion planner 2578. The path planner system 2570 may be configured to receive information from the UI system 2520 (particularly, the start procedure system 2524), the action configuration system 2540, the hand model system 2550, and/or the kinematic model system 2560. The path planner system 2570 may be configured to output information to the vision system 200, and/or the microcontroller 1500.

Figure 38A:
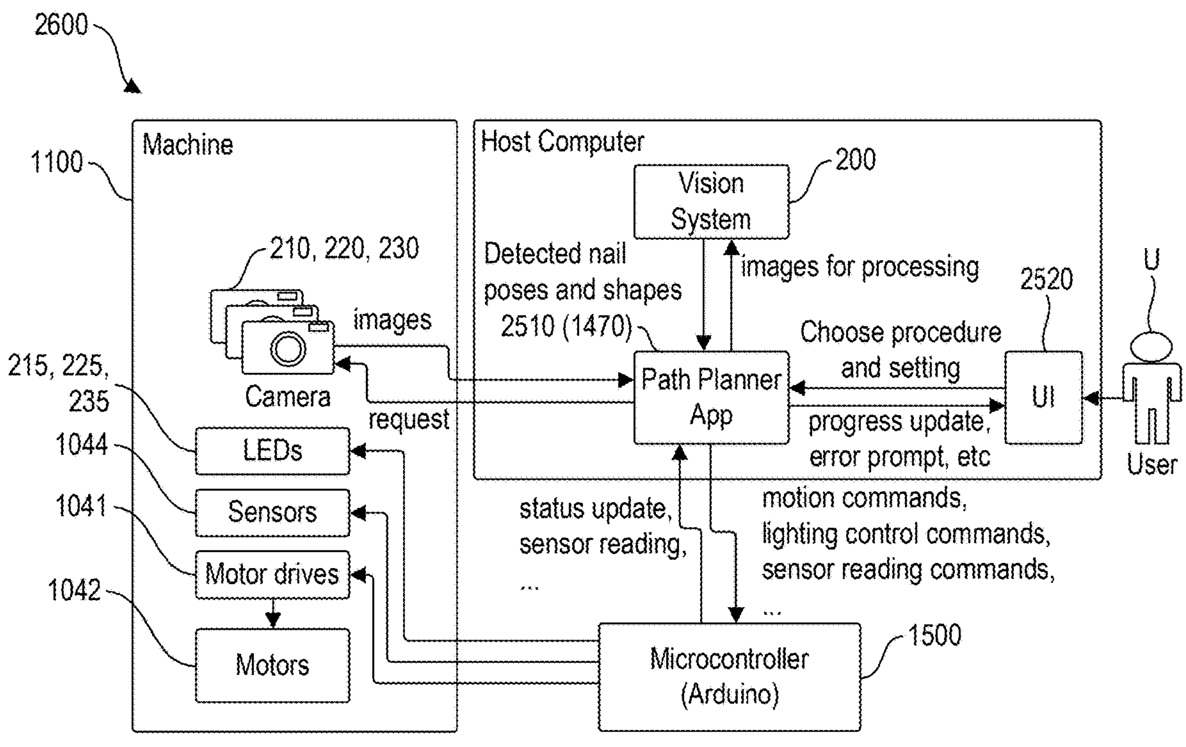
FIG. 38A is a flow chart of a third computer device or system for nail care according to an exemplary embodiment.

FIG. 38A is a system diagram and flow chart of a third computer device or system 2600 for nail care. The system 2600, which may be part of the computer software system 1400, may include the path planner application 2510, which may have one or more features in common with the path planner system 1470. The system 2600 may include the enclosure 1100 of the system 100 including various components housed therein such as (but not limited to) the cameras 210, 220, 230, the LEDs 215, 225, 235, the sensors 1044, the motor drivers 1041, and/or the motors 1042. A host computer may be provided including the vision system 200, the path planner application 2510 (1470), and the UI system 2520. The microcontroller 1500 may be operatively connected with the enclosure 1100 of the system 100 and the host computer.

The microcontroller 1500 may be configured to send instructions to the cameras 210, 220, 230, the LEDs 215, 225, 235, the sensors 1044, and/or the motor drivers 1041. The microcontroller 1500 may be configured to send information (including a status update, a sensor reading, and the like) to the path planner application 2510 (1470) and/or to receive information (including motion commands, lighting control commands, sensor reading commands, and the like) from the path planner application 2510 (1470).

The path planner application 2510 (1470) may be configured to send requests to the cameras 210, 220, 230 and/or to receive images from the cameras 210, 220, 230. The path planner application 2510 (1470) may be configured to send images for processing to the vision system 200, and/or to receive detected nail poses and shapes from the vision system 200. The path planner application 2510 (1470) may be configured to send progress updates, an error prompt and the like to the UI system 2520, and/or to receive a procedure and a setting from the UI system 2520 chosen by the user U.

In some exemplary embodiments, the path planner application 2510 may include specific types of input and processing. For example, the input for the path planner application 2510 may include one or more of the following: finger locations, orientations and 3D shapes, in the form of either point clouds, or any of the 3D mesh formats; a subset of all fingers, chosen by the user; user selected operation type(s) including application, removal, shaping, and/or a combination of the same; parameters for the operation including operation of the application system 600 (e.g., pump speed, tip speed, polish thickness, and the like), operation of the removal system 300 (e.g., soaking time, number of repetitions, standoff height (off the nail surface), and the like), operation of the shaping system 400 (e.g., desired nail length, nail shape (e.g., oval, round, square, with specific parameters for each shape like rounding radius, and the like), and/or shaping tool speed); and/or gantry parameters (e.g., tool offsets, motor and mechanical parameters (e.g., microstepping, gear ratio, min/max RPM, and the like, and/or calibration information)).

The processing performed by the path planner application 2510 may include one or more of the following: vision result processing (e.g., from the vision system 200) including a conversion of fingernail representations from the vision system 200 into the internal data format used inside the path planner application 2510, e.g., a structured 3D point cloud; filtering, smoothing or other types of cleanup of the vision results; calibration between the gantry 1000 and the vision system 200; use of a calibration pattern either attached on the floor of the gantry 1000, the hand rest 1200, or the gantry 1000 itself to configure the vision system 200 to see and align a coordinate system the vision system 200 uses to report detection results with the gantry 1000 coordinate system; modeling of mechanical system and tools; the path planner application 2510 may include the kinematic model 2560 with parameters that describe the geometry and kinematics of the gantry system 1000, as well as the geometry and physics of the one or more tools (e.g., 300, 400, 500, 600); deformable modeling of, e.g., the removal tool 300; modeling of the shaping tool 400 as, e.g., a rotating disk with different shaping velocities at different contact points; modeling of the application tool 600 including a polish flow rate during priming, a flow rate versus tool orientation, and the like; and/or one or more of the various applications described in detail herein and particularly below.

Machine Vision Processing Steps for Nail Location and Extent

Figure 38B:
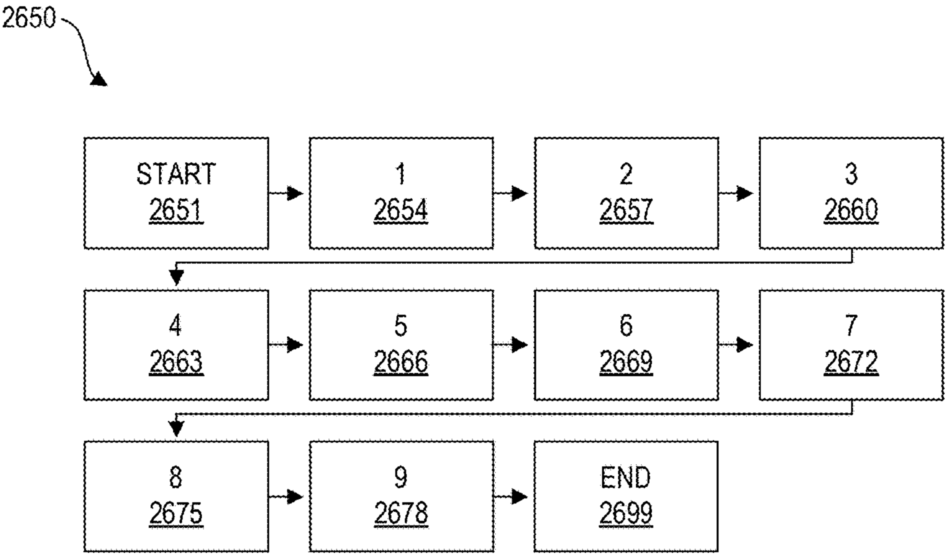
FIG. 38B is a flow chart of a machine vision method according to an exemplary embodiment.

FIG. 38B is a flow chart of a machine vision method 2650 according to an exemplary embodiment. The vision system 200 may include a machine vision method 2650, which may be part of the computer software system 1400, and/or the computer hardware system 1500, and/or the cloud computing system 1700, and/or the path planner application 2510 (147), and/or the host computer, and the like. The machine vision method 2650, also known as machine vision processing, may start 2651 with obtaining certain input 2654 (step 1 in FIG. 38B). The certain input may include one or more of the following: acquired images and ancillary information; a "primary" image of the fingers, broadly illuminated, as acquired by each of three fixed RGB cameras (e.g., 210, 220, 230) approximately in front of/above the fingers ("top" camera's images) and to the left and right sides of the hand ("left", "right" camera's images); the side cameras' images may be used to capture clear and useful images of the thumbs of the user; all top-camera images may be oriented with the fingers in a standardized direction (referred to as "up" here, when displayed conventionally); a "stack" of images from the same cameras, illuminated by localized light sources (single LEDs) of fixed positions; optionally, images from the same cameras, illuminated only by ambient lighting; a defined reference frame (RF) for coordinates, consisting of both an origin location and the directions of three orthogonal coordinate axes: "x, y, z" (the machine-vision (MV) component of the device may communicate position and orientation information to the robotic component with reference to the RF); the 3-D locations of the cameras in the RF (in some embodiments, the cameras and hand rest 1200 are fixed, all images are registered to each other; if a certain feature is present in a pixel in one of the images, and assuming the hand has not moved, the feature is present in the same pixel in all of the others); the 3-D locations of LEDs in the RF, for any LEDs that are used for the image stack; the 3-D locations of certain points on the hand rest 1200 in the RF; and/or characterization of expected finger positions on the hand rest 1200: for example, approximate row and column ranges for each finger in each camera's images, based on the known hand rest 1200 placement.

Images may be pre-processed 2657 (step 2), Pre-processing may be performed with a 3×3 median filter. Also, unless otherwise noted, all primary images may be locally histogram-equalized in luminance (while preserving their hue and saturation). Pre-processing may mitigate broken pixels that are either maximally on or completely off. By averaging each pixel with each pixel's closest neighbors, outliers may be muted.

Nail extent and height profile (e.g., height vs. horizontal position) may be determined 2660 (step 3). Nail extent and height profile may be determined by a sequence of steps, generally applied separately to each finger. For example, in terms of the top-camera imagery, the steps may be one or more of the following in any suitable order: determine approximate finger and nail placement 2663 (step 4); determine certain "edge maps" 2666 (step 5); combine the above four edge maps into a single "average" map 2669 (step 6); determine a pixel location 2672 (step 7); perform watershed processing 2675 (step 8); and/or define the final nail-extent mask 2678 (step 9).

Specifically, the determine approximate finger and nail placement step 2663, may be defined by a binary "mask" NB, i.e., a binary map identifying pixels that appear to contain the nail and nearby parts of the finger and hand rest 1200; in this description, "appear to contain" means that pixels have appropriate color, are organized into regions of appropriate size and texture, are found near pixels with certain other features, and the like; in more detail, this processing may proceed as follows: determine two finger masks based on the primary image without histogram equalization: a binary mask FB to identify pixels that appear to contain part of the finger and a fuzzy-logic mask FZ identifying the degree (on the range 0-1 inclusive) to which individual pixels appear to contain part of the finger; also, compute the axis of the nail or distal phalanx (finger's last segment) and of the centroid of the binary mask, an approximation to the middle of the nail, or at least of the finger's distal phalanx.

Dilate the mask FB to include a few pixels of the background (hand rest 1200) as a new mask BB; currently, this step dilates by 11 pixels, about ½ mm (about 0.01969 inch). (All filtering operations, both linear and morphological, use circular neighborhoods unless stated otherwise.)

Compute several simple geometric binary masks based on the above centroid: the half-spaces to the left, right, top, bottom, above-left, above-right, below-left, and below-right of the centroid. These, and combinations of them, are useful to focus processing on specific aspects of the nail, such as the proximal nail fold or the free end.

Determine a fuzzy mask EZ for the nail's free end, if any.

Determine a fuzzy mask NZ for the presence of (any part of) the nail. The algorithm for this consists of dilating FZ and EZ by 5 pixels (about ¼ mm (about 0.009843 inch)), using whichever is larger at each pixel, equivalent to a fuzzy-logic Or operation; eroding by the same 5 pixels; and performing a flood-fill of the "depressions", i.e., lower pixels values, of the result. Note that the last operation is a grey-value analog to filling in all holes of a binary mask.

Binarize NZ as a new mask. This step uses the Otsu algorithm's threshold, i.e., one that equalizes the variance of the below-threshold and above-threshold distributions of grey values. This new mask is processed to determine the largest connected region of "on" pixels; all other pixels are turned "off", producing a binary mask NB of the approximate nail region and adjacent pixels of the hand rest 1200. NB will be used to inform all later processing, especially that of the nail's boundaries.

The determine certain "edge maps" step 2666, i.e., images reflecting transitions between regions, especially nail/finger and nail/hand rest 1200, may be performed according to a variety of criteria. These criteria are color (RGB pixel values), surface-normal direction, and albedo (surface reflectivity). The steps are:

For each color channel of the primary image masked by both FB and BB, form the binary masks GB of gradients, i.e., for both increasing (+) and decreasing (−) pixel values, in both the x and y pixel directions: a total of 12 such masks. Since the increasing-value and decreasing-value pixels along the boundaries are separated by characteristic distances (roughly 2 mm (0.07874 inch) across each nail fold), offset each +/− pair of x or y masks by one-half of this distance and subtract the negative from the positive: High values therefore represent appropriately offset high-gradient regions of both signs. Then produce an edge map by averaging (in root-mean-square sense) across color channels and across dimensions x and y.

For each color channel of the primary image, form an "edginess" measure (as by morphological-gradient) at each pixel.

For the stack of single-LED images, convert R+G+B pixel values to grey and determine the surface-normal vectors and albedo at each pixel, using the techniques of photometric stereo. Then determine a similar "edginess" measure for the normal vectors and another for the albedo.

The combine the above four edge maps into a single "average" map step 2669 may be performed by forming the square of the mean of the square-roots of each. Mask these with the union of BB and NB, i.e., suppress any "edge" information except for pixels within either NB or BB. Finally, histogram-equalize this map, EA.

The determine a pixel location step 2672 may be performed by determining a pixel location C that is certain to lie within the nail region.

The perform watershed processing step 2675 may include performing watershed processing on EA, marking C and the outer boundary of the whole image as "bottoms" of their respective watersheds. If most of the nail boundary has been well identified in EA, this will form a complete—though possibly deformed—boundary between the nail pixels (single region connected to C) and the exterior (regions connected to the outer boundary). Next, exclude any pixels in regions connected to the outer boundary and mask with BB. Also exclude any remaining small, connected regions (<35 pixels, such as a circle of diameter ~⅓ mm (0.01312 inch)). Finally, retain the largest remaining region, and open (erode/dilate) by 7 pixels (~⅓ mm (0.01312 inch)), producing the binary watershed-based map WB.

The define the final nail-extent mask step 2678 may include defining the final nail-extent mask XB by opening WB by 15 pixels (~⅔ mm (0.02625 inch)) and processing the result with the Chan-Vese version of the active-contour (or "snakes") algorithm, using the adjusted primary image as the algorithm's reference image.

The machine vision method 2650 may end 2699 with output of a height map and nail or phalanx axis for the nail region of each finger or any other suitable output derived from the steps 2654 through 2678 inclusive.

Figure 39:
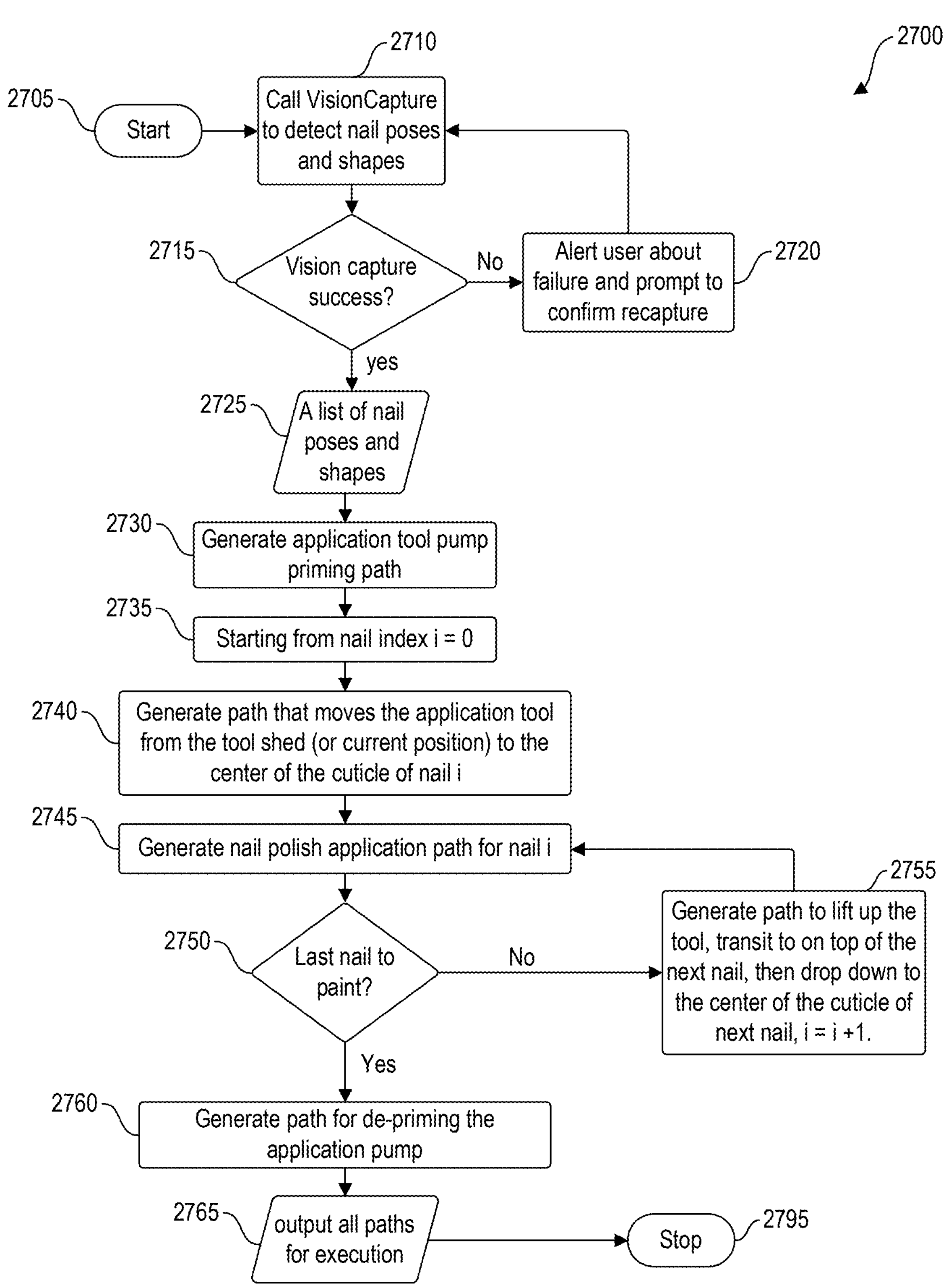
FIG. 39 is a flow chart of a first path planning program according to an exemplary embodiment.

FIG. 39 is a flow chart of a first path planning program 2700. The first path planning program 2700 may provide full hand application path planning. The first path planning program 2700 may include one or more of the following steps in any suitable order: start 2705; then call for the vision system 200 to capture images, and detect nail poses and shapes 2710; then query whether the vision capture was successful 2715; if the vision capture was not successful, then alert the user about the failure and prompt to confirm recapture 2720; if the vision capture was successful, then compare the detected nail poses and shapes with a list of nail poses and shapes 2725; then generate a pump priming path for the application tool 600 2730; then start from a nail index of i=0 2735; then generate a path that moves the application tool 600 from a tool shed (or current position) to a center of a cuticle of the nail i 2740; then generate a nail polish application path for the application tool 600 for the nail i 2745; then query whether a last nail has been painted 2750; if the last nail has not been painted, then generate a path to lift up the application tool 600, transit to a position above the next nail, then drop down to a center of a cuticle of the next nail i=i+1 2755 (and return to step 2745); if the last nail has been painted, then generate a path for de-priming the application pump 2760; then output all paths for execution 2765; and stop 2795.

Figure 40:
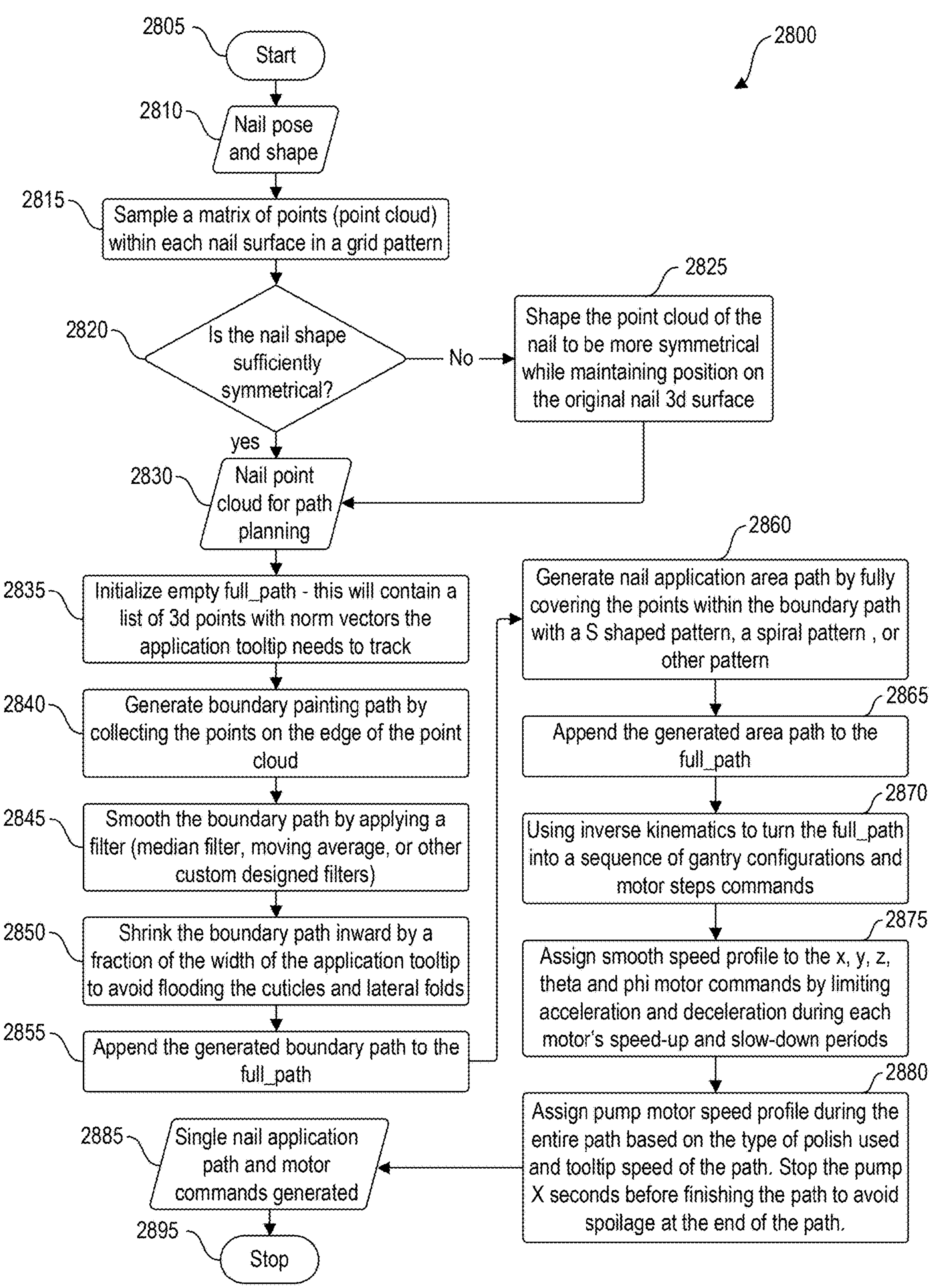
FIG. 40 is a flow chart of a second path planning program according to an exemplary embodiment.

FIG. 40 is a flow chart of a second path planning program 2800. The second path planning program 2800 may provide single nail application path planning. The second path planning program 2800 may include one or more of the following steps in any suitable order: start 2805; then call for the vision system 200 to capture images, and detect nail poses and shapes 2810; then sample a matrix of points (e.g., a point cloud) within each nail surface in a grid pattern; then query whether the nail shape is sufficiently symmetrical 2820; if the nail shape is not sufficiently symmetrical, then shape the point cloud of the nail to be more symmetrical while maintaining a position on the original nail 3D surface 2825 and proceed to step 2830; if the nail shape is sufficiently symmetrical, then generate a nail point cloud for path planning 2830; then initialize an empty full_path (which may contain a list of 3D points with norm vectors the application tooltip needs to track) 2835; then generate a boundary painting path by collecting the points on an edge of the point cloud 2840; then smooth the boundary path by applying a filter (e.g., a median filter, a moving average, or other custom designed filters) 2845; then shrink the boundary path inward by a fraction of a width of the application tooltip to avoid flooding the cuticles and lateral folds 2850; then append the generated boundary path to the full_path 2855; then generate a nail application area path by fully covering the points within the boundary path with an S-shaped pattern, a spiral pattern, or other pattern 2860; then append the generated area path to the full_path 2865; then using inverse kinematics to turn the full_path into a sequence of gantry configurations and motor step commands 2970; then assign a smooth speed profile to the x, y, z, theta and phi motor commands by limiting acceleration and deceleration during each motor's speed-up and slow-down periods 2875; then a assign pump motor speed profile during the entire path based on the type of polish used and tooltip speed of the path, and stop the pump X seconds before finishing the path to avoid spoilage at the end of the path 2880; then generate a single nail application path and motor commands 2885; and stop 2895.

Other portions of the present specification describe details about variations of paths for the application operation. The path planner application 2510 may use inverse kinematics to calculate the required motor positions for achieving a chosen application path, and calculate motor speeds that tracks the path while reducing jerkiness.

The path planner application 2510 may be configured to adjust the flow rate by changing the pump motor speed based on the geometry of the path, to achieve an even polish surface. The path planner application 2510 may adjust the flow rate to compensate for the polish flowing downward caused by gravity. The path planner application 2510 may adjust the flow rate at the corners of the path to avoid excess deposition of polish. The path planner application 2510 may use a specifically designed flow rate profile to prime the syringe. The path planner application 2510 may use a specifically designed flow rate profile to slow down and stop the pump before the end of a section of path, to achieve a better finish.

The path planner application 2510 may be configured to generate a smoothed boundary path for a more polished look. The path planner application 2510 may generate a shifting boundary path inward from the edge of the nail to avoid painting on the surrounding tissues. The path planner application 2510 may round the corners of the nail shape, or modify the shape of the boundary path (and area path actually) to be more symmetrical and/or pleasing for aesthetic purposes on irregularly shaped nails. The path planner application 2510 may provide options on the UI for the user to tune the shape of the nail polish application.

Figure 41:
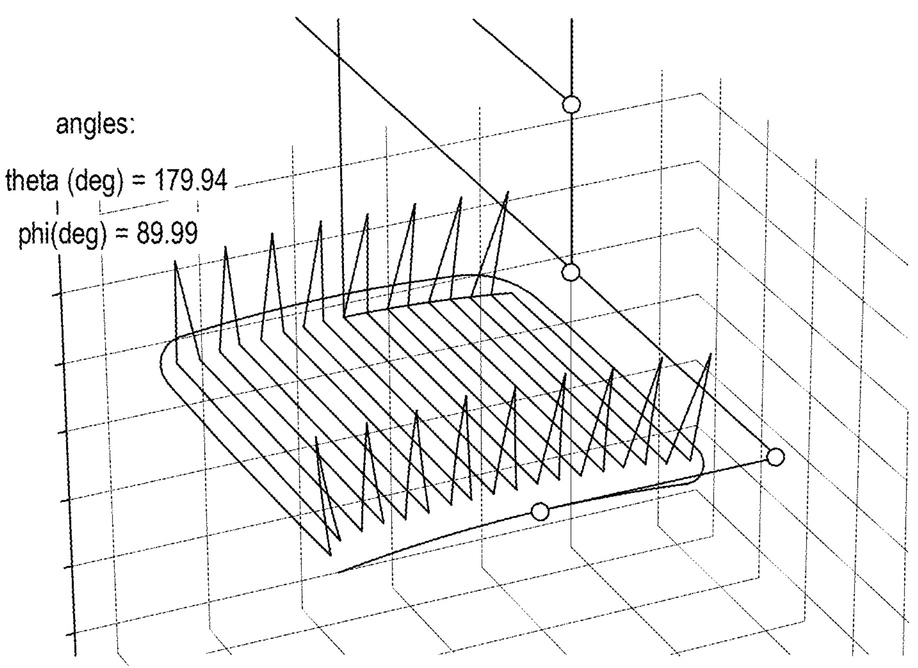
FIG. 41 is a three-dimensional rendering of a boustrophedonic path generated by the first path planning program or the second path planning program according to an exemplary embodiment.

The path planner application 2510 may be configured to lift up the tool tip at the end of each "cornrow" to achieve cleaner application. To this end, FIG. 41 is a three-dimensional rendering of a boustrophedonic path generated by, e.g., the first path planning program 2700 or the second path planning program 2800. The path planner application 2510 may be configured to approach each finger nail with a specifically designed gantry 1000 configuration to avoid interference.

The boustrophedonic path may start with an outline, and then fill in row by row. The spikes shown in FIG. 41 correspond with lifting the application tool 600 from the nail and placing it back down on a different location of the nail in an incremental fashion. FIG. 41 is plotted against a three axis framework with two angles, i.e., e.g., x (mm), y (mm), z (mm), theta (degrees) and phi (degrees).

The removal system 300 may include various removal applications. The removal application may include multiple phases of removal for each nail, focusing on different behaviors. The multiple phases may include four phases as follows: Phase 1: straight sponge wipes from the back to the front, cleaning the top of the nail, where the amount of time the sponge is stationary on the nail to allow acetone/nail-polish remover to soak into the nail polish decreases after the first pass, to maximize speed of nail polish removal while still effectively soaking the nail polish; Phase 2: sponge wipes from the middle of the nail to the back, cleaning polish on the back edge; Phase 3: switch to using the brush instead of the sponge, where the brush takes a zig-zag motion across the width of the nail, proceeding from the back to the front to scrub the nail clean; and/or Phase 4: switch back to using the sponge and wipe the sponge into the front corners of the nail.

The removal path may be automatically adjusted for any nail location, orientation, or size. Path planning may be written in a modular fashion to allow removal of nail polish from a number of nails other than 5, and to allow a user to select a subset of their nails, or to be inclusive of people with a different number of fingernails (missing a finger, polydactyly, and the like). The path planner may use the edge or corner of the sponge or brush to get into user's nail folds for better removal of polish. The sponge for removal may have a curved surface on the sponge that is configured to match a curvature of a majority of users' nails. The path planner may plan a removal path so that the removal path maximizes the usage of the clean surface of sponge or brush, and avoids deposit of removed polish on the user's skin or nail. The path planner may acquire visual feedback from the vision system 200 by moving the removal system 400 out of the camera's way, waiting for a detection result, then adjusting the path to focus on removing detected remaining polish.

Figure 42:
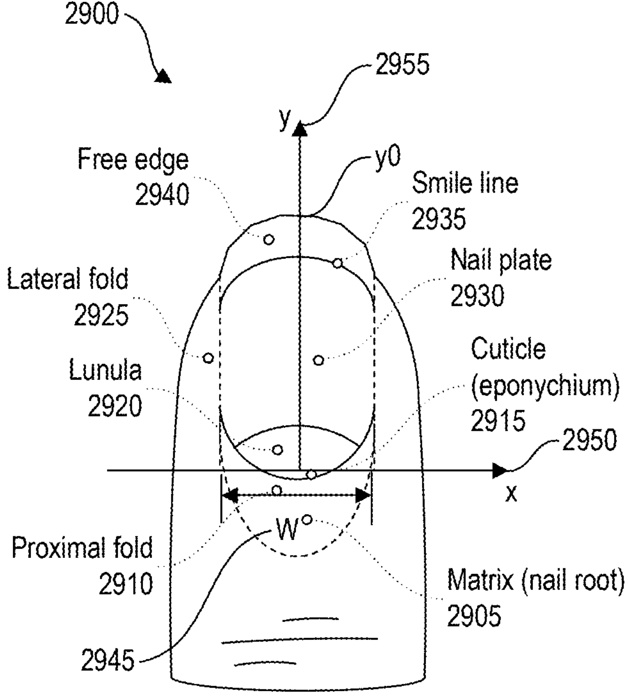
FIG. 42 is a schematic diagram of a fingertip and nail including features of a nail shape formula according to an exemplary embodiment.

The shaping system 400 may include various shaping applications. FIG. 42 is a schematic diagram of a model 2900 of a fingertip and nail including features of the nail according to a nail shape formula. A desired nail shape may be specified according to the nail shape formula Y=f(x)*w+y0 where f(x) is a continuous function defined within [−0.5, 0.5] range, and satisfies f(0)=0; w is the width of the nail; and y0 is the desired nail length after shaping. The schematic diagram includes a model 2900 of a finger and nail including a matrix (e.g., nail root) 2905, a proximal fold 2910, a cuticle (e.g., eponychium) 2915, a lunula 2920, a lateral fold 2925, a nail plate 2930, a smile line 2935, a free edge 2940, a width w 2945, a distance in along an x-axis 2950, and a distance along a y-axis 2955. The x-axis 2950 and the y-axis 2955 may cross at a point where the cuticle 2915 is the most proximal to the finger and/or aligned with a centerline of the finger and/or the nail.

Figure 43:
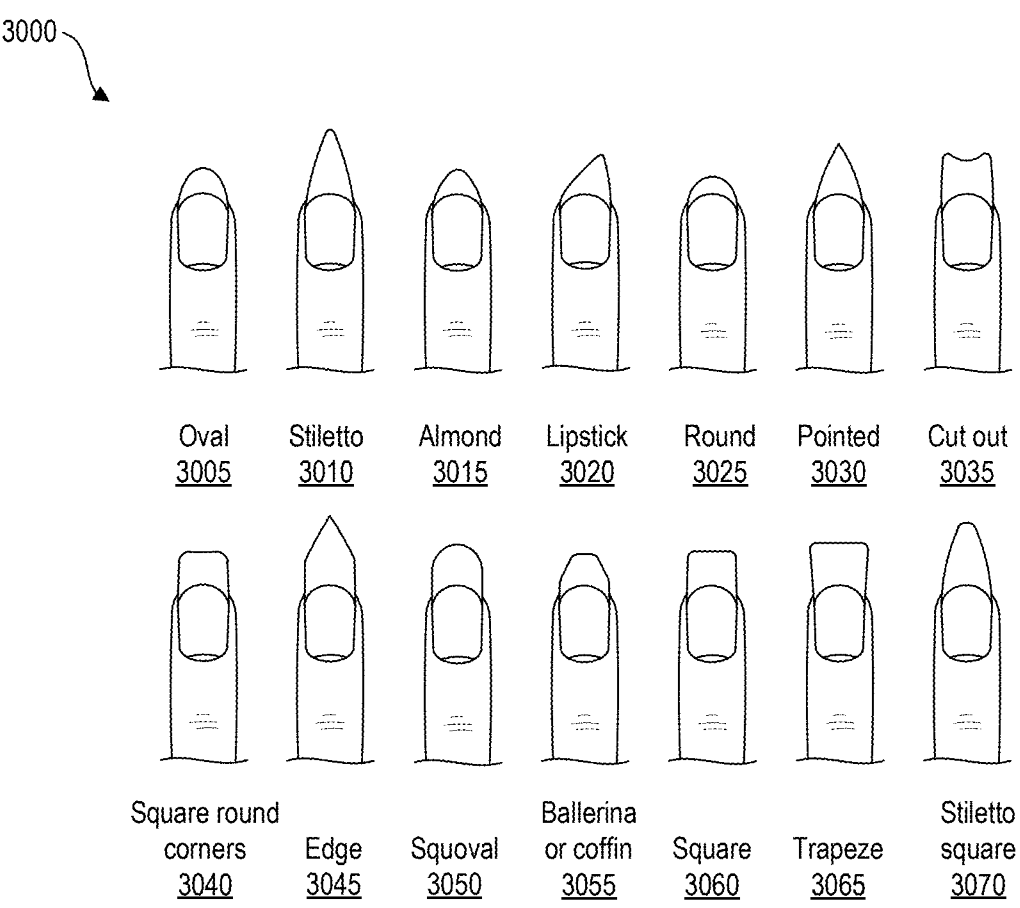
FIG. 43 includes fourteen schematic diagrams of nail shapes according to an exemplary embodiment.

Different definitions of f(x) may be implemented for each of the nail shapes 3000, or any other shapes as shown, for example, in FIG. 43, which includes fourteen schematic diagrams of nail shapes. The nail shapes 3000 may include oval 3005, stiletto 3010, almond 3015, lipstick 3020, round 3025, pointed 3030, cut out 3035, square round corners 3040, edge 3045, squoval 3050, ballerina or coffin 3055, trapeze 3065, stiletto square 3070, and the like.

The path planner application 2510 may be configured to accept a user specified desired nail shape, and analyze the shape to ensure the shape is achievable based on a current nail shape, and will not injure user's nail plate, given nail detection containing free margin information.

Figure 44:
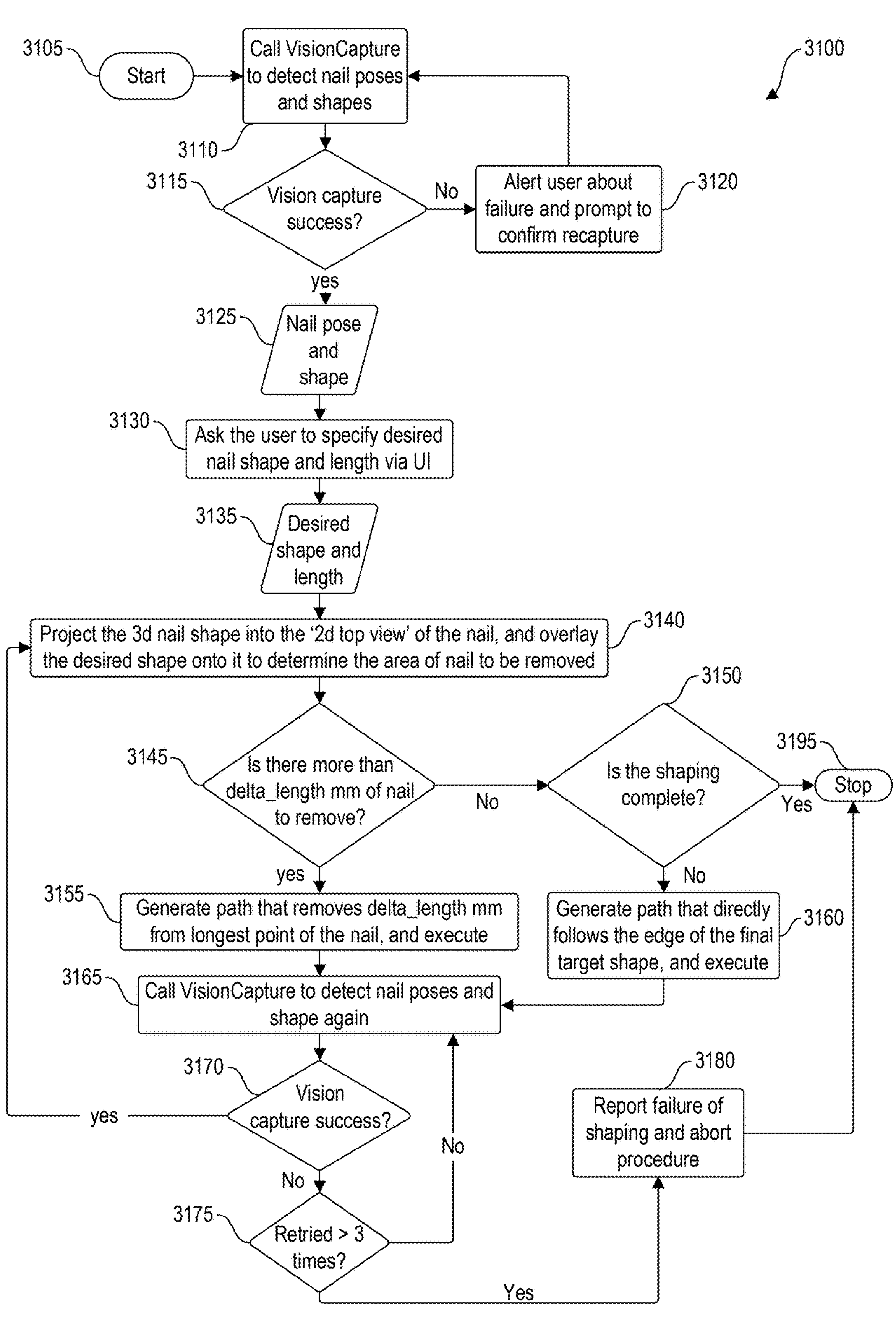
FIG. 44 is a flow chart of a nail shaping path planning program according to an exemplary embodiment.

FIG. 44 is a flow chart of a nail shaping path planning program 3100. The nail shape path planning program 3100 may include one or more of the following steps in any suitable order: start 3105; then call for the vision system 200 to capture images, and detect nail poses and shapes 3110; then query whether the vision capture was successful 3115; if the vision capture was not successful, then alert the user about the failure and prompt to confirm recapture 3120; if the vision capture was successful, then compare the detected nail poses and shapes with a list of nail poses and shapes 3125; then ask the user to specific a desired nail shape and a length via the UI 3130; then determine a desired shape and length of the nail 3135; then project a 3D nail shape into a 2D top view of the nail, and overlay the desired shape onto the image to determine the area of the nail to be removed 3140; then query whether there is more than delta_length mm of nail to remove 3145; if there is not more than delta_length mm of nail to remove, then query whether the shaping is complete 3150; if there is more than delta_length mm of nail to remove, then generate a path that removes delta_length mm from a longest point of the nail and execute 3155; if the nail shaping is complete, then stop 3195; if the nail shaping is not complete, then generate a path that directly follows the edge of the final target shape and execute 3160; after completion of step 3155 or 3160, call the vision system 200 to detect nail poses and shape again 3165; then query whether the vision capture was successful 3170; if the vision capture was successful, then revert to step 3140; if the vision capture was not successful, then determine whether vision capture was retried more than N (e.g., 3) times 3175; if the vision capture was not retried more than 3 times, then revert to step 3165; if the vision capture was retried more than 3 times, then report failure of shaping and abort the procedure 3180; then stop 3195.

Figure 45:
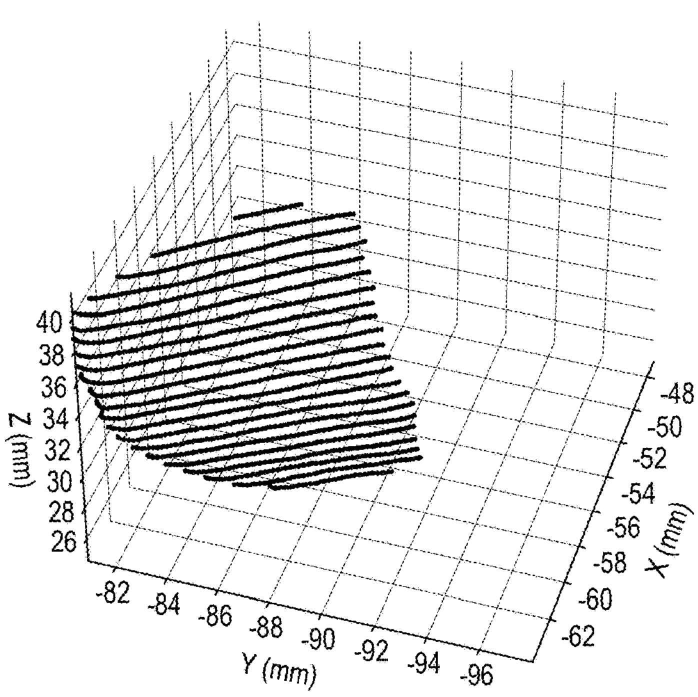
FIG. 45 is a three-dimensional rendering of the nail of the user using a nail point cloud method according to an exemplary embodiment.

FIG. 45 is a three-dimensional rendering of the nail FN of the user U using a nail point cloud method.

Figure 46:
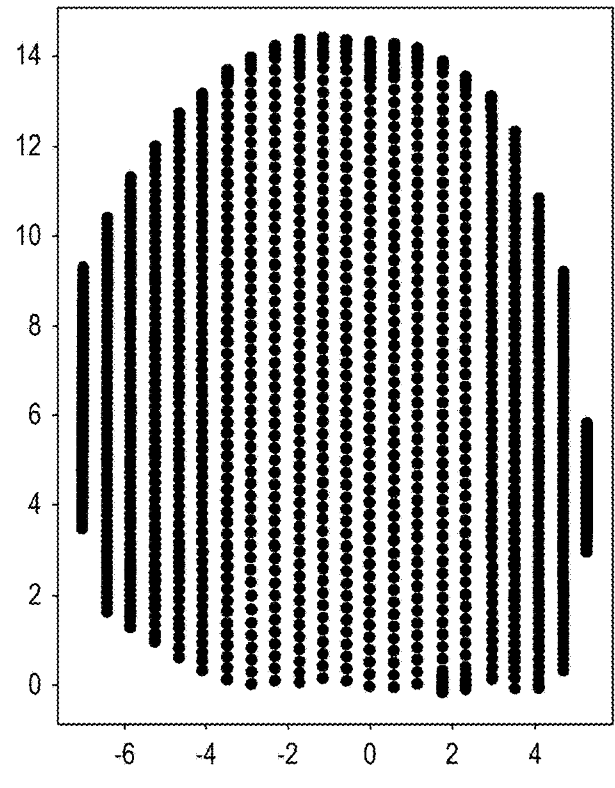
FIG. 46 is a two-dimensional top view of the three-dimensional rendering of the nail of the user using the nail point cloud method according to an exemplary embodiment.

FIG. 46 is a two-dimensional top view of the three-dimensional rendering of the nail FN of the user U using the nail point cloud method.

Figure 47:
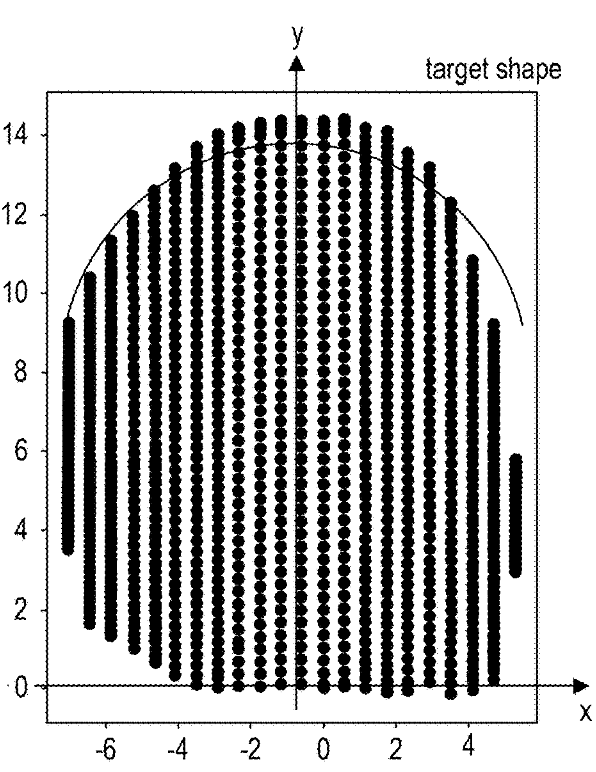
FIG. 47 is the two-dimensional top view of the three-dimensional rendering of the nail of the user using the nail point cloud method overlaid with a third round of a target shape for path planning according to an exemplary embodiment.

FIG. 47 is the two-dimensional top view of the three-dimensional rendering of the nail FN of the user U using the nail point cloud method overlaid with a third round of a target shape for path planning.

Figure 48:
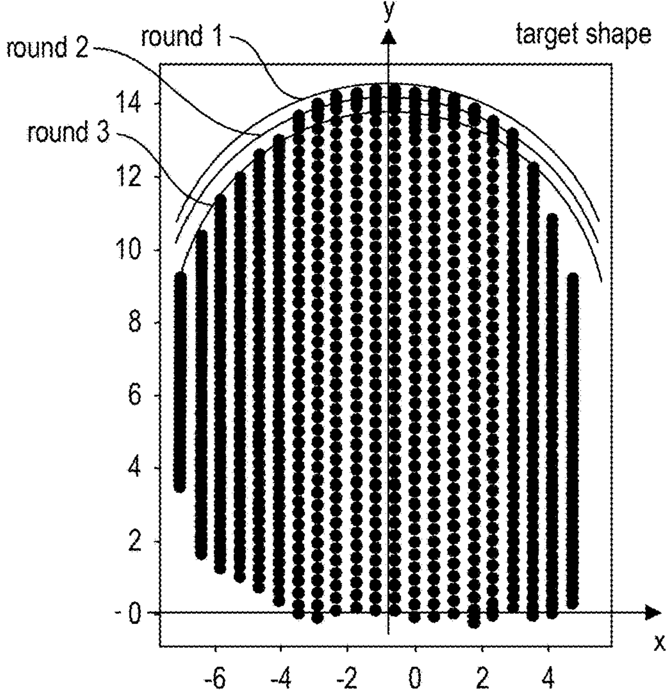
FIG. 48 is the two-dimensional top view of the three-dimensional rendering of the nail of the user using the nail point cloud method overlaid with a first round, a second round, and the third round of the target shape for path planning according to an exemplary embodiment.

FIG. 48 is the two-dimensional top view of the three-dimensional rendering of the nail FN of the user U using the nail point cloud method overlaid with a first round, a second round, and the third round of the target shape for path planning. In FIG. 48, multiple rounds of shaping were performed, in which each round takes off a small fixed amount of nail. Vision feedback from the vision system 200 may be taken between rounds of shaping.

The path planner application 2510 may compare the target nail shape with a current nail shape, and plan to remove the extra material in a series of passes, where each pass removes a small amount of material by approaching the nail from a direction perpendicular to a furthest point of contact on a nail boundary, or by approaching the nail from a direction tangential to a contact point. The contact point may be determined by examining which area is to be shaped in each pass.

The path planner application 2510 may change rotary speed of the shaping tool 400 based on the amount of material planned to remove, or slow down the shaping tool 400 at the last couple passes of shaping for a more refined finish of the nail edge.

The path planner application 2510 may change the contact point on the shaping tool 400 as an alternative way of controlling the shaping speed on the user's nail.

The path planner application 2510 may change the contact point on the shaping tool to achieve different shaping directions.

The path planner application 2510 may acquire visual feedback on the current nail shape after every pass or every few passes, and replan based on observed shaping result, or determine if the shaping is completed.

Figures 49A, 49B, 49C:
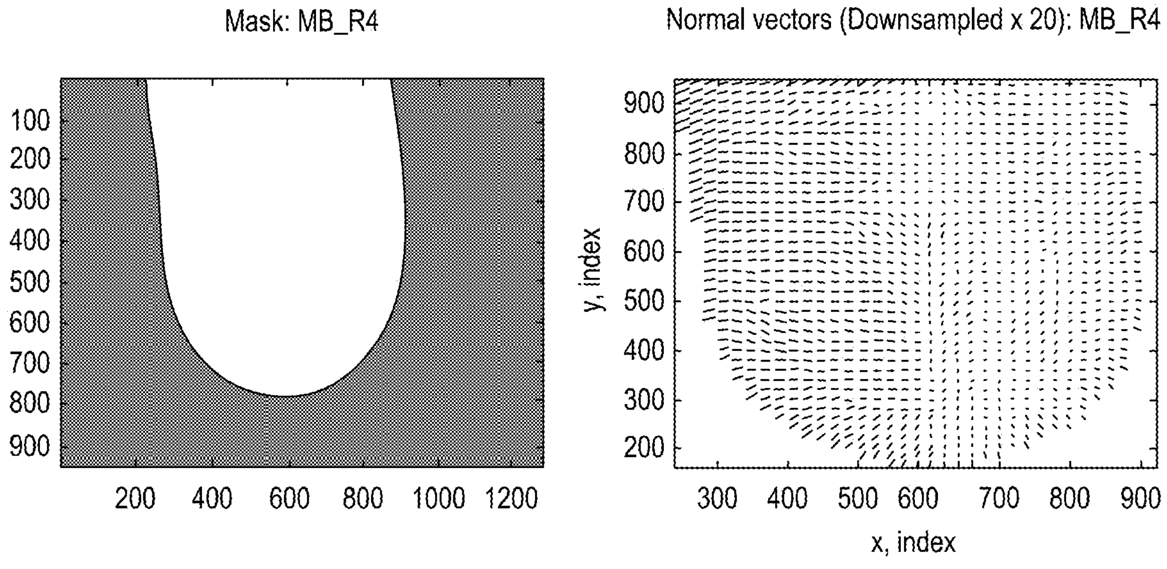
FIG. 49A is a two-dimensional image of a tip of a finger of the user overlaid with a total intensity at each of a plurality of pixels of the image according to an exemplary embodiment.
FIG. 49B is a depiction of a mask used to isolate pixels corresponding to the tip of the finger F of the user U.
FIG. 49C is a two-dimensional image of the tip of the finger of the user overlaid with normal vectors at each of a plurality of points of the image according to an exemplary embodiment.

FIG. 49A is a two-dimensional image of a tip of a finger F of the user U overlaid with a total intensity at each of a plurality of pixels of the image.

FIG. 49B is a depiction of a mask used to isolate pixels corresponding to the tip of the finger F of the user U.

FIG. 49C is a two-dimensional image of the tip of the finger F of the user U overlaid with normal vectors at each of a plurality of points of the image.

FIG. 49D is the two-dimensional image of the tip of the finger F of the user U overlaid with gradient vectors at each of the plurality of points of the image.

FIG. 49E is a three-dimensional depth map image of the tip of the finger F of the user U.

FIG. 49F is a masked version of the three-dimensional depth map image of the tip of the finger F of the user U.

Figure 50:
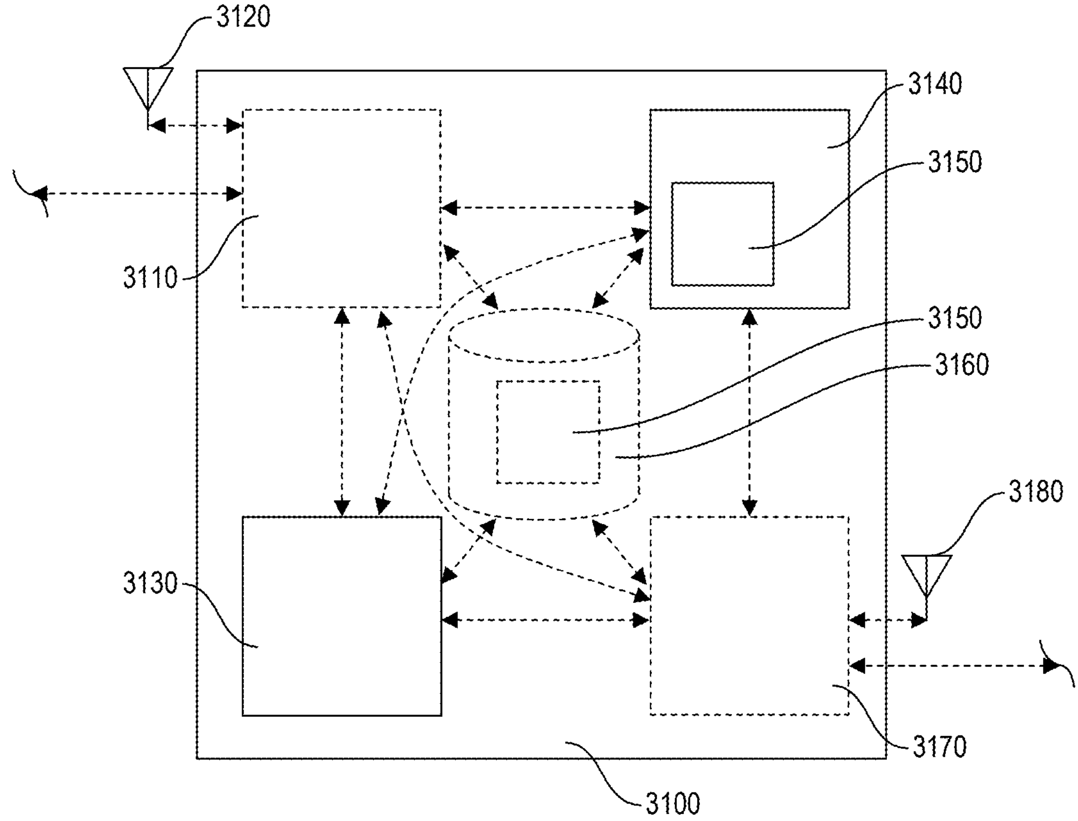
FIG. 50 is a schematic diagram of a computer device or system including at least one processor and a memory storing at least one program for execution by the at least one processor according to an exemplary embodiment.

FIG. 50 is a schematic diagram of the computer device or system (e.g., 1400, 1500, 1700, 2100, 2200, 2300, 2400, 2500, 2600, 2700, 2800, 2900, 3000, 3100 and/or 3200) including at least one processor and a memory storing at least one program for execution by the at least one processor. Specifically, FIG. 50 depicts a computer device or system 3100 comprising at least one processor 3130 and a memory 3140 storing at least one program 3150 for execution by the at least one processor 3130. In some embodiments, the device or computer system 3100 can further comprise a non-transitory computer-readable storage medium 3160 storing the at least one program 3150 for execution by the at least one processor 3130 of the device or computer system 3100. In some embodiments, the device or computer system 3100 can further comprise at least one input device 3110, which may be configured to send or receive information to or from any one of the following: an external device (not shown), the at least one processor 3130, the memory 3140, the non-transitory computer-readable storage medium 3160, and at least one output device 3170. The at least one input device 3110 may be configured to wirelessly send or receive information to or from the external device via a means for wireless communication, such as an antenna 3120, a transceiver (not shown) or the like. In some embodiments, the device or computer system 3100 can further comprise at least one output device 3170, which may be configured to send or receive information to or from any one from the group consisting of the following: an external device (not shown), the at least one input device 3110, the at least one processor 3130, the memory 3140, and the non-transitory computer-readable storage medium 3160. The at least one output device 3170 may be configured to wirelessly send or receive information to or from the external device via a means for wireless communication, such as an antenna 3180, a transceiver (not shown) or the like.

The at least one program 3150 may include one or more instructions including one or more steps of the exemplary process 2300. The instructions of the at least one program 3150 may include multiple steps not included in the processes herein, duplication of one or more of the steps of the processes herein, and/or elimination of one or more of the steps of the processes herein. The processes may be performed by the at least one program 3150. The input device 3110 may be any input device of the system 100, or any other suitable component of the system 100. The output device may be any output device of the system 100, or any other suitable component of the system 100. The controller may be part of the computer device or system 3100 or separate therefrom.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The illustrated aspects of the disclosure may also be practiced in distributed computing environments where certain tasks are performed by remote processing devices that are linked through a communications network. In a distributed computing environment, program modules may be located in both local and remote memory storage devices.

Moreover, it is to be appreciated that various components described herein can include electrical circuit(s) that can include components and circuitry elements of suitable value in order to implement the embodiments of the subject innovation(s). Furthermore, it may be appreciated that many of the various components may be implemented on at least one integrated circuit (IC) chip. For example, in one embodiment, a set of components may be implemented in a single IC chip. In other embodiments, at least one of respective components are fabricated or implemented on separate IC chips.

What has been described above includes examples of the embodiments. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It may be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that at least one component may be combined into a single component providing aggregate functionality or divided into several separate sub-components, and any at least one middle layer, such as a management layer, may be provided to communicatively couple to such sub-components in order to provide integrated functionality. Any components described herein may also interact with at least one other component not specifically described herein but known by those of skill in the art.

As used in this application, the terms "component," "module," "system," or the like are generally intended to refer to a computer-related entity, either hardware (e.g., a circuit), a combination of hardware and software, software, or an entity related to an operational machine with at least one specific functionality. For example, a component may be, but is not limited to being, a process running on a processor (e.g., digital signal processor), a processor, an object, an executable, a thread of execution, a program, and/or a computer. By way of illustration, both an application running on a controller and the controller may be a component. At least one component may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media may be any available storage media that may be accessed by the computer, is typically of a non-transitory nature, and can include both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by at least one local or remote computing device, e.g., via access requests, queries or other data retrieval protocols, for a variety of operations with respect to the information stored by the medium.

On the other hand, communications media typically embody computer-readable instructions, data structures, program modules or other structured or unstructured data in a data signal that may be transitory such as a modulated data signal, e.g., a carrier wave or other transport mechanism, and includes any information delivery or transport media. The term "modulated data signal" or signals refers to a signal that has at least one of its characteristics set or changed in such a manner as to encode information in at least one signal. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Vision System

Overview

In some embodiments, the nail care system 100 includes a system (e.g., vision system) for autonomous identification of fingernails using one or more imaging techniques. In some embodiments, the nail care system 100 includes a camera for image acquisition.

In some embodiments, the nail care system 100 identifies fingernails using one or more of the following techniques:

In some embodiments, the nail care system 100 identifies fingernails using one or more imaging frequenc(ies) and corresponding light spectra.

In some embodiments, the nail care system 100 identifies fingernails by determining a structure of a fingernail from motion, such as by taking multiple images of the fingernail from different angles (e.g., multiple fixed cameras or one or more moving cameras) to compute a point cloud.

In some embodiments, the nail care system 100 identifies fingernails using structured light, such as by projecting a specific pattern of light on the finger, and imaging from a single angle with one or more images to produce depth information.

In some embodiments, the nail care system 100 identifies fingernails using a photometric stereo technique, such as by taking multiple images from a single camera angle while varying the location of the light source to compute a map of surface normal.

In some embodiments, the nail care system 100 identifies fingernails using edge detection, such as by computing visible edges within the image from a single image.

Additional details regarding these techniques in accordance with some embodiments are provided below.

Frequency

In some embodiments, the nail care system 100 images fingernails using ultraviolent light and/or a different spectra of light (e.g., infrared light). For example, in some embodiments, the nail care system 100 uses ultraviolet light, which has been found in some embodiments to increase the contrast between fingernails and fingers. Some embodiments may utilize suitable lighting of one or more spectra of light to distinguish between skin, cuticle, nail fold and/or nail.

Figure 51A:
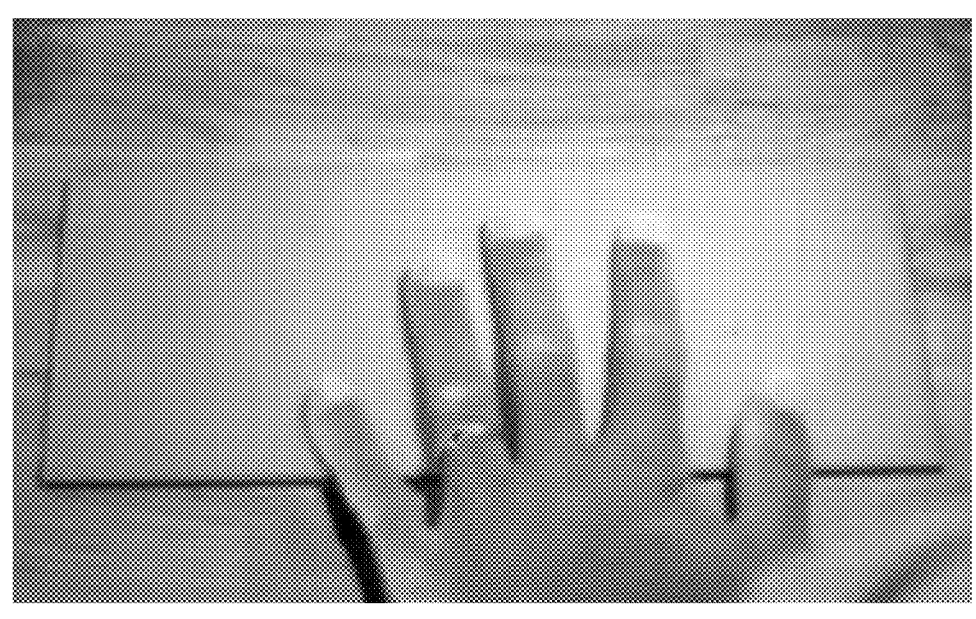
FIG. 51A is a perspective view a hand of a user illuminated with visible and ultraviolet light according to an exemplary embodiment.

FIG. 51A is a perspective view a hand of a user illuminated with visible and ultraviolet light.

In some embodiments, a combination of ultraviolet and visible light has been found to make the finger nails more distinct from other parts of the finger (e.g., skin). In some embodiments, the exposure level of the camera's sensor is controlled to avoid saturation.

Figure 51B:
FIG. 51B is the perspective view of the hand of the user illuminated with ultraviolet light only according to an exemplary embodiment.

FIG. 51B is the perspective view of the hand of the user illuminated with ultraviolet light only.

In some embodiments, the nail care system 100 (and corresponding method) utilizes the addition of a dye that fluoresces under ultraviolet light to allow for a good baseline image, for example, after the first coat had been applied. This can be done to differentiate the nails better. For example, FIG. 51B shows a hand with the middle finger painted with a UV dyed clear coat. The background is a reflective surface deliberately out of plane with the light, so that predominantly fluorescing light is returning to the camera. Alternatively or additionally, one or more imaging filters may be used.

Figure 52:
FIG. 52 is a perspective view of the hand of the user illuminated with ultraviolet light and filtered with a yellow filter according to an exemplary embodiment.

FIG. 52 is a perspective view of the hand of the user illuminated with ultraviolet light and filtered with a yellow filter.

Structure from Motion

In some embodiments, the nail care system 100 uses a structure from motion technique for generating a 3D representation of an object from multiple photographs. For example, multiple pictures are taken of a static object (finger including a finger nail) from different angles, and an algorithm of the sub-system attempts to find correspondence points between the pictures to determine the 3D location of 2D image features, resulting in a 3D point cloud of the object. In some embodiments, the nail care system 100 may include a capture apparatus or rig that moves the camera (or multiple cameras) to different positions and angles relative to a user's finger.

Figure 53:
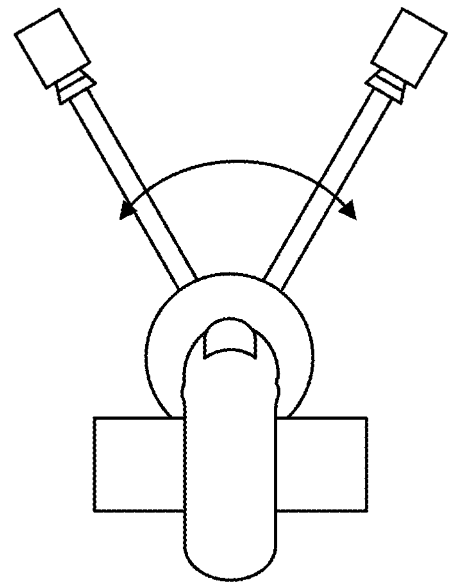
FIG. 53 is a schematic view of a capture apparatus of the vision system rotating about a finger of a user according to an exemplary embodiment.

FIG. 53 is a schematic view of a capture apparatus of the vision system 200 rotating about a finger F of a user.

Figures 54A, 54B, 54C, 54D, 54E, 54F, 54G, 54H, 54I, 54J, 54K:
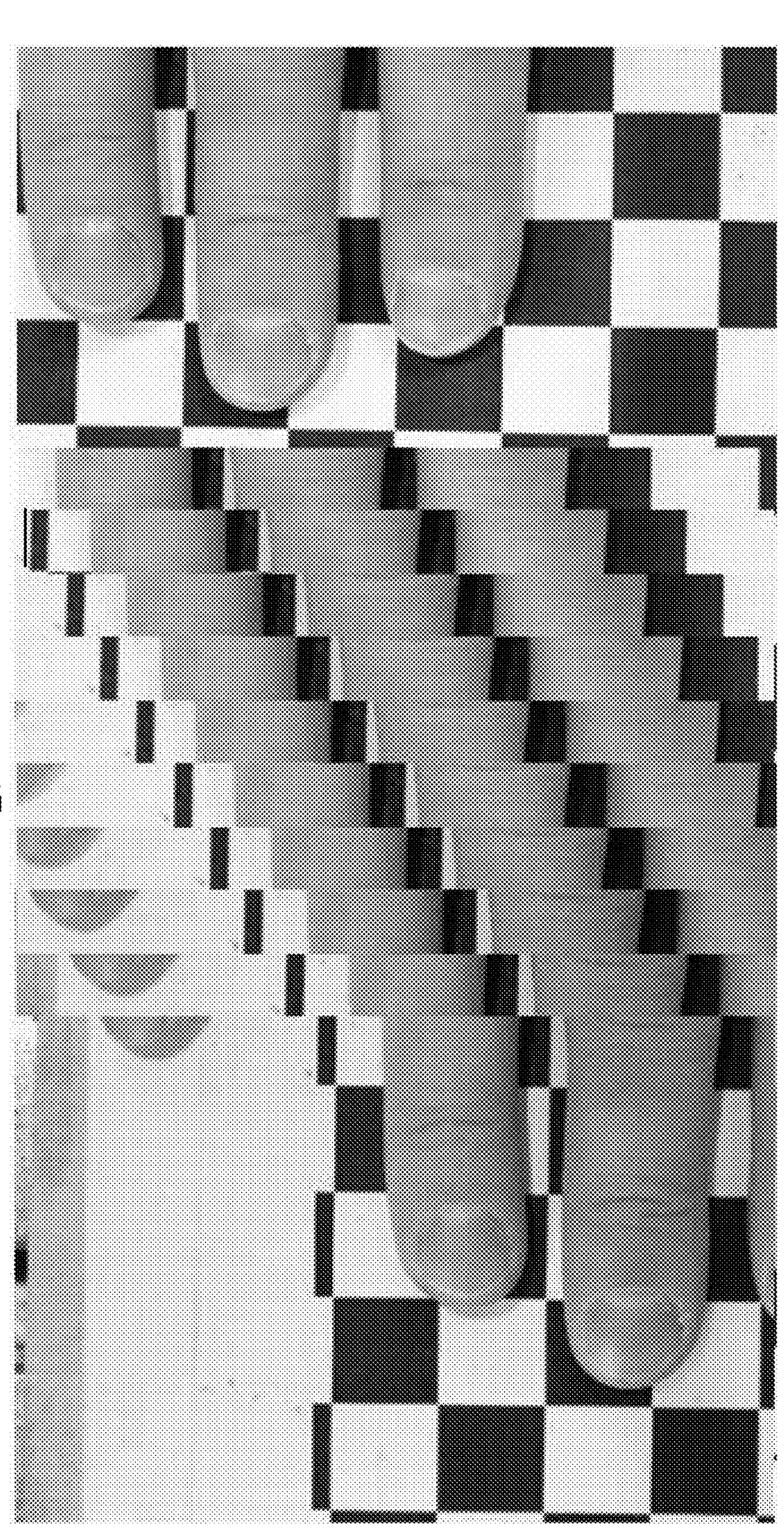
FIG. 54A is a plan view image of fingers of the user on a checkerboard background in a first position of an image capture apparatus of the vision system translating right-to-left relative to the fingers according to an exemplary embodiment.
FIG. 54B is a portion of a plan view image of the fingers of the user on the checkerboard background in a second position of the image capture apparatus of the vision system translating right-to-left relative to the fingers according to an exemplary embodiment.
FIG. 54C is a portion in a third position.
FIG. 54D is a portion in a fourth position.
FIG. 54E is a portion in a fifth position.
FIG. 54F is a portion in a sixth position.
FIG. 54G is a portion in a seventh position.
FIG. 54H is a portion in an eighth position.
FIG. 54I is a portion in a ninth position.
FIG. 54J is a portion in a tenth position.
FIG. 54K is a plan view image of the fingers of the user on the checkerboard background in an eleventh position of the image capture apparatus of the vision system translating right-to-left relative to the fingers according to an exemplary embodiment.

FIG. 54A is a plan view image of fingers of the user on a checkerboard background in a first position of an image capture apparatus of the vision system 200 translating right-to-left relative to the fingers.

FIG. 54B is a portion of a plan view image of the fingers of the user on the checkerboard background in a second position of the image capture apparatus of the vision system 200 translating right-to-left relative to the fingers.

FIG. 54C is a portion in a third position.

FIG. 54D is a portion in a fourth position.

FIG. 54E is a portion in a fifth position.

FIG. 54F is a portion in a sixth position.

FIG. 54G is a portion in a seventh position.

FIG. 54H is a portion in an eighth position.

FIG. 54I is a portion in a ninth position.

FIG. 54J is a portion in a tenth position.

FIG. 54K is a plan view image of the fingers of the user on the checkerboard background in an eleventh position of the image capture apparatus of the vision system 200 translating right-to-left relative to the fingers.

An alternative method of achieving structured motion is to take images of the same subject, from the same distance, but at different angles. This also allows for three-dimensional interpretation of the two-dimensional data collected.

Figures 55A, 55B, 55C, 55D, 55E, 55F, 55G:
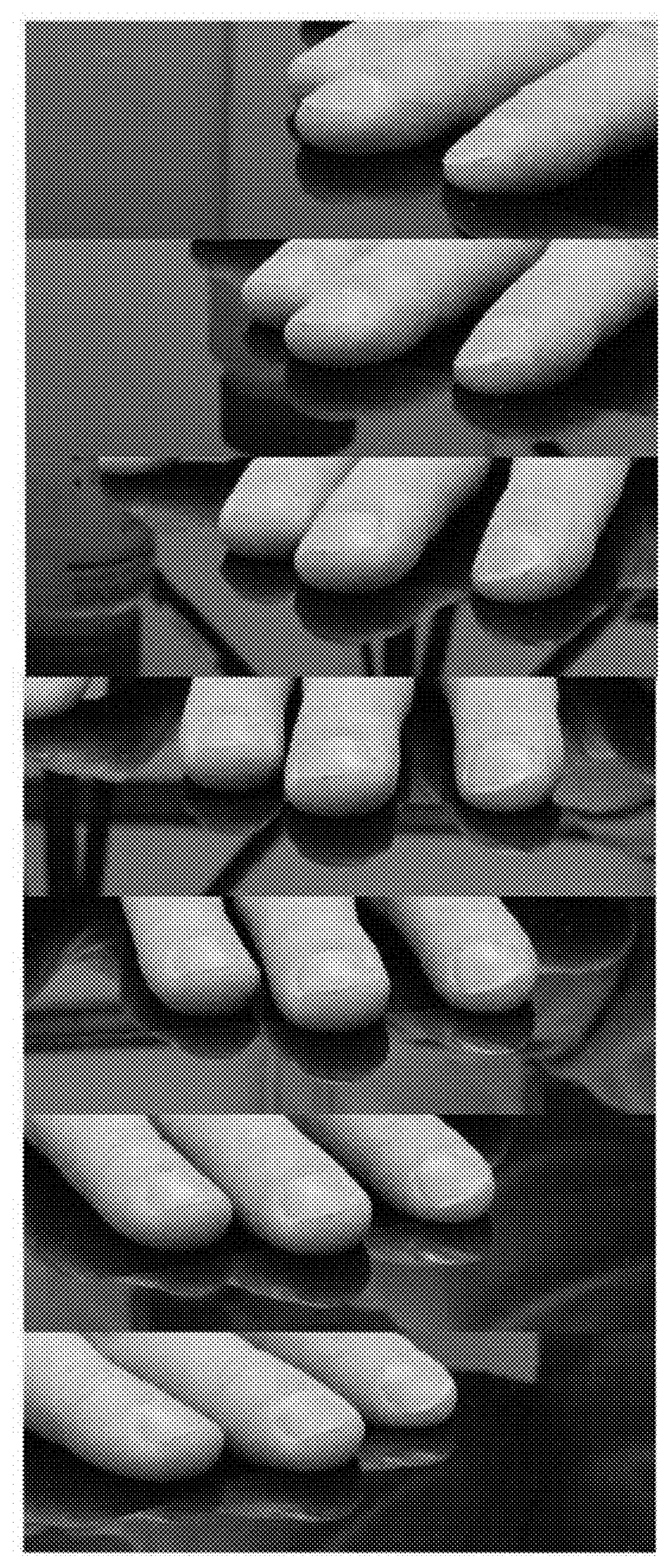
FIG. 55A is a perspective view image of fingers of the user in a position of an image capture apparatus of the vision system rotated about +45 degrees relative to the image of FIG. 55D according to an exemplary embodiment.
FIG. 55B is the position rotated about +30 degrees relative to FIG. 55D.
FIG. 55C is the position rotated about +15 degrees relative to FIG. 55D.
FIG. 55D is the position at about 0 degrees approximately parallel with an approximately horizontal axis through a center of a finger or a hand.
FIG. 55E is the position rotated about −15 degrees relative to FIG. 55D.
FIG. 55F is the position rotated about −30 degrees relative to FIG. 55D.
FIG. 55G is the position rotated about −45 degrees relative to FIG. 55D.

FIG. 55A is a perspective view image of fingers of the user in a position of an image capture apparatus of the vision system 200 rotated about +45 degrees relative to the image of FIG. 55D.

FIG. 55B is the position rotated about +30 degrees relative to FIG. 55D.

FIG. 55C is the position rotated about +15 degrees relative to FIG. 55D.

FIG. 55D is the position at about 0 degrees approximately parallel with an approximately horizontal axis through a center of a finger or a hand.

FIG. 55E is the position rotated about −15 degrees relative to FIG. 55D.

FIG. 55F is the position rotated about −30 degrees relative to FIG. 55D.

FIG. 55G is the position rotated about −45 degrees relative to FIG. 55D.

In some embodiments, the nail care system 100 achieves structured motion by capturing images with a number of different focal depths, using a lens and aperture with a shallow depth of field. Features that are in focus are a known distance from the camera. This allows for the construction of a topology as the camera, or focal plane is moved by known increments. This topology can be interpreted to create a three-dimensional understanding of the subject.

Figures 56A, 56B, 56C, 56D, 56E, 56F, 56G, 56H, 56I:
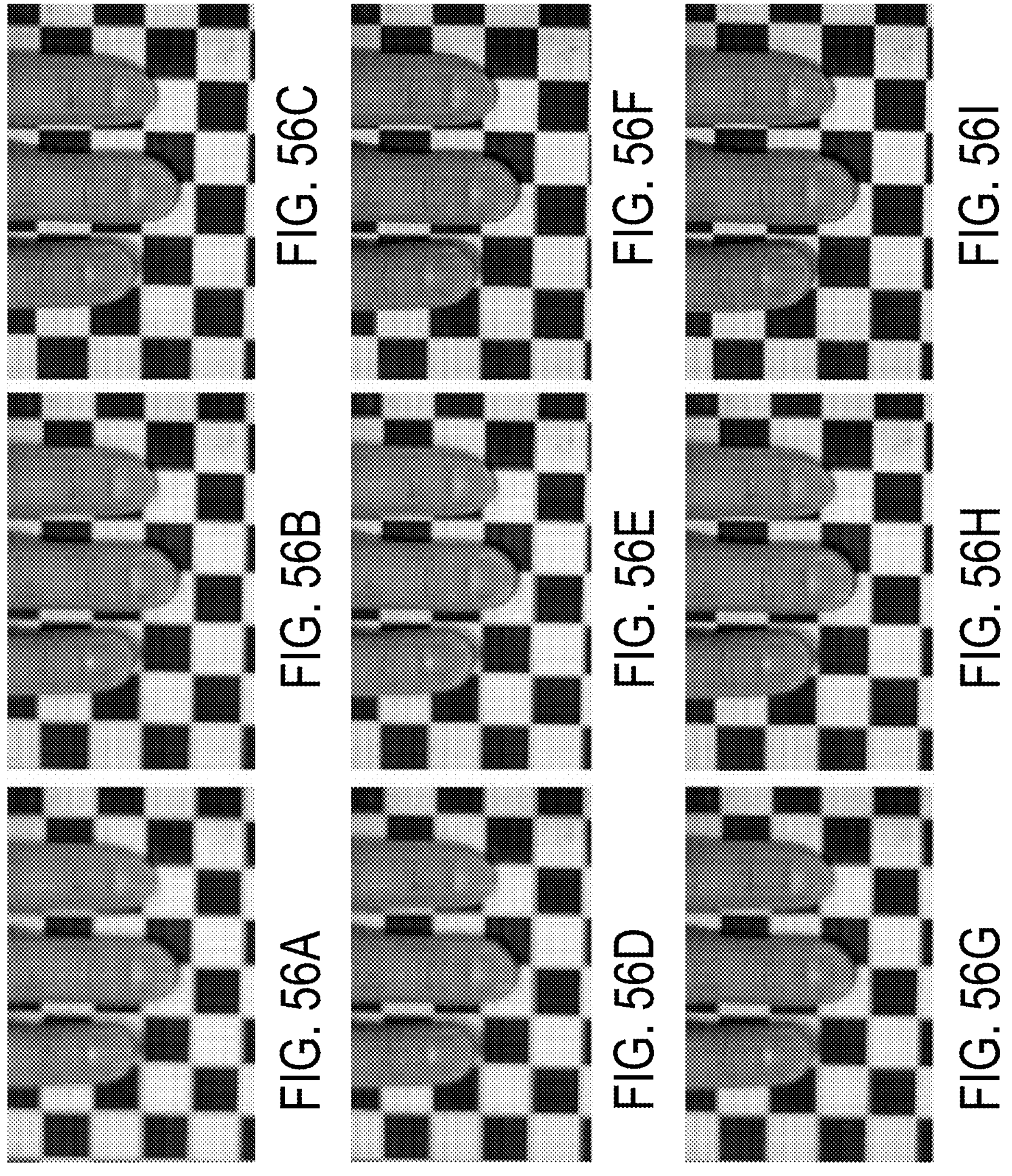
FIG. 56A is a plan view image of the fingers of the user on the checkerboard background in a position of the image capture apparatus of the vision system at a starting depth reference point according to an exemplary embodiment.
FIG. 56B is the position at 0.050 inches (0.127 centimeter) less than the starting depth reference point.
FIG. 56C is the position at 0.100 inches (0.254 centimeter) less than the starting depth reference point.
FIG. 56D is the position at 0.150 inches (0.381 centimeter) less than the starting depth reference point.
FIG. 56E is the position at 0.200 inches (0.508 centimeter) less than the starting depth reference point.
FIG. 56F is the position at 0.250 inches (0.635 centimeter) less than the starting depth reference point.
FIG. 56G is the position at 0.300 inches (0.762 centimeter) less than the starting depth reference point.
FIG. 56H is the position at 0.350 inches (0.889 centimeter) less than the starting depth reference point.
FIG. 56I is the position at 0.400 inches (1.016 centimeters) less than the starting depth reference point.

FIG. 56A is a plan view image of the fingers of the user on the checkerboard background in a position of the image capture apparatus of the vision system 200 at a starting depth reference point.

FIG. 56B is the plan view where the position is moved to about 0.050 inches (0.127 centimeter) less than the starting depth reference point.

FIG. 56C is the plan view where the position is moved to about 0.100 inches (0.254 centimeter) less than the starting depth reference point.

FIG. 56D is the plan view where the position is moved to about 0.150 inches (0.381 centimeter) less than the starting depth reference point.

FIG. 56E is the plan view where the position is moved to about 0.200 inches (0.508 centimeter) less than the starting depth reference point.

FIG. 56F is the plan view where the position is moved to about 0.250 inches (0.635 centimeter) less than the starting depth reference point.

FIG. 56G is the plan view where the position is moved to about 0.300 inches (0.762 centimeter) less than the starting depth reference point.

FIG. 56H is the plan view where the position is moved to about 0.350 inches (0.889 centimeter) less than the starting depth reference point.

FIG. 56I is the plan view where the position is moved to about 0.400 inches (1.016 centimeters) less than the starting depth reference point.

Figures 57A, 57B, 57C, 57D:
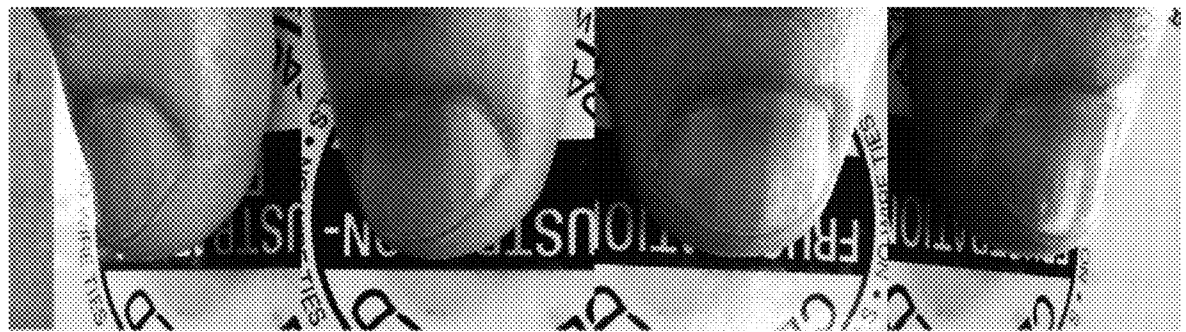
FIG. 57A is a plan view image of a thumb of the user in a position of the image capture apparatus of the vision system rotated about −30 degrees relative to an orthogonal position (i.e., 0 degrees, not shown) of the thumb about a vertical axis through the thumb according to an exemplary embodiment.
FIG. 57B is the position rotated about −15 degrees relative to the vertical axis.
FIG. 57C is the position rotated about +15 degrees relative to the vertical axis.
FIG. 57D is the position rotated about +30 degrees relative to the vertical axis.

FIG. 57A is a plan view image of a thumb of the user in a position of the image capture apparatus of the vision system 200 rotated about −30 degrees relative to an orthogonal position (i.e., 0 degrees, not shown) of the thumb about a vertical axis through the thumb.

FIG. 57B is the position rotated about −15 degrees relative to the vertical axis.

FIG. 57C is the position rotated about +15 degrees relative to the vertical axis.

FIG. 57D is the position rotated about +30 degrees relative to the vertical axis.

Figure 58:
FIG. 58 is a point cloud rendering of a thumb of the user generated from motion capture of the thumb according to an exemplary embodiment.

FIG. 58 is a point cloud rendering of a thumb of the user generated from motion capture of the thumb.

In some embodiments, the nail care system 100 creates multiple image "locations", without requiring an additional camera or actuator, by capturing an image of a subject and its reflection in the same image.

Figure 59:
FIG. 59 is a perspective view image of fingers of the user against a reflective background according to an exemplary embodiment.

FIG. 59 is a perspective view image of fingers of the user against a reflective background.

Structured Light

In some embodiments, the nail care system 100 projects a known pattern of light onto a scene or object (finger including a nail) to recover depth information from a resulting corresponding photograph. An algorithm of this subsystem may take advantage of knowledge of the original projected pattern, and determine how the pattern is modified or distorted by the scene to infer 3D information about the surfaces reflecting the pattern.

In some embodiments, the nail care system 100 uses structured light to reconstruct depth information from a scene. For example, a two dimensional ("2D") pattern may be projected and a single image captured and used to reconstruct a depth map.

In some embodiments, the nail care system 100 may project a single thin line, or multiple thin lines. Each line may be projected at an angle relative to the camera, causing variation in heights to deform the shape of the line. This method can identify small relative changes which occur at the edge of the nail, which can show up as deflections of this line, rather than obtaining a rough global depth map.

Figure 60:
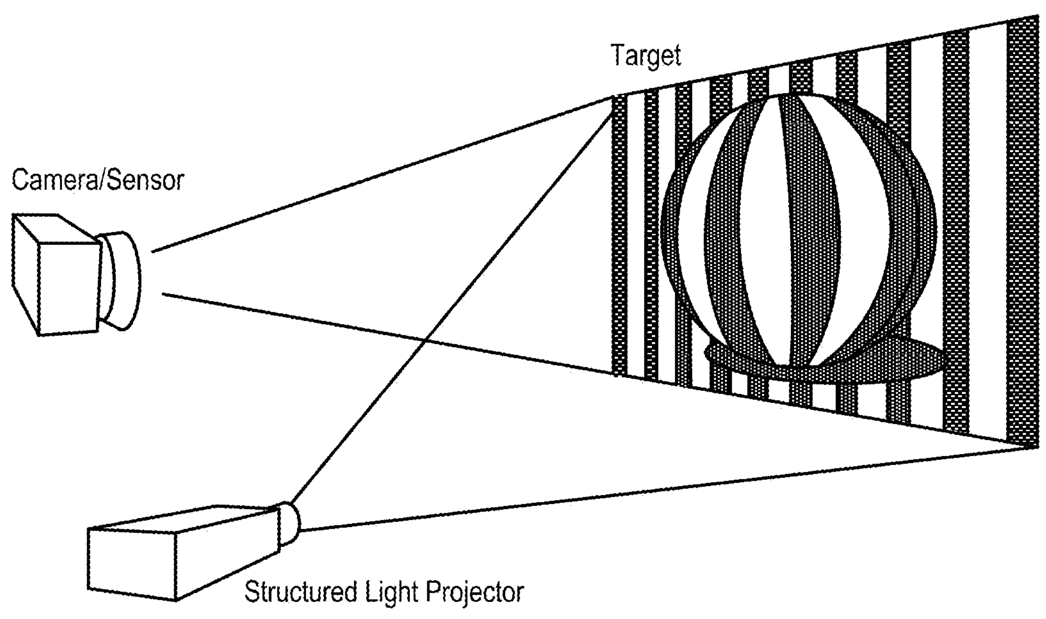
FIG. 60 is a schematic diagram of a structured light technique according to an exemplary embodiment.

In some embodiments, the nail care system 100 projects a single thin line (or multiple lines) that is swept across the finger. The apparatus may physically translate a laser line module across the finger (FIG. 60). In other embodiments, the apparatus may use a small computer projector, which allows translating the line by projecting an appropriate moving image without having to physically move any elements. The chosen projector may use a laser-based technology to reduce focusing complexity.

FIG. 60 is a schematic diagram of a structured light technique.

In some embodiments, the nail care system 100 may form structured light using a projector.

In some embodiments, the nail care system 100 may form structured light using one or more light emitting diodes (LEDs). For example, physical geometries may be achieved using molded or die-cut components in a product.

Figure 61:
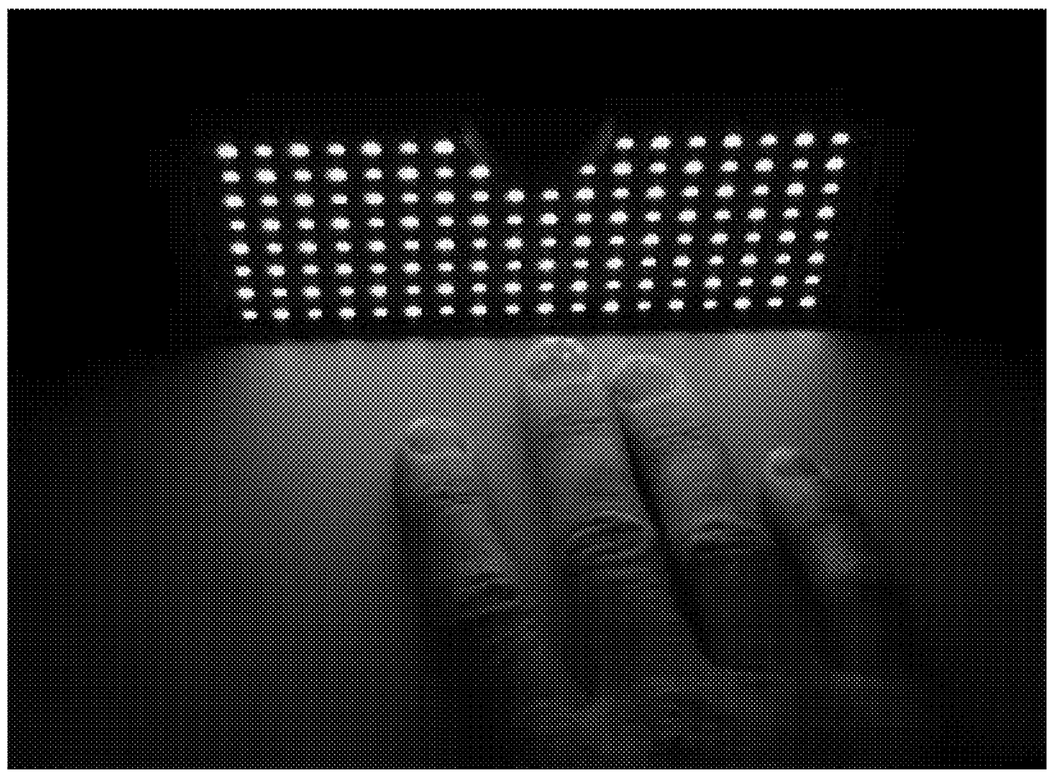
FIG. 61 is a plan view image of fingers of the user imaged while illuminated by alternating color temperatures of white light emitting diodes (LEDs) according to an exemplary embodiment.

FIG. 61 is a plan view image of fingers of the user imaged while illuminated by alternating color temperatures of white light emitting diodes (LEDs). The LEDs create bright spots of alternating color temperature on the finger nails while making the fingers appear lit by diffuse light.

Figure 62:
FIG. 62 is a plan view image of fingers of the user imaged against the reflective background while illuminated by alternating color temperatures of white LEDs according to an exemplary embodiment.

FIG. 62 is a plan view image of fingers of the user imaged against the reflective background while illuminated by alternating color temperatures of white LEDs. The LEDs create a predictable pattern on the reflective background while making the fingers and finger nails appear lit by diffuse light.

Figure 63:
FIG. 63 is a perspective view image of fingers of the user imaged while illuminated by a reflection from a striped, white, plastic component according to an exemplary embodiment.

FIG. 63 is a perspective view image of fingers of the user imaged while illuminated by a reflection from a striped, white, plastic component. The white sections create distinct reflections on the nail, but not the finger.

Figure 64:
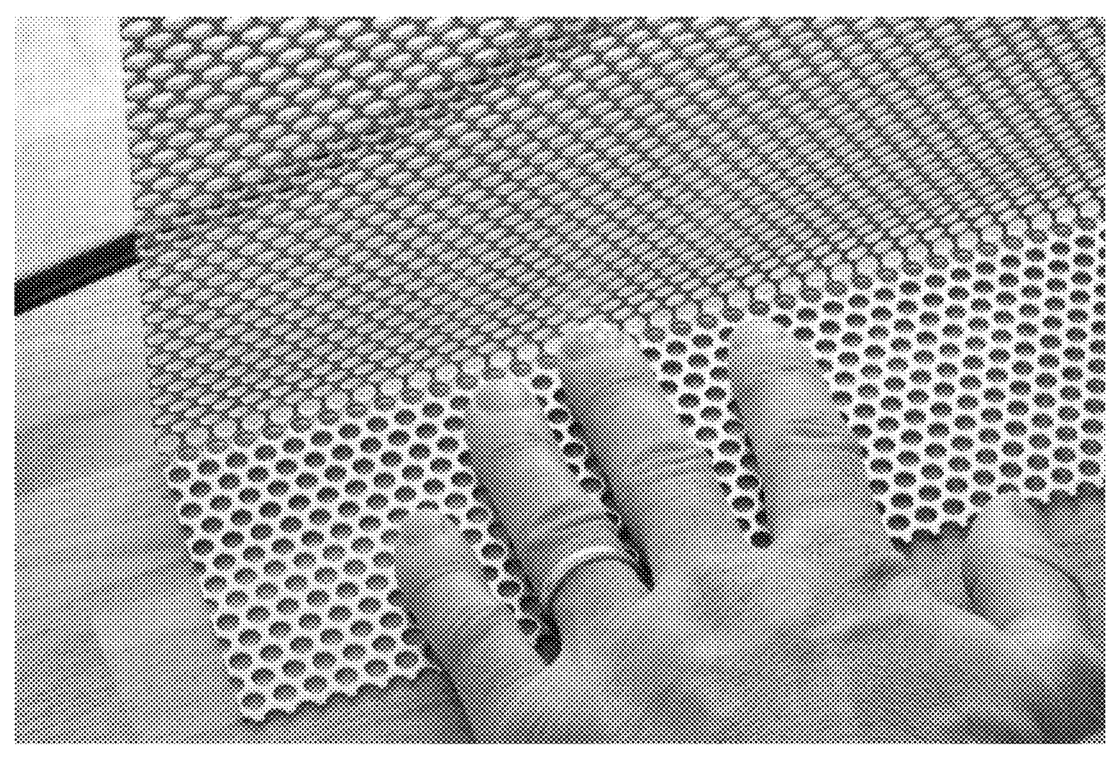
FIG. 64 is a perspective view image of fingers of the user imaged while illuminated by light shined through a perforated piece of metal according to an exemplary embodiment.

FIG. 64 is a perspective view image of fingers of the user imaged while illuminated by light shined through a perforated piece of metal. The light spots are clearly visible on the nails, but not the rest of the finger.

Figure 65:
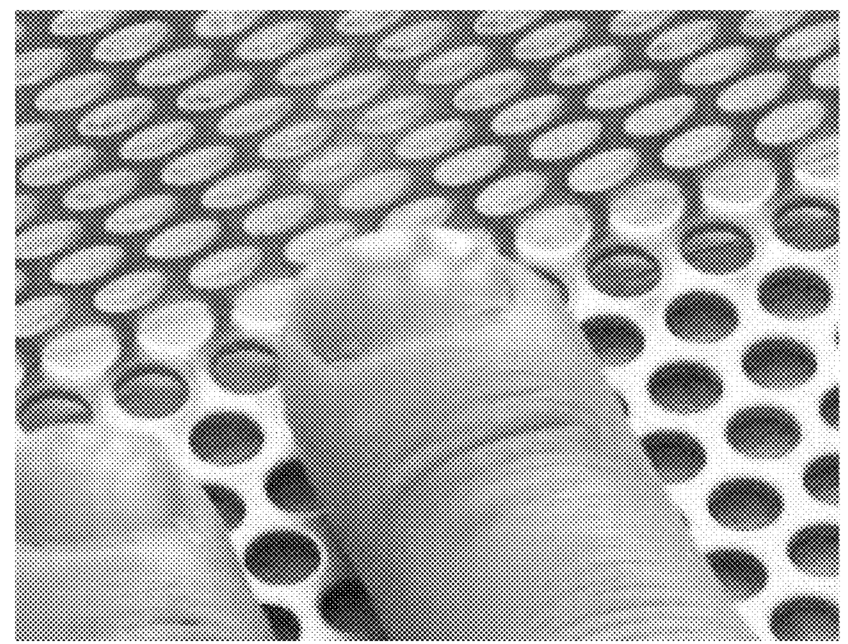
FIG. 65 is a close-up perspective view image of the fingers of the user imaged while illuminated by light shined through the perforated piece of metal according to an exemplary embodiment.

FIG. 65 is a close-up perspective view image of the fingers of the user imaged while illuminated by light shined through the perforated piece of metal. A closer view of the bright spots reflected by the finger nail and the surrounding skin, which appears diffusely lit.

Figures 66A, 66B, 66C, 66D:
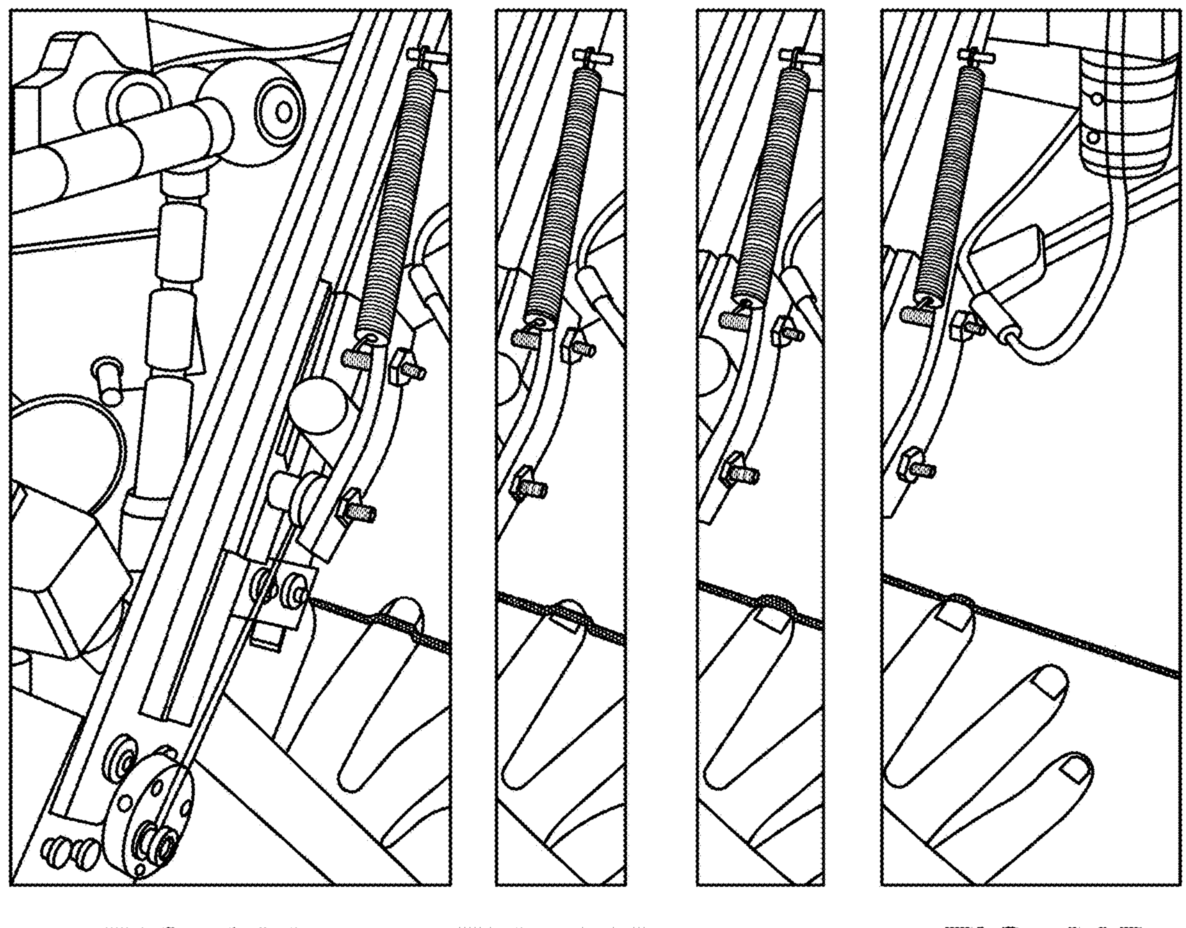
FIG. 66A is a plan view image of fingers of the user below a laser line projector in a first position according to an exemplary embodiment.
FIG. 66B is a plan view image of the fingers of the user below the laser line projector in a second position according to an exemplary embodiment.
FIG. 66C is a plan view image of the fingers of the user below the laser line projector in a third position according to an exemplary embodiment.
FIG. 66D is a plan view image of the fingers of the user below the laser line projector in a fourth position according to an exemplary embodiment.

FIG. 66A is a plan view image of fingers of the user below a laser line projector in a first position.

FIG. 66B is a plan view image of the fingers of the user below the laser line projector in a second position.

FIG. 66C is a plan view image of the fingers of the user below the laser line projector in a third position.

FIG. 66D is a plan view image of the fingers of the user below the laser line projector in a fourth position.

Figures 67A, 67B, 67C:
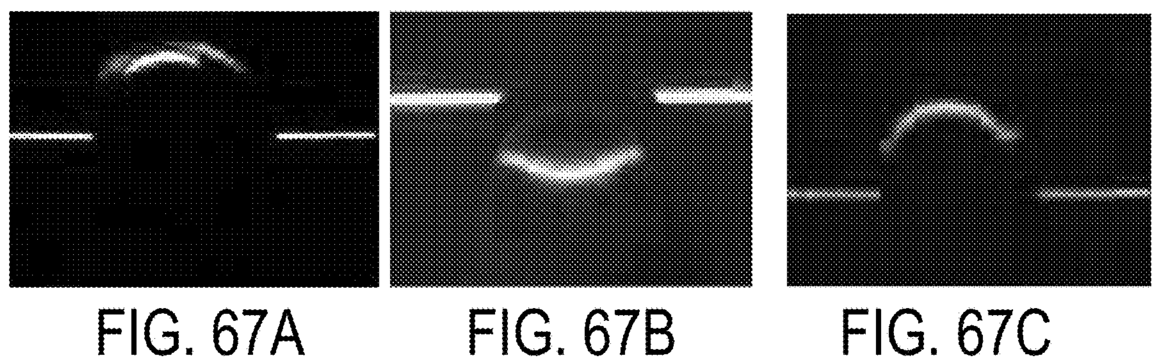
FIG. 67A is a plan view image of a finger of the user below a laser line projector in a fifth position according to an exemplary embodiment.
FIG. 67B is a plan view image of the finger of the user below the laser line projector in a sixth position according to an exemplary embodiment.
FIG. 67C is a plan view image of the finger of the user below the laser line projector in a seventh position according to an exemplary embodiment.

FIG. 67A is a plan view image of a finger of the user below a laser line projector in a fifth position.

FIG. 67B is a plan view image of the finger of the user below the laser line projector in a sixth position.

FIG. 67C is a plan view image of the finger of the user below the laser line projector in a seventh position.

Nail Trough Detection

In some embodiments, the nail care system 100 may detect the troughs on the edges of the nail where the nail ends and the lateral nail fold begins. There is typically a valley along the sides of the nail where it meets the skin, which causes a corresponding deflection in the laser scan line which can be detected.

Figures 68A, 68B:
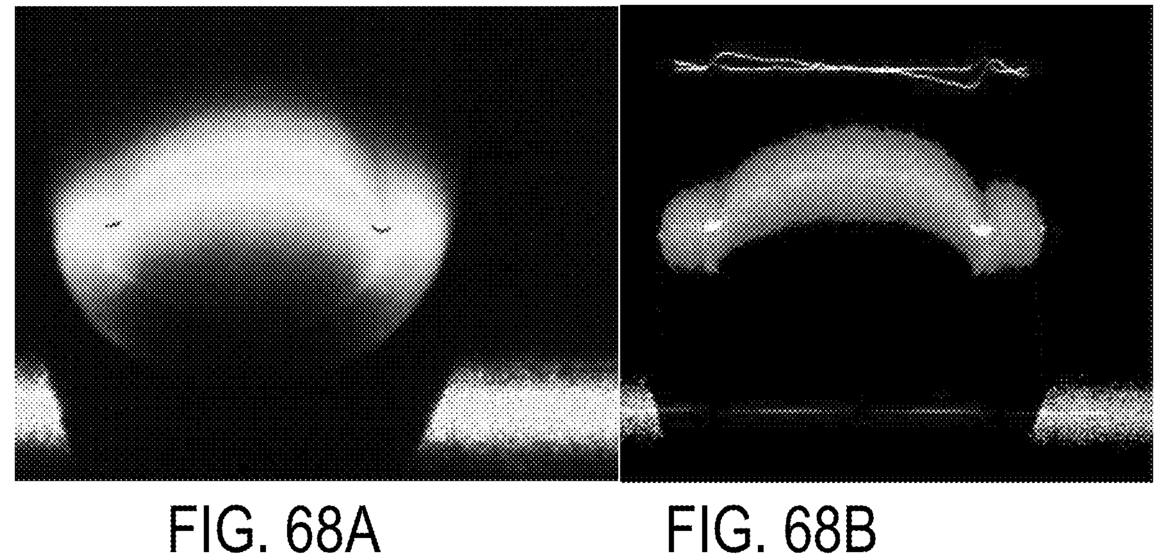
FIG. 68A is a plan view image of the finger of the user below the laser line projector in an eighth position according to an exemplary embodiment.
FIG. 68B is a single frame of rough detection by deflection of a scan line incident on the finger of the user below the laser line projector in the eighth position according to an exemplary embodiment.

FIG. 68A is a plan view image of the finger of the user below the laser line projector in an eighth position.

FIG. 68B is a single frame of rough detection by deflection of a scan line incident on the finger of the user below the laser line projector in the eighth position.

The above screen capture shows a single frame being processed as the scan line sweeps across the nail. The left shows the raw camera image of the line projected onto the nail. On the right, the processed image tracks the center of the deformed laser line (e.g., a first color-coded line), and plots the first and second derivatives (e.g., second and third color-coded lines). Maxima in the second derivative (color coded highlights) indicate the possible locations of the "troughs", the border between the nail and skin at the lateral nail folds. These are then drawn in-place as short fourth color-coded lines on the raw image capture (left) to allow comparison of computed trough locations with the original image.

Figure 69:
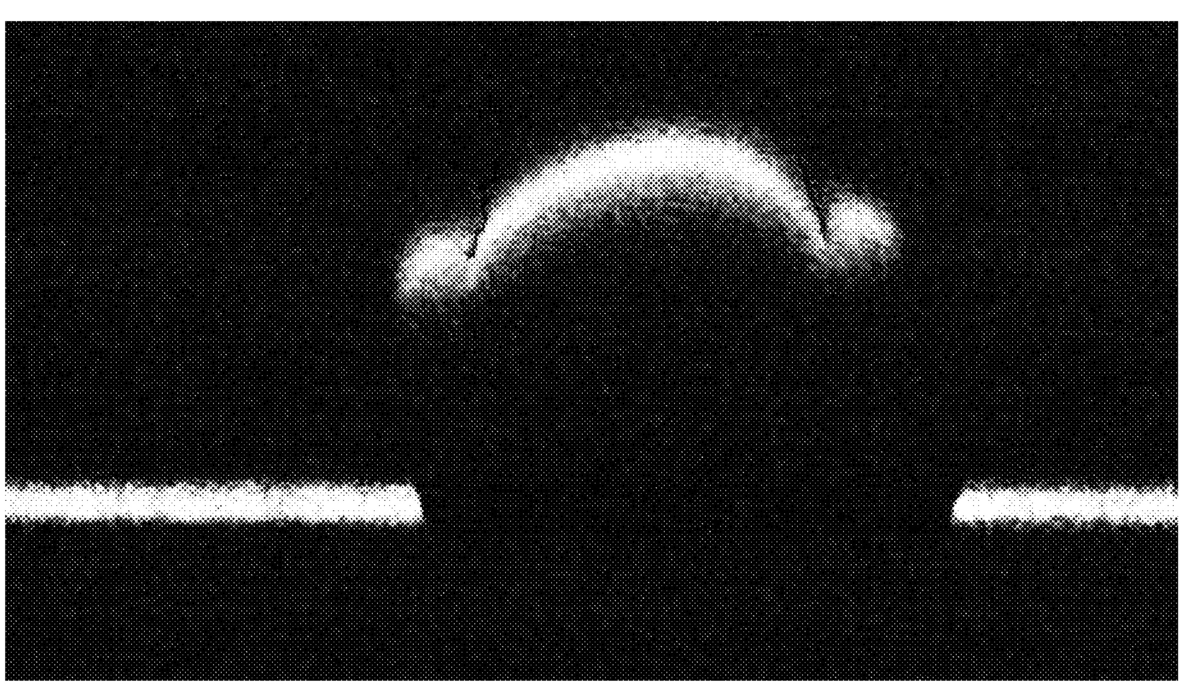
FIG. 69 includes detection results of a trough between a nail and a lateral fold of a finger by performing a trace over multiple images generated by scan lines incident on the finger of the user below the laser line projector in various positions according to an exemplary embodiment.

FIG. 69 includes detection results of a trough between a nail and a lateral fold of a finger by performing a trace over multiple images generated by scan lines incident on the finger of the user below the laser line projector in various positions.

In some embodiments, the nail care system 100 records trough detections from each image as the line sweeps across the fingertip. The above image shows the results from multiple images stitched together to trace along the path of the nail edge valley as the scan line moves down the nail (red lines trace the estimated path of the nail trough).

Parabola Maps

In some embodiments, the nail care system 100 represents the curve of the scan line across the finger as a series of one or more best-fit parabolas to act as a filter to remove noise from the raw line location. This process attempts to find the minimum number of parabolas that can be used to approximate the raw scan line to within a given error bounds. The nail shape is often well approximated by a parabola, so in these cases a good approximation can be found by representing the raw line with only a few parabolas which closely track the raw data while eliminating small noise artifacts.

Figure 70:
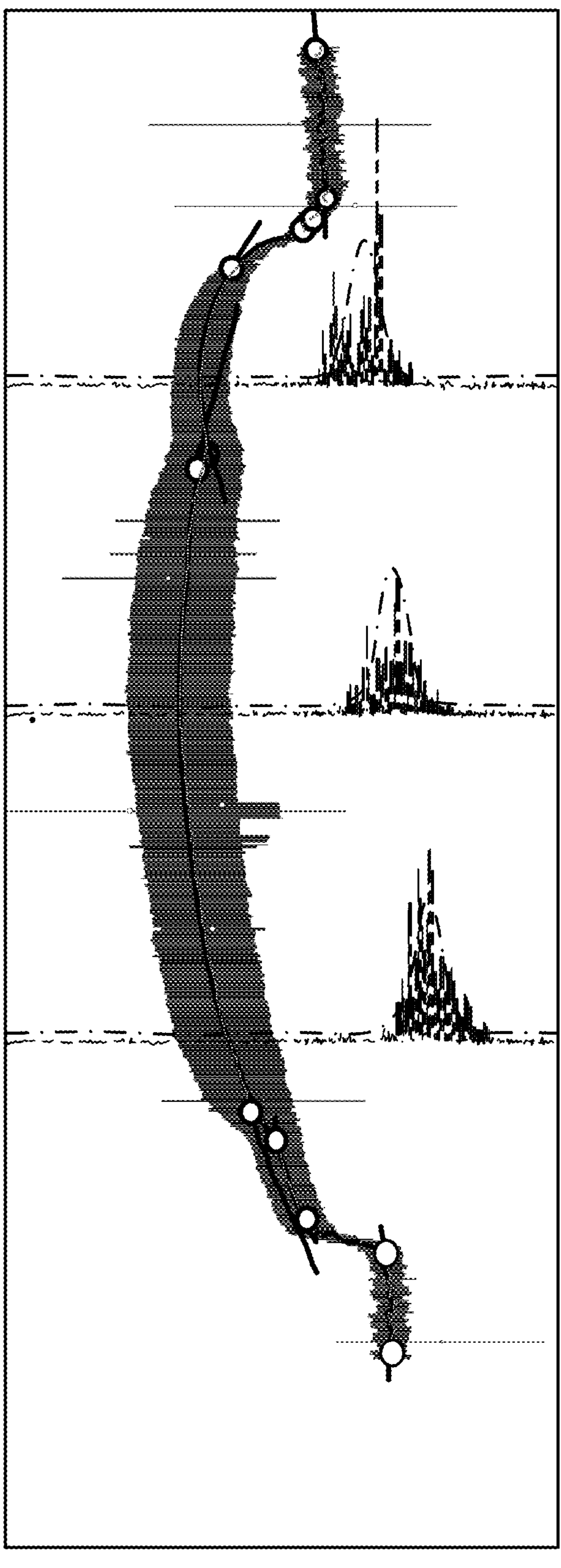
FIG. 70 includes a set of parabolas that form a best-fit match for a single frame of scan-line data of a thumb and a nail of a user according to an exemplary embodiment.

FIG. 70 includes a set of parabolas that form a best-fit match for a single frame of scan-line data of a thumb and a nail of a user.

Figure 71:
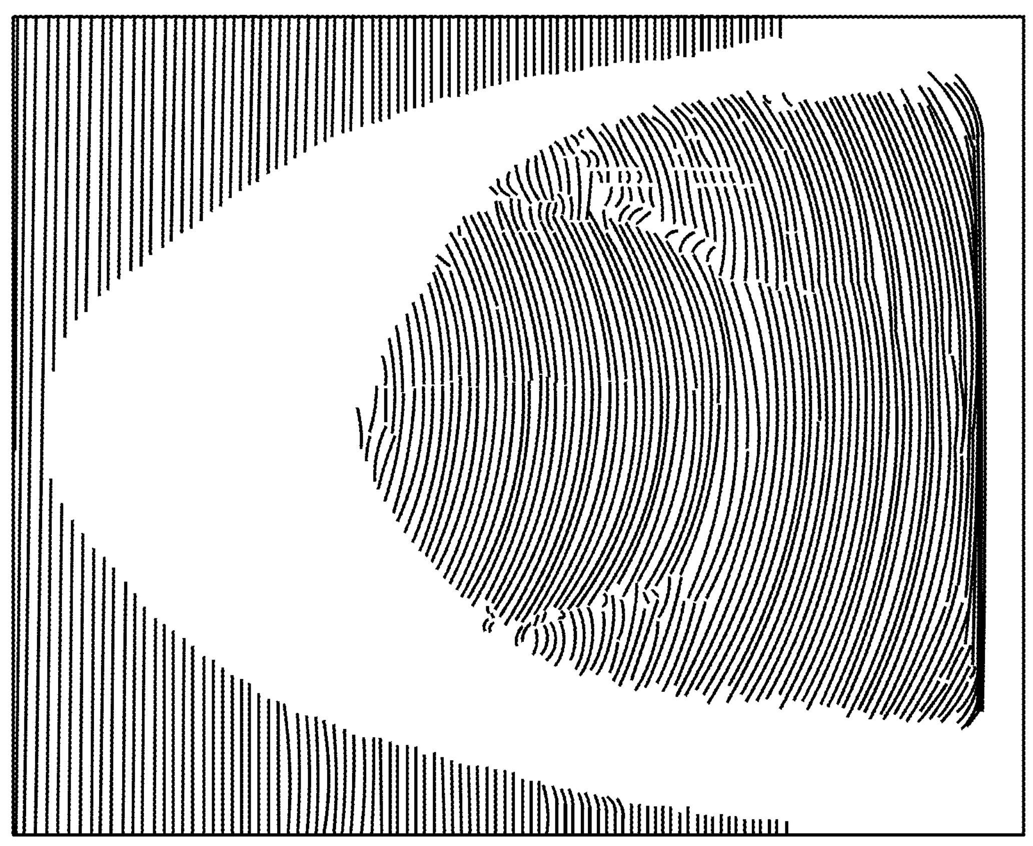

FIG. 71 is a depiction of a thumb and a nail of a user including a set of all scan lines reinterpreted as best-fit parabolas.

FIG. 72 superimposes the set of all scan lines of the thumb and the nail of the user reinterpreted as best-fit parabolas over a plan view image of the thumb.

Because the nail portion of the image can be fairly well represented as a single parabola in cross-section, the borders between the best-fit parabolas can serve to identify the border between nail and skin (see above FIGS.).

Depth Maps

In some embodiments, the nail care system 100 may use the deflection of the scan line caused by the finger to calculate the height of the thumb at that point. This provides a point cloud with points grouped along the length of each scan line.

FIG. 73A is a point cloud rendering of a finger of a user computed by sweep line deformation.

FIG. 73B is another point cloud rendering of the finger of the user computed by sweep line deformation.

The missing areas between the scanlines can be filled in via interpolation, and the data can then be transformed into a standard "depth map" format, which allows for a representation of its image coordinates for direct comparison and/or use alongside standard images.

FIG. 74A is a plan view image of a finger of a user.

FIG. 74B is a point cloud rendering with data filled in via interpolation and transformed into an image space depth map based on the image of the finger of the user of FIG. 74A.

In some embodiments, when using this structured light strategy, the camera image is only used to detect the position and shape of bright scan line. It thus can be more robust to variations in color. In the below sample of partially painted nails, the structured light depth map is largely unaffected by the paint.

FIG. 75A is a plan view image of a partially painted finger of a user using the structured light technique.

FIG. 75B is a point cloud rendering with data filled in via interpolation and transformed into an image space depth map based on the image of the partially painted finger of the user using the structured light technique of FIG. 75A.

Photometric Stereo

In some embodiments, the nail care system 100 uses a photometric technique to estimate the surface angles of an object without moving the camera or object, but instead by varying the illumination. The data computed about the surface is represented as a surface "normal map", which includes a three-dimensional ("3D") vector normal to the estimated surface for each pixel of the image.

FIG. 76A is a first plan image of a finger of a user with a camera and the finger in a stationary position under a first lighting condition.

FIG. 76B is a second plan image of the finger of the user with the camera and the finger in the stationary position under a second lighting condition.

FIG. 76C is a third plan image of the same under a third lighting condition.

FIG. 76D is a fourth plan image of the same under a fourth lighting condition.

FIG. 76E is a fifth plan image of the same under a fifth lighting condition.

FIG. 76F is a sixth plan image of the same under a sixth lighting condition.

FIG. 76G is a seventh plan image of the same under a seventh lighting condition.

FIG. 76H is an eighth plan image of the same under an eighth lighting condition.

In some embodiments, the nail care system 100 includes a system or rig that moves a light source in an arc over the finger, allowing for as many pictures as desired with a continuously varying lighting. One example of such a system is shown as Left capture rig below in FIG. 77A.

In some embodiments, the nail care system 100 includes a system or rig that uses a set of discrete light sources mounted on a plane above the finger which can be turned on/off individually. This rig provides a finite set of lighting angles, but the lighting angles vary in a second dimension as compared to the first rig described above (along the finger and around the finger). One example of such a system is shown below as Right capture rig in FIG. 77B.

FIG. 77A is a schematic view of the capture apparatus of the vision system 200 rotating about the finger of the user, in which a stationary camera takes an image illuminated by a plurality of light sources rotated approximately about an axis through the finger.

FIG. 77B is a schematic view of a capture apparatus of the vision system 200 including a plurality of light sources arranged in a grid on a substrate about an aperture for a lens of the capture apparatus.

FIG. 78 is an uncalibrated normal map of a finger of a user generated using plan view images captured from the capture apparatus of the vision system 200 of FIG. 77A rotating about the finger of the user.

The above normal map was generated from images captured in rig 1 in an uncalibrated mode. Color-coded channels of the image represent the X, Y and Z vector of the surface normal at that location. In uncalibrated mode according to some embodiments, it is not required to know the exact location of the light source for each photograph; the algorithm attempts to localize the light and generate the normal map simultaneously. This allows for a flexible lighting setup, but the coordinate system is arbitrary.

In some embodiments, the nail care system 100 uses a specific coordinate system and increases accuracy by switching to a calibrated strategy, which keeps track of the light position for each photograph.

FIG. 79A is a calibrated normal map of the finger of the user generated using plan view images captured from the capture apparatus of the vision system 200 of FIG. 77A rotating about the finger of the user.

FIG. 79B is a calibrated normal map of an artificial test finger generated using plan view images captured from the capture apparatus of the vision system 200 of FIG. 77A rotating about the artificial test finger.

In the calibrated normal map above, the coordinate system is now aligned with the nail, with a stronger color-coded component indicating a more rightward facing normal, which can be seen on the right side of the nail and finger, and on the inside edge of the left nail fold.

FIG. 80A is a calibrated normal map of a finger of the user generated using plan view images captured from the capture apparatus of the vision system 200 of FIG. 77B including the plurality of light sources arranged in the grid.

FIG. 80B is a calibrated normal map of another finger of the user generated using plan view images captured from the capture apparatus of the vision system 200 of FIG. 77B including the plurality of light sources arranged in the grid.

The calibrated normal maps from rig 2 above benefit from the additional dimension of light variation. The normal map now includes variation in the dimension along the length of the finger (up, in these images) represented as stronger color-coded components indicating a more upward directed normal, which can be seen at the tip of the finger and along the proximal nail fold.

FIG. 81 is a depiction of a portion of a finger of a user represented by planar components of normals represented as a vector-field and using color coding to represent three-dimensional information regarding each vector.

In some embodiments, the common compact representation of normal maps is done by storing each normal vector as a color, where the color components define the 3 spatial dimensions of the vector. The above image shows how these colors map to actual vectors, in this case the planar components of the normal vector are visualized as color-coded line segments. They are pointing straight up in the center of the nail (that surface is normal to the camera), and increasingly point out to the sides towards the left and right edges of the nail as the nail begins to curve downwards.

Edge Detection

In some embodiments, the nail care system 100 uses edge detection and operates on standard 2D images, and highlights areas where there is a discontinuity in the image based on changes in color or brightness properties. The edge detection in some embodiments is concerned with raw pixel values, and may pick up "edges" that represent discontinuities in the image.

In some embodiments, the nail care system 100 uses a HED (Holistically-Nested Edge Detection) edge detector. This detector is designed to examine the image at multiple scales, taking advantage of small scale and large-scale features in the image to find edges that exist across these multiple scales. In some embodiments, it is also trained using examples of edges created by human annotators, and thus tends to identify edges that actually separate objects in an image, rather than finding shadows or other artifacts.

FIGS. 82 and 83 below show the results of an HED edge detector according to some embodiments and an initial pass at segmenting regions based only on the edges shown. While in this particular example the detector picks up on extra edges and misses some portions of the nail boundary, most of the nail boundary appears as boundaries between the regions in the right-hand images.

In some embodiments, because a single image can in some cases produce an incomplete set of edges, by varying the lighting source across several images and combining the resulting edges the nail care system 100 can generate a more complete set of edges.

FIG. 82A is a plan view image of the artificial test finger.

FIG. 82B is the plan view image of FIG. 82A analyzed using Holistically-Nested Edge Detection (HED).

FIG. 82C is the plan view image of FIG. 82A analyzed using initial region segmentation.

FIG. 83A is a plan view image of a finger.

FIG. 83B is the plan view image of FIG. 83A analyzed using HED.

FIG. 83C is the plan view image of FIG. 83A analyzed using initial region segmentation.

Technique Applicability

In some embodiments, the border of the nail can be divided into several different regions through object segmentation and/or other techniques. For example, the below FIG. 84 shows how the techniques describe here perform across the different regions of interest around the nail boundary according to some embodiments. For example, in some embodiments, HED edge detection provides superior results. The below evaluation is exemplary and in other embodiments the structured light and/or photometric stereo techniques may perform better than, for example, HED edge detection.

FIG. 84 is a diagram of a finger including sections of interest of the nail and finger and a comparison of the effectiveness of various analysis methods in accurately detecting and differentiating the sections of interest.

In some embodiments, the free edge of the nail (top of the diagram) can appear in two different configurations. If the nail is long enough, the free edge extends past the flesh of the finger: the image transitions directly from free edge to image background. If the nail is shorter, the flesh of the finger may extend slightly past the free edge: the image transitions from the free edge to finger flesh and then to background. Both conditions may occur in the same image: here the left side has the longer condition (direct transition from free edge to background (from camera perspective)) and the right has the shorter condition (flesh visible past the free edge (from camera perspective)). The nail boundary along the free edge may be easier to determine in the longer condition, with all the techniques providing data in that case. In the shorter condition the boundary may also be detected by all the techniques, but with greater error rate.

Inwards from the free edge, there is typically a visible dividing line where the nail bed ends and the nail plate continues on, now free of the bed (e.g., the superimposed line between the distal edge of the nail and the nail body). Because there is no surface geometry change here (nail plate is smooth from above), only a color change, the technique that most picks up this transition according to some embodiments is color-based edge detection.

The nail edges at the lateral nail folds (color-coded) typically include both a geometric feature (a slight valley) and a color change, so all three of the techniques provide data here in these examples. In some embodiments, the HED edge detector typically finds these edges. In some embodiments, the scan-line structured light strategy is designed to highlight these valleys, and typically provides good data here as well, while the photometric stereo is somewhat helpful here but there is not always enough angular change to allow it to determine the boundary.

At the bottom of the diagram, the proximal nail fold and cuticle present the most challenge. There are large variations among the nails in this area, especially in the presence/size of the cuticle, and the width and definition of the eponychium. Nails that have been consistently manicured tend to have little cuticle and narrow eponychium, while other nails may have a significant and irregular cuticle, and a large, more gradual eponychium region. Because the geometry of this region can vary, in some embodiments, with some nails having a significant geometrical edge at this nail boundary but others lacking this feature, the structured light technique provides some information but the most consistent technique in this region is the HED edge detector. The inaccuracies seen here may be caused by following the wrong edge of the several edges here (cuticle, eponychium, proximal nail fold).

The cuticle (the second inner curving line) can be very subtle, appearing as a very thin, translucent layer on the nail. For the purpose of specifically detecting the cuticle boundary, in some embodiments only the HED edge detector technique partially picks up the cuticle, though other embodiments are possible.

Fingertip Flesh Identification

In some embodiments, to accurately and comfortably shape the fingernail, the nail care system 100 determines not only the boundary of the nail itself, but also the extent of the surrounding fingertip flesh. Toward this end, the nail care system 100 may use one or more techniques for fingertip flesh identification. For example, in some embodiments, the nail care system 100 may apply a fingernail identification algorithm (or a variant thereof) of the type described above to the problem of flesh identification.

As discussed in the sections on nail shaping, the shaping tool according to some embodiments is an oscillating sanding disk. The convex shape and mode of action of the sanding disk may greatly reduce the requirements on the computer vision system as compared to other tools that may be used in other embodiments (such as cutting tools). In any event, in some embodiments, it may still be necessary to estimate some of the fingertip flesh geometry in order to control the sanding disk and understand the range of nail shapes that are achievable for a particular fingertip. One or both of the following two contours may be identified: (a) the outer boundary of the fingertip, which defines how close the sanding disk can approach before contacting flesh, and (b) the contour of the quick, which defines the shortest possible fingernail shape.

Estimating the Fingertip Boundary

In some embodiments, the fingernail identification algorithm described above provides some information about the boundary of the fingertip. As can be seen in the FIG. 85 below, when the nail is shorter than the finger, it is possible to directly infer the fingertip boundary from the fingernail boundary estimate. All of the non-nail, non-background areas of the image can be assumed to be fingertip flesh, and the fingertip boundary is simply the outer contour of this region. However, when the nail is longer than the finger, the fingertip boundary can only be partially inferred. In this case, one option would be to estimate the invisible portion of the fingertip boundary from the visible portion via curve-fitting. Such an estimate would come with some level of uncertainty, but might provide enough accuracy in some embodiments.

FIG. 85A is a plan view image of a nail having a length shorter than that of the finger, in which a fingertip boundary is fully inferred from a fingernail estimate.

FIG. 85B is a plan view image of a nail having a length longer than that of the finger, in which a fingertip boundary is partially inferred from the fingernail estimate.

Another option according to some embodiments is that for long nails additional images are captured from the bottom or side of the finger. FIGS. 86A, 86B and 86C show a finger with a long nail, imaged from below and processed via the fingernail identification pipeline described above. The edge detection step results in a strong identification of the fingertip profile in both white and UV lighting. These results support the assessment that the nail boundary estimation algorithm could be readily adapted in some embodiments to estimate the fingertip flesh boundary from bottom-view or side-view images.

FIG. 86A is an image of a back of a finger illuminated with white light.

FIG. 86B is a depiction of the back of the finger illuminated with white light of FIG. 86A and analyzed with edge detection.

FIG. 86C is a depiction of the back of the finger of FIG. 86A illuminated with ultraviolet light and analyzed with edge detection.

Estimating the Contour of the Quick

In some embodiments, for nail shaping the nail care system 100 may estimate the contour of the quick, which defines the shortest possible fingernail shape. To consider the applicability of our fingernail identification algorithm to this problem, some of the intermediate results from the nail processing pipeline were examined. For some of the nails in the data set, intermediate edge detection results show strong activation along the contour of the quick. FIGS. 87 and 88 show two of the more promising results from the data set, with almost complete detection of the contour of the quick.

FIG. 87A is a plan view image of a finger illuminated with white light.

FIG. 87B is a depiction of the finger illuminated with white light of FIG. 87A and analyzed with edge detection.

FIG. 88A is a perspective image of a finger illuminated with white light.

FIG. 88B is a depiction of the finger illuminated with white light of FIG. 88A and analyzed with edge detection.

In some embodiments, the HED method employed by the nail identification algorithm has no special knowledge of the quick or of the other parts of the nail. Indeed, in some embodiments, it can be problematic for nail identification if HED activates too strongly along the quick, as it can interfere with a complete estimation of the nail region. In some embodiments, a custom-trained HED network is used that can provide even more consistent results along the quick.

In some embodiments, a customized edge detector is trained for improving nail boundary estimation results as applied to, for example, for the quick.

Prototype Evaluation; Fingernail Identification

In some embodiments, the nail care system 100 may utilize one or more building-block techniques for differentiating fingernails from the surrounding flesh. These techniques according to some embodiments have been evaluated by: (a) capturing a larger, standardized data set of fingertip images and (b) using the data set and the identified building-block techniques to prototype a complete, end-to-end algorithm for estimating the nail boundary from fingertip images.

Capture Rig

FIG. 89 is a schematic diagram of an image capture rig for imaging fingers and nails of a user, the rig including LED strips oriented in two planes, a camera, and a projector.

To accelerate and standardize the capture of fingernail images, a specialized imaging rig was designed. A conceptual schematic for the capture rig is shown in FIG. 89. Images are captured by a Prosilica 1.2 megapixel color camera, mounted above the hand and fitted with a fixed 25 mm (0.9843 inch) lens. A PicoPro laser projector, mounted above and behind the hand, projects structured light onto the finger. Strips of individually-addressable, tri-color LEDs allow for dynamic control of the lighting environment.

FIG. 90A is a back perspective view of a prototype of an image capture rig for imaging a hand and fingers of a user, the rig including three LED panels mounted to a same planar surface, a camera through the planar surface, and a projector within the image capture rig.

FIG. 90B is a right side elevation view of the image capture rig for imaging the hand and fingers of the user (here, an artificial test finger is positioned in the rig), the rig including three LED panels oriented in a same plane, a camera, and a projector.

The assembled capture rig is shown in FIGS. 90A and 90B. Note the close placement of the laser projector to the hand, to allow for the projection of very fine structures. Three separate sets of individually-addressable LEDs are mounted inside the rig: a 16×16 panel of tri-color LEDs, an 8×32 panel of tri-color LEDs, and a linear strip of ultraviolet LEDs.

During data acquisition, subjects place one finger at a time on a platform in the center of the capture rig. For each finger, the capture process proceeds as follows according to some embodiments:

First, the camera records a single sweep of a horizontal projector line, scanning down from the base of the finger to the fingertip. The line sweep takes 20 seconds, with approximately 120 images captured during the sweep.

Next, a sequence of 30 individual, white LEDs are illuminated, with one image captured per LED.

Next, images are captured from a sequence of six ultraviolet LEDs.

Finally, three images are captured with multiple-LED lighting (two with white light, one with ultraviolet light).

The full capture process takes approximately 60 seconds per finger and results in approximately 160 images.

FIG. 91 illustrates the results of a single capture session. Specifically, FIG. 91A is a first plan view image of about 120 images of an image capture process, in which a camera records a single sweep of a horizontal laser projector line, scanning down from a base of a finger (e.g., FIG. 91A) towards a fingertip (e.g., FIG. 91D).

FIG. 91B is a second plan view image of the about 120 images of the image capture process.

FIG. 91C is a third plan view image of the about 120 images of the image capture process.

FIG. 91D is a fourth plan view image of the about 120 images of the image capture process.

FIG. 91E is a first plan view image of about 30 images of the image capture process, in which a camera records an image for each of about 30 different white LEDs.

FIG. 91F is a second plan view image of the about 30 images of the image capture process.

FIG. 91G is a third plan view image of the about 30 images of the image capture process.

FIG. 91H is a plan view image of about 6 images of the image capture process, in which a camera records an image for each of about 6 different ultraviolet LEDs.

FIG. 91I is a plan view image of about 3 images of the image capture process, in which a camera records an image illuminated with white light and ultraviolet LEDs.

Nail Identification Method

In some embodiments, the nail care system 100 estimates the fingernail boundary from fingertip images. To mitigate overfitting risks, in some embodiments the apparatus uses an interleaved approach, where earlier data was used to design and tune the algorithm while later data was used for verification and assessment.

FIG. 92 is a data flow chart for a nail identification method. Specifically, FIG. 92 illustrates the high-level data flow for the nail identification method according to some embodiments. First, the 30 single-LED images are used to compute a normal map of the fingertip via calibrated photometric stereo. Next, edge detection is performed on the normal map. Edge detection is also performed on three additional images: the three multi-LED images of the fingertip (two with white light plus one with ultraviolet light). This results in four separate edge detection images for the fingertip. These four edge detection results are then combined into a single edge detection image via a special averaging function (see additional details below). Next, watershed segmentation is performed on the averaged edge image to produce an estimate of the region of the image that corresponds to the fingernail. Finally, contour smoothing is applied to the estimated nail region to produce a finalized estimate of the fingernail boundary.

Edge Detection

In some embodiments, the nail care system 100 uses an edge detection procedure that consists of two steps: image normalization, followed by application of the HED (holistically-nested edge detection) method. For image normalization, a median filter and adaptive histogram equalization are applied to reduce sensor noise and adjust for differences in illumination level across the different inputs to the edge detector.

Edge Average

In some embodiments, to combine multiple edge detection results into a single image, the following function is used:

$$\text{edge\_average}(\text{image}_1, \text{image}_2, \ldots, \text{image}_N, \gamma) = \left(\frac{\sum_{i=1}^{N} (\text{image}_i)^{\frac{1}{\gamma}}}{N}\right)^{\gamma}$$

This special averaging function is useful because it allows for tuning of how much disagreement is allowed across its inputs: as the parameter γ increases, regions of agreement are more strongly accentuated, while regions of disagreement are more strongly de-accentuated. In some embodiments, a value of γ=2.0 is used.

Contour Smoothing

In some embodiments, to smooth the estimated nail region the nail care system 100 first applies morphological erosion and dilation to the segmented image. Next, a boundary contour for the estimated nail region is computed. Then, the active contour method is applied to adjust the computed boundary for improved fit against a reference image of the fingertip (currently the multi-LED-1 image). In some embodiments, this tends to improve the smoothness and accuracy of the estimated boundary, particularly along the free edge of the fingernail.

Results; Fingernail Identification

To assess the fingernail identification according to some embodiments, a pilot study of 12 participants was performed. Fingertip images were gathered using the data capture rig described earlier, and processed via the prototype nail boundary estimation algorithm described above. The results were positive.

Data Gathering and Subject Pool

Data was gathered from 12 subjects, all with unpainted nails. 7 of the subjects were female, 5 were male. Effort was made to gather subjects across a wide range of skin tones and ethnicities; the subject pool included people with Black, White, Latino, Hispanic, and Asian ethnic backgrounds. Data was captured from 8 fingers per subject, for a total of 96 fingers in the data set. Thumbs were not captured in this example.

Nail Identification Results

The captured fingertip images were processed using the prototype method to produce 96 separate fingernail region estimates (one for each finger in the data set). Data from a 13th subject with painted nails is also included with the results for reference.

FIG. 93 shows some representative results from the data set. For each finger, a reference image of the fingertip (the multi-LED-1 image) is shown with a translucent white overlay corresponding to the estimated fingernail region. Specifically, FIG. 93A is a first plan view image of a first nail overlaid with a first nail estimate produced by a nail identification computer program.

FIG. 93B is a second plan view image of a second nail overlaid with a second nail estimate produced by the nail identification computer program.

FIG. 93C is a third plan view image of a third nail overlaid with a third nail estimate produced by the nail identification computer program.

FIG. 93D is a fourth plan view image of a fourth nail overlaid with a fourth nail estimate produced by the nail identification computer program.

FIG. 93E is a fifth plan view image of a fifth nail overlaid with a fifth nail estimate produced by the nail identification computer program.

FIG. 93F is a sixth plan view image of a sixth nail overlaid with a sixth nail estimate produced by the nail identification computer program.

Overall, the results are very promising. In general, the algorithm does a good job of tracing the fingernail boundary, across a wide range of nail shapes, sizes, and features. The algorithm also seems to perform well across a wide range of skin tones.

Care is taken according to various embodiments to avoid failure cases, as illustrated in FIG. 94, and which many include regions of under- or over-estimation.

FIG. 94A is a seventh plan view image of the second nail overlaid with a seventh nail estimate (an overestimation) produced by the nail identification computer program.

FIG. 94B is an eighth plan view image of the sixth nail overlaid with an eighth nail estimate (an underestimation) produced by the nail identification computer program.

Thumbs

It is believed that the current algorithm described above according to some embodiments will generalize well to thumb images. In some embodiments, the current algorithm requires the camera and LED lights to be positioned approximately parallel to the surface of the target nail. In some embodiments, imaging all five fingers on a hand, then, will either require the subject to reposition their hand between imaging of the thumb and the other fingers, or else require a capture rig equipped with multiple cameras (or a single, moveable camera).

Capture Speed

In some embodiments, the capture process can be reduced by tightly synchronizing the LED flashes with the camera shutter. Alternatively or additionally, the number of single-LED images used for the photometric stereo computation may be reduced without substantially reducing the accuracy of the resulting normal map.

Finger Movement

It may be difficult for subjects to hold their fingers steady throughout the capture process. Finger movement can cause a variety of problems for a nail estimation algorithm, including blurry input images and fuzziness in aggregate computations such as the normal map and edge detection average, which rely on inter-frame consistency. These problems can cause substantial inaccuracies in the estimated nail boundary. Reducing the camera exposure time and overall capture time would help to mitigate these issues. Alternatively or additionally, in some embodiments the nail care system 100 may use a mechanical solution (such as a support cradle for each finger) and/or an algorithmic solution (such as an inter-image alignment technique). Finger movement may be limited not only for nail identification, but also during imaging, enamel application, enamel removal, or nail shaping, and/or between any of these steps.

Cuticle Imaging

In some embodiments, nail boundary estimation results along the proximal nail fold are improved by using a custom-trained edge detector (discussed below) in this region. It is noted that the thinnest layers of cuticle tissue can appear nearly transparent to photography: it can be difficult even for a human to trace the inner contour of the cuticle in the fingertip images in our data set. Thus, it may not be possible to completely exclude cuticle tissue from the estimated nail regions.

Computational Complexity/Time Cost

The prototype algorithm processing time can be reduced substantially, including, for example, via the use of a GPU according to some embodiments, which should be able to accelerate many of the steps in the algorithm by an order of magnitude. Additional optimizations, such as reducing the use of scripting-level languages, can further reduce processing time according to some embodiments.

Next Steps—Fingernail Identification; Train a Customized Edge Detector

To improve the accuracy of nail boundary estimation according to some embodiments, the nail care system 100 may use a customized edge detector. Edge detection may be a key step in our prototype algorithm, which may use a HED method with a neural network, trained on a data set of general-subject photographs. In some embodiments, a custom-trained HED or HED-like network may be used to substantially improve results. In some embodiments, getting improved accuracy out of the edge detector could greatly simplify or even eliminate the region segmentation step from the algorithm, with an added benefit to accuracy.

Training a customized edge detector may involve network design, data gathering, and data annotation. In some embodiments, an annotated data set of, for example, 500-1000 fingertips (50-100 subjects) may be used with the result of sufficiently outperforming the generic HED network.

Reduce Capture Time Requirements

In some embodiments, reducing and optimizing capture time requirements for fingertip imaging can be accomplished by, for example, synchronizing the LED flashes with the camera shutter. Alternatively or additionally, modifying illumination level vs. exposure time could potentially reduce total exposure time requirements. Alternatively or additionally, additional savings could be obtained by finding a reduced subset of single-LED images that can still produce a high-quality normal map via photometric stereo.

Reduce Compute Time

In some embodiments, image processing times suitable for production use may be achieved, for example, by porting as much of the algorithm as possible to run on a GPU, and/or by switching to more highly optimized implementations across the processing stack.

Enamel Removal; Introduction

An important part of the manicure according to some embodiments involves the nail care system 100 removing enamel from the nail. There are two methods of enamel removal according to some embodiments. Both ways involve the use of Acetone (or other suitable removal agent) to dissolve the enamel followed by an application of pressure to remove the dissolved enamel. In the first way, finger clips containing a recess for Acetone soaked cotton pads enclose the fingertip. By allowing the enamel sufficient time (thicker enamel layer may require more time) to dissolve into the cotton pad, enamel is removed from the nail. The clips also reduce the rate of evaporation of the Acetone which reduces the amount of Acetone needed for removal. Unlike the first way, the second way just uses an Acetone soaked cotton pad to remove the enamel. Similar to the first way time is needed for the enamel to dissolve into the cotton pad. Manipulation of the cotton pad applies pressure on the nail to wipe the dissolved enamel off the nail.

Although Acetone is discussed above, other suitable removal agent(s) or chemical(s) may be used in other embodiments. For example, in some embodiments, it may be beneficial to accept reduced removal efficacy in pursuit of lower odor or reduced undesirable airborne chemicals or particulates by using currently available alternative removal agents.

Although cotton is discussed above, in other embodiments various other materials may be used to hold a reservoir of removal chemical. For example, such material(s) may be inherently absorbent, such as a cotton pad, or may be absorbent by virtue of their gross or fine structure, such as man-made chamois-like materials. Other techniques to hold a reservoir of removal chemical are also possible, including bladders, syringes, a pipe or array of pipes, or any structure or material that is capable of capturing and dispensing the removal chemical.

The removal process according to some embodiments is a mechanical process that manipulates a cotton pad to remove enamel at the nail-skin junction. This junction is also known as the lateral nail fold. The lateral nail fold is a valley where one half is nail and the other half skin. In well applied enamel, the enamel is expected to cover just the nail half of the valley. When the enamel in this valley comes in contact with Acetone, the enamel starts to dissolve which causes the dissolved enamel to flow over to the skin side of the valley. This requires manipulation of the cotton pad such that the skin half of the valley is depressed allowing pressure and shear force to wipe dissolved enamel off this junction.

In some embodiments, an enamel removal tool using compliance through the use of springs and flexures to passively adapt to nails of varying geometry, is provided that minimizes the manipulation needed by the manicure robot to apply pressure on the nail.

A visual assessment of cleaned finger nails (little to thumb finger) showed that the bulk of enamel was removed from the nail. In some instances, faint traces of enamel at the lateral nail fold exist on some nails.

In some embodiments, the strategic use of compliance allows the enamel removal tool to passively apply pressure over nails of varying geometry which enables the bulk of enamel to be removed.

Results

In some embodiments, the nail care system 100 breaks up a baseline clean for a single coat of enamel on all fingers of one hand into two steps. In the first step, a fully soaked regular cotton pad (approximately 5 ml (approximately 0.3051 cubic inch) of Acetone was absorbed) is used to remove the bulk of enamel from all five fingers. For example, on average, the soaked cotton pad may be pressed upon the nail for a dwell time of approximately 10 s to 20 s. This time may be crucial to enable Acetone to access the enamel in contact with the nail by dissolving the top layer of enamel. After dwelling on each finger, the enamel removal tool is manipulated in such a way that pressure is applied on the nail plate wiping from the proximal nail fold towards the free edge of the nail. When cleaning a new finger, the cotton pad is reoriented to an area devoid of removed enamel. Once the bulk of the enamel is removed from the nail plate, the second step uses a partially soaked cotton pad (e.g., approximately 3 ml (approximately 0.1831 cubic inch)) to clean the residual enamel from the lateral nail folds. The flexures on the enamel removal tool form a pinch like grip on the cotton pad that varies in pinch width to apply pressure on the lateral nail folds as the cleaning tool moves from the proximal nail fold to the free edge of the nail. This pressure compresses the lateral nail fold, exposing the nail in close proximity to the skin to Acetone.

To completely automate the manicure process in some embodiments, an enamel removal tool is provided. The tool may be able to fully remove enamel from the nail plate and may use simple path planning strategies to minimize the cost of the robot. Apart from the design of the enamel removal tool, key components of the enamel removal process may include: the amount of Acetone needed, enamel removal material, quantity of removal material, accuracy and precision of enamel sensing, complexity of cleaning trajectories as well as length of time needed to remove enamel.

In some embodiments, the nail care system 100 includes an enamel removal tool formed by joining layers of laser cut propylene and wood. These materials may be used because of their inertness to Acetone. Flexures and springs may be used to apply pressure over the nail plate of nails varying in size from the little finger to the thumb. This compliance may enable the tool to passively adapt to nails of varying geometry which can reduce the number of enamel removal end-effectors and simplify the cleaning trajectories needed for enamel removal. For example, approximately 8 ml (approximately 0.4882 cubic inch) of Acetone and 6.5 inch (16.51 centimeters) by 1 inch (2.54 centimeters) of elastic micro-fiber cloth may be used to remove a double layer coat of enamel from five nails on one hand.

Enamel Removal Tool

In some embodiments, the nail care system 100 may consider the nail to be broadly comprised of four regions: the nail plate, the free edge, the proximal nail fold and the lateral nail folds (FIG. 1B). To apply pressure at the lateral folds of nails with varying widths, w, and transverse curvature, r1, lateral flexures with inward pointing rounded tips may be laser cut from sheets of polypropylene (FIG. 2B). A spring loaded proximal scrapper may be used to apply pressure on the proximal nail fold, nail plate and free edge as the tool is pressed on the nail and moved from the proximal nail fold to the free edge (FIG. 2B).

FIG. 95A is a plan view of finger nail parameters of a width, which is defined as a widest length between two lowest points in a lateral nail fold, and/or a length, which is defined as a longest length between an apex of a free nail edge and a proximal nail fold.

FIG. 95B is an end view of the finger nail parameter of a transverse nail curvature, which is approximated by a circle of a first radius.

FIG. 95C is a side view of the finger nail parameter of a longitudinal nail curvature, which is approximated by a circle of a second radius.

FIG. 95D is a plan view of the finger nail parameters of a nail plate, a free edge, lateral nail folds, and a proximal nail fold.

FIG. 1. Finger nail parameters. (A) The width, W, is defined as the widest length between the two lowest points in the lateral nail fold. The length, L, is defined as the longest length between apex of the free nail edge and the proximal nail fold. The transverse nail curvature is approximated by a circle of radius, $r_1$. The longitudinal nail curvature is approximated by a circle of radius, $r_2$. (B) The nail plate is divided into four regions. Region 1 is the nail plate, region 2 is the free edge, region 3 is the lateral nail folds and region 4 is the proximal nail fold.

FIG. 96A is a perspective view of a prototype of the enamel/polish removal system 300.

FIG. 96B is a perspective view of the prototype of the enamel/polish removal system 300 with particular emphasis on compliance through springs and flexures, which allow pressure to be applied across nails of varying geometry.

FIGS. 2A and 96B. Enamel removal tool prototype. (A) Experimental test setup. (B) Compliance through springs and flexures allow pressure to be applied across nails of varying geometry. Spring loaded proximal scrapper removes enamel from bulk of nail plate. Lateral flexures spread apart over the nail arch to access nail area at the lateral nail folds.

In some embodiments, the stack of lateral flexures may be designed to have a recess where a cotton pad is placed to function as a reservoir for the delivered Acetone (FIG. 97). Wrapped around the proximal scrapper and the lateral flexures may be a strip of elastic micro-fiber cloth (FIG. 97). Without the cotton pad reservoir, the Acetone may permeate too quickly through the micro-fiber cloth resulting in rapid evaporation. Elasticity of the micro-fiber cloth may also be another important factor because it may enable the lateral flexures to spread apart when a downward force is applied on the nail plate. In some embodiments, Acetone is delivered to the cotton pad reservoir by a syringe. In order to distribute Acetone to the lateral nail folds more efficiently, a flow splitter may be attached to the end of the delivery tube.

Another key aspect of the enamel removal process according to some embodiments may be the surface where the finger rests on (FIG. 2A). A completely flat rigid surface may reduce the deformation of the lateral nail fold when pressure is applied by the tool. The finger guide, which may include or consist of a raised edge, may be sized to minimize discomfort when pressure is applied but narrow and tall enough to enable sufficient deformation of the lateral nail fold for enamel removal.

In some embodiments, the finger guide may be sized to include the whole hand or to interact with only one or more sections of the hand.

In some embodiments, the finger guide may be changeable in position and/or pose at one or more times before during or after operation of the nail care apparatus.

In some embodiments, the finger guide may be articulated in multiple sections in order to possibly allow the pose or position of the user's hand(s) to be changed at one or more times before, during, or after operation of the nail care apparatus.

In some embodiments, the finger guide or one or more of its sections may be passively changeable, for example, by the inclusion of flexible materials, joints, sliding sections, elastomeric materials, thermoelastic materials, or other methods of allowing temporary or permanent change to the guide.

In some embodiments, the finger guide may be actively changeable by the nail care apparatus under the control of one or more algorithms. In some embodiments, active changing of the finger guide is accomplished by motors (e.g., DC brush, DC brushless, AC, stepper, and so on). In other embodiments, other shape changing materials may be employed (e.g., memory metals, ferromagnetic fluids, pneumatically actuated bladders or shapes, hydraulic actuators, and so on).

In some embodiments, the finger guide may incorporate one or more sensors, for example, absolute or relative encoders, pressure sensors, temperature sensors, force or torque sensors, capacitive sensors, and so on. These sensors may be used, for example, to determine whether the user is attempting to alter hand position or pose, or to determine actual position or pose of the user's hand(s), or to increase user comfort, or to ensure the user's hand(s) is/are correctly positioned and engaged with the finger guide, or to provide an indication that the user has withdrawn a hand or hands.

In some embodiments, the capability to alter the position or pose of the finger guide, whether done by the apparatus such as described above or the user such as described above, may be used to perform, for example, any (e.g., all or none) of the following: Increase comfort for the user

- Ensure proper engagement of the user's one or more fingers or hand or portion thereof with the nail care apparatus
- Alter the position or pose of the user's one or more fingers or hand or portion thereof, for example in order to improve operation of the nail care apparatus or any of its functions.
- Provide feedback to the user
- Allow the user to provide input to the apparatus
- Improve the experience of the user (for example by simplifying inserting or withdrawing a hand or hands into/from the apparatus).

FIG. 97 is an exploded view of components of the prototype of the enamel/polish removal system 300.

Robotic Enamel Removal Demonstrations

In some embodiments, the nail care system 100 may apply two coats of enamel to all five finger nails on one hand. The first coat may be, for example, black in color (e.g., to enable visual detection of residual enamel as a test case) or any other color. The second coat may be a matte or other top coat. In some embodiments, the nail care system 100 may divide the enamel removal process into three steps. Every step may begin with aligning the proximal face of the lateral flexure with the apex of the proximal nail fold (FIG. 98A). This may ensure that pressure is applied on the proximal end of the lateral nail folds during the cleaning process.

In the first cleaning step, 1 ml (0.06102 cubic inch) of Acetone (for example) may be injected into the cotton pad for the first finger to be cleaned (in every subsequent cleaning step, 0.5 ml (0.03051 cubic inch) Acetone (for example), may be injected. The tool may be lowered vertically until the lateral flexures engage the lateral nail folds (FIG. 98). After 20 seconds, for example, the tool may be raised vertically. Next, the micro-fiber cloth may be rotated to enable the next finger to undergo the first cleaning step. This may be repeated for all five fingers. The reason behind a vertical path in some embodiments is to prevent removed enamel from redepositing on the tip of the finger due to the sprung proximal scrapper pushing on soiled micro-fiber cloth.

The second cleaning process may be similar to the first except for the path the tool takes. Instead of vertical motions, the path may be a vertical depression followed by an angled lift off (FIG. 98C). This path may be taken to remove the bulk of the enamel from the nail plate while keeping the fingertip clean. At this stage of the enamel removal process, most if not all of the enamel may be removed from the nail plate.

The third cleaning step may be also similar to the first cleaning step except for its cleaning path. The tool may be vertically depressed and after a dwell time, a horizontal wipe may be commanded (FIG. 98D). The third cleaning trajectory may be implemented to target any residual enamel at the lateral nail folds and free edge of the nail. This step may be repeated on any finger that has stubborn residual enamel at the lateral nail folds. The cleaning results after each step according to some embodiments are shown in FIGS. 99A-103D, inclusive.

Comparing nails before enamel application to after enamel application followed by removal, enamel from the nail plate and free edge of all nails was removed. At the end of the third cleaning step, residual enamel in some examples was seen on the little finger, index finger and thumb. This residual enamel somewhat remained in some examples after being subject to targeted and aggressive application of Acetone via a cotton bud.

FIG. 98A is a side view of the prototype of the enamel/polish removal system 300 with particular emphasis on enamel removal tool cleaning trajectories including an initial position in which a proximal face of the lateral flexures is aligned with an apex of an enamel area curve, which ensures pressure is applied to a proximal edge of a lateral nail fold.

FIG. 98B is a side view of the prototype of the enamel/polish removal system 300 with particular emphasis on a first cleaning step in which the enamel/polish removal system 300 is pressed down on the nail and then vertically lifted off the nail.

FIG. 98C is a side view of the prototype of the enamel/polish removal system 300 with particular emphasis on a second cleaning step in which the enamel/polish removal system 300 is pressed down on the nail and then angularly lifted off and away from the nail.

FIG. 98D is a side view of the prototype of the enamel/polish removal system 300 with particular emphasis on a third cleaning step in which the enamel/polish removal system 300 is pressed down on the nail and then horizontally wiped across the nail.

FIGS. 3-103. Example enamel removal cleaning progression. First and second clean may happen once for each finger. Third clean may occur multiple times on fingers that may have stubborn residual enamel at lateral nail folds. Images displayed under the third clean header are the final clean maneuvers for each finger (the black deposits at the tip of the fingers are due to staining when rotating the micro-fiber cloth).

FIG. 99A is a side view image of the prototype of the enamel/polish removal system 300 before enamel/polish removal from a little finger.

FIG. 99B is a side view image of the prototype of the enamel/polish removal system 300 after the first cleaning step is performed by the enamel/polish removal system 300 on the little finger.

FIG. 99C is a side view image of the prototype of the enamel/polish removal system 300 after the second cleaning step is performed by the enamel/polish removal system 300 on the little finger.

FIG. 99D is a side view image of the prototype of the enamel/polish removal system 300 after the third cleaning step is performed by the enamel/polish removal system 300 on the little finger.

FIG. 100A is a side view image of the prototype of the enamel/polish removal system 300 before enamel/polish removal from a ring finger.

FIG. 100B is a side view image of the prototype of the enamel/polish removal system 300 after the first cleaning step is performed by the enamel/polish removal system 300 on the ring finger.

FIG. 100C is a side view image of the prototype of the enamel/polish removal system 300 after the second cleaning step is performed by the enamel/polish removal system 300 on the ring finger.

FIG. 100D is a side view image of the prototype of the enamel/polish removal system 300 after the third cleaning step is performed by the enamel/polish removal system 300 on the ring finger.

FIG. 101A is a side view image of the prototype of the enamel/polish removal system 300 before enamel/polish removal from a middle finger.

FIG. 101B is a side view image of the prototype of the enamel/polish removal system 300 after the first cleaning step is performed by the enamel/polish removal system 300 on the middle finger.

FIG. 101C is a side view image of the prototype of the enamel/polish removal system 300 after the second cleaning step is performed by the enamel/polish removal system 300 on the middle finger.

FIG. 101D is a side view image of the prototype of the enamel/polish removal system 300 after the third cleaning step is performed by the enamel/polish removal system 300 on the middle finger.

FIG. 102A is a side view image of the prototype of the enamel/polish removal system 300 before enamel/polish removal from an index finger.

FIG. 102B is a side view image of the prototype of the enamel/polish removal system 300 after the first cleaning step is performed by the enamel/polish removal system 300 on the index finger.

FIG. 102C is a side view image of the prototype of the enamel/polish removal system 300 after the second cleaning step is performed by the enamel/polish removal system 300 on the index finger.

FIG. 102D is a side view image of the prototype of the enamel/polish removal system 300 after the third cleaning step is performed by the enamel/polish removal system 300 on the index finger.

FIG. 103A is a side view image of the prototype of the enamel/polish removal system 300 before enamel/polish removal from a thumb.

FIG. 103B is a side view image of the prototype of the enamel/polish removal system 300 after the first cleaning step is performed by the enamel/polish removal system 300 on the thumb.

FIG. 103C is a side view image of the prototype of the enamel/polish removal system 300 after the second cleaning step is performed by the enamel/polish removal system 300 on the thumb.

FIG. 103D is a side view image of the prototype of the enamel/polish removal system 300 after the third cleaning step is performed by the enamel/polish removal system 300 on the thumb.

FIGS. 104-106. Enamel removal results from subject's left hand. (A) Before enamel (Essie licorice) and top coat (Sally Hansen big matte top coat) application. (B) After enamel and top coat application. (C) After robotic enamel and top coat removal. Trace enamel under the thumb nail free edge is due to seepage of dissolved enamel when carelessly applied enamel painted over the thumb tip was removed by Acetone soaked cotton swap.

FIG. 104A is a plan view of the little finger before application of enamel and a top coat.

FIG. 104B is a plan view of the ring finger before application of enamel and a top coat.

FIG. 104C is a plan view of the middle finger before application of enamel and a top coat.

FIG. 104D is a plan view of the index finger before application of enamel and a top coat.

FIG. 104E is a plan view of the thumb before application of enamel and a top coat.

FIG. 105A is a plan view of the little finger after application of enamel and a top coat.

FIG. 105B is a plan view of the ring finger after application of enamel and a top coat.

FIG. 105C is a plan view of the middle finger after application of enamel and a top coat.

FIG. 105D is a plan view of the index finger after application of enamel and a top coat.

FIG. 105E is a plan view of the thumb after application of enamel and a top coat.

FIG. 106A is a plan view of the little finger after removal of the enamel and the top coat.

FIG. 106B is a plan view of the ring finger after removal of the enamel and the top coat.

FIG. 106C is a plan view of the middle finger after removal of the enamel and the top coat.

FIG. 106D is a plan view of the index finger after removal of the enamel and the top coat.

FIG. 106E is a plan view of the thumb after removal of the enamel and the top coat.

Discussion; Design Parameters

In some embodiments, flexure separation, $f_s$, is determined by subtracting the horizontal flexure offset, $f_o$, from the width of the little finger, $w_{1f}$. The curve on the proximal scrapper may be determined by the transverse curvature of the thumb, $r_{1t}$. The lateral flexure tip may be angled inward by β to prevent the tip from slipping over the lateral nail fold. The bending stiffness of the lateral flexures may be determined by the cross-sectional geometry of the flexure ($f_t$ and $f_w$) and the flexure length, $f_l$. The lateral flexures may be offset vertically by $P_o$ to engage the nail plate before the proximal scrapper to reduce the force applied by the spring-loaded scrapper on the proximal nail fold.

FIG. 107. Exemplary enamel removal tool design parameters. Lateral flexures are parameterized by the flexure width, $f_w$, flexure length, $f_l$, flexure thickness, $f_t$, flexure separation, $f_s$, and flexure offset, $f_o$. Summing $f_s$ and $f_o$ gives the width of the little finger, $w_{1f}$. The flexure tip is angled, β, away from the vertical. Number of flexures determined by length of thumb, $L_t$. Proximal scrappers are parametrized by the thumb nail transverse nail curvature, $r_{1t}$ and the proximal offset, $P_o$. Proximal scrapper spring has uncompressed natural length, $P_{snl}$, stiffness, $P_{sk}$ and pre-load offset $P_{so}$.

FIG. 107A is a front view of the enamel/polish removal system 300 including identification of enamel removal tool design parameters.

FIG. 107B is a side view of the enamel/polish removal system 300 including identification of enamel removal tool design parameters.

Targeted Cleaning of the Lateral Nail Folds

In some embodiments, a non-Acetone gel-like enamel remover (Nail Polish Remover Gel, Honeybee Gardens) may be deposited at the lateral nail folds to remove residual enamel. The rationale behind this choice was to utilize the technology developed for enamel application to deposit gel-like enamel remover at the lateral nail folds.

As mentioned in Section [1250], an Acetone soaked cotton bud may be used to scrape at the residual nail fold. After multiple scrapes, faint traces of enamel may still remain in some examples.

In some embodiments, the nail care system 100 may use one or more buffing tools applied to the lateral nail folds to get rid of stubborn residual enamel. Getting rid of residual enamel at the lateral nail folds may be crucial, for example, when the color of freshly applied enamel is in sharp contrast with the residual enamel at the lateral nail folds. In other cases, residual enamel may not present any difficulty or issue, for example, when a dark color is to be applied over a light color or when the residual enamel is too faint to be detected during normal day to day interactions.

Sensing Requirements

In some embodiments, to position the enamel removal tool the manicure robot of the nail care system 100 may detect the geometry of enamel area and position the proximal face of lateral flexure at apex of proximal enamel curve.

In some embodiments, the enamel removal tool may be positioned regardless of the position or extent (or even complete lack) of currently applied enamel.

The enamel removal may incorporate pre-programmed downward vertical trajectories that are tuned to the height variations in each finger. This may be done to ensure adequate pressure application at the lateral nail folds. In some embodiments, the nail care system 100 includes an automated procedure for determining when to stop lowering the enamel removal tool on the nail. Methods such as, for example, force sensing at the proximal scrapper, limit switches at the proximal scrapper and/or strain sensing at the root of the lateral flexures could be used according to some embodiments to automate removal tool to nail lowering.

Cuticle Management; Introduction

In some embodiments, the nail care system 100 may include a cuticle management system 500.

For example, cuticle management may be required or desirable to enhance the visual appearance of the enamel on the nails and/or cuticle management may prolong the life of the manicure or pedicure by reducing the risk of enamel flaking off due to underlying cuticle detachment from the nail plate. Users may consider cuticle management to be an essential part of complete nail care, even in the absence of specific compelling benefit, merely because cuticle management is routinely and standardly offered as part of a salon manicure or pedicure.

Exemplary Embodiments

In some embodiments, a rotating abrasive tool may be provided that is able to remove the cuticle. In some embodiments, the composition, configuration, and operation of this tool (e.g., the material from which it is fabricated, and/or the shape of the tool, and/or the manner in which the tool is controlled and used) may be designed to act effectively on cuticle tissue (which typically differs in composition from the nail plate) and so effectively remove cuticle while having minimal or no impact on the nail plate.

In some embodiments, a hybrid burnish/abrade tool bit may be provided (e.g., FIG. 198). In one embodiment, pressure applied on the cuticle through a rotating smooth metal rod may cause cuticle removal through a burnishing process where friction pulls cuticle off the nail plate. A force sensor may monitor the compressive stress on the nail plate to ensure the comfort of the user during the process and/or to most effectively and completely remove excess cuticle. In addition, a band of abrasive particles on the side of the metal rod may be used to remove cuticle that remains on the sides of the eponychium.

FIG. 198 is a perspective view of a tip of a cuticle management system 500 incident on a thumb of a user.

In some embodiments, the burnishing may be able to remove cuticle without affecting the appearance of the applied enamel.

FIG. 199A is a plan view of a finger and nail of a user before a first trial including cuticle management with the cuticle management system 500.

FIG. 199B is a plan view of the finger and nail of the user after cuticle management with the cuticle management system 500 and after applying a ridge filling base coat to the nail.

FIG. 199C is a plan view of the finger and nail of the user after applying a first coat to the nail.

FIG. 199D is a plan view of the finger and nail of the user after applying a second coat to the nail.

FIG. 199E is a plan view of a finger and nail of a user before a second trial including cuticle management with the cuticle management system 500.

FIG. 199F is a plan view of the finger and nail of the user after cuticle management by burnishing the nail with the cuticle management system 500.

FIG. 199G is a plan view of the finger and nail of the user after cuticle management with the cuticle management system 500 and after applying a ridge filling base coat to the nail.

FIG. 199H is a plan view of the finger and nail of the user after applying a first coat to the nail.

FIG. 199I is a plan view of the finger and nail of the user after applying a second coat to the nail, and/or FIG. 199J is a plan view of an intermediate step between the depiction of FIG. 199E and FIG. 199F, in which cuticle debris and misplaced burnishing toolpaths are evident, according to an exemplary embodiment.

In some embodiments, the cuticle management tip may be designed to include a hard and smooth surface for burnishing while the sides of the tip is coated with abrasive grit for persistent cuticle that remain of the sides of the eponychium. A complete cuticle management system 500 may include, for example, a force sensor for nail plate protection and an appropriately sized rotary actuator for cuticle burnishing removal. In some embodiments, optimization of robotic toolpaths may also provide additional striation mitigation through the use of randomized variations in areas where there is cuticle.

The cuticle management system 500 may include a burnishing tool. The burnishing tool may include an abrasive material around a burnishing end of the burnishing tool. The burnishing end may gently burnish cuticle material away from the nail, while the abrasive circumference of the rod gently scrubs any attached cuticle away from the nail folds. A buffing/scrubbing tool comprising a mild abrasive may be configured to effectively remove the softer cuticle while leaving the nail plate unaffected. Cuticle softener may be applied optionally in conjunction with one of the above tools.

FIG. 200 is a side perspective view of the end of the mobility mechanism system 1000 and a cuticle management system 400 (500) with emphasis on a cuticle management tool configured to push against the cuticle and proximal nail fold engaged with the nail FN of the left index finger F of the hand H of the user according to an exemplary embodiment.

In some exemplary embodiments, the cuticle management system 500 may include a device for pushing the cuticle, e.g., as shown in FIG. 200, which may be compliant, semi rigid or rigid, which may be rectilinear in shape, which may be rounded or chamfered, and the like. In some exemplary embodiments, the nail shaping system 400 may include one or more elements of the cuticle management system 500 or vice-versa. In alternative embodiments, the tip of the nozzle 650 of the dispenser system 600 (e.g., FIGS. 34A and 34D) may have a compliant rounded surface surrounding the nozzle orifice configured to present a smooth surface to the nail, which may form part of the cuticle management system 500. In any of the embodiments of the cuticle management system 500, the compliant rounded surface may be configured to minimize disturbance of previously applied coats of enamel by subsequently applied coats.

The cuticle management system 500 (e.g., FIG. 200), may, in some exemplary embodiments, be configured to match a curvature of one or more nails. The cuticle management system 500 may provide a smooth edge to push against the cuticle and proximal nail fold. In one exemplary embodiment, the pushing tool is moved on to the nail at a location away from the nail and is moved toward the nail proximal fold, pushing the cuticle back. In some embodiments, there may be a complaint member or elements between the portion of the cuticle pushing tool in contact with the nail and the rest of the nail care apparatus to limit the amount of force that can be exerted against the proximal nail fold.

The cuticle management device 500 (e.g., FIG. 200) may include a force limiting device (e.g., a spring, as shown, or any biased member including a flexure, rubber, foam, and the like). The force limiting device may be configured to allow the robot to push against the cuticle with a predetermined or adjustable limited about of force.

Each of these embodiments effectively removes cuticle tissue without requiring precise identification of the location and extents of any cuticle present. Each of these embodiments has minimal impact on the nail plate itself.

Some embodiments may further comprise a compliant member or element between the portion of the cuticle removal tool in contact with the user's finger or nail and the rest of the nail care apparatus.

The cuticle management tool 500 is optionally provided in the consumable cartridge 1600, or may be designed to last for the life of the system 100 and so not considered replaceable, or may be replaced from time to time independently of the consumable cartridge 1600.

Chemical Agents

The embodiments described above and/or other embodiments may be supplemented or replaced by the use of chemical preparations. For example, in some embodiments, a cuticle softening agent (such as, for example, a lotion, cream, paste, wax, liquid, powder, etc.) may be applied before use of one or more of the embodiments mentioned. This agent may be designed to enhance operation of the cuticle removal embodiment. In other embodiments a chemical preparation (for example, a lotion, cream, paste, wax, liquid, powder, etc.) may be applied in place of using mechanical or other methods, allowing cuticles to be dissolved or rendered negligible in appearance, size, or thickness.

Similarly, in some embodiments, a formulation (such as, for example, a lotion, cream, wax, paste, oil, powder, etc.) may be also or instead be applied after cuticle removal. This material may be applied, for example, to soothe tissue around the nail plate or area from which the cuticle was removed. Or it may be applied, for example, to improve the appearance of the nail plate or portion thereof or the tissue around the nail plate.

Massage/Stroking/Vibrating; Introduction

In some embodiments, one or more subsystems may be used to deliver, for example, a massaging, stroking, and/or vibrating action to one or more portions (e.g., one portion, two or more separate or connected portions, or all) of the user's hand(s) or feet. This may be done, for example, to create a more relaxing experience for the user, and/or to improve muscle tone and/or to improve range of motion, and/or to relieve minor aches and pains.

Exemplary Embodiments; Position of Massage Structures

In some embodiments, to accomplish this massaging/stroking/vibrating action one or more mechanisms may be positioned above, or below, in front of, or laterally beside (or in any combination of vertical and/or horizontal position) with respect to the hand or foot. In some embodiments, these mechanisms may furthermore be oriented in varying ways with respect to the user's one or both hands or feet. For example, mechanisms may be oriented more or less vertically above the hand or foot and/or more or less vertically below the hand or foot, or more or less horizontally laterally (either distally/proximally or medially/laterally or some combination thereof). These descriptions are exemplary only and it will be clearly seen that any massaging/stroking/vibrating element may be positioned with any relationship to the user's hand or foot and in any orientation with respect to the user's hand or foot.

Composition of Massage Structures

In some embodiments, these massaging/stroking/vibrating structures may be composed of a variety of materials. For example, a particular structure may include one or more compliant materials (for example, elastomers, and/or rigid materials that incorporate a spring or spring-like mechanism), and/or may include a rigid material (e.g., plastic, wood, metal, glass, etc.). In some embodiments, for example, the material(s) used to construct a particular structure may be chosen for specific material properties such as, for example, thermal conductivity or lack thereof, or rigidity, compliance, or a combination thereof. In some embodiments, these massaging/stroking/vibrating structures may be simple, for example, even to consisting of only one material with no articulation or actuation. In other embodiments, such structures may be highly complex, featuring, for example, non-linear elastomeric responses, and/or articulations, and/or actuations, and/or thermal control (for example, heating and/or cooling using, for example, a Peltier effect device or other heating and/or cooling technique). In some embodiments, various characteristics of the massaging/stroking/vibrating structure may be controllable or modifiable under the control or one or more algorithms. For example, a structure may incorporate a compressed air bladder in order to vary its compliance over time. In other embodiments, the structure may alter its form in response to temperature (for example by using a memory material, or by using one or more motors or other actuators). In still other embodiments, materials that alter their characteristics (for example, becoming more or less compliant) based on various conditions (for example, temperature and/or humidity and/or atmospheric pressure, etc.) may be used.

Massage/Stroke/Vibrate Operations

In some embodiments, for example, one or more structures may stroke or press the user's flesh in a series or programmed and/or random motions. In some embodiments, for example, these structures or others may also or instead of massaging and/or stroking and/or pressing severally or individually vibrate while in proximity or contact with the user's flesh.

In some embodiments, these structures may vibrate at one or more possibly time-varying frequencies and/or amplitudes (e.g., a single frequency and amplitude, either of which may optionally vary over time, or a combination of superposed frequencies, one more of which may vary over time, and amplitudes, one or more of which may vary over time). In some embodiments, these structures may perform identical or different vibration strategies at various points on the user's hand(s) or feet and/or various times in the process.

Control of Massaging

In some embodiments, the behavior of these massaging/stroking/vibrating structures may be optionally controlled or modified by the user or by one or more algorithms running on the apparatus, the user's device (for example, phone, tablet, or computer), and/or other computers (for example, a cloud-based computer or computers).

Use of Other Subsystems During Massage

In some embodiments, other subsystems of the apparatus may be used in order to control or modify the operation of these massaging or vibrating structures. For example, in some embodiments, the vision system may be used for this purpose. In other embodiments, a drying subsystem that alters the temperature nearby the user's one or more fingers, portions of the user's hand or foot, or entire hand or foot may be used to improve the massage and/or vibration effect.

Rapid Drying; Introduction

In some embodiments, the apparatus may also include other subsystems to improve the speed with which, for example, enamel or other liquids are cured or dried after application. This may be accomplished in many ways, for example by using a fan or other device to provide airflow to the material to be more rapidly cured or dried, or by heating or cooling the environment at least nearby the material to be more rapidly cured or dried, or by reducing atmospheric pressure around the material to be cured or dried, or by introducing vapors or gases that tend to reduce curing, drying, or evaporation time.

Exemplary Embodiments

In some embodiments, the apparatus may include a fan or other device for creating airflow, optionally with speed control and/or direction control. This fan may be used along with mechanisms that allow the airflow to be directed (e.g., a method for altering the fan's orientation or location) in order to create airflow over the material(s) to be more rapidly cured or dried. In some embodiments, this increased airflow lowers atmospheric pressure over the material to be cured or dried, fostering evaporation of solvents or other components. In other embodiments, the airflow provides a constant stream of air with a low concentration of evaporated solvents or other components, increasing evaporation rates for these components.

In some embodiments, heating or cooling elements may be used to alter the temperature of the air in the flow to more rapidly cure or dry liquids use during one or more portions of the manicure or pedicure process. In some embodiments, for example, heating the air lowers its relative humidity, enabling the air to retain a higher quantity of solvents or other components.

In some embodiments, the temperature of the air flowing may be controlled for greater user comfort even if such temperature control does not contribute materially to improving curing or drying times.

In other embodiments light or other electromagnetic radiation may be used to accelerate curing or drying time. For example, heat may be applied using an infrared light source for those materials that dry or cure more rapidly at elevated temperatures. In other embodiments, ultraviolet light may be used in conjunction with materials that are UV cured. In some embodiments, various shielding methods may be used to ensure the user is not exposed to excessive amounts of light or radiation. In other embodiments, the UV light source is tightly focused and controlled so that it shines only where appropriate in order to ensure the user does not experience excessive radiation. In other embodiments, the wavelength, intensity, and/or duration of the UV or other electromagnetic radiation may be controlled to ensure the user does not experience excessive exposure.

In some embodiments, these sources of electromagnetic radiation may have their position or orientation controlled by one or more other systems in the nail care system 100 or under the direction of the user in order to more precisely target their curing or drying effects. In some embodiments, the intensity of the radiation emitted may be controlled by one or more other systems in the nail care system 100 or under the direction of the user to more precisely target their curing or drying effects.

Odor Control; Introduction

In some embodiments, the apparatus may include systems to manage odor (for example, of nail polish removal liquids such as acetone or enamel odor, or indeed any odor created or exacerbated by any component of the apparatus). In some embodiments, this odor control or reduction may be accomplished by, for example, using some material to absorb and sequester the odorous components (for example, activated carbon, or zeolite).

Exemplary Embodiments

In some embodiments an airflow system (optionally the same one used for rapid drying) may be used to distribute any vapors or odors so that they are not concentrated near the machine during use.

In some embodiments, airflow may be directed through one or more materials that capture (e.g., by molecular capture on an appropriately chosen substrate such as, for example, activate carbon or zeolite) or eliminate (e.g., by chemically altering) components that cause odors. In some embodiments a catalytic agent could be used to alter objectionable vapors to less objectionable vapors or to render the vapors inert or harmless.

In some embodiments, vapors may be heated or cooled in order to reduce or eliminate odors. For example, air containing an objectionable vapor might be heated to the point that the objectionable vapor is broken down or combines into harmless, odorless components (e.g., water, carbon dioxide, etc.). In other embodiments, heating or cooling air containing objectionable vapors alters the distribution or concentration of the objectionable vapors (e.g., by causing them to rise above typical human standing height), or alters their reactivity with the human olfactory system (e.g., by cooling).

In some embodiments one or more (e.g., one, two, or all) of the above techniques may be employed in combination or variation in order to eliminate or reduce objectionable odors.

In some embodiments, these odor control techniques may be applied with suitable modification to reduce or eliminate objectionable waste material. For example, in some embodiments, waste polish remover may be passed through one or more materials to convert it to a harmless or less harmful product. In other embodiments, waste polish remover may be captured and sequestered in a form that prevents or slows its evaporation. Nail polish remover is used only as an example hereinabove and in some embodiments other waste material (e.g., nail shaping residue, cuticle residue, massage oils, lotions, etc.) may receive similar treatment.

Debris Management; Introduction

In other embodiments, the apparatus may include subsystems to manage (e.g., capture, mitigate, sequester, or eliminate) other debris or material from the manicure or pedicure process (e.g., nail filings, clippings, or dust such as from grinding or filing, cuticle detritus, residue from previous applications (e.g., polish, lacquer, gel, acrylic, dip, etc.)).

Exemplary Embodiments

In some embodiments an airflow system (e.g., similar to the ones described above) is used to direct fine particulates (e.g., dust from nail shaping, cuticle residue, residual dead skin cells, dander, etc.) through one or more filters that capture the dust. In some embodiments, these filter(s) may be disposable. In other embodiments, these filters may be cleanable and reusable. In other embodiments, the filters have sufficient capacity that they need be neither cleaned nor replaced during the lifetime of the machine.

In some embodiments, static electricity may be used to direct or capture fine particulates (e.g., dust from nail shaping, cuticle management, or other manicure or pedicure operations, residual dead skin cells, dander, etc.). In some embodiments, an electric charge is applied to the user's hand or hands or foot/feet while an appropriate opposite charge is applied to a particulate capture device. In some embodiments, one or both of these electric charges (on the user's hand or hands or foot/feet and the particulate capture device) may be controlled by one or more algorithms operating on, for example, the nail care system 100, the user's one or more devices, and/or in the cloud. In some embodiments, the electric charge(s) are varied over time to improve particulate capture. In some embodiments, the electric charge(s) are varied to allow easy disposal of captured particulates.

Conclusions

Thus is it seen that a nail care system 100 and corresponding method are provided that includes one or more (e.g., all) of the following subsystems of a manicure or pedicure administering robotic platform: vision system, enamel removal, nail shaping and enamel application along with so-called secondary functions such as, for example, one or more of rapid drying, massage, odor control, and/or debris management.

Nail Shaping; Observe and Understand; Robotic Platform Research and Selection

In some embodiments, the nail care system 100 includes a robotic platform for each area of demonstrating a robotic manicure. For example, in some embodiments, the nail care system 100 may include a Mecademic MECA500 arm. It is included in full in Appendix A: Robotic Platform Research and Selection.

Exemplary Concepts

In some embodiments, the nail care system 100 may include a robotically positioned nail clipper, photo-chemical etching of the finger nail, and/or one or more additional features, examples of which are described below.

Exemplary Concept Evaluation

Concepts for the nail care system 100 according to some embodiments were evaluated based on their performance against a number of exemplary criteria. These are listed below:

FIG. 108A is a left side of a Pugh Chart ranking first, second, third, fourth, and fifth nail shaping methods for the nail shaping system 400.

FIG. 108B is a right side of the Pugh Chart ranking sixth, seventh, eighth, ninth, and tenth nail shaping methods for the nail shaping system 400.

The highest performing concepts according to the exemplary, non-limiting criteria were screened for attributes, such as safe operation. Concepts that did not involve a cutting process were prioritized, as they provided a significant improvement to system safety. Concepts which do not require input from the user were also prioritized. This resulted in a list of primarily incremental removal concepts (e.g., sanding, filing, and abrading), though it is understood that all examples could be used in various embodiments.

Exemplary Prototype Evaluation

Three nail shaping technologies according to some embodiments are described below. These three technologies for use in a nail care system 100 according to the teachings described herein are:

- Vertical sanding drum—a sanding drum rotates from the top of the nail to the bottom.
- Horizontal sanding drum—a sanding drum rotates along the nail.
- Oscillating sanding pad—a sanding pad reciprocates in order to remove material from the nail. Note that in some embodiments, oscillation could also implemented using a drum (e.g., or cone, or indeed any other shape of abrading tool). In various embodiments, any device applied to the nail (e.g., drum, cone, disk, mechanisms with variable or non-uniform grit density, composition, or coarseness, etc.) and any method of application (e.g., rotating, oscillating, reciprocating, etc.) could be used together.

In some embodiments, the vertical and horizontal sanding drum can be made by making modifications to, for example, a Dremel tool.

In some embodiments, an oscillating sanding pad can be adapted for use within a robotic nail care system 100 according to some embodiments starting with or based on similar technologies from an available, oscillating hand-held user product. Exemplary, non-limiting oscillating technologies are described in U.S. Pat. No. 7,188,628, which is hereby incorporated by reference herein in its entirety.

In some embodiments, the vertical sanding implementation is comprised of a customized guard affixed to a rotary tool. This allowed for quick testing of the concept with variable speed control.

FIG. 109 is a perspective view of the nail shaping system 400 including a vertical sanding drum configuration.

The horizontal sanding drum implementation may also be comprised of a customized guard affixed to a rotary tool. This allowed for quick testing of the concept with variable speed control.

FIG. 110 is a perspective view of the nail shaping system 400 including a horizontal sanding drum configuration.

In some embodiments, an oscillating sanding disk may be used. Oscillating technologies similar to those embodied in an available handheld product (depicted below) may be adapted for automated or robotic use in a nail care system 100 according to some embodiments.

FIG. 111 is a perspective view of the nail shaping system 400 including an oscillating sanding disk configuration.

The oscillating sanding disc may produce a suitable nail finish. The interaction between the oscillating disk and the finger may at times result in oscillation of the finger. An oscillating finger may cause shaping of unexpected portions of the nail. Those portions, on a convex nail, may be portions that would be removed at another time, causing the outcome to remain predictable, even in the event of moderate finger movement. The output of shaping appeared consistent. In some embodiments, the alternating direction of the sanding disk may be the cause of a cleaner finish, leaving no vestige of nail removed on the top or bottom of the finger nail.

In some embodiments of a nail care system 100 as described herein, an oscillating sanding disk may be provided with a larger motor than the example depicted above and/or self-contained batteries (or other power source) for mounting as a robot end effector. This may accomplish one or more of the following: minimize human interaction, allow specific geometries to be repeated, and ensure that the results are consistent.

It has been observed that a self-contained nail shaping end effector performs reasonably well. In some embodiments, low compliance between the robot arm and the finger can result in stalling of the motor in the shaping end effector. A small amount of compliance (e.g., a spring) between the arm and the sanding pad according to some embodiments may thus allow the shaping to progress in the event that the nail and effector interfere more than anticipated.

In some embodiments of a nail care system 100 according to the teachings herein, a larger section of elastomer is introduced between a coarser sanding pad, in order to allow nail shaping to happen quickly and without bogging down as easily. This solution had the intended impact and was tested in conjunction with modified robotic paths. In some embodiments, the angle of the tool may be tipped during the shaping of the lateral nail folds in order to get closer to the finger in that area.

Testing; System Overview

An oscillating sanding disk end effector was designed according to some embodiments. Some adaptations to the system were made in order to shape adult nails robotically. A motor with slightly higher torque constant was designed into the system, the input voltage was doubled, and the housing designed so that a flange could be mounted to, for example, the Meca500 or other robot arm.

FIG. 112 is a perspective view of a prototype of the nail shaping system 400 including oscillating sanding disk configuration mounted to a prototype of the mobility mechanism system 1000 and engaging with an extended middle finger of a user.

Because of the particular arrangement of the degrees of freedom of the robotic arm according to some embodiments, nail shaping may work best with the finger in the vertical orientation. In testing, the robot was mounted to an optical breadboard with a designation for the location of a finger, though other arrangements are possible. The effector, with self-contained batteries, may be turned on, then the robotic arm drives the trajectory of the nail shape. The robot arm may very precise and very consistent, though in some embodiments not very compliant. At times, when the finger was not where it was expected to be, higher normal forces would bog the motor down. The solution to this according to some embodiments is to insert additional compliance (e.g., a thicker, springy elastomeric foam) in order to keep the motor from becoming overwhelmed by inconsistency in the nail or finger position. This modification worked well to keep the motor running at a consistent speed and make the rate of nail removal more consistent as the robot follows the trajectory of the finger.

Methods

A trajectory was developed from measurements taken from a human finger nail. These measurements were turned into a model of the nail plate which was then turned into a trajectory, using a robotic tools developer kit.

This trajectory was fed to the Meca500 arm via an Ethernet connection, though other robotic arm(s) and configurations are possible. The connection according to this particular embodiment was run from both the developer kit and a python script that was output by the developer kit.

After a significant amount of testing, the trajectory was used to shape human nails. A few passes resulted in a smooth and deliberately shaped nail.

Enamel Application

Exemplary Implementations

Various implementations for enamel application are possible according to various embodiments. These implementations can include one or more of the following:

Adjustable applicator heads
Integrated flow heads
Interior/exterior masking systems
Remote deposition & jetting methods
Delivery techniques
Cuticle and/or tissue detector systems
Chemical change after application
Remote spreading methods
Surface tension spreading techniques
Volume and thickness control techniques
Pathway methods
Contact applicators FIG. 113A is a conceptual drawing of the enamel/polish application system 600 including a plurality of bristle control rods.

FIG. 113B is a conceptual drawing of the enamel/polish application system 600 including a plurality of directional nozzles.

FIG. 113C is a conceptual drawing of the enamel/polish application system 600 including a plurality of tube array brushes.

FIG. 113D is a conceptual drawing of the enamel/polish application system 600 including a plurality of interchangeable duck bill arrays.

FIG. 113E is a conceptual drawing of the enamel/polish application system 600 including a two-dimensional grid brush.

Evaluation of Exemplary Implementations

Evaluation of suitable implementations can include development of a Pugh matrix in which exemplary concepts are ranked against set, though non-limiting criteria. Fourteen application concepts exist according to various embodiments of a nail care system 100 as described herein and were placed in the matrix and weighted against the following criteria:

Edge smoothness
Surface finish
System complexity
System reliability
Maintenance level requirements
Cost (reusable)
Cost (disposable)
Application Speed The output of the Pugh matrix, included below, provides non-limiting information regarding these approaches.

FIG. 114A is a left side of a Pugh Chart ranking first, second, third, fourth, fifth, and sixth enamel/polish application methods and the enamel/polish application systems 600.

FIG. 114B is a right side of the Pugh Chart ranking seventh, eighth, ninth, tenth, eleventh, twelfth, thirteenth, and fourteenth enamel/polish application methods and the enamel/polish application systems 600.

In some embodiments, a nail care system 100 according to the teachings herein includes a system which can move a set applicator in a repeated and accurate manner.

Platform Selection

In some embodiments, the nail care system 100 includes a robotic platform, such as, for example, the Mecademic MECA500 arm.

In addition to the robotic arm, the nail care system 100 according to some embodiments may include a sub-system for metering the enamel into the application device. For example, in some embodiments, a pneumatic dispensing system may be used. For example, in some embodiments, a Fisnar DC100 controller or similar functioning controller may be selected as it can be computer/electronically controlled and/or has vacuum assistance. In some embodiments, additional options and accessories may also be provided that improve the implementation of nail polish delivery.

FIG. 115 is a perspective view of a pneumatic dispensing system.

Testing; System Overview

The diagram below shows a nail care system 100 according to some embodiments, including exemplary sub-system identifications. It will be understood that miniaturization, encapsulation within a protective housing, and other design changes are within the scope of embodiments.

FIG. 116 is a perspective view of a prototype of a nail care system. FIG. 108: Testing system and component identification. (A) Dispensing controller system. (B) Meca500 Robotic Arm. (C) Fluid reservoir and dispensing mechanics. (D) Fluid manifold and nozzle system. (E) Specimen platform. (F) Forced air fan.

In some embodiments, the core component of the nail care system 100 is the robotic arm, onto which one or more applicator systems can attached. These application systems may then be used to distribute enamel onto the specimen platform—which may include either a flat or curved surface to be painted. The specimen platform may be adjusted based on the end effector applicator size and to avoid situations where a positional singularity (locations in end-effector trajectory where more than one robotic pose could exist) could affect the motion.

In some embodiments, the Meca500 robot or other robot arm can be instructed to move via a multitude of commands. In some embodiments, to reduce complexity, some or all of the commands sent to the robot may utilize the on-board Inverse Kinematics (IK) solver, where a location and orientation in space (X, Y, Z, A, G, B) is given and the robot moves its end effector to the desired position and attitude. In other embodiments, other approaches may be used, such as, for example, calculating specific joint angles along the arm.

In some embodiments, at times, the change in position of the end effector, although small, may require large changes in interior joint angles. The maximum speed of end effector travel is therefore limited not just by the maximum speed of each motor, but also the combination of orientation and location of each joint. Therefore, if the end-effector requires large displacement from a certain joint, it may limit the speed to one which was easily obtainable in another orientation.

FIG. 117 is a schematic diagram of reference frames of a prototype of the mobility mechanism system 1000 for the prototype of the nail care system.

These limitations, along with a desire to minimize system complexity, resulted in a want according to some embodiments to keep the nozzle systems situated along the FRFy and FRFx plane. This may allow for a reduction in necessary coordinate transformation equations as well as maintaining the work-area more about the neutral position of the robot (which kept resulting joint movement within a more linear regime). Since the nail painting operation only requires a small area of coverage, this may not be a significant limitation. In some embodiments, as the nozzle offset height increases, opportunities for motion singularities and speed fluctuations increase.

Testing Methods

In order to test each method of enamel application, a basic practice was standardized in which each application technique was used to deposit enamel on a non-reactive flat surface. Based on the relative performance of each method, some were chosen to explore in further detail and complexity of application type.

For all flat surface tests, glass slides were used. Glass was chosen as it was non-reactive, transparent, hard, and readily available. Types and characteristics of polish varied. Early on, noting the wide selection of polishes available on the market, a host of polish types were used to make sure that any differences could be accommodated. All in all, beyond the large alterations in viscosity between color enamel and top coat, no major variabilities were noted between the color enamel types. The polishes used in the initial exploration phase are illustrated in the diagram below.

FIGS. 118A-118F: Various polishes initially used to test performance.

FIG. 118A is a front view of a bottle of It Never Ends by OPI.

FIG. 118B is a front view of a bottle of Envy the Adventure by OPI.

FIG. 118C is a front view of a bottle of Top Coat by FingerPaints.

FIG. 118D is a front view of a bottle of Haute Springs by Color Therapy.

FIG. 118E is a front view of a bottle of Red-y to Glow by Color Therapy.

FIG. 118F is a front view of a bottle of Through the Grapevine by wet n wild.

In some embodiments, glitter polishes may also be used. For example, in some embodiments, the nail care system 100 is adapted such that its mechanics are large enough to pass the particle size within the polish.

FIG. 119A is a front view of a bottle of glitter polish by FingerPaints.

FIG. 119B is a front view of a bottle of glitter polish by FingerPaints.

FIG. 119C is a front view of a bottle of glitter polish by Sally Hanson.

FIG. 119D is a front view of a bottle of glitter polish by ORLY.

As testing continued to narrow down and focus on more specific application techniques, focus was placed on standardizing one type of polish and top coat type for experiments. The two chosen were Pool side service and all in one top coat and base layer—both by Essie.

FIG. 119E is a front view of a bottle of Pool Side Service by Essie.

FIG. 119F is a front view of a bottle of All In One by Essie.

By standardizing an enamel, experimentation variables could be controlled a bit better. A dark enamel was chosen to highlight the contrast of un-painted areas. Near the end of the project, it was requested that a more sheer polish be used to generate some test samples. The recommended polish was called Ballet Slippers by Essie.

FIG. 119G is a front view of a bottle of Ballet Slippers by Essie.

The sheer polish was slightly thinner than the more opaque polishes, however since the applicator systems were developed to work top coat (which is far less viscous), no major hurdles were noted.

Three main types of surface materials were used during the project according to various embodiments. They include, Delrin, glass, and acrylic. Delrin and glass did not react to the solvents within the polishes, however the acrylic did. Once a polish was applied to acrylic, it would immediately begin to soften the plastic beneath. This posed challenges in that fake acrylic nails are standard to the industry, and thus in order to paint a fake nail, it would need to be on acrylic. Further progression of testing (especially with top coat application), prioritized low-force and non-contact application techniques, which reduced the concern of painting acrylic.

Spreading Applicators

In some embodiments, the nail care system 100 includes a spreader. The spreader operates such that after the enamel is first deposited in a concentrated area it is re-distributed via a tool.

Rotational Spreaders

In some embodiments, the nail care system 100 includes a rotational spreader including a spreading applicator that rotates about an axis.

Horizontally Rotating Spreaders

In some embodiments, the nail care system 100 includes a horizontally rotating spreader that rotates about an axis that is parallel to the surface of application. The enamel is initially deposited in front of the direction of travel, and then the rotating head is swept over the enamel to spread it.

FIG. 120A is a side view of clockwise rotation of a spreading head of the enamel/polish application system 600 against a direction of travel.

FIG. 120B is a side view of counter-clockwise rotation of the spreading head of the enamel/polish application system 600 with the direction of travel.

FIG. 121A is a perspective view of a horizontally rotated cotton swab for the enamel/polish application system 600.

FIG. 121B is a plan view of painting results using the horizontally rotated cotton swab for the enamel/polish application system 600 rotating in a first direction.

FIG. 121C is a plan view of painting results using the horizontally rotated cotton swab for the enamel/polish application system 600 rotating in a second direction.

FIG. 121D is a perspective view of a horizontally rotated silicone eye-liner brush for the enamel/polish application system 600.

FIG. 121E is a plan view of painting results using the horizontally rotated silicone eye-liner brush for the enamel/polish application system 600 rotating in a first direction.

FIG. 121F is a plan view of painting results using the horizontally rotated silicone eye-liner brush for the enamel/polish application system 600 rotating in a second direction.

Vertically Rotating Spreaders

In some embodiments, the nail care system 100 includes a vertically rotating spreader. These rotational spreaders may be similar to the horizontal spreaders. The axis of rotation, however, may be normal to the painted surface. For this effort a rotating head was developed in which replaceable applicator tips could be swapped out.

FIG. 122 is a perspective view of a rotational attachment for the enamel/polish application system 600.

The design of the rotational attachment according to some embodiments had a hollow shaft in which different tools could be passed through as well as weighted differently to alter the down-force that was given to each test application. A series of high-downforce (downforce greater than 10 grams (0.3527 ounce)) and low-downforce (downforce less than 1 gram (0.03527 ounce)) experiments were conducted with this tool. The results are summarized in the tables below.

FIG. 123 is a perspective view of painting results for the rotational attachment of FIG. 122 for the enamel/polish application system 600.

FIG. 124A is a perspective view of a first filleted reduction head for the enamel/polish application system 600.

FIG. 124B is a perspective view of a second filleted reduction head for the enamel/polish application system 600.

FIG. 124C is a plan view of painting results for the first filleted reduction head for the enamel/polish application system 600.

FIG. 124D is a plan view of painting results for the second filleted reduction head for the enamel/polish application system 600.

FIG. 124E is a perspective view of a first conical tipped head for the enamel/polish application system 600.

FIG. 124F is a perspective view of a second conical tipped head for the enamel/polish application system 600.

FIG. 124G is a plan view of painting results for the first conical tipped head for the enamel/polish application system 600.

FIG. 124H is a plan view of painting results for the second conical tipped head for the enamel/polish application system 600.

FIG. 124I is a perspective view of a dome tipped head for the enamel/polish application system 600.

FIG. 124J is a plan view of painting results for the dome tipped head for the enamel/polish application system 600.

FIG. 124K is a perspective view of a first internal cavity head for the enamel/polish application system 600.

FIG. 124L is a perspective view of a second internal cavity head for the enamel/polish application system 600.

FIG. 124M is a plan view of painting results for the first internal cavity head for the enamel/polish application system 600.

FIG. 124N is a plan view of painting results for the second internal cavity head for the enamel/polish application system 600.

FIG. 124O is a perspective view of a silicone brush for the enamel/polish application system 600.

FIG. 124P is a plan view of painting results using the silicone brush for the enamel/polish application system 600 rotating in a first direction.

FIG. 124Q is a plan view of painting results using the silicone brush for the enamel/polish application system 600 rotating in a second direction.

FIG. 124R is a perspective view of a miniature cotton swab for the enamel/polish application system 600.

FIG. 124S is a plan view of painting results using the miniature cotton swab for the enamel/polish application system 600 rotating in a first direction.

FIG. 124T is a plan view of painting results using the miniature cotton swab for the enamel/polish application system 600 rotating in a second direction.

FIG. 124U is a perspective view of a miniature cotton swab for the enamel/polish application system 600.

FIG. 124V is a plan view of painting results using the miniature cotton swab for the enamel/polish application system 600 using a first application pattern.

FIG. 124W is a plan view of painting results using the miniature cotton swab for the enamel/polish application system 600 using a second application pattern.

FIG. 124X is a perspective view of a third filleted reduction head for the enamel/polish application system 600.

FIG. 124Y is a plan view of painting results for the third filleted reduction head for the enamel/polish application system 600.

Promising performance from the filleted reduction head according to some embodiments prompted further investigation into this technique. The head was modified to dispense fluid through a small orifice along the axis of rotation. A circular trajectory which spiraled the tool outwards was created. A depiction of the path and results of the experimentation can be seen below:

FIG. 125 is an X-Y diagram of an outwards spiral pathway plan for the enamel/polish application system 600. The first trace (beginning at x=196.2, y=0 and ending at x=199.0, y=0) is the outwards spiral, the second trace is the exterior trajectory, and the third trace (beginning at x=195.8, y=0 and ending at x=194.2, y=1.8) is the final trajectory before tool removal. The inwards spiral was found to help keep the edges pristine by removing the tool within the painted area.

FIG. 126A is a perspective view of a filleted reduction head for the enamel/polish application system 600 prior to application.

FIG. 126B is the filleted reduction head for the enamel/polish application system 600 dispensing enamel.

FIG. 126C is the filleted reduction head for the enamel/polish application system 600 spreading the dispensed enamel.

FIG. 126D is the filleted reduction head for the enamel/polish application system 600 continued spreading of the dispensed and spread enamel.

FIG. 126E is the filleted reduction head for the enamel/polish application system 600 after completed enamel application.

In order to study the effects of enamel application on a contoured surface according to some embodiments, the pathway was modified for a curved cylinder. A cylinder was chosen because the geometry is similar to that of a fingernail yet enabled simple enough trajectory planning. Additionally, it provided an easy way to swap out test cylinders for different enamel application experiments, as hollow tubes were readily available.

FIG. 127A is a perspective view of the filleted reduction head for the enamel/polish application system 600 incident on a hollow tube in lieu of a finger of a user.

FIG. 127B is a side view of the filleted reduction head for the enamel/polish application system 600 incident on the hollow tube.

FIG. 127C is a Y-Z plot of a cylindrical surface of the hollow tube to be pained, and a swept trajectory of a wrist joint of the user.

FIG. 128A is a top perspective view of the filleted reduction head for the enamel/polish application system 600 and the hollow tube prior to application.

FIG. 128B is a top perspective view of the filleted reduction head for the enamel/polish application system 600 dispensing and spreading enamel.

FIG. 128C is a top perspective view of the filleted reduction head for the enamel/polish application system 600 continued spreading the dispensed and spread enamel.

FIG. 128D is a top perspective view of the filleted reduction head for the enamel/polish application system 600 after completed enamel application.

Many of the tests performed with the filleted reduction head resulted in very smooth enamel application. In some embodiments, the application tool also performs well with successive coats. In some embodiments, care is taken not to keep the spinning head within the painted zone for too long, as air entrapment could occur and leave large bubbles.

FIG. 129 is a plan view of enamel applied with undesirable air entrapment caused from excessive mixing of a spinning head.

A series of experiments were conducted with elastomeric tool tips to test the effect of this application process when much lower down-force was present. Three tool tips were used with the results shown below:

FIG. 130A is a perspective view of the rotational attachment equipped with a soft smooth rotating rubber disc for the enamel/polish application system 600.

FIG. 130B is an end view of soft smooth rotating rubber disc for the enamel/polish application system 600.

FIG. 130C is a plan view of painting results for rotational attachment equipped with the soft smooth rotating rubber disc for the enamel/polish application system 600.

FIG. 130D is a perspective view of the rotational attachment equipped with a low angled rotating rubber cone for the enamel/polish application system 600.

FIG. 130E is an end view of low angled rotating rubber cone for the enamel/polish application system 600.

FIG. 130F is a plan view of painting results for rotational attachment equipped with the low angled rotating rubber cone for the enamel/polish application system 600.

FIG. 130G is a perspective view of the rotational attachment equipped with a soft smooth rotating rubber disc for the enamel/polish application system 600.

FIG. 130H is a side view of soft smooth rotating rubber disc for the enamel/polish application system 600.

FIG. 130I is a plan view of painting results for rotational attachment equipped with the soft smooth rotating rubber disc for the enamel/polish application system 600.

As shown above, the cone design, for example, allowed the central point of the spinning head to maintain contact with the surface, while the exterior would spin the fluid around creating a fairly uniform coating.

The advantage with the vertically rotating spreaders according to some embodiments is that the rotation of the tool forms a circular barrier of enamel around the center of the tool. Unlike passive spreaders according to some embodiments where the paint distribution may change based on the directionality of use, the rotational tools may leave uniform enamel streaks in whichever direction they are moved regardless of pathway history.

Brushes

In some embodiments, the nail care system 100 includes a brush for nail polish application in a repeated fashion. In some embodiments, since the size of the contact patch of the brush is highly dependent upon brush orientation and height above the surface, one or both are carefully controlled.

In some embodiments, the nail care system 100 includes a visual feedback system for applying nail polish with a brush. The real-time, visual feedback may allow the nail care system 100 to determine when to adjust brush pressure to achieve the desired brush shape.

Testing of four different brushes took place and the results are included in Appendix C: Brush Applicators.

Active Dispensing Systems

In some embodiments, the nail care system 100 includes an active dispensing system. For example, as opposed to spreading applicators, which may simply reposition and/or relocate enamel, actively dispensing applicators may work to apply new enamel on the nail surface from a remote reservoir. The active dispensing systems according to some embodiments can be broken into three distinct parts: the pump, the delivery system, and the nozzle. The pump may pressurize the fluid, the delivery system may transport the flow from the reservoir to the nozzle, and the nozzle may be the orifice which helps control the fluid upon exit.

Active dispensing systems according to some embodiments may prove to be much more reliable and precise than any of the spreading applicators.

Active Pumping System

In some embodiments, the nail care system 100 dispenses enamel using a pneumatic system, in which pressurized air is used to advance a plunger within a cylinder of fluid. The advantages of such a system, for example, include quick setup and ease of adjustability. In other embodiments, a more robust dispensing system is provided which may be better suited towards the quick-drying high viscosity nature of nail polish.

FIG. 131 is a side perspective view of a prototype of pneumatically driven syringe heads held by a prototype of the mobility mechanism system 1000 for the enamel/polish application system 600.

In some embodiments, the nail care system 100 includes as a replacement to pneumatics, a stepper driven, positive displacement pump. This pump may utilize much of the same single-use syringe architecture as the pneumatic version. This new design may not only offer superior control, but also better reflect how such a dispensing architecture may be embodied in a desktop device.

FIG. 132 is a perspective view of a captive leadscrew piston pump for the enamel/polish application system 600.

In some embodiments, the nail care system 100 includes a pumping system that includes a motor, which drives a captive leadscrew. At the end of the leadscrew may be a plunger, which is pushed along the interior of a syringe. In various embodiments, the syringe can be swapped out enabling for various colors and types of enamels to be used.

In some embodiments, the nail care system 100 is designed to have manual control (via a button interface) and/or computer control via a USB serial link. The system architecture according to some embodiments is illustrated below:

FIG. 133 is a diagram of a system architecture for control and operation of a stepper motor of the nail care system.

In some embodiments, the nail care system 100 includes microcontroller software having built in odometry so it is possible to not only dispense at a set speed, but also to a set volume. Accelerations and speeds may also be configurable. In some embodiments, a simple static flow rate may be used.

In some embodiments, the nail care system 100 includes computer control that coordinates the robotic arm movement with dispensing speed. For example, in some embodiments, a simple python GUI may be included that allows the user to better operate both devices in unison.

Fluid Delivery System

In most experiments, delivering fluid from the reservoir to the nozzle exit was rather straightforward. Many instances involved either a straight or tapered conduit, however there were a few instances where the conduit path re-directed the flow of enamel in more complex ways. All such embodiments are within the scope.

Constant Diameter Tube

In this embodiment, flow may be directed from the syringe reservoir through a small constant-diameter tube to the nozzle at the end.

FIG. 134 is a perspective view of a constant diameter tube for the enamel/polish application system 600.

In general, nail polish may be a highly viscous fluid, and as such, high pressures are required to push it through small spaces. Experimentation found that nozzle diameters of 1 mm (0.03937 inch) or less seemed to yield decent edge control, however maintaining this nozzle diameter throughout the fluid conduit results in no better performance or advantage. Smaller nozzle diameters did offer better painting control, and thus as the tubes grew smaller in diameter, the pressures required to flow fluid through them increased. In between uses, the fluid could thicken or even dry out creating additional restrictions in flow which would greatly affect dispensing control. In some embodiments, to minimize pressure and reduce flow resistance, the delivery system would be as short as possible while not restricting flow with thin diameter tubing. A careful balance of these factors may result in an accurate application, with lower pressures.

In longer conduit systems that require higher pressures to achieve desired flow rates, entrapped air within the fluid system may have an adverse effect upon dispensing control. Air can be introduced over time from within the plunger seal itself, through the nozzle either by cleaning or changes in enamel volume (such as drying & shrinking), or simply exist in the enamel prior to its introduction into the reservoir. When dispensing occurs, the reservoir may be naturally pressurized up to the equivalent resistance to flow in the system. The higher this resistance, the higher the pressure. If any air is within the reservoir, it may be compressed. This compression acts like a spring and can lengthen the time to reach steady state flow. Any sudden changes to flow rate may also be affected by air in the system, and thus it may be better to administer a constant flow rate throughout the painting process rather than dynamically control it. If there is any bit of compressibility within the fluid or delivery system, the level of control may diminish the longer our conduit length becomes, because flow resistance will increase, yielding to higher working pressures.

In some embodiments, less rigid materials may also add a similar dimension to flow control lag, where non-rigid materials such as rubber tubing can expand when pressurized. Keeping these non-rigid members to a minimum may provide better fluid control.

The nail care system 100 according to some embodiments may operate according to one or more (e.g., all) of the following principals to achieve active dispensing control:

Maintain steady state flow at all times or wherever possible.

Achieve steady state flow prior to painting critical edges of the nail.

This can be done, for example, by either flowing material into a separate receptacle prior to nail application, or flowing the initial portions of paint into a zone on the nail which will be re-traced at a later time.

Changing the volumetric rate of application by changing surface speed rather than dispensing speed.

Maintain a system free of large volumes of air.

Maintaining a clean nozzle to enable repeated, predictable enamel applications

When not used for long periods or after cleaning, use of dispensing fluid to purge and cycle the delivery conduits.

Tapered Tube

FIG. 135 is a perspective view of a tapered tube for the enamel/polish application system 600.

Flow within a tube of constant diameter may exhibit linear pressure drop along the length of travel. By increasing the diameter of pipe according to some embodiments, these losses may be reduced. Therefore, if the tube diameter is enlarged where it is not needed (the final diameter is only needed at the nozzle), according to some embodiments the pressure drop within the flow along the length of the nozzle can be reduced.

In some embodiments, this is the principal behind the tapered or conical nozzle used in a nail care system 100. The tapered tube may also be easier to clean and may not tend to clog as quickly. Apart from a reduction in flow resistance, performance from enamel application may be similar to that of the tube applicator tips, which may make this design an attractive alternative in some embodiments for a constant diameter delivery system.

Tip Configurations

Various types of active dispensing tip configurations may be provided for a nail care system 100 according to various embodiments.

Basic Nozzle Tip

In some embodiments, the nail care system 100 may include a basic nozzle, which may be the simplest form of a dispensing tip. The nozzle may be a round orifice through which fluid is extruded as the tip is swept across the surface. A high level of edge smoothness can be achieved as well as thickness consistency as indicated in the images below:

FIG. 136 is a plan view of painting results using a basic nozzle tip for the enamel/polish application system 600.

FIG. 137 is a perspective view of the basic nozzle tip for the enamel/polish application system 600.

In certain instances, artifacts from the deposition process may form within the topology. This may be present, to an extent, with all application techniques. Enamel age and viscosity were found to be a major factors in uniformity according to some embodiments. To minimize these effects, linear travel speed, trajectory, nozzle size, and/or flow rate can be managed by the nail care system 100. Proper management of these variables may reduce the impact of these visual disturbances.

In exemplary testing, the nozzle tips were hovered over the painted surface in a non-contact application method. In other experiments, a contact-based method was developed. This contact method allowed the nozzle tip to touch the painted surface with limited force. Both methods resulted in high quality enamel deposition and were the most consistent and controllable applicators tested.

The non-contact method produced more uniform results when applying multiple layers of enamel since it did not disturb the layers beneath. In order to achieve a smooth consistent paint formation, the nozzle tip was positioned very close to the surface. Tests indicated that at higher fluid flow rates (more forgiving), the nozzle needed to be positioned within a half a millimeter to the surface according to some embodiments. As flow rates reduced, this distance also decreased, and ideally the nozzle can be kept well within this half millimeter threshold according to some embodiments.

In cases where the tip of the nozzle was positioned too far from the surface according to some embodiments, the enamel would come out in globs, and result in splotchy application. When the nozzles were brought too close to the surface, it would restrict flow, and create streaking marks. This would lead to a reduction in enamel flow and during trajectory retracing the tip would push already applied enamel to the side of the path of travel resulting in an inconsistent application in some instances.

Overall, in some embodiments, wider nozzles may tend to leave a wider path of polish behind, and thus the need for overlapping pathways of enamel application may not be as great as with the smaller nozzle. In contrast, smaller nozzles according to some embodiments may produce slightly better edge smoothness at the reduction of extrusion volume and speed.

In some embodiments, the nail care system 100 may transition from a flat to a curved surface during one or more process steps (e.g., enamel application). In some embodiments, care is taken to avoid having a nozzle tube design such that the angle between the normal of the surface and the central axis of the nozzle negatively impacts on flow and resulting surface finish. As the angle begins to differ by larger and larger amounts, it can alter the distribution of flow out of the nozzle. The diagram below helps to illustrate this effect:

FIG. 138A is an end view of the basic nozzle tip for the enamel/polish application system 600 orthogonally incident with a curved nail of a user with emphasis on undesirable altered distribution of flow of enamel from the nozzle.

FIG. 138B is an end view of the basic nozzle tip for the enamel/polish application system 600 normally incident with the curved nail of the user with emphasis on improved distribution of flow of enamel from the nozzle.

Some nozzles at positions A and C tend to excrete fluid away from the center of the nail, whereas in location B, the nozzle distribution is more uniform. In some embodiments, adjustment for this effect can be accounted for in the pathway planning stage. As the nozzle widens the polish layer may need to compensate by increasing in thickness to achieve complete coverage. A thicker layer may slow the drying process. At a certain point, the effects of gravity may overwhelm the movements of the fluid, making it impossible to control fluid deposition. Because of this, locations A and C may have a higher chance of running. By reducing the width of the nozzle, the layer thickness can diminish, as each pass may require less width of the nail.

Locations D, E, and F illustrate the changes in outflow from the nozzle according to some embodiments when positioned normal to the painted surface. When, according to some embodiments, the nozzle is normal to the surface, the nail can be painted with more uniform flow using a larger choice of nozzle widths. Accordingly, in some embodiments, to keep the distribution of enamel as symmetrical as possible around the nozzle and yield the best control, the nail care system 100 may keep the nozzle as close to normal to the surface as possible.

Flared Castle-Tip Point

In some embodiments, the nail care system 100 may include a flared castle-tip point. This nozzle may be cut from, for example, a plastic taper tip and used to extrude polish onto a flat surface. In this embodiment, the flared arms may bend and spread out to contact the surface at varying distances of nozzle placement, relieving the nozzle of the need to be precisely placed above the nail. Images of the tip are shown below:

FIG. 139A is a top end view of a flared castle-tip point for the enamel/polish application system 600.

FIG. 139B is a side view of the flared castle-tip point for the enamel/polish application system 600.

Images of a large square and the surface artifacts left over using a nozzle tip according to this type according to some embodiments are shown below.

FIG. 140A is a plan view of first painting results using the flared castle-tip point for the enamel/polish application system 600 with emphasis on undesirable surface artifacts.

FIG. 140B is a perspective view of second painting results using the flared castle-tip point for the enamel/polish application system 600 with emphasis on undesirable surface artifacts.

Icing Nozzles

FIG. 141A is a perspective view of a first icing nozzle with two inwardly curved bits for the enamel/polish application system 600.

FIG. 141B is a perspective view of a second icing nozzle with four inwardly curved bits in a relatively loose arrangement for the enamel/polish application system 600.

FIG. 141C is a perspective view of a third icing nozzle with four inward curved bits in a relatively tight arrangement for the enamel/polish application system 600.

In some embodiments, the nail care system 100 may include a nozzle including or appearing similar to a nozzle tip used for icing. For example, these tips may be designed with the intention that the enamel would be forced out the sides of the nozzle rather than directly downwards. By doing this, it may allow the device to rest on the nail-bed in any orientation without affecting flow rate and possibly distributing enamel more evenly.

Filament Nozzles

In some embodiments, the nail care system 100 may include a filament nozzle. For example, tests conducted with the basic nozzle according to some embodiments indicated that the distance between the painted surface and the dispensing nozzle tip was important. If the nozzle was positioned too closely, it would choke flow. If positioned too far away, the enamel would bead-up onto the tip before getting large enough to make contact the surface. At speed, this bead formation, would translate to a blob-like application of polish that would look very inconsistent.

FIG. 142A is a perspective view of a filament nozzle and first painting results using the filament nozzle for the enamel/polish application system 600 with emphasis on undesirable blob formation.

FIG. 142B is a plan view of second painting results using the filament nozzle for the enamel/polish application system 600 with emphasis on undesirable inconsistent painting of enamel. Painting was performed in the horizontal direction.

A filament was designed according to some embodiments to break the formation of the sphere at the end of the nozzle, and create a pathway for the nail polish to flow down the filament shaft and congregate at the base instead. The filament was unconstrained in the Z direction, and thus gravity (or flow of enamel) would draw the pin downwards onto the nail. This contact would allow for easy transfer of the nail polish from the filament onto the nail surface. Two main forms of the filament nozzle were designed according to some embodiments: interior filament and exterior filament.

Interior Filament Nozzles

In some embodiments, the nail care system 100 may include an interior filament nozzle. For example, the filament tip may include a filament positioned within the flow path itself. Such a design is illustrated in the image below:

FIG. 143A is a side perspective view of an interior filament nozzle for the enamel/polish application system 600.

FIG. 143B is a perspective view of the interior filament nozzle for the enamel/polish application system 600.

This filament in this design utilizes a large diameter rod, which floats within the interior diameter of the flow tube. The larger diameter rod may increase the control of filament position.

The rigid filament/floating pin according to some embodiments proved to be a successful modification in that it followed the surface contours really well and kept the pin in contact with the nail bed over a wide range of contour changes. In some embodiments, additional measures are taking to avoid the following conditions:

The pin was not well constrained concentrically within the nozzle, and thus could float around. Although much more deterministic than a bristle brush, the location of the pin could change position with respect to the nozzle tube, leading to inaccurate enamel application.

The enamel had trouble flowing consistently around the pin, and created un-even polish distribution at the tip. This also contributed to inconsistent enamel application.

FIG. 144A is a side perspective view of a first example of undesirable uneven flow from the interior filament nozzle for the enamel/polish application system 600.

FIG. 144B is a side perspective view of a second example of undesirable uneven flow from the interior filament nozzle for the enamel/polish application system 600.

FIG. 144C is a side perspective view of a third example of undesirable uneven flow from the interior filament nozzle for the enamel/polish application system 600.

Exterior Filament Nozzles

In some embodiments, the nail care system 100 may include an exterior filament nozzle. For example, in order to solve the issues with the interior filament nozzle according to some embodiments, an exterior filament system was designed which separated the filament bearing surface from the flow path of enamel. This was done to reduce effects that enamel consistency and viscosity would have on performance. Additionally, the filament could be better constrained which would lead to better precision. The image below illustrates an exterior filament system.

FIG. 145A is a side perspective view of an exterior filament nozzle for the enamel/polish application system 600.

FIG. 145B is a perspective view of the exterior filament nozzle for the enamel/polish application system 600 and painting results for the same.

As expected, the exterior filament system according to some embodiments performed better than the interior filament design because the bearing surfaces remained free from enamel. The design according to some embodiments, however, still required the filament to interrupt the flow path of enamel. Although it did not affect the performance as significantly as the internal filament design according to some embodiments, the filament may still need to be cleaned before use in some embodiments to optimize performance.

Vibration Shroud

In some embodiments, the nail care system 100 may utilize vibratory movement to affect the flow and finish of nail polish application. For example, hectorite and bentonite clays within many polish formulations may create a thixotropic effect—where viscosity decreases as shear forces increase.

The results of this experimentation are summarized in eated by a small array of pins.

APPENDIX E: VIBRATORY SPREADING

Spring Plunger Nozzle

In some embodiments, the nail care system 100 may include a spring plunger nozzle. The spring plunger nozzle may include a tip in which a compression spring from within the tip forces a positive seal to form between a plunger and the interior surfaces of the nozzle. When the sealing force is overcome (e.g., by pushing up on the plunger), fluid may flow from the nozzle.

One benefit of this tip design according to some embodiments is that it is very successful at preventing the enamel inside the tool from drying out. Although the exterior of the tip may need to be cleaned (e.g., after every use), this procedure may be quite simple, such as brushing it with a sponge coated in nail polish remover.

This plunger tip design may function similarly to that of the interior filament nozzle, except that it may be self-sealing when removed from the painted surface. Because the interior plunger may be much shorter, the outflow may be much smoother and more controllable than either of the filament tips tested earlier.

FIG. 146A is a top perspective view of a spring plunger tip for the enamel/polish application system 600.

In some embodiments, the tool may leave a smooth coating behind with reasonable and controllable edges. Since the plunger may be internally sprung, it may require a higher force to open the seal.

FIG. 146B is a top perspective view of painting results of a spring plunger tip for the enamel/polish application system 600.

This higher force, according to some embodiments, may place conditions on the tip's use. For example, in some embodiments, adequate time to harden is allowed to prevent the tip from digging into any lower layers of enamel. For single layer applications, such additional drying or hardening time may not be necessary.

Dispensing Paths

In some embodiments, the nail care system 100 may employ one or more dispensing paths for dispensing enamel. In some embodiments, multiple trajectories (e.g., overlapping of strokes) may be used. In some embodiments, the dispensing may be at higher speed and/or using one or more paths designed for edge smoothness. Examples of the trajectories that can be implemented according to various embodiments of a nail care system 100 (e.g., stored in memory and put into action by a mechanism or element such as a robotic arm of the apparatus in order to apply enamel) in accordance with the teachings herein are illustrated in the table below.

FIG. 147A is an X-Y diagram of a circular outwards spiral pathway plan for the enamel/polish application system 600.

FIG. 147B is a plan view of painting results from the circular outwards pathway plan for the enamel/polish application system 600.

FIG. 147C is an X-Y diagram of a circular outwards followed by a perimeter trajectory pathway plan for the enamel/polish application system 600.

FIG. 147D is a plan view of painting results from the circular outwards followed by a perimeter trajectory pathway plan for the enamel/polish application system 600.

FIG. 147E is an X-Y diagram of a circular outwards followed by a perimeter trajectory, and then a trajectory back inwards pathway plan for the enamel/polish application system 600.

FIG. 147F is a plan view of painting results from the circular outwards followed by the perimeter trajectory, and then the trajectory back inwards pathway plan for the enamel/polish application system 600.

FIG. 147G is an X-Y diagram of a circular outwards followed by a spiraling inward square (low pitch) pathway plan for the enamel/polish application system 600.

FIG. 147H is a plan view of painting results from the spiraling inward square (low pitch) pathway plan for the enamel/polish application system 600.

FIG. 147I is an X-Y diagram of a circular outwards followed by a spiraling inward square (high pitch) pathway plan for the enamel/polish application system 600.

FIG. 147J is a plan view of painting results from the spiraling inward square (high pitch) pathway plan for the enamel/polish application system 600.

FIG. 147K is an X-Y diagram of a circular outwards followed by a square perimeter and then interior start pattern outwards pathway plan for the enamel/polish application system 600.

FIG. 147L is a plan view of painting results from the square perimeter and then interior start pattern outwards pathway plan for the enamel/polish application system 600.

FIG. 147M is an X-Y diagram of a circular outwards followed by a back and forth linear paths followed with a perimeter trajectory pathway plan for the enamel/polish application system 600.

FIG. 147N is a plan view of painting results from the back and forth linear paths followed with the perimeter trajectory pathway plan for the enamel/polish application system 600.

FIG. 147O is an X-Y diagram of a circular outwards followed by a 90 degree offset back and forth linear paths followed by a perimeter trajectory (waffle pattern) pathway plan for the enamel/polish application system 600.

FIG. 147P is a plan view of painting results from the 90 degree offset back and forth linear paths followed by a perimeter trajectory (waffle pattern) pathway plan for the enamel/polish application system 600.

FIG. 147Q is an X-Y diagram of a circular outwards followed by a stippling pathway plan for the enamel/polish application system 600.

FIG. 147R is a plan view of painting results from the stippling pathway plan for the enamel/polish application system 600.

FIG. 147S is an X-Y diagram of a circular outwards followed by a zig-zag pathway plan for the enamel/polish application system 600.

FIG. 147T is a plan view of painting results from the zig-zag pathway plan for the enamel/polish application system 600.

FIG. 147U is an X-Y diagram of a circular outwards followed by an overlapping squares pathway plan for the enamel/polish application system 600.

FIG. 147V is a plan view of painting results from the overlapping squares pathway plan for the enamel/polish application system 600.

FIG. 147W is an X-Y diagram of a circular outwards followed by a nested D's pathway plan for the enamel/polish application system 600.

FIG. 147X is a plan view of painting results from the nested D's pathway plan for the enamel/polish application system 600.

FIG. 147Y is an X-Y diagram of a circular outwards followed by a nested C's pathway plan for the enamel/polish application system 600.

FIG. 147Z is a plan view of painting results from the nested C's pathway plan for the enamel/polish application system 600.

FIG. 147AA is an X-Y diagram of a circular outwards followed by a perimeter and fill (low pitch) pathway plan for the enamel/polish application system 600.

FIG. 147AB is an X-Y diagram of a circular outwards followed by a perimeter and fill (high pitch) pathway plan for the enamel/polish application system 600.

FIG. 147AC is a plan view of painting results from the perimeter and fill (high pitch) pathway plan for the enamel/polish application system 600.

In various embodiments, the nail care system 100 may control one or more (e.g., all) variables including travel speed, fluid flow-rate, nozzle size, fluid type, and sub-surface layer. Details of each of these factors and how they affect the path choice according to some embodiments are discussed below in the table:

| ATTRIBUTE | EFFECT |
|---|---|
| Painting Speed | The rate at which the nozzle is passed over the surface is defined as the painting speed. Painting speed is important because if one can shorten the duration of agitation and mixing time, the fluid has longer to self-level and "heal" any surface abnormalities before curing. The self-leveling characteristics of the fluid may diminish very quickly once it starts to dry and thicken. Ideally, painting can take place as quickly as possible, however excessive speeds can also have negative impacts such as a reduction in edge consistency.<br>If one wanted to paint a larger area faster while keeping the painting speed constant, a larger diameter nozzle and higher volumetric flow may be recommended. |
| Fluid Flow Rate | Fluid flow rates can go hand in hand with painting speed. For example, in order to keep the same enamel thickness, if you were to double the fluid flow rate, you may also need to double your painting speed. If the fluid delivery system has higher internal resistance and there are air bubbles or elastomeric members in the system, higher flow rates generally may require longer times to reach steady state flow. |

-continued

| ATTRIBUTE | EFFECT |
|---|---|
| Nozzle Size | Smaller diameter nozzles may work better with lower flow rates, whereas larger nozzles may be better with higher flow rates. In addition, the nozzle size may also affect the streak width, which can affect trajectory parameters.<br>Smaller nozzles may need higher Z accuracy as their working distance from the surface will be smaller, however they may have more consistent edge formation when compared to a wider nozzel. |
| Fluid Type | Top coat fluid may have a lower viscosity, but may also have much shorter working-time once dispensed. A fluid path for the color enamel may focus on slower speeds for edge precision, followed-up with a faster routine for the top coat which dries faster. |
| Sub-Surface Layer | If one is applying a top coat on top of another layer, one may want to minimize the time the nail care system 100 is in contact with the surface below. The more recently applied material may begin to disolve the enamel beneath and thus higher speeds, larger diameter nozzles, and high flow rates may be effective in such instances. |

Alternatively or additionally, other factors such as where the nozzle is landed and/or removed from within the painted area can have an effect upon quality according to some embodiments. Landing or removal of the nozzle from within the painted area can help prevent smudging and excessive deposition along the edge of the painted perimeter, however can also lead to air entrapment or other anomalies within the painted zone.

Alternatively or additionally, in some embodiments acceleration and deceleration speeds can play an important role. For example, the Meca500 robot has a built-in acceleration and deceleration factor into all the linear movements it makes, and as such, this change in speed may result in larger depositions of paint where the path's trajectory undergoes sharp alterations in heading. Abrupt back and forth movements may be the worst, since these steps may require a slow-down and subsequent speed-up through a re-traced painting zone. Given a constant nozzle flow, this may result in a disproportionate amount of fluid around the node of directional change.

FIG. 148 is a schematic diagram of an undesirable travel speed profile of a nozzle of the enamel/polish application system 600 in which a nozzle travels along path ABC, and, as the tip deaccelerates into B and then reaccelerates to C, the nozzle passes slower along the surface the closer the nozzle is to point B causing undesirable higher concentrations of enamel around point B.

In some embodiments, to minimize this affect, acceleration and de-acceleration constants may be increased or maximized. Since in some embodiments these are based on physical limitations of the robot, they may not proportionally scale with speeds. Therefore, in this regard, slower painting and flow speeds may tend to result in more consistent coating.

Since, for example, the Meca500 is a precise machine and must maintain its advertised precision throughout its profiled envelope, it is understandable that the acceleration of its linear movements may be capped at a relatively safe level. With, for example, a lower DOF robot, shorter limb segments and less mass, higher accelerations and decelerations could be achieved. This may reduce the time in which the dispensing head is not at speed and allow for faster painting.

In some embodiments, alterations in trajectory planning can help by reducing sharp changes in the motion pathway (e.g., such as filleting these directional changes). In some embodiments, to best paint the nail with fast drying enamel, an approach which worked its way from one localized region to the next may give the best results (rapid back and forth strokes from one side of the nail to the other). Managing these two factors when developing an application pathway may be an important consideration according to some embodiments.

Top Coat Application

In some embodiments, once the enamel is painted onto the fingernail, the nail care system 100 may apply a clear top coat on top of the polish to further protect it and/or to shorten drying time. What may make this process a bit different than color application is that it may need to be done in a way that will avoid disturbing the painted coat beneath it. Since the top coat can potentially quickly dissolve the enamel coat underneath, this may further complicate the step—for example, in which tool pressure (if using a contact nozzle), flow, and/or application speed may have to be carefully controlled.

First, in some embodiments, application of top coat may be applied using a non-contact method by hovering a dispensing nozzle over a surface (e.g., flat glass surface for testing) and extruding the clear top coat. The results shown below illustrate how uniformly the top coat layer can be applied using this method.

FIG. 149A is a plan view of first results of an application of a top coat using a non-contact method by hovering a dispensing nozzle over a surface (e.g., a flat glass surface for testing) and extruding a clear top coat.

FIG. 149B is a plan view of second results of the application of the top coat using the non-contact method by hovering the dispensing nozzle over the surface and extruding the clear top coat.

FIG. 149C is a plan view of third results of the application of the top coat using the non-contact method by hovering the dispensing nozzle over the surface and extruding the clear top coat.

For example, when fresh, the top coat fluid may have a lower viscosity than the nail polish, however it also may solidify at a much faster rate. Therefore, the top coat may initially flow and self-level better than the polish, yet these properties may change much quicker as the liquid begins to dry.

Since the top coat application may be the last layer of paint, the nail care system 100 according to some embodiments may apply a more generous amount to the nail without considering how it will affect the next layer. In addition, since the top coat may dries at a much faster rate, the extra top coat material may not affect drying time as significantly as adding the equivalent of colored enamel.

Keeping in mind these two factors, a nail care system 100 according to some embodiments may control the thickness and/or uniformity of the colored enamel layer, which may have a much more significant impact upon the overall processing time than the top coat. In some embodiments, the nail care system 100 may utilize a dispensing process of the polish layer that is more precise and controlled than the clear coat.

For example, using the non-contact nozzle by hovering the top coat over a cured enamel painted square yielded the results below.

FIG. 150A is a perspective view of results of using the non-contact nozzle by hovering the top coat over a cured enamel painted square using bare enamel.

FIG. 150B is a perspective view of results of using the non-contact nozzle by hovering the top coat over the cured enamel painted square using enamel with a top coat.

As can be seen, the enamel has more of a matte finish, and the top coat adds a smoother look to the final output. Further observations demonstrated that as long as the base enamel layer fully covered the area in pigment, most minor surface defects in the enamel (from painting strokes etc.), vanished once top coat was applied. Once dried, the topology from the top coat layer dominates the perceived quality of application. Thus, applying a thicker coating of top coat in order to ensure complete coverage and maximize self-leveling may be implemented according to some embodiments.

Numerous experiments were conducted to test various application factors when the top coat was applied to both flat and curved surfaces. A nail care system 100 according to various embodiments may implement one or more (e.g., all) of the following:

The base layer of enamel must meet a minimum threshold of hardness before the top coat can be consistently applied. If the enamel layer has not cured enough, mixing of the layers can occur.

Avoid too much agitation of the clear top coat liquid, which can result in entrapped air.

Trajectory of top coat must be done quickly and/or kept to a minimum as the top coat dries much quicker.

Non-contact application reduces chances of disruption to the polish layer and reduces the required drying time between coats because contact is not necessary.

In order to best utilize the lower-viscosity parameters of the top coat, quicker application may be best.

The top coat layer may soften the colored polish layer beneath and thus painting may be done in a way to minimize this disruption of the softened enamel layer below.

Since the top coat is clear, precision of top coat application may be more forgiving than with the enamel stage.

In various embodiments, these learnings may help shape a top coat painting strategy which emphasizes a higher surface speed and flow rate, less path trajectory, and utilizes a wider nozzle than the enamel painting process. These combined features may make the topcoat application much quicker.

Cantilever Follower System

In some embodiments, hovering the nozzle above the surface and dispensing enamel may result in a highly repeatable finish. In some embodiments, in order to do this, the geometry of the fingernail must be well characterized. Tests demonstrated that the nozzle of the painting instrument may need to be positioned within a half millimeter of the surface in order to deposit paint in a consistent fashion. This may be an absolute minimum value however, and may fluctuate given changes in nozzle size, flow rate, and surface speed. The closer the nozzle tip is to the surface, the thinner the layer of enamel can be and thus less time can be spent waiting for the enamel to dry. As a result, the tool may be kept well within this 0.5 mm (0.01969 inch) threshold during use.

In some embodiments, in an effort to reduce the required precision, another method may be used which may allow for some compliance between the surface and tool tip. Such a systems may be referred to as "follower tools" in that the nozzle may be free to translate up and down with respect to the surface of the nail. A few of the follower prototypes according to some embodiments are illustrated in the FIG. 151 below.

FIG. 151A is a perspective view of a prototype of a follower with a relatively long conduit of elastomeric tubing of the enamel/polish application system 600.

FIG. 151B is a side view of a prototype of a cantilevered follower with a replaceable nozzle of the enamel/polish application system 600.

FIG. 151C is a side view of a prototype of an elastomeric cantilevered follower with staggered nozzles (for dispensing a color coat and a top coat) of the enamel/polish application system 600.

FIG. 151D is a side view of a prototype of a rigid cantilevered follower with relatively short elastomeric sections at a root section (for compliance) of the enamel/polish application system 600.

In some embodiments, these follower systems may allow the nail care system 100 to paint curved surfaces which were much less defined. For example, by estimating the curvature of the nail and mapping out a 2D path of the nailbed, a high degree of fidelity may be achieved. The design of the follower system is somewhat similar to a few of the contact-type nozzle designs that were experimented with earlier, however this design may incorporate the learnings from the earlier prototypes to create a more robust system. The follower prototypes according to some embodiments focused around the use of a cantilevered dispensing conduit in which the root of the arm was constructed from a short elastomeric member. In response to the forces upon the nozzle, the tip could easily be pushed upwards—allowing the system to absorb large fluctuations in relative position between the nozzle tip and nail surface.

FIG. 152 is a side view of a prototype of a follower system principal of the enamel/polish application system 600 with particular emphasis on flexure of the follower system principal relative to an application surface.

Various approaches are possible in accordance with various embodiments. In some embodiments, key goals of the follower system are to minimize downforce and fluid resistance, create a robust method of fluid delivery, and/or make the system easily serviceable all while doing so in a compact package. These exemplary goals according to some embodiments are further outlined in the table below.

| DESIGN GOAL | REASON | SOLUTION |
|---|---|---|
| Minimize downforce | Limiting the amount of downforce onto the nail may be critical - especially when applying a top coat on top of a partially cured layer of polish. If downforce is too high, the tip may dig into the enamel layer and cause problems. | A long lever arm may be utilized in order to reduce the force at the nozzle tip. |

-continued

| DESIGN GOAL | REASON | SOLUTION |
|---|---|---|
| Minimize fluid delivery resistance | Reduction of delivery resistance may be very important because as pressures increase, so does the loss of control when air is present within the system. In addition, the higher the working pressure, the more likely the system is to leaking. | Fluid may be passed through a wide diameter manifold and large gauge tubing may be used for the delivery members. |
| Compact Size | Although it may not be critical that the size of the system be terribly compact, it may be important to keep mass and conduit length low for both positional accuracy and flow control. A smaller package may also help demonstrate a realistic pathway to minaturization. | Limitations may be placed on the lever arm distances and conduit pathways may be kept fairly direct. Pumping systems may be designed with minimal parts and complexity. |
| Robust fluid delivery | Creating a system that provided consistent fluid delivery while keeping clogging to a minimum may be important. | Nozzle caps may be developed for storage and friction may be reduced near the nozzle tip to prevent binding while deflecting. |
| Easy to service & clean | If clogging did occur, making the system easy to service and clean may be important. Additionally, making the enamel resevoir swappable may be another attractive feature. | Enamel reservoirs may use Luer-Lock type connections and larger gauge delivery conduits may be easier to clean and flush if clogged. |

The final variant of a follower system according to some embodiments is pictured in the FIG. 153 below. It shows both the enamel and top coat reservoirs with their attached lead-screw driven pumping systems. The fluid paths are staggered to allow two enamel colors to be painted with the same platform mechanics. The lever arms for both conduit paths are shielded from accidental contact within the black encasement, while adjustable nozzle guides (in white) constrain the nozzles and prevent un-intended rotation.

FIG. 153 is a side view of a prototype of a follower system of the enamel/polish application system 600, the follower system including enamel and top coat reservoirs with attached lead-screw driven pumping systems.

The follower system pictured in the embodiment above is what was used to paint many of the complex curved nail surfaces in the latter series of tests for this phase. Fluid control was fairly responsive and the design offered a good compromise between nozzle downforce and reliability (too little downforce, and the nozzles tend to bind in an upwards position). Adjustable location plates positioned near the nozzles kept the nozzles in position and allowed for minute tweaks to be made. Lastly, the bends in the conduits were long enough to keep enamel away from the locator slots and gumming up the system.

Overall, this follower design demonstrated that a system which contacts the nail can provide robust and repeatable dispensing—which in many ways may produce comparable results in a much more forgiving package.

Nail Painting Output

Once testing had demonstrated a high degree of confidence in enamel application on both smooth and curved surfaces, alterations were made to the testing platform in order to best paint a human fingernail according to some embodiments. This section documents the system setup, methodology of pathway generation, and shares some images of the application output.

In some embodiments, the nail care system 100 may include a flat surface on which a user places his or her finger.

In some embodiments, the nail care system 100 may include a mechanical fixture or device to help stabilize and orient the finger (e.g., in order to repeatably position a finger). For example, in some embodiments, a tray provides some constraint in the side to side and back and forth (X & Y) positioning of the finger. The design of the tray may be minimal in order to keep the work area as unrestricted as possible. Images of this tray and a robotically painted finger according to some embodiments are shown below.

FIG. 154 is a perspective view of a prototype of a mechanical fixture for stabilizing and orienting a finger of a user for the hand/foot rest system 1200.

FIG. 155 is a perspective view of a finger of a user held in the prototype of the mechanical fixture for stabilizing and orienting the finger of the user for the hand/foot rest system 1200.

In order to paint the finger, according to some embodiments, the nail care system 100 may have a series of trajectory motions programmed into the robot which may require the fingernail to be repeatably positioned in a very accurate manner. Without a tray, repeatable positioning of the finger may not be possible in some embodiments. In addition, although placed in the correct XY orientation, varying finger pressures and/or axial rotation may be monitored by the nail care system 100.

To develop the motion trajectory, a nail care system 100 according to some embodiments may first start with a top-down 2D image of the fingernail in which the original pathway plotting was developed. Once the pathway was made, it may be run repeatedly on the finger in which small tweaks are added to the code to better fit the motion to the actual fingernail. Position of how the nail sits in the cradle, curvature, follower suspension travel, and other effects may not be able to be accounted for without more detailed knowledge of the nail surface, and thus this iterative process may be necessary in some embodiments to generate the best possible painting pathway. An image of two human nails with the pathway plotting strategy is shown in the FIG. 156 below.

FIG. 156A is a plan view of a finger of a user overlaid with a pathway plotting strategy.

FIG. 156B is a plan view of a finger of another user overlaid with a pathway plotting strategy.

Once the pathways were configured appropriately, nails may be painted with enamel and/or clear top coat. Images of this process are shown in FIG. 157.

FIG. 157A is a perspective view of a finger of a user during a first stage of painting a nail with enamel based on the pathway plotting strategy.

FIG. 157B is a perspective view of the finger of the user during a second stage of painting the nail with enamel based on the pathway plotting strategy.

FIG. 157C is a perspective view of the finger of the user during a third stage of painting the nail with enamel based on the pathway plotting strategy.

In some embodiments, a nail care system 100 may paint the outline of the region before filling it in. This way, a smooth edge may be established first and then filled in. Filling may be done in a progressive manner to keep the path trajectory in zones where the enamel is as liquid as possible, and in this case, the fill may be performed from the top to bottom in nail shown above.

FIG. 157D is a perspective view of the finger of the user during a first stage of painting a nail with a top coat based on the pathway plotting strategy.

FIG. 157E is a perspective view of the finger of the user during a second stage of painting the nail with the top coat based on the pathway plotting strategy.

FIG. 157F is a perspective view of the finger of the user during a third stage of painting the nail with the top coat based on the pathway plotting strategy.

In some embodiments, a nail care system 100 may follow the same application process for the top coat application. In some embodiments, since the clear coat may dry at a faster rate, speed may be prioritized, and this process may use a wider nozzle, faster flow rate, and/or a lower fill pitch.

Painting a nail repeatedly required constant enamel removal, and in no short order, thinned enamel had seeped into the surrounding areas of the nail that was difficult to remove. Below is an image of a machine painted nail. The paint on the finger to the right of the nail is left over from an earlier removal attempt.

FIG. 158 is a plan view of the finger of the user after the third stage of painting the nail with the top coat based on the pathway plotting strategy.

Cleaning the nail and surrounding area posed to be a problem in some experiments, so in other experiments a replica finger was used with replaceable nails. The replica finger could be cleaned easier and the nails could be replaced—reducing iteration time and generating nicer images. In addition, with the fake finger, the nails could be positioned with more accuracy within the jig.

FIG. 159 is a perspective view of an artificial finger and nail (positioned in the prototype of the mechanical fixture for stabilizing and orienting the finger of the user attached to a prototype jig for the hand/foot rest system 1200) after painting the nail.

Some images of the replica finger after enamel application according to some embodiments are shown below.

FIG. 160A is a perspective view of the artificial finger and nail after painting the nail.

FIG. 160B is a plan view of the artificial finger and nail after painting the nail.

FIG. 160C is a plan view of the artificial finger and nail after painting the nail.

FIG. 160D is a side view of the artificial finger and nail after painting the nail.

Additionally, a nail jig was made to paint sample nails which made the process easier to observe.

FIG. 161A is a perspective view of a nail jig for testing painting the nail.

FIG. 161B is a perspective view of the nail jig during a first stage of painting the nail.

FIG. 161C is a perspective view of the nail jig during a second stage of painting the nail.

FIG. 161D is a perspective view of the nail jig after a third stage of painting the nail.

Samples were made with both the teal (Poolside Service by Essie) and a thinner pale sheer enamel (Ballet Slippers by Essie).

FIG. 162A is a plan view of a first artificial nail painted using the nail jig.

FIG. 162B is a plan view of a second artificial nail painted using the nail jig.

FIG. 162C is a plan view of a third artificial nail painted using the nail jig.

FIG. 162D is a plan view of a fourth artificial nail painted using the nail jig.

FIG. 162E is a plan view of a fifth artificial nail painted using the nail jig.

FIG. 162F is a plan view of a sixth artificial nail painted using the nail jig.

FIG. 162G is a plan view of a seventh artificial nail painted using the nail jig.

FIG. 162H is a plan view of an eighth artificial nail painted using the nail jig.

FIG. 162I is a plan view of a ninth artificial nail painted using the nail jig.

Based on the results of nail painting tests according to some embodiments, automated application of enamel onto the nail using the follower system yields high quality and consistent results.

Cartridge Design

In some embodiments, the nail care system 100 may be a desktop nail painting device and may incorporate a disposable cartridge.

In some embodiments, the nail care system 100 may incorporate a disposable cartridge according to various approaches. For example, two main scenarios may be considered and exemplary pros and cons of each can be considered. In the first set of scenarios, the nail care system 100 may include a fully incorporated cartridge which includes all process disposables into one cartridge. In the second set of scenarios, the nail care system 100 may include system (or sub-system) specific cartridges which include mechanics that are distinct to each process (shaping, removal, and application) that can be interchanged at their own rates.

In some embodiments, an individual package which contains all process disposables (fully incorporated cartridge) may be provided. In some embodiments, there are advantages which can be realized in higher cartridge modularity.

Incorporated Cartridge Concepts

In some embodiments, the cartridge of the nail care system 100 may incorporate all disposables for the three functions (shaping, removal, and application) together. In order to use the same actuation mechanics, a selection device may be included into the system to be able select the appropriate tool. In the embodiment below, the tool is iterated via a rotary turret system.

FIG. 163 is a perspective exploded view of three cartridges of the consumable cartridge/pod system 1600 integrated into the multi-tool system 1900 and held by an end of the mobility mechanism system 1000.

The cartridge may loaded onto a central post of the machine and can be rotated about its axis via an internal ring gear or other driving mechanism. Mechanics within the post may actuate each of the three systems on the disposable when positioned into the active spot—thus sharing the drive system between all functions and keeping costs low. Exemplary pros and cons may include:

| PROS | CONS |
|---|---|
| Customer may only need to load one cartridge at a time. Complexity of re-loading system may be very simple. | Requires extra axis of control to select tool<br>Cartridge may require more structure to accommodate larger physical size. May result in more costs for construction and transportation.<br>Larger bulk may require more power and rigidity from actuation system. Additionally, more space may be required within the working envelope inside the machine.<br>Because of reduced modularity, packages that contain unpopular colors may remain in storage for long periods. This could tie up more capital into inventory.<br>An all in one cartridge may limit the versatility of the machine as the rate of each portion of the consumable may not be balanced.<br>Unused portions of the cartridge may be discarded, and may reduce customer experience.<br>Cartridges may bulky, which may dissuade consumers. |

Incorporated Modular Cartridge

In some embodiments, the cartridge of the nail care system 100 may break the previous concept into a more modular system. This may allow the user to either replace the entire turret (e.g., removal, shaping, and application) all at once, or if they choose, they may also replace individual cartridges if needed. The benefit of this is that it may allow the customer to better control their experience. Complete cartridge turrets may be sold for higher costs, however individual components may also be purchased for lower costs.

FIG. 164 is a perspective exploded view of three cartridges of the consumable cartridge/pod system 1600.

Exemplary pros and cons may include:

| PROS | CONS |
|---|---|
| Simplified turret cartridge may include all needs for one complete manicure.<br>Integrating possible features and upgrades into turret cartridge at the factory may be easy due to modularity.<br>Modularity may reduce the need for large inventory since turrets may be assembled quickly at the factory. The ability to easily swap out colors may make inventory more versatile, and reduce costs tied up in unused stock.<br>A modular cartridge system may give the user more control over how they use the machine, not requiring them to utilize all functionality of the machine at set rates. | May require extra axis of control to select turret position<br>Larger bulk may require more power and rigidity from actuation system. Additionally, more space may be required within the working envelope inside the machine.<br>Cartridge may become more complex |

Individual Cartridge Designs

Individual cartridge systems according to some embodiments may apply a bit more complexity to the user experience, however in doing so, may give the individual much better control over their use of the machine. Since cartridges may be consumed at various rates, the modularity may allow for more control in utilization of the separate functions within the unit.

Additionally, when more materials can be fit within a cartridge, it not only reduces waste, but also may drastically reduce shipping, storage, and additional cartridge costs. For example, an enamel application cartridge may easily fit enough material for multiple uses at almost no additional cost, yet be sold at a much higher price point.

Since the enamel removal cartridge may require more volume per use, extending the use out of this cartridge may not result in as much cost savings, however if one breaks the removal system up into further modularity, one may begin to see similar savings.

Lastly, by separating the cartridges into modular units that target each of the multiple (e.g., three) functions of the machine, it may allow more flexibility in machine design. Since the cartridges may be smaller, the machine may become smaller and less robust. It may also open up the possibility of providing two models: one that just paints nails, and another which paints, shapes, and removes. In this scenario, a more cost-effective machine that just paints nails may entice a larger market which may otherwise not exist with a more costly machine. A modular cartridge design would allow for such a scenario, whereas the all-in-one consumable would need to be re-designed.

Regardless of machine model, cartridges may be sold in a mix of packs which allows users to better tailor their experience.

Enamel Removal Cartridge

In some embodiments, the nail care system 100 may include an enamel removal cartridge. For example, this first enamel removal concept packages the enamel removal componentry along with a reservoir and microfiber roll all into a disposable. Images of the cartridge are illustrated below:

FIG. 165 is a perspective exploded view of an enamel removal cartridge of the consumable cartridge/pod system 1600 for the enamel/polish removal system 300.

The cartridge may snap to the actuation head and a ram may be driven into the reservoir plunger to push acetone out onto the microfiber cloth below. The micro-fiber cloth may be packaged onto a set of spools, which are advanced by a mating spline/socket. Exemplary pros and cons may be as follows:

| PROS | CONS |
|---|---|
| Cartridge may be simple to replace and may not require the user to route the micro-fiber cloth tape or re-fill the acetone. | Cartridge may include the suspension that is spread over the nail. |
| Actuation may be accomplished with mechanics that live on the base machine and may not be included within the disposable. | A large bulk of the cartridge may require a reservoir for the acetone. |

Since a large portion of the cartridge may be taken up from the acetone storage, one variation according to some embodiments is to remove it from the disposable and place a permanent reservoir onto the unit. Acetone is easy to find, and by eliminating it from the supply chain, it may reduce the risks of hazardous chemical storage and shipping logistics. The resulting features of both acetone storage and suspension mechanics will remain permanently on the machine, and only the micro-fiber cloth spools may be contained within the cartridge. Such an embodiment of this idea is illustrated below:

FIG. 166 is a perspective exploded view of a spring loaded scaffolding for the enamel removal cartridge of the consumable cartridge/pod system 1600 for the enamel/polish removal system 300.

Spring loaded scaffolding can be pushed down to allow the microfiber tape to be stretched over the suspension mechanics of the removal head. A simple pump placed in a more remote location can dispense acetone to the removal head. By moving the reservoir to another location within the machine, the actuator head may not need to move around large volumes of liquid thereby reducing the size, power, and cost of the electronic drive systems. The resulting cartridge may become much more compact and multiple uses could be obtained from this system. Exemplary pros and cons may be:

| PROS | CONS |
|---|---|
| Cartridge may be very compact, which could result in more uses from system. | User may be required to fill up reservoir on machine with acetone. |
| Reduced shipping costs and elimination of hazardous material processing may result. | System may require individual to purchase both the cartridge as well as nail polish remover. |
| Nail polish remover is easy to find and already expected as a cost for polish removal. | Nail polish remover may be handled by customer. |
| Removal of fluid reservoir from actuation head may allow for more compact motion envelope. | Potential misuse and handling could result. Introduction of lower-quality or incompatible fluids could interfere with results. |
| Consumable mechanics may be simplified resulting in lower costs for cartridge. | |

Enamel Application Cartridge

In some embodiments, the nail care system 100 may include an enamel application cartridge. For example, depending on the type of application technique (contact or non-contact nozzles), the enamel application cartridge may differ.

In addition to the design of the cartridge, methods of sealing the nozzle tips are presented according to various embodiments. For example, if these cartridges are designed to be utilized for multiple uses, or sit idle for more than a few minutes between uses, their nozzle tips may be sealed and may be an important component of the cartridge or cartridge holder functionality.

Non-Contact Applicator Concepts

This applicator system may be the simplest, and may be essentially a removable syringe with a tapered nozzle on the end. The disposable package may be nearly identical to or similar to a tube of caulk or two-part epoxy dispenser, where the cartridge comes with a plunger already installed. This plunger may form a sliding seal against the inside walls of the tube as it is advanced along.

FIG. 167 is a partial cutaway side view of an enamel reservoir for the enamel removal cartridge of the consumable cartridge/pod system 1600 for the enamel/polish removal system 300.

FIG. 168 is a partial cutaway exploded side view of a ram engaging the enamel reservoir for the enamel removal cartridge of the consumable cartridge/pod system 1600 for the enamel/polish removal system 300.

To push out the enamel, the nail care system 100 may apply a force onto the plunger via a ram. Since the nozzle and reservoir are incorporated into the same unit, no cleaning may be necessary when switching colors or enamel types. A concept where selectable colors or enamel cartridges can be loaded into a magazine is illustrated below:

FIG. 169 is a perspective view of a color magazine for holding a plurality of cartridges driven by a motor and gear for the consumable cartridge/pod system 1600 for the enamel/polish application system 600.

In this scenario, to select a color, the ram of the nail care system 100 may retract, rotate to the position in which the desired cartridge is, and then extend back down against the plunger to begin flow from the nozzle.

Contact/Follower Cartridge Concept

In some embodiments, enamel application of the nail care system 100 may include a conceptual follower cartridge. It may use a similar design as the enamel cartridge described above, except that the fluid may be conveyed through a thinner conduit member which has a small flexible member at its root. This flexible section may allow the tube to rotate about this connection.

FIG. 170 is a perspective view of a reservoir to be engaged with a ram, a flexible member, a tube, and a nozzle for the consumable cartridge/pod system 1600 for the enamel/polish application system 600.

At the end of the conduit may be a bend, which may direct the flow downward and out the nozzle. The size and durometer of the flexible member may be such that when left alone the nozzle may return back to its neutral location, however when pressed against, it may be allowed to translate upwards towards the reservoir. An interior slot may constrain this motion along a plane.

FIG. 171 is a perspective view of a geared ram for the reservoir to be engaged with the geared ram, the flexible member, the tube, and the nozzle for the consumable cartridge/pod system 1600 for the enamel/polish application system 600.

When the cartridge is inserted into a machine, a retractable ram of the nail care system 100 may be driven into the back of the plunger, which may be installed at the factory. As the ram is progressed forward, fluid may be pushed out of the tip. Since the cartridge may incorporate the reservoir, suspension system, and nozzle into the same unit, no cleaning or system flushing may be necessary when changing between colors, and may be simple enough to be discarded.

Suspension tuning may be set at the factory and may be protected against accidental damage since the delivery system may be shrouded within the cartridge enclosure.

FIG. 172 is a perspective view of an applicator tray for holding a pair of cartridges for the consumable cartridge/pod system 1600 for the enamel/polish application system 600.

Multiple cartridges can be loaded into the actuated applicator tray according to some embodiments so that different colors or enamel types can be used during the manicure process.

Application Head Sealing

Both cartridge concepts presented in the embodiments above incorporate the nozzle, fluid delivery, and reservoir into one disposable unit. This may be done in some embodiments, for example, because cleaning some of these systems is either too laborious, or may not result in the cleanliness one would hope to achieve. For example, when different enamels are never mixed, it allows the provider to fully control the color and fluid characteristics.

For instance, if nail polish remover is flushed through a nozzle in an effort to clean, any residual thinner may affect the look and viscosity of the next enamel dispensed. On top of this, flushing a system is not perfect and many times residual colors may be left to bleed into the next batch of enamel that passes through.

By keeping the flow path mechanics paired with their individual enamel type, more consistent application may be achieved and/or the need for flushing materials and/or flushing mechanics may be eliminated or reduced. Because no system flushing may occur according to some embodiments, nozzle sealing may become more important if one wishes to use the cartridges over extended periods of time (e.g., more than one use).

Nozzle sealing may prevent the enamel within the delivery system from being exposed to air which may dry out the enamel and clog the tip. Three concepts for nozzle sealing according to some embodiments are presented below.

FIG. 173A is a side cross-sectional view of a first nozzle sealing/opening system prior to a needle engaging with a clogged nozzle for the enamel/polish application system 600.

FIG. 173B is a side cross-sectional view of the first nozzle sealing/opening system after the needle engages with the clogged nozzle for the enamel/polish application system 600

This first implementation according to some embodiments uses a conical depression which is spring loaded at the base. As the nozzle is lowered into the cone, it first centers the nozzle into the center of the cone, and then as more pressure is applied, a pin is pushed up into the orifice to further seal it and keep the tip free from clogging. When removed, the nozzle may need to undergo a small amount of cleaning on its exterior, however a simple wiping process may suffice.

The second implementation according to some embodiments presents a septum piercing in which the nozzle is driven either into or through a thin membrane. In the illustration below, the nozzle is immersed in removal fluid, however even something like a soft-rubber block could be used in other embodiments.

FIG. 174A is a side cross-sectional view of a second nozzle sealing/opening system prior to inserting a clogged nozzle into a reservoir of enamel thinner for the enamel/polish application system 600.

FIG. 174B is a side cross-sectional view of the second nozzle sealing/opening system after inserting the clogged nozzle into the reservoir of the enamel thinner for the enamel/polish application system 600.

Depending on the design of the septum, the insertion or removal of the nozzle may wipe away enamel from the tip and provide a ready applicator to work with.

This last implementation according to some embodiments may be resident on the cartridge itself and may be a door type sealing system. When the cartridge is not being used, the door may be sprung shut and may only be opened when in use. Actuation of the door may be accomplished with a simple mechanical interlock such as a pin or other device.

FIG. 175A is a side cross-sectional view of a third nozzle sealing/opening system with a swing door and rubber pad in an open position relative to the nozzle for the enamel/polish application system 600.

FIG. 175B is a side cross-sectional view of the third nozzle sealing/opening system with the swing door and rubber pad in a closed position relative to the nozzle for the enamel/polish application system 600.

In accordance with this embodiment, nozzle sealing and/or a wiping around the exterior of the nozzle may be provided.

On-Board Cartridge Selection & Storage

In some embodiments, in order to reduce actuation mass as much as possible, an embodiment that utilizes the modular cartridge concept may include a selection device that can move over to the desired tool and select it for operation. Each tool may have a common mating receptacle, which could potentially be engaged and disengaged using the actuation already built into the machine. This may be a practical way to reduce the bulk of the moving head and required envelope of the robot.

FIG. 176 is a perspective, exploded view of a ram and a ram drive motor mounted on a gantry system for selective engagement with an application head of the enamel/polish application system 600, a removal head of the enamel/polish removal system 300, and a shaping head of the nail shaping system 400.

Extrapolating this embodiment further, in some embodiments it could even allow for extra storage within the machine in which the system could maintain a stock of disposables in a series of magazines. Such an embodiment is illustrated below:

FIG. 177 is a perspective, exploded view of the ram and the ram drive motor mounted on the gantry system for selective engagement with one of a plurality of application heads of the enamel/polish application system 600, one of a plurality of removal heads of the enamel/polish removal system 300, and one of a plurality of shaping heads of the nail shaping system 400.

Such an embodiment may simplify the user experience since, for example, a user could easily see how many cartridges they have left, as well as providing them a place to store unspent material. Exemplary pros and cons are as follows:

| PROS | CONS |
| --- | --- |
| Direct cartridge replacement may not need to be performed by the user. | Magazine storage may increase size of machine. |
| Disposables may be purchased in bulk and stored in the machine. | Tool connection operation may require more precision with consumables. |
| The magazines may allow the user to keep track of consumables on a more pro-active fashion. | Storage may increase costs and complexity. |

Conclusions

Thus is it seen that a nail care system 100 and corresponding method are provided that includes one or more (e.g., all) of the following sub-systems of a manicure administering robotic platform: vision system, enamel removal, nail shaping and enamel application.

APPENDIX A: ROBOTIC PLATFORM RESEARCH AND SELECTION

To prevent the limitation of testing capabilities, a platform which would offer as many degrees of freedom with a high level or accuracy was sought to be selected.

A six degree of freedom (6-DOF) robotic arm was seen as an attractive platform to allow the applicators under test to be easily positioned in both space and orientation. The task of selecting a robotic arm was dependent upon cost, lead time, accuracy, documentation, and ease of programming. Other robotic arms can be used in other embodiments, including the ones identified below. A list of nearly thirty 6-DOF miniature robotic arms were identified and possible candidates were narrowed down into the list below:

| MFG | NAME | REACH (mm) | PAYLOAD (g) | DOF | IK | Acc/Rep (mm) |
| --- | --- | --- | --- | --- | --- | --- |
| MECADEMIC | Meca500 | 260 | 500 | 6 | Yes | 0.1/0.005 |
| DENSO | VP-6242GM | 400 | 2500 | 6 | | ±0.02 mm |
| YASKAWA | MOTO MINI | 350 | 500 | 6 | | ±0.02 mm |
| YASKAWA | MHJF | 545 | 2000 | 6 | | ±0.03 mm |
| YASKAWA | MH3F | 532 | 3000 | 6 | | ±0.03 mm |
| KUKA | KR 3 AGILUS | 541 | 3000 | 6 | | ±0.02 mm |
| STAUBLI | TX-40 | 515 | 2300 | 6 | | ±0.02 mm |
| ACROME | ACROBOT 6-DOF | N/A | 2000 | 6 | | ±0.1 mm |
| DORNA | DORNA | 450 | 1000 | 5 | | 0.005" |
| UNIVERSAL | UR3 | 500 | 3000 | | | ±0.1 mm |
| ROBOTIS 6-AXIS | MANIPULATOR-H | 645 | 3000 | 6 | | N/A |

-continued

| MFG | NAME | REACH (mm) | PAYLOAD (g) | DOF | IK | Acc/Rep (mm) |
|---|---|---|---|---|---|---|
| X-ARM 7 | | | | | | |
| Parker | XRS | | | | | |
| FANUC | M-1IA/0.5A | 280 | 500 | 6 | | |
| FANUC | LR MATE 200ID/45 | 550 | 4000 | 6 | | |
| FANUC | SR-3IA | | | | | |

Further investigation revealed that the Meca500 arm from Mecademic had superior documentation, which is incorporated by reference herein in its entirety, an option to use an on-board inverse kinematics solver for trajectory planning, and was less expensive than most of the other arms.

FIG. 178 is a screenshot of a control window for the prototype of the mobility mechanism system 1000 of FIG. 117.

APPENDIX B: ENAMEL REMOVAL TOOL DIMENSIONS

| Symbol | Value | Units |
|---|---|---|
| $f_w$ | 2 | mm |
| $f_l$ | 23.4 | mm |
| $f_t$ | 1.6 | mm |
| $f_s$ | 6.4 | mm |
| $f_o$ | 0.8 | mm |
| $W_{lf}$ | 8 | mm |
| $L_t$ | 12.8 | mm |
| $\beta$ | 20 | ° |
| $r_{1t}$ | 10.4 | mm |
| $P_o$ | 0.9 | mm |
| $P_{snl}$ | 0.25 | in |
| $P_{so}$ | 0.01 | in |
| $P_{sk}$ | 15.21 | lb/in |

APPENDIX C: BRUSH APPLICATORS

The size of the contact patch of the brush may be highly dependent upon brush orientation and height above the surface, both of which may have to be carefully controlled. In addition, the curved surface of the nail may further complicate the control of the brush.

The potential of a dynamic brush shape and need for real-time visual feedback were major concerns with brush applicators.

Testing of four different brushes for use according to various embodiments of a nail care system 100 took place and the results are included below:

Soft Nylon Brush

A highly flexible nylon brush was used to apply enamel. The results of this applicator were similar to that of nail polish brush.

FIG. 179 is a perspective view of a nylon brush tip of the enamel/polish application system 600.

FIG. 180A is a close-up perspective view of the nylon brush tip of the enamel/polish application system 600.

FIG. 180B is a plan view of painting results of the nylon brush tip of the enamel/polish application system 600 after applying a single coat.

FIG. 180C is a close-up perspective view of the nylon brush tip of the enamel/polish application system 600.

FIG. 180D is a plan view of painting results of the nylon brush tip of the enamel/polish application system 600 after applying a double coat.

Short-bristled Makeup Brush

A short-bristled brush was tested to see if shorter bristles could produce desirable results. Most nail polish brushes have long bristles which are likely to reduce application pressure, however by shortening the bristles greater edge precision may be achieved.

FIG. 181A is a perspective view of a makeup brush of the enamel/polish application system 600.

FIG. 181B is a plan view of painting results of the makeup brush of the enamel/polish application system 600 after applying a single coat with light pressure.

FIG. 181C is a perspective view of the painting results of the makeup brush of the enamel/polish application system 600 after applying the single coat with light pressure.

FIG. 181D is a perspective view of the makeup brush of the enamel/polish application system 600.

FIG. 181E is a plan view of painting results of the makeup brush of the enamel/polish application system 600 after applying a double coat with light pressure.

FIG. 181F is a perspective view of the painting results of the makeup brush of the enamel/polish application system 600 after applying the double coat with light pressure.

FIG. 181G is a perspective view of the makeup brush of the enamel/polish application system 600.

FIG. 181H is a plan view of painting results of the makeup brush of the enamel/polish application system 600 after applying a single coat with medium pressure.

FIG. 181I is a perspective view of the makeup brush of the enamel/polish application system 600.

FIG. 181J is a plan view of painting results of the makeup brush of the enamel/polish application system 600 after applying a double coat with medium pressure.

FIG. 181K is a perspective view of the makeup brush of the enamel/polish application system 600.

FIG. 181L is a plan view of painting results of the makeup brush of the enamel/polish application system 600 after applying enamel with a blotting method.

Nail Polish Brush

A nail polish brush was attached to the robot head and translated along a flat surface.

FIG. 182 is a perspective view of a nail polish brush attached to the prototype of the mobility mechanism system 1000 of FIG. 117.

The brush was pulled along two slightly-overlapping parallel paths similar to how a nail technician might apply polish on a nail. The results are shown below, and although the edges in many places are somewhat even, there may be occasional deviations. Additionally, pools of polish may be visible in some embodiments near the landing and retraction points (beginning and end of the strokes). Lastly, if not controlled the application may leave behind undesirable streaks.

Although a second coating may fix the streaking, the lack of edge control may remain in some embodiments.

FIG. 183A is a side view of the nail polish brush of the enamel/polish application system 600.

FIG. 183B is a plan view of first painting results of the nail polish brush of the enamel/polish application system 600 after applying enamel at a relatively slow speed with a linear robotic movement of the mobility mechanism system 1000.

FIG. 183C is a plan view of second painting results of the nail polish brush of the enamel/polish application system 600 after applying enamel at a relatively slow speed with a linear robotic movement of the mobility mechanism system 1000.

FIG. 183D is a side view of the nail polish brush of the enamel/polish application system 600.

FIG. 183E is a plan view of third painting results of the nail polish brush of the enamel/polish application system 600 after applying enamel at a relatively fast speed with the linear robotic movement of the mobility mechanism system 1000.

Low-Force Spreading Applicators

A nail polish brush was analyzed to determine the forces and resulting pressure that was placed upon the fingernail during typical use. The brush was loaded in a typical manner and the force and associated contact patch was measured.

FIG. 184A is a top view of a low-force spreading applicator of the enamel/polish application system 600.

FIG. 184B is a side view of brush bristles of the low-force spreading applicator of the enamel/polish application system 600 spreading nail polish.

At a downforce (F r) of 1 gram (which seemed typical for polish application), the contact patch formed by the empty brush measured approximately 6.5 $mm^2$ resulting in an average pressure of approximately 0.15 $g/mm^2$. The bristles of the brush allow the user or nail care system 100 to modulate this downforce in a controlled manner because their long length and results in a low spring constant. By placing the brush at a set height from the nail, the user can establish a given force upon the nail. Additionally, as the brush is pushed further down, the bristles will fan out and consume a larger contact patch, thereby limiting the contact pressure in the region optimal for polish application.

In order to simulate the minute forces generated from a nail polish brush during use, a series of applicators were developed to replicate some of these forces.

Free-Sliding Pin Array

The intent of the free-sliding pin concept is to replicate the minimal pressure of a brush with a more controllable rigid array. A series of small gauge tubes were pressed into a block, which allowed smaller pins to be placed within. The pins were free to slide down the interior of the tubes.

FIG. 185A is a side perspective view of a free-sliding pin array of the enamel/polish application system 600.

FIG. 185B is an end perspective view of the free-sliding pin array of the enamel/polish application system 600.

Nail polish was dispensed onto a slide and the free-sliding pin array was used to spread the enamel around onto a glass slide. Different motions were tried resulting in the images below:

FIG. 186A is a plan view of first painting results of the free-sliding pin array of the enamel/polish application system 600 using swirling motions.

FIG. 186B is a plan view of second painting results of the free-sliding pin array of the enamel/polish application system 600 using swirling motions.

FIG. 186C is a plan view of third painting results of the free-sliding pin array of the enamel/polish application system 600 using relatively tighter swirling motions.

FIG. 186D is a plan view of fourth painting results of the free-sliding pin array of the enamel/polish application system 600 using back and forth motions.

FIG. 186E is a plan view of fifth painting results of the free-sliding pin array of the enamel/polish application system 600 using relatively long sweeping motions.

FIG. 186F is a plan view of sixth painting results of the free-sliding pin array of the enamel/polish application system 600 using relatively long sweeping motions.

FIG. 186G is a plan view of seventh painting results of the free-sliding pin array of the enamel/polish application system 600 using zig-zag motions.

FIG. 186H is a plan view of eighth painting results of the free-sliding pin array of the enamel/polish application system 600 using zig-zag motions.

FIG. 186I is a plan view of ninth painting results of the free-sliding pin array of the enamel/polish application system 600 using zig-zag motions.

Although the free-sliding pin array left clear streaks in some instances, it performed fairly well and even left some impressively uniform zones.

Gravity-Driven End Effectors

Similar to the pin array above, these effectors were kept against the nail bed via gravity and the tool tips were allowed to translate freely in the z-direction by utilizing a telescoping tube design. Their masses were kept to a minimum to reduce force.

FIG. 187A is a perspective view of a gravity-driven end effector with a relatively soft smooth rubber tip of the enamel/polish application system 600.

FIG. 187B is a plan view of first painting results using the gravity-driven end effector with the relatively soft smooth rubber tip of the enamel/polish application system 600.

FIG. 187C is a plan view of second painting results using the gravity-driven end effector with the relatively soft smooth rubber tip of the enamel/polish application system 600.

FIG. 187D is a perspective view of the gravity-driven end effector with a textured rubber tip of the enamel/polish application system 600.

FIG. 187E is a plan view of first painting results using the gravity-driven end effector with the textured rubber tip of the enamel/polish application system 600.

FIG. 187F is a plan view of second painting results using the gravity-driven end effector with the textured rubber tip of the enamel/polish application system 600.

FIG. 187G is a perspective view of a micro-brush tip of the enamel/polish application system 600.

FIG. 187H is a perspective view of the gravity-driven end effector with the micro-brush tip of the enamel/polish application system 600.

FIG. 187I is a plan view of first painting results using the gravity-driven end effector with the micro-brush tip of the enamel/polish application system 600.

FIG. 187J is a plan view of second painting results using the gravity-driven end effector with the micro-brush tip of the enamel/polish application system 600.

FIG. 187K is a perspective view of a gravity-driven rod of the enamel/polish application system 600.

FIG. 187L is a plan view of painting results using the gravity-driven rod of the enamel/polish application system 600.

FIG. 187M is a perspective view of a gravity-driven wedge of the enamel/polish application system 600.

FIG. 187N is a plan view of painting results using the gravity-driven wedge of the enamel/polish application system 600.

FIG. 187O is a perspective view of the gravity-driven end effector with a gravity-driven squeegee of the enamel/polish application system 600.

FIG. 187P is a plan view of painting results using the gravity-driven end effector with the gravity-driven squeegee of the enamel/polish application system 600.

APPENDIX D: OTHER SPREADING METHODS ACCORDING TO VARIOUS EMBODIMENTS

Air Spreading

Air spreading pushed the enamel around with a concentrated jet of air. Although air spreading was more effective than anticipated, the accelerated drying speed may make spreading more difficult as time passes. Low pressures may be more controllable; however, this method if not controlled may exhibit unreliable edge control.

FIG. 188A is a perspective view of enamel before application of an air spreading technique.

FIG. 188B is a perspective view of the enamel after before application of the air spreading technique.

In various embodiments, a nail care system 100 may control the shape of deposition of enamel with air (e.g., in circumstances where areas need to be touched up and/or preventing enamel from flowing in certain directions). Alternatively or additionally, the nail care system 100 may use a concentrated jet of air to, for example, expedite drying time, which could be beneficial to application.

Cut and Paste

In various embodiments, a nail care system 100 may use cured nail polish (e.g., cured nail polish in flat sheets, cut out, and then fixed to the fingernail). The cutout may be bent over a complex surface of the nail.

The nail care system 100 may in some embodiments apply nail polish remover to soften the base of the cutout before application onto the nail. In some embodiments, the nail care system 100 may apply a thin layer of nail polish to the nail prior to placing the cutouts down.

In some embodiments, the nail care system 100 can then reflow the nail polish layer with heat or placed into an oven prior to application.

FIG. 189A is a plan view of a square-shaped cut-and-paste enamel section applied to a flat surface.

FIG. 189B is a plan view of a custom-shaped cut-and-paste enamel section applied to an artificial nail.

FIG. 189: A) a square cutout that was applied to a flat surface—note the rippling on the surface. B) Another dried cutout applied to an acrylic nail. Note the uneven surface reflections and chipping along the edges.

Stamping and Pad Printing

The nail care system 100 may in some embodiments use stamping or pad printing. Ink transfers, with pad printing technology, may be used. These may use lower viscosity acrylic inks to generate high resolution prints, but may have longer drying times. Pad printing with nail polish and pad printing tools may be used.

Sponge application according to some embodiments may yield more uniform coloring. When multiple coatings are performed, the color may become deeper. Output from the experiments conducted are shown below.

FIG. 190A is a perspective view of a nail art pad printer of the enamel/polish application system 600.

FIG. 190B is a plan view of first painting results using the nail art pad printer of the enamel/polish application system 600.

FIG. 190C is a plan view of second painting results using the nail art pad printer of the enamel/polish application system 600.

FIG. 190D is a perspective view of an open cell foam pad of the enamel/polish application system 600.

FIG. 190E is a plan view of first painting results using the open cell foam pad of the enamel/polish application system 600 on a planar surface.

FIG. 190F is a perspective view of second painting results using the open cell foam pad of the enamel/polish application system 600 on an artificial nail.

Fountain Pen

The nail care system 100 may in some embodiments use a fountain pen tip (or similar) for application. A series of fountain pen tips were acquired and dipped into nail polish in an attempt to apply the polish in a controlled fashion. The metal nibs did work for a short time of use, though may need periodic cleaning to avoid becoming clogged.

FIG. 191A is a perspective view of a first fountain pen style tip of the enamel/polish application system 600.

FIG. 191B is a perspective view of a second fountain pen style tip of the enamel/polish application system 600.

Felt Tip Applicators

The nail care system 100 may in some embodiments use a felt tip (or similar) applicator. For example, this method as tested used a tip with tiny capillary tubes within to allow ink to flow towards the tip. These are common in paint markers that have low viscosity. Two types were used—one was advertised as a nail art applicator pen, and another was a commercially available paint pen.

FIG. 192A is a perspective view of a first felt tip of the enamel/polish application system 600.

FIG. 192B is a perspective view of a second felt tip of the enamel/polish application system 600.

Both performed well when used to create an initial layer of paint, though monitoring of down force and clog prevention may be needed to according to some embodiments.

Pin Grid Applicators

The nail care system 100 may in some embodiments use a pin grid applicator. For example, a small array of 0.020" diameter holes were drilled into a block or Delrin placed 0.030" apart. 0.02" Diameter pins were inserted into the holes to create a three-sided square shape as shown below. The grid of pins was then placed into a puddle of polish and then "stamped" onto a glass slide leaving behind the "C" character we see on the right.

FIG. 193A is a perspective view of a pin grid applicator of the enamel/polish application system 600.

FIG. 193B is a plan view of painting results using the pin grid applicator of the enamel/polish application system 600.

This exploration demonstrated how well a shape could be created by a small array of pins.

APPENDIX E: VIBRATORY SPREADING

The nail care system 100 may in some embodiments use vibratory movement for nail polish application.

For example, to test this effect, enamel was placed onto a piezoelectric buzzer diaphragm to observe the effects in which high frequency oscillations might affect the fluid. Droplets of enamel were placed on the diaphragm and images were taken before, during, and after a short period of speaker modulation.

FIG. 194A is a perspective view of enamel prior to vibratory spreading for the enamel/polish application system 600.

FIG. 194B is a perspective view of the enamel during the vibratory spreading for the enamel/polish application system 600.

FIG. 194C is a perspective view of the enamel after the vibratory spreading for the enamel/polish application system 600.

FIG. 194: A nail polish drop applied on a relatively flat surface. A) Nail polish droplet before vibration B) Droplet during vibration. Note the halo shape at center. C) The droplet shortly after vibration ends. Note how halo is gone.

FIG. 195A is a perspective view of enamel on a steeply angled surface prior to vibratory spreading for the enamel/polish application system 600.

FIG. 195B is a perspective view of the enamel on the steeply angled surface during the vibratory spreading for the enamel/polish application system 600.

FIG. 195C is a perspective view of the enamel on the steeply angled surface after the vibratory spreading for the enamel/polish application system 600.

FIG. 195: A nail polish drop applied on a steeply angled surface. A) Nail polish droplet before vibration B) Droplet during vibration. Note the surface reflections indicated a slight surface change. C) The droplet shortly after vibration ends. Note how the surface returns to near original shape.

Two agitation heads were developed and fitted over an extrusion nozzle. The design according to some embodiments is simply a coil wrapped around a floating mandrel that slides about the interior shaft which enamel is dispensed from. On the interior of the device is an axially magnetized hollow, cylindrical magnet. Depending on the direction of current passed through the coil it either pushes the mandrel up or pulls it down. When cycled repeatedly, the oscillations create localized vibrations within the dispensed enamel.

FIG. 196 is an exploded perspective view of components of a vibratory spreading system of the enamel/polish application system 600.

The oscillation tip was affixed to the robot and square deposition. Tests illustrated that vibration/agitation of the enamel had a positive effect on surface finish.

FIG. 197A is a perspective view of painting results using the basic nozzle tip of the enamel/polish application system 600.

FIG. 197B is a perspective view of painting results using the vibratory spreading system of the enamel/polish application system 600.

FIG. 197: (A) A square enamel application using the basic extrusion nozzle system. (B) The same enamel application routine, however this time the vibratory tip was engaged. Note the reduction in pathway artifacts.

Additional Embodiments

In some embodiments, the nail care system 100 may include some or all of the foregoing features, and/or one or more additional features.

Computing and Architectural

In some embodiments, the nail care system 100 may include one or more processors (e.g., as part of one or more robots) that control or influence one or more (e.g., all) of enamel removal, cuticle management, nail shaping, enamel application (e.g., multiple enamel coats or top and bottom coat application).

In some embodiments, the nail care system 100 may be controlled by one or more processing operations (e.g., remote computation) that may be performed by a connected device (e.g., cloud computer or user's mobile device). For example, in some embodiments, processing of fingernail images may be performed on remote computers (e.g., one or more servers in the cloud).

In some embodiments, the nail care system 100 may be designed so that one or more of the consumables required for a manicure may be readily acquired by the typical consumer. For example, the nail care system 100 may have a reservoir for nail polish remover that the user can refill. In some embodiments, there may be a limited number of acceptable products (e.g., one, two, or all available)

In some embodiments, all consumables required for a manicure may be included in one package (e.g., a robotically accessible package) or a multiple packages (e.g., a multitude of robotically accessible packages), or multiple packages and user-refillable or -replaceable reservoirs and/or components.

In some embodiments, the apparatus may be designed to automatically eject or combine and eject consumables. This may allow for easier cleanup and/or disposal of consumables and/or may provide a more pleasing user experience.

In some embodiments, the nail care system 100 may communicate information about consumables (for example, color, viscosity, number of coats required, age of this particular consumable item, number of times this consumable has been used, or other special handling or processing requirements) to the robotic platform using information embedded in the disposable cartridge.

In some embodiments, the nail care system 100 may modify one or more application parameters based on the information regarding one or more characteristics. For example, in some embodiments, one or more processors of the nail care system 100 may run one or more algorithms to inform when other algorithms should double check initial fingernail boundary identification outputs. In some embodiments, one or more processors of the nail care system 100 may run one or more algorithms to inform when humans should double check fingernail boundary identification outputs. In various embodiments, one or more algorithms may modify nearly any parameter of one or more functional modules (e.g., Removal, Shaping, Cuticle Management, Application of Enamel). For example, the speed, direction, pressure and/or path taken by the Removal tool may in some embodiments vary based on various characteristics of the user's nail(s), for example, length, thickness, overall size, amount of material to be removed, and so on. Similar techniques, applied as appropriate, may apply to all functions of the apparatus in various embodiments.

In some embodiments, the nail care system 100 may communicate with a user's mobile or other device (e.g., computer, phone, or tablet, such as an application running thereon) such that a user can verify or modify output or one or more characteristics of the nail care system 100 using the user's mobile device.

In some embodiments, the nail care system 100 may communicate with a remote computer (e.g., cloud server computer) such that an operator (e.g., employee) can verify or modify output or one or more characteristics of the nail care system 100 remotely.

In some embodiments, the nail care system 100 may run an algorithm for identifying when a user is missing one or more fingers or nails or when one or more of a user's fingers or nails are not within operating limits of the apparatus (e.g., missing, having dimensions significantly different from normal, or being oriented in a sufficiently unusual manner).

In some embodiments, the nail care system 100 may develop and store data that improves or informs the identification of a particular person's nails and/or an archetype of finger nails.

In some embodiments, the nail care system 100 may scan and image nails multiple times prior to the first application of enamel (or other operation of the nail care system 100) and/or prior to other applications of enamel (or other operation(s) of the nail care system 100).

In some embodiments, the nail care system 100 may implement functionality that allows someone to choose to skip steps of a robotic/automated manicure or to apply steps to only some (e.g., one or all) of the user's fingers/nails.

In some embodiments, the nail care system 100 may implement functionality that allows someone to choose to repeat or extend steps of a robotic/automated manicure or to repeat or extend steps to only some (e.g., one or all) of the user's fingers/nails.

In some embodiments, marketing or content may be targeted to user(s) based on nail characteristics or consumable preferences (e.g., characteristics and/or preferences input to or learned by the nail care system 100). The system 100 may be configured to store user preference information. The user preferences may include one or more of steps the user chooses to skip, important features of the user's hand (e.g., missing/extra digits, for example), a user inventory of consumable pods, purchase history, use history, and the like. Anonymized user data and metadata may be collected and aggregated for statistical analysis.

In some embodiments, the nail care system 100 may perform methods for mapping 2D patterns (e.g., logos or images) onto the 3D nail surface.

In some embodiments, the nail care system 100 may communicate with one or more remote computers for remote (cloud based) verification of cartridges/disposables.

In some embodiments, the nail care system 100 and/or one or more remote and/or connected computers may register the invalidation of a consumable or cartridge (or corresponding unique identifier) upon consumption (e.g., physical or cartridge based, and/or via storage in data for an application).

In some embodiments, the nail care system 100 may locally (e.g., by the nail care system 100 or connected device) verify cartridges/disposables.

In some embodiments, the nail care system 100 and/or one or more remote and/or connected computers may compile and store data regarding prior colors/application packages used or preferred (e.g., by a single user and/or by aggregated users).

In some embodiments, the nail care system 100 and/or one or more remote and/or connected computers may compile and store data regarding purchase and use of consumables.

Vision System

In some embodiments, the nail care system 100 may use its vision system and may run one or more algorithms that differentiate fingernails from fingers (e.g., boundary and curvature) (e.g., using structured light, one or more frequencies of light, based on a positioning of one or more lights, using normal maps, based on a positioning of one or more camera(s), through actuation of camera(s), using different light sources (position) to achieve better imaging, and/or using a method that combines or prioritizes estimates from two or more of the above methods to improve estimates).

In some embodiments, the nail care system 100 may be used to run an algorithm that plans robotic actuation based on images/knowledge of finger nail (e.g., a method for refining an estimate for the above region into a smooth paintable region, a method for refining an estimate for the above region into a smooth path for shaping, using knowledge of prior nail observations, and/or using knowledge of shapes of other finger nails).

In some embodiments, the vision system of the nail care system 100 may generate structured light In some embodiments, the vision system of the nail care system 100 may adjust structured light to create alternative data.

In some embodiments, the vision system of the nail care system 100 may use multiple sources of light.

In some embodiments, the vision system of the nail care system 100 may use different frequencies of light (including light beyond typical human visual capabilities such as, for example infrared or ultraviolet light).

In some embodiments, the vision system of the nail care system 100 may move one or more sources of light in predetermined or random ways.

In some embodiments, the vision system of the nail care system 100 may illuminate one or more different sources of light according to a predetermined pattern or at random in order to, for example, provide time-sequenced illumination of one or more fingers.

In some embodiments one or more masks may be used to create a pattern of light.

In some embodiments, one or more reflectors may be used to generate a particular pattern of light.

In various embodiments, the vision system of the nail care system 100 may use one or more (e.g., all) of the above techniques singly and/or in combination in order to generate light. For example, structured light may be generated in some embodiments using multiple light sources, or may be emitted in multiple frequencies, including frequencies beyond the typical human visual range. As another example, in some embodiments, one or more light sources may be used with one or more masks and/or one or more reflectors.

In some embodiments, the vision system of the nail care system 100 may be used to run an algorithm to assess enamel removal completeness.

In some embodiments, the vision system of the nail care system 100 may be used to train or run a trained algorithm to differentiate fingernails from fingers based on labeled examples. In some embodiments, the vision system of the nail care system 100 may be used to determine presence, location, and/or orientation of one or more fingers or and/or nails.

In some embodiments, the vision system may be used to run algorithms to allow other components to compensate for motions of or ore more of the user's fingers and/or the user's hand.

In some embodiments, the vision system may be used to determine which hand is present (left or right).

In some embodiments, the vision system may be used to determine the presence of objects (e.g., rings, nail appliques, decorative objects, and/or any other material than finger flesh and nail).

In some embodiments, the vision system may be used to determine when a user has put a hand into the apparatus.

In some embodiments, the vision system may be used to determine whether a hand or some other object has been placed into the apparatus.

In some embodiments, the vision system may be used to determine skin tones and/or pigmentation in order, for example, to suggest particular nail polish colors or types of application (e.g., French manicure, "naked" manicure, etc.).

In some embodiments, the vision system may be used to determine finger morphology (e.g., short, slender, long, spatulate, etc.) in order to, for example, make manicure recommendations to the user (e.g., nail polish colors, French manicure, "naked" manicure, etc.).

Nail Shaping

In some embodiments, the nail shaping system of the nail care system 100 may include an oscillating, reciprocating, and/or rotating shaper on a robot (e.g., an oscillating, reciprocating, and/or rotating shaper with disposables able to be changed by robot). In some embodiments, the nail shaping system of the nail care system 100 may include one or more compliant components (e.g., springs, foam, elastomers) applying pressure to an oscillating shaper.

In some embodiments, the nail care system 100 may monitor current and/or back EMF drawn by a shaping tool motor (e.g., to inform or adjust nail shaping and/or to inform nail shaping progress).

In some embodiments, the nail care system 100 may use an encoder (e.g., optical, magnetic, potentiometric) to provide determination of orientation and/or rotational velocity of the shaping element (e.g., to inform or adjust nail shaping and/or to inform nail shaping progress).

In some embodiments, the nail care system 100 may use a motor (e.g., a brushless AC or DC motor) that inherently supplies encoder information (e.g., to inform or adjust nail shaping and/or to inform nail shaping progress).

In some embodiments, the nail care system 100 may monitor the position of the shaping element in space (e.g., in order to inform or adjust nail shaping and/or to inform nail shaping progress). This may be accomplished by, for example, using absolute or relative encoders on some or all members of the actuation system or, for example, by using components of the vision system (or other specifically purposed vision elements) to optically locate the shaping element, or, for example, by sensing of a magnetic element located with a known relationship to the shaping element, or, for example, by the use of a capacitive sensor to locate the shaping element or a capacitive target located with a known relationship to the shaping element.

In some embodiments, the nail care system 100 may monitor force applied by the shaping tool (e.g., in order to inform or adjust nail shaping and/or to inform nail shaping progress).

In some embodiments, the nail care system 100 may monitor the length of time expended during the shaping process (e.g., in order to inform or adjust nail shaping and/or to inform nail shaping progress).

In some embodiments, the nail care system 100 may use one or more components of the vision system (e.g., LEDs, one or more cameras, structured light, or other components) during the shaping process (e.g., in order to inform or adjust nail shaping and/or to inform nail shaping progress).

Enamel Application

In some embodiments, the enamel application system of the nail care system 100 may include an extrusion nozzle for nail polish or other consumable application.

In some embodiments, the enamel application system of the nail care system 100 may include a flexible extrusion nozzle that follows the geometry of the nail where error may occur.

In some embodiments, the extrusion nozzle may be designed to permit flow both out of and into the nozzle.

In some embodiments, the enamel application system of the nail care system 100 may run a program that suspends the application system, so that the entire system can deflect to follow the contour of the nail.

In some embodiments, the enamel application system of the nail care system 100 may utilize one or more cartridges or user-replaceable and/or refillable components.

In some embodiments, the enamel application system of the nail care system 100 may perform a method for sealing, storing nozzles, and/or otherwise preventing curing/clotting in tip or tubes.

In some embodiments, the enamel application system of the nail care system 100 may perform a method for cleaning/purging the nozzle in order to achieve a good application.

In some embodiments, the enamel application system of the nail care system 100 may perform a process for landing a nozzle on a finger nail in a way that optimizes the ability to achieve complete coverage and/or a smooth finish.

In some embodiments, the enamel application system of the nail care system 100 may utilize one-time use application nozzles (e.g., nozzles integrated into containers, to minimize flow paths and opportunity for curing and clogs).

In some embodiments, the enamel application system of the nail care system 100 may perform a method of applying high viscosity fluid (or enamel) by first applying the perimeter, and later filling the center. In other embodiments, a wide range of techniques and/or paths may be used. For example, application may be from the center out using, for example, some form of spiral or modified spiral. In other embodiments, filling may be accomplished using appropriately spaced horizontal or vertical rows. In other embodiments, sections of the nail may be filled (for example, by using any of a variety of techniques, some of which are provided as examples above). In some embodiments, any space-filling pattern may be used to fill some or all of any nail or nails.

In some embodiments, the enamel application system of the nail care system 100 may perform and utilize a measurement using a flexible application nozzle and its deflection to inform a better understanding of the 3D geometry of the nail (e.g., which could allow for more precise top-coat application and/or could inform non-contact application during future manicures or uses).

In some embodiments, the nozzle may be actively controlled in one or more possibly mutually perpendicular axes in order to more precisely and/or uniformly control application.

In some embodiments, enamel may be dispensed using a positive displacement pump to precisely control the amount of material applied.

In some embodiments, the applicator pump may be able to both extrude and withdraw fluid in order to optimally control application rate.

In some embodiments, the application pump is contained within the replaceable cartridge. In some embodiments, the nail care system 100 may monitor the position of the application nozzle in space (e.g., in order to inform or adjust nail shaping and/or to inform nail shaping progress). This may be accomplished by a variety of methods, for example, using absolute or relative encoders on some or all members of the actuation system or, for example, by using components of the vision system (or other specifically purposed vision elements) to optically locate the shaping element, or, for example, by sensing of a magnetic element located with a known relationship to the shaping element, or, for example, by the use of a capacitive sensor to locate the shaping element or a capacitive target located with a known relationship to the shaping element.

In some embodiments the position and/or orientation of the nozzle relative to the nail or its normal may be monitored using, for example, optical or acoustic ranging, or capacitive sensing.

In some embodiments, the position and/or orientation of the nozzle relative to the nail or its normal may be used to modify the path followed by the nozzle in order to optimally, for example, balance speed, coverage, glossiness, and uniformity of applied fluid.

In some embodiments, the configuration of the nozzle (e.g., length and/or width, presence and/or position of a filament or needle within the nozzle, etc.) may be varied, either actively or passively or both, in order to optimize dispensing of enamel or other material to be applied.

Enamel Removal

In some embodiments, the enamel removal system of the nail care system 100 may include a passively or actively controlled flexible effector designed to make contact with a user's entire nail bed (e.g., and/or the same designed to spread into lateral nail fold).

In some embodiments, the enamel removal system of the nail care system 100 may include a thicker absorbent layer, acting as acetone (or remover) reservoir, covered by a cloth layer.

In some embodiments, the enamel removal system of the nail care system 100 may include a system to automatically dispense acetone or remover into an effector or onto a nail.

In some embodiments, the enamel removal system of the nail care system 100 may include a cloth layer that absorbs enamel, which can be translated or rotated to position a fresh surface after each fingernail.

In some embodiments, the enamel removal system of the nail care system 100 may include an autonomous translation/actuation of cloth/absorbent layer while maintaining the position of flexures and remover-soaked swab (or layer).

In some embodiments, the enamel removal system of the nail care system 100 may include an end effector that moves in one or more ways in order to improve enamel removal (e.g., while simultaneously maintaining pressure on the user's finger and/or maintaining normal to fingernail).

Additional Embodiments and Details Regarding Nail Care System

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor (e.g., multiple processors), which can be special or general purpose, coupled to receive data and instructions from, and to transmit data and instructions to, a storage system, at least one input device, and/or at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" or "computer-readable" medium refers to any computer program product, apparatus and/or device, such as for example magnetic discs, optical disks, memory, and Programmable Logic Devices (PLDs), used to provide machine instructions and/or data to a processor, including a machine-readable medium that receives machine instructions as a machine-readable signal. The term "machine-readable signal" refers to any signal used to provide machine instructions and/or data to a processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer or robot having a display device (e.g., interactive display device), such as for example a cathode ray tube (CRT) or a liquid crystal display (LCD) or a light emitting diode (LED) monitor for displaying information to the user, and in some embodiments one or more buttons, a keyboard, a pointing device, such as for example a mouse or a trackball, by which the user may provide input to the computer (e.g., in some embodiments, the user may provide input via the interactive display). Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Terminology

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units to perform the exemplary process, it is understood that the exemplary processes may also be performed by one or plurality of modules.

The use of the terms "first", "second", "third" and so on, herein, are provided to identify various structures, dimensions or operations, without describing any order, and the structures, dimensions or operations may be executed in a different order from the stated order unless a specific order is definitely specified in the context.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be embodied in systems, apparatus, methods, and/or articles depending on the desired configuration. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other embodiments may be within the scope of the following claims.

What is claimed is:

1. A nail care system comprising:
one or more of a shaping system, a polish removal system and a cuticle system;
a nail polish application system;
a mobility system; and
a vision system comprising an image acquisition system, an illumination system, and a machine vision processing system comprising a computing device having at least one processor and non-transitory memory storing at least one program for execution by the at least one processor, the at least one program including instructions that cause the processor to:
determine a nail extent and a nail height profile based on analysis of pre-processed images, and
output operating instructions for the mobility system based on the determined nail extent and the determined nail height profile.

2. The nail care system of claim 1, wherein the shaping system is configured for one or more of rotary motion, linear reciprocating motion, and rotational oscillation, and wherein the shaping system comprises an abrasive element.

3. The nail care system of claim 1, wherein the polish removal system comprises a polish removal tool comprising one or more of a sponge, a semi-circular groove or a groove pattern on a surface thereof, and a brush or one or more bristles.

4. The nail care system of claim 1, wherein the cuticle system comprises a burnishing tool.

5. The nail care system of claim 1, wherein the at least one program further including instructions, which, when executed by the at least one processor cause the at least one processor to perform operations comprising: determining finger and nail placement based on analysis of the pre-processed images; outputting operating instructions for one or more of the shaping system, the polish removal system, the cuticle system, the vision system, the nail polish application system, and the mobility system based on the determined nail extent, the determined nail height profile, and the determined finger and nail placement.

6. The nail care system of claim 1, wherein the nail polish application system comprises a reservoir or vial in fluid communication with a nozzle.

7. The nail care system of claim 6, wherein the reservoir or vial includes a cap, wherein the cap is configured to remain stationary relative to the nozzle, and wherein the reservoir or vial is configured to be moved relative to the nozzle, and cause fluid in the reservoir or vial to flow out of the nozzle.

8. The nail care system of claim 1, wherein the mobility system is configured to move one or more of the shaping system, the polish removal system, the cuticle system, and the nail polish application system in at least three directions and rotationally about at least two axes.

9. The nail care system of claim 1, further comprising an accelerated drying system.

10. The nail care system of claim 1, further comprising a hand massage system.

11. The nail care system of claim 1, further comprising a nail identification, diagnosis and estimation of conditions system.

12. The nail care system of claim 1, further comprising: an enclosure system configured to enclose the mobility system, one or more of the shaping system, the polish removal system, the cuticle system, and the nail polish application system, and configured to permit movement of the same in at least three directions and rotationally about at least two axes.

13. The nail care system of claim 1, further comprising: a hand rest or foot rest system comprising one or more of fiducials, and at least one finger guide having bilateral symmetry.

14. The nail care system of claim 1, further comprising: a cartridge or pod system including one or more components of the nail polish application system, and the polish removal system.

15. The nail care system of claim 1, further comprising: a multi-tool system configured for movement by the mobility system and configured to engage with one or more of the cuticle system, the shaping system, the application system, and the removal system.

16. A non-transitory computer-readable storage medium storing at least one program for nail care, the at least one program for execution by at least one processor and a non-transitory memory storing the at least one program, the at least one program including instructions, when, executed by the at least one processor cause the at least one processor to perform operations comprising:

coordinated operation of one or more of a shaping system, a polish removal system, a cuticle management system, a vision system, a nail polish application system, and a mobility system;

receiving image information from the vision system;

pre-processing the received images;

determining nail extent and a nail height profile based on analysis of the pre-processed images; and determining finger and nail placement based on analysis of the pre-processed images; outputting operating instructions for one or more of the shaping system, the polish removal system, the cuticle management system, the vision system, the nail polish application system, and the mobility system based on the determined nail extent, the determined nail height profile, and the determined finger and nail placement.

17. The non-transitory computer-readable storage medium of claim 16, further comprising: a computer implemented tool movement method comprising: driving one or more of the shaping system, the polish removal system, the cuticle management system, and the nail polish application system to a starting point relative to the nail; driving a center of the one or more of the shaping system, the polish removal system, the cuticle management system, and the nail polish application system to a lateral fold of the nail; moving the one or more of the shaping system, the polish removal system, the cuticle management system, and the nail polish application system in any suitable direction relative to the nail; lifting the one or more of the shaping system, the polish removal system, the cuticle management system, and the nail polish application system; and driving the one or more of the shaping system, the polish removal system, the cuticle management system, and the nail polish application system to another point relative to the nail.

18. The non-transitory computer-readable storage medium of claim 16, further comprising: a computer implemented tool movement method comprising: driving the one or more of the shaping system, the polish removal system, the cuticle management system, and the nail polish application system according to a predetermined pattern in order to place the one or more of the shaping system, the polish removal system, the cuticle management system, and the nail polish application system in a predetermined position proximate to one or more anatomical features of the nail in order to perform an operation of the one or more of the shaping system, the polish removal system, the cuticle management system, and the nail polish application system.

19. The non-transitory computer-readable storage medium of claim 16, further comprising a computer implemented path planning method for a single nail, a plurality of nails, and/or a full hand including the plurality of nails and for generating instructions for driving and operating the one or more of the shaping system, the polish removal system, the cuticle management system, and the nail polish application system.

* * * * *